(12) United States Patent
Muhammedali

(10) Patent No.: US 11,995,613 B2
(45) Date of Patent: May 28, 2024

(54) SEARCH EXTRACTION MATCHING, DRAW ATTENTION-FIT MODALITY, APPLICATION MORPHING, AND INFORMED APPLY APPARATUSES, METHODS AND SYSTEMS

(71) Applicant: Monster Worldwide, Inc., Weston, MA (US)

(72) Inventor: Javid Muhammedali, Wellesley, MA (US)

(73) Assignee: Monster Worldwide, Inc.

( * ) Notice: Subject to any disclaimer, the term of this patent is extended or adjusted under 35 U.S.C. 154(b) by 0 days.

(21) Appl. No.: 17/895,015

(22) Filed: Aug. 24, 2022

(65) Prior Publication Data
US 2023/0026252 A1    Jan. 26, 2023

Related U.S. Application Data

(63) Continuation of application No. 15/465,478, filed on Mar. 21, 2017, now abandoned, which is a (Continued)

(51) Int. Cl.
G06Q 10/1053 (2023.01)
G06F 16/2455 (2019.01)
(Continued)

(52) U.S. Cl.
CPC ..... *G06Q 10/1053* (2013.01); *G06F 16/2456* (2019.01); *G06F 16/24578* (2019.01);
(Continued)

(58) Field of Classification Search
None
See application file for complete search history.

(56) References Cited

U.S. PATENT DOCUMENTS 4,831,403 A   5/1989 Ishida et al.
4,882,601 A   11/1989 Taniguchi et al.
(Continued)

FOREIGN PATENT DOCUMENTS

CN   104001976   8/2014
EP   1085751    12/2002
(Continued)

OTHER PUBLICATIONS

"yahoo !_hotjobs" (webpage, published Apr. 1, 2005 and dowmloaded from http://web.archive.org/web/2005040109545/hotobs.yahoo.com/jobs/ on Dec. 11, 2009.
(Continued)

*Primary Examiner* — Kim T Nguyen
(74) *Attorney, Agent, or Firm* — Hanchuk Kheit LLP.; Walter G. Hanchuk

(57) ABSTRACT

The Search Extraction Matching, Draw Attention-Fit Modality, Application Morphing, and Informed Apply Apparatuses, Methods and Systems ("SEMATFM-AMIA") transforms inputs including new job listing introduction inputs, via SEMATFM-AMIA components (e.g., the conductor component, the resume view controller component, the XY paths handler component, the title handler component, the resume librarian component, and the job listing librarian component), into outputs including relevant resume outputs and/or augmented new job listing record outputs. It is noted that the terms "component" and "object" may be used interchangeably hereinthroughout. In one embodiment, the SEMATFM-AMIA includes an apparatus, comprising: a memory, a component collection in the memory, and a processor disposed in communication with the memory, and configured to issue a plurality of processing instructions from the component collection stored in the memory.

(Continued)

SEMATFM-AMIA may then receive, in connection with an application to a job, a resume adjustment request, where the request includes one or more raw terms of a resume, one or more normalized terms of the resume, one or more raw terms of a job listing corresponding to the job, and one or more normalized terms of the job listing. SEMATFM-AMIA may load said resume normalized terms and said job listing normalized terms into a joined normalized terms set, and add to a common normalized terms set normalized term members of the joined normalized terms set which meet a count criterion. SEMATFM-AMIA may visit each of one or more normalized term members of the common normalized terms set. After further receiving, adding, visiting, providing and otherwise processing data, SEMATFM-AMIA may receive, from the resume adjuster component, a request to formulate the adjusted resume record, wherein said record formulation request includes specification of the resume and substitution information, and formulate the adjusted resume record which substitutes each of user-selected resume raw terms with a corresponding user-selected job listing raw term, wherein the formulation includes accessing one or more stores.

1 Claim, 69 Drawing Sheets

Related U.S. Application Data continuation-in-part of application No. 14/711,336, filed on May 13, 2015, now abandoned.

(60) Provisional application No. 62/345,719, filed on Jun. 3, 2016, provisional application No. 61/992,816, filed on May 13, 2014.

(51) Int. Cl.
*G06F 16/2457* (2019.01)
*G06F 16/903* (2019.01)
*G06F 40/284* (2020.01)
*G06Q 10/06* (2023.01)
*G06Q 10/0631* (2023.01)
*G06Q 10/10* (2023.01)
*G06Q 50/00* (2012.01)
*H04L 67/306* (2022.01)

(52) U.S. Cl.
CPC ...... *G06F 16/90344* (2019.01); *G06F 40/284* (2020.01); *G06Q 10/06* (2013.01); *G06Q 10/063112* (2013.01); *G06Q 10/10* (2013.01); *G06Q 50/01* (2013.01); *H04L 67/306* (2013.01)

(56) References Cited

U.S. PATENT DOCUMENTS

| | | | |
|---|---|---|---|
| 4,910,548 | A | 3/1990 | Taniguchi et al. |
| 4,912,648 | A | 3/1990 | Tyler |
| 5,023,646 | A | 6/1991 | Ishida et al. |
| 5,062,074 | A | 10/1991 | Kleinberger et al. |
| 5,164,897 | A | 11/1992 | Clark et al. |
| 5,168,299 | A | 12/1992 | Taniguchi et al. |
| 5,197,004 | A | 3/1993 | Sobotka et al. |
| 5,218,395 | A | 6/1993 | Taniguchi et al. |
| 5,416,694 | A | 5/1995 | Parrish et al. |
| 5,539,493 | A | 7/1996 | Kusaka |
| 5,663,910 | A | 9/1997 | Ko |
| 5,671,409 | A | 9/1997 | Fatseas et al. |
| 5,740,477 | A | 4/1998 | Kosako et al. |
| 5,805,747 | A | 9/1998 | Bradford |
| 5,832,497 | A | 11/1998 | Taylor |
| 5,884,270 | A | 3/1999 | Walker et al. |
| 5,931,907 | A | 8/1999 | Davies et al. |
| 5,950,022 | A | 9/1999 | Hagiwara |
| 5,978,767 | A | 11/1999 | Chriest et al. |
| 5,978,768 | A | 11/1999 | McGovern et al. |
| 6,006,225 | A | 12/1999 | Bowman et al. |
| 6,026,388 | A | 2/2000 | Liddy et al. |
| 6,052,122 | A | 4/2000 | Sutcliffe et al. |
| 6,144,944 | A | 11/2000 | Kurtzman, II et al. |
| 6,144,958 | A | 11/2000 | Ortega |
| 6,169,986 | B1 | 1/2001 | Bowman et al. |
| 6,185,558 | B1 | 2/2001 | Bowman et al. |
| 6,226,630 | B1 | 5/2001 | Billmers |
| 6,247,043 | B1 | 6/2001 | Bates et al. |
| 6,249,784 | B1 | 6/2001 | Macke et al. |
| 6,263,355 | B1 | 7/2001 | Harrell et al. |
| 6,272,467 | B1 | 8/2001 | Durand et al. |
| 6,275,812 | B1 | 8/2001 | Haq et al. |
| 6,289,340 | B1 | 9/2001 | Puram et al. |
| 6,304,864 | B1 | 10/2001 | Liddy et al. |
| 6,363,376 | B1 | 3/2002 | Wiens et al. |
| 6,370,510 | B1 | 4/2002 | McGovern |
| 6,385,620 | B1 | 5/2002 | Kurzius |
| 6,401,084 | B1 | 6/2002 | Ortega et al. |
| 6,434,551 | B1 | 8/2002 | Takahashi et al. |
| 6,453,312 | B1 | 9/2002 | Goiffon et al. |
| 6,460,025 | B1 | 10/2002 | Fohn et al. |
| 6,463,430 | B1 | 10/2002 | Brady et al. |
| 6,492,944 | B1 | 12/2002 | Stilp |
| 6,502,065 | B2 | 12/2002 | Imanaka et al. |
| 6,516,312 | B1 | 2/2003 | Kraft et al. |
| 6,523,037 | B1 | 2/2003 | Monahan et al. |
| 6,546,005 | B1 | 4/2003 | Berkley et al. |
| 6,563,460 | B2 | 5/2003 | Stilp |
| 6,564,213 | B1 | 5/2003 | Ortega et al. |
| 6,567,784 | B2 | 5/2003 | Bukow |
| 6,571,243 | B2 | 5/2003 | Gupta et al. |
| 6,578,022 | B1 | 6/2003 | Foulger |
| 6,603,428 | B2 | 8/2003 | Stilp |
| 6,615,209 | B1 | 9/2003 | Gomes et al. |
| 6,636,886 | B1 | 10/2003 | Katiyar et al. |
| 6,646,604 | B2 | 11/2003 | Anderson |
| 6,658,423 | B1 | 12/2003 | Pugh et al. |
| 6,661,884 | B2 | 12/2003 | Shaffer |
| 6,662,194 | B1 | 12/2003 | Joao |
| 6,678,690 | B2 | 1/2004 | Kobayashi et al. |
| 6,681,223 | B1 | 1/2004 | Sundaresan |
| 6,681,247 | B1 | 1/2004 | Payton |
| 6,697,800 | B1 | 2/2004 | Jannink et al. |
| 6,701,313 | B1 | 3/2004 | Smith |
| 6,704,051 | B1 | 3/2004 | Takahashi |
| 6,714,944 | B1 | 3/2004 | Shapiro et al. |
| 6,718,340 | B1 | 4/2004 | Hartman et al. |
| 6,757,691 | B1 | 6/2004 | Welsh et al. |
| 6,781,624 | B1 | 8/2004 | Takahashi |
| 6,782,370 | B1 | 8/2004 | Stack |
| 6,803,614 | B2 | 10/2004 | Takahashi |
| 6,853,982 | B2 | 2/2005 | Smith et al. |
| 6,867,981 | B2 | 3/2005 | Murohara |
| 6,873,996 | B2 | 3/2005 | Chand |
| 6,904,407 | B2 | 6/2005 | Ritzel |
| 6,912,505 | B2 | 6/2005 | Linden et al. |
| 6,917,952 | B1 | 7/2005 | Dailey et al. |
| 6,853,993 | B2 | 8/2005 | Ortega |
| 6,952,688 | B2 | 10/2005 | Goldman et al. |
| 6,963,867 | B2 | 11/2005 | Ford et al. |
| 6,973,265 | B2 | 12/2005 | Takahashi |
| 7,016,853 | B1 | 3/2006 | Pereless et al. |
| 7,043,433 | B2 | 5/2006 | Hejna |
| 7,043,443 | B1 | 5/2006 | Firestone |
| 7,043,450 | B2 | 5/2006 | Velez et al. |
| 7,076,483 | B2 | 7/2006 | Preda et al. |
| 7,080,057 | B2 | 7/2006 | Scarborough et al. |
| 7,089,237 | B2 | 8/2006 | Turnbull et al. |
| 7,096,420 | B1 | 8/2006 | Peikes |
| 7,124,353 | B2 | 10/2006 | Goodwin et al. |
| 7,137,075 | B2 | 11/2006 | Huang |

(56) References Cited

U.S. PATENT DOCUMENTS

| | | |
|---|---|---|
| 7,146,416 B1 | 12/2006 | Yoo et al. |
| 7,191,176 B2 | 3/2007 | McCall et al. |
| 7,219,073 B1 | 5/2007 | Taylor et al. |
| 7,225,187 B2 | 5/2007 | Dumais et al. |
| 7,249,121 B1 | 7/2007 | Bharat et al. |
| 7,251,658 B2 | 7/2007 | Dane et al. |
| 7,292,243 B1 | 11/2007 | Burke |
| 7,379,929 B2 | 5/2008 | Meteyer |
| 7,424,438 B2 | 9/2008 | Vianello |
| 7,424,469 B2 | 9/2008 | Ratnaparkhi |
| 7,487,104 B2 | 2/2009 | Sciuk |
| 7,490,086 B2 | 2/2009 | Joao |
| 7,512,612 B1 | 3/2009 | Akella |
| 7,519,621 B2 | 4/2009 | Harik |
| 7,523,387 B1 | 4/2009 | Greenwald et al. |
| 7,613,631 B2 | 11/2009 | Walker et al. |
| 7,668,950 B2 | 2/2010 | Horowitz et al. |
| 7,702,515 B2 | 4/2010 | Fujino et al. |
| 7,711,573 B1 | 5/2010 | Obeid |
| 7,720,791 B2 | 5/2010 | Hyder |
| 7,734,503 B2 | 5/2010 | Agarwal et al. |
| 7,761,320 B2 | 6/2010 | Fliess et al. |
| 7,778,872 B2 | 7/2010 | Kamangar et al. |
| 7,827,117 B2 | 11/2010 | MacDaniel et al. |
| 7,865,451 B2 | 1/2011 | Hyder |
| 7,881,963 B2 | 2/2011 | Chudnovesky |
| 8,195,657 B1 | 6/2012 | Dellove |
| 8,244,551 B1 | 8/2012 | Mund |
| 8,321,275 B2 | 11/2012 | Collins et al. |
| 8,375,067 B2 | 2/2013 | Hyder |
| 8,433,713 B2 | 4/2013 | Chen |
| 8,527,510 B2 | 9/2013 | Chen |
| 8,600,931 B1 | 12/2013 | Wehrle |
| 8,645,817 B1 | 2/2014 | Fisher |
| 8,914,383 B1 | 12/2014 | Weinstein |
| 10,878,381 B2 * | 12/2020 | Rennison ............. G06Q 10/105 |
| 11,017,355 B2 * | 5/2021 | Rennison ........... G06Q 10/1057 |
| 11,726,762 B2 * | 8/2023 | Liu ........................... G06F 8/65 |
| | | 717/172 |
| 2001/0034630 A1 | 10/2001 | Mayer et al. |
| 2001/0037223 A1 | 11/2001 | Beery |
| 2001/0039508 A1 | 11/2001 | Nagler et al. |
| 2001/0042000 A1 | 11/2001 | Defoor, Jr. |
| 2001/0047347 A1 | 11/2001 | Perell et al. |
| 2001/0049674 A1 | 12/2001 | Talib et al. |
| 2002/0002479 A1 | 1/2002 | Almog et al. |
| 2002/0010614 A1 | 1/2002 | Arrowood |
| 2002/0024539 A1 | 2/2002 | Eleftheriadis |
| 2002/0026452 A1 | 2/2002 | Baumgarten et al. |
| 2002/0038241 A1 | 3/2002 | Hiraga |
| 2002/0042733 A1 | 4/2002 | Lesandrini |
| 2002/0045154 A1 | 4/2002 | Wood |
| 2002/0046074 A1 | 4/2002 | Barton |
| 2002/0049774 A1 | 4/2002 | Ritzel |
| 2002/0055867 A1 | 5/2002 | Putnam et al. |
| 2002/0055870 A1 | 5/2002 | Thomas |
| 2002/0059228 A1 | 5/2002 | McCall et al. |
| 2002/0072946 A1 | 6/2002 | Richardson |
| 2002/0091629 A1 | 7/2002 | Danpour |
| 2002/0091669 A1 | 7/2002 | Puram et al. |
| 2002/0091689 A1 | 7/2002 | Wiens et al. |
| 2002/0095621 A1 | 7/2002 | Lawton |
| 2002/0103698 A1 | 8/2002 | Cantrell |
| 2002/0111843 A1 | 8/2002 | Wellenstein |
| 2002/0116203 A1 | 8/2002 | Cherry |
| 2002/0120506 A1 | 8/2002 | Hagen |
| 2002/0120532 A1 | 8/2002 | McGovern et al. |
| 2002/0123921 A1 | 9/2002 | Frazier |
| 2002/0124184 A1 | 9/2002 | Fichadia et al. |
| 2002/0128892 A1 | 9/2002 | Farenden |
| 2002/0133369 A1 | 9/2002 | Johnson |
| 2002/0143573 A1 | 10/2002 | Bryce et al. |
| 2002/0156674 A1 | 10/2002 | Okamoto et al. |
| 2002/0161602 A1 | 10/2002 | Dougherty et al. |
| 2002/0169669 A1 | 11/2002 | Stetson |
| 2002/0174008 A1 | 11/2002 | Noteboom |
| 2002/0194056 A1 | 12/2002 | Summers |
| 2002/0194161 A1 | 12/2002 | McNamee et al. |
| 2002/0194166 A1 | 12/2002 | Fowler et al. |
| 2002/0195362 A1 | 12/2002 | Abe |
| 2002/0198882 A1 | 12/2002 | Linden et al. |
| 2003/0009437 A1 | 1/2003 | Seiler et al. |
| 2003/0009479 A1 | 1/2003 | Phair |
| 2003/0014294 A1 | 1/2003 | Yoneyama |
| 2003/0018621 A1 | 1/2003 | Steiner et al. |
| 2003/0023474 A1 | 1/2003 | Helweg-Larsen |
| 2003/0033292 A1 | 2/2003 | Meisel et al. |
| 2003/0037032 A1 | 2/2003 | Neece |
| 2003/0046139 A1 | 3/2003 | Beman et al. |
| 2003/0046152 A1 | 3/2003 | Colas et al. |
| 2003/0046311 A1 | 3/2003 | Baidya et al. |
| 2003/0046389 A1 | 3/2003 | Thieme |
| 2003/0061242 A1 | 3/2003 | Warmer et al. |
| 2003/0071852 A1 | 4/2003 | Stimac |
| 2003/0093322 A1 | 5/2003 | Sciuk |
| 2003/0125970 A1 | 7/2003 | Mittal et al. |
| 2003/0144996 A1 | 7/2003 | Moore, Jr. |
| 2003/0158855 A1 | 8/2003 | Farnham et al. |
| 2003/0160887 A1 | 8/2003 | Takahashi |
| 2003/0172145 A1 | 9/2003 | Nguyen |
| 2003/0177027 A1 | 9/2003 | DiMarco |
| 2003/0182171 A1 | 9/2003 | Vianello |
| 2003/0182173 A1 | 9/2003 | D'Elena et al. |
| 2003/0187680 A1 | 10/2003 | Fujino et al. |
| 2003/0187842 A1 | 10/2003 | Hyatt |
| 2003/0195877 A1 | 10/2003 | Ford et al. |
| 2003/0204439 A1 | 10/2003 | Cullen |
| 2003/0220811 A1 | 11/2003 | Fan et al. |
| 2003/0229638 A1 | 12/2003 | Carpenter et al. |
| 2004/0030566 A1 | 2/2004 | Brooks |
| 2004/0107112 A1 | 6/2004 | Cotter |
| 2004/0107192 A1 | 6/2004 | Joao |
| 2004/0111267 A1 | 6/2004 | Jadhav et al. |
| 2004/0117189 A1 | 6/2004 | Bennett |
| 2004/0128282 A1 | 7/2004 | Kleinberger et al. |
| 2004/0133413 A1 | 7/2004 | Beringer et al. |
| 2004/0138112 A1 | 7/2004 | Cassart |
| 2004/0148180 A1 | 7/2004 | Pajwani |
| 2004/0148220 A1 | 7/2004 | Freeman et al. |
| 2004/0163040 A1 | 8/2004 | Hansen |
| 2004/0186743 A1 | 9/2004 | Cordero |
| 2004/0186776 A1 | 9/2004 | Llach et al. |
| 2004/0193484 A1 | 9/2004 | Allen |
| 2004/0193582 A1 | 9/2004 | Smyth |
| 2004/0210565 A1 | 10/2004 | Lu |
| 2004/0210600 A1 | 10/2004 | Chand |
| 2004/0210661 A1 | 10/2004 | Thompson |
| 2004/0215793 A1 | 10/2004 | Ryan et al. |
| 2004/0219493 A1 | 11/2004 | Philips |
| 2004/0225629 A1 | 11/2004 | Eder |
| 2004/0243428 A1 | 12/2004 | Black et al. |
| 2004/0267554 A1 | 12/2004 | Bowman et al. |
| 2004/0267595 A1 | 12/2004 | Woodings et al. |
| 2004/0267735 A1 | 12/2004 | Melham |
| 2005/0004927 A1 | 1/2005 | Singer |
| 2005/0033633 A1 | 2/2005 | LaPasta et al. |
| 2005/0033698 A1 | 2/2005 | Chapman |
| 2005/0050440 A1 | 3/2005 | Meteyer et al. |
| 2005/0055340 A1 | 3/2005 | Dresden |
| 2005/0060318 A1 | 3/2005 | Brickman |
| 2005/0080656 A1 | 4/2005 | Crow et al. |
| 2005/0080657 A1 | 4/2005 | Crow et al. |
| 2005/0080764 A1 | 4/2005 | Ito |
| 2005/0080795 A1 | 4/2005 | Kapur et al. |
| 2005/0083906 A1 | 4/2005 | Speicher |
| 2005/0096973 A1 | 5/2005 | Heyse et al. |
| 2005/0097204 A1 | 5/2005 | Horowitz |
| 2005/0114203 A1 | 5/2005 | Savitsky et al. |
| 2005/0125283 A1 | 6/2005 | Fan et al. |
| 2005/0125408 A1 | 6/2005 | Somaroo et al. |
| 2005/0154701 A1 | 7/2005 | Parunak et al. |
| 2005/0154746 A1 | 7/2005 | Liu et al. |
| 2005/0171867 A1 | 8/2005 | Doonan |
| 2005/0177408 A1 | 8/2005 | Miller |

(56) References Cited

U.S. PATENT DOCUMENTS

| | | |
|---|---|---|
| 2005/0192955 A1 | 9/2005 | Farrell |
| 2005/0210514 A1 | 9/2005 | Kittlaus et al. |
| 2005/0222901 A1 | 10/2005 | Agarwal et al. |
| 2005/0228709 A1 | 10/2005 | Segal |
| 2005/0240431 A1 | 10/2005 | Cotter |
| 2005/0278205 A1 | 12/2005 | Kato |
| 2005/0278709 A1 | 12/2005 | Sridhar et al. |
| 2006/0010108 A1 | 1/2006 | Greenberg |
| 2006/0026067 A1 | 2/2006 | Nicholas et al. |
| 2006/0026075 A1 | 2/2006 | Dickerson et al. |
| 2006/0031107 A1 | 2/2006 | Aihara et al. |
| 2006/0047530 A1 | 3/2006 | So et al. |
| 2006/0069614 A1 | 3/2006 | Agarwal et al. |
| 2006/0080321 A1 | 4/2006 | Horn et al. |
| 2006/0100919 A1 | 5/2006 | Levine |
| 2006/0106636 A1 | 5/2006 | Segal |
| 2006/0116894 A1 | 6/2006 | DiMarco |
| 2006/0133595 A1 | 6/2006 | Ravishankar |
| 2006/0155698 A1 | 7/2006 | Vayssiere |
| 2006/0177210 A1 | 8/2006 | Ichimiya |
| 2006/0178896 A1 | 8/2006 | Sproul |
| 2006/0195362 A1 | 8/2006 | Jacobi et al. |
| 2006/0206448 A1 | 9/2006 | Hyder et al. |
| 2006/0206505 A1 | 9/2006 | Hyder et al. |
| 2006/0206517 A1 | 9/2006 | Hyder et al. |
| 2006/0206584 A1 | 9/2006 | Hyder et al. |
| 2006/0212466 A1 | 9/2006 | Hyder et al. |
| 2006/0229895 A1 | 10/2006 | Kodger |
| 2006/0229896 A1 | 10/2006 | Rosen et al. |
| 2006/0235884 A1 | 10/2006 | Pfenninger |
| 2006/0265266 A1 | 11/2006 | Chen et al. |
| 2006/0265267 A1 | 11/2006 | Chen et al. |
| 2006/0265268 A1 | 11/2006 | Hyder et al. |
| 2006/0265269 A1 | 11/2006 | Hyder et al. |
| 2006/0265270 A1 | 11/2006 | Hyder et al. |
| 2006/0277102 A1 | 12/2006 | Agliozzo |
| 2007/0022188 A1 | 1/2007 | Kohs |
| 2007/0033064 A1 | 2/2007 | Abrahamsohn |
| 2007/0038636 A1 | 2/2007 | Zanghi et al. |
| 2007/0050257 A1 | 3/2007 | Fine |
| 2007/0054248 A1 | 3/2007 | Bare |
| 2007/0059671 A1 | 3/2007 | Mitchell |
| 2007/0100803 A1 | 5/2007 | Cava |
| 2007/0162323 A1 | 7/2007 | Gorham |
| 2007/0185884 A1 | 8/2007 | Kantamneni |
| 2007/0190504 A1 | 8/2007 | Schwartz et al. |
| 2007/0203710 A1 | 8/2007 | Habichler et al. |
| 2007/0203906 A1 | 8/2007 | Cone et al. |
| 2007/0218434 A1 | 9/2007 | Habichler et al. |
| 2007/0239777 A1 | 10/2007 | Toomey |
| 2007/0260597 A1 | 11/2007 | Crame |
| 2007/0271109 A1 | 11/2007 | Wang et al. |
| 2007/0273909 A1 | 11/2007 | Chen et al. |
| 2007/0288308 A1 | 12/2007 | Chen et al. |
| 2008/0059523 A1 | 3/2008 | Schmidt |
| 2008/0133343 A1 | 6/2008 | Hyder et al. |
| 2008/0133499 A1 | 6/2008 | Hyder et al. |
| 2008/0133595 A1 | 6/2008 | Hyder et al. |
| 2008/0140430 A1 | 6/2008 | Hyder |
| 2008/0140680 A1 | 6/2008 | Hyder et al. |
| 2008/0155588 A1 | 6/2008 | Roberts et al. |
| 2008/0275980 A1 | 11/2008 | Hansen |
| 2009/0138335 A1 | 5/2009 | Lieberman |
| 2009/0164282 A1 | 6/2009 | Goldberg |
| 2009/0198558 A1 | 8/2009 | Chen et al. |
| 2010/0082356 A1 | 4/2010 | Verma et al. |
| 2010/0114789 A1* | 5/2010 | Dane ............... G06Q 10/06 705/321 |
| 2011/0060695 A1 | 3/2011 | Boyland |
| 2011/0134127 A1 | 6/2011 | Gundlapalli et al. |
| 2012/0226623 A1 | 9/2012 | Jurney et al. |
| 2014/0244534 A1 | 8/2014 | Simmons et al. |
| 2014/0324721 A1* | 10/2014 | Rennison ........... G06Q 50/2057 705/321 |
| 2017/0270487 A1* | 9/2017 | Rennison ........... G06Q 10/1057 |
| 2017/0330153 A1* | 11/2017 | Muhammedali ...... H04L 67/306 |
| 2023/0026252 A1* | 1/2023 | Muhammedali ............ G06F 16/90344 |
| 2023/0262830 A1* | 8/2023 | Ohlsson ............... H04W 12/06 370/328 |

FOREIGN PATENT DOCUMENTS

| | | |
|---|---|---|
| EP | 1596535 | 5/2004 |
| JP | 63-246709 | 10/1988 |
| JP | 6-265774 | 9/1994 |
| JP | 6-313844 | 11/1994 |
| JP | 7-287161 | 10/1995 |
| JP | 8-76174 | 3/1996 |
| JP | 61-62011 | 3/1996 |
| JP | 8-292366 | 5/1996 |
| JP | 8-286103 | 11/1996 |
| JP | 10-26723 | 1/1998 |
| JP | 2001-083407 | 3/2001 |
| JP | 200203030 | 7/2002 |
| JP | 2002251448 | 9/2002 |
| JP | 2004062834 | 2/2004 |
| JP | 2005109370 | 11/2005 |
| WO | 00/26839 | 5/2000 |
| WO | 0148666 | 2/2001 |
| WO | 0146870 | 6/2001 |

OTHER PUBLICATIONS

Greg Linden, Brent Smith, Jeremy York, "Amazon.com Recommendations Item-to_item Collaborative Filtering," IEEE Internet Computing, vol. 7, No. 1, January/Feb. 2003: 76-80. University of Maryland. Department of Computer Science. Dec. 2, 2009 <http://www.cs.umd.edu/~samir/498/Amazon-Recommendations.pdf>.

Bettman, James R., "A Threshold Model of Attribute Satisfaction Decisions." Journal of Consumer Research Policy Board, pp. 30-35, 1974.

Hotjob webpag, published Apr. 1, 2005 and downloaded from http://webarchive.org/web/20050401095045/hotjobs.yahoo.com/jobs/ on Dec. 11, 2009.

Notice of Acceptance on Australian patent application No. 2007249205 dated Mar. 12, 2013.

International search report and written opinion for PCT/US2007/068913 mailed Nov. 30, 2007.

International search report and written opinion for PCT/US2007/068914 dated Dec. 7, 2007.

International search report and written opinion for PCT/US2007/068916 dated Feb. 22, 2008.

International search report and written opinion for PCT/US2007/068917 dated Nov. 30, 2007.

Examiner first report on Australian patent application No. 2007249205 dated Jun. 30, 2011.

Examiner's search information statement on Australian patent application No. 2007249205 dated Jun. 29, 2011.

"Commsland: Contractors cut out the middleman." M2 Presswire. Coventry: Nov. 5, 2002, p. 1.

Hallet, Karen Schreier. "Mastering the expanding LEXIS-NEXIS academic universe," EContent. Wilton: Oct/Nov. 1999. Vol. 22, Iss. 5, p. 47.

Hayes, heather B. "Hiring on the Fast Track," Federal Computer Week, Falls Church: Jul. 29, 2002, vol. 16, Iss. 26, p. 26.

"Steve Wynn Begins Search for 9000 Employees fro Wynn Las Vegas." PR Newswire. New York: Nov. 8, 2004. p. 4.

M. Balabanovic et al. (Mar. 1997). "Fab: content-Based, Collaborative Recommendation," Communications of the ACM 40(3): 66-72.

Bettman, James R., " A Threshold Model of Attribute Satisfaction decisions", Joournsumer Research Policy Board, pp. 30-35 (1974).

* cited by examiner

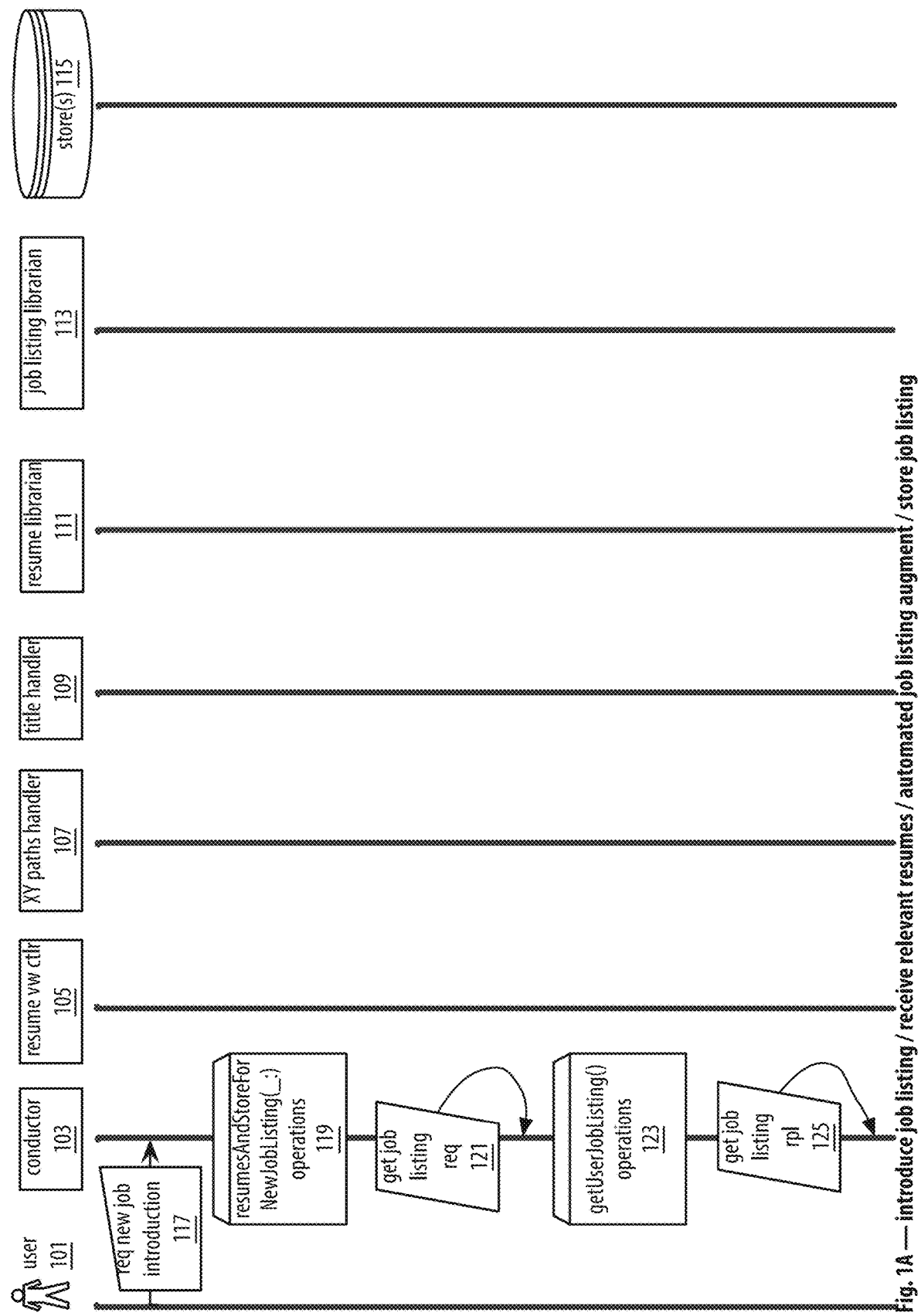

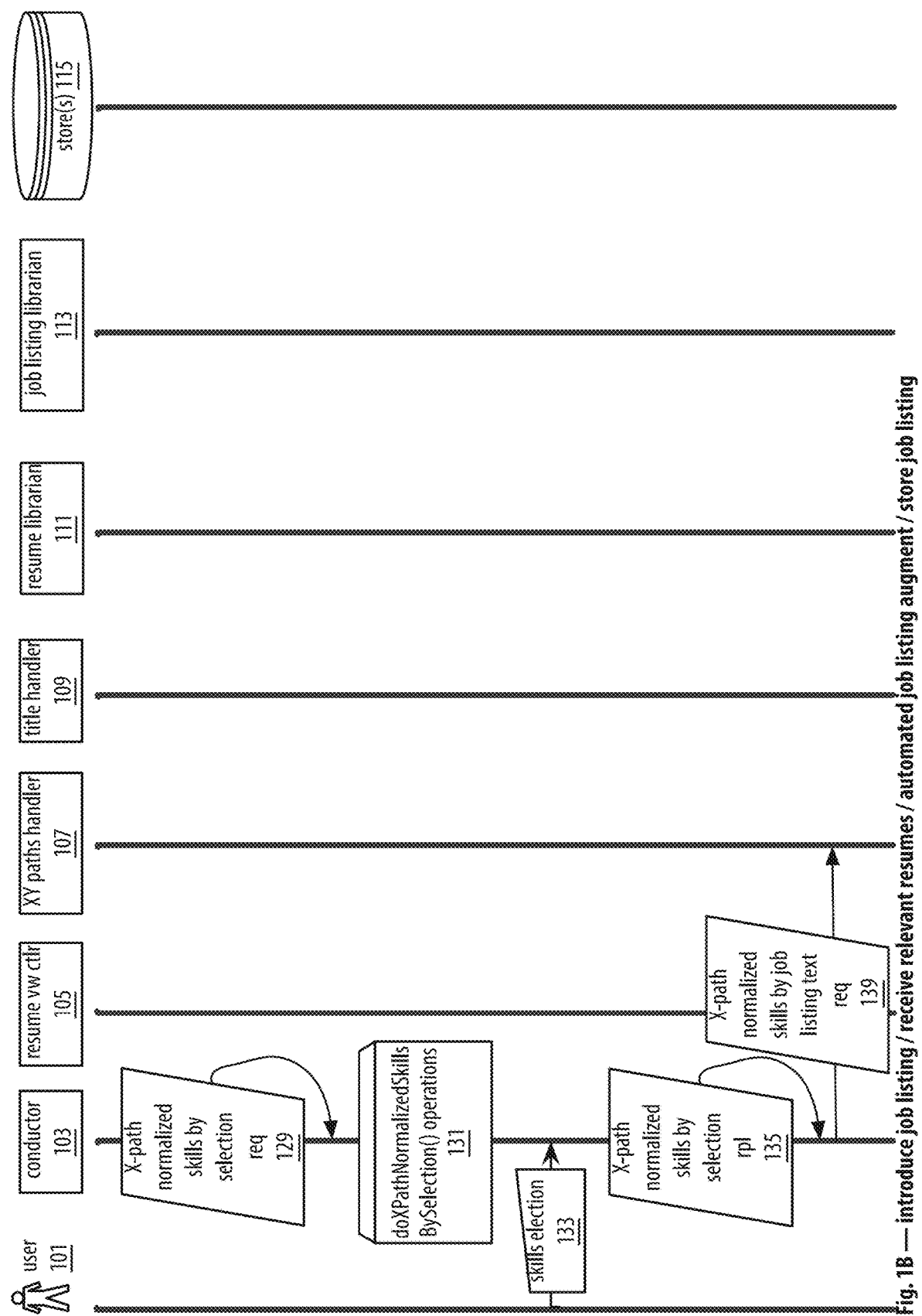

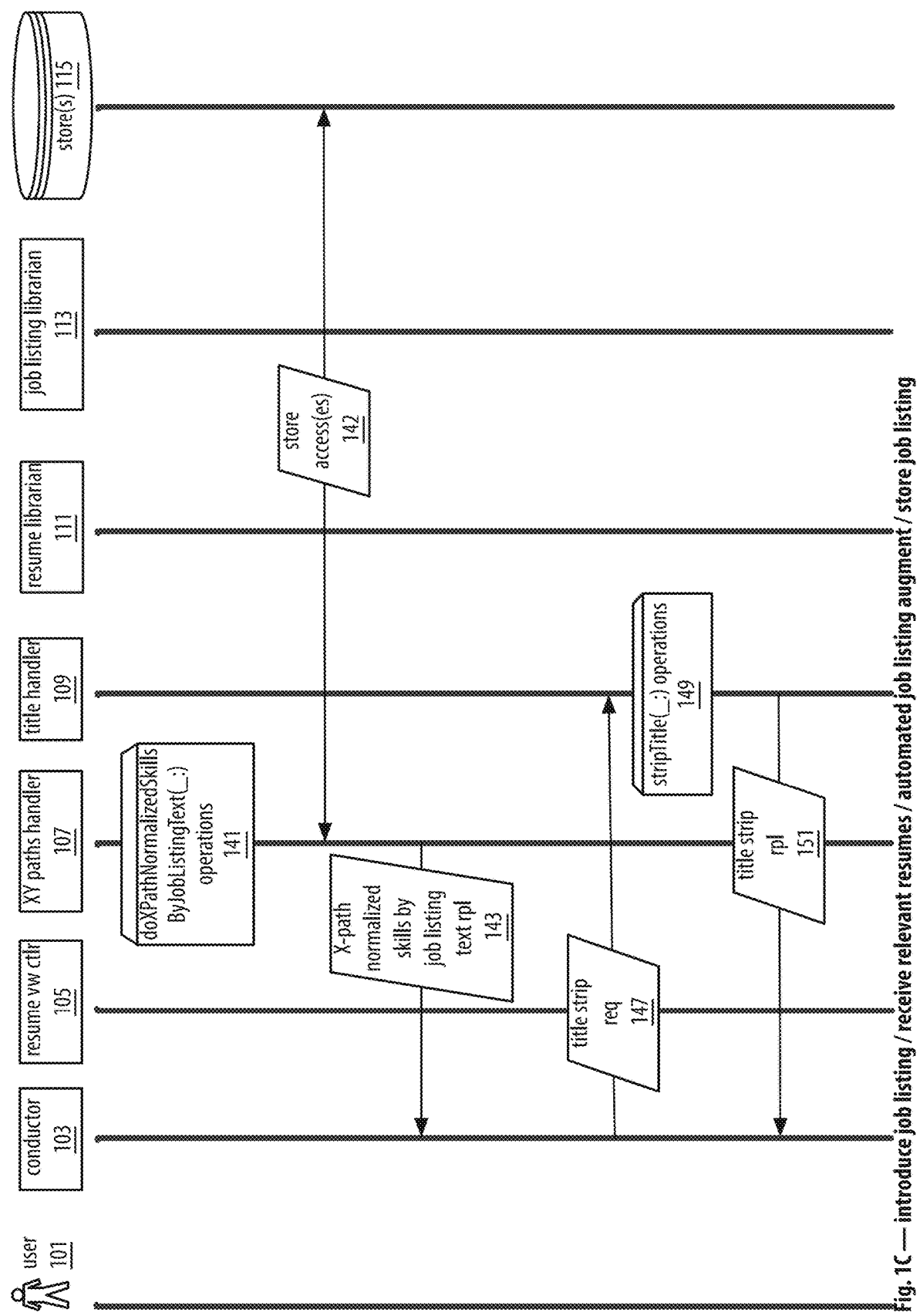

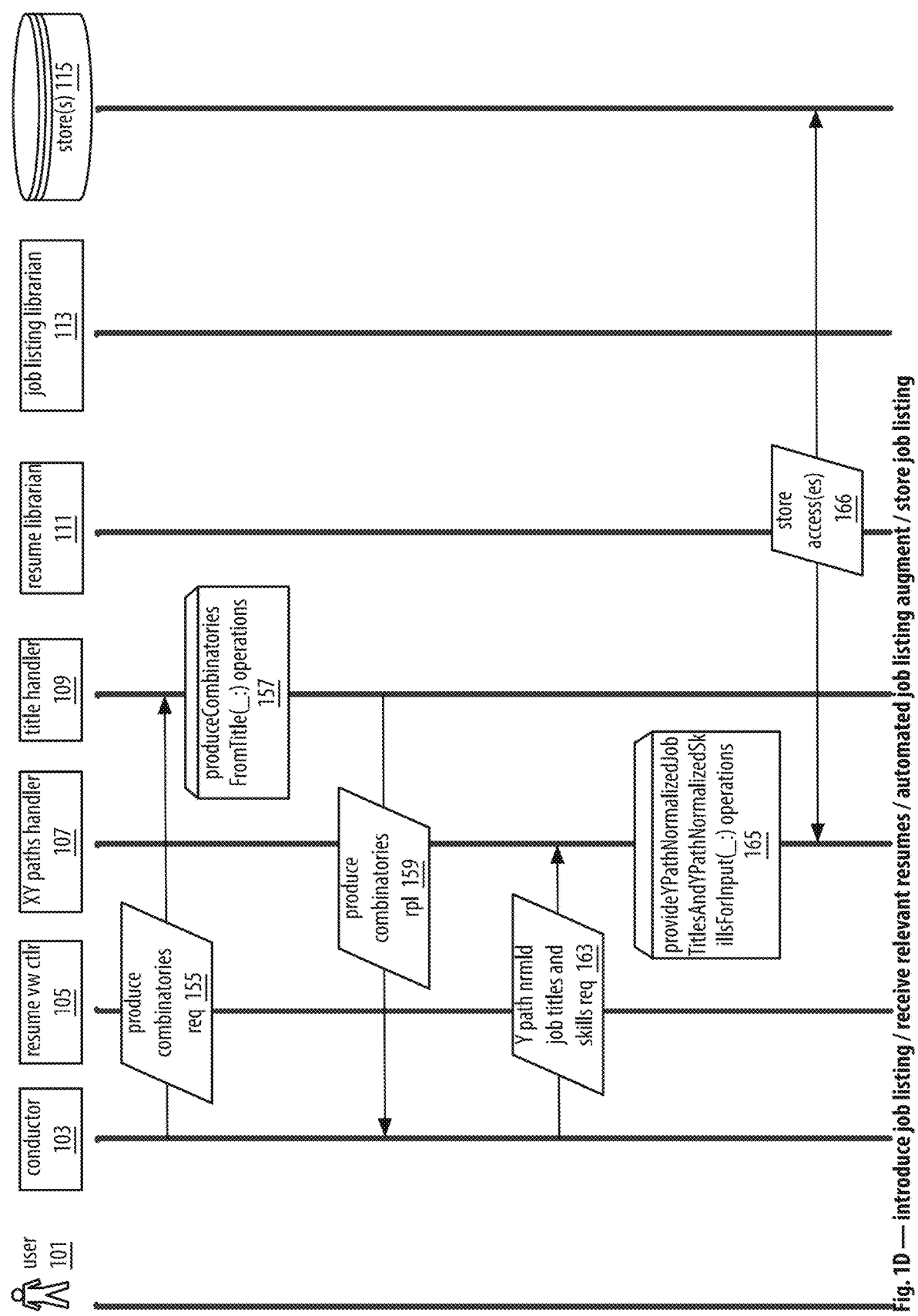

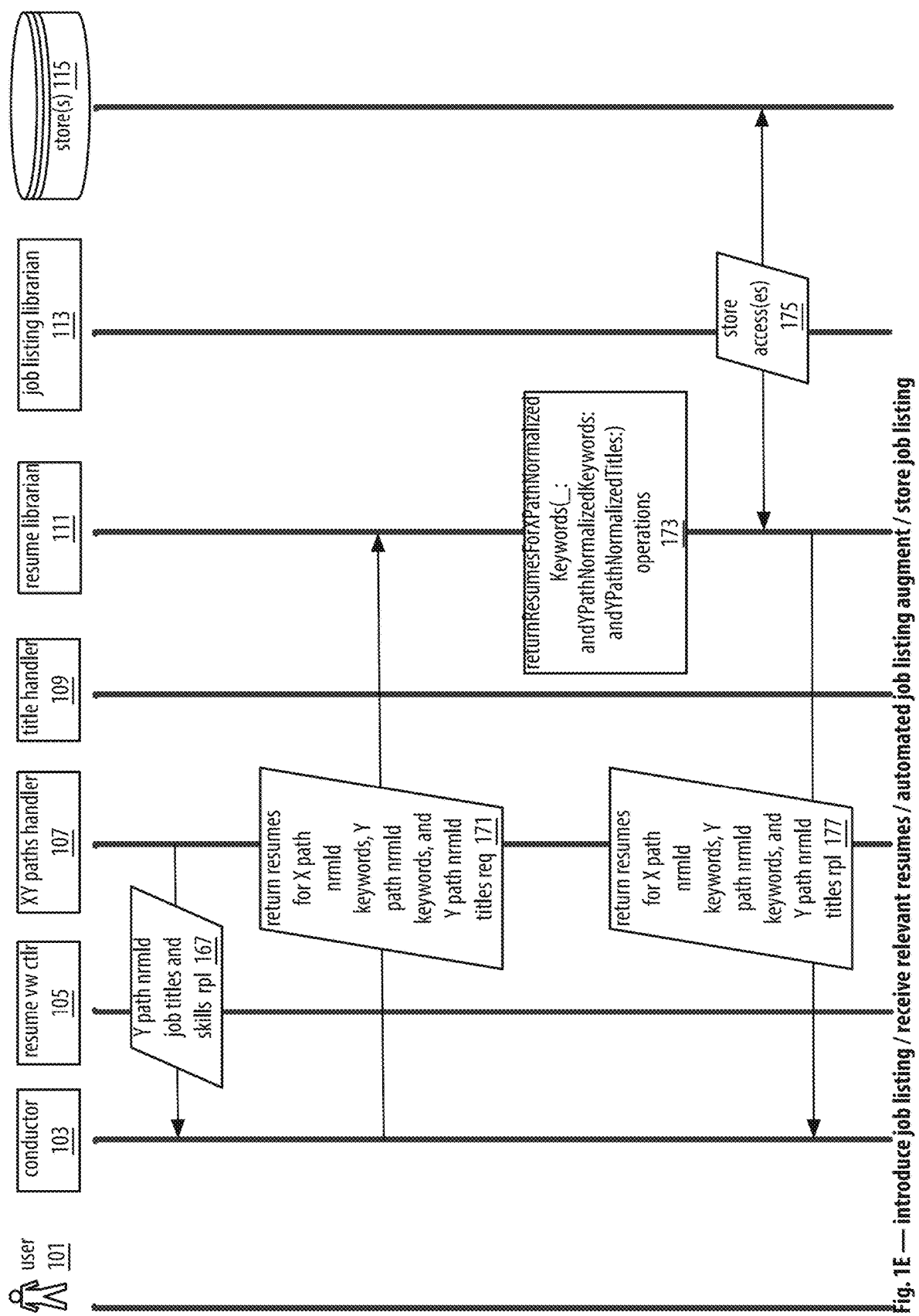
Fig. 1E — introduce job listing / receive relevant resumes / automated job listing augment / store job listing

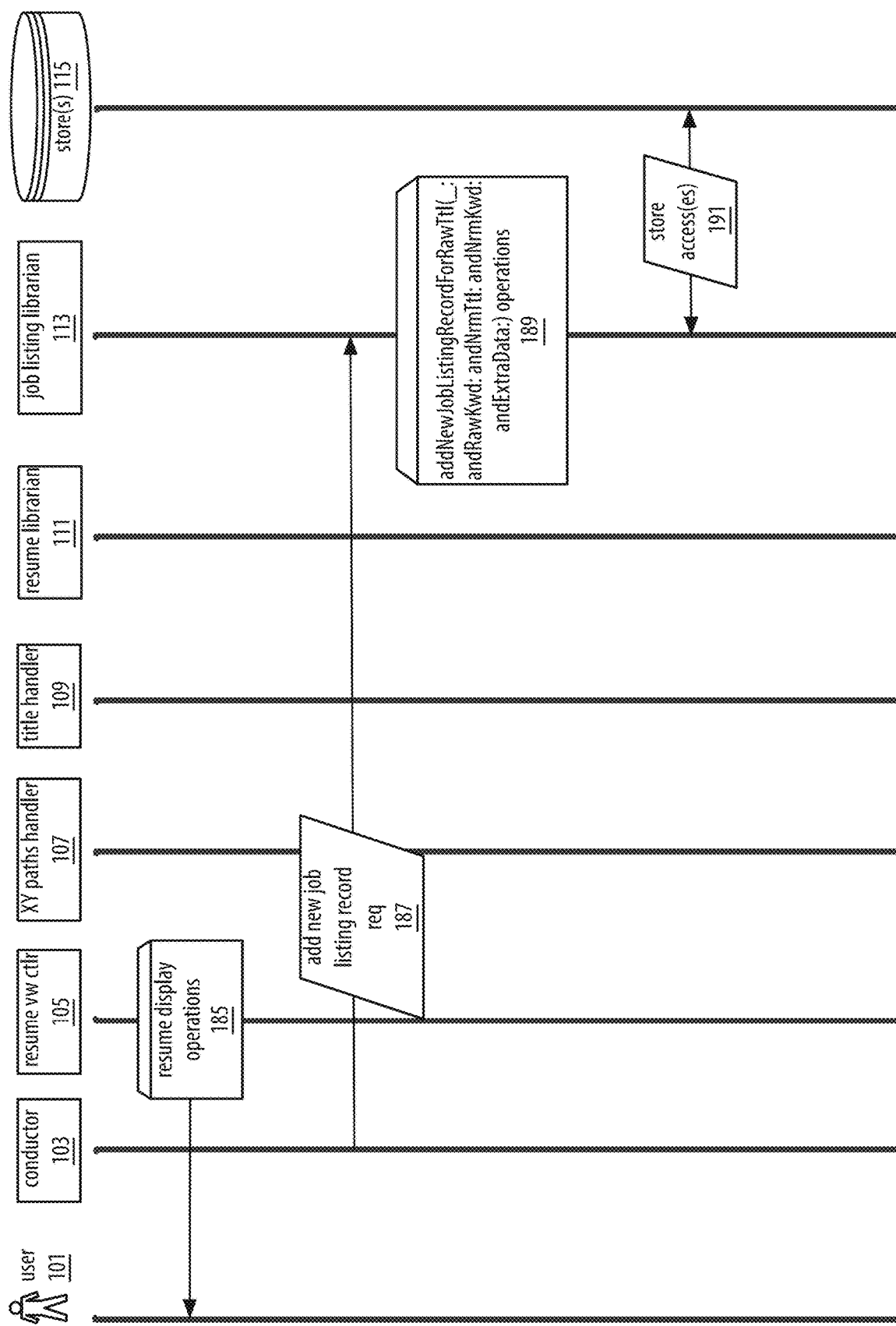
Fig. 1F — introduce job listing / receive relevant resumes / automated job listing augment / store job listing

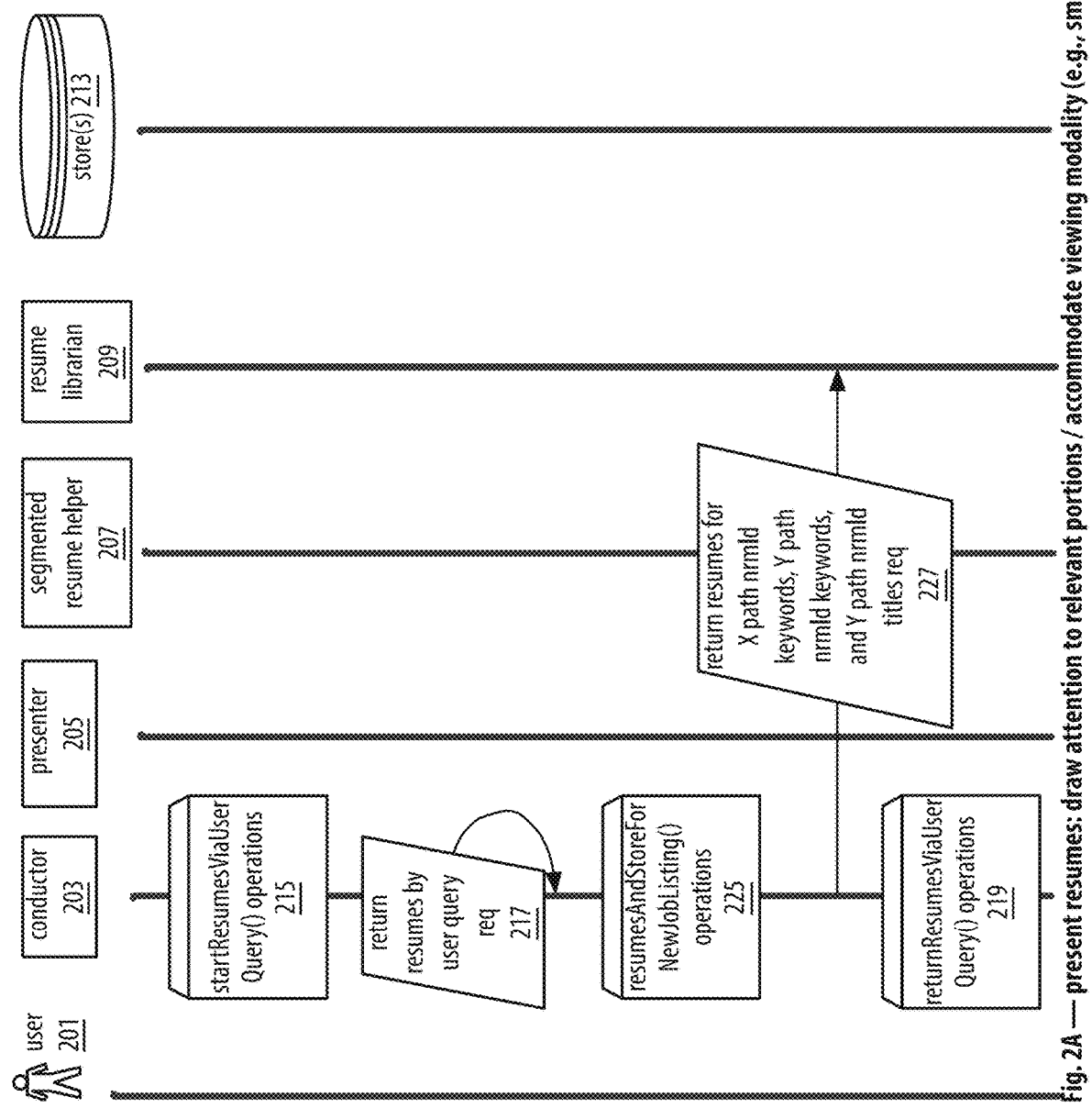
Fig. 2A — present resumes: draw attention to relevant portions / accommodate viewing modality (e.g., smartphone / pad / desktop-laptop)

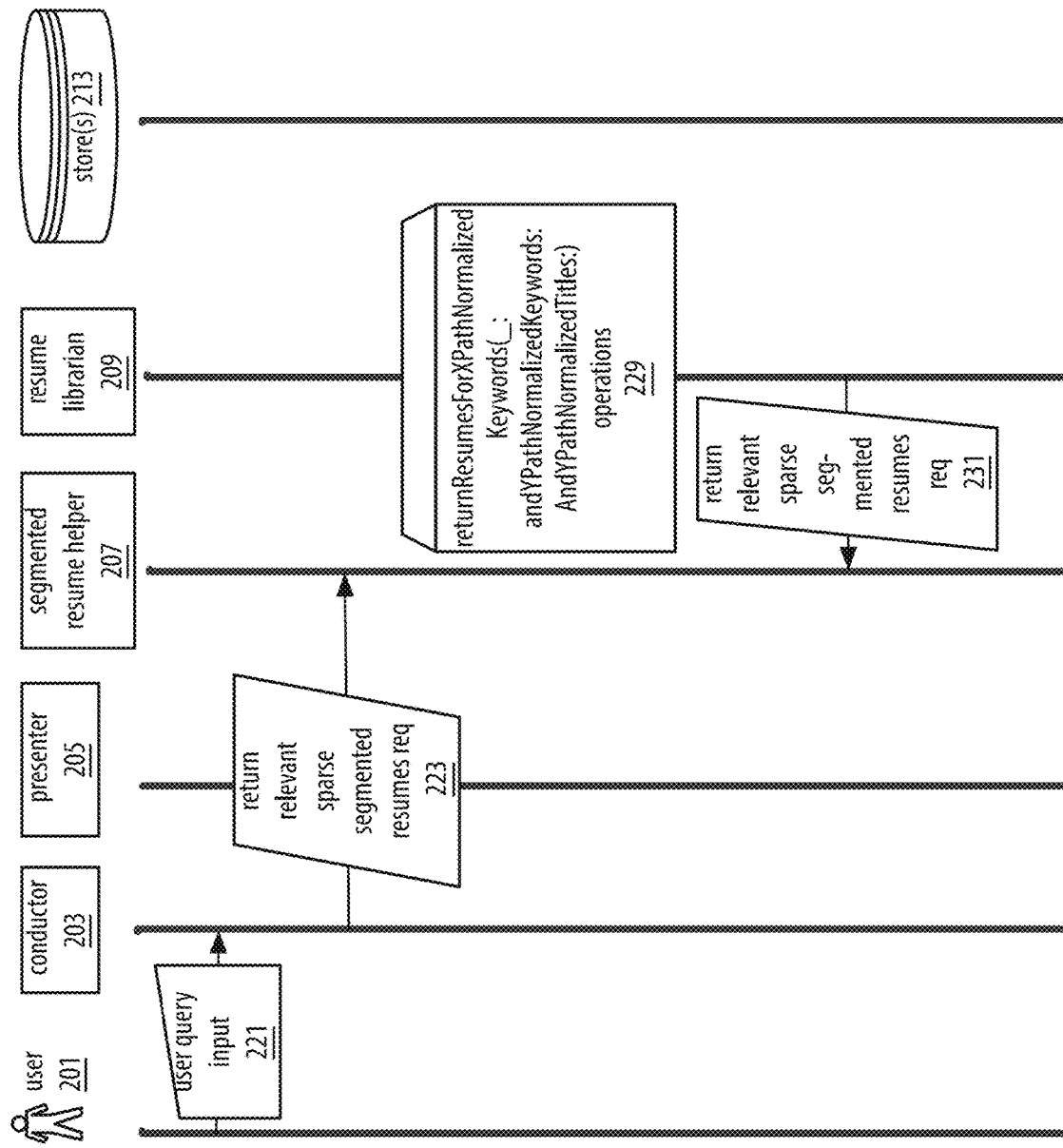
Fig. 2B — present resumes: draw attention to relevant portions / accommodate viewing modality (e.g., smartphone / pad / desktop-laptop)

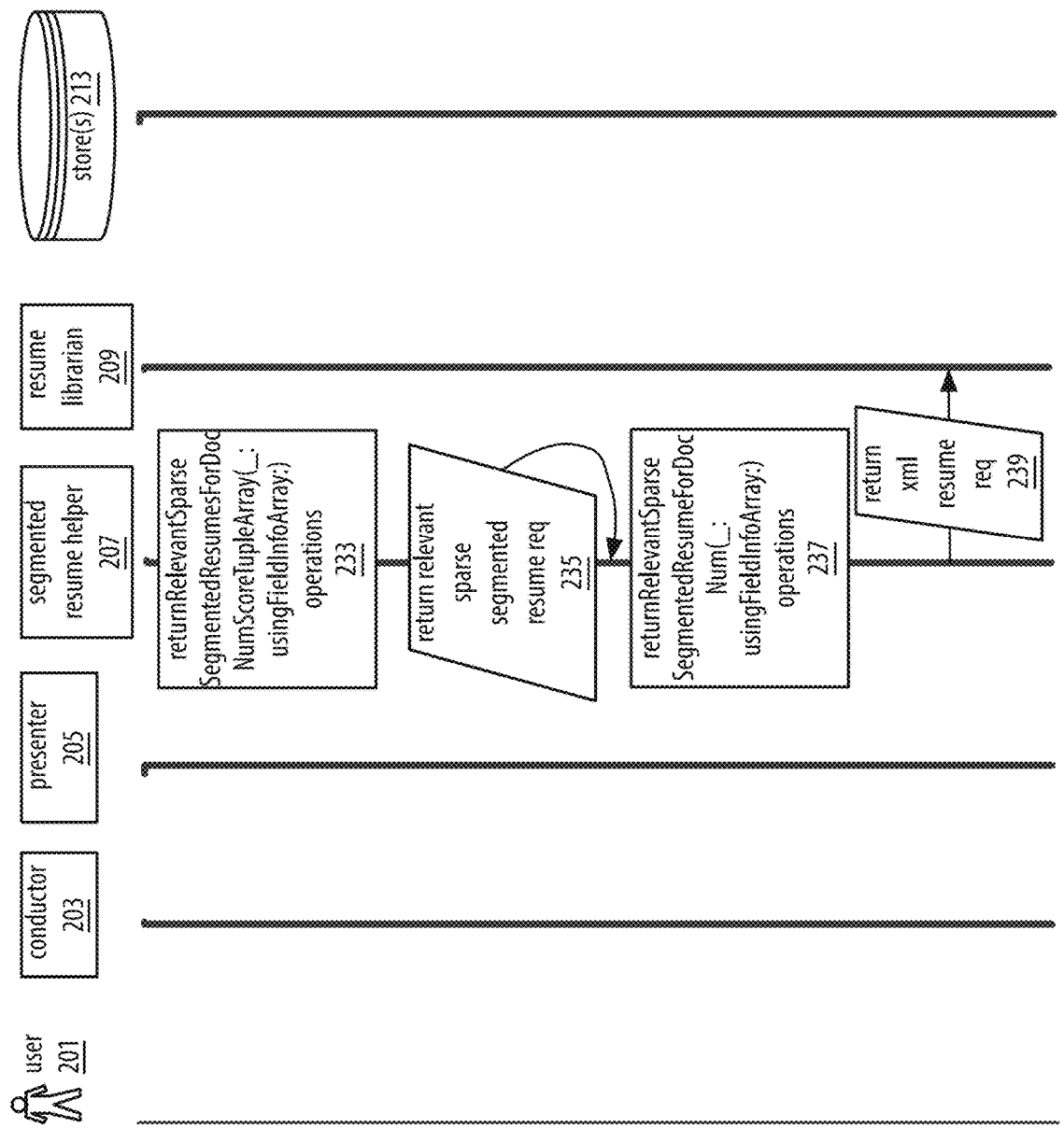
Fig. 2C — present resumes: draw attention to relevant portions / accommodate viewing modality (e.g., smartphone / pad / desktop-laptop)

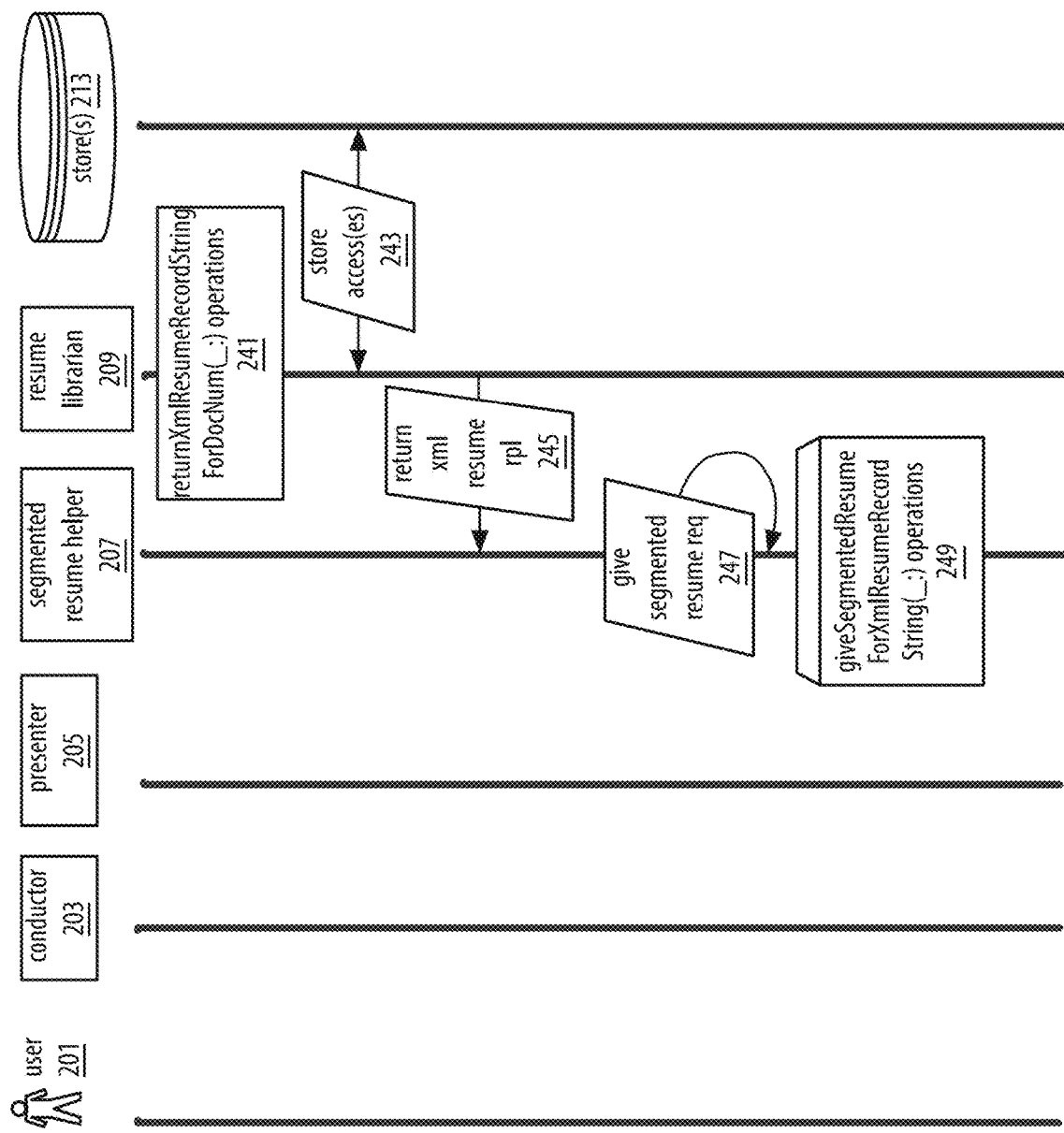
Fig. 2D — present resumes: draw attention to relevant portions / accommodate viewing modality (e.g., smartphone / pad / desktop-laptop)

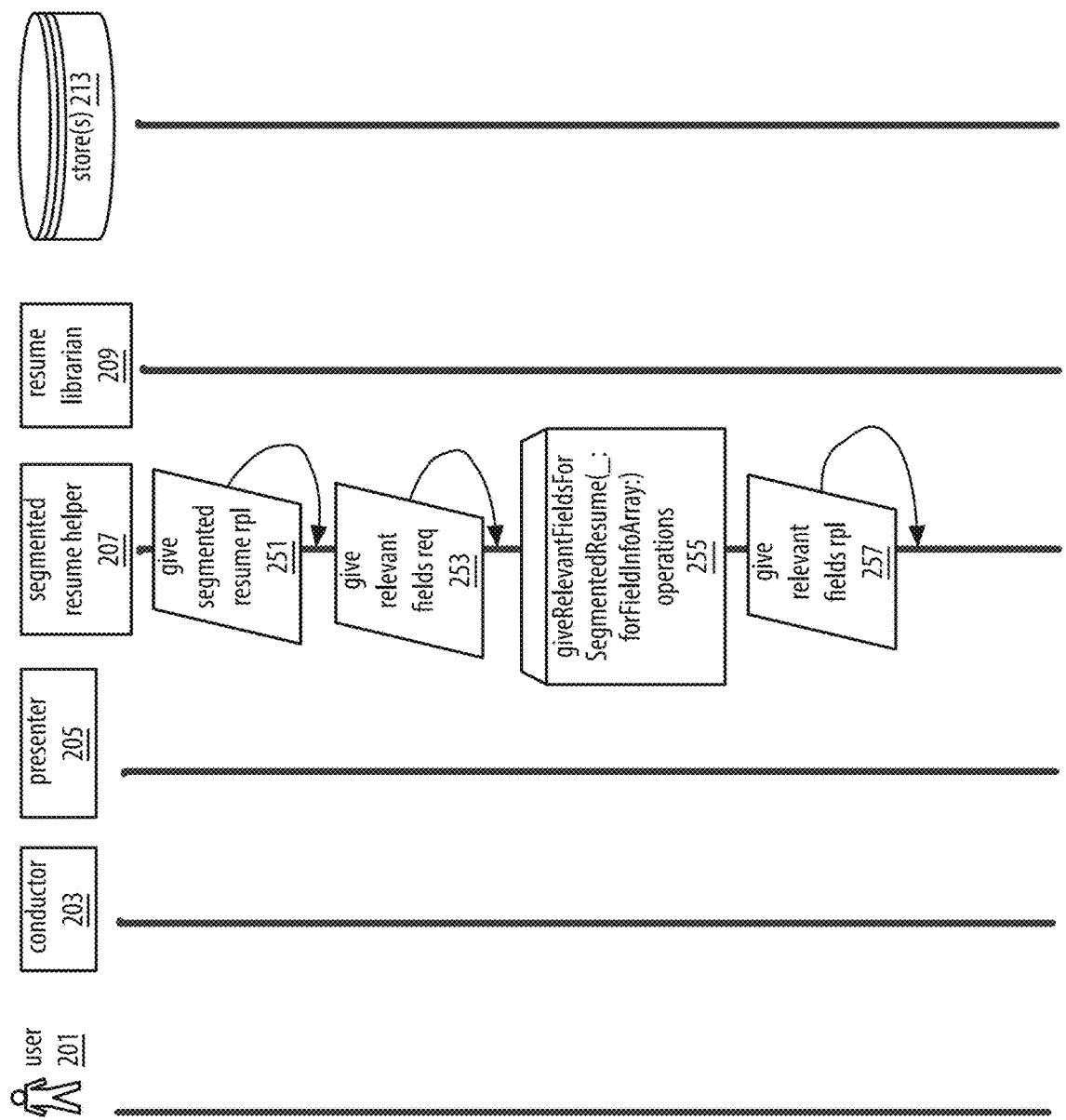
Fig. 2E — present resumes: draw attention to relevant portions / accommodate viewing modality (e.g., smartphone / pad / desktop-laptop)

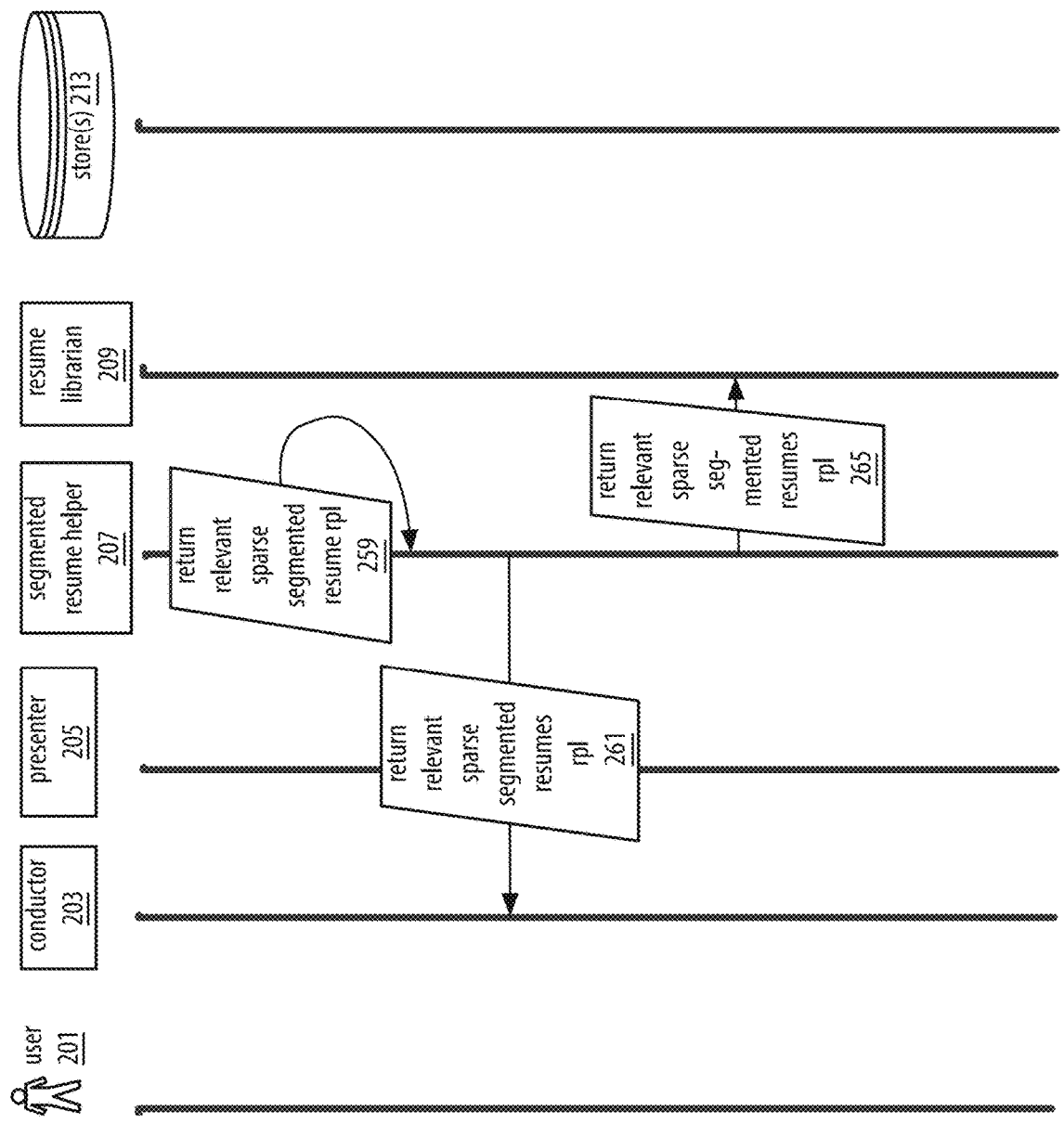
Fig. 2F — present resumes: draw attention to relevant portions / accommodate viewing modality (e.g., smartphone / pad / desktop-laptop)

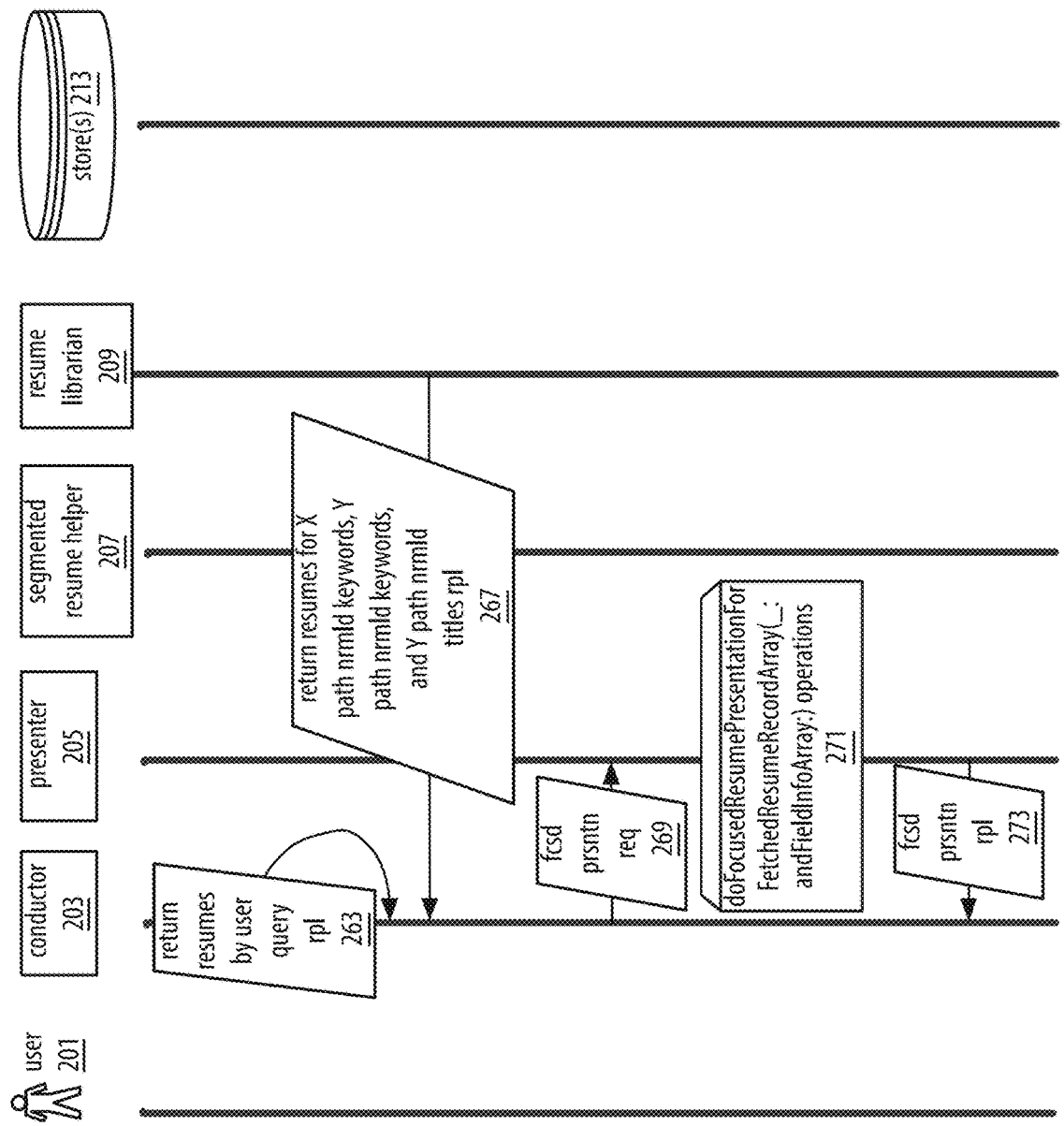
Fig. 2G — present resumes: draw attention to relevant portions / accommodate viewing modality (e.g., smartphone / pad / desktop-laptop)

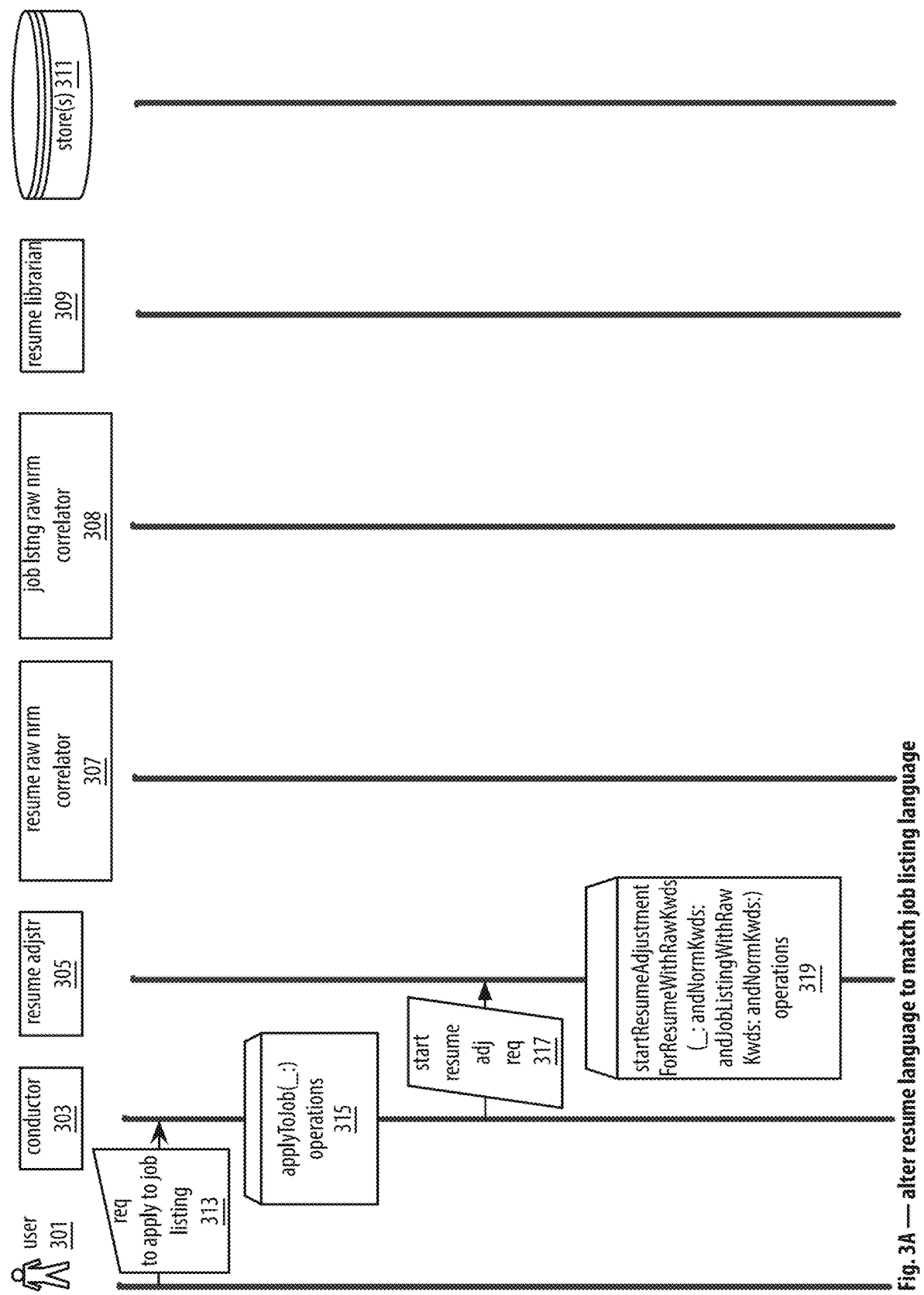
Fig. 3A — alter resume language to match job listing language

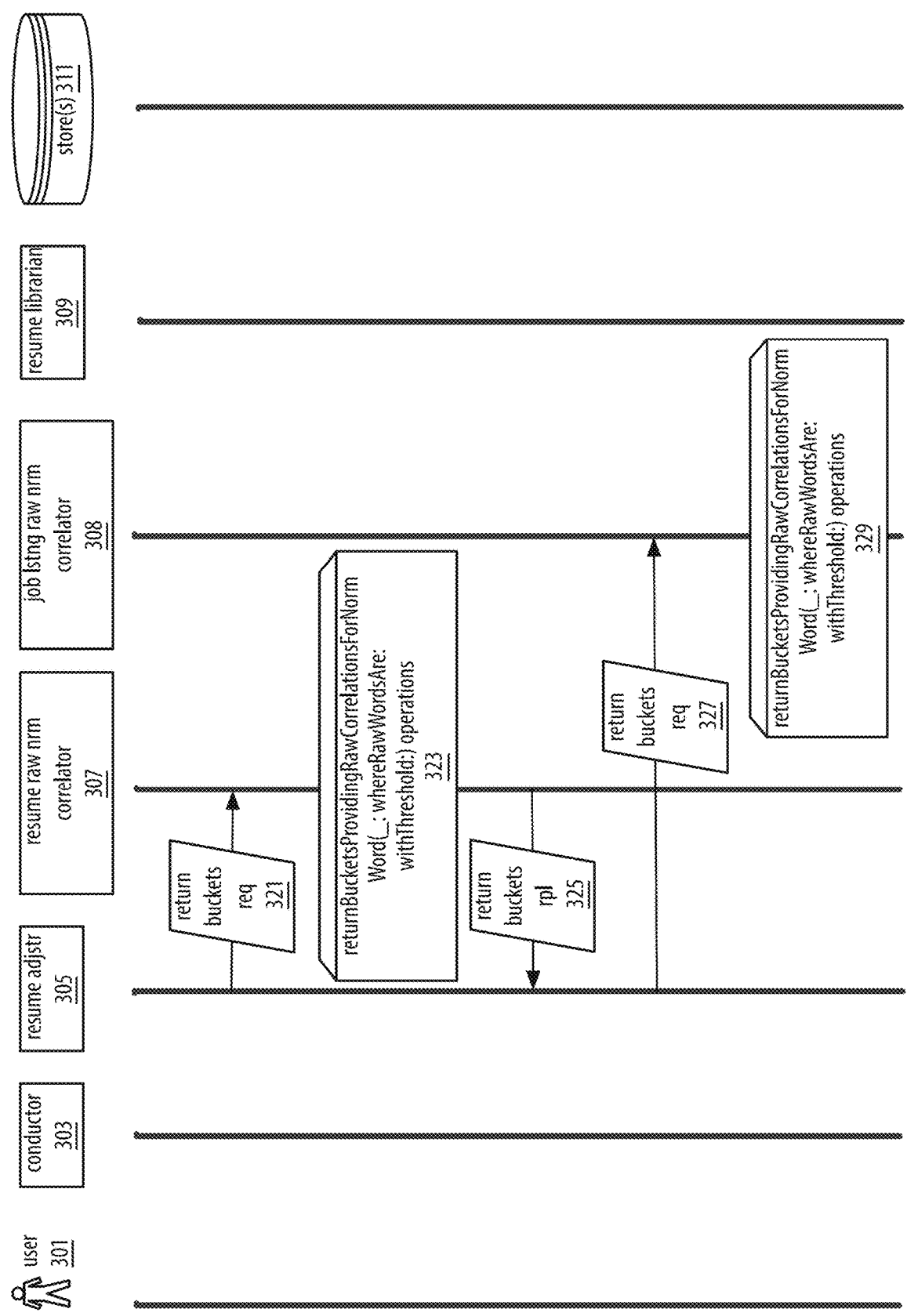
Fig. 3B — alter resume language to match job listing language

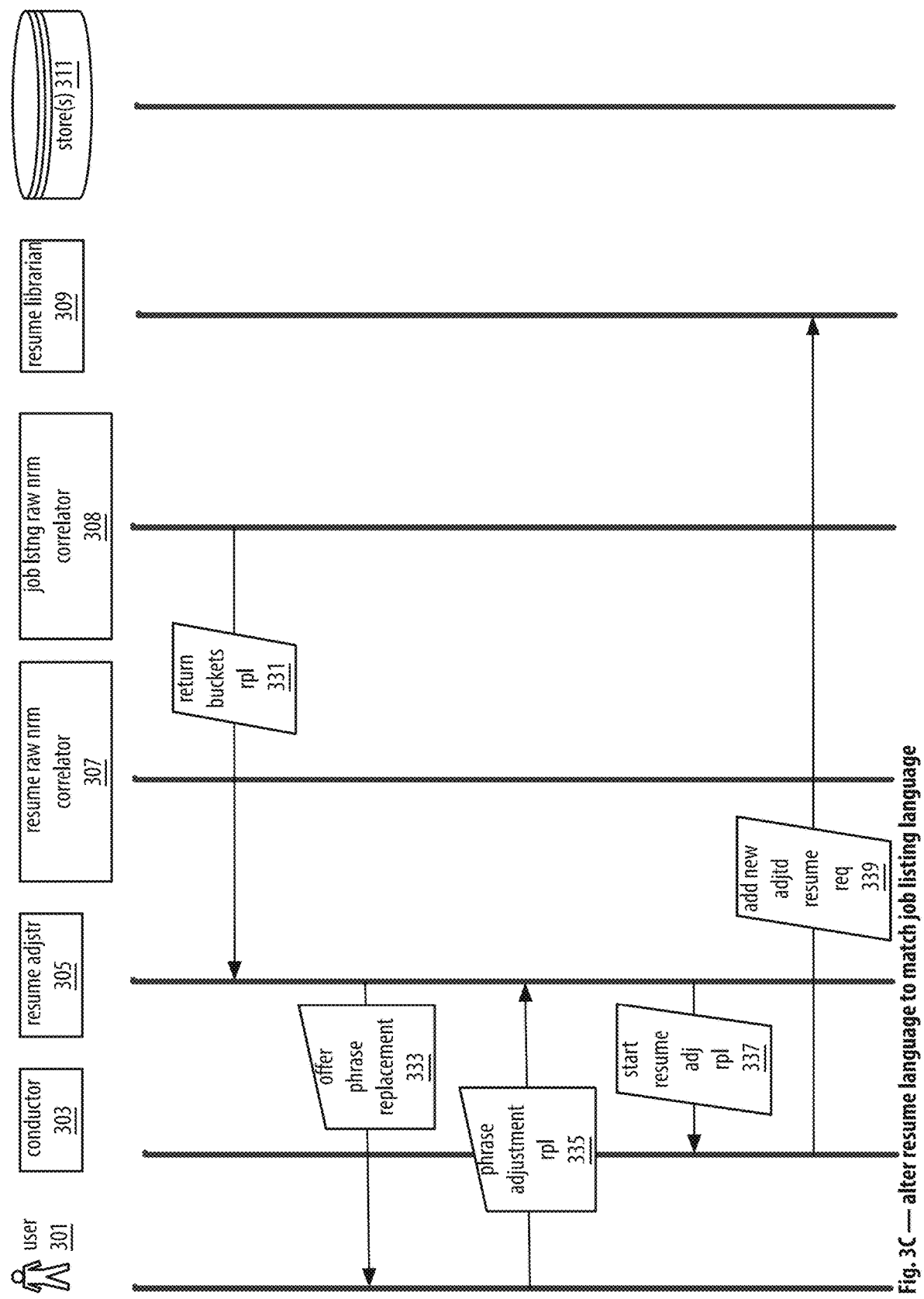
Fig. 3C — alter resume language to match job listing language

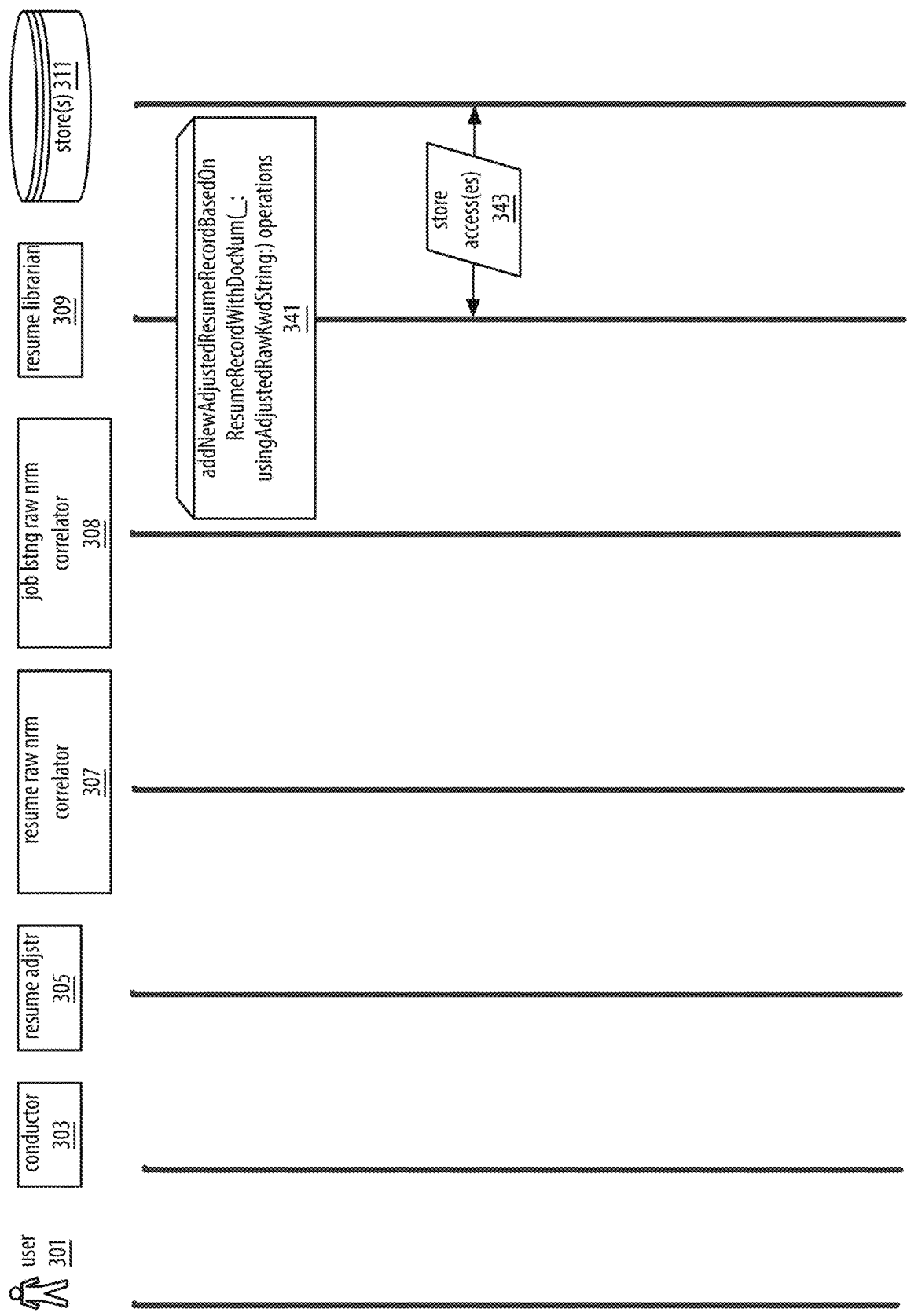
Fig. 3D — alter resume language to match job listing language

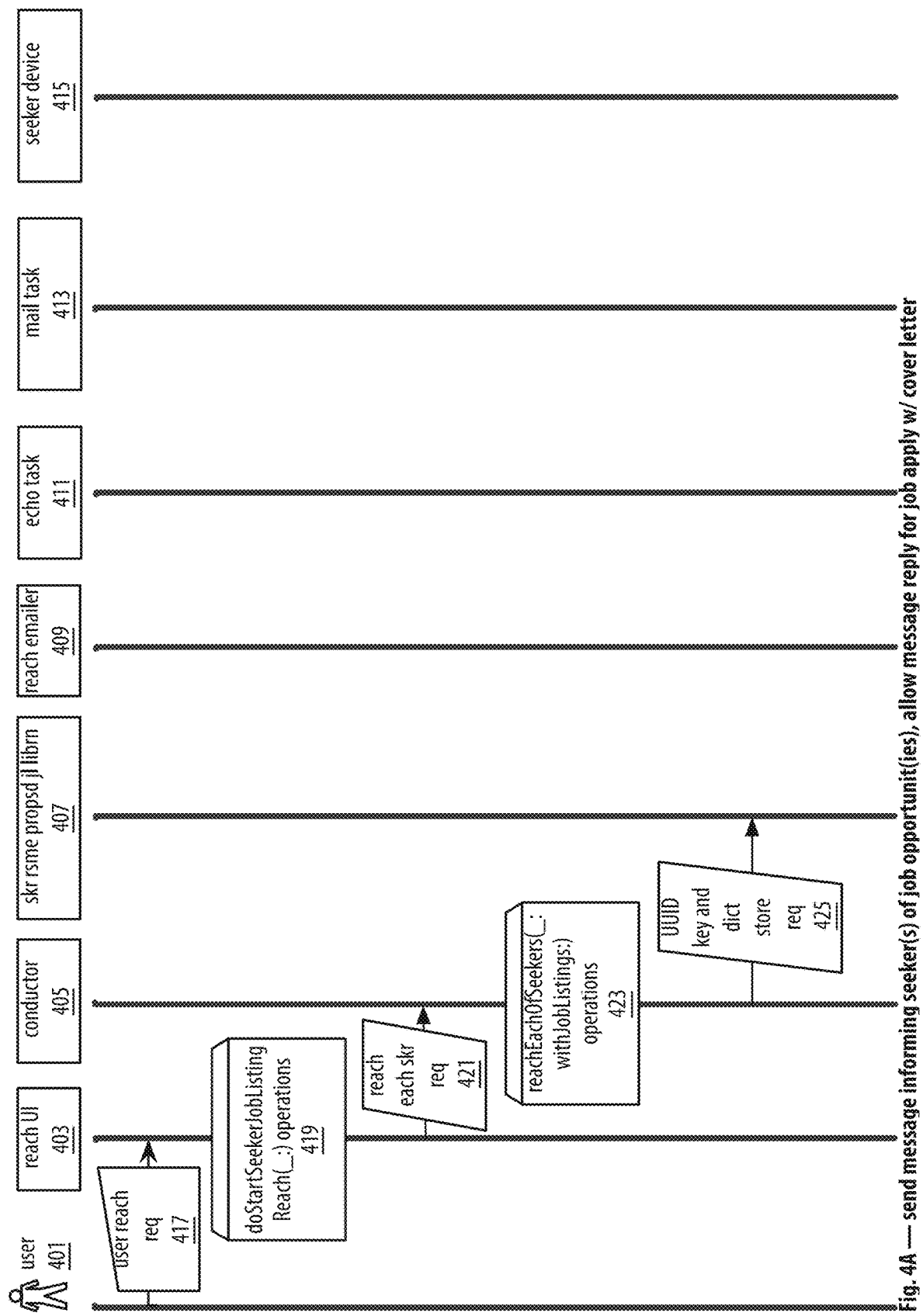
Fig. 4A — send message informing seeker(s) of job opportunit(ies), allow message reply for job apply w/ cover letter

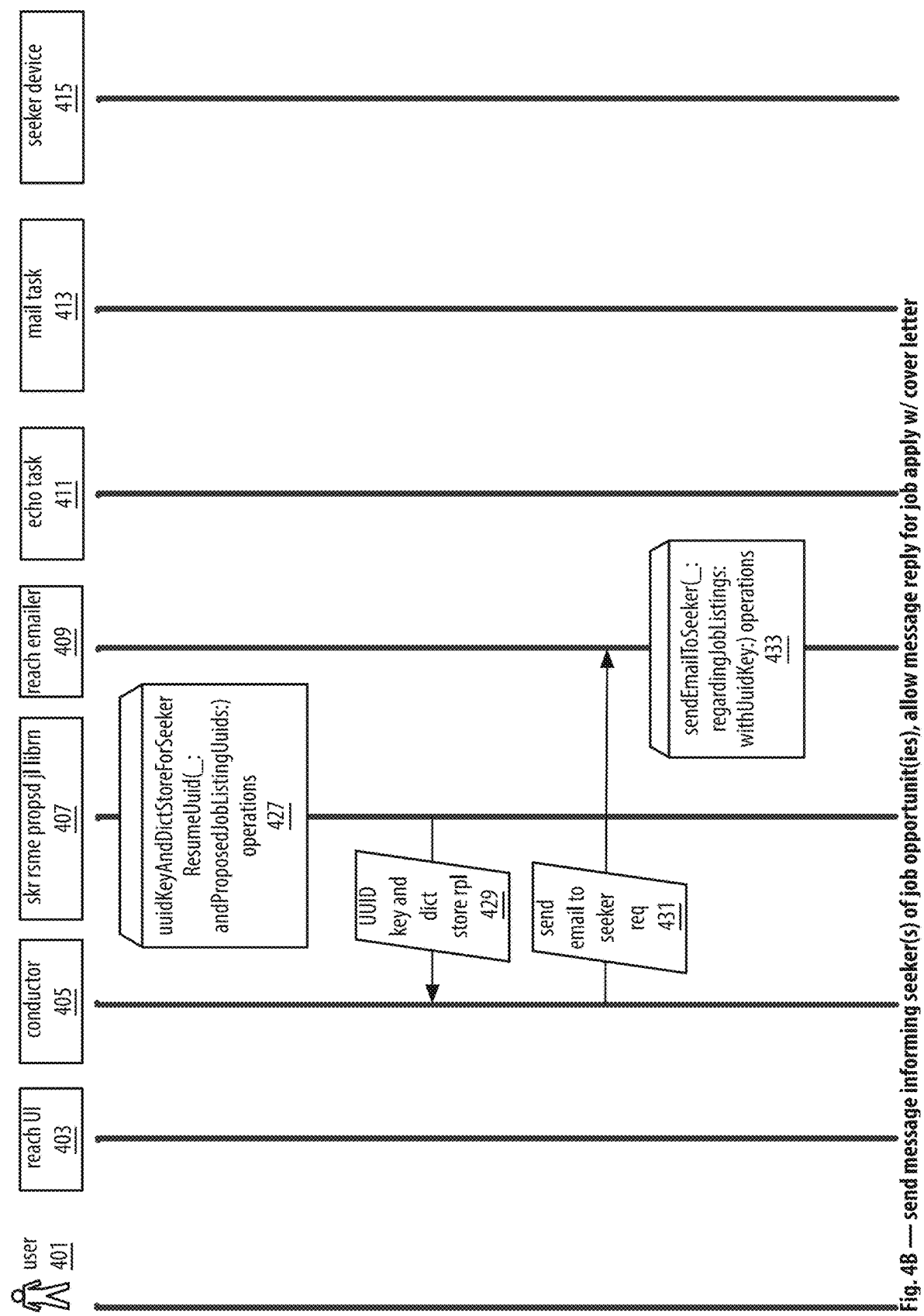
Fig. 4B — send message informing seeker(s) of job opportunit(ies), allow message reply for job apply w/ cover letter

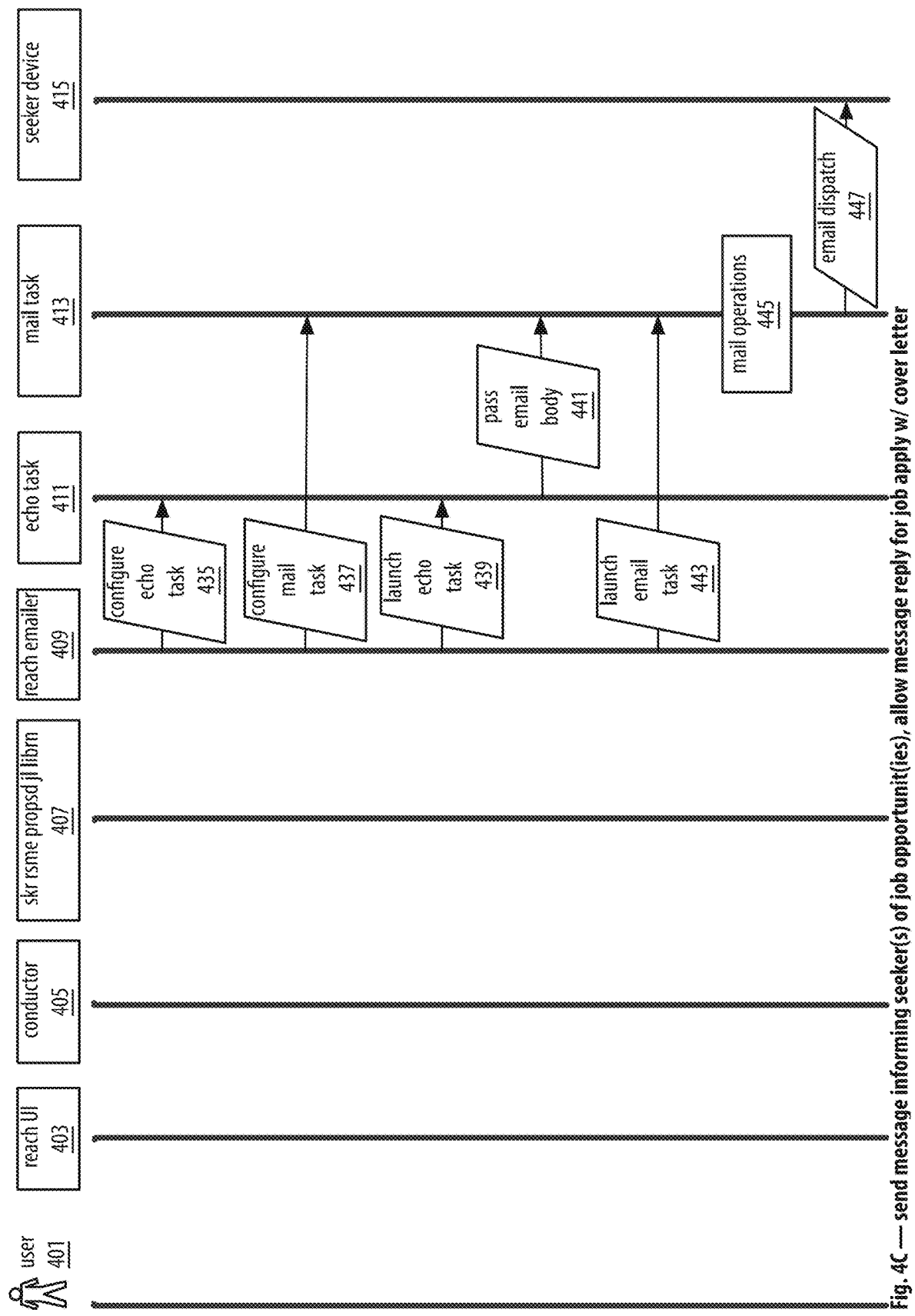
Fig. 4C — send message informing seeker(s) of job opportunit(ies), allow message reply for job apply w/ cover letter

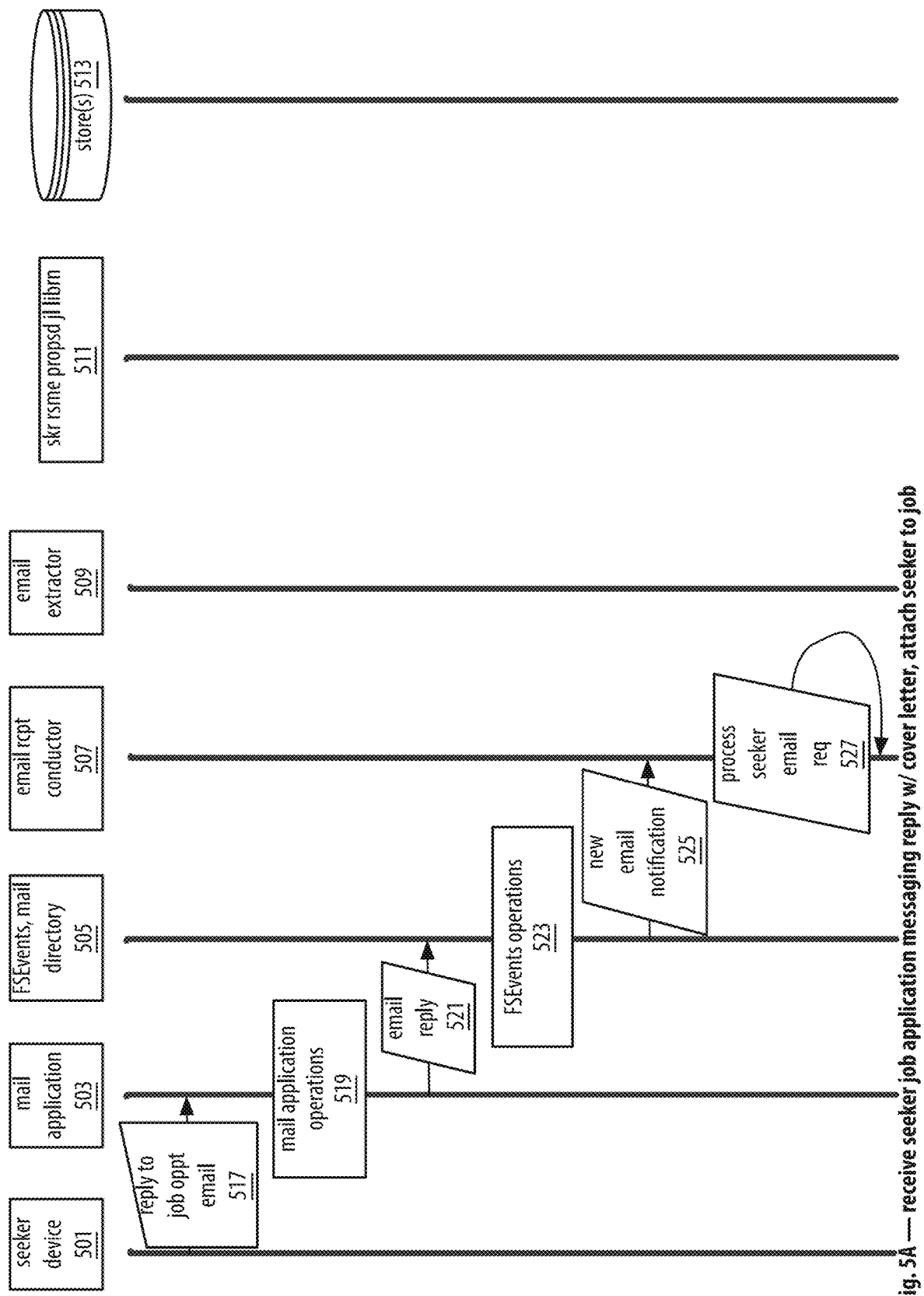
Fig. 5A — receive seeker job application messaging reply w/ cover letter, attach seeker to job

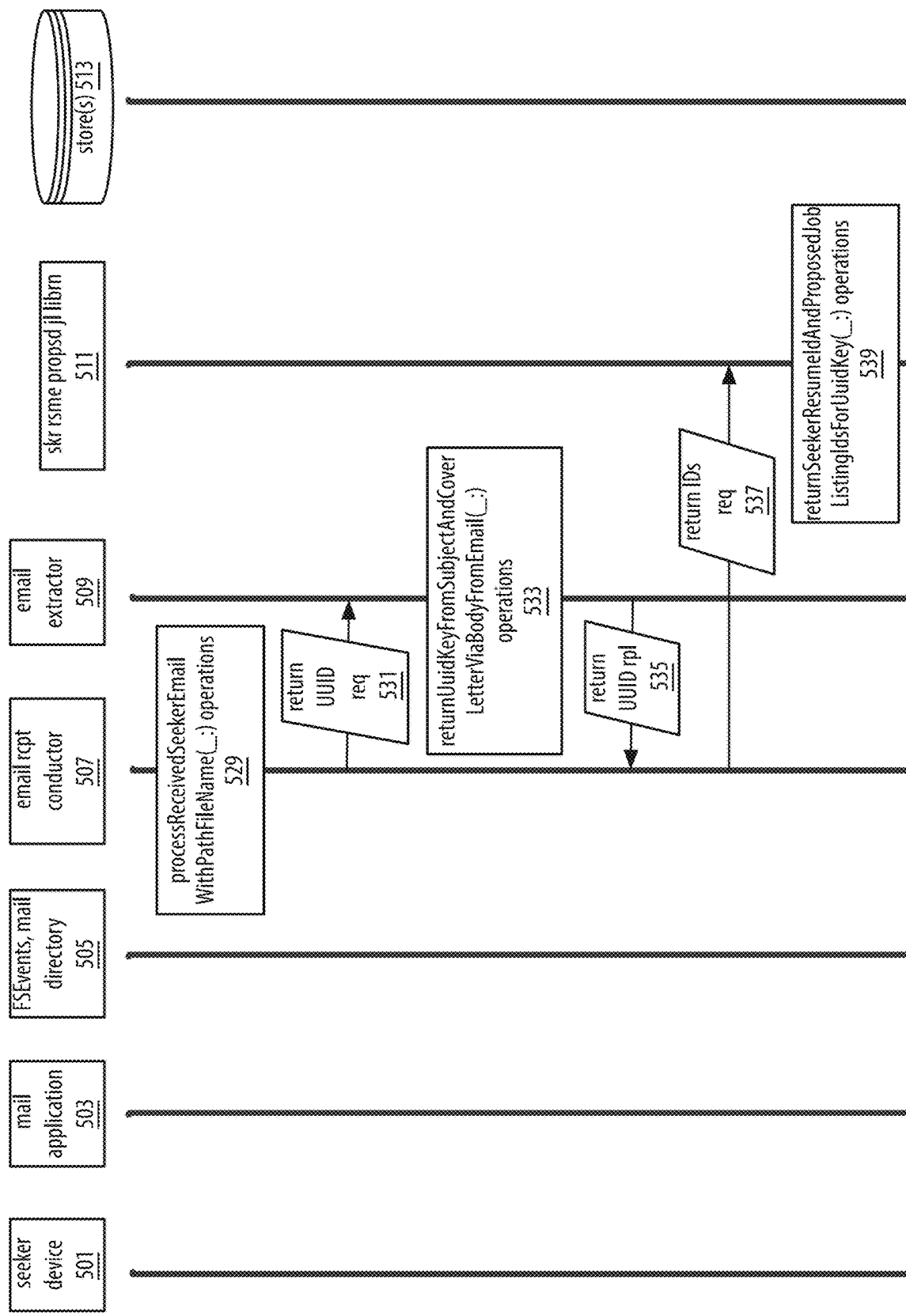
Fig. 5B — receive seeker job application messaging reply w/ cover letter, attach seeker to job

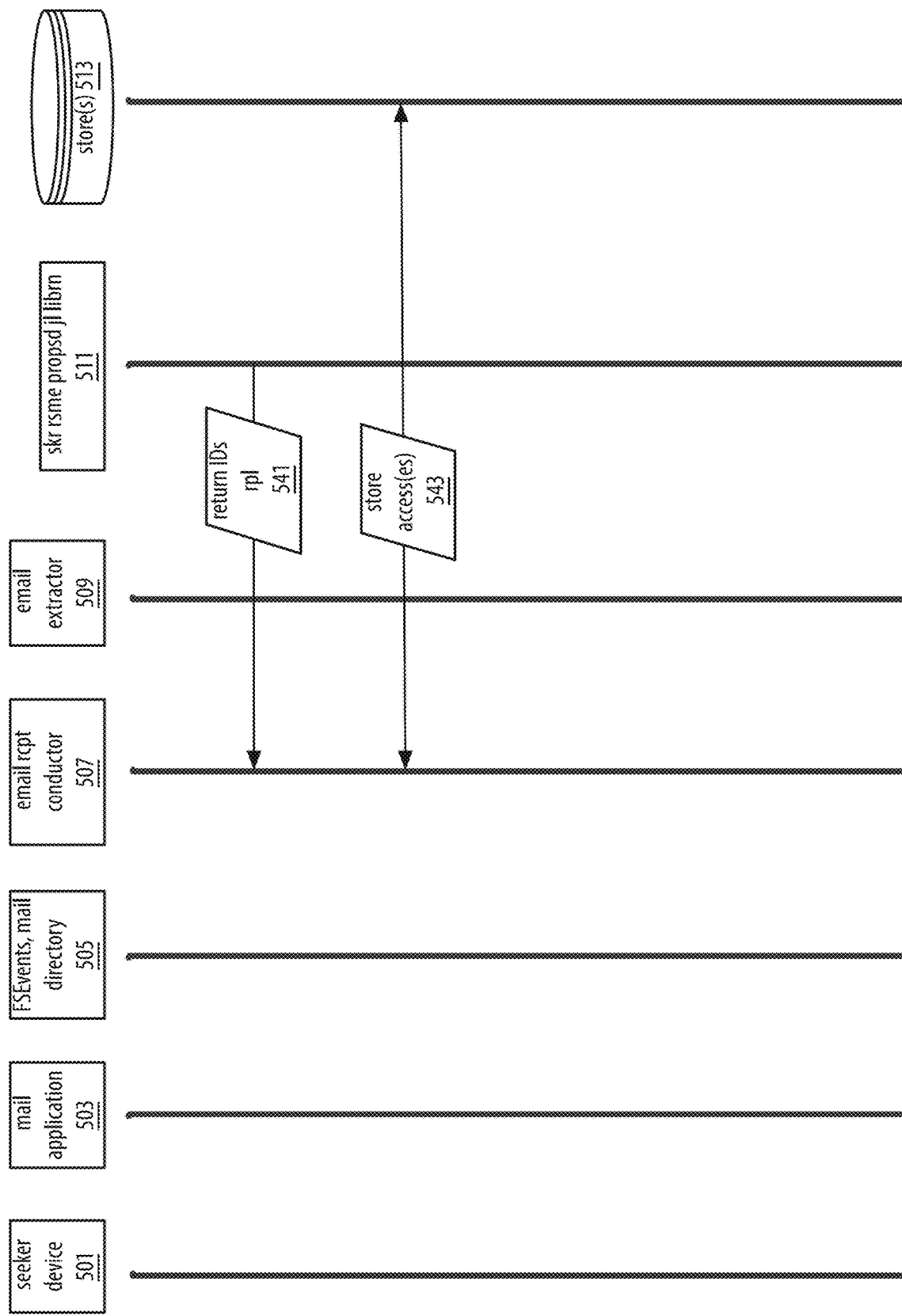
Fig. 5C — receive seeker job application messaging reply w/ cover letter, attach seeker to job

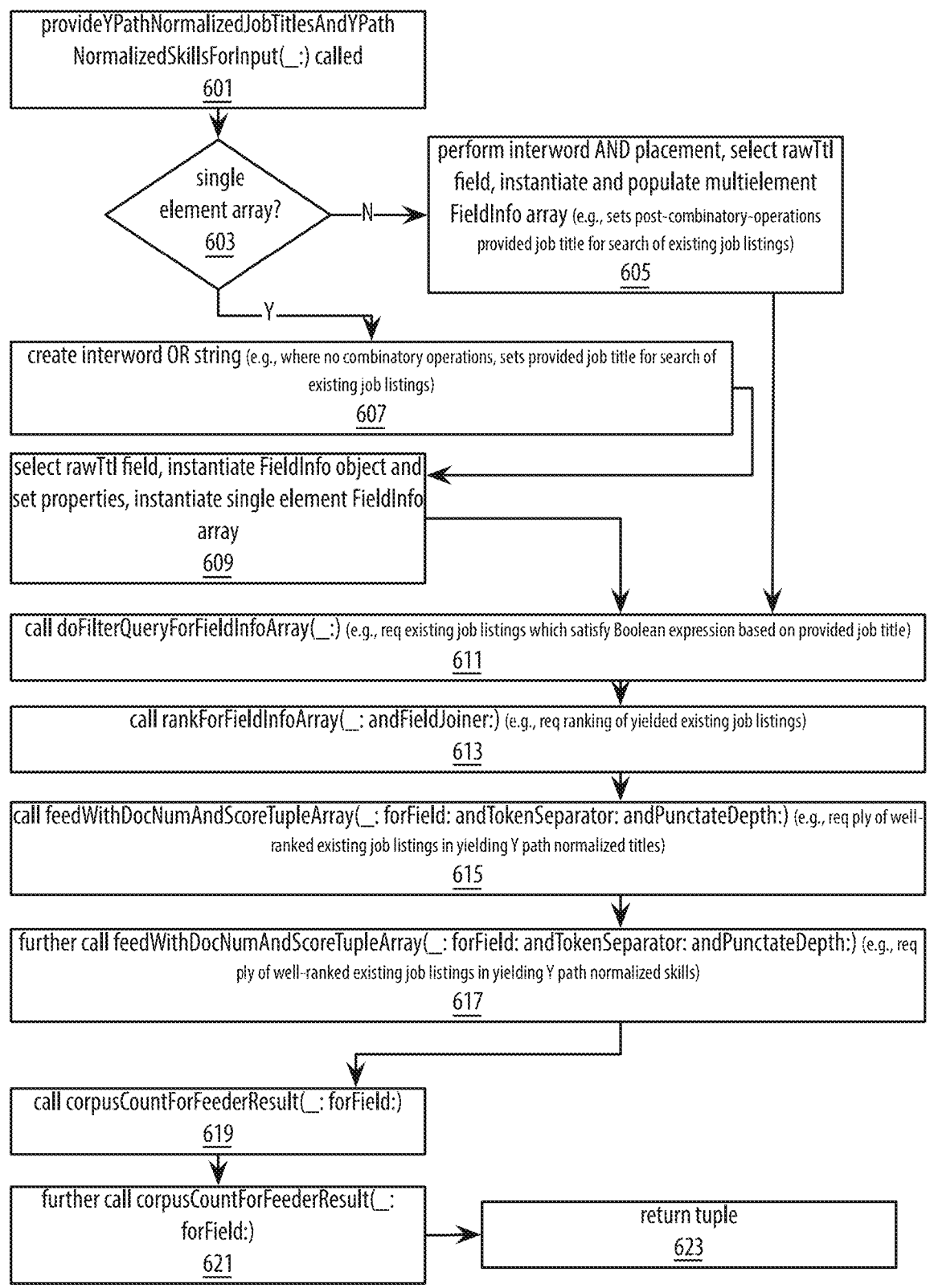
Fig. 6 — yield Y path normalized job titles and/or Y path normalized skills

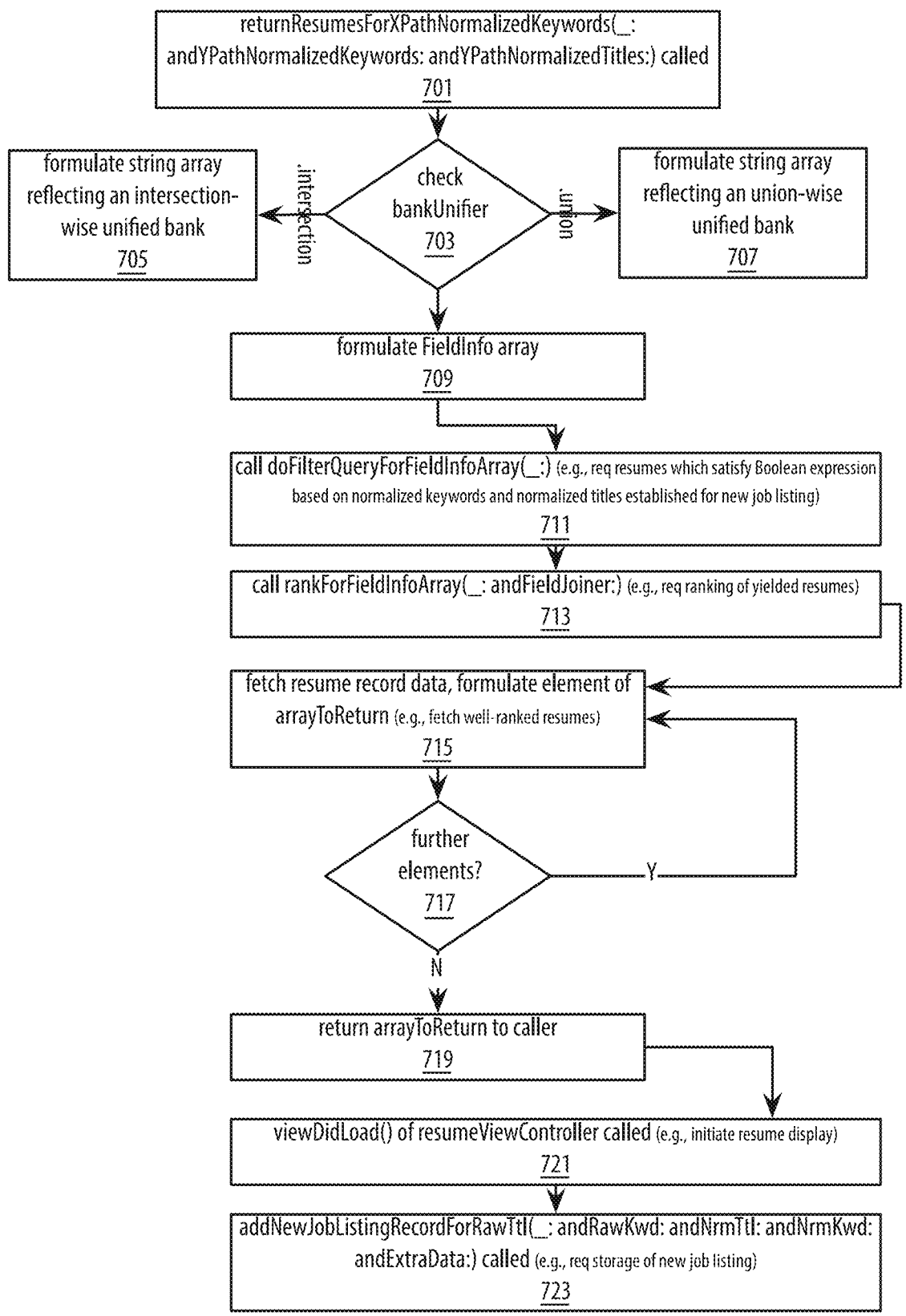
Fig. 7 — return relevant resumes / store job listing record

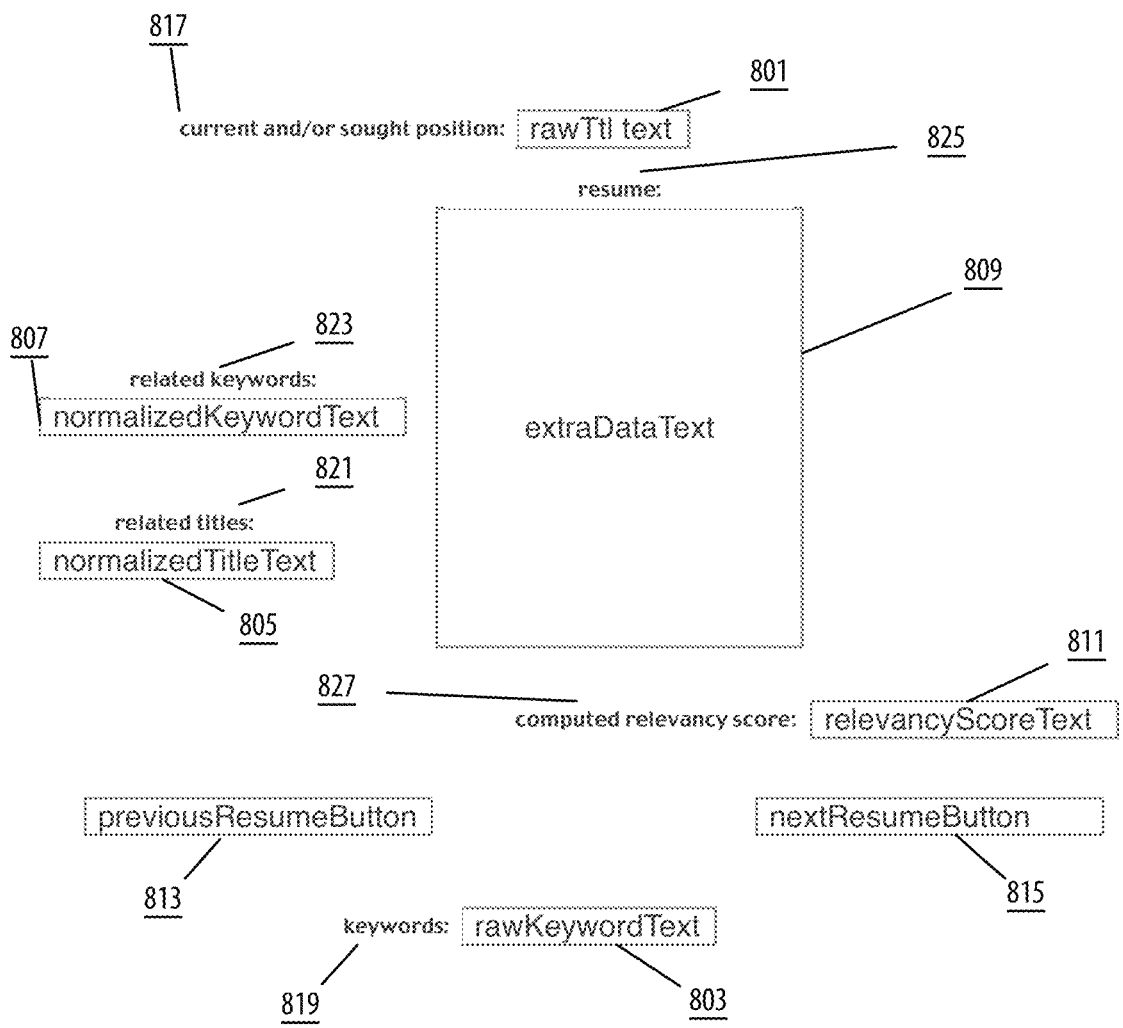
Fig. 8 — UI: present potential-good-fit resumes for new job listing

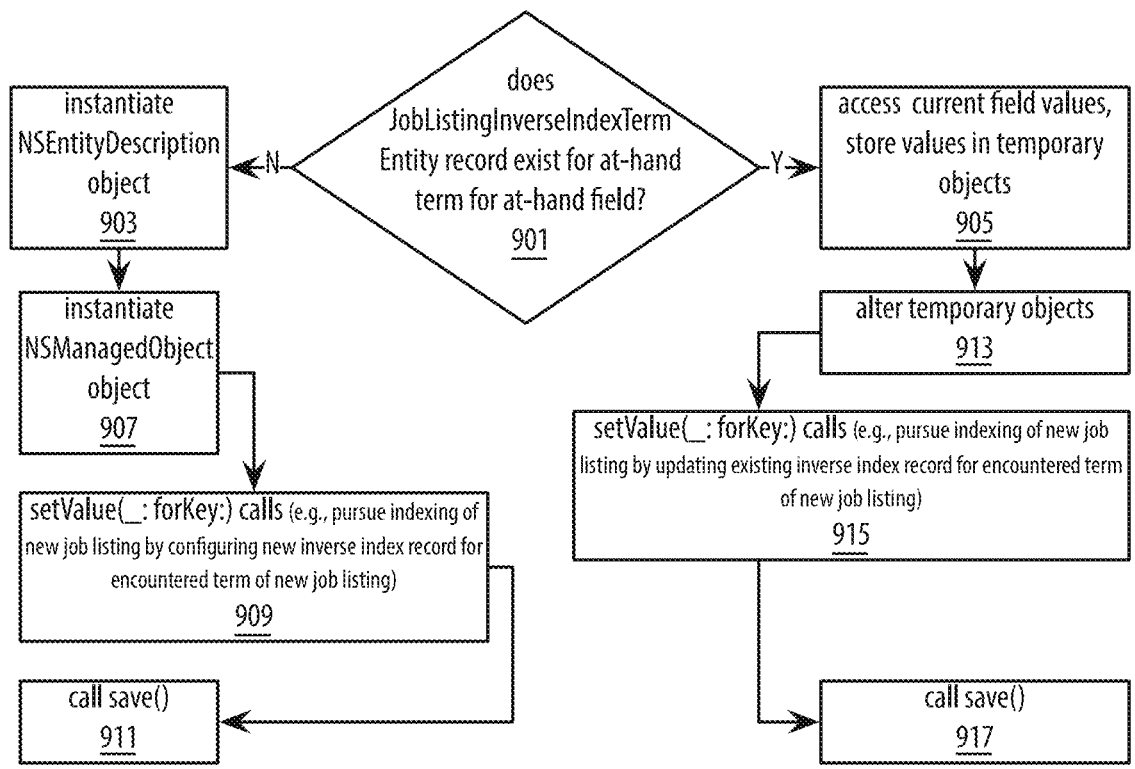
Fig. 9 — job listing indexer process

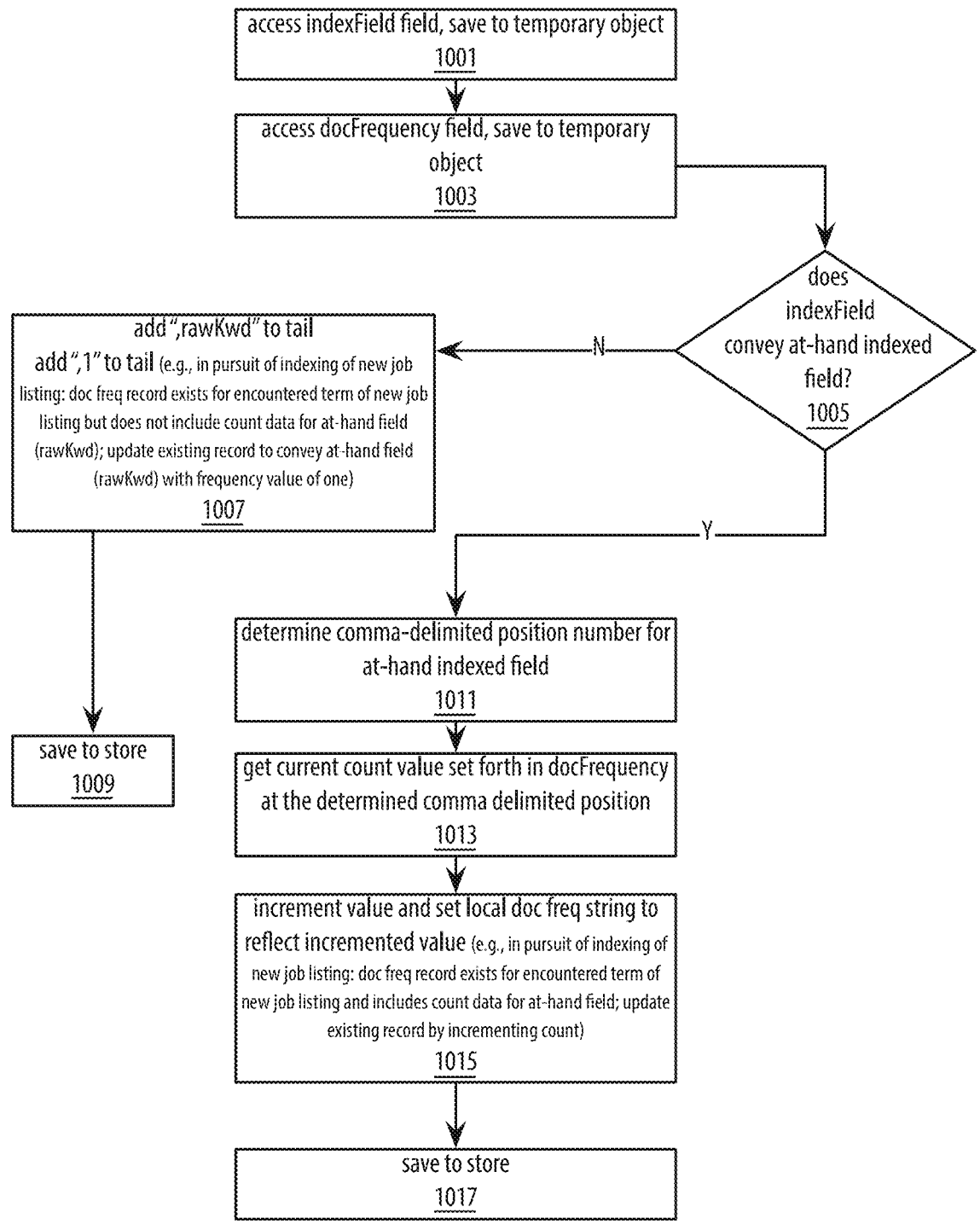
Fig. 10 — further job listing indexer process

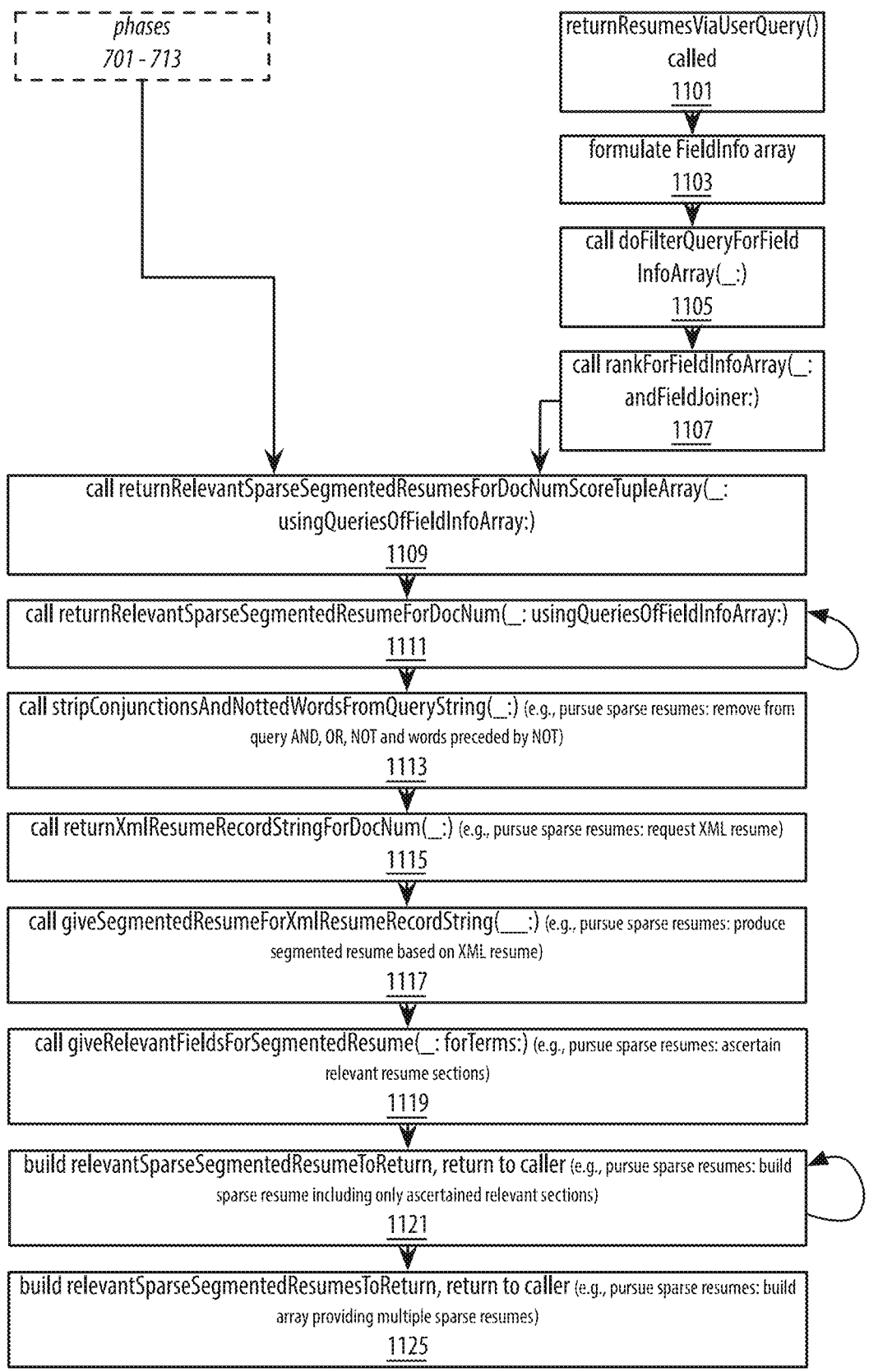
Fig. 11 — yield sparse resumes (resumes which include only relevant sections)

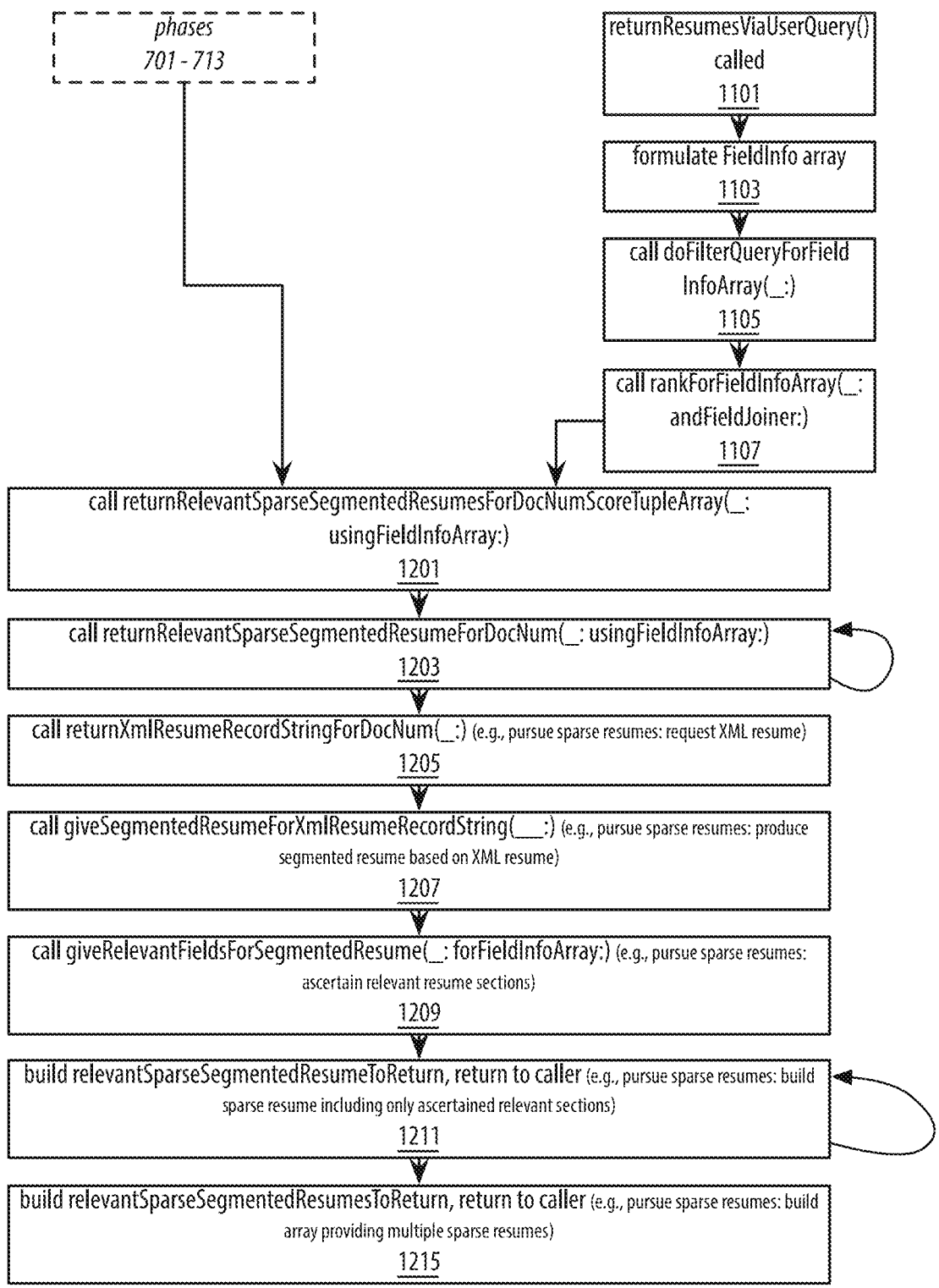
Fig. 12 — yield sparse resumes (resumes which include only relevant sections) (alternative)

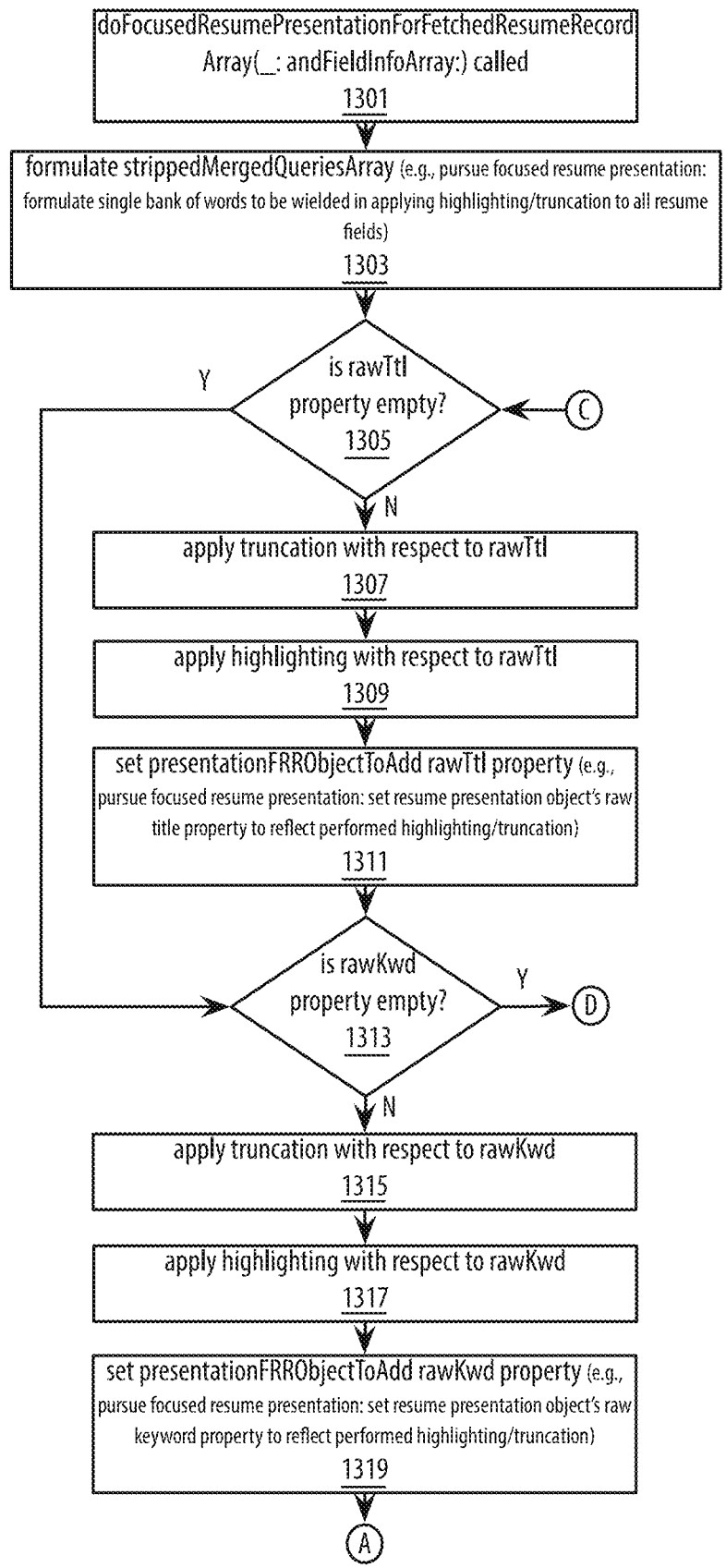
Fig. 13A — provide focused resume presentation

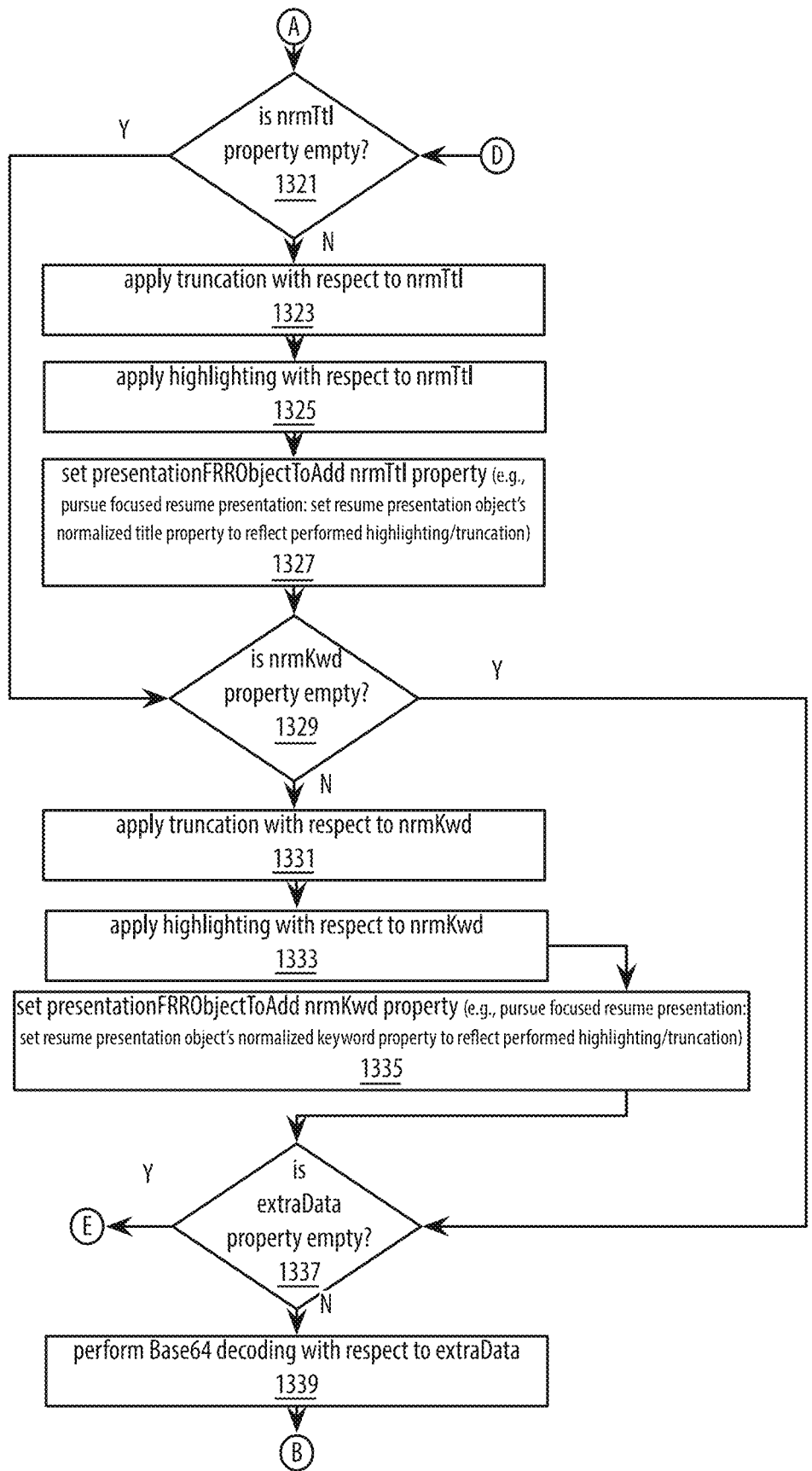
Fig. 13B — provide focused resume presentation

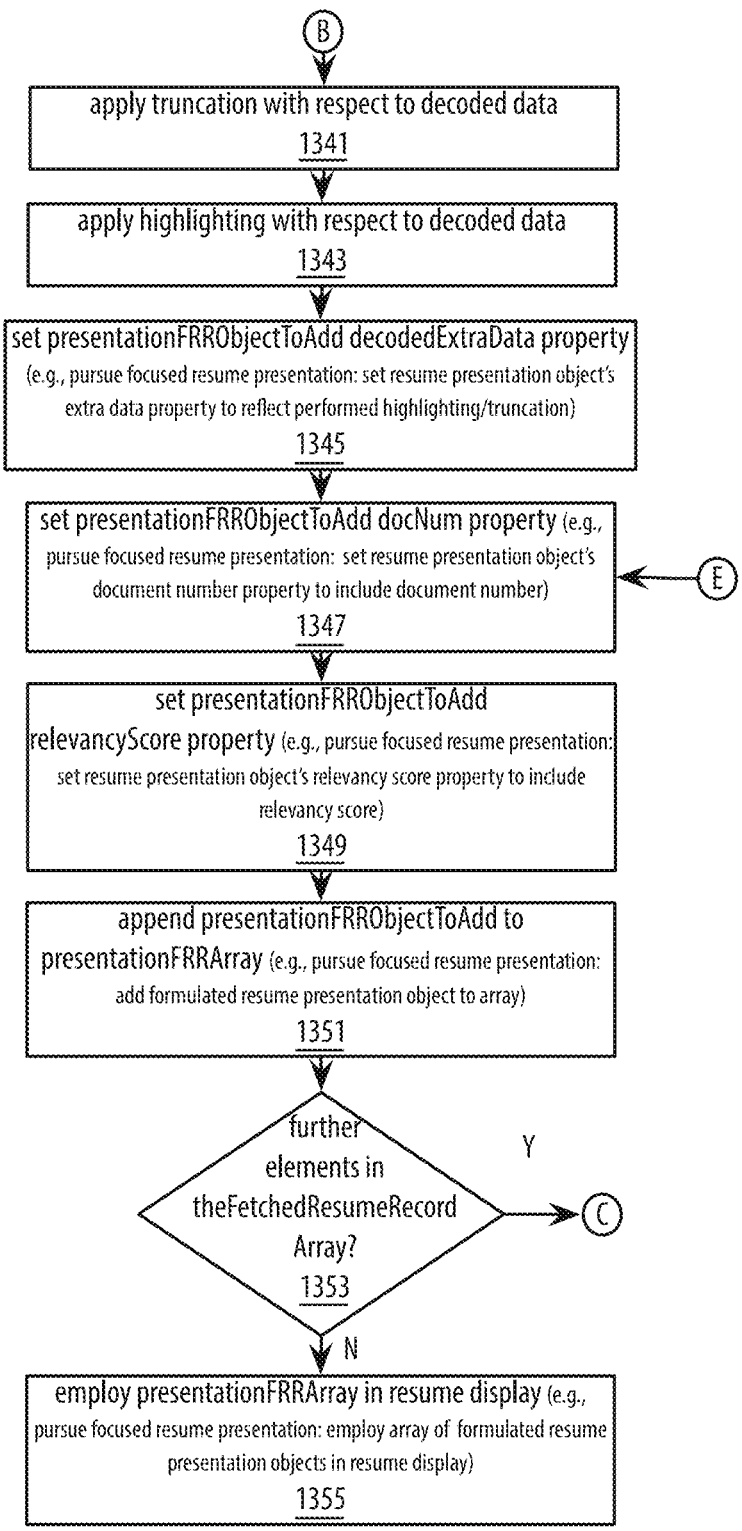
Fig. 13C — provide focused resume presentation

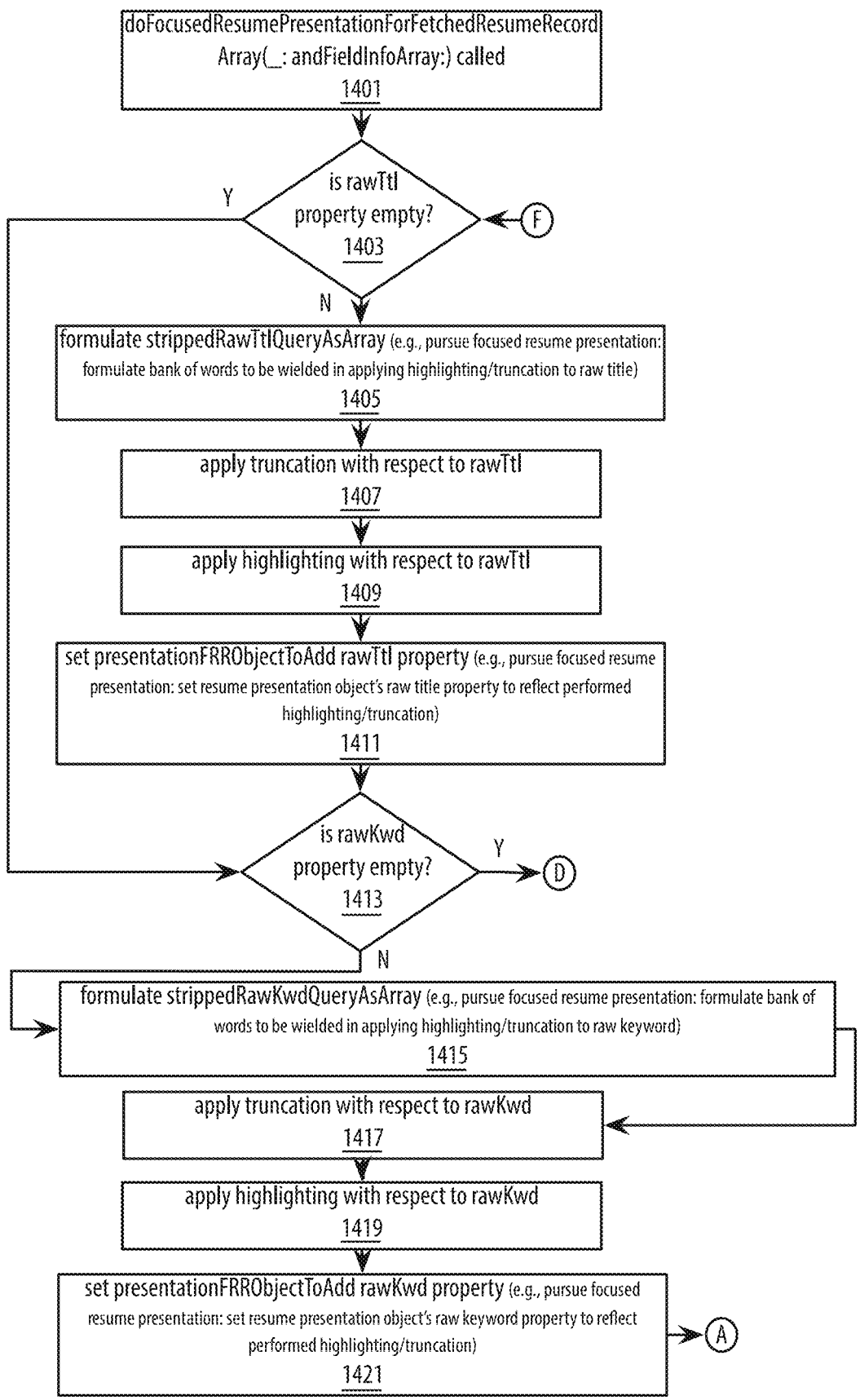
Fig. 14A — provide focused resume presentation (alternative)

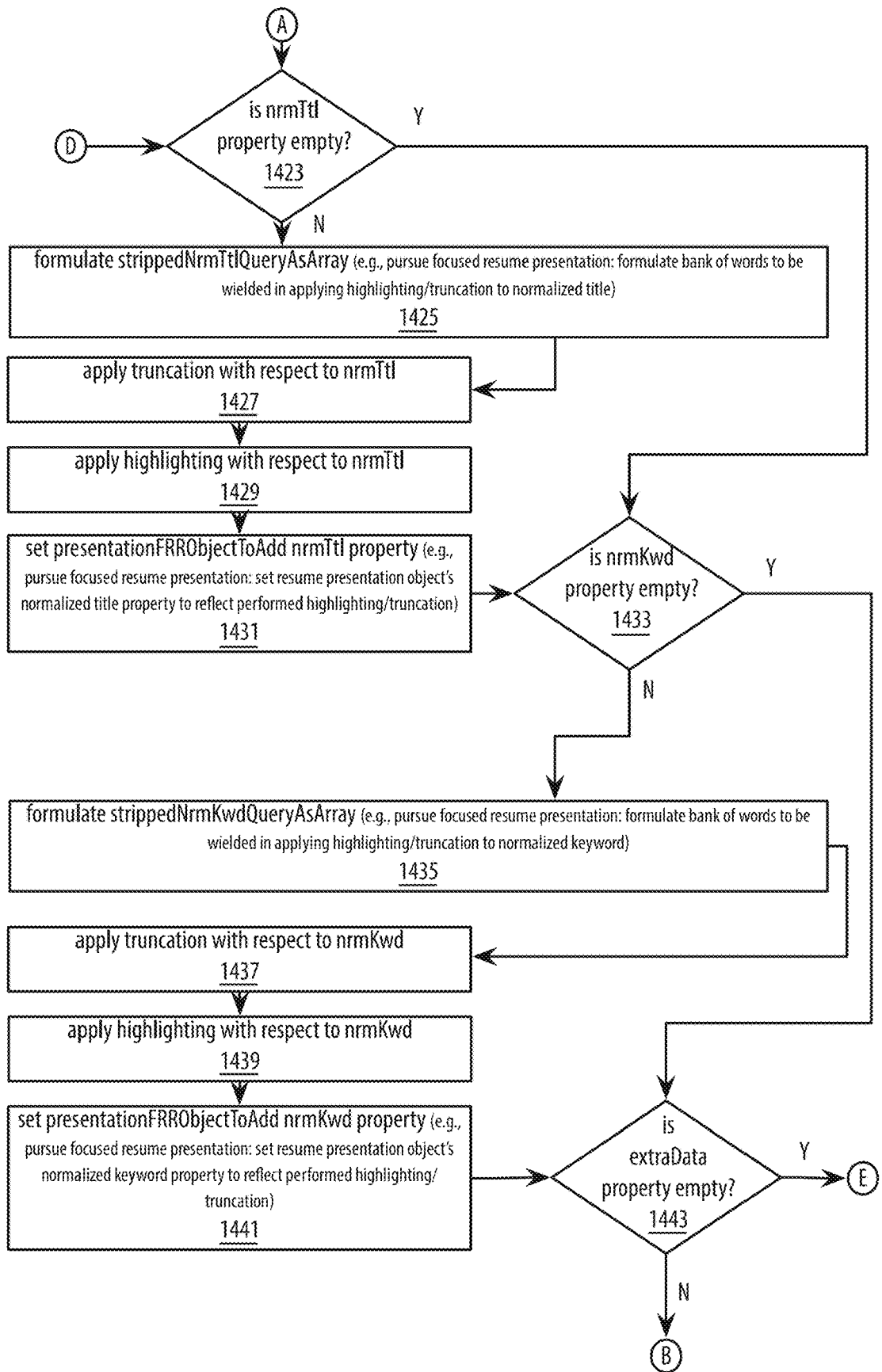
Fig. 14B— provide focused resume presentation (alternative)

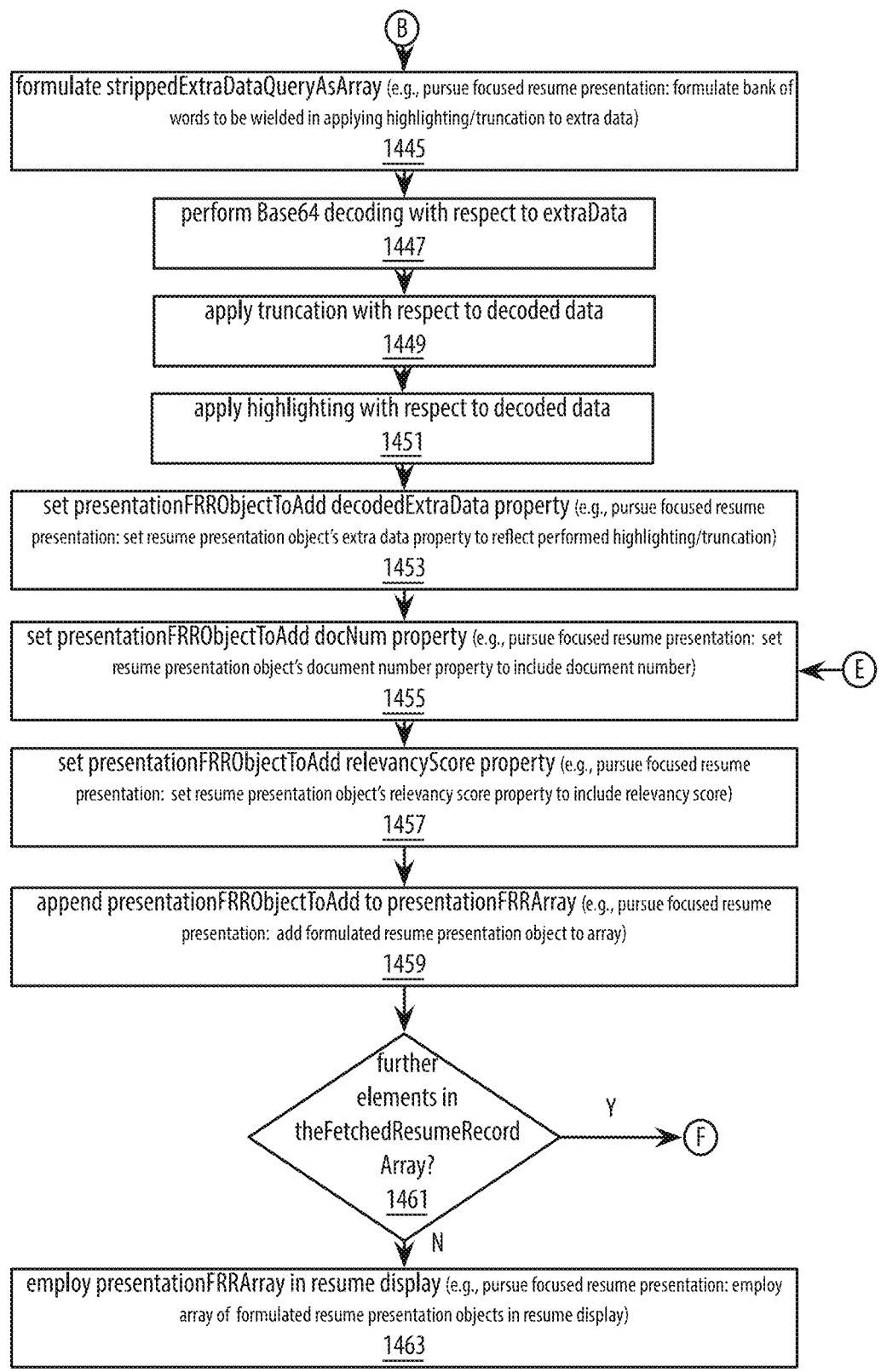
Fig. 14C — provide focused resume presentation (alternative)

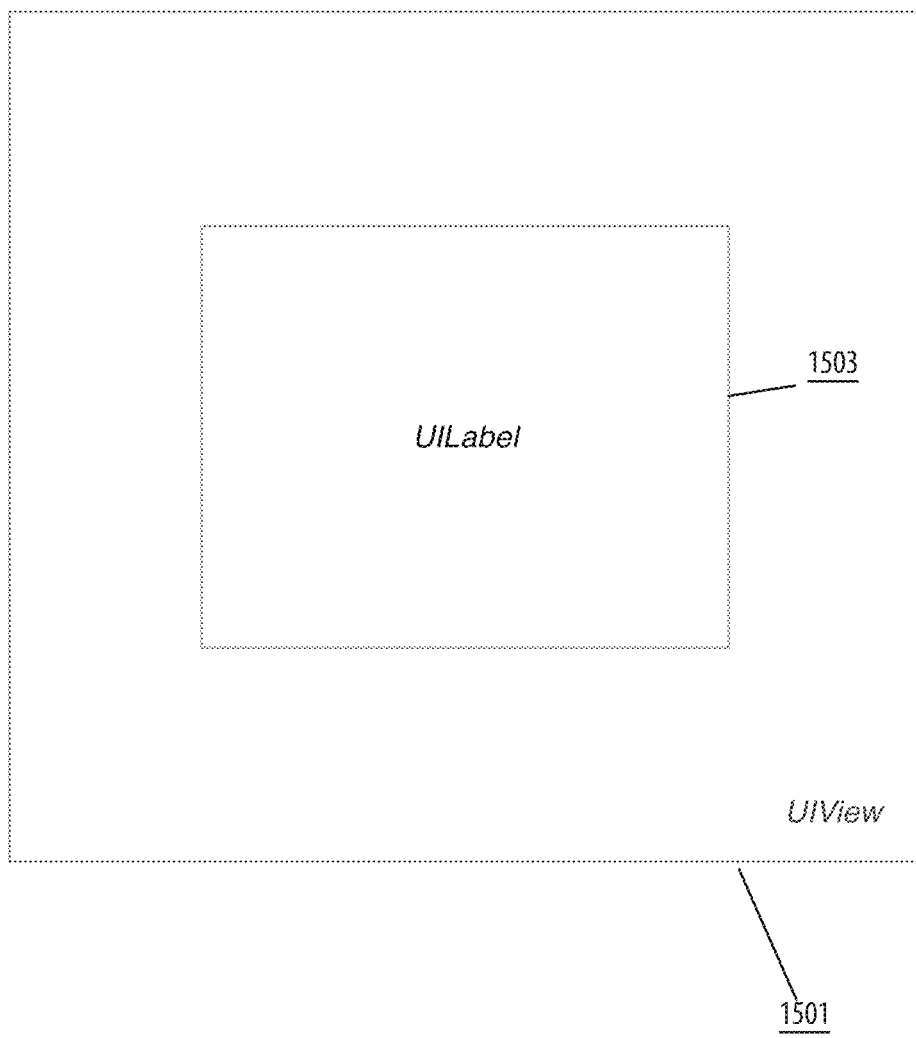
Fig. 15 — UI: resume presentation

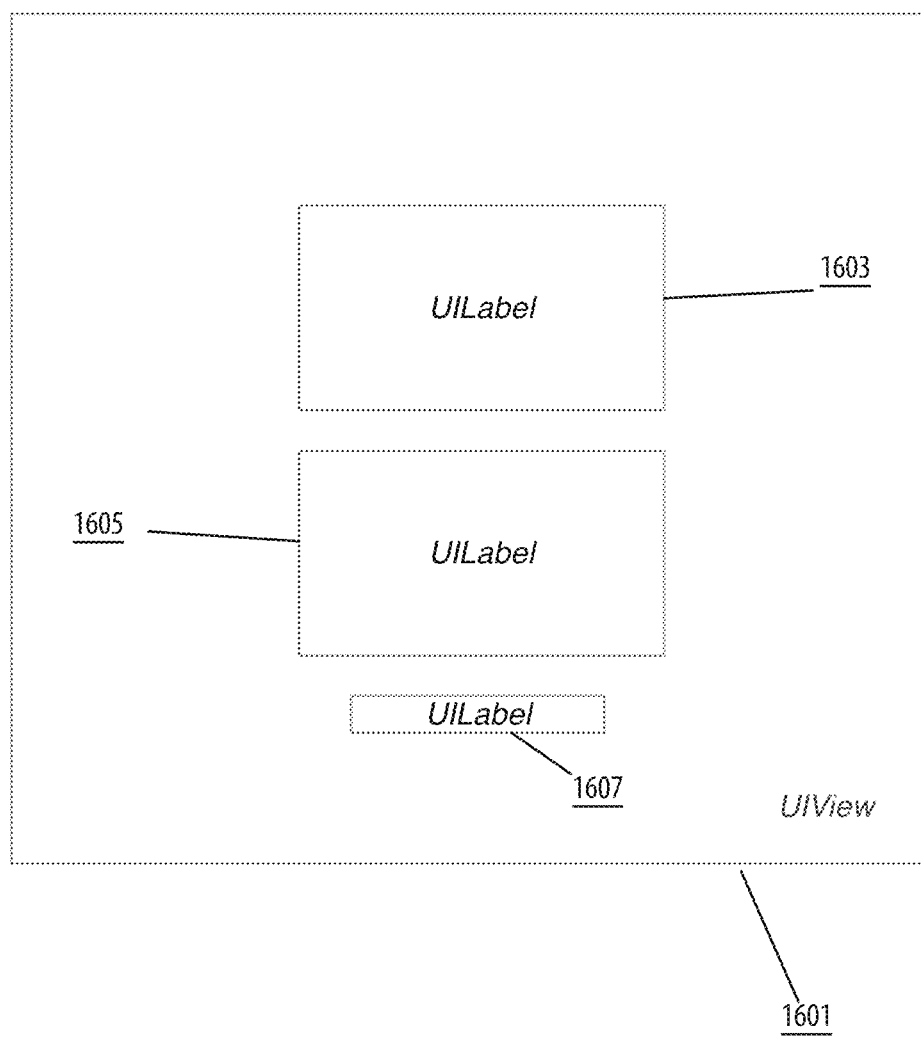
Fig. 16 — UI: resume presentation (alternative)

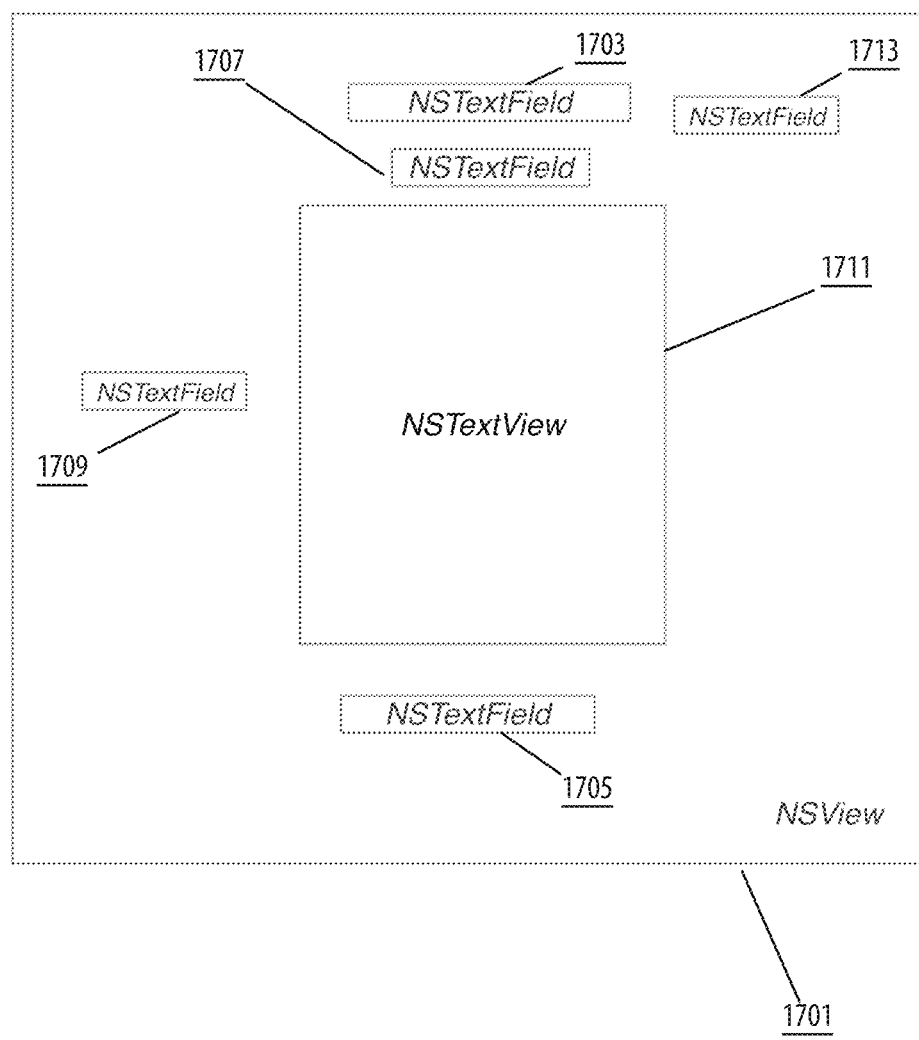
Fig. 17 — pdf producer view- focused resume presentation pdf

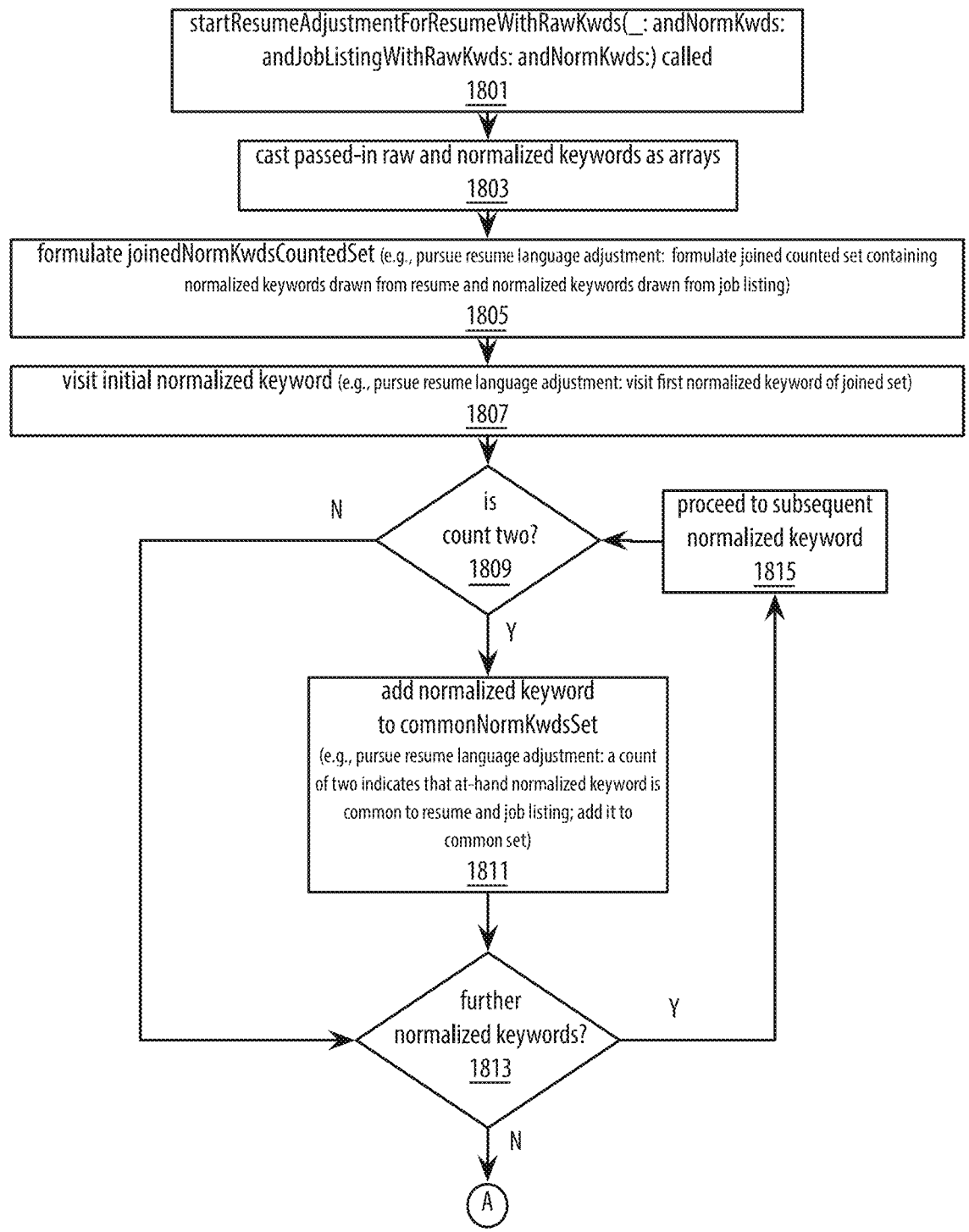
Fig. 18A — adjust resume language

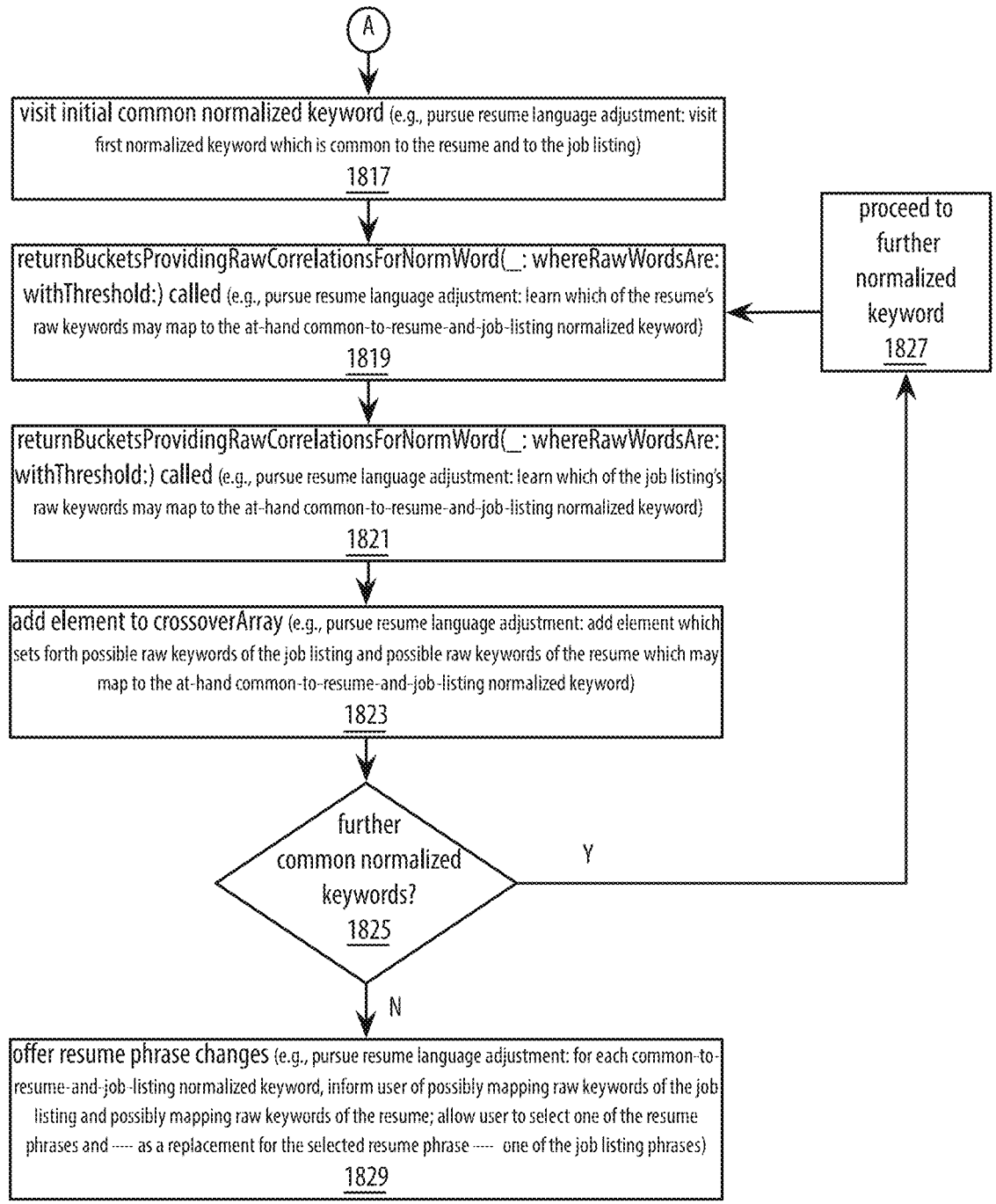
Fig. 18B — adjust resume language

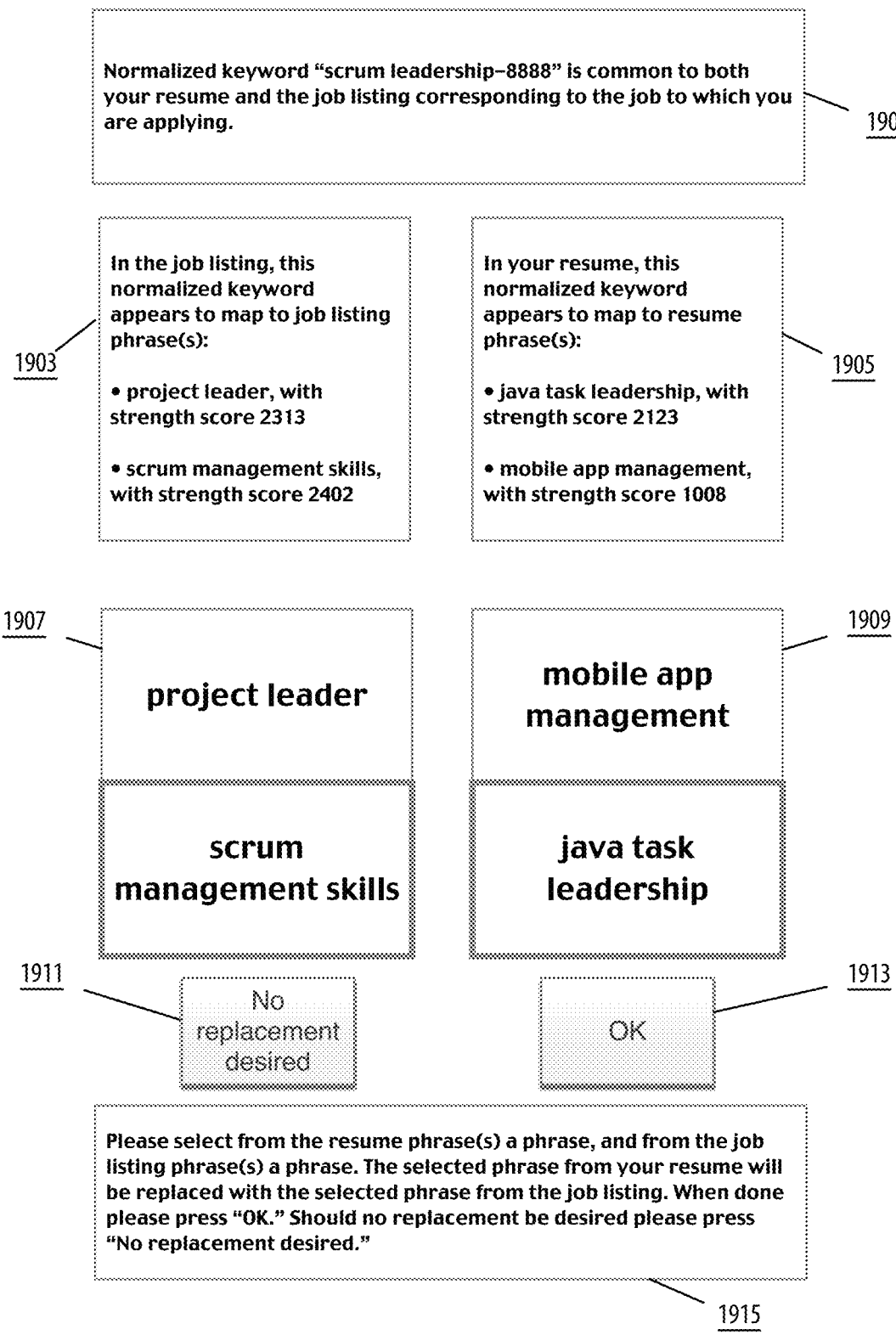
Fig. 19 — UI: adjust resume language

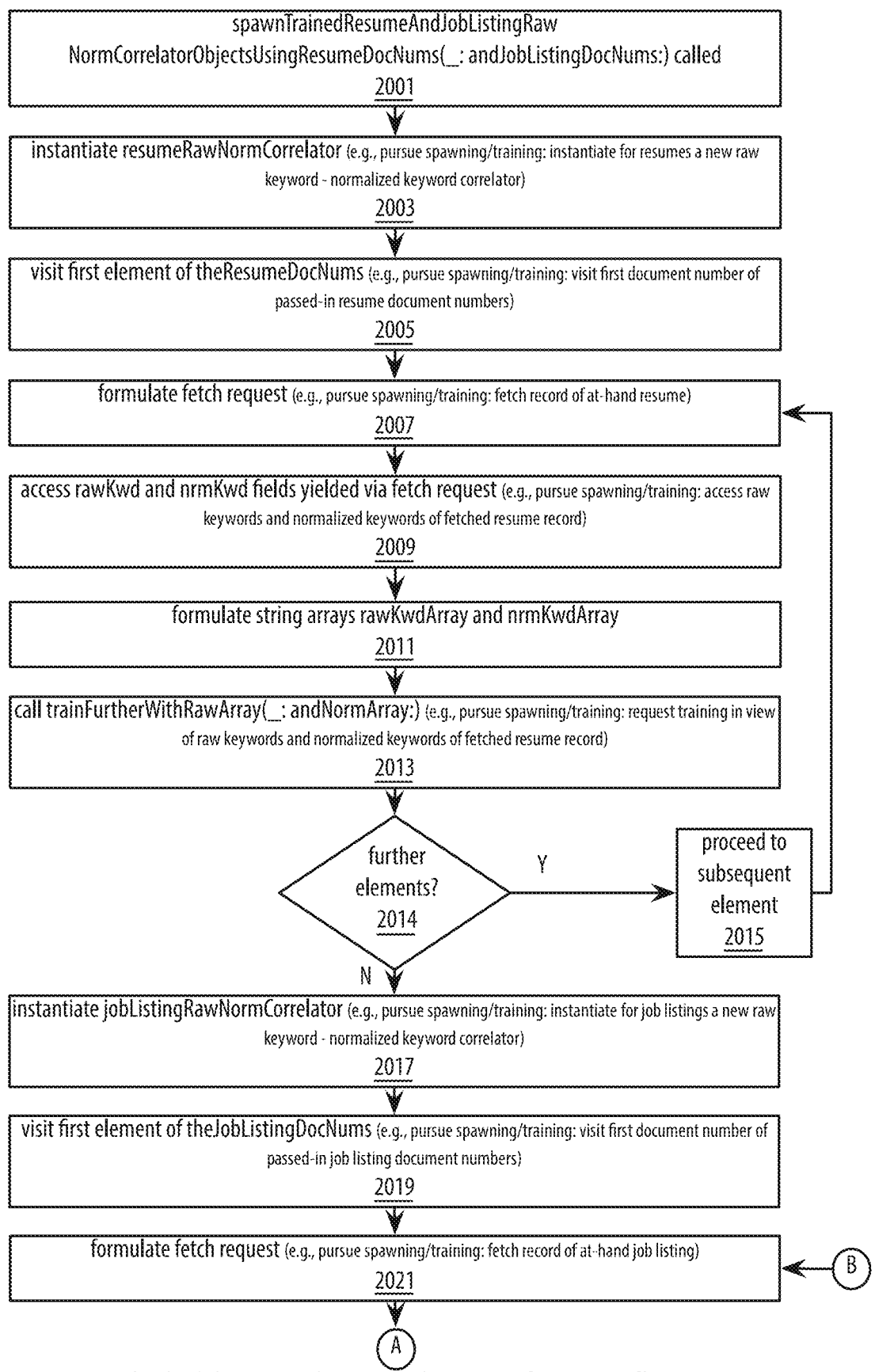
Fig. 20A — spawning/training processing supporting resume language adjustment

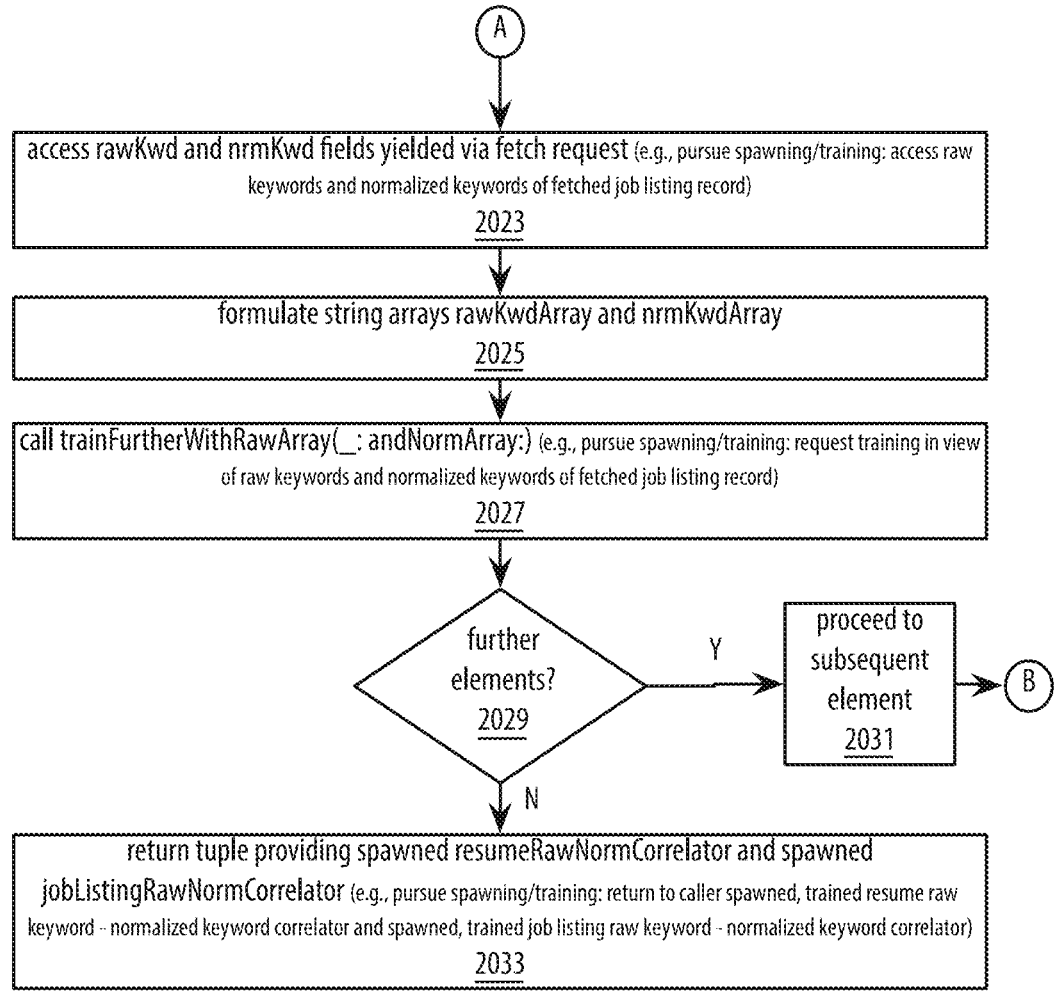
Fig. 20B — spawning/training processing supporting resume language adjustment

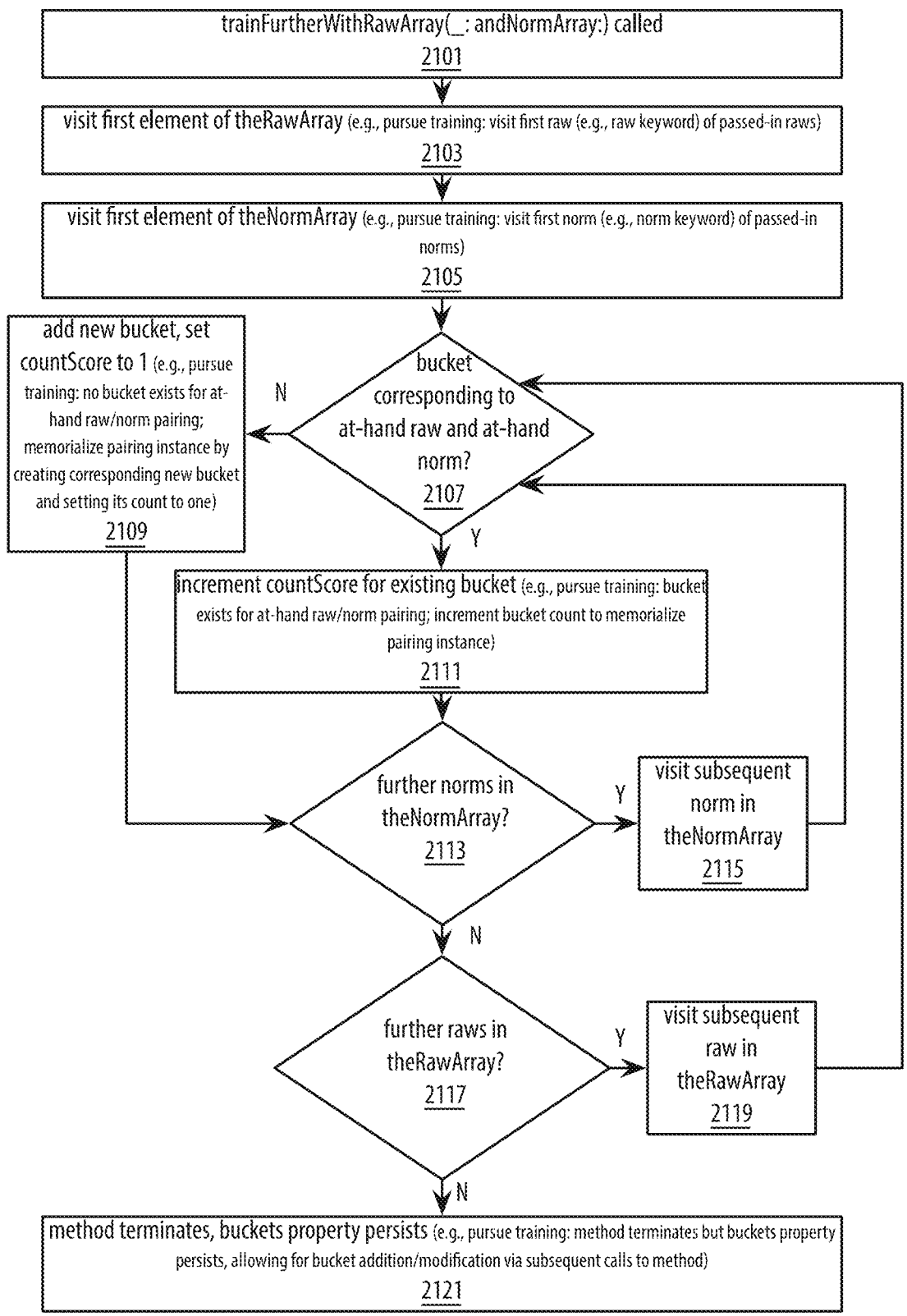
Fig. 21 — further training processing supporting resume language adjustment

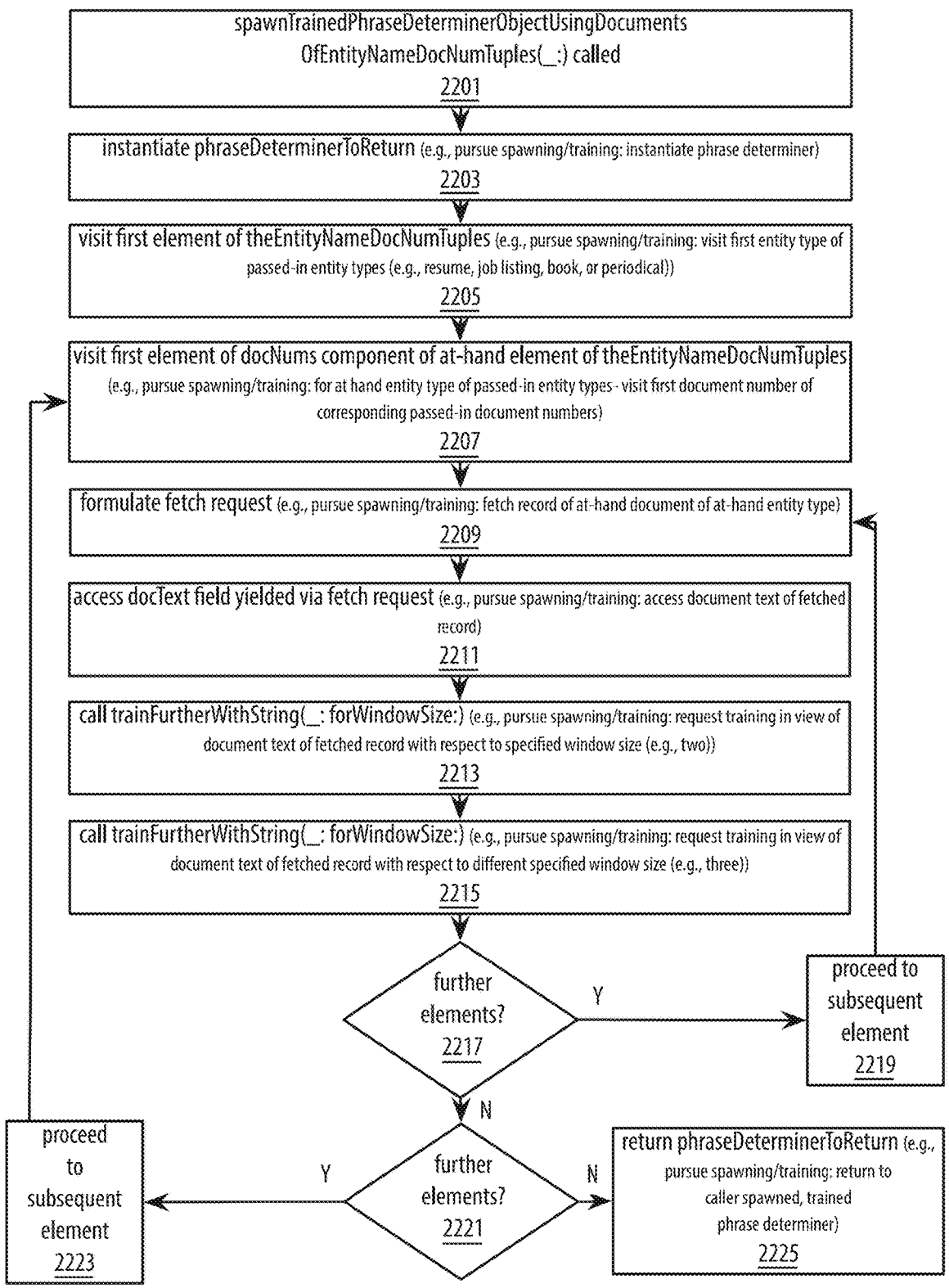
Fig. 22 — spawning/training processing supporting phrase recognition within raw text

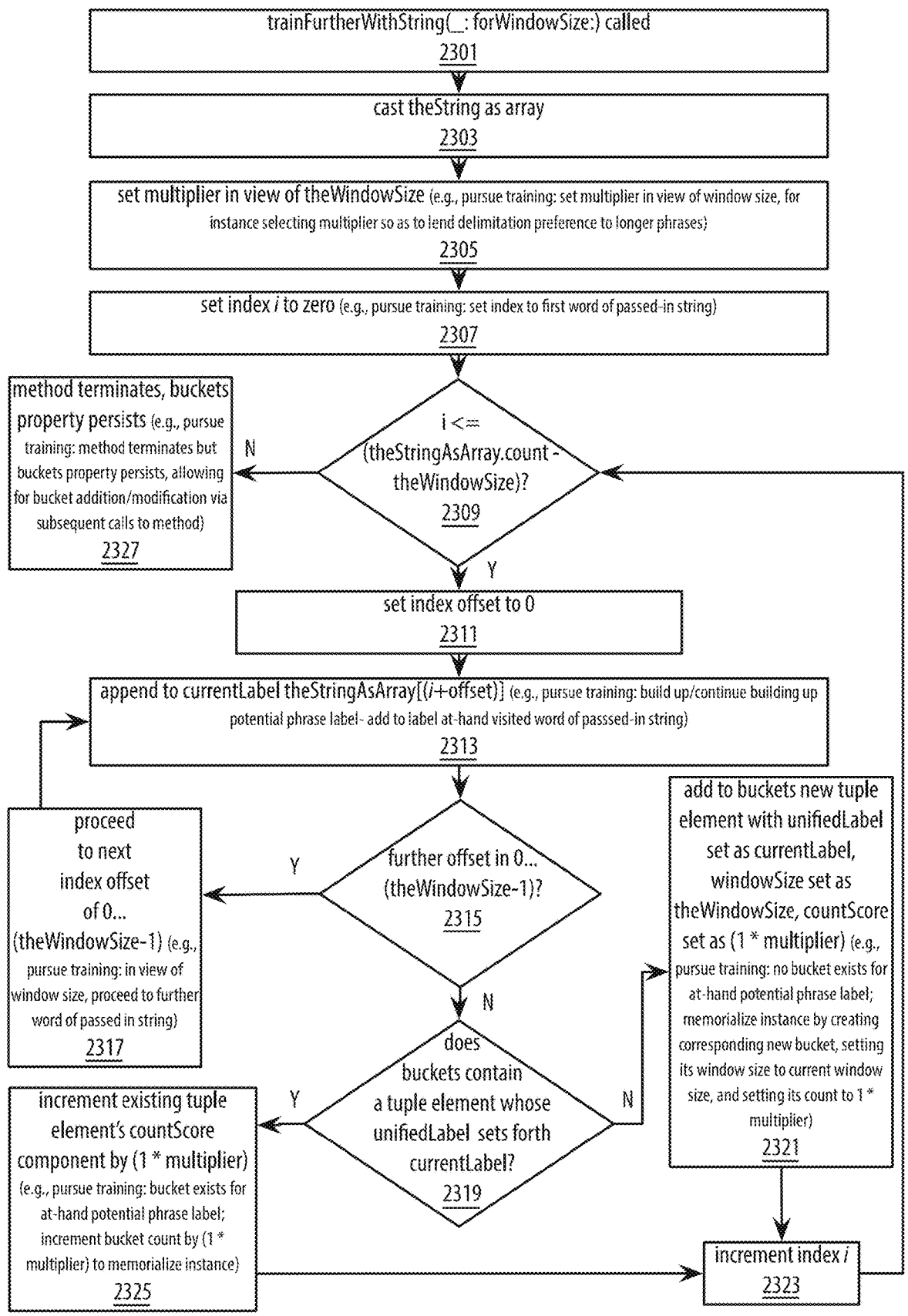
Fig. 23 — further training processing supporting phrase recognition within raw text

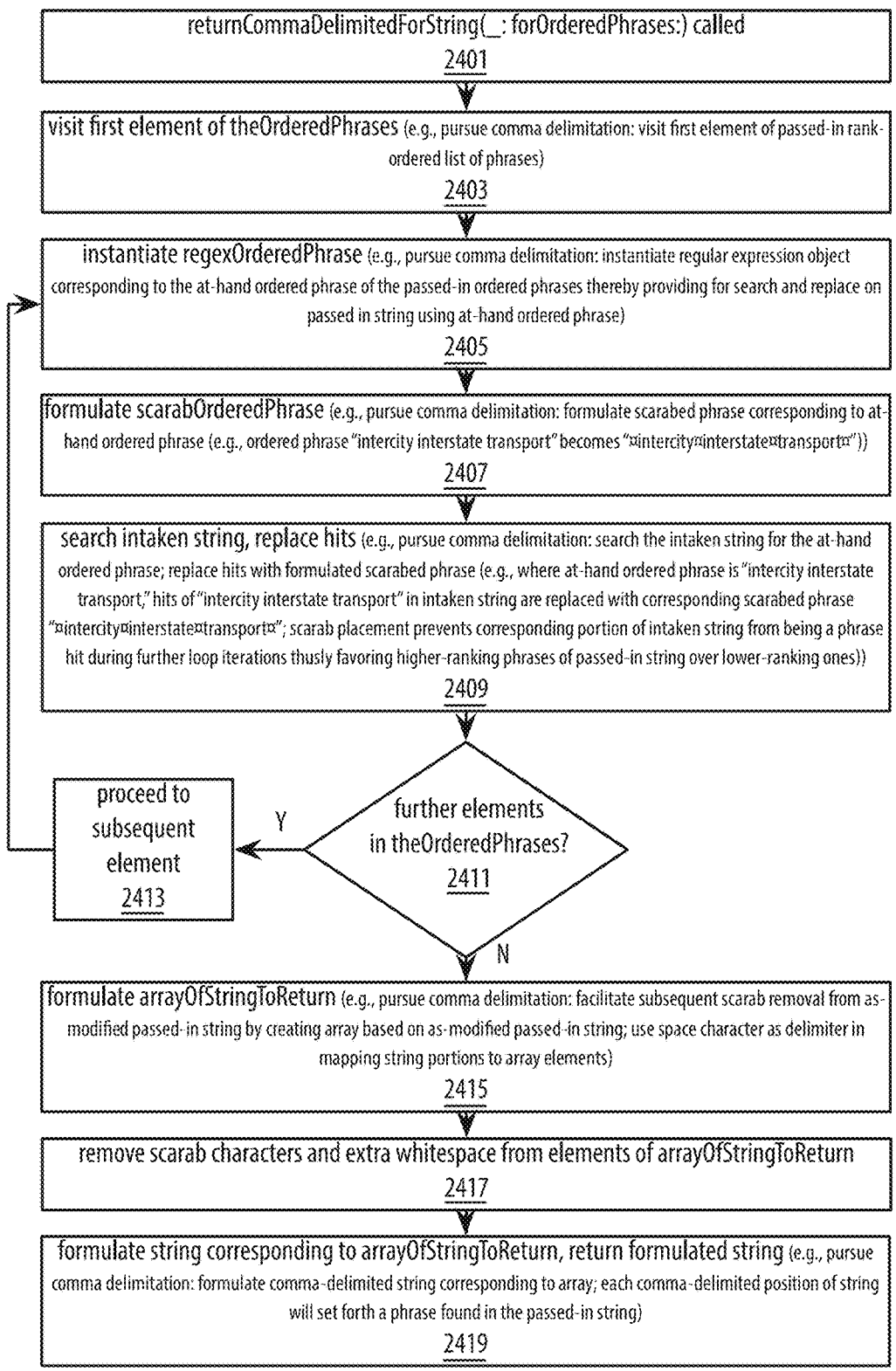
Fig. 24 — process applying comma delimitation to found phrases

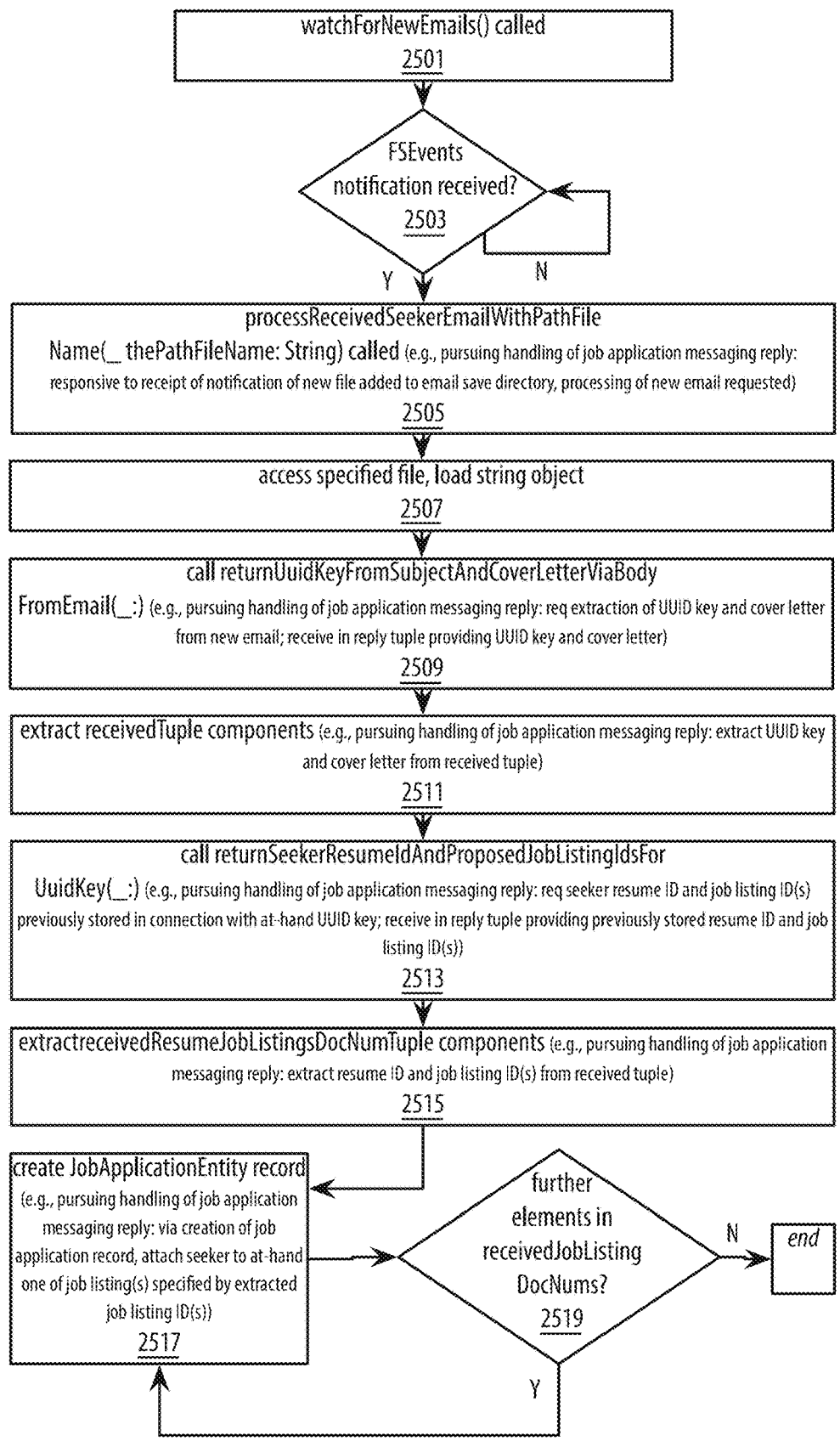
Fig. 25 — handle job application messaging reply

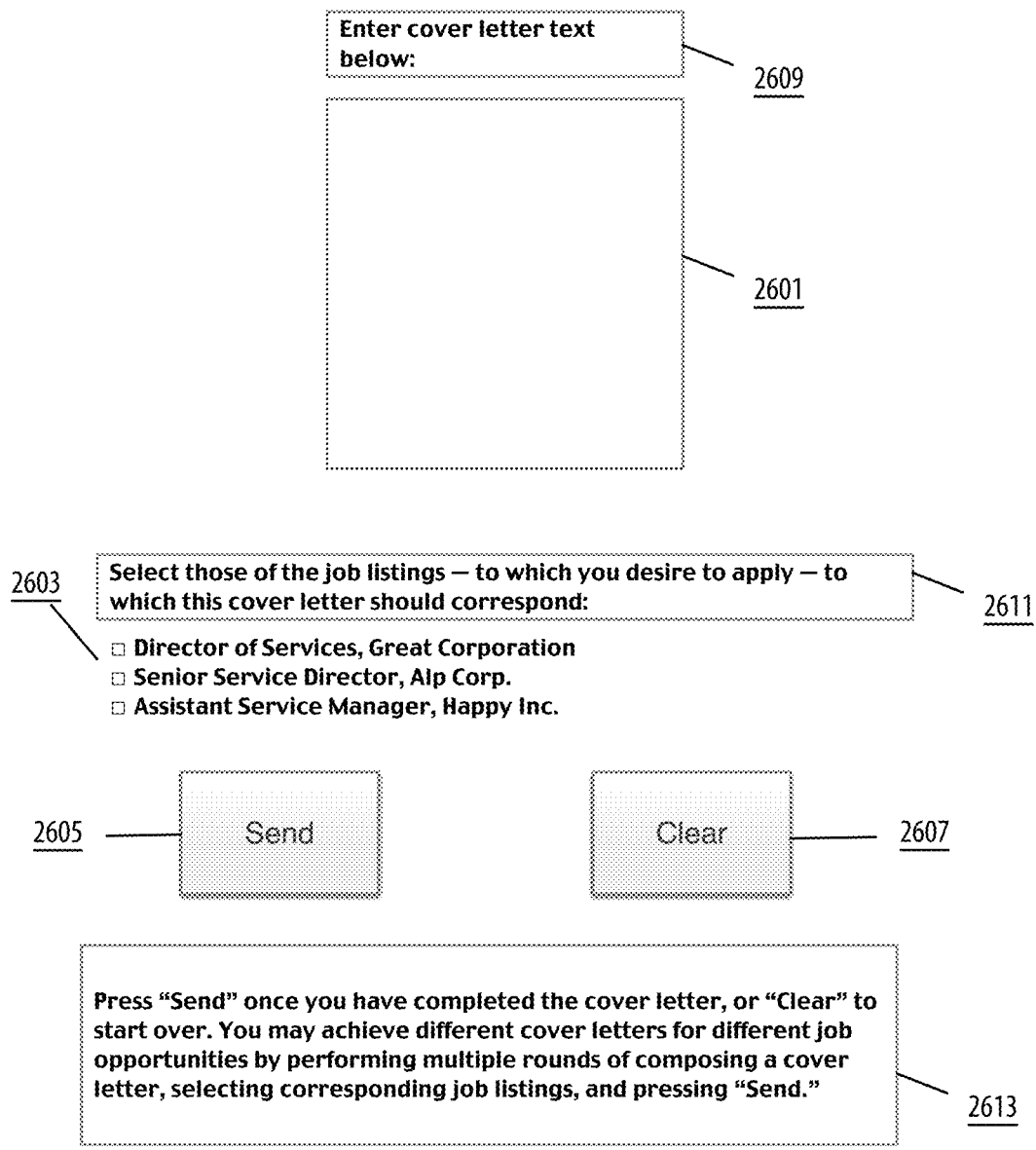
Fig. 26— in-email-body-UI: apply to messaging-heralded job opportunit(ies) / provide coverletter(s)

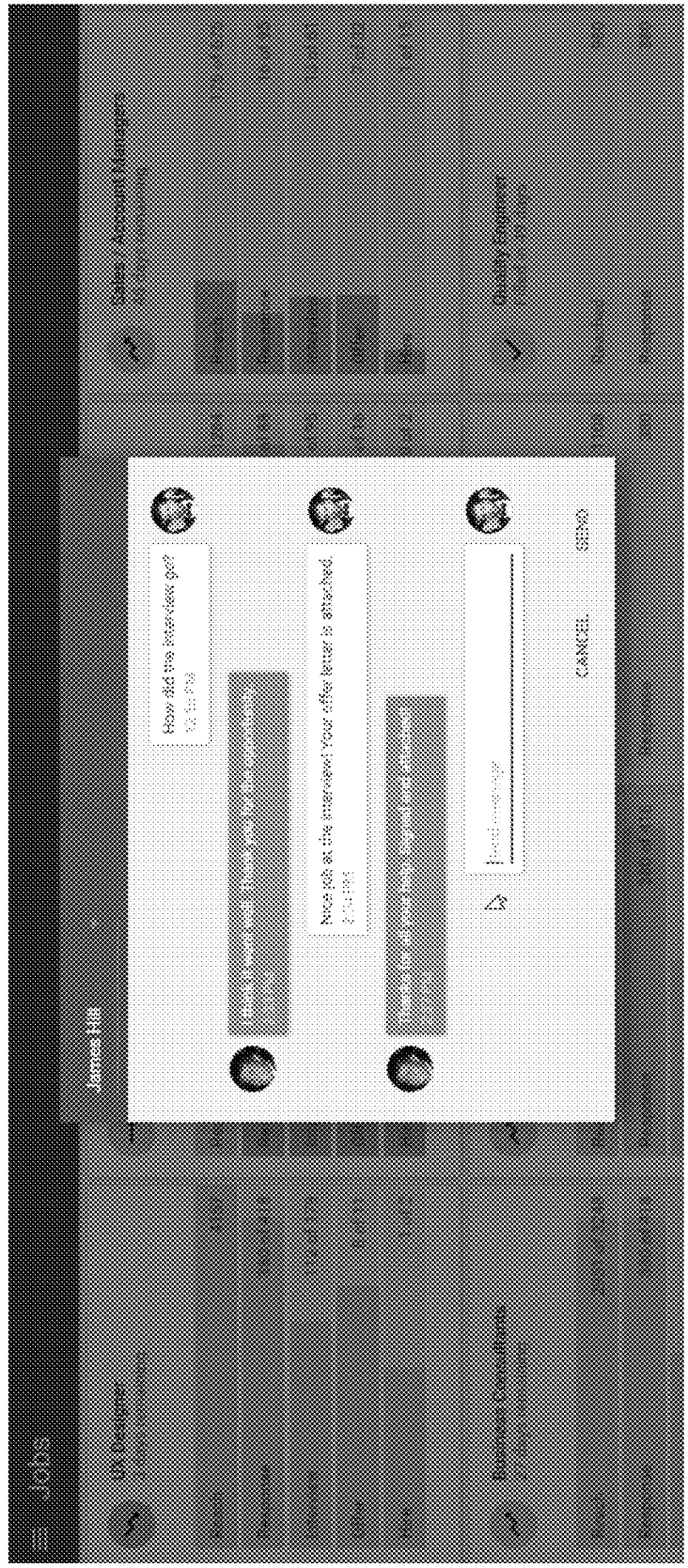
Fig. 27 — screenshot: communicate with a job seeker user via instant messaging

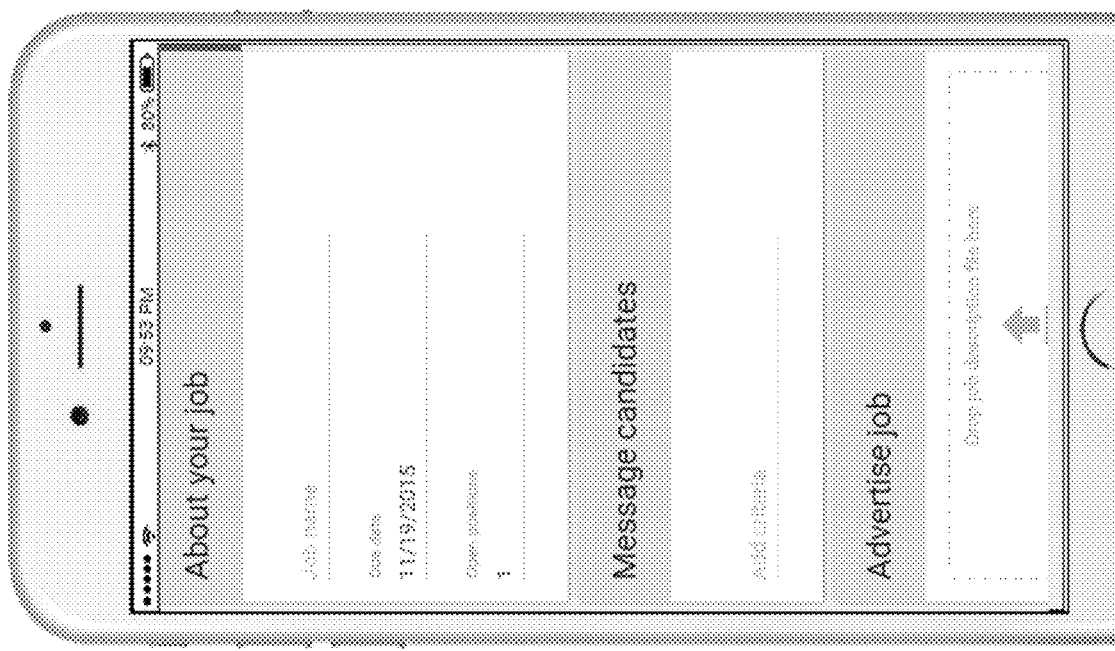
Atlas: Create Job 2803
ATLAS allows recruiters to create and post a job instantly from a mobile phone.
Upload job description from PDF, word, or source from Monster's library
Fig. 28 — screenshot: provide new job listing / message job seekers / advertise job

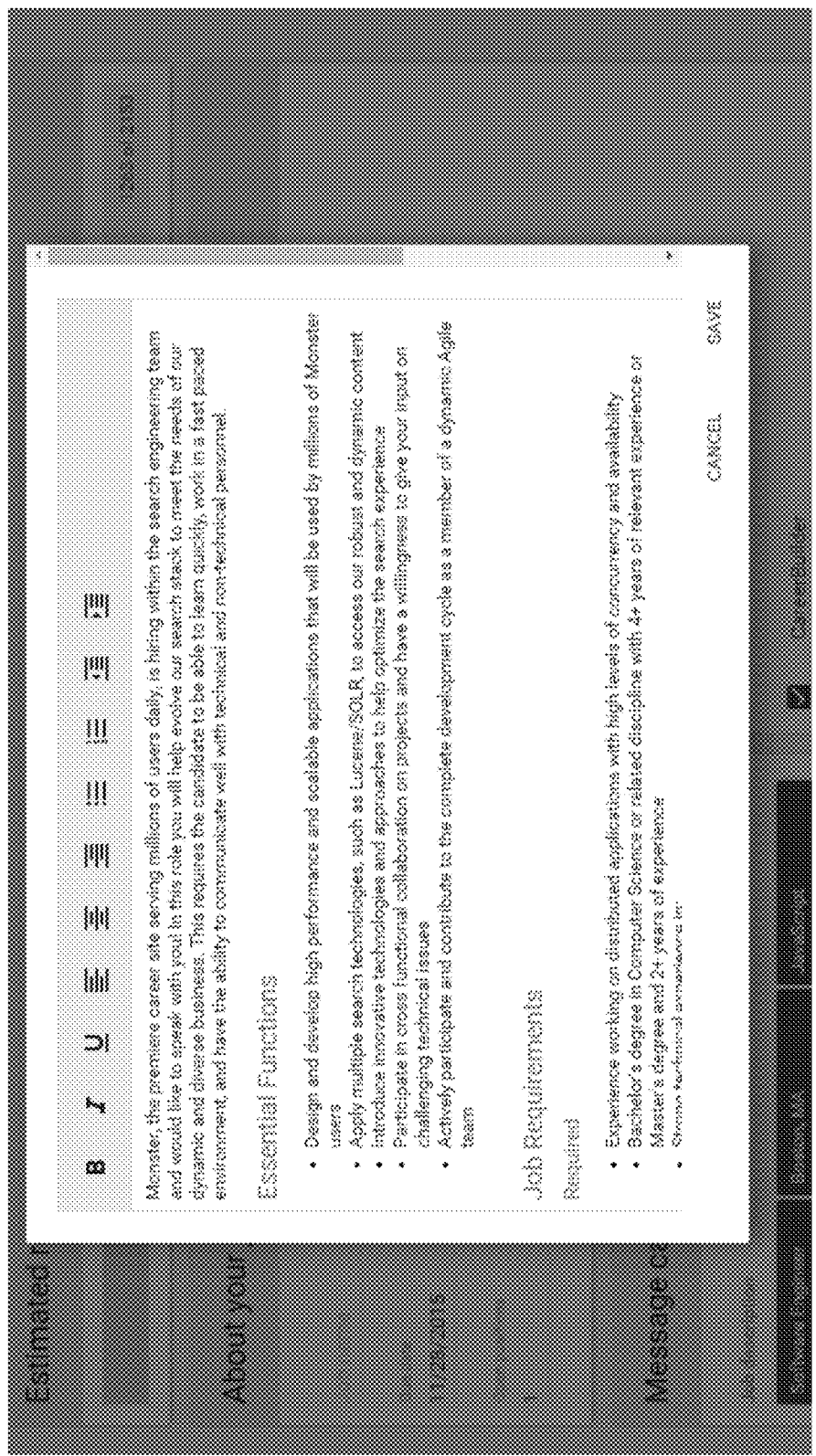
Fig. 29 — screenshot: provide a new job listing via entry

Fig. 30 — screenshot: provide new job listing / message job seekers / advertise job

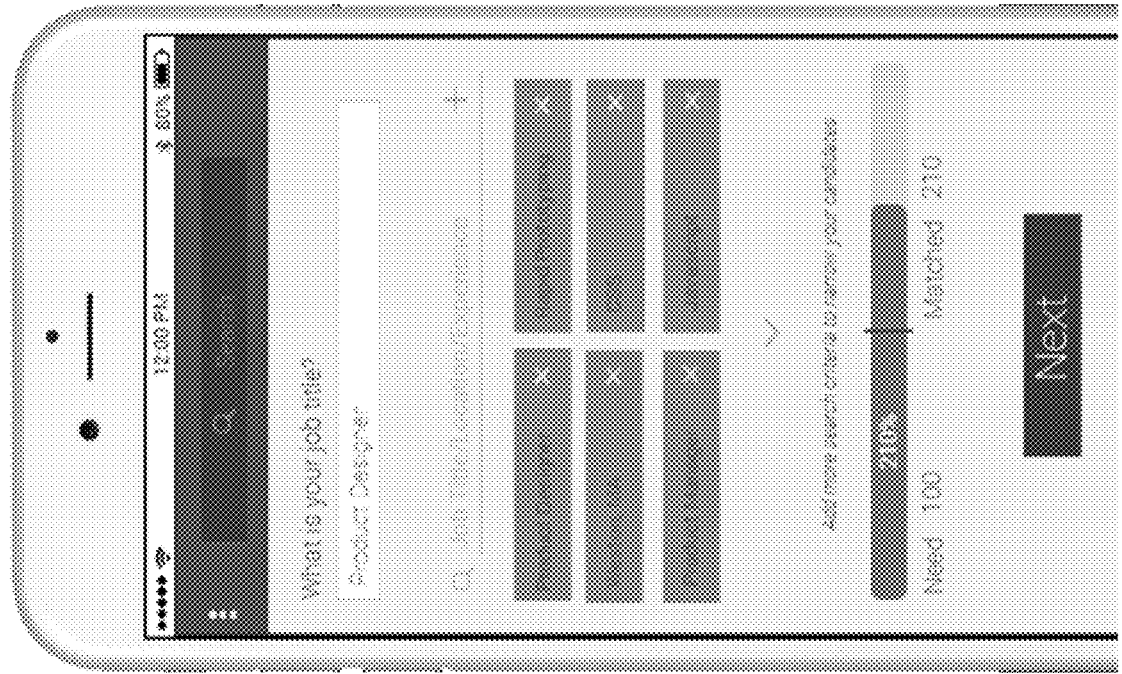

CREATE A JOB

RECOMMENDS SEARCH CRITERIA:

Easy to learn and adapt with color coordinated actions including:
- Skills
- Titles
- Locations Predictive Analytics determine number of candidates required based on:
- Requirements
- Location
- Due date
- Past performance Fig. 31 — screenshot: provide job title of introduced job listing, receive suggested skill(s)/title(s)/locations

CREATE A JOB
JOB DESCRIPTION:
Pre-populated job descriptions based on high performing similar roles increase recruiter efficiency and maximize candidate response.
Determine from Job Title and Recruiter feedback with simple editing tools.
Fig. 32 — screenshot: normalized job titles/skills plied in prepopulating a job listing

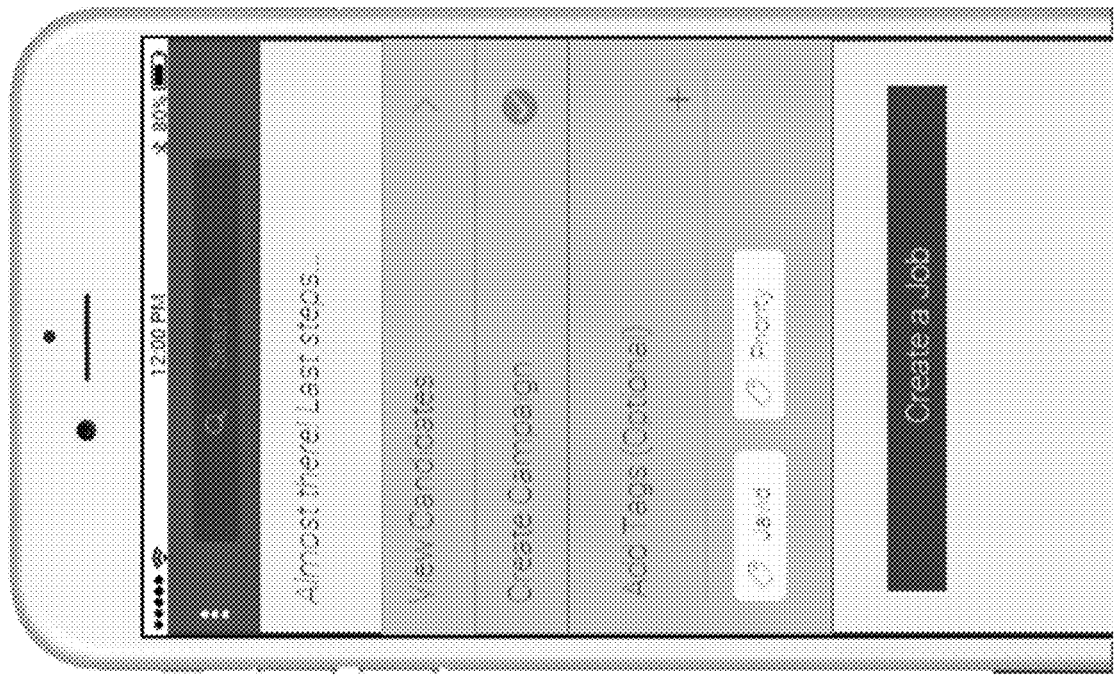
VIEW (SEARCH) CANDIDATES:
Determine match rate of candidates to requirements
CREATE CAMPAIGNS:
Create a group of candidates to message out the job
ADD TAGS:
Manually tag jobs to find them later or allow ATLAS to create smart tags
CREATE A JOB
Fig. 33 — screenshot: indication of match rate of candidates versus requirements

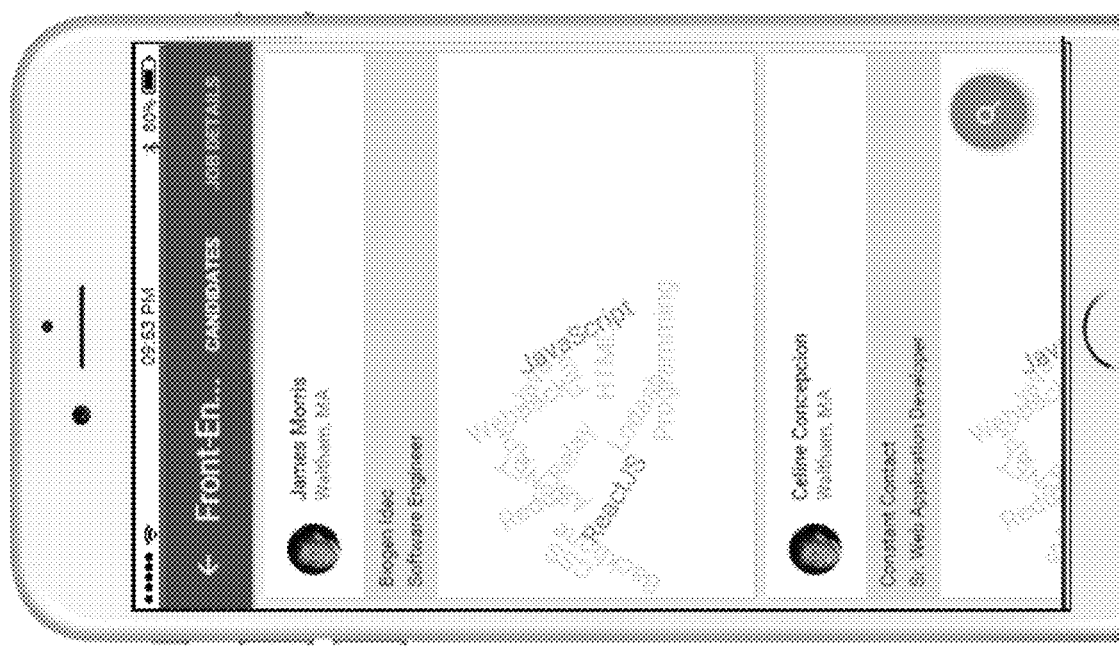
Recruiters and hiring managers review candidates instantly on any device and incorporate automated job refinement suggestions on the fly.
Fig. 34 — screenshot: review candidate job seekers

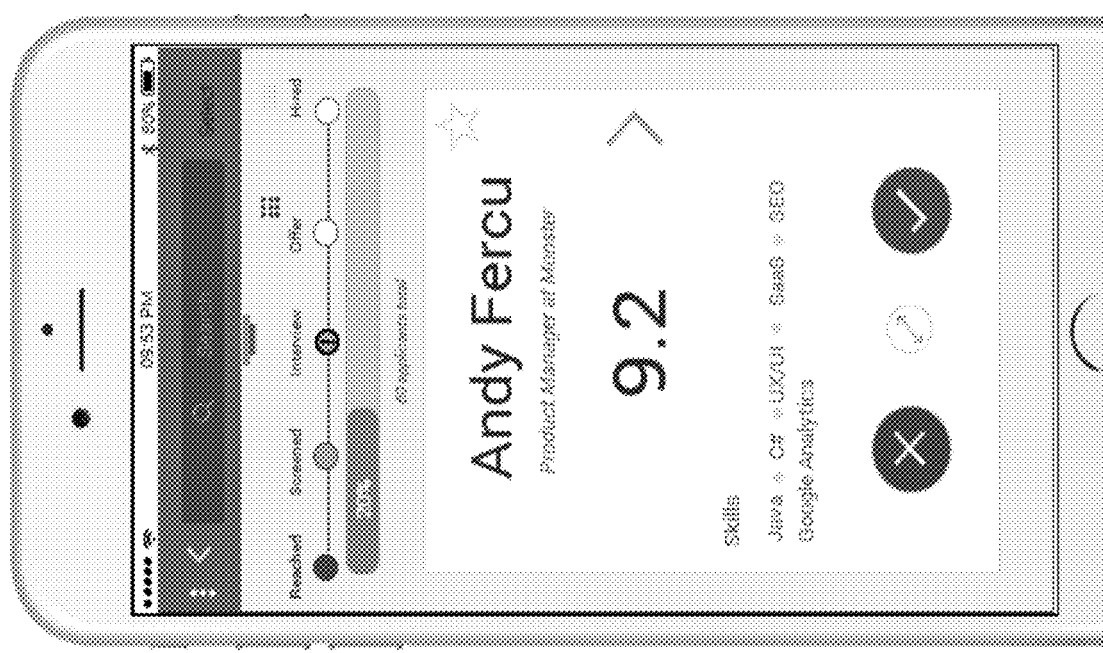
As candidates respond and apply, recruiters and hiring managers to swipe on ATLAS to:
- review responses
- select the best fit
- move selected candidates forward in the recruiting process
- report on key OFCCP metrics
Fig. 35 — screenshot: review seeker response(s) / select apparent-good-fit seeker(s) / move job seeker(s) forward in hiring process / OFCCP metrics

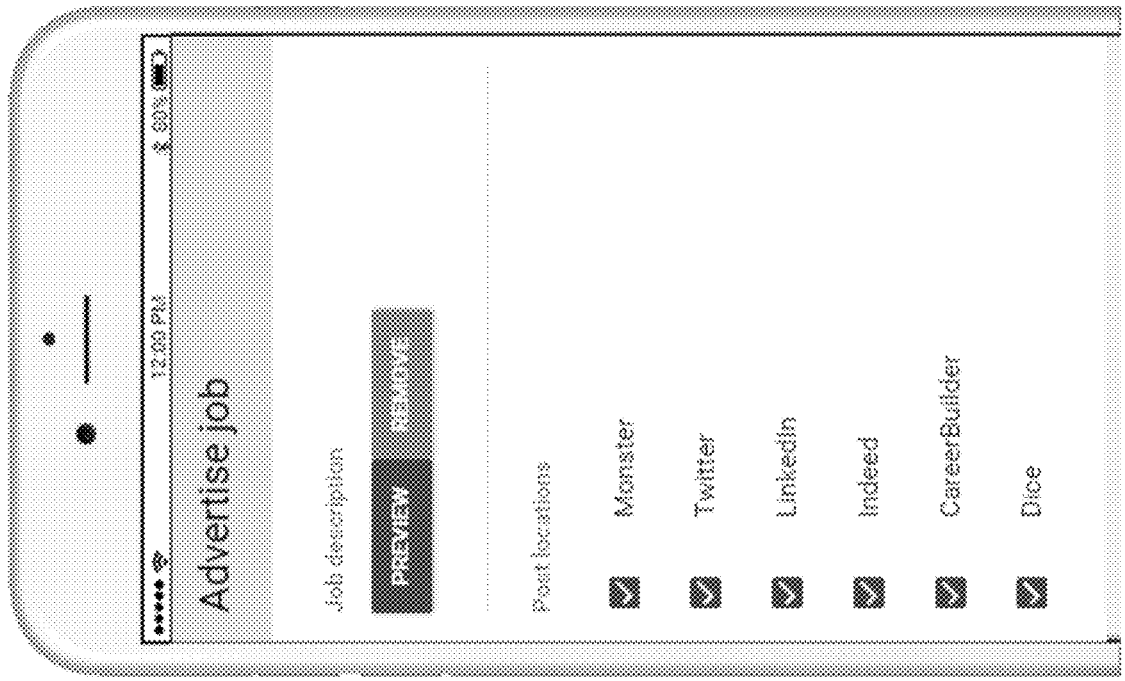
POST JOBS:
Automatically defaults to post to all designated career sites
Adaptive to work with:
- PPC
- Duration Jobs
- Free Boards
Fig. 36 — screenshot: advertise job

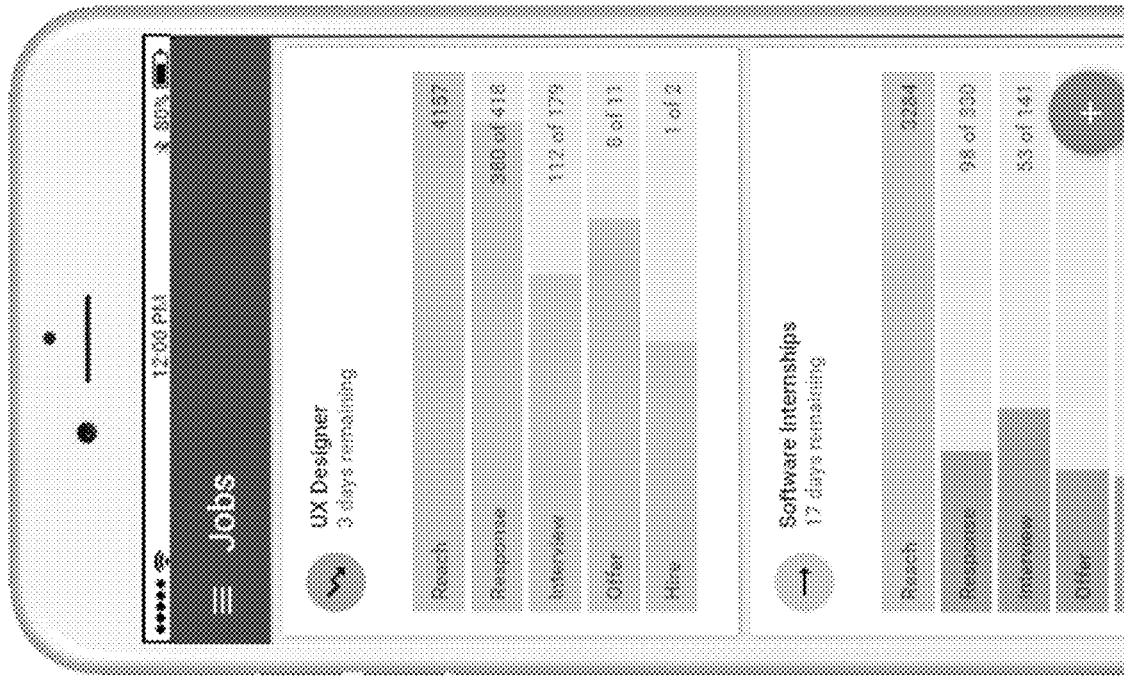
VIEW JOB:
Jobs automatically prioritized by risk of missing due date
Colored circle draw attention to stages in need of action
Clear call to action buttons
Candidates broken down by pipeline stage
Customer/Hiring manager icons
Tags
Fig. 37 — screenshot: receive information regarding campaign(s)
VIEW A JOB

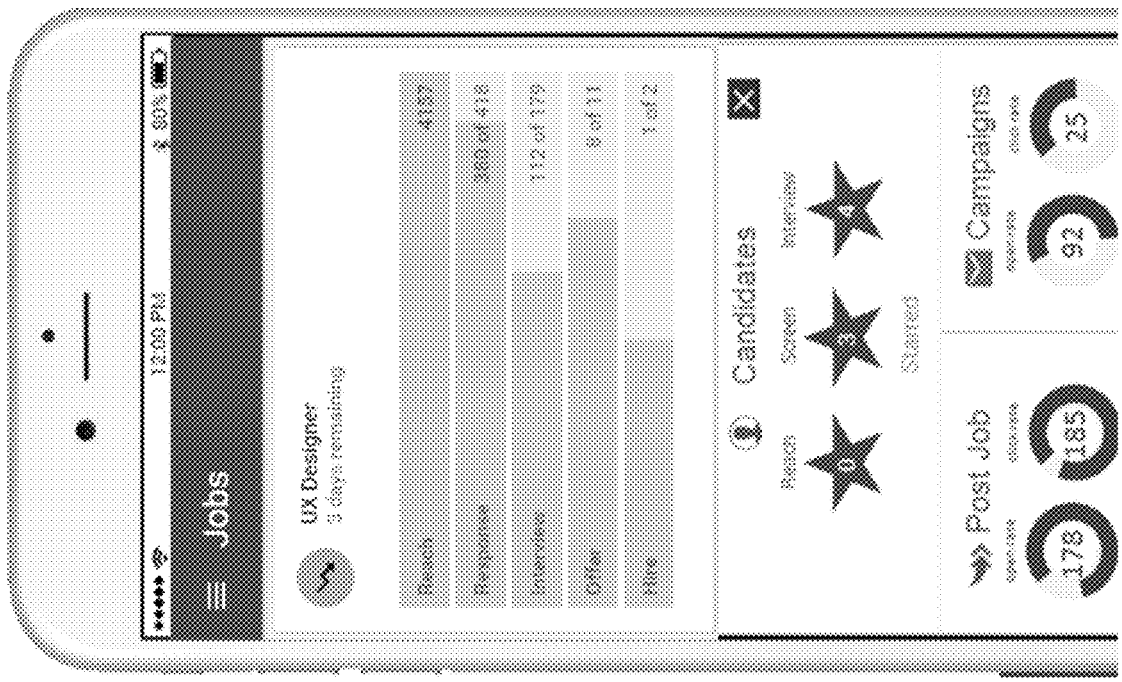
JOB ACTIONS:
View starred candidates
See views and clicks on postings
See opens and clicks for campaigns
VIEW A JOB
Fig. 38 — screenshot: view starred candidate(s) / receive views/clicks information for job listing(s)/ campaign(s)

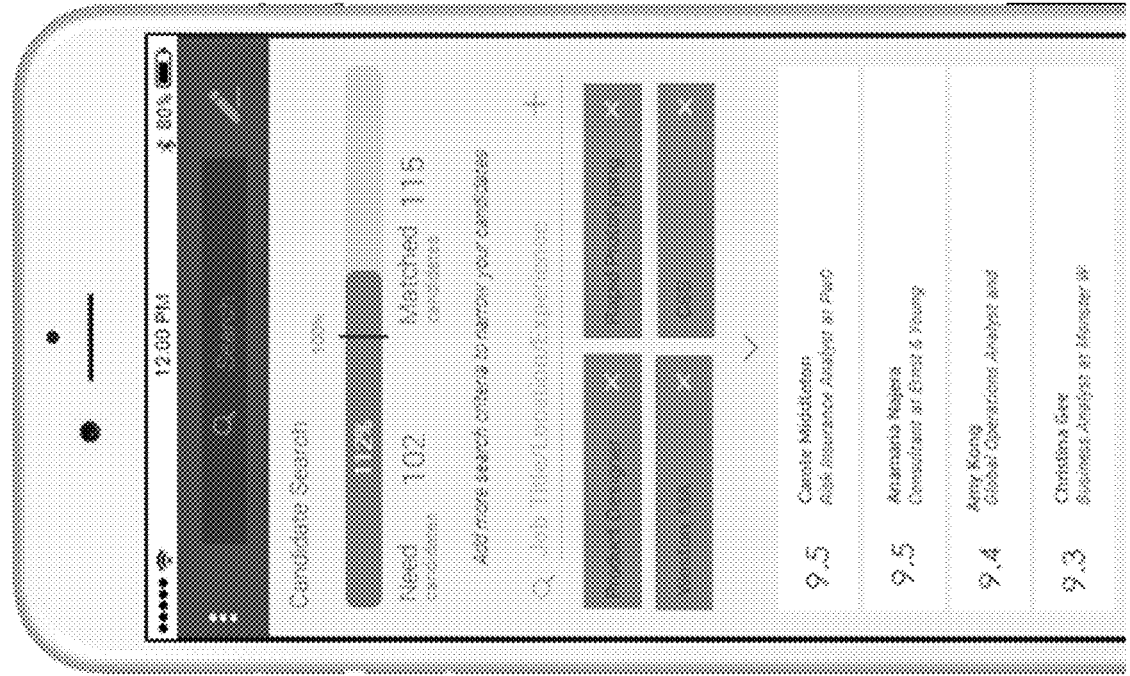

DISTRIBUTED SEARCH

CANDIDATES SEARCH VIEW:

Easy to find more candidates on various 3rd party job boards

Automatically recommends search terms and candidates based on job description

Provides candidate counts on search against required

Clear call to actions

Creates and leverages smart tags

Fig. 39 — screenshot: search for job seekers across multiple destinations

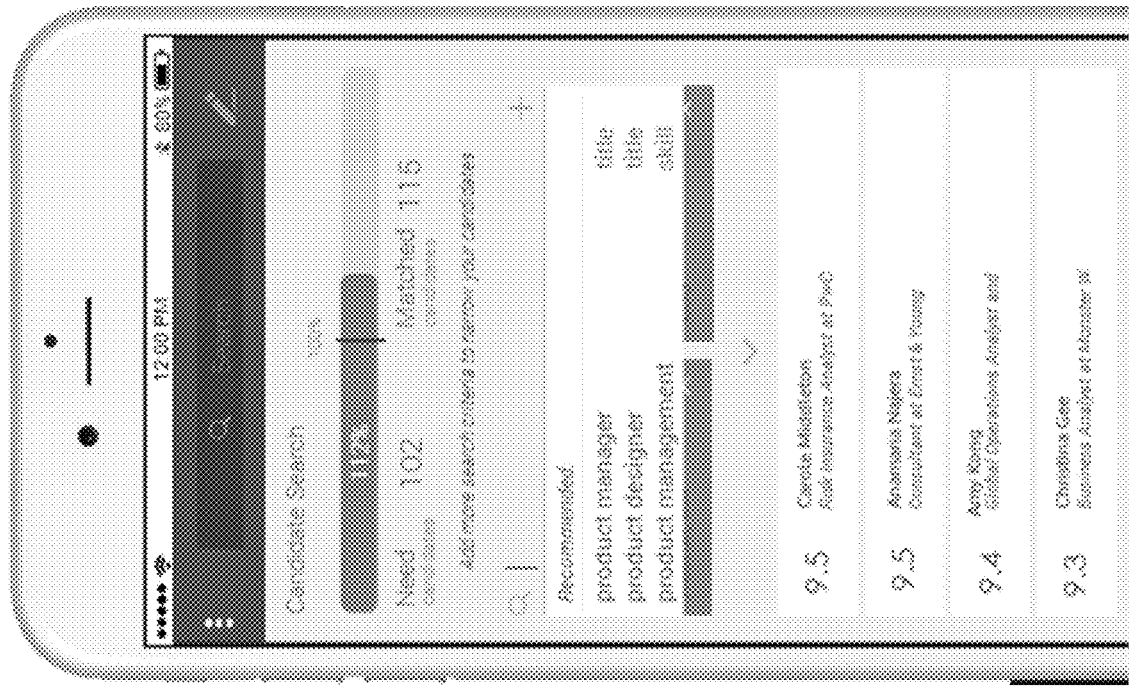
DISTRIBUTED SEARCH
4003
CANDIDATES SEARCH VIEW:
Smart match type-aheads based on similar queries and job descriptions
Recommended titles
Color coded skills designations
Fig. 40 — screenshot: type-ahead functionality

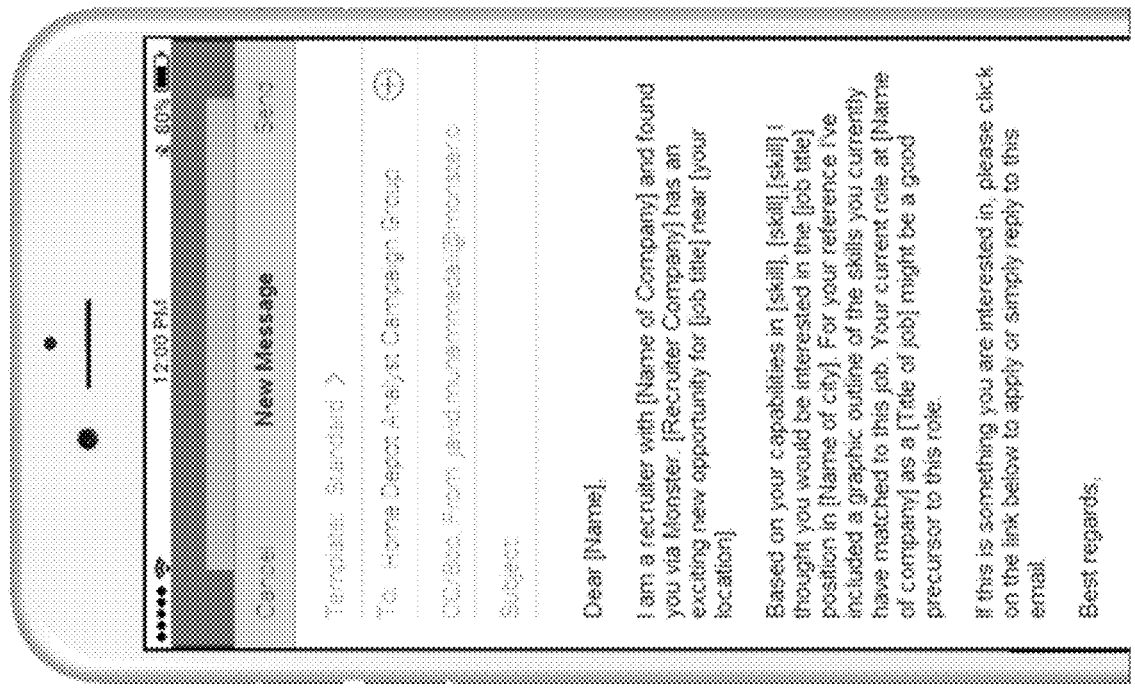
CREATING CANDIDATE MESSAGING:
Standard template as default — as selected by the user
**Could default to most impactful message for that Job Category*
Increases efficiency for recruiters to send campaign messages
EMAIL TEMPLATES
Fig. 41 — screenshot: candidate messaging

VIEW CANDIDATES:

Updated candidates have responded to jobs or campaigns and require recruiter action Applied candidates have gone through the application process and are considered part of the candidate pipeline Fig. 42 — screenshot: view candidate job seeker information

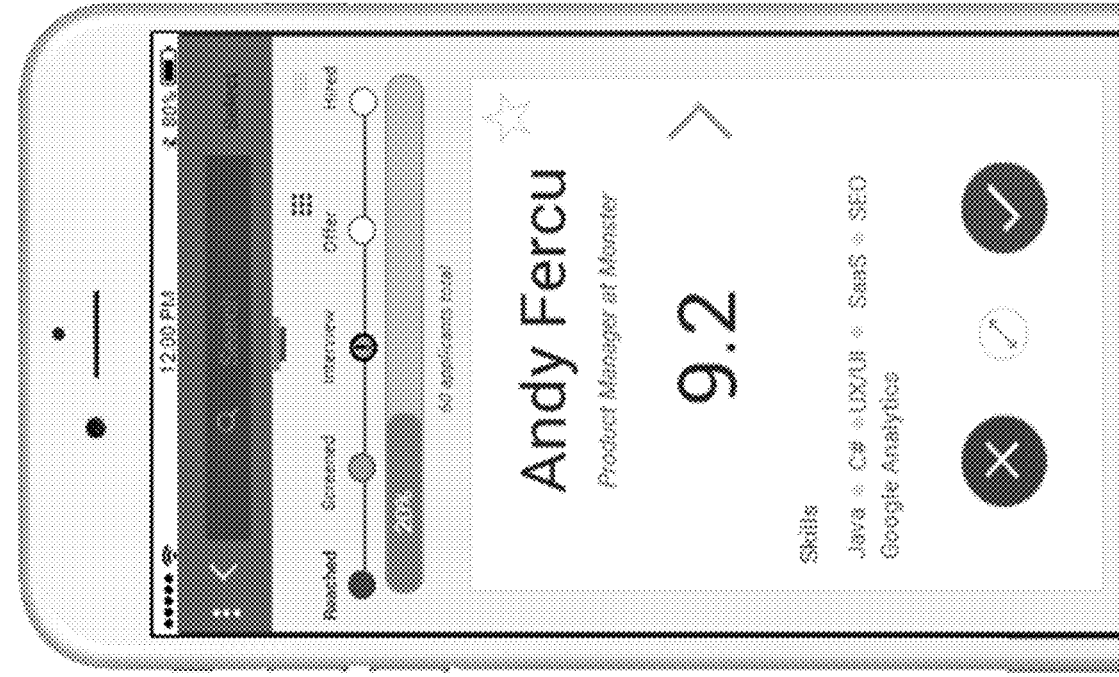
APPLIED CANDIDATES:
Shows stages of the pipeline:
- % bar correlates to circle graph
- Color correlates to level of attention required
- Stage with highest attention required opens first
Candidate view:
- Red X = Reject
- Green Check = Move to next stage
- Arrow = Consider later
Stars
Fig. 43 — screenshot: seeker pipeline progress

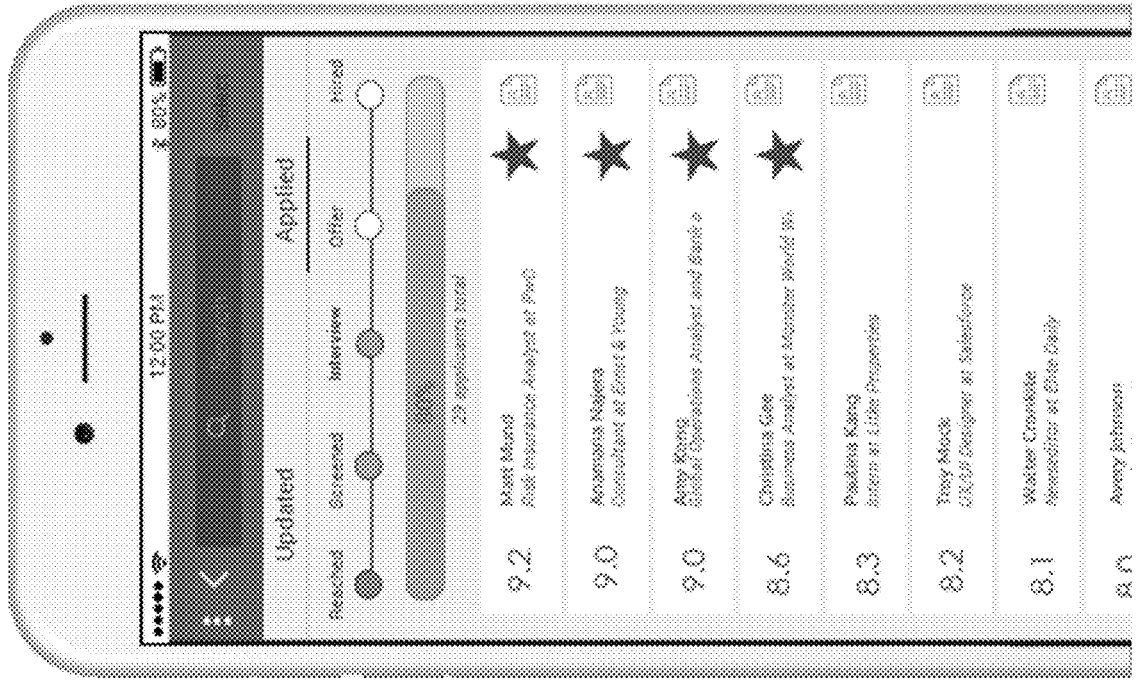
CANDIDATES LIST VIEW:
Starred candidates appear first
Match score determines remaining candidate list order
Provides a quick resume view
Fig. 44 — screenshot: seeker candidate display

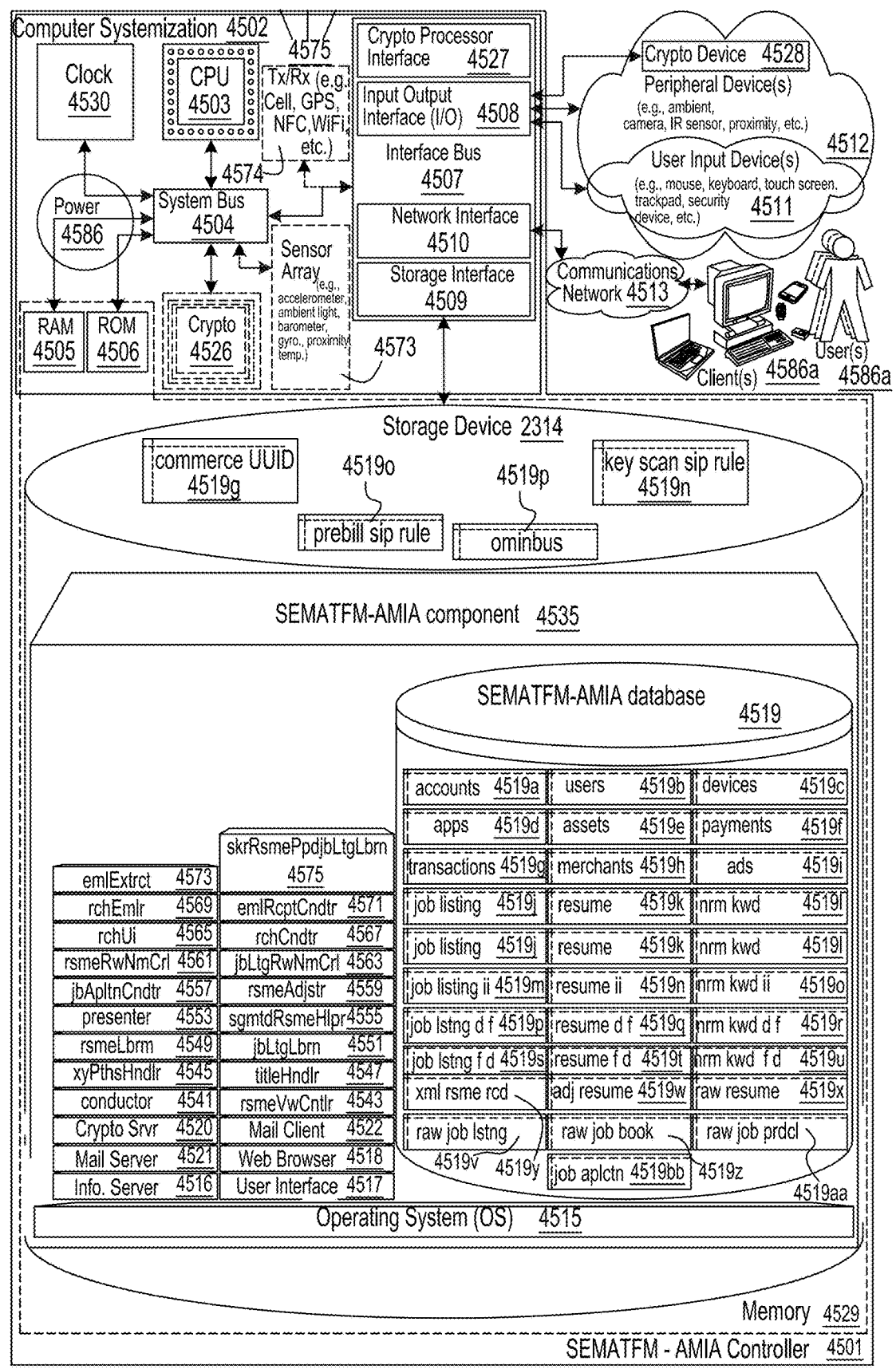
SEMATFM - AMIA Controller Fig. 45

SEARCH EXTRACTION MATCHING, DRAW ATTENTION-FIT MODALITY, APPLICATION MORPHING, AND INFORMED APPLY APPARATUSES, METHODS AND SYSTEMS

PRIORITY CLAIM

This application is a continuation of and claim priority under 35 U.S.C. § 120 from U.S. application Ser. No. 15/465,478, titled "Search Extraction Matching, Draw Attention-Fit Modality, Application Morphing, and Informed Apply Apparatuses, Methods and Systems," filed on Mar. 21, 2017, which claims benefit to priority under 35 USC § 119 to U.S. provisional patent application Ser. No. 62/345,719, filed Jun. 3, 2016, entitled "SEARCH EXTRACTION MATCHING AND APPLICATION MORPHING APPARATUSES, METHODS AND SYSTEMS".

Applicant also hereby claims benefit to priority under 35 USC § 120 as a continuation-in-part of: U.S. patent application Ser. No. 14/711,336, filed May 13, 2015, entitled "Social Relation Management Apparatuses, Methods and Systems".

Applicant further hereby claims benefit to priority under 35 USC 365 as a national stage entry and continuation-in-part, of: Patent Cooperation Treaty application, serial no. PCT/US15/30550, filed May 13, 2015, entitled "Social Relation Management Apparatuses, Methods and Systems".

Applicant additionally hereby claims benefit to priority under 35 USC § 119 to U.S. provisional patent application Ser. No. 61/992,816, filed May 13, 2014, entitled "SOCIAL RELATION MANAGEMENT APPARATUSES, METHODS AND SYSTEMS".

The entire contents of the aforementioned applications are herein expressly incorporated by reference.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address relationship management systems, and more particularly, include Search Extraction Matching, Draw Attention-Fit Modality, Application Morphing, and Informed Apply Apparatuses, Methods and Systems.

As such, the present innovations include (at least) the following distinct area, including: Electronic Communications involving Condition Responsive Indicating Systems that are Responsive to a Particular Sequence of Conditions (with a suggested Class/Subclass of 340/523).

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Headhunters endeavoring to fill job positions—and job seekers endeavoring to secure new or different employment—increasingly find traditional approaches unsatisfying.

In particular, headhunters may find traditional approaches of manually sifting through piles of resumes and piles of job listings antiquated and insufficient to meet the needs of modern business. In like vein, job seekers may find current application processes of filling out cumbersome questionnaires and re-entering data multiple times to be ill matched for the pace of modern, mobile workforce.

As such, headhunters and job seekers alike may be embracive of a new approach to their respective needs.

BRIEF DESCRIPTION OF THE DRAWINGS

Appendices and/or drawings illustrating various, non-limiting, example, innovative aspects of the Search Extraction Matching, Draw Attention-Fit Modality, Application Morphing, and Informed Apply Apparatuses, Methods and Systems (hereinafter "SEMATFM-AMIA") disclosure, include:

FIG. 1 (sheets 1A-1F) shows a datagraph diagram illustrating embodiments for the SEMATFM-AMIA of functionality by which a user introducing a new job listing may receive resumes relevant to that job listing, by which the new job listing may be augmented in an automated fashion, and by which such new job listing may be stored.

FIG. 2 (sheets 2A-2G) shows a datagraph diagram illustrating embodiments for the SEMATFM-AMIA of functionality by which operations may be performed so as to present identified resumes in a fashion which may serve to draw attention to one or more relevant resume portions and/or aid resume presentation according to viewing modality.

FIG. 3 (sheets 3A-3D) shows a datagraph diagram illustrating embodiments for the SEMATFM-AMIA of functionality by which the language or presentation of a job seeker's resume may be altered so that such language better matches the language set forth by a job listing corresponding to a job to which the seeker desires to apply.

FIG. 4 (sheets 4A-4C) shows a datagraph diagram illustrating embodiments for the SEMATFM-AMIA of functionality by which one or more job seeker users may each receive a messaging dispatch (e.g., email) which serves to inform the seeker recipient of headhunter-selected job opportunities, and allows the seeker recipient to apply to those jobs, providing a cover letter in doing so.

FIG. 5 (sheets 5A-5C) shows a datagraph diagram illustrating embodiments for the SEMATFM-AMIA of functionality by which seeker replies to dispatched messages (e.g., emails), and operations may be performed to process such received replies including—with respect to each replying seeker—attaching that seeker and their stored resume as an applicant to each of the one or more job listings to which the seeker has indicated desire to apply.

FIG. 6 shows a logic flow diagram illustrating embodiments for the SEMATFM-AMIA of a server-performed process by which Y path normalized job titles and/or Y path normalized skills may be yielded.

FIG. 7 shows a logic flow diagram illustrating embodiments for the SEMATFM-AMIA of a server-performed process by which relevant resumes may be returned in view of specified X path normalized keywords, Y path normalized keywords, and Y path normalized titles, and by which a new job listing record may be stored.

FIG. 8 shows, for various embodiments of the SEMATFM-AMIA, an example user interface employable in presenting to a user (e.g., a recruiter user) providing a new job listing and one or more resumes which are potential good fits for that job listing.

FIG. 9 shows a logic flow diagram illustrating embodiments for the SEMATFM-AMIA of a server-performed process which acts in the pursuit of indexing a job listing.

FIG. 10 shows a logic flow diagram illustrating embodiments for the SEMATFM-AMIA of a further server-performed process which acts in the pursuit of indexing a job listing.

FIG. 11 shows a logic flow diagram illustrating embodiments for the SEMATFM-AMIA of a server-performed process by which yielded may be sparse resumes, to with resumes which include only relevant sections.

FIG. 12 shows a logic flow diagram illustrating embodiments for the SEMATFM-AMIA of a further server-performed process by which yielded may be sparse resumes, to with resumes which include only relevant sections.

FIG. 13 (sheets 13A-13C) shows a logic flow diagram illustrating embodiments for the SEMATFM-AMIA of a user device-performed process by which focused resume presentation may be provided.

FIG. 14 (sheets 14A-14C) shows a logic flow diagram illustrating embodiments for the SEMATFM-AMIA of a further user device-performed process by which focused resume presentation may be provided.

FIG. 15 shows, for various embodiments of the SEMATFM-AMIA, an example user interface employable in resume presentation.

FIG. 16 shows, for various embodiments of the SEMATFM-AMIA, a further example user interface employable in resume presentation.

FIG. 17 shows, for various embodiments of the SEMATFM-AMIA, a view employable in producing a pdf which offers focused presentation of a resume.

FIG. 18 (sheets 18A and 18B) shows a logic flow diagram illustrating embodiments for the SEMATFM-AMIA of a server-performed process by which resume language or presentation may be adjusted.

FIG. 19 shows, for various embodiments of the SEMATFM-AMIA, an example user interface employable in resume adjustment.

FIG. 20 (sheets 20A and 20B) shows a logic flow diagram illustrating embodiments for the SEMATFM-AMIA of a server-performed spawning and training process which supports adjustment of resume language.

FIG. 21 shows a logic flow diagram illustrating embodiments for the SEMATFM-AMIA of a further server-performed training process which supports adjustment of resume language.

FIG. 22 shows a logic flow diagram illustrating embodiments for the SEMATFM-AMIA of a server-performed spawning and training process which supports recognition of phrases within raw text.

FIG. 23 shows a logic flow diagram illustrating embodiments for the SEMATFM-AMIA of a further server-performed training process which supports recognition of phrases within raw text.

FIG. 24 shows a logic flow diagram illustrating embodiments for the SEMATFM-AMIA of a server-performed process which applies comma delimitation to phrases found in input.

FIG. 25 shows a logic flow diagram illustrating embodiments for the SEMATFM-AMIA of a server-performed process which handles a received seeker message (e.g., email), the received seeker message being responsive to a job opportunity-heralding message (e.g., email).

FIG. 26 shows, for various embodiments of the SEMATFM-AMIA, an example in-email-body user interface employable in allowing a user to apply to one or more messaging-heralded (e.g., email-heralded) job opportunities and to provide one or more cover letters in doing so.

FIG. 27 shows a screenshot illustrating embodiments of SEMATFM-AMIA operation by which a headhunter user may communicate with a job seeker user via instant messaging.

FIG. 28 shows a screenshot illustrating embodiments of SEMATFM-AMIA operation by which a headhunter user may perform operations including providing a new job listing, messaging job seekers, and advertising a job.

FIG. 29 shows a screenshot illustrating embodiments of SEMATFM-AMIA operation by which a headhunter user may provide a new job listing via entry.

FIG. 30 shows a screenshot illustrating embodiments of SEMATFM-AMIA operations including operations by which a headhunter user may perform operations including providing a new job listing, messaging job seekers, and advertising a job.

FIG. 31 shows a screenshot illustrating embodiments of SEMATFM-AMIA operations including operations by which a headhunter user may provide a job title of a being-introduced job listing and receive one or more suggested skills, titles, and/or locations for that new job listing.

FIG. 32 shows a screenshot illustrating embodiments of SEMATFM-AMIA operation by which yielded normalized job titles and/or normalized skills may be employed in prepopulating a job listing.

FIG. 33 shows a screenshot illustrating embodiments of SEMATFM-AMIA operations including operations by which a headhunter user may be presented with an indication of the match rate of candidates to requirements.

FIG. 34 shows a screenshot illustrating embodiments of SEMATFM-AMIA operation by which a headhunter user may review candidate job seekers.

FIG. 35 shows a screenshot illustrating embodiments of SEMATFM-AMIA operation by which a headhunter user may review job seeker user responses, select job seeker users which appear to be good fits for the at-hand job opportunity, move job seeker users forward in the at-hand hiring process, and/or to create and/or receive reports on Office of Federal Contract Compliance Programs (OFCCP) metrics.

FIG. 36 shows a screenshot illustrating embodiments of SEMATFM-AMIA operation by which a headhunter user may perform operations including advertising a job.

FIG. 37 shows a screenshot illustrating embodiments of SEMATFM-AMIA operation by which, in one aspect, a headhunter user may receive information regarding one or more campaigns for filling job openings.

FIG. 38 shows a screenshot illustrating embodiments of SEMATFM-AMIA operation by which a headhunter user may be provided with functionality including being able to view starred candidates, receive information regarding quantity of views and/or clicks for job listings, and/or receive information regarding quantity of views and/or clicks for campaigns.

FIG. 39 shows a screenshot illustrating embodiments of SEMATFM-AMIA operations including operations by which a headhunter user may be provided with functionality by which she may search for job seekers across multiple destinations, such destinations perhaps implementing some or all of the discussed-herein functionality.

FIG. 40 shows a screenshot illustrating embodiments of SEMATFM-AMIA operation by which a headhunter user may be provided with type-ahead functionality.

FIG. 41 shows a screenshot illustrating embodiments of SEMATFM-AMIA operation by which a headhunter user may be provided with candidate messaging capabilities.

FIG. 42 shows a screenshot illustrating embodiments of SEMATFM-AMIA operation by which a headhunter user may be able to view information regarding candidate job seeker users.

FIG. 43 shows a screenshot illustrating embodiments of SEMATFM-AMIA operation by which a headhunter user may be able to receive display of pipeline progress of a given seeker candidate.

FIG. 44 shows a screenshot illustrating embodiments of SEMATFM-AMIA operation by which a headhunter user may be able to receive display regarding one or more seeker candidates.

FIG. 45 shows a block diagram illustrating embodiments of a SEMATFM-AMIA controller.

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citation and/or reference numbers are not necessarily sequences but rather just example orders that may be rearranged and other orders are contemplated.

DETAILED DESCRIPTION

In a first aspect, SEMATFM-AMIA transforms inputs including new job listing introduction inputs, via SEMATFM-AMIA components (e.g., the conductor component, the resume view controller component, the XY paths handler component, the title handler component, the resume librarian component, and the job listing librarian component), into outputs including relevant resume outputs and/or augmented new job listing record outputs. It is noted that the terms "component" and "object" may be used interchangeably hereinthroughout.

In a second aspect, SEMATFM-AMIA transforms inputs including job listing introduction inputs and/or resume query inputs, via SEMATFM-AMIA components (e.g., the conductor component, the presenter component, the segmented resume helper component, the resume librarian component, and the job listing librarian component), into outputs including relevant portion attention-draw outputs regarding resumes and/or viewing modality-tailored outputs regarding resumes.

In a third aspect, SEMATFM-AMIA transforms inputs including job application inputs, resume inputs, and/or job listing inputs, via SEMATFM-AMIA components (e.g., the job application conductor component, the resume adjuster component, the resume raw norm correlator component, the job listing raw norm correlator component, and the resume librarian component), into outputs including adjusted resume outputs.

In a fourth aspect, SEMATFM-AMIA transforms inputs including headhunter-selected job seeker-job opportunity inputs, via SEMATFM-AMIA components (e.g., the reach UI component, the reach conductor component, the seeker resume proposed job listings librarian component, the reach emailer component, echo task component, and the mail task component), into outputs including email outputs which provide for job application and cover letter provision.

In a fifth aspect, SEMATFM-AMIA transforms inputs including seeker reply inputs and/or resume query inputs, via SEMATFM-AMIA components (e.g., email receipt conductor component, the email extractor component, and seeker resume proposed job listings librarian component), into outputs including job listing attachment outputs.

The SEMATFM-AMIA components, in various embodiments, implement advantageous technological features as set forth below.

INTRODUCTION

A headhunter seeking to introduce a new job listing may find it a challenge to formulate the content of such job listing so as, for instance, to be appropriately descriptive and/or to appropriately attract relevant talent. As such, there may be call that headhunters tasked with such job listing introduction be highly trained and/or experienced in the field of the job listing. Even then, such training and/or experience may be insufficient to rise to the task.

Moreover, viewing resumes on a headhunter device may prove challenging. With modern times there has been an increase in diversity of viewing devices, such diverse devices often differing greatly in, say, screen size. As such a resume may be presented in a way which is ill-fitting for the device at hand (e.g., a smartphone). Further, a headhunter may find it a challenge to quickly and/or accurately identify relevant portions of a resume.

What is more, diversity of language may lead to like things and/or scenarios being described using rather different language. As such it may arise that a job listing and a resume differ greatly in language yet are, in reality, suitable for one another. As one illustration, "mobile development" as a skill in a job listing may in reality be suitable for "Android experience" as a skill in a resume despite "mobile development" being linguistically dissimilar to "Android experience."

Moreover, from the headhunter perspective it may prove challenging to inform seekers of job opportunities in such a fashion that encourages those seekers to apply to such opportunities without, say, being dissuaded from doing so due to foreseen difficulty and/or time loss. From the seeker perspective, the details in a desctiption of job opportunities may appear so daunting a task as to encourage one to not apply, and/or to delay application and therefore risk opportunity loss.

That which is discussed herein innovates past the shortcomings including but not limited to those just discussed.

SEMATFM-AMIA

In one aspect, that which is set forth herein provides functionality by which a user introducing a new job listing may receive resumes relevant to that job listing, by which the new job listing may be augmented (e.g., with normalized skills/keywords, and/or normalized titles) in an automated fashion, and by which such new job listing may be stored.

In another aspect, that which is set forth herein provides functionality by which operations may be performed so as to present identified (e.g., flowing from new job listing provision or flowing from GUI specification) resumes (e.g., resumes along with corresponding relevancy scores) in a fashion which may serve to draw attention to one or more relevant resume portions and/or aid resume presentation according to viewing modality (e.g., smartphone versus pad versus desktop/laptop viewing).

In yet another aspect, that which is set forth herein provides functionality by which the language of a job seeker's resume may be altered so that such language better matches the language set forth by a job listing corresponding to a job to which the seeker desires to apply.

In an additional aspect, that which is set forth herein provides functionality by which one or more job seeker users may each receive an email which serves to inform the seeker recipient of headhunter-selected job opportunities, and allows the seeker recipient to apply to those jobs, providing a cover letter in doing so.

In a further aspect, that which is set forth herein provides functionality by which received may be seeker replies to job listing reach, and operations may be performed to process such received replies including—with respect to each replying seeker attaching that seeker as an applicant to each of the one or more job listings to which the seeker has indicated desire to apply.

The foregoing functionality as well as additional functionality will now be discussed in detail.

FIG. 1 shows a datagraph illustrating—according to one or more embodiments—functionality by which—as referenced—a user introducing a new job listing may receive resumes relevant to that job listing, by which the new job listing may be augmented (e.g., with normalized skills/keywords, and/or normalized titles) in an automated fashion, and by which such new job listing may be stored. With an eye towards that which is discussed herein, it is noted that such approach might, perhaps, be viewed as for instance involving in one aspect extraction operations (e.g., extraction operations which retrieve elements of a newly-introduced job listing), and in another aspect search and matching operations (e.g., search and matching operations which include consideration of relevancy). Accordingly, the approach might be coupled to the moniker search extraction matching (SEM).

Among that which is set forth in FIG. 1 are job listing-introducing user 101, conductor object 103, resume view controller object 105, XY paths handler object 107, title handler object 109, resume librarian object 111, job listing librarian object 113, and store(s) 115 (e.g., one or more databases). Conductor object 103 and resume view controller object 105 may operate at a job listing-introducing user client device (e.g., a smartphone, pad, and/or laptop) while objects 107-113 may operate at one or more servers. It is noted that, to facilitate discussion and decrease linguistic monotony, the terms "skills" and "keywords" may be used interchangeably hereinthroughout.

The process depicted in FIG. 1 may commence when job listing-introducing user 101 employs a user interface in indicating a desire to introduce a new job listing (phase 117). Associated with the user interface may be discussed-herein method resumesAndStoreForNewJobListing(_:) of conductor object 103, and such job introduction request by the user may cause activation of resumesAndStoreForNewJobListing(_:). Among the operations performed by resumesAndStoreForNewJobListing(_:) (phase 119) may be calling (phase 121) getUserJobListing( ) of the conductor object which in an aspect acts to perform operations including receiving (e.g., via upload or entry) the new job listing from the user (phase 123). Further among such operations is returning to its caller a to-be-discussed tuple corresponding to the new job listing (phase 125).

As is discussed in greater detail hereinbelow, two sets of normalized skills and one set of normalized keywords may be leveraged in, for instance, one or more of searching for resumes and associating normalized skills with an introduced job listing—X-path normalized skills, Y-path normalized skills, and Y-path normalized titles. According to one or more embodiments establishment of such X-path normalized skills may involve receiving selection from the job listing providing user. In keeping with this resumesAndStoreForNewJobListing(_:) may at phase 129 call discussed-herein method doXPathNormalizedSkillsBySelection( ) of the conductor object. Method doXPathNormalizedSkillsBySelection( ) may perform one or more discussed-herein operations (e.g., operations involving presenting a normalized skills selection GUI) to receive such X-path normalized skills selection from the user (phase 131, phase 133), and to provide to its caller a to-be-discussed string conveying x-path normalized skills elected by the user (phase 135).

Alternately or additionally, according to one or more embodiments establishment of such X-path normalized skills may leverage the user-provided job listing. In keeping with this resumesAndStoreForNewJobListing(_:) may call discussed-herein method doXPathNormalizedSkillsByJobListingText(_:) method of XY paths handler object 107 (phase 139) in such a fashion that provides the called method with a discussed-herein string providing one or more portions of the new job listing (e.g., a string providing a qualifications and duties portion of the newly-provided job listing). Taking such string providing one or more portions of the new job listing to be held in object theJobListingText, and bearing in mind that which is discussed herein with respect to butler objects, the call of phase 139 may involve an XML SOAP request in line with the following:

```
POST /ReceivingButlerForXYPathsHandler HTTP/1.1
Host: www.example.com
Content-Type: application/soap+xml; charset=utf-8
<?xml version="1.0"?>
<soap:Envelope xmlns:soap="http://www.w3.org/2003/05/soap-envelope">
    <soap:Body>
        <DoXPathNormalizedSkillsByJobListingText
    xmlns="http://www.example.com/doxpathnormalizedskillsbyjoblistingtext>
            <JobListingText> \(theJobListingText) </JobListingText>
        </DoXPathNormalizedSkillsByJobListingText>
    </soap:Body>
</soap:Envelope>
```

Among the discussed-herein operations performed by doXPathNormalizedSkillsByJobListingText(_:) (phase 141) may be selecting normalized keywords based on quality of fit between the user-provided job listing text which it receives and considered normalized keywords, with it being the case that method-selected normalized keywords are ones which provide sufficient quality of fit. As one illustration of quality of fit, suppose that the user-provided job listing text in part included "duties include the planning of projects," and did not, say, discuss meals or food. A normalized keyword "project planning" might be expected to provide better quality of fit with respect to the user-provided job listing text than would normalized keyword "meal planning" Such operations may involve accessing one or more stores (phase 142). Also among the operations performed by doXPathNormalizedSkillsByJobListingText(_:) may be returning to its caller (phase 143) the normalized keywords which it selects.

Subsequently, resumesAndStoreForNewJobListing(_:) may perform further discussed-herein operations including calling (phase 147) discussed-herein method stripTitle(_:) of title handler object 109 in a fashion that provides the called method with a string object which conveys the user-indicated title of the new listing. Taking such string object to possess the name jobListingTitle, and bearing in mind that which is discussed herein with respect to butler objects, the call of phase 147 may involve an XML SOAP request in line with the following:

further discussed-herein operations including calling (phase 155) discussed-herein method produceCombinatoriesFromTitle(_:) of title handler object 109 in a fashion that provides the called method with, for example, the strip-modified job listing title received via phase 151. Taking such strip-modified job listing title to be held in object strippedJobListingTitle, and bearing in mind that which is discussed herein with respect to butler objects, the call of phase 155 may involve an XML SOAP request in line with the following:

```
POST /ReceivingButlerForTitleHandler HTTP/1.1
Host: www.example.com
Content-Type: application/soap+xml; charset=utf-8
<?xml version="1.0"?>
<soap:Envelope xmlns:soap="http://www.w3.org/2003/05/soap-envelope">
  <soap:Body>
    <ProduceCombinatoriesFromTitle
xmlns="http://www.example.com/producecombinatoriesfromtitle">
      <Title> \(strippedJobListingTitle) </Title >
    </ProduceCombinatoriesFromTitle>
  </soap:Body>
</soap:Envelope>
```

As is discussed in greater detail herein, among the operations performed by produceCombinatoriesFromTitle(_:) (phase 157) may be yielding one or more alternatives corresponding to the title. In particular, such operations may, for example, involve subjecting the passed-in job listing title to one or more combinatory operations that yield from the job title the taken k at a time combinations for k=2 . . . the number of words in the passed-in title. As one illustration, for a passed-in job listing title of "java mobile developer" such combinatory operations may yield "java mobile," "java developer," "mobile developer," and "java mobile developer." Also among the operations performed by produceCombinatoriesFromTitle(_:) may be returning, via a string array object, the yielded title alternatives to its caller (phase 159).

```
POST /ReceivingButlerForTitleHandler HTTP/1.1
Host: www.example.com
Content-Type: application/soap+xml; charset=utf-8
<?xml version="1.0"?>
<soap:Envelope xmlns:soap="http://www.w3.org/2003/05/soap-envelope">
  <soap:Body>
    <StripTitle xmlns="http://www.example.com/striptitle>
      <Title> \(jobListingTitle) </Title>
    </StripTitle>
  </soap:Body>
</soap:Envelope>
```

As is discussed in greater detail herein, among the operations performed by stripTitle(_:) (phase 149) may be subjecting the passed-in job listing title to one or more whitelist and/or blacklist operations so as to yield a modified version of the job listing title (e.g., from which certain words such as city names and/or superlatives have been removed). Also among the operations performed by stripTitle(_:) may be returning the strip-modified job listing title to its caller (phase 151).

Subsequent to receiving such strip-modified job listing title, resumesAndStoreForNewJobListing(_:) may perform Subsequent to receiving such string array, resumesAndStoreForNewJobListing(_:) may perform further discussed-herein operations including calling (phase 163) discussed-herein method provideYPathNormalizedJobTitlesAndYPathNormalizedSkillsForInput(_:) method of XY paths handler object 107 in a fashion that provides the called method with, as an example, the string array received via phase 159. Taking such string array to be held in object titleCombinations, and bearing in mind that which is discussed herein with respect to butler objects, the call of phase 163 may involve an XML SOAP request in line with the following:

```
POST /ReceivingButlerForXYPathsHandler HTTP/1.1
Host: www.example.com
Content-Type: application/soap+xml; charset=utf-8
<?xml version="1.0"?>
<soap:Envelope xmlns:soap="http://www.w3.org/2003/05/soap-envelope">
   <soap:Body>
      <ProvideYPathNormalizedJobTitlesAndYPathNormalizedSkillsForInput
xmlns="http://www.example.com/provideypathnormalizedjobtitlesandypathnormalizedsk
illsforinput>
         <ForInput> \(titleCombinations) </ForInput>
      </ProvideYPathNormalizedJobTitlesAndYPathNormalizedSkillsForInput>
   </soap:Body>
</soap:Envelope>
```

As discussed in greater detail herein, among the operations performed by provideYPathNormalizediobTitlesAndYPathNormalizedSkillsForInput(_:) (phase 165) may to ply the passed-in job title text in one or more index-employing operations so as to yield Y-path normalized job titles and Y-path normalized skills. It is observed that such discussed-herein index-employing operations may include the discovery of already-existing job listings and the leveraging of those already-existing job listings in the Y-path normalized job titles and Y-path normalized skills selection. Such operations performed by provideYPathNormalizediobTitlesAndYPathNormalizedSkillsForInput(_:) may involve accessing one or more stores (phase 166). Also among the operations performed by provideYPathNormalizedJobTitlesAndYPathNormalizedSkillsForInput(_:) may be returning to its caller (phase 167) a to-be-discussed two component tuple which conveys, for instance, the Y-path normalized job titles and Y-path normalized skills yielded by provideYPathNormalizedJobTitlesAndYPathNormalizedSkillsForInput(_:).

Subsequently, resumesAndStoreForNewJobListing(_:) may perform further discussed-herein operations including creating from the tuple received via phase 167 two string arrays—a first string array corresponding to the tuple-provided Y-path normalized skills and a second string array corresponding to the tuple-provided Y-path normalized titles. As examples, the string array corresponding to the tuple-provided Y-path normalized skills may be named yPathNormalizedSkills and the string array corresponding to the tuple-provided Y-path normalized titles may be named yPathNormalizedTitles.

Further subsequently, resumesAndStoreForNewJobListing(_:) may act in the pursuit of providing to the user one or more resumes which appear to be good fits for the newly-introduced job listing. In keeping with this, resumesAndStoreForNewJobListing(_:) may at phase 171 call discussed-herein method returnResumesForXPathNormalizedKeywords(_: andYPathNormalizedKeywords: andYPathNormalizedTitles:) method of resume librarian object 111 in a fashion that provides the called method with firstly either the discussed-hereinabove X-path normalized skills elected by the user or the discussed-hereinabove X-path normalized skills obtained by leveraging the user-provided job listing (e.g., cast as a string array), secondly the noted string array corresponding to the tuple-provided Y-path normalized skills (e.g., named yPathNormalizedSkills), and thirdly the noted string array corresponding to the tuple-provided Y-path normalized titles (e.g., named yPathNormalizedTitles). Taking such resume X-path normalized skills/keywords to be held in object xPathNormalizedSkills, such Y-path normalized skills/keywords to be held in object yPathNormalizedSkills, and such Y-path normalized titles to be held in object yPathNormalizedTitles, and bearing in mind that which is discussed herein with respect to butler objects, the call of phase 171 may involve an XML SOAP request in line with the following:

```
POST /ReceivingButlerForResumeLibrarian HTTP/1.1
Host: www.example.com
Content-Type: application/soap+xml; charset=utf-8
<?xml version="1.0"?>
<soap:Envelope xmlns:soap="http://www.w3.org/2003/05/soap-envelope">
   <soap:Body>
<ReturnResumesForXPathNormalizedKeywordsAndYPathNormalizedKeywordsAndYPathNormali
zedTitles
xmlns="http://www.example.com/returnresumesforxpathnormalizedkeywordsandypathnorm
alizedkeywordsandypathnormalizedtitles>
         <XPathNormalizedKeywords> \(xPathNormalizedSkills)
      </XPathNormalizedKeywords>
         <AndYPathNormalizedKeywords> \(yPathNormalizedSkills)
      </AndYPathNormalizedKeywords>
         <AndYPathNormalizedTitles> \(yPathNormalizedTitles)
      </AndYPathNormalizedTitles>
</ReturnResumesForXPathNormalizedKeywordsAndYPathNormalizedKeywordsAndYPathNormal
izedTitles>
   </soap:Body>
</soap:Envelope>
```

As discussed in greater detail herein, among the operations performed by returnResumesForXPathNormalizedKeywords(_: andYPathNormalizedKeywords: andYPathNormalizedTitles:) (phase 173) may to ply the passed-in X-path normalized skills, Y-path normalized skills, and Y-path normalized titles in one or more index-employing operations so as to locate already-existing resumes which appear to be good fits for the newly-introduced job listing. Such operations performed by returnResumesForXPathNormalizedKeywords(_: andYPathNormalizedKeywords: andYPathNormalizedTitles:) may involve accessing one or more stores (phase 175). Also among the operations performed by returnResumesForXPathNormalizedKeywords(_: andYPathNormalizedKeywords: andYPathNormalizedTitles:) may be returning to its caller (phase 177) indication operation to be held in object theNrmKwd, such string providing the entirety of the job listing to be held in object theExtraData, and bearing in mind that which is discussed herein with respect to butler objects, the call of phase 187 may involve an XML SOAP request in line with the following:

```
POST /ReceivingButlerForJobListingLibrarian HTTP/1.1
Host: www.example.com
Content-Type: application/soap+xml; charset=utf-8
<?xml version="1.0"?>
<soap:Envelope xmlns:soap="http://www.w3.org/2003/05/soap-envelope">
    <soap:Body>
        <AddNewJobListingRecordForRawTtlAndRawKwdAndNrmTtlAndNrmKwdAndExtraData
xmlns="http://www.example.com/addnewjoblistingrecordforrawttlandrawkwdandnrmttlan
dnrmkwdandextradata>
            <ForRawTtl> \(theRawTtl) </ForRawTtl>
            <AndRawKwd> \(theRawKwd) </AndRawKwd>
            <AndNrmTtl> \(theNrmTtl) </AndNrmTtl>
            <AndNrmKwd> \(theNrmKwd) </AndNrmKwd>
            <AndExtraData> \(theExtraData) </AndExtraData>
        </AddNewJobListingRecordForRawTtlAndRawKwdAndNrmTtlAndNrmKwdAndExtraData>
    </soap:Body>
</soap:Envelope>
``` of such resumes which appear to be good fits. In particular, the method may do so by returning an array of FetchedResumeRecord objects, the class definition for SegmentedResume being set forth herein.

Subsequent to receiving such array of FetchedResumeRecord objects, resumesAndStoreForNewlobListing(_:) may perform further discussed-herein operations including causing job listing-introducing user 101 to receive display (e.g., via a discussed-herein GUI) regarding the one or more resumes which appear to be good fits (phase 185). Such operations may involve employ of a to-be-discussed resumeViewController object.

Further subsequently, resumesAndStoreForNewJobListing(_:) may perform discussed-herein operations so as to cause the newly-introduced job listing may be stored. Such operations may include calling (phase 187) discussed-herein method addNewJobListingRecordForRawTtl(_: andRawKwd: andNrmTtl: andNrmKwd: andExtraData:) method of job listing librarian object 113 in a fashion that provides the called method firstly with a string casting of the string array (e.g., reflecting the discussed combinatory operations) received via phase 159, secondly with the noted discussed-herein string providing one or more portions of the new job listing (e.g., a string providing a qualifications and duties portion of the newly-provided job listing), thirdly with a string casting of the discussed-above Y-path normalized titles, and fourthly with a string reflecting—depending on the embodiment—either the result of application of a discussed-herein intersect operation to the discussed-above X-path normalized skills and the discussed-above Y-path normalized skills, or the result of application of a discussed-herein union operation to the discussed-above X-path normalized skills and the discussed-above Y-path normalized skills. Then fifthly with a discussed-herein string object providing the entirety of the user-provided job listing (e.g., with the string object supplying a Base64 encoded string representing a pdf of the job listing). It is noted that the job listing may, as discussed herein, subsequent to being stored be subjected to indexing.

Taking such string casting of the string array received via phase 159 to be held in object theRawTtl, such string providing one or more portions of the new job listing (e.g., providing a qualifications and duties portion) to be held in object theRawKwd, such string casting of the Y-path normalized titles to be held in object theNrmTtl, such string reflecting the noted result of either an intersect or a union operation to be held in object theNrmKwd, such string providing the entirety of the job listing to be held in object theExtraData, and bearing in mind that which is discussed herein with respect to butler objects, the call of phase 187 may involve an XML SOAP request in line with the following:

Among the discussed-herein operations performed by addNewJobListingRecordForRawTtl(_: andRawKwd: andNrmTtl: andNrmKwd: andExtraData:) (phase 189) may be accessing one or more stores (191) so as to cause storage of the job listing provided by user 101.

As discussed herein, resumes along with corresponding relevancy scores may—flowing from new job listing provision or flowing from GUI specification—be identified. FIG. 2 shows a datagraph illustrating—according to one or more embodiments—functionality by which—as referenced—operations may be performed so as to present such identified resumes in a fashion which may serve to draw attention to one or more relevant resume portions and/or aid resume presentation according to viewing modality (e.g., smartphone versus pad versus desktop/laptop viewing). Such approach might be coupled to the moniker draw attention-fit modality (ATFM).

Among that which is set forth in FIG. 2 are user 201, conductor object 203, presenter object 205, segmented resume helper object 207, resume librarian object 209, and store(s) 213 (e.g., one or more databases). Conductor object 203 and presenter object 205 may operate at a user client device (e.g., a smartphone, pad, and/or laptop) while objects 207-213 may operate at one or more servers.

The process depicted in FIG. 2 may—according to a first scenario—commence when method startResumesViaUserQuery( ) of the conductor object performs operations (phase 215) including calling (phase 217) returnResumesViaUserQuery( ) of the conductor object, returnResumesViaUserQuery( ) being a method which takes no parameters. Method startResumesViaUserQuery( ) may be called flowing from the action of user 201 (e.g., the user may activate a GUI button, and such button activation may lead to the calling of startResumesViaUserQuery( )).

The process depicted in FIG. 2 may—according to a second scenario—commence when discussed-herein method resumesAndStoreForNewJobListing( ) of the conductor object performs operations (phase 225) including calling (phase 227) discussed-herein returnResumesForXPathNormalizedKeywords(_: andYPathNormalizedKeywords: AndYPathNormalizedTitles:) of the resume librarian object in a fashion that provides the called method with discussed-herein X-path normalized keywords, discussed-herein Y-path normalized keywords, and discussed-herein Y-path normalized titles. Taking such resume X-path normalized keywords to be held in object theXPathNormalizedKeywords, such Y-path normalized keywords to be held in object theYPathNormalizedKeywords, and such Y-path normalized titles to be held in object theYPathNormalizedTitles, and bearing in mind that which is discussed herein with respect to butler objects, the call of phase 227 may involve an XML SOAP request in line with the following:

Returning to the second scenario, among the discussed-herein operations performed (phase 229) by returnResumesForXPathNormalizedKeywords(_: andYPathNormalizedKeywords: AndYPathNormalizedTitles:) may be calling (phase 231) method returnRelevantSparseSegmentedResumesForDocNumScoreTupleArray(_: usingFieldInfoArray:) of the segmented resume helper object in a fashion that

```
POST /ReceivingButlerForResumeLibrarian HTTP/1.1
Host: www.example.com
Content-Type: application/soap+xml; charset=utf-8
<?xml version="1.0"?>
<soap:Envelope xmlns:soap="http://www.w3.org/2003/05/soap-envelope">
    <soap:Body>
<ReturnResumesForXPathNormalizedKeywordsAndYPathNormalizedKeywordsAndYPathNormali
zedTitles
xmlns="http://www.example.com/returnresumesforxpathnormalizedkeywordsandypathnorm
alizedkeywordsandypathnormalizedtitles>
        <XPathNormalizedKeywords> \(theXPathNormalizedKeywords)
</XPathNormalizedKeywords>
        <AndYPathNormalizedKeywords> \(theYPathNormalizedKeywords)
</AndYPathNormalizedKeywords>
        <AndYPathNormalizedTitles> \(theYPathNormalizedTitles)
</AndYPathNormalizedTitles>
</ReturnResumesForXPathNormalizedKeywordsAndYPathNormalizedKeywordsAndYPathNormal
izedTitles>
    </soap:Body>
</soap:Envelope>
```

Returning to the first scenario, among the discussed-herein operations performed (phase 219) by returnResumesViaUserQuery( ) may be receiving (phase 221) from user 201 (e.g., via a GUI) discussed-herein resume search query information including one or more Boolean queries and one or more corresponding field specifications. Also among the operations performed by returnResumesViaUserQuery( ) may be calling (phase 223) method returnRelevantSparseSegmentedResumesForDocNumScoreTupleArray(_: usingFieldInfoArray:) of the segmented resume helper object in a fashion that provides the called method with a discussed-herein tuple array received in reply to a discussed-herein call to rankForFieldInfoArray(_: andFieldJoiner:) and with a discussed-herein modified FieldInfo array which was passed in that call to rankForFieldInfoArray(_: andFieldJoiner:). Taking such tuple array to be held in object theTupleArray and taking such modified FieldInfo array to be held in object theModifiedFieldInfoArray, and bearing in mind that which is discussed herein with respect to butler objects, the call of phase 223 may involve an XML SOAP request in line with the following:

provides the called method with a discussed-herein tuple array received in reply to a discussed-herein call to rankForFieldInfoArray(_: andFieldJoiner:) and with a discussed-herein modified FieldInfo array which was passed in that call to rankForFieldInfoArray(_: andFieldJoiner:). Taking such tuple array to be held in object theTupleArray and taking such modified FieldInfo array to be held in object theModifiedFieldInfoArray, the call of phase 231 may involve an XML SOAP request in line with that discussed in connection with the XML SOAP request of phase 223.

Among the discussed-herein operations (see, for instance, FIG. 12) performed by returnRelevantSparseSegmentedResumesForDocNumScoreTupleArray(_: usingFieldInfoArray:) (phase 233) may be entering a discussed-herein for-in loop which sets forth operations including placing a call (phase 235) to returnRelevantSparseSegmentedResumeForDocNum(_: usingFieldInfoArray:) in a fashion that provides the called method with a resume document number which is presently being—as discussed hereinbelow—visited by the for-in loop and the array of FieldInfo objects received via the second parameter passed to returnRelevantSparseSegment-

```
POST /ReceivingButlerForSegmentedResumeHelper HTTP/1.1
Host: www.example.com
Content-Type: application/soap+xml; charset=utf-8
<?xml version="1.0"?>
<soap:Envelope xmlns:soap="http://www.w3.org/2003/05/soap-envelope">
    <soap:Body>
<ReturnRelevantSparseSegmentedResumesForDocNumScoreTupleArrayUsingFieldInfoArray
xmlns="http://www.example.com/returnrelevantsparsesegmentedresumesfordocnumscoret
uplearrayusingfieldinfoarray>
        <ForDocNumScoreTupleArray> \(theTupleArray) </ForDocNumScoreTupleArray>
        <UsingFieldInfoArray> \(theModifiedFieldInfoArray) </UsingFieldInfoArray>
</ReturnRelevantSparseSegmentedResumesForDocNumScoreTupleArrayUsingFieldInfoArray
>
    </soap:Body>
</soap:Envelope>
``` edResumesForDocNumScoreTupleArray(_: usingFieldInfoArray:). Taking such resume document number to be held in object theDocNum and such array of FieldInfo objects to be held in object theFieldInfoArray, and bearing in mind that which is discussed herein with respect to butler objects, the call of phase may involve an XML SOAP request in line with the following:

```
POST /ReceivingButlerForSegmentedResumeHelper HTTP/1.1
Host: www.example.com
Content-Type: application/soap+xml; charset=utf-8
<?xml version="1.0"?>
<soap:Envelope xmlns:soap="http://www.w3.org/2003/05/soap-envelope">
   <soap:Body>
     <ReturnRelevantSparseSegmentedResumeForDocNumUsingFieldInfoArray
xmlns="http://www.example.com/returnrelevantsparsesegmentedresumefordocnumusingfieldinfoarray>
       <ForDocNum> \(theDocNum) </ForDocNum>
       <UsingFieldInfoArray> \(theFieldInfoArray) </UsingFieldInfoArray>
     </ReturnRelevantSparseSegmentedResumeForDocNumUsingFieldInfoArray>
   </soap:Body>
</soap:Envelope>
```

Among the discussed-herein operations performed by returnRelevantSparseSegmentedResumeForDocNum(_: usingFieldInfoArray:) (phase 237) may be calling (phase 239) discussed-herein method returnXmlResumeRecordStringForDocNum(_:) of resume librarian object 209 in a fashion that provides the called method with the resume document number which was received by returnRelevantSparseSegmentedResumeForDocNum(_: usingFieldInfoArray:). Taking such resume document number to be held in object theDocNum, and bearing in mind that which is discussed herein with respect to butler objects, the call of phase 239 may involve an XML SOAP request in line with the following:

```
POST /ReceivingButlerForResumeLibrarian HTTP/1.1
Host: www.example.com
Content-Type: application/soap+xml; charset=utf-8
<?xml version="1.0"?>
<soap:Envelope xmlns:soap="http://www.w3.org/2003/05/soap-envelope">
   <soap:Body>
     <ReturnXmlResumeRecordStringForDocNum
xmlns="http://www.example.com/returnxmlresumerecordstringfordocnum>
        <ForDocNum> \(theDocNum) </ForDocNum>
     </ReturnXmlResumeRecordStringForDocNum>
   </soap:Body>
</soap:Envelope>
```

As is discussed in greater detail herein, among the operations performed by returnXmlResumeRecordStringForDocNum(_:) (phase 241) may be accessing one or more stores (phase 243) in pursuit of returning (phase 245) to its caller—that is to say returning to returnRelevantSparseSegmentedResumeForDocNum(_: usingFieldInfoArray:)—a string object providing an XML resume corresponding to the passed-in resume document number.

Subsequent to receiving such XML resume, returnRelevantSparseSegmentedResumeForDocNum(_: usingFieldInfoArray:) may perform further discussed-herein operations including calling (phase 247) discussed-herein method giveSegmentedResumeForXmlResumeRecordString(_:) of segmented resume helper object 207 in a fashion that provides the called method with the string object XML resume received via phase 245. Taking such XML resume to be held in object returnedXmlResumeRecordString, and bearing in mind that which is discussed herein with respect to butler objects, the call of phase 247 may involve an XML SOAP request in line with the following:

```
POST /ReceivingButlerForSegmentedResumeHelper HTTP/1.1
Host: www.example.com
Content-Type: application/soap+xml; charset=utf-8
<?xml version="1.0"?>
<soap:Envelope xmlns:soap="http://www.w3.org/2003/05/soap-envelope">
   <soap:Body>
     <GiveSegmentedResumeForXmlResumeRecordString
xmlns="http://www.example.com/givesegmentedresumeforxmlresumerecordstring>
        <ForXmlResumeRecordString> \(returnedXmlResumeRecordString)
</ForXmlResumeRecordString>
     </GiveSegmentedResumeForXmlResumeRecordString>
   </soap:Body>
</soap:Envelope>
```

As is discussed in greater detail herein, among the operations performed by giveSegmentedResumeForXmlResumeRecordString(_:) (phase 249) may be loading properties of a SegmentedResume object—the class definition for SegmentedResume being set forth herein—with corresponding XML tag-delimited data of the XML string passed to it (e.g., data of an XML string delimited by <docNum> and </docNum> may be loaded into the docNumString property of the SegmentedResume object). Also among the operations performed by giveSegmentedResumeForXmlResumeRecordString(_:) may be returning the loaded SegmentedResume object to its caller (phase 251).

Subsequent to receiving such SegmentedResume object, returnRelevantSparseSegmentedResumeForDocNum(_:usingFieldInfoArray:) may perform further discussed-herein operations including calling (phase 253) discussed-herein method giveRelevantFieldsForSegmentedResume(_: forFieldInfoArray:) of segmented resume helper object 207 in a fashion that provides the called method with the SegmentedResume object received via phase 251 and the FieldInfo array which was passed to returnRelevantSparseSegmentedResumeForDocNum(_: usingFieldInfoArray:). Taking such SegmentedResume object to be held in object fullSegmentedResume and such passed-in FieldInfo array to be held in object theFieldInfoArray, and bearing in mind that which is discussed herein with respect to butler objects, the call of phase 253 may involve an XML SOAP request in line with the following:

cussed-herein operations including employing the string array which was returned in response to the call to giveRelevantFieldsForSegmentedResume(_: forFieldInfoArray:) in formulating a corresponding SegmentedResume object which is made up of relevant resume portions. Such SegmentedResume object may then, at phase 259, be returned to the caller of returnRelevantSparseSegmentedResumeForDocNum(_: usingFieldInfoArray:) to with to returnRelevantSparseSegmentedResumesForDocNumScoreTupleArray(_: usingFieldInfoArray:).

As referenced above and as discussed herein, returnRelevantSparseSegmentedResumesForDocNumScoreTupleArray(_: usingFieldInfoArray:) may call returnRelevantSparseSegmentedResumeForDocNum(_: usingFieldInfoArray:) at 235 in connection with a for-in loop which visits each resume document number specified by the tuple array passed to returnRelevantSparseSegmentedResumesForDocNumScoreTupleArray(_: usingFieldInfoArray:). In particular, returnRelevantSparseSegmentedResumesForDocNumScoreTupleArray(_: usingFieldInfoArray:) may call returnRelevantSparseSegmentedResumeForDocNum(_: usingFieldInfoArray:) with respect to each document number visited by the for-in loop. As such, returnRelevantSparseSegmentedResumesForDocNumScoreTupleArray(_: usingFieldInfoArray:) may receive a sparse segmented resume of the sort discussed with respect to each resume specified by the tuple array and may append it to an array of SegmentedResume objects which may have the name relevantSpar-

```
POST /ReceivingButlerForSegmentedResumeHelper HTTP/1.1
Host: www.example.com
Content-Type: application/soap+xml; charset=utf-8
<?xml version="1.0"?>
<soap:Envelope xmlns:soap="http://www.w3.org/2003/05/soap-envelope">
   <soap:Body>
     <GiveRelevantFieldsForSegmentedResumeForFieldInfoArray
xmlns="http://www.example.com/giverelevantfieldsforsegmentedresumeforfieldinfoarray>
        <ForSegmentedResume> \(fullSegmentedResume) </ForSegmentedResume>
        <ForFieldInfoArray> \(theFieldInfoArray) </ForFieldInfoArray>
     </GiveRelevantFieldsForSegmentedResumeForFieldInfoArray>
   </soap:Body>
</soap:Envelope>
```

Among the operations performed by giveRelevantFieldsForSegmentedResume(_: forFieldInfoArray:) (phase 255) may be—as is discussed hereinbelow—formulating a string array which conveys those resume sections which are considered to be relevant resume sections. Also among the operations performed by giveRelevantFieldsForSegmentedResume(_: forFieldInfoArray:) may be returning such string array to its caller (phase 257).

Subsequently, returnRelevantSparseSegmentedResumeForDocNum(_: usingFieldInfoArray:) may perform disseSegmentedResumesToReturn. Method returnRelevantSparseSegmentedResumesForDocNumScoreTupleArray(_: usingFieldInfoArray:) may return that array of SegmentedResume objects, once fully loaded, to its caller. Such array may, for example be named relevantSparseSegmentedResumesToReturn)

In the case of the first scenario the caller of returnRelevantSparseSegmentedResumesForDocNumScoreTupleArray(_: usingFieldInfoArray:) may be returnResumesViaUserQuery( ) and as such it may be returnResumesViaUserQuery( ) which receives (phase 261) the noted array of SegmentedResume objects. In the case of the second scenario the caller of returnRelevantSparseSegmentedResumesForDocNumScoreTupleArray(_: usingFieldInfoArray:) may be returnResumesForXPathNormalizedKeywords(_: andYPathNormalizedKeywords: AndYPathNormalizedTitles:) and as such it may be returnResumesForXPathNormalizedKeywords(_: andYPathNormalizedKeywords: AndYPathNormalizedTitles:) which receives (phase 265) the noted array of SegmentedResume objects.

Considering the first scenario, it is noted that the return type of returnResumesViaUserQuery( ) may be [FetchedResumeRecord], that is to say an array of FetchedResumeRecord objects. As such returnResumesViaUserQuery( ) may perform one or more discussed-herein operations to ply the array of SegmentedResume objects which it receives in formulating an array of FetchedResumeRecord objects and returning (phase 263) that array to its caller, to with to startResumesViaUserQuery( ).

Considering the second scenario, it is noted that the return type of returnResumesForXPathNormalizedKeywords(_: andYPathNormalizedKeywords: AndYPathNormalizedTitles:) may likewise be [FetchedResumeRecord]. Further likewise returnResumesForXPathNormalizedKeywords(_: andYPathNormalizedKeywords: AndYPathNormalizedTitles:) may perform one or more discussed-herein operations to ply the array of SegmentedResume objects which it receives in formulating an array of FetchedResumeRecord objects and returning (phase 267) that array to its caller, namely resumesAndStoreForNewjobListing( ).

Considering the first scenario, startResumesViaUserQuery( ) may call (phase 269) discussed-herein method doFocusedResumePresentationForFetchedResumeRecordArray (_: andFieldInfoArray:) of presenter object 205, where the FetchedResumeRecord array received via phase 263 may be passed as the first parameter of the call and the at-hand FieldInfo array may be passed as the second parameter of the call Considering the second scenario, resumesAndStoreForNewJobListing( ) may call (phase 269) discussed-herein method doFocusedResumePresentationForFetchedResumeRecordArray(_: andFieldInfoArray:) method of presenter object 205, where the FetchedResumeRecord array received via phase 267 may be passed as the first parameter of the call and the at-hand FieldInfo array may be passed as the second parameter of the call.

Subsequently doFocusedResumePresentationForFetchedResumeRecordArray(_: andFieldInfoArray:) may perform one or more discussed-herein operations—for instance display which applies relevant highlighting and/or display which applies textual truncation—to present the at-hand resumes to user 201 (phase 271, phase 273) such that attention is drawn to one or more relevant resume portions and/or resume presentation is tailored according to viewing modality (e.g., smartphone versus pad versus desktop/laptop viewing).

FIG. 3 shows a datagraph illustrating—according to one or more embodiments—functionality by which—as referenced—the language of a job seeker's resume may be altered so that such language better matches the language set forth by a job listing corresponding to a job to which the seeker desires to apply. As such resume alteration may transpire in connection with application to a given job, the approach may be coupled to the moniker application-based resume morphing, or by the foreshortened moniker application morphing (AM).

Among that which is set forth in FIG. 3 are job seeker user 301, job application conductor object 303, resume adjuster object 305, resume raw norm correlator object 307, job listing raw norm correlator object 308 resume librarian object 309, and store(s) 311 (e.g., one or more databases). Job application conductor object 303 may operate at a job seeker client device (e.g., a smartphone, pad, and/or laptop) while objects 305-309 may operate at one or more servers.

The process depicted in FIG. 3 may commence when job seeker user 301 employs a user interface in indicating a desire to apply to a given job listing (phase 313). Associated with the user interface may be discussed-herein method applyToJob(_:) of job application conductor object 303, and such job application request by the seeker user may cause activation of applyToJob(_:). Among the operations performed by applyToJob(_:) (phase 315) may be calling (phase 317) startResumeAdjustmentForResumeWithRawKwds(_: andNormKwds: andJobListingWithRawKwds: andNormKwds:) of resume adjuster object 305 in a fashion that provides the called method with raw keywords sourced from the job seeker's resume, normalized keywords sourced from the job seeker's resume, raw keywords drawn from the job listing to which the seeker is applying, and normalized keywords sourced from the job listing to which the seeker is applying. Taking such resume raw keywords to be held in object theResumeRawKeywords, such resume normalized keywords to be held in object theResumeNormalizedKeywords, such job listing raw keywords to be held in object theJobListingRawKeywords, and such job listing normalized keywords to be held in object theJobListingNormalizedKeywords, and bearing in mind that which is discussed herein with respect to butler objects, the call of phase 317 may involve an XML SOAP request in line with the following:

```
POST /ReceivingButlerForResumeAdjuster HTTP/1.1
Host: www.example.com
Content-Type: application/soap+xml; charset=utf-8
<?xml version="1.0"?>
<soap:Envelope xmlns:soap="http://www.w3.org/2003/05/soap-envelope">
  <soap:Body>
<StartResumeAdjustmentForResumeWithRawKwdsAndNormKwdsAndJobListingWithRawKwdsAndN
ormKwds
xmlns="http://www.example.com/startresumeadjustmentforresumewithrawkwdsandnormkwd
sandjoblistingwithrawkwdsandnormkwds>
     <ResumeRawKwds> \(theResumeRawKeywords) </ResumeRawKwds>
     <ResumeNormKwds> \(theResumeNormalizedKeywords) </ResumeNormKwds >
     <JobListingRawKwds> \(theJobListingRawKeywords) </JobListingRawKwds>
     <JobListingNormKwds> \(theJobListingNormalizedKeywords)
</JobListingNormKwds>
</StartResumeAdjustmentForResumeWithRawKwdsAndNormKwdsAndJobListingWithRawKwdsAnd
```

```
NormKwds>
   </soap:Body>
</soap:Envelope>
```

Among the discussed-herein operations (see, for instance, FIG. 18) performed by startResumeAdjustmentForResumeWithRawKwds(_: andNormKwds: andJobListingWithRawKwds: andNormKwds:) (phase 319) may be formulating set commonNormKwdsSet which contains common-to-resume-and-job-listing normalized keywords. Also among the discussed-herein operations performed by startResumeAdjustmentForResumeWithRawKwds(_: andNormKwds: andJobListingWithRawKwds: andNormKwds:) may be calling (phase 321) discussed-herein method returnBucketsProvidingRawCorrelationsForNormWord(_: whereRawWordsAre: withThreshold:) of resume raw norm correlator object 307. The call may pass to returnBucketsProvidingRawCorrelationsForNormWord(_: whereRawWordsAre: withThreshold:) of the resume raw norm correlator object the an at-hand visited (e.g., via for-in loop) common-to-resume-and-job-listing normalized keyword of commonNormKwdsSet, a string array corresponding to the passed-in resume raw keywords, and a discussed-herein threshold. Taking such at-hand visited common-to-resume-and-job-listing normalized keyword of commonNormKwdsSet to be held in object commonNormKwd, such string array corresponding to the passed-in resume raw keywords to be held in object resumeRawKwdsArray, and such threshold to be held in object setThreshold, and bearing in mind that which is discussed herein with respect to butler objects, the call of phase 321 may involve an XML SOAP request in line with the following:

connection with phases 321-325 but with respect to job listing normalized keywords and job listing raw keywords rather than with respect to resume normalized keywords and resume raw keywords, with the call of phase 327 being made upon returnBucketsProvidingRawCorrelationsForNormWord(_: whereRawWordsAre: withThreshold:) of job listing raw norm correlator object 308.

Subsequently, startResumeAdjustmentForResumeWithRawKwds(_: andNormKwds: andJobListingWithRawKwds: andNormKwds:) may perform discussed-herein operations including formulating object crossoverArray which sets forth possible job listing raw keywords and possible resume raw keywords which may map to common-to-resume-and-job-listing normalized keywords. Further subsequently, startResumeAdjustmentForResumeWithRawKwds(_: andNormKwds: andJobListingWithRawKwds: andNormKwds:) may—as discussed herein—(e.g., via applyToJob(_:)) make job seeker user 301 aware of each of normalized keywords which are common to the resume and the job listing, inform the user of the corresponding raw keyword of the job listing, inform the user of the corresponding raw keyword of the resume, and offer the job seeker user the opportunity to swap in her resume the job listing raw keyword for the resume raw keyword (phase 333). The user may, as discussed herein, indicate (e.g., via applyToJob(_:)) acceptance or non-acceptance of such swapping offer (phase 335).

```
POST /ReceivingButlerForResumeRawNormCorrelator HTTP/1.1
Host: www.example.com
Content-Type: application/soap+xml; charset=utf-8
<?xml version="1.0"?>
<soap:Envelope xmlns:soap="http://www.w3.org/2003/05/soap-envelope">
   <soap:Body>
<ReturnBucketsProvidingRawCorrelationsForNormWordWhereRawWordsAreWithThreshold
xmlns="http://www.example.com/returnbucketsprovidingrawcorrelationsfornormwordwhe
rerawwordsarewiththreshold>
      <ForNormWord> \(commonNormKwd) </ForNormWord>
      <WhereRawWordsAre> \(resumeRawKwdsArray) </WhereRawWordsAre>
      <WithThreshold> \(setThreshold) </WithThreshold>
</ReturnBucketsProvidingRawCorrelationsForNormWordWhereRawWordsAreWithThreshold>
   </soap:Body>
</soap:Envelope>
```

As referenced above and as discussed herein, the call of phase 321 may be performed multiple times with each such call corresponding to a particular one of the common-to-resume-and-job-listing normalized keyword of commonNormKwdsSet. In response to being called returnBucketsProvidingRawCorrelationsForNormWord(_: whereRawWordsAre: withThreshold:) of resume raw norm correlator object 307 may perform one or more discussed-herein operations (phase 323). Among such operations may be formulating tuples which provide indications of those of the passed-in resume raw keywords which may map to the passed-in common-to-resume-and-job-listing normalized keyword, and returning the formulated tuples to its caller (phase 325).

Turning to phases 327-331, such phases may, as discussed herein, act in a fashion analogous to that discussed in Subsequent to such user indication, method startResumeAdjustmentForResumeWithRawKwds(_: andNormKwds: andJobListingWithRawKwds: andNormKwds:) may perform discussed-herein operations including formulating a string reflecting the job seeker user's alteration elections and returning such string to its caller, that is to say to method applyToJob(_:) (phase 337).

Having received such string, applyToJob(_:) may perform discussed-herein operations including calling (phase 339) addNewAdjustedResumeRecordBasedOnResumeRecordWithDocNum(_: usingAdjustedRawKwdString:) of resume librarian object 309 in a fashion that provides the called method with the document number of the at-hand seeker's resume, and also with the noted string reflecting the job seeker user's alteration elections. Taking such document number to be held in object theDocNum and such string reflecting the job seeker user's alteration elections to be held in object adjustedRawKwd, and bearing in mind that which is discussed herein with respect to butler objects, the call of phase 339 may involve an XML SOAP request in line with the following:

```
POST /ReceivingButlerForResumeLibrarian HTTP/1.1
Host: www.example.com
Content-Type: application/soap+xml; charset=utf-8
<?xml version="1.0"?>
<soap:Envelope xmlns:soap="http://www.w3.org/2003/05/soap-envelope">
   <soap:Body>
<AddNewAdjustedResumeRecordBasedOnResumeRecordWithDocNumUsingAdjustedRawKwdString
xmlns="http://www.example.com/addnewadjustedresumerecordbasedonresumerecordwithdo
cnumusingadjustedrawkwdstring>
      <WithDocNum> \(theDocNum) </WithDocNum>
      <UsingAdjustedRawKwdString> \(adjustedRawKwd) </UsingAdjustedRawKwdString>
</AddNewAdjustedResumeRecordBasedOnResumeRecordWithDocNumUsingAdjustedRawKwdStrin
g>
   </soap:Body>
</soap:Envelope>
```

Among the discussed-herein operations performed by addNewAdjustedResumeRecordBasedOnResumeRecord-WithDocNum(_: usingAdjustedRawKwdString:) (phase 341, phase 343) may be—as discussed herein—retrieving the ResumeEntity record corresponding to the passed-in resume document and further creating a new AdjustedResumeEntity record which reflects the job seeker user's alteration elections.

FIG. 4 shows a datagraph illustrating—according to one or more embodiments—functionality by which—as referenced—one or more job seeker users may each receive a messaging dispatch (e.g., an email) which serves to inform the seeker recipient of headhunter-selected job opportunities, and allows the seeker recipient to apply to those jobs, providing a cover letter in doing so. Such approach might be coupled to the moniker informed apply (IA).

Among that which is set forth in FIG. 4 are headhunter user 401, reach UI object 403, reach conductor object 405, seeker resume proposed job listings librarian object 407, reach emailer object 409, echo task object 411, mail task object 413, and seeker device 415. Reach UI object 403 may operate at a headhunter client device (e.g., a smartphone, pad, and/or laptop) while objects 405-415 may operate at one or more servers. Seeker device 415 may, say, be smartphone, pad, and/or laptop.

The process depicted in FIG. 4 may commence when headhunter user 401 employs a user interface in specifying one or more such job seekers and one or more such jobs, and further in requesting that dispatch of such emails occur (phase 417). Associated with the user interface may be discussed-herein method doStartSeekerJobListingReach(_:) of reachUi object 403, and such request by the headhunter user may cause activation of doStartSeekerJobListingReach (_:). Among the operations performed by doStartSeekerJobListingReach(_:) (phase 419) may be calling (phase 421) reachEachOfSeekers(_: withJobListings:) of reach conductor object 405 in a fashion that provides the called method with seeker information and job listing information obtained from the headhunter user. Taking such seeker information to be held in object chosenSeekers and such job listing information to be held in object chosenJobListings, and bearing in mind that which is discussed herein with respect to butler objects, the call of phase 421 may involve an Extensible Markup Language (XML) Simple Object Access Protocol (SOAP) request in line with the following:

```
POST /ReceivingButlerForReachConductor HTTP/1.1
Host: www.example.com
Content-Type: application/soap+xml; charset=utf-8
<?xml version="1.0"?>
<soap:Envelope
xmlns:soap="http://www.w3.org/2003/05/soap-envelope">
   <soap:Body>
      <ReachEachOfSeekersWithJobListings
xmlns="http://www.example.com/reacheachofseekerswithjoblistings>
         <Seekers> \(chosenSeekers) </Seekers>
         <WithJobListings> \(chosenJobListings) </WithJobListings>
      </ReachEachOfSeekersWithJobListings>
   </soap:Body>
</soap:Envelope>
``` where the employ of a backslash and parentheses in connection with a variable name serves to insert the value of that variable into the XML string.

Among the discussed-herein operations performed by reachEachOfSeekers(_: withJobListings:) (phase 423) may be calling (phase 425) discussed-herein method uuidKeyAndDictStoreForSeekerResumeUuid(_: andProposedJobListingUuids:) of the seekerResumeProposedJobListingsLibrarian object (407). The call may pass to uuidKeyAndDictStoreForSeekerResumeUuid(_: andProposedJobListingUuids:) the Universally Unique Identifier (UUID) of the resume of a particular headhunter-specified job seeker along with job listing UUIDs relating to job opportunities specified by the headhunter for that seeker. Taking such job seeker UUID to be held in object theSeekerResumeUuid and such job listing UUIDs to be held in object theProposedJobListingUuids, and bearing in mind that which is discussed herein with respect to butler objects, the call of phase 425 may involve an XML SOAP request in line with the following:

```
POST /ReceivingButlerForSeekerResumeProposedJobListingsLibrarian HTTP/1.1
Host: www.example.com
Content-Type: application/soap+xml; charset=utf-8
<?xml version="1.0"?>
```

```
<soap:Envelope xmlns:soap="http://www.w3.org/2003/05/soap-envelope">
   <soap:Body>
      <UuidKeyAndDictStoreForSeekerResumeUuidAndProposedJobListingUuids
xmlns="http://www.example.com/uuidkeyanddictstoreforseekerresumeuuidandproposedjo
blistinguuids>
         <SeekerResumeUuid> \(theSeekerResumeUuid) </SeekerResumeUuid>
         <AndProposedJobListingUuids> \(theProposedJobListingUuids)
</AndProposedJobListingUuids>
      </UuidKeyAndDictStoreForSeekerResumeUuidAndProposedJobListingUuids>
   </soap:Body>
</soap:Envelope>
```

As discussed herein the call of phase 425 may be performed multiple times with each such call corresponding to a particular one of the headhunter-specified job seekers. In response to being called uuidKeyAndDictStoreForSeekerResumeUuid(_: andProposedJobListingUuids:) may perform one or more discussed-herein operations (phase 427). Among such operations may be generating a new UUID, storing the received seeker resume UUID and the received proposed job listing UUIDs in a dictionary, and returning the generated UUID to its caller (phase 429).

Further among the operations performed by reachEachOfSeekers(_: withJobListings:) may be calling (phase 431) discussed-herein method sendEmailToSeeker(_: regardingJobListings: withUuidKey:) of the reach emailer object. Passed in the call may be discussed-herein information regarding the at-hand seeker, discussed-herein information regarding the at-hand job listings, and the UUID received via phase 429. Taking such seeker information to be held in object theSeeker, such job listing information to be held in object theJobListings, and such received UUID to be held in object theUuidKey, and bearing in mind that which is discussed herein with respect to butler objects, the call of phase 425 may involve an XML SOAP request in line with the following:

to which the cover letter may correspond, and press a "send" button associated with the executable code to apply to the selected jobs with the entered cover letter). Also among the operations performed by sendEmailToSeeker(_: regardingJobListings: withUuidKey:) may be configuring (phase 435) echo task 411, configuring (phase 437) mail task 413, launching the echo task (phase 439), and launching the mail task (phase 443). As discussed in greater detail herein, such configuration includes setting the echo task when launched to pass (phase 441) the noted constructed email body to the mail task. The mail task may perform discussed-herein operations (phase 445) including causing the constructed email to be dispatched to its recipient (phase 447).

FIG. 5 shows a datagraph illustrating—according to one or more embodiments—functionality by which—as referenced—received may be seeker replies to the dispatched emails of FIG. 4, and operations may be performed to process such received replies including—with respect to each replying seeker attaching that seeker as an applicant to each of the one or more job listings to which the seeker has indicated desire to apply. Among that which is set forth in FIG. 5 are seeker device 501 (e.g., a smartphone, pad, and/or laptop), mail application 503, FSEvents process and mail save directory 505, email receipt conductor object 507,

```
POST /ReceivingButlerForReachEmailer HTTP/1.1
Host: www.example.com
Content-Type: application/soap+xml; charset=utf-8
<?xml version="1.0"?>
<soap:Envelope xmlns:soap="http://www.w3.org/2003/05/soap-envelope">
   <soap:Body>
      <SendEmailToSeekerRegardingJobListingWithUuidKey
xmlns="http://www.example.com/sendemailtoseekerregardingjoblistingwithuuidkey>
         <ToSeeker> \(theSeeker) </ToSeeker>
         <RegardingJobListings> \(theJobListings) </RegardingJobListings>
         <WithUuidKey> \(theUuidKey) </WithUuidKey>
      </SendEmailToSeekerRegardingJobListingWithUuidKey>
   </soap:Body>
</soap:Envelope>
```

As discussed herein the call of phase 431 may be performed multiple times with each such call corresponding to a particular one of the headhunter-specified job seekers.

In response to being called sendEmailToSeeker(_: regardingJobListings: withUuidKey:) may perform one or more discussed-herein operations (phase 433). Among such operations may be constructing an email having properties including a to line which reflects the email address of the at-hand seeker, and a body which conveys the at-hand job listings and invites the seeker to apply to one or more of the job listings where the user provides a cover letter in doing so. Further properties of the constructed email are discussed herein (e.g., the email may set forth executable code—say JavaScript—which allows the user to compose a cover letter, select one or more of the at-hand job opportunities as ones email extractor object 509, seeker resume proposed job listings librarian object 511, and store(s) 513 (e.g., one or more databases). Elements 503-511 may, for instance, operate at one or more servers.

The process depicted in FIG. 5 may commence when email receipt conductor method watchForNewEmails( ) is launched (e.g., via an applicationDidFinishLaunching(_:) method) (phase 515). Subsequently a reply to an email of the sort discussed in connection with FIG. 4 may be dispatched (phase 517) by seeker device 501 and received by mail application 503. As discussed herein, mail application 503 may, in response to receiving such a reply email, perform operations including saving the reply email to a particular directory (phase 519, phase 521). The FSEvents process of 505 may perform discussed-herein operations (phase 523)

including recognizing the addition of the reply email to the directory and making email receipt conductor method watchForNewEmails( ) aware of the new email (phase 525).

Responsive to being made aware of the new email, watchForNewEmails( ) may perform one or more discussed-herein operations including calling (phase 527) processReceivedSeekerEmailWithPathFileName(_:) of email receipt conductor object 507 in a fashion that provides the called method with the full file path, cast as a string, of the new email Taking such full file path cast as a string to be held in object theFilePathAsString, and bearing in mind that which is discussed herein with respect to butler objects, the call of phase 527 may involve an XML SOAP request in line with the following:

```
POST /ReceivingButlerForEmailReceiptConductor HTTP/1.1
Host: www.example.com
Content-Type: application/soap+xml; charset=utf-8
<?xml version="1.0"?>
<soap:Envelope xmlns:soap="http://www.w3.org/2003/05/soap-envelope">
   <soap:Body>
     <ProcessReceivedSeekerEmailWithPathFileName
xmlns="http://www.example.com/processreceivedseekeremailwithpathfilename>
         <PathFileName> \(theFilePathAsString) </PathFileName>
     </ProcessReceivedSeekerEmailWithPathFileName>
   </soap:Body>
</soap:Envelope>
```

Among the discussed-herein operations performed by processReceivedSeekerEmailWithPathFileName(_:) (phase 529) may be loading into a string object the contents of the new email, and calling (phase 531) discussed-herein method returnUuidKeyFromSubjectAndCoverLetterViaBodyFromEmail(_:) of the email extractor object. The call may pass to returnUuidKeyFromSubjectAndCoverLetterViaBodyFromEmail(_:) the noted string object holding the contents of the new email. Taking such string object to possess the name stringOfEmail, and bearing in mind that which is discussed herein with respect to butler objects, the call of phase 531 may involve an XML SOAP request in line with the following:

```
POST /ReceivingButlerForEmailExtractor HTTP/1.1
Host: www.example.com
Content-Type: application/soap+xml; charset=utf-8
<?xml version="1.0"?>
<soap:Envelope xmlns:soap="http://www.w3.org/2003/05/soap-envelope">
   <soap:Body>
      <returnUuidKeyFromSubjectAndCoverLetterViaBodyFromEmail
xmlns="http://www.example.com/returnuuidkeyfromsubjectandcoverletterviabodyfromemail>
        <FromEmail> \(stringOfEmail) </FromEmail>
      </returnUuidKeyFromSubjectAndCoverLetterViaBodyFromEmail>
   </soap:Body>
</soap:Envelope>
```

Among the discussed-herein operations performed by returnUuidKeyFromSubjectAndCoverLetterViaBodyFromEmail(_:) (phase 533) may be extracting from the passed-in string corresponding to the new email a discussed-herein key set forth by the subject line of the email and also a discussed-herein cover letter set forth by the new email Method returnUuidKeyFromSubjectAndCoverLetterViaBodyFromEmail(_:) may return such extracted key and cover letter to its caller (phase 535).

Method processReceivedSeekerEmailWithPathFileName(_:) may subsequently call (phase 537) discussed-herein method returnSeekerResumeIdAndProposediobListingIdsForUuidKey(_:) of the seeker resume proposed job listings librarian object. The call may pass to returnSeekerResumeIdAndProposedJobListingIdsForUuidKey(_:)) the key discussed in connection with phase 533. Taking such key to be held in object receivedEmailUuidKey, and bearing in mind that which is discussed herein with respect to butler objects, the call of phase 537 may involve an XML SOAP request in line with the following:

```
POST /ReceivingButlerForSeekerResumeProposedJobListingsLibrarian HTTP/1.1
Host: www.example.com
Content-Type: application/soap+xml; charset=utf-8
<?xml version="1.0"?>
<soap:Envelope xmlns:soap="http://www.w3.org/2003/05/soap-envelope">
   <soap:Body>
      <ReturnSeekerResumeIdAndProposedJobListingIdsForUuidKey
xmlns="http://www.example.com/returnseekerresumeidandproposedjoblistingidsforuuid
key>
         <UuidKey> \(receivedEmailUuidKey) </UuidKey>
      </ReturnSeekerResumeIdAndProposedJobListingIdsForUuidKey>
   </soap:Body>
</soap:Envelope>
```

Among the discussed-herein operations performed by returnSeekerResumeIdAndProposedJobListingIdsForUuidKey(_:) (phase 539) may be obtaining the seeker resume UUID and the job listing UUIDs which correspond to the passed-in key, where the job listing UUIDs correspond to headhunter-selected job opportunities. Further among such discussed-herein operations may be returning (phase 541) such seeker resume UUID and job listing UUIDs to the caller of returnSeekerResumeIdAndProposedJobListingIdsForUuidKey(_:).

Having received the dispatch of phase 541, processReceivedSeekerEmailWithPathFileName(_:) may perform one or more discussed-herein operations to attach the at-hand job seeker as an applicant to each of the one or more at-hand job listings to which the seeker indicated desired to apply via her reply email, such attachment including—as discussed in greater detail hereinbelow—the creation of a corresponding JobApplicationEntity record (phase 543).

According to one or more embodiments, a conductor object—the conductor object being an instantiation of a Conductor class—may have methods including resumesAndStoreForNewJobListing(_:). Such method may have the declaration:

func resumesAndStoreForNewJobListing(_sender: AnyObject)

As such the declaration indicates that the method may take a first parameter of type AnyObject, the first parameter having the local parameter name sender and no external parameter name. Also indicated by the declaration is that the method may have no return value. The method may be activated in response to a user expressing a desire to introduce a new job listing—say in response to the user activating a button or other GUI element (e.g., the method may be set forth as an action method called when the user activates an instantiated UIButton).

The method may in one aspect call a to be discussed getUserJobListing( ) method of the conductor object which in an aspect acts to receive (e.g., via upload or entry) the new job listing from the user. In response to the call the resumesAndStoreForNewJobListing(_:) method may receive a to-be-discussed tuple whose first tuple component is a first string providing the title of the new listing, whose second tuple component is a string array setting forth additional portions of the job listing, and whose third tuple component is a second string which may set forth a Base64 string-encoded version of the entire job listing (e.g., a base 64 encoded string representing an uploaded pdf file of the job listing). The resumesAndStoreForNewJobListing(_:) method may store the first component of the returned tuple in a jobListingTitle string property of the conductor object, the second tuple component of the returned tuple in a jobListingBalance string array property of the conductor object, and may store the third tuple component of the returned tuple in a jobListingExtraData string property of the conductor object.

According to one or more embodiments two sets of normalized skills may be leveraged in, for instance, one or more of searching for resumes and associating normalized skills with an introduced job listing. To facilitate discussion, one of these sets of normalized skills may referred to as the X-path normalized skills while the other of these sets of normalized skills may be referred to as the Y-path normalized skills.

According to certain embodiments establishment of such X-path normalized skills may involve receiving selection from the job listing providing user. According to other embodiments establishment of such X-path normalized skills may leverage the user-provided job listing. Where X-path normalized skills establishment involves such selection by the user, resumesAndStoreForNewJobListing(_:) may call a to-be-discussed doXPathNormalizedSkillsBySelection( ) method of the conductor object. Received in response to the call may be a to-be-discussed string conveying x-path normalized skills elected by the user. The resumesAndStoreForNewJobListing(_:) method may store the received string in a xPathNormalizedSkills string property of the conductor object. Where X-path normalized skills establishment includes such leveraging of the user-provided job listing, resumesAndStoreForNewJobListing(_:) may call a to-be-discussed doXPathNormalizedSkillsByJobListingText(_:) method of a xYPathsHandler object, passing as the sole parameter—with an eye to that which is discussed hereinbelow—a string element of the noted jobListingBalance property which holds a qualifications and duties portion of the newly-provided job listing (e.g., element [3] of the property may be passed). Received in response to the call may be a to-be-discussed string conveying X-path normalized skills yielded by leveraging the job listing. The resumesAndStoreForNewJobListing(_:) method may store the received string in the noted xPathNormalizedSkills property.

According to one or more embodiments, and as is discussed in greater detail herein, the user-provided job title may be subjected to one or more whitelist and/or blacklist operations. For embodiments where such whitelist and/or blacklist operations are applied, resumesAndStoreForNewJobListing(_:) may call a to-be-discussed stripTitle(_:) method of a titleHandler object, passing as the sole parameter of the call the noted jobListingTitle property of the conductor object. Received in response to the call may be a modified version of the title from which, for example, certain words such as city names and/or superlatives have been removed. The resumesAndStoreForNewJobListing(_:) method may store the received string in a strippedJobListingTitle property of the conductor object.

The user-provided job title may, according to one or more embodiments and as discussed in greater detail hereinbelow, be subjected to one or more combinatory operations which as will be discussed yield one or more alternatives corresponding to the title. For embodiments where such combinatory operations are applied, resumesAndStoreForNewJobListing(_:) may call a to-be-discussed produceCombinatoriesFromTitle(_:) method of the titleHandler object. For certain embodiments, passed as the sole parameter of the call may be the noted jobListingTitle property of the conductor object. For other embodiments passed as the sole parameter of the call may be the noted strippedJobListingTitle property of the conductor object. Received in response to the call may be a string array providing the noted alternatives. Where passed as the sole parameter is the jobListingTitle property the alternatives may correspond to the user-provided job listing title sans whitelist or blacklist operations. Where passed as the sole parameter is the strippedJobListingTitle property the alternatives may correspond to the user-provided job title as subjected to the blacklist and/or whitelist operations. The resumesAndStoreForNewJobListing(_:) method may store the received string array in a titleCombinations string array property of the conductor object.

As discussed in greater detail hereinbelow, various discussed-herein operations involve Y-path normalized skills and Y-path normalized titles. As such, resumesAndStoreForNewlobListing(_:) may call to-be-discussed provideYPathNormalizedJobTitlesAndYPathNormalizedSkillsForInput(_:) method of the xYPathsHandler object, passing as the sole parameter—depending on the embodiments—either the jobListingTitle string property cast as a single element string array, the strippedJobListingTitle property cast as a single element string array, or the titleCombinations string array property. Received in response to the call may be a to-be-discussed two component tuple, each tuple component of which provides a to-be-discussed array of tuples. As discussed in greater detail herein, resumesAndStoreForNewJobListing(_:) may act to create from the returned tuple two string arrays, one of which may be stored in a yPathNormalizedSkills string array property of the conductor object and one which may be stored in a yPathNormalizedTitles string array property of the conductor object.

As discussed in greater detail hereinbelow, according to one or more embodiments one or more resumes, which appear to be good fits for the newly-introduced job listing, may be yielded prior to storage and/or indexing of that newly-introduced job listing. As such, resumesAndStoreForNewlobListing(_:) may call a to-be-discussed returnResumesForXPathNormalizedKeywords(_: andYPathNormalizedKeywords: andYPathNormalizedTitles:) method of a resumeLibrarian object, passing as the first parameter of the call noted xPathNormalizedSkills string property cast as a string array (e.g., by calling componentsSeparatedByString (",") on that property), passing as the second parameter of the call the noted yPathNormalizedSkills string array property, and passing as the third parameter of the call the noted yPathNormalizedTitles string array property. Received in response to the call may be a to-be-discussed array of objects of type FetchedResumeRecord (i.e., a [FetchedResumeRecord] array), the FetchedResumeRecord class definition being discussed hereinbelow. The resumesAndStoreForNewJobListing(_:) method may store the received [FetchedResumeRecord] array in a receivedResumes [FetchedResumeRecord] property of the conductor object. It is noted that, to facilitate discussion, the terms "skills" and "keywords" may be used interchangeably hereinthroughout.

According to one or more embodiments and as is discussed in greater detail hereinbelow, the noted resumes which appear to be good matches for the newly-introduced job listing may be displayed to the user introducing that job listing. As such, resumesAndStoreForNewJobListing(_:) may set a to-be-discussed resumesArray property of a to-be-discussed resumeViewController object (e.g., code in line with the pseudocode resumeViewController.resumesArray=receivedResumes may be employed). Furthermore resumesAndStoreForNewJobListing(_:) may cause display of a to-be-discussed view associated with resumeViewController (e.g., with such view display request involving resumesAndStoreForNewlobListing(_:) calling presentViewController(_: animated: completion:) on a view controller corresponding to a presently-displayed view where resumeViewController is passed as the first parameter, true is passed as the second parameter, and nil is passed as the third parameter such third parameter passage indicating that no completion handler is desired). The display of such view associated with resumeViewController may, for example, cause calling of a to-be-discussed viewDidLoad( ) method of resumeViewController and resume display to the job-listing-providing-user.

According to one or more embodiments, and as is discussed in greater detail hereinbelow, the newly-introduced job listing may be stored. It is noted that—as discussed herein—the job listing may subsequent to being stored be subjected to indexing (e.g., a method doIndexing( ) may be periodically called and may act to index all new job listings which have been newly saved and/or uploaded since the last calling of the method, and/or a doIndexing( ) may be called in response to the saving and/or upload of a job listing, doIndexing( ) acting to index that job listing). In keeping with this, resumesAndStoreForNewlobListing(_:) may call a to-be-discussed addNewJobListingRecordForRawTtl(_: andRawKwd: andNrmTtl: andNrmKwd: andExtraData:) method of a to-be-discussed jobListingLibrarian object.

Passed as the first parameter may, as a first example, be the jobListingTitle string property of the conductor object. Such passage may result in the new job listing record setting forth for its rawTtl field the as-user-provided job title of the newly-introduced job listing sans being subjected to the discussed-herein blacklist and/or whitelist operations. As a second example, passed for the first parameter may be the strippedJobListingTitle property of the conductor object. Such passage may result in the new job listing record setting forth for its rawTtl field the as-user-provided job title of the newly-introduced job listing as subjected to the discussed herein blacklist and/or whitelist operations. As a third example, passed for the first parameter may be the titleCombinations string array property of the conductor object cast as a string (e.g., via calling joinWithSeparator(",") on the property, thusly yielding a comma-delimited string). Such passage may result the new job listing record setting forth as its rawTtl field—in view of that which is discussed hereinabove—either the as-user-provided job title sans being subjected to the discussed herein blacklist and/or whitelist operations but as subjected to the discussed herein combinatory operations, or the as-user-provided job title as subject to the discussed herein blacklist and/or whitelist operations and as further subjected to the discussed herein combinatory operations.

Passed for the second parameter may be the element of the jobListingBalance property of the conductor object which sets forth the qualifications and duties subportion of the newly-provided job listing (e.g., element [3] of the job- ListingBalance property). Such passage may result in the new job listing record setting forth as its rawKwd field the qualifications and duties subportion of the newly-introduced job listing.

Turning to the third parameter, passed for the third parameters may be the yPathNormalizedTitles string array property of the controller object cast as a string (e.g., via calling joinWithSeparator(",") on the property, thereby yielding a comma-delimited string). Such passage may result in the new job listing record setting forth as its nrmTtl field the discussed-herein Y-path normalized titles.

As the fourth parameter, passed may be—depending on the embodiment—either a string reflecting the application of an intersect operation to that which is set forth by the xPathNormalizedSkills string property of the conductor object and that which is set forth by the yPathNormalized-Skills string array property of the conductor object, or reflecting the application of a union operation to that which is set forth by the xPathNormalizedSkills property of the conductor object and that which is set forth by the yPath-NormalizedSkills property of the conductor object.

For embodiments where an intersect operation is employed and embodiments where a union operation is employed, code in line with the following pseudocode may be set forth:

```
var arrayOfXPathNormalizedSkills =
xPathNormalizedSkills.componentsSeparatedByString(",")
var setOfXPathNormalizedSkills = Set(arrayOfXPathNormalizedSkills)
var setOfYPathNormalizedSkills = Set(yPathNormalizedSkills)
Then, for embodiments where an intersect operation is employed the to-be-passed
string may be set forth via code in line with the pseudocode:
var intersectionXYNormalizedSkillsSet =
setOfXPathNormalizedSkills.intersect(setOfYPathNormalizedSkills)
var intersectionStringToPass: String =
intersectionXYNormalizedSkillsSet.joinWithSeparator(",")
where intersectionStringToPass is the to-be-passed comma-delimited string.
For embodiments where a union operation is employed the to-be-passed string may
be set forth via code in line with the pseudocode:
var unionXYNormalizedSkillsSet =
setOfXPathNormalizedSkills.union(setOfYPathNormalizedSkills)
var unionStringToPass: String = unionXYNormalizedSkillsSet.joinWithSeparator(",")
``` where unionStringToPass is the to-be-passed comma-delimited string.

As such, passed for the fourth parameter may be—depending on the embodiment—either intersectionStringTo-Pass or unionStringToPass. Such passage may result in the new job listing record setting forth as its nrmKwd field—depending on the embodiment—either a comma-delimited string setting forth the discussed normalized keyword intersection or a comma-delimited string setting forth the discussed normalized keyword union. It is noted that herein-throughout the terms "skill" and "keyword" may—in the interest of decreasing textual monotony—be employed interchangeably.

Turning to the fifth parameter, passed may be the job-ListingExtraData string property of the controller object. Such passage may result in the new job listing record setting forth as its extraData field the discussed Base64 string encoded version of the entirety of the job listing (e.g., a Base64 encoded string representing an uploaded pdf file of the job listing).

Turning to obtainment of the user-provided job listing, it is observed that a job-listing providing user may proffer such job listing via one or more of upload and entry. The job listing receipt operations may be implemented by a method getUserJobListing( ). The method may have the declaration:

func getUserJobListing( )→(String, [String], String)

As such the declaration indicates that the method may take no parameters and may have a return type of a tuple array setting forth a first string, a string array, and a second string. According to one or more embodiments the method may be set forth by the conductor object and may be called by the resumesAndStoreForNewJobListing(_:) method of the conductor object.

Turning to job listing provision via user entry, as one example such entry may, in keeping with the Swift/Apple frameworks pseudocode employed herein, be implemented via one or more instantiated UITextField objects and/or UITextView objects. As another example, such entry may be implemented via one or more HTML <input> elements of type "text" and/or one or more HTML <textarea> elements. Job listing provision via upload may as one example in keeping with the Swift/Apple frameworks pseudocode employed herein be implemented via one or more instantiated UIDocumentPickerViewController objects. Such upload may, as another example, be implemented via one or more HTML <input> elements of type "file."

The uploaded file may, as examples, be a text file (e.g., with the extension .txt), a pdf file (e.g., with the extension .pdf), or a Microsoft Word file (e.g., with the extension .docx). Where the uploaded file is a text file, extracting the contents of the text file may, for instance and in keeping with the Swift/Apple frameworks pseudocode employed herein, involve instantiating an NSString object using the init(contentsOfFile: encoding) initializer, where passed for the contentsOfFile parameter is a string specifying the path including file name where the uploaded text file resides, and passed for the encoding parameter is NSUTF8StringEncoding. The instantiated NSString object may then hold the textual contents of the uploaded text file. Where the uploaded file is a pdf file, extracting the textual contents of the file may, for instance and in keeping with the Swift/Apple frameworks-based pseudocode employed herein, involve instantiating an NSURL object via the init (string) initializer method where passed for the string parameter is a string specifying the path including the file name where the uploaded pdf file resides and then instantiating a PDFDocument object via the init(URL) initializer method where passed for the URL parameter is the instantiated NSURL object. The instantiated PDFDocument object may then hold the textual contents of the uploaded pdf file, a string representation of such textual content being accessible by calling string( ) on the PDFDocument object. Where the uploaded file is a Microsoft Word file, extracting the textual contents of the Word file may, for instance, involve the employ of a docx2txt command line program, docx2txt being a command line program which takes a Word file as input and outputs a text file which contains the textual context of that Word file. In keeping with the Swift/Apple frameworks-based pseudocode employed herein, an NSTask object may be instantiated whose launchPath property is set to the path, including executable name, for docx2txt. Moreover, the instantiated NSTask object's arguments property may be set to a string array setting forth the arguments to be employed when loading the executable set forth by the launchPath property. As one illustration, suppose that the path including file name where the uploaded Word file resides is held in a string object named theWordFile, and that the path including file name to which the text file results of docx2txt may be written is held in string object theOutputTextFile. Continuing with the illustration, the arguments property of the instantiated NSTask object may be set to string array ["\(theWordFile)", "\(theOutputTextFile)"]. Further, method launch( ) may be called on the instantiated NSTask object to launch docx2txt. The resultant text file may then be handled in a fashion in line with that discussed hereinabove with respect to the handling of an uploaded text file. According to one or more embodiments, a headhunter user may—as an alternative to and/or in addition to uploading a job listing—choose (e.g., via a GUI) a job listing which exists on one or more stores. Such store-leveraging functionality for job listing provision may be performed in a manner analogous to that discussed herein with respect to provision via upload (e.g., with the above-noted string passage for the contentsOfFile parameter being the passage of a string specifying the path including file name where the chosen job listing exists on the appropriate store). It is observed that such stores may be referred to as "libraries."

As discussed, where upload is employed the textual content thereof may come to be held in and/or accessible as a string. In like vein, where an instantiated UITextField object is, as discussed, employed, a String holding the text entered therein by the user may be accessed via the text property thereof. Where an instantiated UITextView object is, as discussed, employed, a string holding the text entered therein by the user may be yielded by accessing the text property of that object. Where an HTML <input> element of type "text" or an HTML <textarea> element is employed, a string holding the text entered by the user may be obtained via accessing the element via its HTML ID. As such, via a number of approaches the job listing uploaded or entered by the user may come to be held in and/or accessible as one or more strings. It is noted that according to one or more embodiments multiple strings may be merged into a single string via one or more calls to string method StringByAppendingString(_:).

It is noted that according to one or more embodiments the job listing provided by the user (e.g., via entry and/or upload) may perhaps be viewed as being made up of a job title and a job description. For instance, where the user provides the job listing via entry the user may be provided with one GUI element for receipt of the job title portion of the job listing (e.g., the user may be provided with a corresponding UITextField object or HTML <input> element of type "text") and may be provided with another GUI element for receipt of the job description portion of the job listing (e.g., the user may be provided with a UITextView object or a HTML <textarea> element). The GUI may provide (e.g., via one or more UILabel objects and/or via HTML text) instruction to the user to enter the job title in the discussed GUI element therefor and to enter the job description in the discussed GUI element therefor. As such the job title and job description may be received separately. Moreover the job title and job description may be received together from the user (e.g., a unified job listing may be provided). For example, the user may be provided with a single GUI element (e.g., of the sort just discussed) into which to enter the entirety of the job listing, both job title and job description. As another example, where the user provides, as discussed, the job listing via upload, the content of that upload may be the entirety of the job listing, both job title and job description. Where the job title and job description are received together, one or more operations may be performed to separate out the job title and job description. For example, the user may be provided with instruction (e.g., via the GUI) that headings may be employed in providing the job listing, with a "job title" heading preceding the job title and a "job description" heading preceding the job description. Under such a circumstance the unified job listing may be loaded into a string array where each word of the unified job listing may be an element of the string array (e.g., the unified job listing may first exist as a string, and—in keeping with the Swift/Apple frameworks-based pseudocode employed herein—componentsSeparatedByString(_:), with a string providing a space character being passed as the sole parameter, may be called upon the string so as to break the string into words via space character-delimitation and cause each such word to become an element of a generated string array). The string array may be stepped through in a word-wise fashion, say via a for-in loop. Code in conjunction with the loop may, when encountering "job" via one pass through the word-wise loop, look for either of "title" or "description" in the next pass through the loop. Where the next pass through the word-wise loop finds "title" the code may consider itself to have found the "job title" heading. Where the next pass through the word-wise loop finds "description" the code may consider itself to have found the "job description" heading. Where the code, in the next pass through the loop, finds neither "title" nor "description" the code may consider the found word "job" to correspond to neither the head "job title" nor the heading "job description." Where the code determines itself to have found the heading "job title" it may consider the words that follow to correspond to the job title until finding the "job description" heading or the end of the array. Such job title words may be loaded into a string (e.g., entitled jobTitle). Where the code determines itself to have found the heading "job description" it may consider the words that follow to correspond to the job description until finding the "job title" heading or the end of the array. Such job description words may be loaded into a string. As such, a string corresponding to the job title and a string corresponding to the job description may come to be possessed. According to one or more embodiments the code may take a more relaxed view when searching for the "job title" and "job description" headings. In particular the code may allow for a user-provided heading similar to "job title" to be accepted as the job title header and/or a user-provided heading similar to "job description" to be accepted as the job description header. As illustrations, the code may accept synonyms and/or misspellings of the words "job," "title," and/or "description" as, respectively, the words "job," "title," and "description." Under such a scenario, when looping through the string array the code may consider a found word against a bank of synonyms for the word "job," a bank of synonyms for the word "title," and a bank of synonyms for the word "description." Such a synonyms bank may, as an illustration, be populated via the WordNet database. In terms of misspellings, looping through the string array the code may compare—through the lens of accepting misspellings—a found word as discussed (e.g., to "job," "title," and "description" and/or synonyms thereof). Such acceptance of misspellings may, for instance, consider a user-provided word to map to "job," "title," or "description"—and/or a synonym thereof—where that word is within a chosen quantity of edit distances of one of those words (e.g., Levenshtein distance calculation may be performed). As one illustration, "tittle" may be calculated to be within one edit distance of the word "title"—the one edit being the removal of the extraneous "t"—and be accepted as "title." As further examples of leniency, the code may accept "title"—and/or a synonym thereof—without being preceded by the word "job"—or a synonym thereof—to be the job title heading, and/or the code may accept "description"—and/or a synonym thereof—without being preceded by the word "job"—or a synonym thereof—to be the job description heading.

As referenced, the job listing provided by the user may be viewed as being made up of a job title and a job description. Moreover, via the discussed operations the job listing may be separated out into the job title and the job description (e.g., there may be a held string for each). Such separation operations may regard circumstances in which user instruction is provided that headings—for instance "job title" and "job description"—be employed in setting forth the job listings. As explained, automated operations may leverage such headings in breaking a job listing into two portions (e.g., held as two strings). In like vein, according to one or more embodiments the job description portion of the job listing may itself be viewed as being made up of one or more subportions. As illustrations, such subportions may include company name, job location, compensation, and/or qualifications and duties. Via operations analogous to the ones regarding separating the job listing into job title and job description, operations may act to separate the job description into, say, company name, job location, compensation, and/or qualifications and duties. In analogous like manner job description separation operations may regard circumstances in which user instruction is provided that subheadings—for instance "company name," "job location," "compensation," and/or "qualifications and duties" be employed in setting forth the job description. Then, further analogously, automated operations may act to leverage such headings in breaking the job description of a job listing into multiple subportions (e.g., held as a string array where each array element corresponds to one of the subportions)—perhaps a company name subportion, a job location subportion, a compensation subportion, and/or a qualifications and duties subportion. As such a job listing may be broken into a standalone string and an array of strings (e.g., a four element array of strings). The standalone string may correspond to the job title. The standalone string may be returned by getUserJobListing( ) as the first element of the returned tuple. The array of strings may correspond to the job description and may be returned by getUserJobListing( ) as the second element of the returned tuple. A first element (e.g., element [0]) of the array of strings) may be a string setting forth the company name, a second element (e.g., element [1]) of the array of strings may be a string setting forth the job location, a third element (e.g., element [2]) of the array of strings may be a string setting forth compensation, and a fourth element (e.g., element [3]) of the string array may be a string setting forth qualifications and duties. Where the string of a particular job description subportion is desired the corresponding array element may be accessed. With reference to that which has been discussed, it is noted that separate GUI elements (e.g., UITextField objects) may be provided with respect to each of the subportions (e.g., there may be one such GUI element for company name, one such GUI element for job location, one such GUI element for compensation, and/or one such GUI element for qualifications and duties). The text of such GUI elements may be accessed in the fashion discussed herein and the noted array elements may be appropriately loaded with such text (e.g., element [3] of such array may be set to hold the text returned from the GUI element—say a UITextField object—for qualifications and duties).

Turning to the third tuple element returned by getUserJobListing( )—the third tuple element being a string—the following is noted. As one example, as discussed herein according to one or more embodiments there may be a standalone string corresponding to the as-user-provided job title and an array of strings corresponding to the as-user-provided job description. A job description unified string corresponding to all string elements of the string array may be yielded by calling joinWithSeparator(_:)—where a string providing a space character is passed for the sole parameter—on the string array. A composited string made up of the standalone string corresponding to the as-user-provided job title and the job description unified string may be formulated by calling stringByAppendingString(_:) on the standalone string corresponding to the as-user-provided job title, where the job description unified string is passed as the sole parameter of the method call. A Base64 string representation of such composited string may be formulated by, in keeping with the Swift/Apple frameworks pseudocode employed herein, instantiating an NSData object corresponding to the composited string by calling dataUsingEncoding(_:) on the composited string, passing NSUTF8StringEncoding as the sole parameter. And then by instantiating the noted Base64 string representation by calling, on the NSData object, base64EncodedStringWithOptions(_:), passing NSDataBase64EncodingOptions(rawValue: 0)—the zero indicating that no options are desired—as the sole parameter of the call. Such resultant Base64 string representation may be returned by getUserJobListing( ) as the third element of the returned tuple.

As a second example regarding the third tuple element returned by getUserJobListing( ) as discussed herein according to one or more embodiments the user may, as discussed, provide the job listing as an upload (e.g., as a .pdf or .docx file). In keeping with the Swift/Apple frameworks-based pseudocode employed herein, an NSData object corresponding to the uploaded file may be instantiated via NSData's init(contentOfFile:) init method where a string corresponding to the path of the uploaded file is passed as the sole parameter of the call. Then a Base64 string representation of the file may be yielded by calling, on the NSData object, base64EncodedStringWithOptions(_:) where NSDataBase64EncodingOptions(rawValue: 0) is passed as the sole parameter of the call. The yielded Base64 string may be returned by getUserJobListing( ) as the third element of the returned tuple. As one example such Base64 encoding of the uploaded job listing file may later be decoded and downloaded. As another example, such Base64 encoding of the uploaded job listing file may be later decoded and displayed. For instance in the case of a pdf file, in keeping with the Swift/Apple frameworks pseudocode employed herein a WKWebView object may be employed in such display. In particular, the post-Base64-decoded pdf file may be stored in a local or remote location and an NSURL object specifying that location may be instantiated. Further, an NSURLRequest object corresponding to that NSURL object may also be instantiated. Then, loadRequest(_:) may called on the WKWebView object, passing the NSURLRequest object as the sole parameter, thusly causing display of the pdf file.

Having, for instance, the user-provided job title text and user-provided job description text (e.g., as strings) operation may proceed as follows. For instance, the job title may be subjected to one or more stripping operations. Such stripping operations may be provided by a method stripTitle(_:). The method may have the declaration:

func stripTitle(_theTitle: String)→String

As such the declaration indicates that the method may take a single parameter of type string, the single parameter having the local parameter name theTitle and no external parameter name. The declaration further indicates that the method may have a return type of string. According to one or more embodiments the method may be set forth by the titleHandler object and may be called by the resumesAndStoreForNewJobListing(_:) method of the conductor object, with the sole parameter of the call being the discussed string setting forth the job title obtained from the user-provided job listing.

According to such stripping operations, one or more words and/or phrases may be removed from and/or retained in that which is set forth by received parameter theTitle. As an example there may be a store and/or data structure containing such to-be-removed words and/or phrases. To facilitate discussion this store and/or data structure will be considered to be a string array (e.g., a string array yoked with a backing store—say a database) and will be referred to as the "blacklist array." As illustrations, the blacklist array may include location names (e.g., city names), business names, and/or certain adjectives.

As illustrations, the blacklist array and/or its backing store may be populated with such location names by drawing from one or more location name databases (e.g., the GeoNames database). The blacklist array and/or its backing store may be populated with such business names by drawing from one or more business databases (e.g., state business databases such as the Kepler database of the California Secretary of State). The blacklist array and/or its backing store may be populated with such certain adjectives by drawing adjectives from a lexical database (e.g., the WordNet database or the Moby Part-of-Speech database) and then removing therefrom words associated with job titles. Such job titles may for instance be drawn from a job listing database (e.g., the Government of Canada Job Bank National Occupation Classification (NOC), and/or the United States Bureau of Labor Statistics (BLS) Standard Occupational Classifications listing, and/or the normalized job titles discussed herein). For instance, adjectives may be extracted from the Moby Part-of-Speech listing by extracting therefrom words tagged as adjectives via a backslash character followed by one or more alphabet characters of which one is a capital letter "A" (e.g., with such extraction being performed in a fashion employing an instantiated NSRegularExpression object whose pattern property is set to hold a regular expression string formulated to capture words followed by a backslash character and then one or more alphabetic characters of which one is a capital letter "A," and whose options property is set to an empty array to signify that no options are desired. Regarding implementation of the discussed removal, in keeping with the Swift/Apple frameworks-based pseudocode employed herein, suppose a first set object named adjectivesSet and holding the discussed adjective words (e.g., drawn from the Moby Part-of-Speech listing) instantiated. Suppose that also instantiated is a set object which is named jobTitlesSet and which holds words gathered as discussed (e.g., from the Government of Canada Job Bank). Then, further in keeping with the noted pseudocode code in line with the pseudocode adjectivesSet.subtract(jobTitlesSet) might be set forth so as to yield a set corresponding to adjectivesSet but with removed therefrom those words of adjectivesSet which also exist in jobTitlesSet. As such, a set object may be yielded which contains the noted certain adjectives—that is to say adjectives which may be viewed as not being job title related. Such yielded set object might perhaps be held in a set object reducedAdjectivesSet.

The noted blacklist array and/or its backing store may in one aspect, as referenced, include the discussed location names and the discussed business names. Moreover, the blacklist array and/or its backing store may include words of the noted reducedAdjectivesSet via, taking the blacklist array to be a string array object blackListArray, code in line with the pseudocode blackListArray=blackListArray+Array (reducedAdjectivesSet), where Array(reducedAdjectivesSet) serves to instantiate an array based on set object reducedAdjectivesSet while the addition operation serves to join the noted arrays and have blackListArray hold the result of the addition operation.

As Such, the blacklist string array and/or its backing store may hold the noted location names, the noted business names, and the noted certain synonyms. From here, recalling received parameter theTitle to provide the string setting forth the job title obtained from the user-provided job listing, and taking the blacklist to be held in a string array blackListArray, the words in the blacklist may be removed from the user-provided job title text via code in line with the Swift/Apple frameworks-based pseudocode:

```
var titleToReturn = theTitle
for blacklistWord in biackListArray {
    titleToReturn =
titleToReturn.stringByReplacingOccurrencesOfString(blacklistWord
        , withString: "")
}
```

Method stripTitle(_:) may, as a first example, return that which is set forth by titleToReturn as the result of the method. According to one or more embodiments, one or more operations may be performed to—prior to the method returning titleToReturn—any extra whitespace (e.g., any extra space characters) existing in titleToReturn subsequent to run of the for-in loop.

Although the discussed blacklist approach has been plied in removing from that which is set forth by theTitle words such as those relating to place names, business names, and certain adjectives, other possibilities exist. For example, a whitelist string array (e.g., a string array yoked with a backing store—say a database) may be formulated and only words of received parameter theTitle contained in the whitelist may be permitted to remain. As one illustration, the whitelist string array and/or its backing store may be populated with words drawn from a job listing database of the sort noted (e.g., the Government of Canada Job Bank) and/or the normalized job titles discussed herein. Under such a whitelist scenario, taking the whitelist string array to be string array object whiteListArray, that which is set forth by received parameter theTitle may be made to hold no words other than those held in whiteListArray via code in line with the following Swift/Apple frameworks-based pseudocode:

```
var theTitleArray: [String] = theTitle.componentsSeparatedByString(" ")
theTitleArray = theTitleArray.filter({whiteListArray.contains($0)})
var titleToReturn: String = theTitleArray.joinWithSeparator(" ")
```

Method stripTitle(_:) may, as a second example, return that which is set forth by titleToReturn as the result of the method.

Contemplating the above pseudocode, a string array based on received parameter theTitle is created, the created array is subjected to a filter operation that leaves behind in the array only those words which exist in whiteListArray, and then string object titleToReturn which reflects the altered array is instantiated.

As an illustration, via the discussed blacklist or whitelist operations that which is set forth by received parameter theTitle "acme brothers super python coder san francisco" may become "python coder." In particular, in the case of a blacklist approach "acme brothers" may be removed due to being recognized as a business name, "super" may be removed due to being recognized as one of the discussed certain adjectives, and "san francisco" may be removed due to being a location name In the case of a whitelist approach, only "python" and "coder" may be permitted to remain in view of those words being recognized as job-title related words.

According to one or more embodiments, the user-provided job title text (e.g., as modified by the blacklist or whitelist operations) may be subjected to one or more combinatory operations that yield from such job title the taken k at a time combinations for k=2 . . . the number of words in theTitle (e.g., the taken k at a time combinations for k=2 . . . 5 in the case where the job title contains five words). The combinatory operations may be provided by a method produceCombinatoriesFromTitle(_:). The method may have the declaration:

func             produceCombinatoriesFromTitle(_theTitle: String)→[String]

As such the declaration indicates that the method may take a single parameter of type string, the single parameter having the local parameter name theTitle and no external parameter name. The declaration further indicates that the method may have a return type of string array. According to certain embodiments the method may be set forth by the titleHandler object and may be called by the resumesAndStoreForNewJobListing(_:) method of the conductor object, with the sole parameter of the call being—depending on the embodiment—the discussed string setting forth the job title obtained from the user-provided job listing or such job title as subjected to the discussed herein whitelist or blacklist operations. As an illustration, suppose received parameter theTitle reflected the job title as subjected to the discussed whitelist or blacklist operations and set forth "java mobile developer." As there are three words in this title, the combinatory operations may yield from received parameter theTitle the taken k at a time combinations for k=1 . . . 3. More specifically, yielded from "java mobile developer" may be "java mobile," "java developer," "mobile developer," and "java mobile developer." Such yielded combinatory results may, in one or more embodiments, be set forth in a string array and returned as the result of produceCombinatoriesFromTitle(_:). It is noted that although, so as to facilitate discussion, discussed has been k=2 . . . the number of words in theTitle, other possibilities exist. For instance, k=1 . . . the number of words in theTitle might be employed. Where k=1 . . . the number of words in theTitle, returning to the example of "java mobile developer" further to the discussed yielded may be "java," "mobile," and "developer."

It is further noted that according to one or more embodiments implementation may be such that there is call that yielded combinatory results contain at least one word which, even taken standalone, is a job title. As illustrations, the words "engineer" and "developer" may—even taken standalone—be job titles, while the words "java," "mobile," "solutions," and "applications" may—taken standalone—not be job titles. Pools of such words which—even taken standalone—are job titles may be drawn from sources including those discussed hereinabove (e.g., the BLS Standard Occupational Classifications listing and/or the normalized job titles discussed herein), where single word job titles are yielded therefrom (e.g., by querying the source in a way which requests only single word job titles, and/or by taking a list of job titles drawn from such a source and—via employ of a NSRegularExpression object whose pattern property is set to hold a regular expression which matches single word phrases—distilling such a list of job titles into a list of single word job titles. As an illustration, where such a source held job titles including "dentist," "family dentist," "maxillofacial dentist," "engineer," "electrical engineer," and "mechanical engineer," the single word job titles thereof may be "dentist" and "engineer." Returning to the previous example of performing combinatory on "java mobile developer" to yield "java developer," "mobile developer," and "java mobile developer," "java mobile" might be removed from further consideration because neither "java" nor "mobile" is—taken standalone—a job title.

Turning to the plying—in one or more index-employing operations—of the job title text provided by the user submitting the job listing (e.g., with such job title text having been subjected to one or more of the discussed operations such as the discussed herein blacklist or whitelist operations and/or the discussed combinatory operations), the following is now discussed with respect to FIG. 6. At phase 601 the provideYPathNormalizedJobTitlesAndYPathNormalizedSkillsForInput(_:) of the xYPathsHandler object may be called. The method may have the declaration:

```
func provideYPathNormalizedJobTitlesAndYPathNormalizedSkillsForInput(_ theInput:
[String]) -> (normTitles: [(fieldVal: String, count: Int, corpusCount: Int,
score: Double)], normKwds: [(fieldVal: String, count: Int, corpusCount: Int,
score: Double)])
```

The declaration indicates that the method may take a single parameter of type string array, the single parameter having the local parameter name theInput and having no external parameter name. The declaration further indicates that the method may have a return type (normTitles: [(fieldVal: String, count: Int, corpusCount: Int, score: Double)], normKwds: [(fieldVal: String, count: Int, corpusCount: Int, score: Double)]). As such, the return type is that of a tuple which holds two tuple arrays, the first tuple array having the component name normTitles and the second tuple array having the component name normKwds, each tuple array having tuple elements of the sort (fieldVal: String, count: Int, corpusCount: Int, score: Double). Accordingly, each such element is a tuple which has a string component whose name is fieldVal, an integer component whose name is count, an integer component whose name is corpusCount, and a double component whose name is score.

As referenced, the user-provided job title text (e.g., as modified by the discussed blacklist or whitelist operations) may according to certain embodiments be further subjected to one or more combinatory operations but may according to other embodiments not be subjected to such combinatory operations. First discussed in connection with the above method will be the scenario where such combinatory operations are not performed.

The provideYPathNormalizedJobTitlesAndYPathNormalizedSkillsForInput(_:) method may as one example be called by resumesAndStoreForNewJobListing(_:). Bearing in mind the at-hand scenario of no combinatory operations, passed to the provideYPathNormalizedJobTitlesAndYPathNormalizedSkillsForInput(_:) method may be, as the sole element of a string array, the user-provided job title text as modified by the blacklist or whitelist operations. The provideYPathNormalizedJobTitlesAndYPathNormalizedSkillsForInput(_:) method may, at phase 603, check the string array passed to it (i.e., the string array with the local parameter name theInput) to determine whether the string array is a single element or a multielement string array. In keeping with the pseudocode employed herein, the provideYPathNormalizedJobTitlesAndYPathNormalizedSkillsForInput(_:) method may employ code in line with the pseudocode var sizeOfTheInput=theInput.count, which may cause sizeOfTheInput to hold an integer indicating the quantity of elements in the string array theInput. The method may take a count size of one to be indicative of the at-hand scenario where the combinatory operations are not performed, and may take a count size of greater than one to be indicative of the scenario discussed hereinbelow where the combinatory operations are performed. The method may perhaps examine the value of sizeOfTheInput via a switch-case statement, and/or via one or more if and/or else statements.

Where for the to be discussed hereinbelow scenario of the combinatory operations being performed the method finds sizeOfTheInput to be greater than one, flow may proceed to phase 605. For the at-hand scenario of the combinatory operations not being performed and a corresponding sizeOfTheInput value of one, the method may at phase 607 act to create a string which corresponds to the string received via the sole element of theInput but which sets "OR" interword. Illustratively, where the sole element of theInput provides the string "java mobile developer," such interword placement of "OR" may yield the string "java OR mobile OR developer." As an illustration in keeping with the pseudocode employed herein of such interword setting of "OR," code in line with the following pseudocode may be employed by the provideYPathNormalizedJobTitlesAndYPathNormalizedSkillsForInput(_:) method.

Firstly, a string array object may be instantiated based on the string provided by the sole element of theInput, the sole element being element [0] of theInput:

var    tempArray=theInput[0].componentsSeparatedByString(" ")

where the method call to componentsSeparatedByString(_:) serves to generate a string array from the string provided by the sole element of theInput, where a space character is employed as the delimiter in mapping the string to elements of tempArray. The array so formulated may—continuing with the above example—have "java" as its first element, "mobile" as its second element, and "developer" as its third element. Secondly, code in line with the following pseudocode may be set forth by the provideYPathNormalizedJobTitlesAndYPathNormalizedSkillsForInput(_:) method:

var    tempORedString=tempArray.joinWithSeparator(" OR ")

where the joinWithSeparator(_:) method call on tempArray may serve to yield therefrom a string where "OR"—a space character, "OR," and another space character—is inserted interelement when joining the elements of tempArray into a single string. As such, the resultant string—tempORedString—may hold "java OR mobile OR developer."

At phase 609 the provideYPathNormalizedJobTitlesAndYPathNormalizedSkillsForInput(_:) method may—according to one or more embodiments—select indexed job listing field rawTtl. Discussed herein is the employ of a class FieldInfo. Class FieldInfo may have the definition:

```
class FieldInfo {
    var fieldName: String = String( )
    var searchQueryForField: String = String( )
    var qfPassDocs: [String] = [String]( )
    var strippedQueryForField: [String] = [String]( )
    var scoresForQfPassDocs: [String:Double] = [String:Double]( )
}
```

As such the class definition of FieldInfo sets forth properties including fieldName of type String, searchQueryForField of type string, qfPassDocs of type string array, strippedQueryForField of type string array, and scoresForQfPassDocs of type string to double dictionary. Also at phase 609 the method may instantiate an object which has the name elementToAppend and which is of type FieldInfo, set the instantiated object's fieldName property to "rawTtl," and set the instantiated object's searchQueryForField property to reflect that which is set forth by tempORedString via code in line with the pseudocode:

```
var elementToAppend: FieldInfo = FieldInfo( )
elementToAppend.fieldName = "rawTtl"
elementToAppend.searchQueryForField
    = tempORedString
```

Still further at phase 609 the method may instantiate an array of FieldInfo objects whose sole element sets forth that which is provided by elementToAppend. Such may be achieved via code in line with the pseudocode var fieldInfoArray: [FieldInfo]=[FieldInfo] (arrayLiteral: elementToAppend).

Object fieldInfoArray in one aspect reflects the discussed interword placement of "OR" into the user-provided job title text as modified by the blacklist or whitelist operations, and in another aspect reflects the discussed selection of indexed job listing field "rawTtl." According to one or more embodiments an indexOperations object—an instantiation of an IndexOperations class—may provide methods including doFilterQueryForFieldInfoArray(_:) and filterQueryForQuery(_: andField:), where the later method is employed by the former method. The doFilterQueryForFieldInfoArray(_:) method may have the declaration:

```
func doFilterQueryForFieldInfoArray(_ theFieldInfoArray: [FieldInfo]) ->
    [FieldInfo]
```

The declaration indicates that the method may take a single parameter of type [FieldInfo]—an array of FieldInfo objects—Where the single parameter has the local parameter name theFieldInfoArray and has no external parameter name. The declaration further indicates that the method may have a return type of [FieldInfo].

The filterQueryForQuery(_: andField:) method may have the declaration:

```
func filterQueryForQuery(_ theSearchString: String, andField
    theIndexField: String) -> [String]
```

The declaration indicates that the method may take a first parameter of type string, the first parameter having the local parameter name theSearchString and no external parameter name. The declaration further indicates that the method may take a second parameter of type string, the second parameter having the local parameter name theIndexField and the external parameter name andField. The declaration additionally indicates that the method may have a return type of string array.

Method doFilterQueryForFieldInfoArray(_:) may receive a FieldInfo array and may return a FieldInfo array wherein—for a given element thereof—the fieldName property sets forth the same value as the fieldName property of the corresponding element of the passed-in FieldInfo array, the searchQueryForField property sets forth the same value as the searchQueryForField property of the corresponding element of the passed-in FieldInfo array, and the qfPassDocs property sets forth a string array wherein each element of the string array sets forth the document number of a job listing for which the field specified by fieldName satisfies the Boolean expression set forth by searchQueryForField. As an illustration, for the circumstance of the passed-in FieldInfo array being a single element array whose single FieldInfo element sets forth "java OR mobile OR developer" for its searchQueryForField property and "rawTtl" for its fieldName property, the returned FieldInfo array may be a single element array whose single FieldInfo elements sets forth "java OR mobile OR developer" for its searchQueryForField property, "rawTtl" for its fieldName property, and ["5JKL", "9WXY", "3DEF"] for its qfPassDocs property. Such returned single element may indicated that each of job listings 5JKL, 9WXY, and 3DEF has a rawTtl field satisfying the Boolean expression "java OR mobile OR developer." To facilitate discussion, document numbers such as "3DEF" are set forth in this illustration rather than, say, UUIDs. It is noted that although discussed has been the return of document numbers of job listings whose fieldName-specified fields satisfy a searchQueryForField-specified Boolean expression, job listing discovery may not be the objective of provideYPathNormalizedJobTitlesAndYPathNormalizedSkillsForInput(_:). Instead the job listings to which such document numbers correspond may be employed as seeds for further index-leveraging operations. At phase 611 the provideYPathNormalizedJobTitlesAndYPathNormalizedSkillsForInput(_:) method may call doFilterQueryForFieldInfoArray(_:), passing for the sole parameter of such call the single element FieldInfo array created at phase 609. Method provideYPathNormalizediobTitlesAndYPathNormalizedSkillsForInput(_:) may receive in reply to the call an of-the-sort-discussed FieldInfo array further setting forth job listing document numbers.

The indexOperations object may, according to one or more embodiments, further provide methods including rankForFieldInfoArray(_: andFieldJoiner:), andFieldsHandlerForFieldInfoArray(_:), calculateScoreForTerm(_: forDocumentNumber: andFieldName:), and calculateNormContribForTerm(_: forDocumentNumber: andFieldName:). The later three of the four methods may be called by the first of the four methods.

The rankForFieldInfoArray(_: andFieldJoiner:) method may have the declaration:

```
func rankForFieldInfoArray(inout _ theFieldInfoArray: [FieldInfo],
    andFieldJoiner theFieldJoiner: FieldJoinerKind) -> [(String, Double)]
```

The declaration indicates that the method may take a first parameter of type FieldInfo array, the first parameter being an inout parameter and therefore capable of being modified within the method, the first parameter having the local parameter name theFieldInfoArray and having no external parameter name. The declaration further indicates that the method may take a second parameter of type FieldJoinerKind, the second parameter having the local parameter name theFieldJoiner and the external parameter name andFieldJoiner. The declaration additionally indicates that the method may have a return type of array of (String, Double) tuples, that is to say an array of which each element is a tuple, and where each such tuple has a string component and a double component.

Turning to FieldJoinerKind, FieldJoinerKind may be defined as an enum:

```
enum FieldJoinerKind {
    case And
    case Or
}
```

As such, an instantiated FieldJoinerKind object may hold the value FieldJoinerKind.And or FieldJoinerKind.Or.

With further regard to doFilterQueryForFieldInfoArray(_:) and rankForFieldInfoArray(_: andFieldJoiner:) the following is noted. According to one or more embodiments a caller of such methods may act to specify the record type (e.g., job listing, resume, or normalized keyword) with respect to which these methods are to operate. As one example, each of these methods may accept a further passed-in parameter (e.g., a string or an enum) which allows the caller to make such record type indication. As another example, the indexOperations object which provides these methods may include a property (e.g., a string or enum property) which allows a caller, by setting the object property, to make the noted record type indication Where the parameter or property is a string, record type specification may for example be made by specifying corresponding entity name as a string (e.g., the string "JobListingEntity" to specify job listing, the string "ResumeEntity" to specify resume, or the string "NormalizedKeywordEntity" to specify normalized keyword). JobListingEntity. ResumeEntity, and NormalizedKeywordEntity are discussed in greater detail herein. Where the parameter or property is an enum, such enum may have the definition:

```
enum RecordTypeKind {
    case JobListing
    case Resume
    case NormalizedKeyword
}
```

In keeping with this RecordTypeKind.JobListing may be employed to specify job listing, RecordTypeKind.Resume may be employed to specify resume, and RecordTypeKind.NormalizedKeyword may be employed to specify normalized keyword.

The andFieldsHandlerForFieldInfoArray(_:) method may have the declaration:

```
func andFieldsHandlerForFieldInfoArray(_ theFieldInfoArray:
    [FieldInfo]) -> [FieldInfo]
```

The declaration indicates that the method may take a single parameter of type FieldInfo array, the first parameter having the local parameter name theFieldInfoArray and having no external parameter name. The declaration further indicates that the method may have a return type of FieldInfo array.

The calculateNormContribForTerm(_: forDocumentNumber: andFieldName:) method may have the declaration:

```
func calculateNormContribForTerm(_ theTerm: String,
    forDocumentNumber theDocumentNumber: String, andFieldName
    theFieldName: String) -> Double
```

The declaration indicates that the method may take a first parameter of type string, the first parameter having the local parameter name theTerm and having no external parameter name. The declaration further indicates that the method may take a second parameter of type string, the second parameter having the local parameter name theDocumentNumber and the external parameter name forDocumentNumber. Still further, the declaration indicates that the method may take a third parameter of type string, the third parameter having the local parameter name theFieldName and the external parameter name andFieldName. Moreover, the declaration indicates that the method may have a return type of double.

The calculateNormContribForTerm(_: forDocumentNumber: andFieldName:) method may have the declaration:

```
func calculateNormContribForTerm(_ theTerm: String,
    forDocumentNumber theDocumentNumber: String, andFieldName
    theFieldName: String) -> Double
```

The declaration indicates that the method may take a first parameter of type string, the first parameter having the local parameter name theTerm and having no external parameter name. The declaration further indicates that the method may take a second parameter of type string, the second parameter having the local parameter name theDocumentNumber and the external parameter name forDocumentNumber. Still further the declaration indicates that the method may take a third parameter of type string, the third parameter having the local parameter name theFieldName and the external parameter name andFieldName. Moreover, the declaration indicates that the method may have a return type of double.

Method rankForFieldInfoArray(_: andFieldJoiner:) may, via its first parameter, receive a FieldInfo array of the sort returned by doFilterQueryForFieldInfoArray(_:), to with a FieldInfo array for which each element thereof has its qfPassDocs property setting forth a string array wherein each element of the string array sets forth the document number of a document (e.g., a job listing document) for which the field specified by fieldName satisfies the Boolean expression set forth by searchQueryForField. Via its second parameter—the parameter with the external name andFieldJoiner rankForFieldInfoArray(_: andFieldJoiner:) may receive FieldJoinerKind.And or FieldJoinerKind.Or. For the at-hand circumstance of passing for the first parameter a single element FieldInfo array, that which of FieldJoinerKind.And and FieldJoinerKind.Or is passed for the second parameter may not affect the output of the method. For the circumstance of passing for the first parameter a multi-element FieldInfo array that which of FieldJoinerKind.And and FieldJoinerKind.Or is passed may affect the outcome of the method. Method rankForFieldInfoArray(_: andFieldJoiner:) may return via the noted tuple array—considering the at-hand scenario of a single element FieldInfo array being passed for the first parameter of the method call—a relevance score for each job listing indicated by the qfPassDocs property of the sole element of that FieldInfo array. In particular, each tuple of the returned array may specify a job listing document number via the string component of the tuple and a corresponding relevance score via the double component of the tuple. It is noted that the relevance score returned by the method with respect to a particular job listing document may, for instance, be thought of as quantifying quality of fit between words set forth via searchQueryForField and that which is set forth in that job listing's field as specified by fieldName.

As an illustration, for the circumstance of calling rankForFieldInfoArray(_: andFieldJoiner:) where passed for the first parameter is a single element FieldInfo array where the FieldInfo object of the sole array element sets forth "java OR mobile OR developer" for its searchQueryForField property, "rawTtl" for its fieldName property, and ["5JKL", "9WXY", "3DEF"] for its qfPassDocs property, the method may return the tuple array [("5JKL", 23.89), ("9WXY", 21.45), ("3DEF", 2.12)]. As such the tuple array may convey a relevance score of 23.89 with respect to job listing "5JKL", a relevance score of 21.45 with respect to job listing "9WXY", and a relevance score of 2.12 with respect to job listing "3DEF". It is noted that the method may formulate the returned tuple array such that the elements are sorted by score order (e.g., with higher scores appearing in the array ahead of lower score). It is further noted that although discussed has been the return of job listing document numbers and corresponding relevancy score, job listing ranking may not be the objective of provideYPathNormalizedJobTitlesAndYPathNormalizedSkillsForInput(_:). Instead the job listing scores and corresponding job listings may be employed as seeds for further index-leveraging operations.

At phase 613 the provideYPathNormalizedJobTitlesAndYPathNormalizedSkillsForInput(_:) method may call rankForFieldInfoArray(_: andFieldJoiner:), passing for the first parameter the FieldInfo array received in response to calling doFilterQueryForFieldInfoArray(_:), and passing for the second parameter FieldJoinerKind.Or. Being that a single element FieldInfo array is being passed, in agreement with that which has been discussed either of FieldJoiner- Kind.And and FieldJoinerKind.Or may be passed without affecting that which is returned by rankForFieldInfoArray(_: andFieldJoiner:). Nevertheless, to facilitate discussion the passing of FieldJoinerKind.Or is set forth. Method provideYPathNormalizedJobTitlesAndYPathNormalizedSkillsForInput(_:) may receive in reply to the method call an of-the-sort-noted tuple array setting forth job listing document numbers and corresponding relevancy scores.

The indexOperations object may, according to one or more embodiments, further provide methods including feedWithDocNumAndScoreTupleArray(_: forField: andTokenSeparator: andPunctateDepth:), punctateForExpandedTupleArray(_: andPunctateDepth:), and corpusCountForFeederResult(_: forField:). It is noted that the second of these three methods may be called by the first of these three methods.

Method feedWithDocNumAndScoreTupleArray(_: forField: andTokenSeparator: andPunctateDepth:) may have the declaration:

```
func feedWithDocNumAndScoreTupleArray(_
theDocNumAndScoreTupleArray: [(num: String, score: Double)],
forField theField: String, andTokenSeparator theTokenSeparator:
String, andPunctateDepth thePunctateDepth: Int) ->
[(fieldVal: String, count: Int, score: Double)]
```

The declaration indicates that the method may take a first parameter which is a tuple array of which each element of the array is a tuple whose first tuple component is of type string and has the component name num, and whose second tuple component is of type double and has the component name score. The declaration indicates that the first parameter may have the local parameter name theDocNumAndScoreTupleArray and no external parameter name. The declaration further indicates that the method may take a second parameter of type string, the second parameter having the local parameter name theField and the external parameter name forField. Also the declaration indicates that the method many take a third parameter of type string, the third parameter having the local parameter name theTokenSeparator and the external parameter name andTokenSeparator. Moreover, the declaration indicates that the method may take a fourth parameter of type int, the fourth parameter having the local parameter name thePunctateDepth and the external parameter name andPunctateDepth. The declaration additionally indicates that the method may have a return type of tuple array where each element of the array is a tuple whose first tuple component is of type string and has the component name fieldVal, whose second tuple component is of type int and has the component name count, and whose third tuple element is of type double and has the component name score.

The punctateForExpandedTupleArray(_: andPunctateDepth:) method may have the declaration:

```
func punctateForExpandedTupleArray(_
theExpandedTupleArray: [(num: String, score Double, fieldVal:
String)], andPunctateDepth thePunctateDepth: Int) ->
[(fieldVal: String, count: Int, score: Double)]
```

The declaration indicates that the method may take a first parameter of type tuple array of which each element of the array is a tuple whose first tuple component is of type string and has the component name num, whose second tuple component is of type double and has the component name score, and whose third tuple element is of type string and has the component name fieldVal. The declaration indicates that the first parameter may have the local parameter name theExpandedTupleArray and no external parameter name. The declaration further indicates that the method may take a second parameter of type int, the second parameter having the local parameter name thePunctateDepth and the external parameter name andPunctateDepth. The declaration additionally indicates that the method may have a return type of tuple array of which each element of the array is a tuple whose first tuple component is of type string and has the component name fieldVal, whose second tuple element is of type int and has the component name count, and whose third tuple element is of type double and has the component name score.

The corpusCountForFeederResult(_: forField:) method may have the declaration:

```
func corpusCountForFeederResult(_ theFeederResult: [(fieldVal: String,
count: Int, score: Double)], forField theField: String) -> [(fieldVal:
String, count: Int, corpusCount: Int, score: Double)]
```

The declaration indicates that the method may take a first parameter of type tuple array of which each element of the array is a tuple whose first tuple component is of type string and has the element name fieldVal, whose second tuple element is of type int and has the component name count, and whose third tuple component is of type double and has the component name score. The declaration indicates that the first parameter may have the local parameter name theFeederResult and no external parameter name. The declaration further indicates that the method may take a second parameter of type string, the second parameter having the local parameter name theField and the external parameter name forField. The declaration additionally indicates that the method may have a return type of tuple array of which each element of the array is a tuple whose first tuple component is of type string and has the component name fieldVal, whose second tuple component is of type int and has the component name count, whose third tuple element is of type int and has the component name corpusCount, and whose fourth tuple component is of type double and has the component name score.

Returning to method feedWithDocNumAndScoreTupleArray(_: forField: andTokenSeparator: andPunctateDepth:), such method may, via its first parameter, receive a tuple array of the sort returned by rankForFieldInfoArray(_: andFieldJoiner:), that is to say a tuple array wherein each element of the array is a tuple which sets forth a job listing document number via its first tuple component and a corresponding relevancy score via its second tuple component. Via its second parameter—the parameter with the external parameter name forField—feedWithDocNumAndScoreTupleArray(_: forField: andTokenSeparator: andPunctateDepth:) may receive an indication of the job listing field with respect to which punctuation for the job listings conveyed by the first parameter may be performed. In one aspect, punctating over documents (e.g., job listing documents) with respect to a field set forth by those documents involves inspecting those documents (e.g., job listings), determining the values set forth by those documents for that field, and determining the set of unique values set forth. As an illustration, suppose that punctation was performed with respect to the job listing field nrmTtl, and that a first job listing set forth "construction manager" for its nrmTtl field, a second job listing set forth "scrummaster" for its nrmTtl field, a third job listing set forth "construction manager" for its nrmTtl field, a fourth job listing set forth "web project manager" for its nrmTtl field, a fifth job listing set forth "scrummaster" for its nrmTtl field, and a sixth job listing set forth "construction manager" for its nrmTtl field. Punctating over these job listings with respect to the nrmTtl field may result in the set of unique values "construction manager," "scrummaster," and "web project manager." It is noted that punctation may also return a count value which indicates the number of times that a given unique value occurred among the considered documents. Continuing with the punctation illustration, the count for unique value "construction manager" may be three because "construction manager" appears three times among the nrmTtl fields of the considered job listings, in particular the first, third and sixth job listings. In like vein the count for unique value "scrummaster" may be two due to that value occurring in the nrmTtl field of the second and fifth job listings. In further like vein the count for unique value "web project manager" may be one because that value occurs in the nrmTtl field of only one considered job listing, the fourth job listing.

Via its third parameter—the parameter with the external parameter name andTokenSeparator—the method may receive indication of a delimiter which may be employed by the field specified for forField for circumstances where multiple values are set forth. As an illustration, where the field specified for forField is nrmTtl and where the nrmTtl field employs a comma character as a delimiter when setting forth multiple values—therefore for example indicating three values via "construction project manager,engineering project manager,project manager"—specified for andTokenSeparator may be ",". Via its fourth parameter—the parameter with the external parameter name andPunctateDepth—the method may receive an indication of the quantity of punctation unique values to return. It is observed that the method, when complying with the quantity specified for andPunctateDepth, may eliminate from that which is returned punctation unique values having lower corresponding counts. As an illustration returning to the previous example of the punctation unique values being "construction manager" with a count of three, "scrummaster" with a count of two, and "web project manager" with a count of one, under the circumstance of 2 being passed for andPunctateDepth the method may opt to not return unique punctation value "web project manager" so as to comply with the specification of two for andPunctateDepth, thereby dropping lower count valued "web project manager" in favor of higher count valued "construction manager" and "scrummaster."

Method feedWithDocNumAndScoreTupleArray(_: forField: andTokenSeparator: andPunctateDepth:) may return via its tuple array one or more punctation unique values corresponding to the field specified by the passed-in forField parameter, where the quantity of returned punctation unique values does not exceed the value passed in for the andPunctateDepth parameter, and where specified for each indicated punctation unique value may firstly be a count value which indicates the quantity of times that the unique value occurs—within the forField-specified field—among the job listings conveyed by the passed in tuple array, and secondly the average of the relevance scores for the job listings of the passed in tuple array which—within the field specified by forField—set forth that unique value.

As a first illustration, suppose that feedWithDocNumAndScoreTupleArray(_: forField: andTokenSeparator: andPunctateDepth:) was called where passed for the first parameter was a tuple array in the vein of the example tuple array discussed as being returned in response to a call to rankForFieldInfoArray(_: andFieldJoiner:)—that is to say the example tuple array [("5JKL", 23.89), ("9WXY", 21.45), ("3DEF", 2.12)]—but with further tuple elements in the vein of those noted. Suppose further that passed for the forField parameter was "nrmTtl," passed for the andTokenSeparator parameter was ",", and passed for the andPunctateDepth parameter was 3. Method feedWithDocNumAndScoreTupleArray(_: forField: andTokenSeparator: andPunctateDepth:)—and/or the punctateForExpandedTupleArray(_: andPunctateDepth:) method called thereby—may consider the nrmTtl fields set forth by the job listings specified by the input tuple array and may determine the unique values set forth thereby. Moreover, for each such unique value determined may be the quantity of the input-tuple-array indicated job listings which set forth that value. Still further the job listing-corresponding relevancy scores included in the passed-in tuple array may be employed in computing—for each of the noted unique field values—the average relevancy score among those of the passed-in job listings which set forth that value. In doing the aforementioned, the value specified by the value passed for andPunctateDepth may be respected.

Hence, according to the first illustration returned by feedWithDocNumAndScoreTupleArray(_: forField: andTokenSeparator: andPunctateDepth:) may be the tuple array [("project manager-635", 18, 56.92), ("construction project manager-8159", 12, 41.32), ("construction manager-4458", 7, 22.12)]. As such the returned tuple array may indicate that, for the job listings indicated by the passed-in tuple array, the top three most frequently occurring nrmTtl values are "project manager-635," "construction project manager-8159," and "construction manager-4458." Further indicated by the returned tuple array may be that, of the job listings indicated by the passed-in tuple array, eighteen set forth "project manager-635," twelve set forth "construction project manager-8159," and seven set forth "construction manager-4458." Still further indicated by the returned tuple array may be that the average relevancy score of those of the job listings indicated by the passed-in tuple array which set forth via the nrmTtl field "project manager-635" is 56.92, that the average relevancy score of those of the job listings indicated by the passed-in tuple array which set forth via the nrmTtl field "construction project manager-8159" is 41.32, and that the average relevancy score of those of the job listings indicated by the passed-in tuple array which set forth via the nrmTtl field "construction manager-4458" is 22.12. With reference to the indication of dash-preceded values in connection with the unique nrmTtl field values set forth in the returned tuple array (e.g., the specification of "635" in "project manager-635") the following is noted. According to one or more embodiments normalized titles (e.g., as set forth via job listing nrmTtl fields) may have corresponding identifier values. Moreover job listing nrmTtl fields, in setting forth such normalized titles, may set forth the normalized title name (e.g., "project manager"), the normalized title identifier (e.g., "635"), or both (e.g., "project manager-635") with dash-character delimitation being employed between the normalized title name and identifier.

As a second illustration, suppose that feedWithDocNumAndScoreTupleArray(_: forField: andTokenSeparator: andPunctateDepth:) were called where passed for the method's parameters were the same values passed according to the first illustration except that passed for the forField parameter was "nrmKwd" rather than "nrmTtl." The method—or the punctateForExpandedTupleArray(_: andPunctateDepth:) method called thereby—may act as discussed in connection with the first illustration, but with respect to the nrmKwd field rather than with respect to the nrmTtl field. As such, according to the second illustration returned by feedWithDocNumAndScoreTupleArray(_: forField: andTokenSeparator: andPunctateDepth:) may be the tuple array [("project planning-3201", 39, 38.96), ("project tracking-5375", 26, 29.02), ("project estimates-5374", 22, 21.86)]. As such, the returned tuple array may indicate that, for the job listings indicated by the passed-in tuple array, the top three most frequently occurring nrmKwd values are "project planning-3201," "project tracking-5375," and "project estimates-5374."

Further indicated by the returned tuple array may be that, of the job listings indicated by the passed-in tuple array, thirty-nine set forth "project planning-3201," twenty-six set forth "project tracking-5375," and twenty-two set forth "project estimates-5374." Still further indicated by the retuned tuple array may be that the average relevancy score of those of the job listings indicated by the passed-in tuple array which set forth via the nrmKwd field "project planning-3201" is 38.96, that the average relevancy score of those of the job listings indicated by the passed-in tuple array which set forth via the nrmKwd field "project tracking-5375" is 29.02, and that the average relevancy score of those of the job listings indicated by the passed-in tuple array which set forth via the nrmKwd field "project estimates-5374" is 21.86. With reference to the indication of dash-preceded values in connection with unique nrmKwd values set forth in the returned tuple array (e.g., "project tracking-5375"), it is noted that such may be in keeping with that which was discussed in connection with the first illustration. As such, normalized keywords (e.g., as set forth via job listing nrmKwd fields) may have corresponding identifier values, and—for example—job listing nrmKwd fields in setting forth such normalized keywords may set forth the normalized keyword name, the normalized keyword identifier, or both.

At phase 615 the provideYPathNormalizedJobTitlesAndYPathNormalizedSkillsForInput(_:) method may call feedWithDocNumAndScoreTupleArray(_: forField: andTokenSeparator: andPunctateDepth:), passing—as illustrations—for the first parameter the tuple array received in response to calling rankForFieldInfoArray(_: andFieldJoiner:), passing for the forField parameter nrmTtl, passing for the andTokenSeparator parameter ",", and passing for the andPunctateDepth parameter 10. It is noted that although the foregoing example sets forth speciation of a punctate depth of ten, a different value may be passed instead (e.g., according to—in the vein of that which is discussed herein—automated selection, automated-assisted selection, and/or system administrator choice). Received by provideYPathNormalizedJobTitlesAndYPathNormalizedSkillsForInput (_:) in response to the method call a normalized title-corresponding tuple array of the sort noted.

At phase 617 provideYPathNormalizedJobTitlesAndYPathNormalizedSkillsForInput(_:) may again call feedWithDocNumAndScoreTupleArray(_: forField: andTokenSeparator: andPunctateDepth:), again passing for the first parameter the tuple array received in response to calling rankForFieldInfoArray(_: andFieldJoiner:), now passing for the forField parameter nrmKwd, again passing for the andTokenSeparator ",", and now passing for the andPunctateDepth parameter 20. It is noted that although the foregoing example sets forth a specification of a punctate depth of twenty, a different value may be passed instead (e.g., according to—in the vein of that which is discussed herein—automated selection, automated-assisted selection, and/or system administrator choice). Received by provideYPathNormalizediobTitlesAndYPathNormalizedSkillsForInput (_:) in response to the method call a normalized keyword-corresponding tuple array of the sort noted.

Method corpusCountForFeederResult(_: forField:) may receive for its first parameter a tuple array of the sort returned by feedWithDocNumAndScoreTupleArray(_: forField: andTokenSeparator: andPunctateDepth:) and for its second parameter a field name specification corresponding to the tuple array passed for the first parameter (e.g., passing for the second parameter the same field value which was passed to feedWithDocNumAndScoreTupleArray(_: forField: andTokenSeparator: andPunctateDepth:) for the call which yielded the tuple array passed to corpusCountForFeederResult(_: forField:) for the first parameter). Method corpusCountForFeederResult(_: forField:) may, for each field value included in the passed-in tuple array, and with regard to the passed-in field name, access an appropriate JobListingDocumentFrequencyEntity record so as to learn, for each such field value of the passed-in tuple array, the quantity of times which that field value is found in that field among the job listings of the corpus as set forth in that appropriate record's docFrequency field. As one example, tuple array pass-in of the value "scrummaster-9989" and a passed-in field name of nrmTtl, such JobListingDocumentFrequencyEntity access may find that there are ninety-six appearances of "scrummaster-9989"—within the nrmTtl field—among the job listings of the corpus. As such, corpusCountForFeederResult(_: forField:) may return a tuple array like the tuple array passed to it, but further including for each tuple of the array a tuple element which sets forth a corresponding corpus count of the sort discussed.

As such, at phase 619 provideYPathNormalizediobTitlesAndYPathNormalizedSkillsForInput(_:) may call corpusCountForFeederResult(_: forField:), passing for the first parameter the tuple array received in response to the call of phase 615 and passing for the second parameter nrmTtl. In response to the method call received may be a tuple array like the passed-in tuple array but further including the noted corpus count information.

In like vein, at phase 621 provideYPathNormalizedJobTitlesAndYPathNormalizedSkillsForInput(_:) may call corpusCountForFeederResult(_: forField:), passing for the first parameter the tuple array received in response to the call of phase 617 and passing for the second parameter nrmKwd. In response to the method call received may be a tuple array like the passed in tuple array but further including the noted corpus count information. At phase 623 provideYPathNormalizedJobTitlesAndYPathNormalizedSkillsForInput(_:) may pass to its caller the tuple array received in response to the call of phase 619, and the tuple array received in response to the call of phase 621. In particular, considering the tuple returned by provideYPathNormalizedJobTitlesAndYPathNormalizedSkillsForInput(_:), the tuple array received at phase 619 may be returned via the normTitles component of the tuple which provideYPathNormalizedJobTitlesAndYPathNormalizedSkillsForInput(_:) returns. And, the tuple array received at phase 621 may be returned via the normKwds component of the tuple which provideYPathNormalizedJobTitlesAndYPathNormalizedSkillsForInput (_:) returns.

Returning to phase 601, now discussed will be the scenario in which the user-provided job title text (e.g., as modified by the discussed blacklist or whitelist operations) may be subject to one or more of the discussed combinatory operations. Bearing in mind the at-hand scenario of one or more combinatory operations being applied, passed to the provideYPathNormalizedJobTitlesAndYPathNormalized- SkillsForInput(_:) method may be a multielement string array, wherein each element thereof sets forth a combinatory operation result of the sort discussed. For instance, discussed hereinabove were the combinatory operations wherein yielded from the modified job title "java mobile developer" were the combinatory operations outputs "java mobile," "java developer," "mobile developer," and "java mobile developer." As such, received via the method may be a multielement string array wherein the first element sets forth "java mobile," the second element sets forth "java developer," the third element sets forth "mobile developer," and the fourth element sets forth "java mobile developer."

Revisiting phase 603, at phase 603 the method may determine whether the string array passed to it is a single element or multielement string array (e.g., with the method, as discussed, checking the count property of the received array to determine whether or not count sets forth a value greater than one. As noted, where the method ascertains the received array to be a single element array (e.g., due to the count property setting forth one) flow may proceed to phase 607. And where as discussed above the method ascertains the received array to be a multielement array (e.g., due to the count property setting forth a value greater than one) flow may proceed to phase 605. In keeping with the at-hand scenario of the discussed combinatory operations being performed—and a corresponding determination of the received string array to be a multielement array—flow may proceed to phase 605. Discussed hereinabove in connection with phase 607 and the scenario of combinatory operations not being performed was interword placement by provideYPathNormalizedJobTitlesAndYPathNormalizedSkillsForInput(_:) of the word "OR" with respect to the string provided by the sole element of theInput. Moreover, discussed hereinabove in connection with phase 609 was provideYPathNormalizediobTitlesAndYPathNormalizedSkillsForInput(_:) selecting indexed job listing field rawTtl, and provideYPathNormalizedJobTitlesAndYPathNormalizedSkillsForInput(_:) instantiating a sole element FieldInfo array whose sole element was a FieldInfo object setting forth "rawTtl" for its fieldName property, and for its searchQueryForField property a string reflecting the noted interword "OR" placement.

In like vein, at phase 605—according to the at-hand scenario—provideYPathNormalizedJobTitlesAndYPathNormalizedSkillsForInput(_:) may likewise select indexed job listing field rawTtl, and may—for each of the received strings—perform interword placement, but placing "AND" interword rather than "OR." Still further at phase 605 provideYPathNormalizedJobTitlesAndYPathNormalizedSkillsForInput(_:) may instantiate a multielement FieldInfo array, where the FieldInfo array possesses an element for each of the received strings, each such element setting froth "rawTtl" for its fieldName property and for its searchQueryForField property a given one of the received strings as subjected to the noted interword placement of "AND."

Recalling the passed in multielement string array being available to provideYPathNormalizedJobTitlesAndYPathNormalizedSkillsForInput(_:) via local parameter theInput, the above discussed of phase 605 may be achieved via code in with the pseudocode:

```
var fieldInfoArray: [FieldInfo] = [FieldInfo]( )
for inputStringElement in theInput {
    var tempArray: [String] =
    inputStringElement.componentsSeparatedByString(" ")
    var tempAndedString: String =
```

-continued

```
tempArray.joinWithSeparator(" AND ")
    var elementToAppend: FieldInfo = FieldInfo( )
    elementToAppend.fieldName = "rawTtl"
    elementToAppend.searchQueryForField = tempAndedString
    fieldInfoArray.append(elementToAppend)
}
```

From phase 605 flow may proceed to phase 611, phase 611 now being performed under the scenario of the combinatory operations having been performed. At phase 611, provideYPathNormalizediobTitlesAndYPathNormalizedSkillsForInput(_:) may call doFilterQueryForFieldInfoArray(_:), passing for the sole parameter the multielement FieldInfo array created at phase 605 according to the at-hand scenario. Further to that which has been discussed hereinabove with respect to doFilterQueryForFieldInfoArray(_:) and called-thereby filterQueryForQuery(_: andField:) with respect to the circumstance of combinatory operations not having been performed, an example regarding the operation of those two methods will now be discussed for the at-hand scenario of the combinatory operations having been performed. According to this example, suppose that passed to doFilterQueryForFieldInfoArray(_:) by provideYPathNormalizediobTitlesAndYPathNormalizedSkillsForInput(_:) were a multielement FieldInfo array for which element [0] sets forth "rawTtl" for its fieldName property and "java AND mobile" for its searchQueryForField property, element [1] sets forth "rawTtl" for its fieldName property and "java AND developer" for its searchQueryForField property, element [2] sets forth "rawTtl" for its fieldName property and "mobile AND developer" for its searchQueryForField property, and element [3] sets forth "rawTtl" for its fieldName property and "java AND mobile AND developer" for its searchQueryForField property. The returned FieldInfo array may, in one aspect, set forth for each of elements [0] [3] fieldName and searchQueryForField values equivalent to those of the corresponding passed-in element (e.g., element [2] of the FieldInfo array may set forth "rawTtl" for its fieldName property and "mobile AND developer" for its searchQueryForField property). In another aspect, turning to the qfPassDocs property the returned FieldInfo array may, continuing with the example, set forth as follows: for element [0] ["12XKZ", "18JKS", "22YYZ", "51EJK"], for element [1] ["12XKZ", "19PPZ", "88JKJ"], for element [2] ["12XKZ", "36ZRS", "44QLT"], and for element [3] ["12XKZ", "95RJS", "13PZR"]. The qfPassDocs property of a given element may set forth the identifiers of job listings having fields specified by that element's fieldName property which satisfy the Boolean expression specified by that element's searchQueryForField property. As an illustration, for example element [2] the returned FieldInfo array sets forth for its qfPassDocs property ["12XKZ", "36ZRS", "44QLT"] as job listings which satisfy "mobile AND developer" (set forth by element [2]'s searchQueryForField property) via their rawTtl fields ("rawTtl" being set forth by element [2]'s fieldName property). To facilitate discussion, job listing document numbers such as, for instance, "44QLT" are set forth in these examples rather than, say, UUIDs. Moreover, although discussed has been the return of job listing document numbers, job listing discovery may not be the ultimate objective of provideYPathNormalizedJobTitlesAndYPathNormalizedSkillsForInput(_:). Instead, the job listings to which such document numbers correspond may be employed as seeds for further index-leveraging operations.

As noted above, the indexOperations object may provide methods including rankForFieldInfoArray(_: andFieldJoiner:), andFieldsHandlerForFieldInfoArray(_:), calculateScoreForTerm(_: forDocumentNumber: andFieldName:), and calculateNormContribForTerm(_: forDocumentNumber: andFieldName:). As also noted the later of these four methods may be called by the first of these four methods.

From phase 611 flow may proceed to phase 613, phase 613 now being performed with respect to the scenario of the discussed combinatory operations having been performed and a multielement array having been passed to provideYPathNormalizedJobTitlesAndYPathNormalizedSkillsForInput(_:). At phase 613 provideYPathNormalizediobTitlesAndYPathNormalizedSkillsForInput(_:) may call rankForFieldInfoArray(_: andFieldJoiner:), passing for the first parameter the FieldInfo array received, under the at-hand scenario of the combinatory operations having been performed, in response to the call of phase 611. For the second parameter of the call to rankForFieldInfoArray(_: andFieldJoiner:) provideYPathNormalizediobTitlesAndYPathNormalizedSkillsForInput(_:) may pass FieldJoinerKind.Or. For the scenario of combinatory operations having been performed, the FieldInfo array received in response to the call of phase 611 and passed as the first parameter of the method call of phase 613 may be a multielement FieldInfo array. As referenced, for the scenario of a multielement FieldInfo array being passed to rankForFieldInfoArray(_: andFieldJoiner:) that of FieldJoinerKind.Or and FieldJoinerKind.And which is passed as the second parameter in calling the method may affect that which is returned by the method.

With reference to that which is discussed hereinabove with respect to the operation of rankForFieldInfoArray(_: andFieldJoiner:) under the circumstance of combinatory operations not being performed, the following is noted. Method rankForFieldInfoArray(_: andFieldJoiner:) may in an aspect return relevancy scores corresponding to job listings indicated in the passed in FieldInfo array. Where a single element FieldInfo array is passed in (e.g., under the circumstance of combinatory operations not being performed) the method may return a relevancy score for each job listing of which it learns via the passed in FieldInfo array. Under the scenario of a multielement FieldInfo array being passed in the method may return relevancy scores for all of the job listings conveyed via the passed in FieldInfo array or may return relevancy scores for fewer than all of those job listings. Which of these outcomes arises may be dictated by which of FieldJoinerKind.Or and FieldJoinerKind.And is passed for the second parameter when calling the method.

In particular, where FieldJoinerKind.And is specified, in order for the method to return a relevancy score for a given job listing there may be call that the job listing be specified in each of the elements of the passed-in FieldInfo array. Where FieldJoinerKind.Or is specified, being specified by at least one of the elements of the passed-in FieldInfo array may be sufficient for a relevancy score to be returned for a given job listing.

As an illustration, considered is the above-discussed example FieldInfo array returned by filterQueryForQuery(_: andField:) wherein, with respect to the qfPassDocs property, array element [0] set forth ["12XKZ", "18JKS", "22YYZ", "51EJK"], element [1] set forth ["12XKZ", "19PPZ", "88JKJ"], element [2] set forth ["12XKZ", "36ZRS", "44QLT"], and element [3] set forth ["12XKZ", "95RJS", "13PZR"]. Where such example FieldInfo array is passed as the first parameter to rankForFieldInfoArray(_: andFieldJoiner:) and FieldJoinerKind.And is passed as the second parameter, as noted there may be call that a job listing be specified in each of the elements of the passed-in FieldInfo array in order for a relevancy score to be returned with respect to that job listing. For the at-hand example passed-in FieldInfo array only job listing "12XKZ" is specified in each of the elements of the passed-in FieldInfo array. As such, of the job listings specified by the passed-in FieldInfo array it is only job listing "12XKZ" for which a relevancy score may be returned. In complying with receiving FieldJoinerKind.And for its second parameter, rankForFieldInfoArray(_: andFieldJoiner:) may call noted andFieldsHandlerForFieldInfoArray(_:).

Where, in hand with the noted example FieldInfo array being passed for the first parameter, FieldJoinerKind.Or is instead passed for the second parameter the following may transpire. As noted, where FieldJoinerKind.Or is passed for the second parameter being specified by at least one of the elements of the passed-in FieldInfo array may be sufficient for the method to return a relevancy score for that job listing. As such, for the at-hand example passed-in FieldInfo array each of the job listings specified thereby may result in a returned corresponding relevancy score. As such the method may return relevancy scores for each of job listings 12XKZ, 18JKS, 22YYZ, 51EJK, 19PPZ, 88JKJ, 36ZRS, 44QLT, 95RJS, and 13PZR.

As referenced, that which of FieldJoinerKind.And and FieldJoinerKind.Or is passed as the second parameter to rankForFieldInfoArray(_: andFieldJoiner:) may dictate which job listings specified by the first parameter receive relevancy scores. As to the calculation of these job listing-wise relevancy scores the following is noted. Discussed hereinabove with respect to rankForFieldInfoArray(_: andFieldJoiner:) for the circumstance of the combinatory operations not being performed and a single element FieldInfo array being passed for the first parameter was job listing-wise relevancy score calculation with respect to the query specified by the passed-in FieldInfo array, where a relevancy score was calculated with respect to each of the qfPassDocs-indicated job listings for that query. In like vein, under the circumstance of FieldJoinerKind.Or being specified, with respect to each query set forth by the passed-in FieldInfo array a relevancy score for that query may be calculated with respect to each qfPassDocs-indicated job listing for that query. Then calculated scores may be summed job listing-wise (e.g., where a given job listing was a qfPassDocs-indicated job listing for a first, for a third, and for a fifth of the passed-in queries—and the job listing received a relevancy score of 10 with respect to the first query, of 22 with respect to the third query, and of 25 with respect to the fifth query—those three relevancy scores for the job listing may be summed to yield a total of 57).

Returning to the discussed example multielement passed-in FieldInfo array the following illustration is set forth. Element [0] of the array sets forth "rawTtl" for its fieldName property and "java AND mobile" for its searchQueryForField property. Moreover, element [0] sets forth ["12XKZ", "18JKS", "22YYZ", "51EJK"] for its qfPassDocs field. Suppose that calculating, in agreement with the above, a relevancy score for the query with respect to each of the qfPassDocs-indicated job listings yields the following relevancy scores: 12XKZ-36.0, 18JKS-12.0, 22YYZ-18.0, 51EJK-4.0. Then, element [1] of the array sets forth "rawTtl" for its fieldName property and "java AND developer" for its searchQueryForField property. Moreover, element [1] sets forth ["12XKZ", "19PPZ", "88JKJ"] for its qfPassDocs field. Suppose that calculating, in agreement with the above, a relevancy score for the query with respect to each of the qfPassDocs-indicated job listings yields the following relevancy scores: 12XKZ-46.0, 19PPZ-29.0, and 88JKJ-12.0.

Further according to the illustration, element [2] of the array sets forth "rawTtl" for its fieldName property and "mobile AND developer" for its searchQueryForField property. Moreover, element [2] sets forth ["12XKZ", "36ZRS", "44QLT"] for its qfPassDocs field. Suppose that calculating a relevancy score for the query with respect to each of the qfPassDocs-docs indicated job listings yields the following relevancy scores: 12XKZ-44.0, 36ZRS-29.0, and 44QLT-52.0. Finally, element [3] of the array sets forth "rawTtl" for its fieldName property and "java AND mobile AND developer" for its searchQueryForField property. Moreover, element [3] sets forth ["12XKZ", "95RJS", "13PZR"] for its qfPassDocs field. Suppose that calculating a relevancy score with respect to each of the qfPassDocs-indicated job listing fields yields the following relevancy scores: 12XKZ-6.0, 95RJS-27.0, and 13PZR-11.0.

Then—continuing with the illustration—performing the noted job listing-wise summing may yield the following. For 12XKZ a total of 132.0, reflecting the sum of 36.0 (the calculated relevancy score with respect to the query of element [0]), 46.0 (the calculated relevancy score with respect to the query of element [1]), 44.0 (the calculated relevancy score with respect to the query of element [2]), and 6.0 (the calculated relevancy score with respect to the query of element [3]). For 18JKS a sum of 12.0, the sum reflecting the calculated score for the query of element [0], the sole element which set forth 18JKS as a qfPassDocs-indicated job listing. For 22YYZ a sum of 18.0, the sum reflecting the calculated score for the query of element [0], the sole element which set forth 22YYZ as a qfPassDocs-indicated job listing. In like vein, calculated may be the following sums: 51EJK-4.0, 19PPZ-29.0, 88JKJ-12.0, 36ZRS-29.0, 44QLT-52.0, 95RJS-27.0, and 13PZR-11.0.

Under a circumstance of FieldJoinerKind.And being specified, operations may be akin to that just discussed with respect to the specification of FieldJoinerKind.Or, but first removing from consideration qfPassDocs-indicated job listings which do not meet the FieldJoinerKind criterion of being listed as a qfPassDocs-indicated job listing with respect to all of the specified queries. As such, returning to the noted example passed-in multielement FieldInfo array, only job listing 12XKZ meets the FieldJoinerKind criterion of being listed as a qfPassDocs-indicated job listing with respect to all of the FieldInfo array-specified queries. As such, all qfPassDocs-indicated job listings except for job listing 12XKZ may be removed from consideration. Such being the case, for element [0] it is only with respect to 12XKZ that the job listing relevancy score may be calculated (i.e., the noted score of 36.0). Likewise for element [1] it is only with respect to 12XKZ that the job listing relevancy score may be calculated (i.e., the noted score of 46.0). Further likewise, for element [2] it is only with respect to 12XKZ that the job listing relevancy score may be calculated (i.e., the score of 44.0). Also likewise, for element [3] it is only with respect to 12XKZ that the job listing relevancy score may be calculated (i.e., the score of 6.0). Then, performing the noted job listing-wise summing may involve summing only for the not-removed-from-consideration job listings, in this case only job listing 12XKZ. As such, calculated may be the 12XKZ total of 132.0, reflecting the sum of 36.0 (the calculated relevancy score for element [0]), 46.0 (the calculated relevancy score for element [1]), 44.0 (the calculated relevancy score for element [2]), and 6.0 (the calculated relevancy score for element [3]). It is reminded that although for the sake of completeness details regarding the passing of FieldJoinerKind.And have been discussed, for the at-hand example scenario of combinatory operations having been performed it is FieldJoinerKind.Or which was passed for the second parameter.

As per the foregoing which has been discussed with respect to the calling of rankForFieldInfoArray(_: andFieldJoiner:) under the scenario of the combinatory operations having been performed, returned by rankForFieldInfoArray (_: andFieldJoiner:) may be—in the vein of that discussed hereinabove with respect to the scenario of combinatory operations not having been performed—a tuple array of the sort noted which sets forth job listing document numbers and corresponding relevancy scores. Such a job listing-corresponding relevancy score tuple array in hand, flow for the scenario of combinatory operations having been performed may proceed (e.g., with respect to phase 615-phase 623) as discussed hereinabove with respect to the scenario of combinatory operations not having been performed.

As discussed hereinabove, for the circumstance of combinatory operations not having been performed the provideYPathNormalizediobTitlesAndYPathNormalizedSkillsForInput(_:) method placed "OR" interword with respect to the sole query. As also discussed hereinabove, for the circumstance of combinatory operations having been performed the provideYPathNormalizediobTitlesAndYPathNormalizedSkillsForInput(_:) method placed "AND" interword with respect to each of the multiple queries. Moreover, for the scenario of combinatory operations having been performed FieldJoinerKind.Or was passed by the provideYPathNormalizedJobTitlesAndYPathNormalizedSkillsForInput(_:) method. For the scenario of combinatory operations not having been performed there was only a single query, a scenario under which choice of FieldJoinerKind.Or versus FieldJoinerKind.And did not affect that which was output by rankForFieldInfoArray(_: andFieldJoiner:). Now discussed will be corresponding rationales.

Turning to the discussed scenario of combinatory operations not having been performed, the noted placement of OR interword may, due to its setting forth a less-restrictive Boolean query, be seen as providing for a potential return of a larger quantity of job listing document numbers than the quantity of job listing document numbers returned under the scenario of placing AND interword. To the extent that such less restrictive Boolean expression may, considered alone, be feared overly inclusive—perhaps matching tangentially-related job listings (e.g., under the scenario of query "java OR mobile OR developer" with respect to field nrmTtl a job listing having a nrmTtl field including "real estate developer" may satisfy the query)—a corrective counterbalance may be viewed as arising via the call to rankForFieldInfoArray(_: andFieldJoiner:). In particular, the relevancy scoring provided by the called method may be expected to provide higher ranking to job listings which set forth a greater number of query words (e.g., under the scenario of query "java OR mobile OR developer" with respect to field nrmTtl a job listing having a nrmTtl field including "real estate developer" may be expected to receive a lower relevancy score than a job listing having a nrmTtl field including "java developer" due to the latter job listing's field setting forth a greater quantity of the query words than that of the former job listing. On the other hand, having instead set AND interword may be considered to have been overly exclusive in view of its more restrictive Boolean query (e.g., under the scenario of query "java AND mobile AND developer" with respect to field nrmTtl the noted job listing having a nrmTtl field including "java developer" may not be identified despite it perhaps being viewable as an appropriate job listing). Nevertheless, according to one or more embodiments interword placement of AND might be the course of action for the scenario of combinatory operations not being performed (e.g., automated analysis might, say, apply such interword OR placement for a certain period of time and/or for a certain pool of users, apply such interword AND placement for another period of time and/or for another pool of users, and then quantify by some metric—say downstream resultant job views, job applications, and/or job listing hires—the success of interword OR placement versus interword AND placement; such quantification result might be leveraged in selecting—say in an automated fashion—which of interword OR placement and interword AND placement to employ).

Turning to the discussed scenario of combinatory operations being performed, discussed herein has been interword AND placement with respect to each of the multiple queries arising from the combinatory operations, and employ of FieldJoinerKind.Or. To the extent that such setting forth of a more restrictive Boolean query (e.g., than that which may arise from interword OR placement) might be feared to be overly exclusive, one corrective counterbalance might be viewed as arising due to the employ of more inclusive FieldJoinerKind.Or (e.g., more inclusive than employ of FieldJoinerKind.And). As an illustration, where set forth multiple queries—with respect to field nrmTtl—arising from the combinatory operations included "java AND mobile AND developer," "java AND mobile," "java AND developer," and "mobile AND developer," while a job listing having a nrmTtl field including "java developer" may not meet the Boolean expressions "java AND mobile AND developer," "java AND mobile," or "mobile AND developer," it may meet the Boolean expression "java AND developer." Then, due to the application of FieldJoinerKind.Or causing it to be the case that a job listing satisfying a single one of the multiple queries would allow it to be considered further, the job listing may be the subject of a returned relevancy score. Under for instance the scenario of combinatory operations being performed, the discussed relevancy score operations may be expected to assign higher scores to job listings which score better for particular ones of the multiple queries, and/or which score well for—bearing in mind the discussed job-wise relevancy score summing—a greater quantity of the multiple queries. The alternatives to placement of AND interword and FieldJoinerKind.Or may perhaps be viewed as less than ideal. For instance keeping AND as the interword joiner but instead using FieldJoinerKind.And as the field joiner may be viewed as establishing an overly-restrictive scenario since, for a relevancy score to be returned for a job listing, there may consequentially be call that such job listing satisfy all words of all queries. The employ of not just OR interword but also FieldJoinerKind.Or might be viewed as being overly inclusive due to the employ of the less restrictive alternative with respect to both that which is employed interword and that which is employed as field joiner. The employ of OR interword and FieldJoinerKind.And may perhaps be viewed as being somewhat like the employ of AND interword and FieldJoinerKind.Or due to it pairing one less-restrictive alternative with one more-restrictive alternative. That which of on one hand AND interword and FieldJoinerKind.Or, and on the other hand OR interword and FieldJoinerKind.And is employed may be decided upon, for instance, based on automated analysis in the vein of that discussed. Via such analysis it might be determined, for example, that of these two alternative it is the employ of AND interword and FieldJoinerKind.Or which led to more satisfactory quantified results (e.g., quantified results of the sort discussed).

With further regard to the tuple returned by provideYPathNormalizedJobTitlesAndYPathNormalizedSkillsForInput(_:) in connection with phase 623—under either the scenario of combinatory operations not having been performed or the scenario of combinatory operations having been performed—the following is noted. Formulated (e.g., via action of the method which called provideYPathNormalizedJobTitlesAndYPathNormalizedSkillsForInput(_:)—and thusly via for instance the action of resumesAndStoreForNewJobListing(_:)) from the tuple array returned by provideYPathNormalizedJobTitlesAndYPathNormalizedSkillsForInput(_:) may, for example, be a string array for which each element thereof sets forth normalized keyword descriptive text, a dash character, and the corresponding normalized keyword identifier (e.g., an element of the array may set forth "project planning-3201"). Taking the tuple returned by provideYPathNormalizedJobTitlesAndYPathNormalizedSkillsForInput(_:) to be held in the object providerResult, such a string array may be created (e.g., by resumesAndStoreForNewJobListing(_:)) via code in line with the pseudocode var yPathNormalizedKeywordsHolder: [String]=providerResult.normKwds.map({$0.fieldVal}), by which the noted string array has the name yPathNormalizedKeywordsHolder. As an illustration, such string array may come to be stored in a yPathNormalizedKeywords property of the conductor object.

With still further regard to the tuple returned by provideYPathNormalizedJobTitlesAndYPathNormalizedSkillsForInput(_:) in connection with phase 623—under either the scenario of combinatory operations not having been performed or the scenario of combinatory operations having been performed—the following is also noted. Formulated (e.g., via the action of the method which called provideYPathNormalizedJobTitlesAndYPathNormalizedSkillsForInput(_:)—and thusly for instance via the action of resumesAndStoreForNewJobListing(_:)) from the tuple array returned by provideYPathNormalizedJobTitlesAndYPathNormalizedSkillsForInput(_:) may be, for example, a string array for which each element thereof sets forth normalized job title descriptive text, a dash character, and the corresponding normalized job title identifier (e.g., an element of the array may set forth "project manager-635"). In like vein to that which has been discussed in connection with normalized keyword, taking the tuple returned by provideYPathNormalizedJobTitlesAndYPathNormalizedSkillsForInput(_:) to be held in the object providerResult, such a string array may be created via code in line with the pseudocode var yPathNormalizedTitlesHolder: [String]=providerResult.normTitles.map ($0.fieldVal), by which the noted string array has the name yPathNormalizedTitlesHolder. As an illustration, such string array may come to be held in a yPathNormalizedTitles property of the conductor object.

Turning to the X-path normalized skills, as one example according to one or more embodiments a user providing a job listing may be presented with one or more normalized job skills and be prompted to select one or more of those normalized skills as ones which she thinks to be appropriate for the job listing being provided. Such functionality may be provided by a method doXPathNormalizedSkillsBySelection( ). The method may have the declaration:

func doXPathNormalizedSkillsBySelection( )→String

As such the declaration indicates that the method may take no parameters and may return a string. The method may, for instance, be indicated to be an action method by including in its declaration, ahead of "func," "@IBAction." According to one or more embodiments the method may be set forth by the conductor object and may be called by the resumesAndStoreForNewJobListing(_:) method of the conductor object. Turning to the method presenting one or more normalized skills to the user and prompting for user selection of one or more of those normalized skills the following is noted. As one example the presentation and prompting for selection may, in keeping with the Swift/Apple frameworks pseudocode employed herein, be implemented via one or more instantiated UISwitch objects. As another example such presentation and prompting for user selection may be implemented via one or more HTML <input> elements of type "checkbox." As such, the user providing the job listing may be presented with a listing of one or more normalized skills where presented with each is a checkbox GUI element and/or an on-off slider GUI element via which the user may tick the checkbox and/or flip the switch to "on" so as to indicate that the corresponding normalized skill may be associated with the job listing being provided. The normalized job skills display may be grouped and/or hierarchical in nature. As an illustration, normalized skills related to food service, along with their corresponding checkboxes and/or sliders may be grouped under user-visible heading "food service." The "food service" label may for example be presented via an instantiated UILabel and/or via HTML text. User-visible text may be presented in connection with a given checkbox and/or slider element to convey the normalized skill which may be chosen by activating that checkbox or slider. As examples, next to a particular normalized skill may be the text "construction management." Such normalized skill text may be implemented via an instantiated UILabel and/or via an HTML <label> element.

Turning to determination of user selection of a given normalized skill, where one or more UISwitch objects are employed an action method may—as an illustration—be associated with the UISwitch objects. With the user toggling a given UISwitch associated with a given normalized skill, the action method may be called. The method may have the declaration func checkboxToggled(_sender: AnyObject), where the declaration indicates that the method may take a single parameter of type AnyObject, the single parameter having the local parameter name sender and having no external parameter name. Where the user toggles a given UISwitch object, thusly causing the action method to be called, the method may access the activating UISwitch object via the sender parameter. As such, in the case of UISwitch employ the method may in one aspect query the on property of sender and determine whether or not this property holds the Boolean value true. Where it does the method may consider the switch to have been flipped to on by the user. Otherwise the method may consider the switch to have been flipped to off by the user. The method may additionally determine the particular UISwitch object which was toggled by querying the tag property of sender. Each UISwitch object may be associated with a different numerical tag value such that the action may, via the tag value of sender, know the UISwitch object which was toggled.

As such, where the action method determines that the user has flipped the switch which corresponds to a given tag value, the method may consider the user to have elected the normalized skill associated with that tag value. As an illustration, where a tag value of 3201 were associated with the switch corresponding to the normalized skill "project planning" and the action method determined the job listing-providing user to have flipped the switch with tag 3201 to on, the method may consider the user to have elected that normalized skill.

Further regarding user selection of a given normalized skill, where there is employ of one or more HTML <input> elements of type "checkbox" it may be the case that functionality is in the vein of the scenario where a UISwitch object is employed and a tag value is associated with that UISwitch, the tag value mapping to a given normalized skill. In particular, associated with each such checkbox <input> element may be an HTML id attribute which maps to a given normalized skill. Via calling getElementById( ) on the at-hand document object where passed as the sole parameter of the call is the HTML id of a given checkbox, that given checkbox may be accessed. Then the checked/unchecked status of the checkbox so accessed may be determined by inspecting the value of the checked property of that checkbox. For instance, taking document to provide access to the at-hand document object, code in line with the pseudocode var inspectedCheckbox=document.getElementById ("3201") may allow access to the checkbox associated with id 3201 via object inspectedCheckbox. Then via code in line with the pseudocode inspectedCheckbox.checked the noted checked property may be examined as to Boolean value. Where inspectedCheckbox.checked holds true the user may be considered to have elected the normalized skill associated with id 3201. Where inspectedCheckbox.checked holds false the user may be considered to have not elected the normalized skill associated with id 3201.

As such, via the employ of one or more UISwitch objects and/or one or more HTML <input> elements of type "checkbox" selection by the job listing-providing user of one or more normalized skills may be known. According to one or more embodiments created may be a string reflecting the normalized skills elected by the job listing-providing user. The string may include the discussed numerical identifiers (e.g., 3201), the discussed textual descriptions (e.g., project planning), or both. As an illustration, suppose the discussed ascertaining of switches set to on and/or of checkboxes ticked by the job listing-providing user found that user to have elected normalized skill "project planning" associated with numerical identifier 3201, normalized skill "project estimates" associated with numerical identifier 5374, and normalized skill "project schedule" associated with numerical identifier 7531. As one example, the created string may be "3201,5374,7531." As another example the created string may be "project planning,project estimates,project schedule." As yet another example the created string may be "project planning-3201,project estimates-5374,project schedule-7531." The created string (e.g., "project planning-3201,project estimates-5374,project schedule-7531") may be the string returned by doXPathNormalizedSkillsBySelection( ).

As such, by way of such via-GUI election of one or more normalized skills, X-path normalized skills may be established. Further regarding X-path normalized skills, the job listing itself that the job listing-providing user supplies may, as another example, be employed in establishing X-path normalized skills. Such functionality may be provided by a method doXPathNormalizedSkillsByJobListingText(_:). The method may have the declaration:

func doXPathNormalizedSkillsByJobListingText(_ theJobListingText: String) -> String As such, the declaration indicates that the method may take a single parameter of type string, the single parameter having the local parameter name theJobListingText and no external parameter name. The declaration further indicates that the method may have a return type of string. According to one or more embodiments the method may be set forth by the xYPathsHandler object and may be called by the resumesAndStoreForNewJobListing(_:) method of the conductor object. The passed sole parameter of the call may, according to one or more embodiments, be the discussed string setting forth qualifications and duties obtained from the user-provided job listing (e.g., qualifications and duties set forth via a qualifications and duties section of that job listing). As an example, the job listing may be provided via entry performed by the job listing-providing user, and/or via upload. Operation of the doXPathNormalizedSkillsByJobListingText(_:) method will now be discussed.

According to one or more embodiments, there may be a stored record for each normalized keyword and each such normalized keyword record may be indexed. Such a normalized keyword record may conform to the entity definition:

| Field Name | Data Type |
| --- | --- |
| docNum | String |
| normalizedKeywordId | String |
| normalizedKeyword | String |

Such entity may be given the name NormalizedKeywordEntity. As one illustration, a record conforming to this entity definition may hold date in accordance with the following:

| Field Name | Value |
| --- | --- |
| docNum | D4B428C3-9679-4237-9C95-8EA6634B3606 |
| normalizedKeywordId | 3201 |
| normalizedKeyword | project planning |

As referenced there may be such a record for each normalized keyword and these normalized keyword records may be indexed. As such index-leveraging operations may be performed with respect to the indexed normalized keywords. As an example of such index-leveraging operations performed with respect to such indexed normalized keywords, the rankForFieldInfoArray(_: andFieldJoiner:) method may be called with respect to received parameter theJobListingText which may, according to one or more embodiments, be the discussed-herein qualifications and duties obtained from the user-provided job listing. So as to wield the rankForFieldInfoArray(_: andFieldJoiner:) method in connection with the indexed normalized keywords and further in connection with received parameter theJobListingText, the call to the method may pass as the first parameter a single element FieldInfo array. In particular, the single element may be a FieldInfo object whose fieldName property is set to the string "normalizedKeyword," whose searchQueryForField property is set to received parameter theJobListingText, and whose qfPassDocs property is set to a string array conveying the normalizedKeywordIds of all NormalizedKeywordEntity records. As examples, a string array holding the normalizedKeywordIds of all NormalizedKeywordEntity records may be available by accessing a property of an object and/or by calling a method of an object (e.g., accessing, with respect to a certain object, a property entitled allNormalizedKeywordIds may yield a string array conveying the normalizedKeywordIds of all NormalizedKeywordEntity records). The string array received from the object—via the noted property access or in reply to the method call—may be set for the noted qfPassDocs property. Moreover, the call to the rankForFieldInfoArray(_: andFieldJoiner:) method may pass as the andFieldJoiner parameter FieldJoinerKind.Or. As for the at-hand employ of the method a single field—normalizedKeyword—is in play and as such no field joining is to be performed, either FieldJoinerKind.Or or FieldJoinerKind.And may, as referenced herein, be passed to the method without causing operational difference. So as to facilitate discussion, employ of FieldJoinerKind.Or is set forth.

For each normalized keyword there may be a record of type NormalizedKeywordEntity which holds the corresponding normalized keyword in the normalizedKeyword field, and these records may be indexed with respect to those normalizedKeyword fields. In keeping with this the noted specification, via the fieldName property of the passed FieldInfo object, of normalizedKeyword in the method call directs the attention of the method to the normalizedKeyword field when consulting the index. The specification, via the qfPassDocs property of the passed FieldInfo object, of the string array conveying the normalizedKeywordIds of all NormalizedKeywordEntity records causes the method to consider all of the normalized keywords. The specification, via the searchQueryForField property of the passed FieldInfo object, of received parameter theJobListingText (e.g., setting forth the noted qualifications and duties obtained from the user-provided job listing) causes the method to consider that which is set forth by theJobListingText. The rankForFieldInfoArray(_: andFieldJoiner:) method called as discussed may calculate a rank score for each normalized keyword vis-a-vis that which is set forth by theJobListingText.

Rank score calculation for a given normalized keyword may consider that which might perhaps be thought of as quality of fit between that normalized keyword and theJobListingText. In keeping with this, a normalized keyword which experiences better quality of fit with respect to theJobListingText may receive a higher score than a normalized keyword which experiences a lesser quality of fit with respect to theJobListingText. As an illustration, suppose that theJobListingText in part included "duties include the planning of projects," and did not, say, discuss meals or food. A normalized keyword "project planning" might be expected to experience better quality of fit with respect to theJobListingText than would normalized keyword "meal planning" (e.g., with rankForFieldInfoArray(_: andFieldJoiner:) employing stemming such that "project" and "projects" match due to both mapping the same stem word, say "project"). In keeping with this the rankForFieldInfoArray (_: andFieldJoiner:) method may return an array of tuples, where each tuple of the array conveys a normalized keyword (e.g., via the docNum of that normalized keyword) and a score reflecting the quality of fit of that normalized keyword to theJobListingText, the array being sorted in order of score, with higher scores being listed first.

According to one or more embodiments one or more of such tuple-conveyed normalized keywords may be chosen as the X-path normalized skills for the job listing. As such, for instance, the first n elements of the array of tuples may be considered further. As one illustration n may be selected as five. Suppose, for example, the results tuple array returned by rankForFieldInfoArray(_: andFieldJoiner:) were held in an array entitled resultsTupleArray, and that the value of n were held in an integer object entitled n (e.g., with n holding 5). A tuple array made up of the first n elements of resultsTupleArray may be produced via code in line with the Swift/Apple frameworks-based pseudocode var topNTupleArray=resultsTupleArray[0 . . . (n−1)].

The normalized keywords corresponding to topNTupleArray may then be fetched and added to an array setting forth, as the X-path normalized skills for the at-hand job listing, the top n normalized keywords yielded by rankForFieldInfoArray(_: andFieldJoiner:). Such an array may be yielded via code in line with the following pseudocode:

```
var normalizedKeywordFetchRequest = NSFetchRequest(entityName:
"NormalizedKeywordEntity")
var fetchedNormalizedKeyword: String = String( )
var xPathNormalizedKeywords: [String] = [String]( )
for topNTuple in topNTupleArray {
   normalizedKeywordFetchRequest.predicate = NSPredicate(format: "%@ ==
normalizedKeywordId", topNTuple.0)
   var normalizedKeywordFetchResult =
managedObjectContext.executeFetchRequest(normalizedKeywordFetchRequest)
   fetchedNormalizedKeyword =
normalizedKeywordFetchResult[0].valueForKey("normalizedKeyword")
   xPathNormalizedKeywords.append(fetchedNormalizedKeyword)
}
```

It is noted that according to one or more embodiments the yielded array may be formulated so as to set forth both the normalized keywords themselves and their corresponding identifiers. For instance, each element of such an array might set forth the text for a normalized keyword, a dash character, and the corresponding normalizedKeywordId (e.g., an element of the array might set forth "project planning-3201"). Under such an embodiment the above pseudocode xPathNormalizedKeywords.append(fetchedNormalizedKeyword) might instead be xPathNormalizedKeywords.append("\(fetchedNormalizedKeyword)-\(topNTuple.0)"). A comma-delimited string corresponding to the array may be yielded by calling joinWithSeparator(",") on the array. Such string may be returned by doXPathNormalizedSkillsByJobListingText(_:) as the result of the method.

As noted herein, where GUI selection of normalized skills occurs possessed may be the skill identifiers of those normalized skills which have been selected. In a manner analogous to that which has been just discussed with respect to employing the job listing itself in establishing X-path normalized skills, such normalized skill identifiers arising via the GUI selection may be employed in fetching corresponding normalized keywords. In likewise analogous fashion, instantiated with respect to GUI-selected normalized skills may be an array of the sort noted (e.g., a string array for which each element sets forth a normalized keyword, a dash character, and the corresponding normalizedKeywordId). A comma-delimited string formulated from that array (e.g., yielded by calling joinWithSeparator(",") on the array) may be the string returned by doXPathNormalizedSkillsBySelection( ).

As referenced, according to one or more embodiments there may be two sets of normalized skills, the X-path normalized skills and the Y-path normalized skills. As noted, the X-path normalized skills may arise due to operations which make use of via-GUI skills selection performed by a user providing a job listing, or due to operations which make use of such a job listing itself. As also noted, the Y-path normalized skills may arise due to operations which make use of job title text provided by the job listing-submitting user. Moreover, as discussed for each of the X-path normalized skills and the Y-path normalized skills may be a property of the conductor object which sets forth indications of normalized keyword descriptive text, a dash character, and the corresponding normalized keyword identifier (e.g., such an indication might set forth "project planning-3201"). Such X-path normalized skills property of the conductor object may be a comma-delimited string and have the name xPathNormalizedSkills. Such Y-path normalized skills property of the conductor object may be a string array and have the name yPathNormalizedSkills.

Referenced above was resumeLibrarian object method returnResumesForXPathNormalizedKeywords(_: andYPathNormalizedKeywords: andYPathNormalizedTitles:). Turning now to FIG. 7, among that which will be discussed will be further details regarding this method. At phase 701 the returnResumesForXPathNormalizedKeywords(_: andYPathNormalizedKeywords: andYPathNormalizedTitles:) method of the resumeLibrarian object (e.g., corresponding to an instantiation of a ResumeLibrarian class) may be called. The method may have the declaration:

```
func returnResumesForXPathNormalizedKeywords(_
   theXPathNormalizedKeywords: [String], andYPathNormalizedKeywords
   theYPathNormalizedKeywords: [String], andYPathNormalizedTitles
   theYPathNormalizedTitles: [String] ) -> [FetchedResumeRecord]
```

The declaration indicates that the method may take a first parameter of type string array, the first parameter having the local parameter name theXPathNormalizedKeywords and no external parameter name. The declaration further indicates that the method may take a second parameter of type string array, the second parameter having the local parameter name theYPathNormalizedKeywords and the external parameter name andYPathNormalizedKeywords. Still further, the declaration indicates that the method may take a third parameter of type string array, the third parameter having the local parameter name theYPathNormalizedTitles and the external parameter name theYPathNormalizedTitles. The declaration additionally indicates that the method may have a return type of [FetchedResumeRecord], as such indicating the return of an array, the elements of which are FetchedResumeRecord objects.

FetchedResumeRecord may be defined as a class:

```
class FetchedResumeRecord {
   var docNum: String = ""
   var rawTtl: String = ""
   var rawKwd: String = ""
   var nrmTtl: String = ""
   var nrmKwd: String = ""
```

```
    var extraData: String = ""
    var relevancyScore: Double = 0.0
}
```

Accordingly, the class may include a property docNum of type string, a property rawTtl of type string, a property rawKwd of type string, a property nrmTtl of type string, a property nrmKwd of type string, a property extraData of type string, and a property relevancyScore of type double. As such, the class definition may reflect the discussed-herein entity definition ResumeEntity, but with the additional conveyance of a relevancy score.

Passed for the first two parameters of the method call to returnResumesForXPathNormalizedKeywords(_: andYPathNormalizedKeywords: andYPathNormalizedTitles:) may, respectively, be the noted xPathNormalizedSkills string property of the conductor object cast as a string array (e.g., by calling componentsSeparatedByString(",") on that property) and the noted yPathNormalizedSkills string array property of the conductor object. Passed for the third parameter may be the noted yPathNormalizedTitles string array property of the conductor object. The method call may be performed by the method which called provideYPathNormalizediobTitlesAndYPathNormalizedSkillsForInput (_:) (e.g., resumesAndStoreForNewlobListing(_:) may call returnResumesForXPathNormalizedKeywords(_: andYPathNormalizedKeywords: andYPathNormalizedTitles:)).

The returnResumesForXPathNormalizedKeywords(_: andYPathNormalizedKeywords: andYPathNormalizedTitles:) method may act to create from received parameter theXPathNormalizedKeywords and received parameter theYPathNormalizedKeywords a unified bank of normalized keywords. As one illustration, an approach may be taken in which there may be call that a given normalized keyword exist in both of received parameter theXPathNormalizedKeywords and received parameter theYPathNormalizedKeywords in order to be included in the unified bank. As another illustration, an approach may be taken in which a given keyword being in either of received parameter theXPathNormalizedKeywords and received parameter theYPathNormalizedKeywords may be sufficient for that normalized keyword to be included in the unified bank. The choice as to which of these approaches is employed may, for example, be made based upon automated analysis in the vein of the sort discussed herein (e.g., automated analysis might, say, apply the first of these two approaches for a certain period of time and/or for a certain pool of users, apply the second of these two approaches for another period of time and/or for another pool of users, and quantify by some metric—say downstream result resume views, resume interview extensions, resume job offers, and/or hires—the success of the first approach versus the second approach; such quantification result might be leveraged in selecting—say in an automated fashion—which of the two approaches to employ). According to one or more embodiments, recordation of the elected approach may be made. For instance, a property of the resumeLibrarian object may be set to reflect the elected approach. As an illustration, such may be recorded in a property bankUnifier of type BankUnifierKind, where BankUnifierKind is defined as an enum:

```
enum BankUnifierKind {
    case Intersection
    case Union
}
```

At phase 703 returnResumesForXPathNormalizedKeywords(_: andYPathNormalizedKeywords: andYPathNormalizedTitles:) may ascertain the elected approach (e.g., the method may check the bankUnifier property). Where the method ascertains that the elected approach is the first approach (e.g., the method finds bankUnifier to hold BankUnifierKind.Intersection) flow may proceed to phase 705. Where the method ascertains that the elected approach is the second approach (e.g., the method finds bankUnifier to hold BankUnifierKind.Union) flow may proceed to phase 707. Where the first approach is pursued, at phase 705 a string array (e.g., having elements such as "project planning-3201") which reflects a set intersection-wise unified bank may be formulated via code in line with the pseudocode:

```
var setOfXPathNormalizedKeywords: Set = Set(theXPathNormalizedKeywords)
var setOfYPathNormalizedKeywords: Set = Set(theYPathNormalizedKeywords)
var intersectSetOfUnifiedNormalizedKeywords: Set =
setOfXPathNormalizedKeywords.intersect(setOfYPathNormalizedKeywords)
var arrayOfUnifiedNormalizedKeywords: [String] =
[String](intersectSetOfUnifiedNormalizedKeywords)
```

Where the second approach is pursued, at phase 707 a string array (e.g., having elements such as "project planning-3201") which reflects a set union operation-wise unified bank may be formulated via code in line with the pseudocode:

```
var setOfXPathNormalizedKeywords:
Set = Set(theXPathNormalizedKeywords)
var setOfYPathNormalizedKeywords:
Set = Set(theYPathNormalizedKeywords)
var unionSetOfUnifiedNormalizedKeywords: Set =
setOfXPathNormalizedKeywords.union(setOfYPathNormalizedKeywords)
var arrayOfUnifiedNormalizedKeywords: [String] =
[String](unionSetOfUnifiedNormalizedKeywords)
```

As such, instantiated with respect to the pursued approach may be a string array arrayOfUnifiedNormalizedKeywords setting forth the unified bank of normalized keywords as subjected to the pursued approach. Further to having arrayOfUnifiedNormalizedKeywords at its disposal, returnResumesForXPathNormalizedKeywords(_: andYPathNormalizedKeywords: andYPathNormalizedTitles:) may have access to the third passed parameter, that is to say the parameter having the local parameter name theYPathNormalizedTitles. In pursuit of identifying resumes which may be relevant to the job listing which is being provided, returnResumesForXPathNormalizedKeywords(_:

andYPathNormalizedKeywords: andYPathNormalizedTitles:) may call discussed-hereinabove doFilterQueryForFieldInfoArray(_:) and rankForFieldInfoArray(_: andFieldJoiner:) methods of the indexOperations object. So as to leverage in those method calls that which is set forth in arrayOfUnifiedNormalizedKeywords and theYPathNormalizedTitles, returnResumesForXPathNormalizedKeywords(_: andYPathNormalizedKeywords: andYPathNormalizedTitles:) may create a FieldInfo array which corresponds to these two string arrays and which may be applied in calls to these two methods.

With reference to that which is discussed herein with respect to, to instance, the Y-path normalized skills, passed to doFilterQueryForFieldInfoArray(_:) may be a single or multielement FieldInfo array for which each element thereof sets forth a Boolean expression via its searchQueryForField property and a corresponding field via its fieldName property. Moreover, with reference to that which is discussed herein with respect to, for instance, the Y-path normalized skills, doFilterQueryForFieldInfoArray(_:) may, in response to such a FieldInfo array, return a FieldInfo array wherein—for a given element thereof—the fieldName property sets forth the same value as the fieldName property of the corresponding element of the passed-in FieldInfo array, the searchQueryForField property sets forth the same value as the searchQueryForField property of the corresponding element of the passed-in FieldInfo array, and the qfPassDocs property sets forth a string array wherein each element of the string array sets forth the document number of a document—which for the at-hand circumstance may be a resume—for which the field as specified by the noted fieldName property satisfies the Boolean expression set forth by the noted searchQueryForField property.

From either phase 705 or phase 707 flow may proceed to phase 709 where returnResumesForXPathNormalizedKeywords(_: andYPathNormalizedKeywords: andYPathNormalizedTitles:) may perform the referenced creation of a FieldInfo array which corresponds to the two string arrays. As one aspect of such FieldInfo array creation, the method may create with respect to each of the string arrays a string which sets forth—as a sole string—the elements of that string array where "OR" (i.e., a space character, followed by "OR," followed by another space character) is placed interelement relative to the string array (e.g., where theYPathNormalizedTitles sets forth ["project manager-208", "site manager-5438", "assistant project manager-3086"] the corresponding string may set forth "project manager-208 OR site manager-5438 OR assistant project manager-3086."

The method may create such strings via code in line with the pseudocode:

```
var oredUnifiedNormalizedKeywordsString: String =
arrayOfUnifiedNormalizedKeywords.joinWithSeparator(" OR ")
var oredTheYPathNormalizedTitlesString: String =
theYPathNormalizedTitles.joinWithSeparator(" OR ")
```

As further aspects of such FieldInfo array creation the method may employ code in line with the following pseudocode:

```
var firstElementToAppend: FieldInfo = FieldInfo( )
firstElementToAppend.searchQueryForField =
oredUnifiedNormalizedKeywordsString
firstElementToAppend.fieldName = "nrmKwd"
var secondElementToAppend: FieldInfo = FieldInfo( )
secondElementToAppend.searchQueryForField =
oredTheYPathNormalizedTitlesString
secondElementToAppend.fieldName = "nrmTtl"
var resumeSearchFieldInfoArray: [FieldInfo] = [FieldInfo]( )
resumeSearchFieldInfoArray.append(firstElementToAppend)
resumeSearchFieldInfoArray.append(secondElementToAppend)
```

As such, established may be a FieldInfo array which sets forth a first element which specifies a Boolean expression oredUnifiedNormalizedKeywordsString and indicates that doFilterQueryForFieldInfoArray(_:) may consider that Boolean expression with respect to the nrmKwd field of available resumes, and a second element which sets forth a Boolean expression oredTheYPathNormalizedTitlesString and indicates that doFilterQueryForFieldInfoArray(_:) may consider that Boolean expression with respect to the nrmTtl field of available resumes.

With reference to that which is discussed hereinabove regarding doFilterQueryForFieldInfoArray(_:) (e.g., in connection with discussion of Y-path normalized keywords), it is noted that at phase 711 returnResumesForXPathNormalizedKeywords(_: andYPathNormalizedKeywords: andYPathNormalizedTitles:) may call doFilterQueryForFieldInfoArray(_:), passing for the sole parameter of the call the FieldInfo array created at phase 709. In reply to the call returnResumesForXPathNormalizedKeywords(_: andYPathNormalizedKeywords: andYPathNormalizedTitles:) may receive a FieldInfo array of the sort discussed which further sets forth, via qfPassDocs property specification, the noted Boolean-expression-satisfying resume document numbers. As an illustration, suppose that passed to doFilterQueryForFieldInfoArray(_:) were a FieldInfo array as follows. A first element which sets forth for its searchQueryForField property string "project planning-3201 OR project tracking-5375 OR project estimates-5374," and for its fieldName property "nrmKwd." And a second element which sets forth for its searchQueryForField property "project manager-208 OR site manger-5438 OR assistant project manager-3086," and for its fieldName property "nrmTtl." Continuing with the illustration, the returned FieldInfo array may set further forth the noted Boolean-expression-satisfying document numbers. As such the returned FieldInfo array may provide via its first element a searchQueryForField property setting forth that which was set forth by the searchQueryForField property of the first element of the passed in FieldInfo array, a fieldName property setting forth that which was set forth by the fieldName of the first element of the passed in FieldInfo array, and for its qfPassDocs property resume document numbers as per ["JRS123", "XKY209", "AAA123", "BBB456"]. Moreover, the returned FieldInfo array may provide via its second element a searchQueryForField property setting forth that which was set forth by the searchQueryForField property of the second element of the passed-in FieldInfo array, a fieldName property setting forth that which was set forth by the fieldName property of the second element of the passed-in FieldInfo array, and for its qfPassDocs property resume document numbers as per ["JRS123", "JNS491", "KZM404", "AAA123", "BXJ493"]. It is noted that, to facilitate discussion, resume document numbers have been set forth in the form of three letters followed by three digits rather than, say, as UUIDs.

With reference to that which is discussed hereinabove with respect to rankForFieldInfoArray(_: andFieldJoiner:), it is noted that at phase 713 returnResumesForXPathNormalizedKeywords(_: andYPathNormalizedKeywords: andYPathNormalizedTitles:) may call rankForFieldInfoArray(_: andFieldJoiner:), passing for the first parameter of the call the FieldInfo array received in response to the call of phase 711 to doFilterQueryForFieldInfoArray(_:), and passing for the second parameter FieldJoinerKind.Or. Although set forth here is the example of passing for the second parameter FieldJoinerKind.Or, according to one or more embodiments FieldJoinerKind.And may be passed instead. With reference to that which is discussed herein with respect to rankForFieldInfoArray(_: andFieldJoiner:), it is noted that in response to being called the method may return a tuple array which may set forth one or more of the passed-in document numbers along with corresponding relevancy scores, a given tuple of the array setting forth such a document number and such a relevancy score. For the at-hand circumstance of FieldJoinerKind.Or being passed for the second parameter, the returned tuple array may set forth each passed-in resume document number along with a corresponding relevancy score. The elements of the returned tuple array may be sorted according to conveyed relevancy score with elements conveying higher relevancy scores appearing first. Continuing with the foregoing illustration, returned by rankForFieldInfoArray(_: andFieldJoiner:) may be the tuple array [("AAA123", 39.60), ("JNS491", 37.93), ("BXJ493", 33.48), ("JRS123", 30.29), ("XKY209", 28.86), ("BBB456", 26.63), ("KZM404", 23.26)].

As noted, the return type of returnResumesForXPathNormalizedKeywords(_: andYPathNormalizedKeywords: andYPathNormalizedTitles:) may be [FetchedResumeRecord] where, as also noted, the class definition of FetchedResumeRecord reflects discussed-herein ResumeEntity, but with the additional conveyance of a relevancy score. From phase 713 flow may proceed to phases 715 and 717 where returnResumesForXPathNormalizedKeywords(_: andYPathNormalizedKeywords: andYPathNormalizedTitles:) may formulate the array of FetchedResumeRecord elements to be returned by the method. In particular, the method may act as per the following.

Taking the tuple array returned in response to the call to rankForFieldInfoArray(_: andFieldJoiner:) to be held by returnResumesForXPathNormalizedKeywords(_: andYPathNormalizedKeywords: andYPathNormalizedTitles:) in a tuple array object rankingResults and the at-hand managed object context to be available via managedObjectContext, returnResumesForXPathNormalizedKeywords(_: andYPathNormalizedKeywords: andYPathNormalizedTitles:) may access the ResumeEntity-compliant resume records which correspond to the resume document numbers set forth by the tuple array and formulate the FetchedResumeRecord array to be returned by returnResumesForXPathNormalizedKeywords(_: andYPathNormalizedKeywords: andYPathNormalizedTitles:), via code in line with the pseudocode:

```
var arrayToReturn: [FetchedResumeRecord] = [FetchedResumeRecord]( )
for result in rankingResults {
  var elementToAppend: FetchedResumeRecord =
    FetchedResumeRecord( )
  var resumeEntityFetchRequest = NSFetchRequest(entityName:
    "ResumeEntity")
  resumeEntityFetchRequest.predicate =
NSPredicate(format:"@% == docNum", result.0)
  var resumeEntityFetchResult =
managedObjectContext.executeFetchRequest(resumeEntityFetchRequest)
  elementToAppend.docNum =
  resumeEntityFetchResult[0].valueForKey("docNum")
  elementToAppend.rawTtl =
  resumeEntityFetchResult[0].valueForKey("rawTtl")
  elementToAppend.rawKwd =
  resumeEntityFetchResult[0].valueForKey("rawKwd")
  elementToAppend.nrmTtl =
  resumeEntityFetchResult[0].valueForKey("nrmTtl")
  elementToAppend.nrmKwd =
  resumeEntityFetchResult[0].valueForKey("nrmKwd")
  elementToAppend.extraData =
  resumeEntityFetchResult[0].valueForKey("extraData")
  elementToAppend.relevancyScore = result.1
  arrayToReturn.append(elementToAppend)
}
```

From phase 717 flow may proceed to phase 719 where returnResumesForXPathNormalizedKeywords(_: andYPathNormalizedKeywords: andYPathNormalizedTitles:) may return the FetchedResumeRecord array formulated via phase 715 and 717.

With reference to, for instance, that which is discussed hereinabove with respect to calls to doFilterQueryForFieldInfoArray(_:) and rankForFieldInfoArray(_: andFieldJoiner:) under the scenario of Y-path normalized skills, the following is noted. For the at-hand scenario of employing doFilterQueryForFieldInfoArray(_:) and rankForFieldInfoArray(_: andFieldJoiner:) in yielding resumes, in one aspect "OR" was placed interword with respect to each of the two searchQueryForField-specified Boolean expressions set forth by the discussed FieldInfo array. In another aspect under the at-hand scenario of yielding resumes FieldJoinerKind.Or was employed as the second parameter in the call to rankForFieldInfoArray(_: andFieldJoiner:). Such placement of "OR" interword with respect to each of the two Boolean expressions and such employ of FieldJoinerKind.Or may for example arise from automated analysis of the sort discussed herein. Such automated analysis may explore the various possibilities for interword AND placement versus interword OR placement, and the employment of FieldJoinerKind.Or versus FieldJoinerKind.And. As such, explored by the automated analysis—first under the scenario of FieldJoinerKind.Or employment and then under the scenario of FieldJoinerKind.And employment—may be placing AND interword with respect to both the nrmKwd-oriented Boolean expression and the nrmTtl-oriented Boolean expression, placing OR interword with respect to both the nrmKwd-oriented Boolean expression and the nrmTtl-oriented expression, placing AND interword with respect to the nrmKwd-oriented Boolean expression but OR interword with respect to the nrmTtl-oriented Boolean expression, and placing OR interword with respect to the nrmKwd-oriented Boolean expression but AND interword with respect to the nrmTtl-oriented Boolean expression. The automated analysis may apply each of the possibilities for a different period of time and/or for a different pool of users and quantify by some metric—say downstream resultant resume views, interview invitation extensions, and/or job listing fills and/or hires—the success of each of the noted possibilities. Such quantification result may be leveraged in selecting—say in an automated fashion—which of the possibilities to employ. As such, the discussed herein placement of OR interword with respect to both Boolean expressions and employ of FieldJoinerKind.Or in pursuit of yielding resumes may arise from such an automated analysis finding such possibility to succeed according to the one or more metrics (e.g., with automated selection of such possibility for employ).

To the extent that such placement of OR interword with respect to both Boolean expressions coupled with employ of FieldJoinerKind.Or is viewed as setting forth three less-restrictive logical operations, the following is noted. According to one point of view, although such plying of three less restrictive operations may result in a larger number of resumes being identified, it is nevertheless the case that rankForFieldInfoArray(_: andFieldJoiner:) may tend to assign higher relevancy score to resumes which—bearing in mind the discussed summing performed by rankForFieldInfoArray(_: andFieldJoiner:)—set forth more of the Boolean-expression-indicated normalized titles and/or normalized keywords (e.g., with such resumes setting forth greater numbers of the Boolean-expression-indicated normalized titles and/or normalized keywords being seen as better fits for the job listing being provided). Moreover, as the identified and ranked resumes may be presented to a user (e.g., a job listing-providing user and/or a recruiter), it may perhaps be seen as beneficial to allow such user to learn of a larger quantity of resumes than of a smaller quantity of resumes.

The foregoing employ of the X-path normalized skills (i.e., X-path normalized keywords), the Y-path normalized skills (i.e., Y-path normalized keywords), and the Y-path normalized titles in identifying resumes which appear to be good fits with respect to a newly-provided non-indexed (e.g., not yet indexed) job listing may, from one point of view, be seen as harnessing the value of existing indexed job listings in performing such resume identification, at least via the rationale that the Y-path normalized skills and Y-path normalized titles arose from consideration of such existing indexed job listings.

According to one or more embodiments, one or more operations may be performed to present to a user (e.g., the job listing-submitting user) the discussed resumes provided via the action of returnResumesForXPathNormalizedKeywords(_: andYPathNormalizedKeywords: andYPathNormalizedTitles:). As discussed, returned by the method may be an array of FetchedResumeRecord objects which sets forth fetched resume record data regarding the resumes identified as potential good fits with respect to the newly-provided job listing, as well as corresponding relevancy scores. As one example of such resume presentation, in keeping with the Swift/Apple frameworks pseudocode employed herein employed may be a resumeViewController object which is an instantiation of a ResumeViewController class (e.g., with ResumeViewController inheriting from UIViewController. The resumeViewController object may set forth properties including resumesArray of type [FetchedResumeRecord] by which the object may hold the discussed array returned by returnResumesForXPathNormalizedKeywords(_: andYPathNormalizedKeywords: andYPathNormalizedTitles:) and currentResumeArrayIndex of type int by which the object may hold the element number of an element of resumesArray whose data is presently being displayed to the user. Object resumeViewController may further set forth properties including rawTitleText of type UILabel which may be employed in presentation to the user of the data set forth by the rawTtl property of the FetchedResumeRecord object pointed to by currentResumeArrayIndex, rawKeywordText of type UILabel which may be employed in presentation to the user of the data set forth by the rawKwd property of the FetchedResumeRecord object pointed to by currentResumeArrayIndex, normalizedTitleText of type UILabel which may be employed in presentation to the user of the data set forth by the nrmTtl property of the FetchedResumeRecord object pointed to by currentResumeArrayIndex, normalizedKeywordText of type UILabel which may be employed in presentation to the user of the data set forth by the nrmKwd property of the FetchedResumeRecord object pointed to by currentResumeArrayIndex, extraDataText of type UITextView which may be employed in presentation to the user of the data set forth by the extraData property of the FetchedResumeRecord object pointed to by currentResumeArrayIndex, and relevancyScoreText of type UILabel which may be employed in presentation to the user of the data set forth by the relevancyScore property of the FetchedResumeRecord object pointed to by currentResumeArrayIndex. It is noted that the just-discussed properties may be set forth as @IBOutlet properties facilitating their association with respective GUI element objects established via Xcode.

Still further, resumeViewController may set forth properties including nextResumeButton of type UIButton which may be employed in activating a to-be-discussed method of resumeViewController which causes presentation to the user of data corresponding to a subsequent element of resumesArray (e.g., an element having an index number corresponding to currentResumeArrayIndex+1). Also, resumeViewController may set forth properties including previousResumeButton of type UIButton which may be employed in activating a to-be-discussed method of resumeViewController which causes presentation to the user of data corresponding to a preceding element of resumesArray (e.g., an element having an index number corresponding to currentResumeArrayIndex−1). It is noted that the just-discussed UIButton properties may be set forth as @IBOutlet properties aiding their association with respective GUI elements established via Xcode (e.g., facilitating programmatic disablement of nextResumeButton when there are no subsequent resumes and/or programmatic disablement of previousResumeButton when there are no preceding resumes). It is further noted that the referenced method which causes presentation of data corresponding to a subsequent element of resumesArray, and/or the referenced method which causes presentation of data corresponding to a preceding element of resumesArray, may be set forth as @IBAction methods aiding their association with respective GUI elements established via Xcode (e.g., facilitating allowing button activation to cause calling of a corresponding method).

According to one or more embodiments, resumeViewController may provide methods including viewDidLoad( ), nextResume(_:), and prevResume(_:). The calling of viewDidLoad( ) may be taken as commencing the functionality discussed herein in connection with resumeViewController. Method viewDidLoad( ) may, for instance, be called (phase 721) subsequent to the loading into memory of the GUI view which is under the thrall of resumeViewController, an event which may for example flow from a request that such GUI view be presented (e.g., the caller of returnResumesForXPathNormalizedKeywords(_: andYPathNormalizedKeywords: andYPathNormalizedTitles:) may request such GUI display subsequent to receipt of the noted FetchedResumeRecord array, such caller perhaps also setting the resumesArray property of resumeViewController to reflect that array). The viewDidLoad( ) may be set forth as an override method which includes code in line with the pseudocode super. viewDidLoad( ) the method thusly adding functionality to that functionality which is provided by a viewDidLoad( ) method inherited via parent class UIViewController.

The viewDidLoad( ) method may have the declaration:
func viewDidLoad( ),
the declaration thusly indicating that the method neither accepts parameters nor returns a value. The method may set forth code including code in line with the pseudocode:

```
currentResumeArrayIndex = 0
if resumesArray.count > 1 {
    nextResumeButton.enabled = true
}
else {
    nextResumeButton.enabled = false
}
previousResumeButton.enabled = false
self.doDisplayForResumeArrayIndex(currentResumeArrayIndex)
```

As such, via such code viewDidLoad( ) when called may act to set currentResumeArrayIndex to correspond to the first element (e.g., element [0]) of resumesArray), it being noted that according to one or more embodiments viewDidLoad( ) may not be called where returnResumesForXPathNormalizedKeywords(_: andYPathNormalizedKeywords: andYPathNormalizedTitles:) does not return an array with at least one element. Further via such code viewDidLoad( ) may act to activate nextResumeButton in the case where the array is not a single element array and, as such, there are elements beyond the at-hand first element, and to deactivate nextResumeButton otherwise. Still further via such code the method may act to deactivate previousResumeButton, such deactivation perhaps viewable as being done with the perspective that, with the at-hand element of resumesArray being the first element of the array (e.g., element [0]) there are no preceding elements of the array.

Moreover, via such code viewDidLoad( ) may make a call to doDisplayForResumeArrayIndex(_:), a further method of resumeViewController, viewDidLoad( ) passing as the sole parameter of the call currentResumeArrayIndex.

Method doDisplayForResumeArrayIndex(_:) may have the declaration:

func doDisplayForResumeArrayIndex(_theResumeArrayIndex: Int), the declaration indicating that the method may take a single parameter of type int, the parameter having the local parameter name theResumeArrayIndex and having no external parameter name. The method may set forth code in line with the pseudocode:

```
rawTitleText.text = resumesArray[theResumeArrayIndex].rawTtl
rawKeywordText.text = resumesArray[theResumeArrayIndex].rawKwd
normalizedTitleText.text = resumesArray[theResumeArrayIndex].nrmTtl
normalizedKeywordText.text = resumesArray[theResumeArrayIndex].nrmKwd
var decodedExtraData: NSData = NSData(base64EncodedString:
resumesArray[theResumeArrayIndex].extraData, options:
NSDataBase64DecodingOptions(rawValue:0))
extraDataText.text = String(data: decodedExtraData, encoding:
NSUTF8StringEncoding)
relevancyScoreText.text =
String(resumesArray[theResumeArrayIndex].relevancyScore)
```

As such, doDisplayForResumeArrayIndex(_:) when called may act to set the text properties of the noted UILabel objects and the noted UITextView object to reflect the corresponding properties of the at-hand FetchedResumeRecord object—as indicated by passed-in theResumeArrayIndex—of resumesArray. It is observed that setting the text property of a UILabel object or a UITextView object causes such GUI element to display the set text (e.g., setting the text property of a given UILabel object to the string "scrummaster-9989" may cause the GUI label element to display "scrummaster-9989"). As reflected by the above pseudocode, doDisplayForResumeArrayIndex(_:) may, with respect to the extraDataText UITextView object, act to first decode a Base64 representation of such extra data into a string representation thereof.

Turning to method nextResume(_:), it is noted that such method may, for example, be called in response to the action of UIButton object nextResumeButton. The nextResume(_:) method may have the declaration:

func nextResume(_sender: UIButton), the declaration thusly indicating that the method may take a single parameter of type UIButton, the single parameter having the local parameter name sender and no external parameter name. The declaration further indicates that the method may return no value. The method may set forth code including code in line with the pseudocode:

```
currentResumeArrayIndex = currentResumeArrayIndex + 1
if currentResumeArrayIndex == (resumesArray.count) - 1 {
    nextResumeButton.enabled = false
}
else {
    nextResumeButton.enabled = true
}
if currentResumeArrayIndex == 0 {
    previousResumeButton.enabled = false
}
else {
    previousResumeButton.enabled = true
}
self.doDisplayForResumeArrayIndex(currentResumeArrayIndex)
```

As such, nextResume(_:) when called may act to increment currentResumeArrayIndex, such incrementation being in keeping with the method being called where desired is display of information corresponding to a subsequent resume (e.g., with the method being called where the user activates nextResumeButton). It is noted that where there is no further resume subsequent to one for which information is presently being displayed, nextResumeButton may be disabled preventing user activation of the method via the button. Further when called nextResume(_:) may, as reflected by the pseudocode, check whether currentResumeArrayIndex reflects the element number of the array's last element (e.g., reflects the element number (resumesArray.count)-1). Where such is the case the method may deactivate nextResumeButton. Such declaration may perhaps be seen as reflecting the notion that where currentResumeArrayIndex reflects the last element of the array there may be no subsequent resumes. Where such is not the case the method may activate nextResumeButton.

Still further when called nextResume(_:) may, as reflected by the pseudocode, check whether as-incremented currentResumeArrayIndex reflects the element number of the array's first element (e.g., element [0]). Where such is the case previousResumeButton may be deactivated. Such deactivation may perhaps be seen as reflecting the notion that where currentResumeArrayIndex reflects the first element of the array there are no preceding resumes. Where such is not the case the method may activate previousResumeButton.

To the extent that it is taken to be unlikely that activation of nextResumeButton and calling of nextResume(_:) occurs where the method's incrementation of currentResumeArrayIndex causes indication of the first element of the array, such code may perhaps be viewed as ensuring that there is nevertheless handling of such an occurrence.

Also when called, nextResume(_:) may call doDisplayForResumeArrayIndex(_:), passing as the sole parameter as-incremented currentResumeArrayIndex. In response to the call doDisplayForResumeArrayIndex(_:) may perform the discussed hereinabove GUI display-related operations with respect to as-incremented currentResumeArrayIndex.

Turning to prevResume(_:), it is noted that such method may, for example, be called in response to activation of the UIButton object previousResumeButton. The prevResume (_:) method may have the declaration:

func prevResume(_sender: UIButton), the declaration thusly indicating that the method may take a single parameter of type UIButton, the single button having the local parameter name sender and having no external parameter name. The declaration further indicates that the method may return no value. The method may set forth code in line with the pseudocode:

```
currentResumeArrayIndex = currentResumeArrayIndex - 1
if currentResumeArrayIndex == (resumesArray.count) - 1 {
   nextResumeButton.enabled = false
}
else {
   nextResumeButton.enabled = true
}
if currentResumeArrayIndex == 0 {
   previousResumeButton.enabled = false
}
else {
   previousResumeButton.enabled = true
}
self.doDisplayForResumeArrayIndex(currentResumeArrayIndex)
```

As such, prevResume(_:) when called may act to decrement currentResumeArrayIndex, such incrementation being in keeping with the method being called where desired is display of information corresponding to a preceding resume (e.g., with the method being called where the user activates previousResumeButton). It is noted that where there is no resume predecessor to one for which information is presently being displayed previousResumeButton may be disabled preventing user activation of the method via the button. Also when called prevResume(_:) may, as referenced by the pseudocode, check whether as-decremented currentResumeArrayIndex reflects the element number of the array's first element (e.g., element [0]). Where such is the case previousResumeButton may be deactivated. Such deactivation may perhaps be seen as reflecting the notion that where currentResumeArrayIndex reflects the first element of the array there are no preceding resumes. Where such is not the case the method may activate previousResumeButton. Additionally when called prevResume(_:) may, as reflected by the pseudocode, check whether as-decremented currentResumeArrayIndex reflects the element number of the array's last element (e.g., reflects the element number (resumesArray.count)−1). Where such is the case the method may deactivate nextResumeButton. Such deactivation may perhaps be seen as reflecting the notion that where currentResumeArrayIndex reflects the last element of the array there are no subsequent resumes. Where such is not the case the method may activate nextResumeButton. To the extent that it is taken to be unlikely that activation of previousResumeButton and calling of prevResume(_:) occurs where the method's decrementation of currentResumeArrayIndex causes indication of the last element of the array, such code may perhaps be viewed as ensuring that there is nevertheless appropriate handling of such an occurrence.

Still further when called prevResume(_:) may call doDisplayForResumeArrayIndex(_:), passing as the sole parameter as-decremented currentResumeArrayIndex. In response to the call doDisplayForResumeArrayIndex(_:) may perform the discussed hereinabove GUI display-related operations with respect to as-decremented currentResumeArrayIndex.

FIG. 8 shows an example user interface according to one or more embodiments which, in one aspect, reflects the functionality just discussed in connection with resumeViewController. As such the user interface of FIG. 8 may, in an aspect, be employed in presenting to a user (e.g., a recruiter user) providing a new job listing one or more resumes which, in accordance with that which is discussed herein, are potential good fits for that job listing. With reference to that which is discussed hereinabove with respect to resumeViewController, it is noted that GUI elements 801-811 may be instantiated UILabel and UITextView objects which correspond to the discussed UILabel and UITextView properties of resumeViewController. As such the operations discussed in connection with doDisplayForResumeArrayIndex(_:) wherein UILabel and UITextView text properties are set may result in visual alteration of GUI elements 801-811. For example, GUI element 801 may be an instantiated UILabel corresponding to the rawTitleText property of resumeViewController such that doDisplayForResumeArrayIndex(_:) setting the text property of rawTitleText to convey the rawTtl property of a FetchedResumeRecord object corresponding to the resumesArray element indicated by currentResumeArrayIndex may cause GUI element 801 to display text corresponding to such rawTtl property of such FetchedResumeRecord object Analogous may hold with respect to 803 being an instantiated UILabel corresponding to the rawKeywordText property of resumeViewController and the discussed setting of the text property of rawKeywordText, 805 being an instantiated UILabel corresponding to the normalizedTitleText property of resumeViewController and the discussed setting of the text property of normalizedTitleText, 807 being an instantiated UILabel corresponding to the normalizedKeywordText property of resumeViewController and the discussed setting of the text property of normalizedKeywordText, 809 being an instantiated UITextView corresponding to the extraDataText property of resumeViewController and the discussed setting of the text property of extraDataText, and 811 being an instantiated UILabel corresponding to the relevancyScoreText property of resumeViewController and the discussed setting of the text property of relevancyScoreText. Also with reference to that which is discussed hereinabove with respect to resumeViewController, GUI elements 813 and 815 may be instantiated UIButton objects which correspond to the discussed UIButton properties of resumeViewController and whose GUI activation may result in calling of—respectively—prevResume(_:) and nextResume(_:) (e.g., with the methods being @IBAction methods where each is associated via Xcode with a corresponding appropriate one of GUI elements 813 and 815). In particular, GUI element 813 may be a UIButton object which corresponds to the previousResumeButton property of resumeViewController and whose GUI activation may result in calling of discussed herein prevResume (_:). Further in particular, GUI element 815 may be a UIButton object which corresponds to the nextResumeButton property of resumeViewController and whose GUI activation may result in calling of discussed herein nextResume (_:). The buttons of GUI elements 813 and 815 may have their titles set to convey their operation to the user. As examples, the title of GUI element 813 may be set to "previous resume" while the title of GUI element 8 15 may be set to "next resume." In keeping with the Swift/Apple frameworks pseudocode employed herein, resumeViewController (e.g., via the viewDidLoad( ) method thereof) may set such GUI element 813 title via code in line with the pseudocode previousResumeButton.setTitle("previous resume", forState: UIControlState.Normal), and such GUI element 815 title via code in line with the pseudocode:

nextResumeButton.setTitle("next resume", forState: UIControlState.Normal).

Elements 817-827 may be employed to provide explanatory text to the user regarding the discussed UILabels 801-807 and 813, and discussed UITextView 809. In particular, as examples explanatory text 817 may be situated next to UILabel 801 and may set forth the text "current and/or sought position," explanatory text 819 may be situated next to UILabel 803 and may set forth the text "keywords," explanatory text 821 may be situated next to UILabel 805 and may set forth the text "related titles," explanatory text 823 may be situated next to UILabel 807 and may set forth the text "related keywords," explanatory text 825 may be situated next to UITextView 809 and may set forth the text "resume," and explanatory text 827 may be situated next to UILabel 811 and may set forth the text "computed relevancy score." 817-827 may, for instance, be implemented as instantiated UILabel objects whose text properties are set (e.g., in the discussed viewDidLoad( ) method in a manner in line with the discussed-herein setting of the text properties of UILabel objects) in agreement with the foregoing (e.g., 823 may be implemented as an instantiated UILabel object whose text property is set to the string "related keywords").

Reflecting upon the functionality discussed herein in connection with resumeViewController and the properties, methods, and corresponding GUI view thereof, it is noted that such functionality—which is discussed with reference to Swift/Apple frameworks-based pseudocode—may, for example, operate in the role of a client approach (e.g., a mobile app or other app). As another example, such functionality may operate in the role of code which runs within the context of a web browser (e.g., as JavaScript-based code which runs in the context of a web browser). Where such functionality operates in the role of code which runs within the context of a web browser (e.g., as JavaScript-based code), such implementation may for instance include JavaScript innerHTML functionality being employed in the vein of the UILabel text property functionality discussed herein in connection with the Swift/Apple frameworks-based pseudocode set forth in connection with resumeViewController.

At phase 723, a record corresponding to the newly-provided job listing may be added. Such record may comply with the discussed-herein JobListingEntity. Such entity definition, as discussed herein, sets forth the fields docNum, rawTtl, rawKwd, nrmTtl, nrmKwd, and extraData, each of which is a string field.

According to one or more embodiments, such new job listing record addition functionality may be implemented by a addNewJobListingRecordForRawTtl(_: andRawKwd: andNrmTtl: andNrmKwd: andExtraData:) method of the jobListingLibrarian object. The method may have the declaration:

func addNewJobListingRecordForRawTtl(_ theRawTtl: String, andRawKwd theRawKwd: String, andNrmTtl theNrmTtl: String, andNrmKwd theNrmKwd: String, andExtraData theExtraData: String)

As such the declaration indicates that the method may take a first parameter of type string, the first parameter having the local parameter name theRawTtl and no external parameter name. The declaration further indicates that the method may take a second parameter of type string, the second parameter having the local parameter name theRawKwd and the external parameter name andRawKwd. The declaration also indicates that the method may take a third parameter of type string, the third parameter having the local parameter name theNrmTtl and the external parameter name andNrmTtl. Also, the declaration indicates that the method may take a fourth parameter of type string, the fourth parameter having the local parameter name theNrmKwd and the external parameter name andNrmKwd. Moreover, the declaration indicates that the method may take a fifth parameter of type string, the fifth parameter having the local parameter name theExtraData and the external parameter name andExtraData. Still further indicated by the declaration is that the method may return no value.

As noted above, the addNewJobListingRecordForRawTtl(_: andRawKwd: andNrmTtl: andNrmKwd: andExtraData:) method may, for example, be called (phase 723) by the discussed hereinabove resumesAndStoreForNewJobListing (_:) method of the conductor object. The addNewJobListingRecordForRawTtl(_: andRawKwd: andNrmTtl: andNrmKwd: andExtraData:) method may act as follows. Creation of the job listing record may, in accordance with the Swift/Apple frameworks pseudocode employed herein in one aspect involve instantiating an NSEntityDescription object via employ of the NSEntityDescription class method entityForName(_: inManagedObjectContext:) where the string "JobListingEntity" passed as the first parameter and the at-hand managed object context passed as the second parameter. In another aspect, creation of the job listing record may involve instantiating an NSManagedObject via the initializer method init(entity: insertIntoManagedObjectContext:) where the above-instantiated NSEntityDescription object is passed as the first parameter and the at-hand managed object context is passed as the second parameter. In a further aspect creation of the job listing record may involve multiply calling setValue(_: forKey:) on the instantiated NSManagedObject. A first such call to setValue(_: forKey:) may correspond to the docNum field. Passed for the first parameter may be a string setting forth a newly-generated UUID (e.g., created via code in line with the pseudocode NSUUID( ).UUIDString). Passed for the second parameter may be "docNum." Such first call may serve to set the newly-generated UUID as the value for the docNum field of the new JobListingEntity record. A second such call may correspond to the rawTtl field. Passed for the first parameter may be above-noted received theRawTtl.

Passed for the second parameter may be "rawTtl." Such second call may serve to set received theRawTtl as the value for the rawTtl field of the new JobListingEntity record.

A third such call may correspond to the rawKwd field. Passed for the first parameter may be the above-noted received theRawKwd. Passed for the second parameter may be "rawKwd." Such third call to setValue(_: forKey:) may serve to set received theRawKwd as the value for the rawKwd field of the new JobListingEntity record. A fourth such call may correspond to the nrmTtl field. Passed for the first parameter may be above-noted received theNrmTtl. Passed for the second parameter may be "nrmTtl." Such fourth call to setValue(_: forKey:) may serve to set received theNrmTtl as the value for the nrmTtl field of the new JobListingEntity record.

A fifth such call may correspond to the nrmKwd field. Passed for the first parameter may be the above-noted received theNrmKwd. Passed for the second parameter may be "nrmKwd." Such fifth call to setValue(_: forKey:) may serve to set received theNrmKwd as the value for the nrmKwd field of the new JobListingEntity record. A sixth such call may correspond to the extraData field. Passed for the first parameter may be the above-noted received theExtraData. Passed for the second parameter may be "extraData." Such sixth call to setValue(_: forKey:) may serve to set received theExtraData as the value for the extraData field of the new JobListingEntity record.

In a final aspect, creation of the job listing record may involve calling save( ) on the at-hand managed object context. As such, a new job listing record may be saved to the store.

Further to being stored with respect to a JobListingEntity-compliant record, one or more fields of a job listing may be subjected to indexing. It is noted that although, to facilitate discussion, indexing is mainly discussed with reference to indexing of JobListingEntity-compliant job listings, indexing of NormalizedKeywordEntity-compliant records and/or ResumeEntity-compliant records may be performed in analogous fashion.

Indexing may be performed by method doIndexing( ) of the indexOperations object. The doIndexing( ) method may have the declaration:

func doIndexing( )

As such the declaration indicates that the method may take no parameters and may return no value. Method doIndexing( ), when indexing a given job listing, may consider each word set forth in a subject-to-indexing field of that job listing, and with respect to each such word may alter or create a record compliant with the entity definition:

| Field Name | Data Type |
| --- | --- |
| indexField | String |
| term | String |
| documentNumbers | String |
| termFrequency | String |
| termBoost | String |
| termPositions | String |

Such entity may be given the name JobListingInverseIndexTermEntity. According to one or more embodiments, there may alternately or additionally be an entity named ResumeInverseIndexTermEntity and/or an entity named NormalizedKeywordInverseIndexTermEntity. Such entities may be the same as the noted JobListingInverseIndexTermEntity outside of entity name. As such the JobListingInverseIndexTermEntity may be employed in the indexing of job listings, the ResumeInverseIndexTermEntity may be employed in the indexing of resumes, and/or the NormalizedKeywordInverseIndexTermEntity may be employed in the indexing of normalized keywords. With reference to that which is discussed herein it is noted that, in keeping with the Core Data functionality provided via the Swift/Apple frameworks, such employ of different entity names may facilitate, for example, JobListingInverseIndexTermEntity records being stored in a first store (e.g., database), NormalizedKeywordInverseIndexTermEntity records being stored in a second store (e.g., database), and/or ResumeInverseIndexTermEntity records being stored in a third store (e.g., database), and/or limiting operations (e.g., database search operations) to a single one of JobListingInverseIndexTermEntity records, NormalizedKeywordInverseIndexTermEntity records, or ResumeInverseIndexTermEntity records.

Considering the above entity definition of JobListingInverseIndexTermEntity, it is observed that the term field of a given record may set forth the indexed term (e.g., word) to which the record corresponds, and the indexField field may set forth the source record field with respect to which the term has been indexed. To facilitate discussion, the terms "term" and "word" may be used interchangeably herein-throughout.

Considering the indexField and term fields of JobListingInverseIndexTermEntity, recall that a job listing record complying with the JobListingEntity entity definition may set forth one or more fields including rawTtl, rawKwd, nrmTtl, nrmKwd, and extraData. One or more of these fields may be subjected to indexing. As an illustration, where the word "supervision" is drawn from the rawKwd field of a given job listing record and indexed, such indexing may be reflected in a JobListingInverseIndexTermEntity record which sets forth "rawKwd" for its indexField field and "supervision" for its term field. The JobListingInverseIndexTermEntity will now be discussed with respect to the following example record which conforms to the entity definition:

| Field Name | Value |
| --- | --- |
| indexField | rawKwd |
| term | python |
| documentNumbers | ABC123,XYZ456 |
| termFrequency | 2,1 |
| termBoost | 1.0,0.5 |
| termPositions | 7_12,0 |

The first two fields set forth the indexed field and term to which the record corresponds. In this example, as set forth by the term field setting forth "python" and the indexField setting forth "rawKwd," the record corresponds to the appearance of the word "python" in the rawKwd field of job listing records. The JobListingInverseIndexTermEntity record, as indicated by the documentNumbers field, reflects the numbers of job listing documents—in this case job listings ABC123 and XYZ456—in which indexing so far has encountered, in the rawKwd field of those job listings, at least one instance of the word "python." Indexing may act, when finding the word "python" in the rawKwd field of a job listing record, to determine whether or not there exists an JobListingInverseIndexTermEntity record corresponding to the word "python" for the field rawKwd. Where such JobListingInverseIndexTermEntity record does not yet exist, indexing may create it and set it to reflect the new find. Where such JobListingInverseIndexTermEntity record already exists the record may be altered to reflect the new find. As an illustration, the above example JobListingInverseIndexTermEntity record may have been created when indexing found "python" to exist in the rawKwd field of job listing ABC123 but found no JobListingInverseIndexTermEntity record for "python" for the field rawKwd to already exist. It is noted that although document numbers in the vein of "ABC123" in the interest of facilitating discussion, document numbers of a different tenor—say UUIDs—may be employed.

As referenced, the JobListingInverseIndexTermEntity record sets forth job listings ABC123 and XYZ456 as ones which include the word "python" in the rawKwd field. It is noted that, more specifically, the documentNumbers field sets forth such document numbers via a comma-character-delimited string. As such, document numbers are separated from one another by comma characters. Each such comma-delimited position may be through of as being numbered. As such "ABC123" may—where such numbering begins with zero—be thought of as occupying position number zero while "XYZ456" may be thought of occupying position number one. Such position numbers may be employed in interpreting the values set forth by the termFrequency, termBoost, and termPositions fields.

In particular, for example, the termFrequency field also sets forth comma-delimitation, with comma characters being placed between indicated term frequency values. The comma-delimited positions may track the comma delimited positions of the documentNumbers field such that the nth position of the termFrequency field sets forth term frequency information for the document number indicated by the nth position of the documentNumbers field. As one illustration, position number zero of documentNumbers setting forth "ABC123" and position number zero of termFrequency setting forth "2" indicates that the term frequency is two with respect to "python" for document number ABC123, to with that the rawKwd field of job listing ABC123 sets forth "python" two times. Similarly, position number one of documentNumbers setting forth "XYZ456" and position number one of termFrequency setting forth "1" conveys that the term frequency is one for document XYZ456 with respect to the word "python."

Similarly, termBoost employs comma-delimitation between values with the comma-delimited positions again tracking the comma-delimited positions of documentNumbers. Illustratively, position number zero of documentNumbers setting forth "ABC123" and position number zero of termBoost setting forth "1.0" conveys that the term boost is 1.0 with respect to "python" for the rawKwd field of job listing ABC123. Likewise, considering position number one of the documentNumbers and termBoost fields yields it being the case that the term boot is 0.5 respect to "python" for the rawKwd field of job listing XYZ456. Term boosts may be employed in adjusting the result of the discussed-herein relevancy scoring calculation. Field termPositions employs both comma character delimitation and underscore character delimitation. The comma-delimitation is in keeping with that which has been discussed with respect to other fields. For instance, continuing with the example JobListingInverseIndexTermEntity record comma-delimited position number zero corresponds to job listing ABC123. Within a comma-delimited position underscore-delimitation may be employed to set forth multiple values for the comma-delimited position. As one illustration, comma-delimited position number zero of termPositions sets forth, when underscore-delimitation is considered, the values 7 and 12. As comma-delimited position number zero of documentNumbers sets forth document number ABC123, considering the documentNumbers and termPositions fields—and both the comma-delimitation and the underscore-delimitation—yields finding the termPositions to be 7 and 12 for "python" in the rawKwd field of job listing ABC123. It is observed that the example JobListingInverseIndexTermEntity record setting forth two term position values for job listing ABC123 is in keeping with the record conveying a term frequency of two for job listing ABC123. Considering comma-delimited position number one of termPositions, only a single value is set forth, to with zero. With only a single value being conveyed there may not be call for underscore delimitation. Bearing in mind that comma-delimited position number one of documentNumbers sets forth "XYZ456," the example JobListingInverseIndexTermEntity record indicates that the term position for "python" within the rawKwd field of job listing XYZ456 is term position zero. It is observed that the record setting forth a single position value for job listing XYZ456 is in keeping with the example JobListingInverseIndexTermEntity record setting forth a frequency of one with respect to job listing XYZ456. As an example, in one or more embodiments term positions may be employed in finding specific terms among indexed documents. For instance, where the two word term "python coder" were to be found with respect to a particular job listing field (e.g., the rawKwd field) a match may call for a given job listing document setting forth "python" with a term position of p and setting forth "coder" with a term position of p+1 where p is an integer.

Further specifics of indexing will now be discussed. Firstly, suppose a job listing record whose set fields include its docNum field being set to "PRS777" and its rawKwd field being set so as to indicate "onsite supervision,offsite supervision", and that the rawKwd field is to be subjected to indexing. It is noted that, to facilitate discussion, a simplified job listing scenario is laid out (e.g., with a docNum setting of "PRS777" rather than, say, a UUID, and with a foreshortened rawKwd text portion being discussed). Indexing method doIndexing( ) may come to possess noted "PRS777" of the docNum field and the noted "onsite supervision,offsite supervision" of the rawKwd field via one or more NSFetchRequest-related operations of the sort discussed herein. Indexing method doIndexing( ) may access a given job listing record in connection with an approach—say via a for-in loop which cycles through to-be-indexed job listings—via which the method visits each of stored job listing records and/or each of a subset of the stored job listing records (e.g., those records known to have been added or changed within a certain recent time period).

Considering the indexing of the noted example rawKwd field, indexing method doIndexing( ) may, via the discussed NSFetchRequest-related operations, initially possess the text of this field as a string, string being the data type for this field in the JobListingEntity entity definition. Indexing method doIndexing( ) may then produce a string array corresponding to the rawKwd field text but with each word as an array element and with punctuation removed via code in line with the pseudocode:

```
var rawKwdStringRange:Range = rawKwdString.startIndex ..< rawKwdString.endIndex
var rawKwdArray = [String]( )
```

```
rawKwdString.enumerateSubstringsInRange(rawKwdStringRange, options:
NSStringEnumerationOptions.ByWords, {(substring, _, _, _) -> ( ) in
rawKwdArray.append(substring)})
```

Taking rawKwdString to be a string which conveys that which is set forth by the rawKwd field, the following transpires in the above pseudocode. A range rawKwdRange is instantiated which runs from and includes the position of the first character in rawKwdString and runs to but does not include the position of the last character of rawKwdString. Then rawKwdArray is instantiated so as to be a string array based on rawKwdString, the string array having each word of rawKwdString as an element and having punctuation of rawKwdString stripped therefrom. The above method call on rawKwdString takes the range as its first parameter, NSStringEnumerationOptions.ByWords as its options parameter so as to indicate that rawKwdString should be broken into array elements on a by-word basis with punctuation being removed, and a closure as the third parameter of the method call. The closure acts to separately receive from the method each word of rawKwdString, and when receiving such a word to append it to rawKwdArray.

Referring again to the entity definition for JobListingInverseIndexTermEntity it is noted that fields include termFrequency and termPositions. These fields may allow the JobListingInverseIndexTermEntity record for a given word to convey that, for the indexed field indicated by indexField, the term specified by field term—for a particular one of one or more job listing documents—is set forth by that job listing a quantity of times conveyed by termFrequency and at positions—within the at-hand field—of that job listing conveyed by termPositions. As an illustration, these fields may allow a JobListingInverseIndexTermEntity record for the word "supervision" to indicate for a given job listing document number that, for the field conveyed by indexField the word "supervision" is set forth twice (set forth termFrequency) via word positions one and three (as set forth by termPositions) in that field.

Indexing method doIndexing( ) may, possessing a string array of the sort discussed corresponding to the contents of a particular field—sans punctuation—of a particular job listing record, act as follows.

The indexOperations object which sets forth doIndexing( ) may additionally set forth method findIndicesOfWord(_: in Array:) and findFrequenciesPositionsForTermsInArray(_:). Functionality may be such that findFrequenciesPositionsForTermsInArray(_:) calls findIndicesOfWord(_: in Array:), with doIndexing( ) calling findFrequenciesPositionsForTermsInArray(_:) where rawKwdArray is passed as the sole parameter of the call.

Method findIndicesOfWord(_: in Array:) may have the declaration:

func findIndicesOfWord(_wordToFind: String, inArray theArray: [String])→[Int]

As such the declaration indicates that the method may take a first parameter of type string, the first parameter having the local parameter name wordToFind and having no external parameter name. The declaration further indicates that the method may take a second parameter of type string array, the second parameter having the local parameter name theArray and the external parameter name inArray. Still further indicated by the declaration is that the method may return an array of integer objects.

Method findFrequenciesPositionsForTermsInArray(_:) may have the declaration:

```
func findFrequenciesPositionsForTermsInArray(_ wordArray: [String]) -> [(term:
String, frequencies: Int, positions: [Int])]
```

As such the declaration indicates that the method may take a first parameter of type string array, the first parameter having the local parameter name wordArray and no external parameter name. The declaration further indicates that the method may have a return type of an array of tuples where each tuple of the array is of the sort (term: String, frequencies: Int, positions: [Int]). As such, each tuple of the array has an string component whose name is term, an integer component whose name is frequencies, and an integer array component whose name is positions. Methods findIndicesOfWord(_: in Array:) and findFrequenciesPositionsForTermsInArray(_:) may be set forth via code in line with the pseudocode:

```
func findIndicesOfWord(_ wordToFind: String, inArray theArray: [String]) -> [Int]
{
    var indicesToReturn: [Int] = [Int]( )
    for (indexOfVisitedWord, visitedWord) in theArray.enumerate( ) {
        if          visitedWord == wordToFind {
                    indicesToReturn.append(indexOfVisitedWord)
        }
    }
    return indicesToReturn
}
func findFrequenciesPositionsForTermsInArray(_ wordArray: [String]) -> [(term:
String, frequencies: Int, positions: [Int])] {
    var wordCounterSet: NSCountedSet = NSCountedSet(array: wordArray)
    var termsFrequenciesPositions: [(term: String, frequencies: Int, positions:
[Int])] = [(term: String, frequencies: Int, positions: [Int])]( )
    for setItem in wordCounterSet {
        termsFrequenciesPositions.append((term: setItem as String, frequencies:
```

```
wordCounterSet.countForObject(setItem), positions: self.findIndicesOfWord(setItem
as String, inArray: wordArray)))
    }
    return termsFrequenciesPositions
}
```

As an illustration, where rawKwdArray as passed to findFrequenciesPositionsForTermsInArray(_:) by doIndexing( ) is the sans-punctuation string array ["onsite", "supervision", "offsite", "supervision"], received by doIndexing( ) in response to the method call may be the tuple array [("offsite", 1, [2]), ("supervision", 2, [1, 3]), ("onsite", 1, [0])]. As perhaps alluded to by the tuple component names "term," "frequencies," and "positions" in the above pseudocode, the first component of each tuple of the array sets forth a term (e.g., "supervision"), the second component of each tuple of the array sets forth the quantity of times the term occurs in the passed in string array (e.g., 2 for "supervision"), and the third component of each tuple of the array sets forth the positions in the passed-in string array where the term appears (e.g., positions 1 and 3 for "supervision," bearing in mind that position count starts with zero). Where the sans punctuation string array passed to findFrequenciesPositionsForTermsInArray(_:) corresponds to a to-be-indexed field (e.g., in the case of the discussed example rawKwd), such tuple-conveyed frequencies and positions for a term may reflect the frequency and positions of that term in the field.

Further considering the call of findFrequenciesPositionsForTermsInArray(_:) the following is noted. As discussed a string array may be passed to findFrequenciesPositionsForTermsInArray(_:). The method may instantiate an NSCountedSet object wordCounterSet and a tuple array termsFrequenciesPositions. The tuple array is of the sort just discussed. Turning to the NSCountedSet, an NSCountedSet object may act such that—on one hand—it keeps only a single copy of a given object even when multiple ones of that object are passed to the set, but—on the other hand—keeps track of the quantity of times a given object has been passed to the set. Such quantity of times a given object has been passed to the set is available via the NSCountedSet method countForObject(_:) which takes as its input the object for which such quantity count is desired. Illustratively, where passed to the set were "dog," "cat," "dog," and "bear" the NSCountedSet may contain one manifestation of each of "dog," "cat," and "bear," but may answer 1 where countForObject(_:) is called with respect to either "cat" or "bear" but 2 where countForObject(_:) is called with respect to "dog." In the above pseudocode passed to NSCountedSet wordCounterSet, via its instantiation, is each element of the passed in string array wordArray. Via the for-in loop findFrequenciesPositionsForTermsInArray(_:) visits each member of the set, and when visiting a particular set member adds a corresponding tuple object element to the tuple array. In creating the new tuple object, the method adds the visited set member itself cast as a string as the term component of the new tuple object, sets as the frequencies component of the tuple the value returned by the noted countForObject(_:) method with respect to the at-hand visited set member, and sets as the positions component of the new tuple object the result of calling findIndicesOfWord(_: in Array:) where passed as the first parameter is at-hand visited set member setItem cast as a string, and where passed as the second parameter is passed-in string array wordArray. In agreement with that which has been discussed, that which is returned in reply to wordCounterSet.countForObject(setItem) of the above pseudocode may reflect the quantity of times at-hand visited set member setItem exists in wordCounterSet—and by extension—the input string array. The findIndicesOfford (_: in Array:) method employs a for-in loop to visit each element of the array passed to it, and when doing so adds the index number of the visited element to the to-be-returned integer array under the circumstance where the visited element matches passed-in wordToFind.

Regarding the termBoost field of JobListingInverseIndexTermEntity, it is noted that termBoost may be employed to convey, with respect to a term as it exists in a given field for a given job listing document, a value to be employed in a discussed herein relevancy score calculation. According to one or more embodiments a boost of 1.0 may be the default boost, a value of greater than 1.0 may serve to drive the score calculation higher, and a value of less than 1.0 may serve to drive the score calculation lower. A boost of greater than 1.0 may be set where it is determined—through an automated analysis of the relevancy score calculation's effect on related outputs (e.g., suggested normalized keywords and/or suggested normalized job titles)—that the relevancy score calculation tends too low for a given term as it appears in a given field of a given job listing document. A boost of less than 1.0 may be set where it is determined—for instance through automated analysis of the sort noted—that the relevancy score calculation tends too high for a given term as it appears in a given field of a given job listing document.

With reference to the foregoing, where a job listing is undergoing indexing by indexing method doIndexing( ) such method may act as follows with respect to each field of the job listing which is to be indexed. Via the approach discussed hereinabove the method may yield from a string representation of the at-hand field to be indexed a sans-punctuation string array wherein each element of the array holds a word of the at-hand field. Indexing method doIndexing( ) may then pass the string array to the discussed findFrequenciesPositionsForTermsInArray(_:) method, indexing method doIndexing( ) receiving in return a tuple array of the sort discussed which sets forth for each unique word in the input string array the unique word (via tuple component term), the quantity of times it occurs in the passed-in string array and by extension the quantity of times it occurs in the corresponding job listing field (via tuple component frequencies), and the position or positions at which those occurrences sit in the passed in string array and by extension in the corresponding job listing field (via tuple component positions). Then with respect to each such unique word of the tuple array—perhaps with indexing method doIndexing( ) employing a for-in loop to visit each element of the tuple array—doIndexing( ) may act to determine the boost value for the at-hand word (e.g., doIndexing( ) may call a method which accepts a word, a field name, and a document number and returns the corresponding set boost value). Indexing method doIndexing( ) may, for instance, create a new tuple array which is like the discussed tuple array but which additionally includes in each tuple thereof a tuple component specifying the boost for the word of the tuple.

With reference to the JobListingInverseIndexTermEntity definition it is noted that populating a JobListingInverseIndexTermEntity record with respect to an at-hand word may call for the following information:

1) Field in which the word is found so that the JobListingInverseIndexTermEntity indexField field may be satisfied. Such may be known to doIndexing( ) by virtue of doIndexing( ) having access to the at-hand job listing, knowing which fields are to be indexed (e.g., via accessing an object property, and/or by calling a method which returns such), and knowing the indexable field which is presently subject to indexing;
2) The word itself the JobListingInverseIndexTermEntity term field
may be satisfied. Such may be known to doIndexing( ) for instance, via the discussed tuple array;
3) The document number of the job listing in which the word appears. Such may be known to doIndexing( ) by virtue of it having access to the at-hand job listing;
4) The term frequency and term positions for the at-hand word with respect to the at-hand indexable field. Such may be known to doIndexing( ) for instance, via the discussed tuple array;
5) The term boost for the at-hand word with respect to the at-hand indexable field of the at-hand document. Such may be known to doIndexing( ) via the discussed newly created tuple array which additionally includes boosts.

With such index field, term, document number, term frequency, term boost, and term position information for the at-hand word at its disposal, indexing method doIndexing( ) may then with respect to each word of the discussed newly created tuple array which additionally includes boosts act as follows, doIndexing( ) perhaps employing a for-in loop to visit each element of the tuple array which additionally includes boosts.

Turning to FIG. 9 it is noted that in one aspect the indexing method may, with respect to the at-hand visited element of the tuple array which additionally includes boosts, determine at phase 901 whether or not there exists a JobListingInverseIndexTermEntity record which corresponds to the term indicated by that at-hand visited element and to the indexable field from which indexing method doIndexing( ) drew that term (e.g., from the rawKwd field). Where such record exists, indexing method doIndexing( ) may update the record to specify—with respect to the term and field to which the record corresponds—the term frequency, term positions, and term boost set forth by the at-hand visited element of the tuple array which additionally includes boosts, as well as the corresponding thereto job listing document number.

Such record existence check may involve instantiating an NSFetchRequest object whose entityName property is set to indicate "JobListingInverseIndexTermEntity" and whose predicate property is set to indicate that retrieved records may set forth the at hand term in the term field and in the indexField field the job listing field from which indexing method doIndexing( ) drew that term. Taking the at-hand term to be accessible via tuple.term and the corresponding job listing field from which that term was drawn to be held in object currentField, the noted predicate property of the instantiated NSFetchRequest object may be set to "term=%@ and indexField=%@", tuple.term, currentField", thusly indicating that it is desired that returned job listing records set forth tuple.term for their term fields and currentField for their indexField fields.

Then indexing method doIndexing( ) may call executeFetchRequest(_:) on the at-hand managed object context with the instantiated NSFetchRequest object being passed as the sole parameter of the method call. The array returned in response to the method call may then be considered. Where the record in question exists it may be available via index [0] of the returned array. Where the record in question does not exist the returned array may be empty. As such, indexing method doIndexing( ) may check the isEmpty property of the returned array. Where isEmpty holds Boolean true the doIndexing( ) may take the record in question to not exist and flow may proceed to phase 903 in pursuit of creating a new JobListingInverseIndexTermEntity record. Where isEmpty holds Boolean false doIndexing( ) may take the record in question to exist and flow may proceed to phase 905 in pursuit of altering the existing JobListingInverseIndexTermEntity record.

Pursing new JobListingInverseIndexTermEntity record creation with arrival at phase 903, indexing method doIndexing( ) may, in keeping with the pseudocode employed herein, instantiate an NSEntityDescription object via employ of the NSEntityDescription class method entityForName(_: inManagedObjectContext:) where the string "JobListingInverseIndexTermEntity" is passed as the first parameter of the call and the at-hand managed object context is passed as the second parameter of the call. Flow may then proceed to phase 907 where the indexing method instantiates an NSManagedObject object via the initializer method init (entity: insertIntoManagedObjectContext:) where the above-instantiated NSEntityDescription object is passed as the first parameter and the at-hand managed object context is passed as the second parameter.

Flow may then proceed to phase 909 where indexing method doIndexing( ) may make multiple setValue(_: forKey:) calls on the instantiated NSManagedObject. A first such call may pass the term indicated by the at-hand visited element of the tuple array which additionally includes boosts (e.g., accessible via tuple.term) as the first parameter and "term" as the second parameter, and may serve to set the noted term as the value for the term field of the new JobListingInverseIndexTermEntity record. As second such call may pass the indexable field from which indexing method doIndexing( ) drew the term (e.g., accessible via currentField) as the first parameter and "indexField" as the second parameter, and may serve to set such field from which the at-hand term was drawn as the value of the indexField field of the new JobListingInverseIndexTermEntity record. A third such call may pass the document number of the JobListingEntity record from which the indexing method drew the term (e.g., accessible via currentDocNumber) as the first parameter and "documentNumbers" as the second parameter, and may serve to set such job listing document number as the value of the documentNumbers field of the new JobListingInverseIndexTermEntity record. It is noted that since, at this juncture, the JobListingInverseIndexTermEntity record may be setting forth only a single document number value there may not yet be call to employ comma delimitation. It is further noted that under the circumstance where indexing method doIndexing( ) has possession of the at-hand document number in other than string from (e.g., as an NSUUID object) indexing method doIndexing( ) may cast the document number to a string representation for purposes of the method call.

A fourth call to setValue(_: forKey:) may pass the term frequency indicated by the at-hand visited element of the tuple array which additionally includes boosts (e.g., accessible via tuple.frequencies) cast as a string as the first parameter and "termFrequency" as the second parameter, and may serve to set the passed frequency as the value for the termFrequency field of the new JobListingInverseIndexTermEntity record. It is noted that since, at this juncture, the JobListingInverseIndexTermEntity record may be setting forth only a single term frequency value there may not yet be call to employ comma delimitation. A fifth such call may pass the term boost indicated by the at-hand visited element of the tuple array which additionally includes boosts (e.g., accessible via tuple.boost) cast as a string as the first parameter and "termBoost" as the second parameter, and may serve to set the passed boost as the value for the termBoost field of the new JobListingInverseIndexTermEntity record. It is noted that since, at this juncture, the JobListingInverseIndexTermEntity record may be setting forth only a single boost value there may not yet be call to employ comma delimitation.

A sixth call to setValue(_: forKey:) may convey the one or more positions indicated by the at-hand visited element of the tuple array which additionally includes boosts. Such may be available, for example, via that which is returned by passing tuple.positions to underscoreDelimitedStringFromPositionsIntArray(_:), a further method of the indexOperations object. Method underscoreDelimitedStringFromPositionsIntArray(_:) may have the declaration:

---
underscoreDelimitedStringFromPositionsIntArray(_ thePositionsIntArray: [Int]) -> String
---

As such the declaration indicates that the method may take a single parameter of type integer array, the single parameter having the local parameter name thePositionsIntArray and no external parameter name. Further indicated by the declaration is that the method may return a string. Method underscoreDelimitedStringFromPositionsIntArray (_:) may be set forth via code in line with the pseudocode:

```
func underscoreDelimitedStringFromPositionsIntArray(_
    thePositionsIntArray: [Int]) -> String {
    var tempStringArray: [String] = [String]()
    for element in thePositionsIntArray {
        tempStringArray.append(String(element))
    }
    return tempStringArray.joinWithSeparator("_")
}
```

As referenced, tuple.positions may be an integer array of one or more elements. The underscoreDelimitedStringFromPositionsIntArray(_:) method may take such an integer array and yield a string which employs underscore-delimitation in the case of multiple position values. As illustrations, passing a tuple.positions of [2] to the method may yield the string "2", while passing a tuple.positions of [1, 3] to the method may yield the string "1_3". As such, the method yields the discussed underscore-delimitation expected for the termPositions field of JobListingInverseIndexTermEntity. In view of this, the result of passing tuple.positions to the underscoreDelimitedStringFromPositionsIntArray(_:) method may be passed as the first parameter of the setValue(_: forKey:) call while "termPositions" may be passed as the second parameter of the call. Such setValue(_: forKey:) call may serve to set the string returned by underscoreDelimitedStringFromPositionsIntArray(_:) as the value for the termPositions field of the new JobListingInverseIndexTermEntity record. It is noted that, at this juncture, the JobListingInverseIndexTermEntity record may only be setting forth a single group of one or more underscore-delimited term position values. As such there may not yet be call to employ the discussed comma delimitation.

Finally, flow may proceed to phase 911 where the indexing method doIndexing( ) may call save( ) on the at-hand managed object context, thusly causing the new JobListingInverseIndexTermEntity record to be committed to the store.

As noted, where indexing method doIndexing( ) at phase 901 finds Boolean true when checking the discussed isEmpty property flow may proceed to phase 905 so that doIndexing( ) may pursue altering the existing record. At phase 905 indexing method doIndexing( ) may access the existing record's values for the to-be-altered fields of that record. As such indexing method doIndexing( ) may access the existing record's values for the fields documentNumbers, termFrequency, termBoost, and termPositions. Moreover indexing method doIndexing( ) may store the values thereof in temporary objects. As referenced, the existing JobListingInverseIndexTermEntity record may be accessible via index [0] of the array returned in response to the discussed executeFetchRequest(_:) call. Bearing this in mind, indexing method doIndexing( ) may access the noted field values and store to the noted temporary objects via code in line with the pseudocode:

```
var tempDocumentNumbers: String = fetchResult[0].valueForKey("documentNumbers")
var tempTermFrequency: String = fetchResult[0].valueForKey("termFrequency")
var tempTermBoost: String = fetchResult[0].valueForKey("termBoost")
var tempTermPositions: String = fetchResult[0].valueForKey("termPositions")
``` where fetchResult is taken to be the array returned in response to the noted call to executeFetchRequest(_:).

From phase 905 flow may proceed to phase 913 where indexing method doIndexing( ) may add to each of the temporary string objects a further comma-delimited position, the further comma-delimited position setting forth information regarding the job listing field of the job listing which is presently undergoing indexing.

Taking the document number of the job listing presently undergoing indexing to be held in a string object currentDocNumber, indexing method doIndexing( ) may make use of code in line with the pseudocode tempDocumentNumbers=tempDocumentNumbers. stringByAppendingString(",\(currentDocNumber)"), which causes tempDocumentNumbers to set forth the string which it previously set forth but with a comma character and the string value set forth by currentDocNumber appended to its end.

In like vein, taking the term frequency indicated by the at-hand visited element of the tuple array which additionally includes boosts to be accessible via tuple.frequencies, indexing method doIndexing( ) may make use of code in line with the pseudocode tempTermFrequency=tempTermFrequency. stringByAppendingString(",\(tuple.frequencies)").

In further like vein, taking the term boost indicated by the at-hand visited element of the tuple array which additionally includes boosts to be accessible via integer-valued tuple.boost, indexing method doIndexing( ) may make use of code in line with the pseudocode tempTermBoost=tempTermBoost.stringByAppendingString (",\(tuple.boost)").

In still further like vain, taking underscoreDelimitedStringForTuplePositions to hold the underscore-delimited string resulting from passing tuple.positions to noted underscoreDelimitedStringFromPositionsIntArray(_:)—where tuple.positions is taken to convey the one or more positions indicated by the at-hand visited element of the tuple array which additionally includes boosts—indexing method doIndexing( ) may make use of code in line with the pseudocode tempTermPositions=tempTermPositions.stringBy AppendingString(",\(underscoreDelimitedStringForTuplePositions)").

From phase 913 flow may proceed to phase 915 where indexing method doIndexing( ) may act to set fields of the existing JobListingInverseIndexTermEntity record as per corresponding ones of the discussed temporary objects. As such doIndexing( ) may make use of code in line with the pseudocode:

```
fetchResult[0].setValue(tempDocumentNumbers, forKey: "documentNumbers")
fetchResult[0].setValue(tempTermFrequency, forKey: "termFrequency")
fetchResult[0].setValue(tempTermBoost, forKey: "termBoost")
fetchResult[0].setValue(tempTermPositions, forKey: "termPositions")
```

From phase 915 flow may proceed to phase 917 where indexing method doIndexing( ) may call save( ) on the at-hand managed object context, thereby causing the changes to the altered JobListingInverseIndexTermEntity record to be committed to the store.

It is noted that according to one or more embodiments, where there is desire to alter a job listing record itself—that is to say a desire to alter the JobListingEntity record for a job listing—such may perhaps be achieved by creating a new JobListingEntity record which reflects the desired changes and which receives a new document number, and subjecting that new job listing record to indexing. According to one or more embodiments the outmoded JobListingEntity record may be deleted (e.g., via one or more calls to deleteObject (_:) on the at-hand managed object context passing an NSManagedObject object corresponding to the deleted record as the sole parameter of the call).

Further to indexing method doIndexing( ) altering and/or creating a JobListingInverseIndexTermEntity record with respect to processing a given word in connection with indexing (e.g., when indexing a job listing and hitting the word "python" in an indexable field—say the rawKwd field—acting as discussed hereinabove), indexing method doIndexing( ) may alter and/or create a JobListingDocumentFrequencyEntity record with respect to that word. The JobListingDocumentFrequencyEntity may have the entity definition:

| Field Name | Data Type |
|---|---|
| term | String |
| indexField | String |
| docFrequency | String |

According to one or more embodiments, there may alternately or additionally be an entity named ResumeDocumentFrequencyEntity and/or an entity named NormalizedKeywordDocumentFrequencyEntity. Such entities may be the same as the noted JobListingDocumentFrequencyEntity outside of entity name. As such the JobListingDocumentFrequencyEntity may be employed in connection with job listings, the ResumeDocumentFrequencyEntity may be employed in connection with resumes, and/or the NormalizedKeywordDocumentFrequencyEntity may be employed in connection with normalized keywords. With reference to that which is discussed herein it is noted that, in keeping with the Core Data functionality provided via the Swift/Apple frameworks, such employ of different entity names may facilitate, for example, JobListingDocumentFrequencyEntity records being stored in a first store (e.g., database), NormalizedKeywordDocumentFrequencyEntity records being stored in a second store (e.g., database), and/or ResumeDocumentFrequencyEntity records being stored in a third store (e.g., database), and/or limiting operations to a single one of JobListingDocumentFrequencyEntity records, NormalizedKeywordDocumentFrequencyEntity records, or ResumeDocumentFrequencyEntity records.

The JobListingDocumentFrequencyEntity will now be discussed with respect to the following example record which conforms to the entity definition:

| Field Name | Value |
|---|---|
| term | python |
| indexField | rawKwd,rawTtl |
| docFrequency | 132,38 |

The term field sets forth as a string the term to which the record corresponds. The indexField and docFrequency fields each set forth a comma-delimited string in the vein of that discussed with respect to JobListingInverseIndexTermEntity, a comma-delimited position number p in the indexField field string conveying a value related to comma-delimited position number p in in the docFrequency field (e.g., comma-delimited position number one in the indexField field string conveying a value relating to comma-delimited position number one in the in the docFrequency field).

In the example record, the term field indicates that the record corresponds to the word "python" The indexField and docFrequency fields—taken together and bearing in mind the referenced yoked comma-delimited positions—convey the following. Firstly that—when considering the rawKwd field of job listing records—among all job listing records in the corpus the word "python" occurs 132 times. And, secondly, that—when considering the rawTtl field of job listing records—among all job listing records in the corpus the word "python" occurs 38 times. As such the docFrequency field conveys a job-listing-field-specific count of the quantity of times a word exists among all job listings of the corpus taken together. As discussed herein, such document frequency value may be employed in the discussed-herein relevancy score calculation.

As an example, indexing method doIndexing( ) may, when encountering a given occurrence of the word "python" in the indexable field rawKwd of a being-indexing job listing, determine whether or not there exists a JobListingDocumentFrequencyEntity record for the word "python."

Where such record exists doIndexing( ) may update the record to reflect the newly-indexed occurrence of the word "python." Where such JobListingDocumentFrequencyEntity record does not exist doIndexing( ) may both create a JobListingDocumentFrequencyEntity record and set it to reflect the newly-indexed occurrence of the word "python." Such checking may involve instantiating an NSFetchRequest object whose entityName property is set to indicate "JobListingDocumentFrequencyEntity" and whose predicate property is set to indicate that returned records may set forth "python" in the term field (e.g., where "python" is held in string object termUnderIndex the predicate property may be set to:

"term==%@", termUnderIndex).

Then, the executeFetchRequest(_:) method may be called by doIndexing( ) on the at-hand managed object context with the NSFetchRequest object being passed as the sole parameter of the method call. The array returned in response to the method call may then be considered by doIndexing( ). In particular, where such record exists it may be available via element [0] of the returned array, but where such record does not exist the returned array may be empty. As such the isEmpty property of the returned array may be checked for its Boolean value. Where isEmpty holds Boolean true the record may be taken to not exist. Where isEmpty holds Boolean false the record may be taken to exist.

Under the scenario where the record does not exist doIndexing( ) may act as follows. To open, it is noted that for the purposes of the following discussion of the circumstance where the JobListingDocumentFrequencyEntity record does not exist the above-placed sample JobListingDocumentFrequencyEntity record setting forth "python" may be placed aside. Creation of the JobListingDocumentFrequencyEntity record may, in accordance with the Swift/Apple frameworks pseudocode employed herein, in one aspect involve instantiating an NSEntityDescription object via employ of the NSEntityDescription class method entityForName(_: inManagedObjectContext:), where the string "JobListingDocumentFrequencyEntity" is passed for the first parameter and the at-hand managed object context is passed as the second parameter. In another aspect, creation of the record may involve instantiating an NSManagedObject via the initializer method init(entity: insertIntoManagedObjectContext:), where the above-instantiated NSEntityDescription object is passed as the first parameter and the at-hand managed object contest is passed as the second parameter. In a further aspect, creation of the JobListingDocumentFrequencyEntity record may involve multiply calling the setValue(_: forKey:) method on the instantiated NSManagedObject. A first such call may pass the term ("python" according to the at-hand example) for the first parameter and "term" as the second parameter, and may serve to set the passed term ("python" according to the at-hand example) as the value for the term field of the new record. As second call to setValue(_: forKey:) may pass the at-hand field being indexed ("rawKwd" according to the at-hand example) as the first parameter and "indexField" as the second parameter and may serve to set the at-hand field being indexed (e.g., "rawKwd" according to the at-hand example) as the value for the indexField field of the new JobListingDocumentFrequencyEntity record. A third such call may pass the string "1" as the first parameter and docFrequency as the second parameter and may serve to set for the docFrequency field of the new JobListingDocumentFrequencyEntity record one as the current count—with respect to the at-hand indexed field (e.g., "rawKwd" according to the at-hand example)—of the quantity of times the word "python" occurs across job listing documents in the corpus. With regard to the docFrequency field being set to a count of one, it is noted that such reflects that, according to the current example, "python" has been found once in the at-hand indexable field, and the finding of no preexisting record corresponding to "python" indicates that the previous corpus count for "python," for the at-hand indexable field, was zero.

In a final aspect, creation of the record may involve calling save( ) on the at-hand managed object context. As such, a new JobListingDocumentFrequencyEntity record may be saved to the store via the foregoing.

Turning to FIG. 10 it is noted that under the scenario where the record does exist, doIndexing( ) may act as follows to update the existing record to reflect the example circumstance of "python" having been found once in the rawKwd field of a JobListingDocumentFrequencyEntity record undergoing indexing. As such, doIndexing( ) may, via phase 1001 and phase 1003 access, respectively, the indexField and docFrequency field of the noted existing record, and may save each to a temporary object. As referenced, the noted existing record may be available via element [0] of the array which was returned in reply to the call to executeFetchRequest(_:). Taking such array to be held in object fetchResult, the noted fields of the existing JobListingDocumentFrequencyEntity record may be assigned to such temporary objects via code in line with the pseudocode:

```
var tempIndexField: String = fetchResult[0].valueForKey("indexField")
var tempDocFrequency: String = fetchResult[0].valueForKey("docFrequency")
```

Via phase 1005 the indexing method doIndexing( ) may determine whether or not the existing record sets forth document frequency information for the at-hand indexable field (e.g., rawKwd according to the present example). It is noted that there may be the possibility that the record may exist for the at-hand word—"python" according to the present example—yet only set forth document frequency information for fields other than the at-hand field. As an illustration, for the circumstance of an at-hand word of "python" and an at-hand indexable field of rawKwd, the existing JobListingDocumentFrequencyEntity record may set forth document frequency information with respect to "python" for only, say, the rawTtl field and not for the rawKwd field. In making such determination indexing method doIndexing( ) may firstly create a string array corresponding to string object tempIndexField by calling componentsSeparatedByString(_:) on the string object where, in view of the comma delimitation employed by the indexField of the existing JobListingDocumentFrequencyEntity record, "," is passed as the sole parameter of the method call. Indexing method doIndexing( ) may then call the contains(_:) method on the string array, passing as the sole parameter of the method call, in view of the at-hand field being rawKwd, the string "rawKwd." Where the method call returns Boolean true doIndexing( ) may take the indexField of the existing JobListingDocumentFrequencyEntity record to set forth "rawKwd" and flow may proceed to phase 1011. Where the method call returns Boolean false doIndexing( ) may take the indexField of the existing JobListingDocumentFrequencyEntity record to not set forth "rawKwd" and flow may proceed to phase 1007. For the purposes of the example scenario in which phase 1007 is reached the at-hand JobListingDocumentFrequencyEntity record for "python" may be considered to be as follows:

| Field Name | Value |
|---|---|
| term | python |
| indexField | rawTtl |
| docFrequency | 38 |

Via phase 1007 and phase 1009 indexing method doIndexing( ) may act in the pursuit of adding to each of the indexField and docFrequency fields of the existing JobListingDocumentFrequencyEntity record a further comma-delimited position. As such doIndexing( ) may, via code in keeping with the following pseudocode, in one aspect append to each of tempIndexField and tempDocFrequency so as to reflect a count of 1 with respect to "rawKwd":

```
tempIndexField = tempIndexField.stringByAppendingString(",\(currentField)")
tempDocFrequency = tempDocFrequency.stringByAppendingString(",\(currentCount)")
``` where currentField is taken to be a string object specifying "rawKwd" and currentCount is taken to be an integer object specifying 1. With regard to specification of a count of 1 with respect to "rawKwd," it is noted that such may reflect that, according to the current example, "python" has been found once in the at-hand indexable field rawKwd, and it being found via phase 1005 that although a JobListingDocumentFrequencyEntity record exists with respect to the word "python" such record sets forth no information with respect to the rawKwd field. Such setting forth of no information indicates that the previous corpus count for "python" with respect to rawKwd was zero.

Turning to phase 1009, recalling the discussed array fetchResult and taking managedObjectContext to provide access to the at-hand managed object context, the existing JobListingDocumentFrequencyEntity record may be updated by indexing method doIndexing( ) to, via code in line with the following pseudocode, match the changes recorded at tempIndexField and tempDocFrequency:

```
fetchResult[0].setValue(tempIndexField, forKey: "indexField")
fetchResult[0].setValue(tempDocFrequency, forKey: "docFrequency")
managedObjectContext.save( )
```

As referenced, phase 1011 may be reached where at phase 1005 it is determined that the existing JobListingDocumentFrequencyEntity record does set forth document frequency information for the at-hand indexable field (e.g., rawKwd according to the present example). For the purpose of the scenario where phase 1011 is reached, the at-hand JobListingDocumentFrequencyEntity record may be taken to be the first shown example JobListingDocumentFrequencyEntity record setting forth "python," that is to say the record:

| Field Name | Value |
|---|---|
| term | python |
| indexField | rawKwd,rawTtl |
| docFrequency | 132,38 |

At phase 1011 indexing method doIndexing( ) may determine the comma-delimited position number for the at-hand indexed field. The indexField and docFrequency fields of a JobListingDocumentFrequencyEntity record may be yoked such that comma-delimited position p of the docFrequency field sets forth document frequency information which corresponds to the field specified by comma-delimited position p of the indexField field. Taking the discussed string array upon which the contains(_:) method was, at phase 1005, called to have the name tempIndexFieldArray, indexing method doIndexing( ) may determine the comma-delimited position number for the at-hand indexable field of rawKwd via code in line with the following pseudocode:

```
var delimPosition=tempIndexFieldArray.indexOf(consideredIndexField),
``` where consideredIndexField is taken to specify the at-hand indexed field (e.g., rawKwd according to the present example).

At phase 1013 doIndexing may find the document frequency value set forth by the record with respect to the comma-delimited position determined at phase 1011 via code in line with the pseudocode:

```
var tempDocFrequencyArray: [String] =
  tempDocFrequency.componentsSeparatedByString(",")
var docFrequencyValueAtDelimPosition: Int =
  Int(tempDocFrequencyArray[delimPosition])
``` where the Int(tempDocFrequencyArray[delimPosition]) creates an integer corresponding to the string yielded via tempDocFrequencyArray[delimPosition].

At phase 1015 the indexing method may in one aspect increment the integer value obtained via phase 1013 via code in line with the pseudocode var incrementedFrequencyValueString: String=String(docFrequencyValueAtDelimPosition+1), where the incrementation reflects "python" having been found once in the rawKwd field of the job listing undergoing indexing.

Further at phase 1015 the indexing method may update tempDocFrequency to reflect the incrementation via code in line with the pseudocode:

```
tempDocFrequencyArray[delimPosition] =
  incrementedFrequencyValueString
tempDocFrequency = tempDocFrequencyArray.joinWithSeparator(",")
``` where the first pseudocode line updates the appropriate array element to reflect the incremented count value held in incrementedFrequencyValueString, and the second pseudocode line updates discussed string tempDocFrequency by converting the array to a comma-delimited string via the indicated call to joinWithSeparator(_:).

At phase 1017 indexing method doIndexing( ) may update the existing JobListingDocumentFrequencyEntity record to match the change recorded to tempDocFrequency via code in line with the following pseudocode:

```
fetchResult[0].setValue(tempDocFrequency, forKey: "docFrequency")
managedObjectContext.save( )
``` where managedObjectContext is taken to provide access to the at-hand managed object context.

As referenced, although to facilitate discussion indexing is mainly herein discussed with respect to indexing of JobListingEntity-compliant records, indexing of, for instance, NormalizedKeywordEntity-compliant records and/or ResumeEntity-compliant records may be performed in analogous fashion.

Such analogously-performed indexing of NormalizedKeordEntity-compliant records may involve employing NormalizedKeywordInverseIndexTermEntity-compliant records in lieu of JobListingInverseIndexTermEntity-compliant records and NormalizedKeywordDocumentFrequencyEntity-compliant records in lieu of JobListingDocumentFrequencyEntity-compliant records. The entity definition for NormalizedKeywordInverseIndexTermEntity may be identical to that of JobListingInverseIndexTermEntity outside of entity name. In like vein the entity definition NormalizedKeywordDocumentFrequencyEntity entity may be identical to that of JobListingDocumentFrequencyEntity outside of the entity name Such analogously-performed indexing of ResumeEntity-compliant records may involve employing ResumeInverseIndexTermEntity-compliant records in lieu of JobListingInverseIndexTermEntity-compliant records and ResumeDocumentFrequencyEntity-compliant records in lieu of JobListingDocumentFrequencyEntity-compliant records. The entity definition for ResumeInverseIndexTermEntity may be identical to that of JobListingInverseIndexTermEntity outside of the entity name. The entity definition for ResumeDocumentFrequencyEntity may be identical to that of JobListingDocumentFrequencyEntity outside of the entity name.

Such employ of entity definitions which differ only with respect to entity name (e.g., JobListingInverseIndexTermEntity, NormalizedKeywordInverseIndexTermEntity, and ResumeInverseIndexTermEntity differing from one another only by entity name) may facilitate, for instance, associating certain entity types with certain stores.

In particular, according to one or more embodiments multiple stores (e.g., multiple Core Data stores) may be established with it being the case that certain entity types are associated with certain stores. For instance, discussed-herein entities JobListingInverseIndexTermEntity and JobListingDocumentFrequencyEntity may be associated with a first store (e.g., named JobListingIndexingStore). Further for instance, in like vein discussed-herein ResumeInverseIndexTermEntity and ResumeDocumentFrequencyEntity may be associated with a second store (e.g., named ResumeIndexingStore). Still further for instance, also in like vein discussed-herein entities NormalizedKeywordInverseIndexTermEntity and NormalizedKeywordDocumentFrequencyEntity may be associated with a third store (e.g., named NormalizedKeywordIndexingStore). Also for instance, additionally in like vein discussed-herein entities JobListingEntity, ResumeEntity, and NormalizedKeywordEntity may be associated with a fourth store (e.g., named DataRecordsStore).

Revisiting the notion that it may be established that it is the case that certain entity types are associated with certain stores, the following is noted. Configurations may be established which set up such stores and such entity-to-store mappings. With such entity-to-store mappings, operation may be, for instance, that a an NSFetchRequest which specifies a particular entity may be handled by the store with which that entity is associated (e.g., an NSFetchRequest setting forth JobListingInverseIndexTermEntity may be directed to the JobListingIndexingStore store). In like vein when creating a record (e.g., in a fashion involving NSEntityDescription's entityForName(_: inManagedObjectContext:) method and NSManagedObject's init(entity: insertToManagedObjectContext) method) and specifying a particular entity the creation may occur with respect to the store with which that entity is associated (e.g., where the noted call to entityForName(_: inManagedObjectContext:) sets forth ResumeInverseIndexTermEntity a subsequent call to save( ) on the at-hand managed object context may cause the new ResumeInverseIndexTermEntity record to be committed to store ResumeIndexingStore). Such configurations may, as an example, be Core Data configurations (e.g., Core Data Model Editor-established Core Data configurations). For instance, a first Core Data configuration may be for the store JobListingIndexingStore and may assign to that configuration the entities JobListingInverseIndexTermEntity and JobListingDocumentFrequencyEntity. Further for instance, in like vein a second Core Data configuration may be for the store ResumeIndexingStore and may assign to that configuration the entities ResumeInverseIndexTermEntity and ResumeDocumentFrequencyEntity. Still further for instance, also in like vein a third Core Data configuration may be for the store NormalizedKeywordIndexingStore and may assign to that configuration the entities NormalizedKeywordInverseIndexTermEntity and NormalizedKeywordDocumentFrequencyEntity. Also for instance, further in like vein a fourth Core Data configuration may be for the store DataRecordsStore and may assign to that configuration the entities JobListingEntity, ResumeEntity, and NormalizedKeywordEntity. By way of such Core Data configurations such four stores may be established (e.g., due to the Core Data frameworks operating with respect to the Core Data configurations), and such store-to-entity relationships may be set up which provide, for instance, for the noted functionality wherein (e.g., due to the Core Data frameworks operating with respect to the Core Data configurations) fetches and record additions setting forth particular entities are directed to and handled by the appropriate store.

According to one or more embodiments, indexing operations may act in the vein of that which has been discussed above to create and populate records conforming to the further entity definition JobListingFieldDataEntity. JobListingFieldDataEntity may have the entity definition:

| Field Name | Data Type |
|---|---|
| docNum | String |
| fieldNames | String |
| fieldBoosts | String |
| fieldLengths | String |

In like vein index operations may act to create and populate records conforming to the entity definition ResumeFieldDataEntity and to the entity definition NormalizedKeywordFieldDataEntity, the definitions for each being the same as the entity definition for JobListingFieldDataEntity, differing only in name. As perhaps alluded to by their names, JobListingFieldDataEntity may correspond to job listings while ResumeFieldDataEntity and NormalizedKeywordFieldDataEntity may correspond, respectively, to resumes and normalized keywords. To facilitate discussion it is the JobListingFieldDataEntity which will be discussed in greater detail. Analogous is applicable with respect to the ResumeFieldDataEntity and the NormalizedKeywordFieldDataEntity.

The docNum field of a JobListingFieldDataEntity record may set forth the document number of a particular job listing. The fieldNames field of a JobListingFieldDataEntity record may set forth via a comma-delimited string the names of the fields set forth by its corresponding job listing record. As an illustration, such a fieldNames field may set forth "nrmTtl,nrmKwd,rawTtl,rawKwd." The fieldBoosts and fieldLengths fields of a JobListingFieldDataEntity record may correspond to the job listing document number set forth via the docNum field, and may set forth, in a comma-delimited fashion, field boost and field length data.

In particular, the comma-delimitation of those two fields may be each yoked to the comma-delimitation of the fieldNames field. As such, comma-delimited position p of the fieldLengths field may give field length data which corresponds to the job listing field set forth at comma-delimited position p of the fieldNames field. Likewise as such, comma-delimited position p of the fieldBoosts field may give field boost data which corresponds to the job listing field set forth at comma-delimited position p of the fieldNames field.

Such field length data may set forth length (e.g., in number of words) of a corresponding job listing field of a corresponding job listing document number. Such field boost data may set forth a field-specific score multiplier employable in discussed-herein relevancy score calculations with respect to a corresponding job listing document number.

Placement of such field length data may, for instance, involve indexing method doIndexing( ) calling—in keeping with the Swift/Apple frameworks-based pseudocode employed herein—on a string representing an at-hand field of a job listing being indexed (e.g., the rawKwd field) method enumerateSubstringsInRange(_: options: usingBlock:), where a Swift range corresponding to the totality of the at-hand job listing field is passed as the first parameter, NSStringEnumerationOptions.ByWords is passed as the second parameter, and passed for the third parameter is a closure which intakes a passed-in string and appends it to an array. Then indexing method doIndexing( ) accessing the count property of the array loaded by the closure may yield the word count for the job listing field.

In the vein of that which is discussed herein, such a field boost may be selected by a system administrator, and/or in an automated and/or automated assist fashion (e.g., via the time period-orientated and/or user pool-orientated testing of the sort discussed herein.

As an illustration, suppose that a JobListingDocumentFrequencyEntity record corresponding to job listing XYZ-123 and accordingly setting forth "XYZ-123" for its docNum field. Suppose further that such record set forth "nrmTtl,nrmKwd,rawTtl,rawKwd" for its fieldNames field, "1.2,0.9,1.0,1.0" for its fieldBoosts field, and "3,6,4,7" for its fieldLengths field. Such a JobListingDocumentFrequencyEntity record may indicate that for job listing XYZ-123 the following holds. The nrmTtl field of the job listing has a field boost of 1.2 and a field length of 3. The nrmKwd field of the job listing has a field boost of 0.9 and a field length of 6. The rawTtl field of the job listing has a field boost of 1.0 and a field length of 4. The rawKwd field of the job listing has a field boost of 1.0 and a field length of 7.

As referenced above, according to one or more embodiments there may be a stored record for each job listing and each such job listing record may be indexed. Such a job listing record may conform to the entity definition:

| Field Name | Data Type |
|---|---|
| docNum | String |
| rawTtl | String |
| rawKwd | String |
| nrmTtl | String |
| nrmKwd | String |
| extraData | String |

Such entity may be given the name JobListingEntity. According to one or more embodiments, there may alternately or additionally be an entity named ResumeEntity. Such entity may be the same as the noted JobListingEntity outside of entity name. As such the JobListingEntity may be employed in the storage of job listings while the ResumeEntity may be employed in the storage of resumes. With reference to that which is discussed herein it is noted that, in keeping with the Core Data functionality provided via the Swift/Apple frameworks, such employ of different entity names may—according to one or more embodiments—facilitate JobListingEntity records being stored in a first store (e.g., database) and/or ResumeEntity records being stored in a second store (e.g., database), and/or limiting operations (e.g., database fetch operations) to a single one of JobListingEntity records and/or ResumeEntity records. To facilitate discussion it is JobListingEntity which will be discussed in greater detail. It is noted that analogous is applicable to ResumeEntity.

The docNum field of a given job listing record may hold an identifier of the job listing. Such an identifier may be a UUID. In keeping with the pseudocode employed herein a UUID may be generated and presented as a string via code in line with the pseudocode NSUUID( ).UUIDString. The rawTtl field of a given job listing may hold text in the vein of the job title text provided by a job-listing-submitting user, such held text perhaps further reflecting the application of the discussed whitelist or blacklist operations.

The rawKwd field of a given job listing may hold, as one example, text in the vein of the discussed job submitting user-provided job description text. As a second example such field may hold text in keeping with that which arises from such user-provided job description text being subjected to a parsing operation. Such parsing may, for instance, intake user-provided job description text and look for words therein considered to be indicative of the job description setting forth qualifications (e.g., the word "qualifications" and/or the word "expertise" may be considered to be so indicative), and/or look for words therein considered to be indicative of the job description setting forth duties (e.g., the word "duties" and/or the word "responsibilities" may be considered to be so indicative). The parsing may consider text coupled with qualifications-indicating words to correspond to qualifications for the job and/or may consider text coupled with such duties-indicating words to correspond to duties for the job. Such qualifications text and/or such duties text may, according to one or more embodiments, be placed in the rawKwd field of the corresponding job listing record.

The nrmTtl field may hold one or more normalized job titles for the job set forth by a record, multiple normalized job titles being set forth by the string of the record via a delimiter (e.g., a comma character may be employed as a delimiter) between such multiple normalized job titles. In like vein the nrmKwd field may hold one or more normalized job keywords, such keywords also being discussed herein in connection with the moniker "skills." Akin to the normalized job title field, a delimited (e.g., ",") may be employed to allow multiple normalized keywords to be set forth via a single string. The normalized keywords may, as one example, be of the sort discussed herein in connection with the job listing providing user employing a GUI in selecting one or more normalized skills. The normalized job titles and/or normalized keywords may, for instance, be drawn from a pool. Moreover, each normalized keyword and/or normalized keyword may have an associated identifier (e.g., UUID and/or integer). As illustrations, normalized job titles may include name "scrummaster" with an identifier of 9989 and such normalized skills may include name "project execution" with an identifier of 9233. According to one or more embodiments, inclusion of a given normalized title via the nrmTtl field of a job listing record and/or inclusion of a given normalized keyword via the nrmKwd field of a job listing may set forth name, identifier, or both. As an illustration, where "scrummaster" is to be included in the nrmTtl field of a job listing, set forth—perhaps in a comma-delimited fashion with respect to other normalized titles—may be "scrummaster," "9989," or "scrummaster-9989." It is noted that although "scrummaster-9989" employs a dash character to delimitate normalized title name form normalized title identifier, other delimitation possibilities exist.

Still further set forth by the entity definition may be the field extraData. Such a field of a job listing may set forth additional data beyond that set forth by the other fields including but not limited to company name, company location, and/or salary. The field, as indicated by the entity definition, may be of type string. According to various embodiments, such additional information set forth via English or other human language text in the string. As another example encoding (e.g., Base64 encoding) may be employed. It is noted that the employ of encoding (e.g., Base64 encoding) may allow, for instance, for the inclusion of binary data (e.g., one or more images) in the string held by the field. According to one or more embodiments, delimitation may separate various data (e.g., separating company name from company location from salary). Such delimitation may be in the vein of that discussed (e.g., comma-character delimitation). Moreover such delimitation—as well as other delimitation discussed herein—may be set forth via XML tagging, JSON tagging, and/or the like. As referenced herein, JobListingEntity records may, for instance, be held in a database or other Core Data managed store (e.g., a store DataRecordsStore may hold JobListingEntity, ResumeEntity, and/or NormalizedKeordEntity records).

According to one or more embodiments, resumes, along with corresponding relevancy scores, may be identified. For example, as discussed herein returnResumesForXPathNormalizedKeywords(_: andYPathNormalizedKeywordsAndYPathNormalizedTitles:) may, perhaps flowing from the discussed provision of a new job listing, identify resumes and set forth corresponding relevancy scores.

As discussed in connection with FIG. 7, returnResumesForXPathNormalizedKeywords(_: andYPathNormalizedKeywordsAndYPathNormalizedTitles:) may perform operations including formulating a FieldInfo array (e.g., with regard to that which has been received for the parameter corresponding to X-path normalized keywords, that which has been received for the parameter corresponding to Y-path normalized keywords, and that which has been received for the parameter corresponding to Y-path normalized titles), and calling doFilterQueryForFieldInfoArray(_:) where the formulated FieldInfo array may be passed as the sole parameter of the call. Returned to returnResumesForXPathNormalizedKeywords(_: andYPathNormalizedKeywordsAndYPathNormalizedTitles:) as the result of the call may be a modified FieldInfo array of the sort discussed herein which appends to the passed-in FieldInfo array of pass resume document numbers. Still further, returnResumesForXPathNormalizedKeywords(_: andYPathNormalizedKeywordsAndYPathNormalizedTitles:) may call rankForFieldInfoArray(_: andFieldJoiner:) where the noted modified FieldInfo array may be passed as the first parameter of the call and an appropriate discussed-herein FieldJoiner enum value may be passed as the second parameter. The return of that call may be a discussed-herein tuple array, where the tuples thereof set forth document numbers of relevant resumes along with corresponding relevancy scores.

As another example, there may be a method returnResumesViaUserQuery( ) of the conductor object where the method has the declaration:

func returnResumesViaUserQuery( )→[FetchedResumeRecord]

As such the declaration may indicate that the method may take no parameters and may have a return type of [FetchedResumeRecord], to with an array of FetchedResumeRecord objects. The method may—with regard to FieldInfo array formulation, calling of doFilterQueryForFieldInfoArray(_:), and calling of rankForFieldInfoArray(_: andFieldJoiner:)—act in the vein of that which has just been discussed in connection with the returnResumesForXPathNormalizedKeywords(_: andYPathNormalizedKeywordsAndYPathNormalizedTitles:) method but with the FieldInfo array, rather than being formulated with regard to X-path normalized keywords, Y-path normalized keywords, and Y-path normalized titles, being—say—formulated with regard to a user setting forth (e.g., via a GUI) one or more Boolean query expressions with corresponding indications of the field to which a given query may apply, as well as indication of—in keeping with that which is discussed herein with respect to type FieldJoinerKind—that which of AND and OR may be applied with respect to particular adjacent Boolean query-field specifications.

As an illustration, via a GUI a user may be able to set forth a first Boolean query "project AND manager" with a corresponding field specification of "rawTtl," a second Boolean query "project OR management OR schedule NOT clinical" with a corresponding field specification of "rawKwd," and, say, and indication that AND be applied with respect to the two adjacent Boolean query-field specifications.

The GUI may, for example, employ functionality of the sort discussed herein with respect to job listing provision, and/or one or more UITextField objects, HTML <input> elements of type "text," UIPickerView objects, and/or JavaScript pulldown/select menus may be employed (e.g., with the UITextField objects and/or HTML <input> elements of type "text" being employed in receipt of the Boolean queries, and/or the UIPickerView objects and/or JavaScript pulldown/select menus being employed in receipt of the field and join specifications). As an example, the just-discussed GUI functionality may be implemented via a userResumeViewController which is an instantiation of a UserResumeViewController which inherits from UIViewController. Method returnResumesViaUserQuery( ) may employ the userResumeViewController object to receive data of the user's selections, and may employ that data in FieldInfo array formulation. It is noted that although the foregoing example sets forth two Boolean query-field specifications, greater or fewer than two Boolean query-field specifications may be set forth, with indications with respect to adjacent such query-field specifications as to which of AND and OR may be employed.

Returning to the example of the user GUI specification, returnResumesViaUserQuery( ) may construct a FieldInfo array having as its first element a FieldInfo object whose searchQueryForField property sets forth "project AND manager" and whose fieldName property sets forth "rawTtl," and having as its second element a FieldInfo object whose searchQueryForField property sets forth "project OR management OR schedule NOT clinical" and whose fieldName property sets forth "rawKwd." Moreover, in calling rankForFieldInfoArray(_: andFieldJoiner:) returnResumesViaUserQuery( ) may pass as the second parameter FieldJoinerKind.And.

Accordingly, as examples resumes along with corresponding relevancy scores may flowing from new job listing provision and flowing from GUI specification be identified. Now discussed will be one or more embodiments by which operations may be performed so as to present such identified resumes in a fashion which may serve to draw attention to one or more relevant resumes portions and/or aid resume presentation according to viewing modality (e.g., smartphone versus pad versus desktop/laptop viewing).

Two approaches to resume section relevancy determination (e.g., to support drawing attention to such relevant sections and/or to leverage such relevant sections in aiding resume presentation) will be considered herein. According to the first approach a portion of a resume may be considered relevant where—when considering a corresponding FieldInfo array—a Boolean expression is set forth with respect to that section and the section satisfies that Boolean expression. As discussed herein, such satisfaction is recorded via the qfPassDocs property of the FieldInfo object which sets forth that query. Accordingly, via such first approach to resume section relevancy each resume held up as a hit by rankForFieldInfoArray(_: andFieldJoiner:) may be considered. In particular the FieldInfo array involved in determining that resume to be a hit—that is to say the FieldInfo array passed as the first parameter in the call to rankForFieldInfoArray(_: andFieldJoiner:) which returned the resume as a hit—may be examined as to the qfPassDocs set forth by that FieldInfo array. Where a given FieldInfo object of the FieldInfoArray lists the document number of the at-hand hit resume as a qf pass doc, the resume section indicated by the fieldName property of that FieldInfo object may be considered to be a relevant section of that hit resume. The rationale may, according to one point of view, be that—by virtue of the resume being listed as a qf pass doc for that section—it is known that the resume satisfied the Boolean expression set forth with respect to that section.

As an illustration, suppose that the document number of a particular hit resume was QRS-609. Suppose further that the corresponding FieldInfo array was a two element array setting forth the following:

```
element [0]:
fieldName - "rawTtl"
searchQueryForField - "project AND manager"
qfPassDocs - ["XYZ-123", "ABC-456", "QRS-609"]
element [1]:
fieldName - "rawKwd"
searchQueryForField - "project OR management OR schedule NOT clinical"
qfPassDocs - ["XYZ-123", "ABC-456"]
```

According to the just-discussed approach to resume section relevancy, the rawTtl sections of resume QRS-609 may be considered a relevant section; due to "QRS-609" being listed among the qfPassDocs for rawTtl it is known that the rawTtl section of resume QRS-609 met the Boolean expression set forth with respect to that section—namely the Boolean expression "project AND manager." On the other hand the rawKwd section of resume QRS-609 might not be considered a relevant section; as "QRS-609" is not listed among the qfPassDocs for rawKwd it is known that the rawKwd section of resume QRS-609 did not meet the Boolean expression set forth with respect to that section—namely the Boolean expression "project OR management OR schedule NOT clinical."

A further approach to resume section relevancy may take what may, perhaps, be viewed as a more broadly encompassing view of section relevancy. In particular, with respect to a given hit resume the corresponding FieldInfo array may be examined and collected may be all terms set forth by the Boolean expression of that FieldInfo array which are not preceded by the word "NOT" (e.g., from a particular Boolean expression "project OR management OR schedule NOT clinical" it is "project," "management," and "schedule" which may be collected). Then all sections of the at-hand resume may be searched for each of the collected terms. A resume section which includes one or more of the collected words may be considered relevant. It is observed that this more broadly encompassing approach to relevancy might not take into account the resume sections to which the collected words may be directed in their queries. As such, again considering the above example two element FieldInfo array it is noted that the term "schedule" is set forth for a Boolean expression and therefore may be among the collected words. According to the more broadly encompassing approach to resume section relevancy any section of a corresponding hit resume setting forth "schedule" may be considered a relevant section for that resume. As such, for instance, where the nrmKwd section of a corresponding hit resume set forth "schedule" the nrmKwd section of that hit resume may be considered a relevant section even though no Boolean expression may be set forth with respect to the nrmKwd section as per the corresponding FieldInfo array.

First considered in greater detail will, in connection with FIG. 11, be the more broadly encompassing approach to resume section relevancy. Then discussed in greater detail will be the other approach.

Turning to FIG. 11 it is noted that two flow paths are depicted thereby. According to the first flow path phases 701-713 may transpire as discussed herein in connection with FIG. 7. Then, however, from phase 713 flow may proceed to phase 1109 where returnResumesForXPathNormalizedKeywords(_: andYPathNormalizedKeywordsAndYPathNormalizedTitles:) may call returnRelevantSparseSegmentedResumesForDocNumScoreTupleArray(_: usingQueriesOfFieldInfoArray:) of object segmentedResumeHelper which is an instantiation of a SegmentedResumeHelper class.

According to the second flow path, at phase 1101 the noted returnResumesViaUserQuery( ) method of the conductor object may be called. The method may, for example, be called in response to a user conveying (e.g., a GUI) a desire to perform a resume search by way of Boolean query specification of the sort noted. As an illustration returnResumesViaUserQuery( ) may be called by an action method startResumesViaUserQuery( ) of the conductor object which calls returnResumesViaUserQuery( ) and according to one or more embodiments saves the [FetchedResumeRecord] object returned in reply to the call as a property of the object which sets forth the action method, to with the conductor object. For example, the action method may, in keeping with the pseudocode employed herein, have @IBAction appended to the beginning of its method declaration and may take a single parameter of type AnyObject which has no external parameter name and which has the local parameter name sender. As such, for instance, a UIButton object may be associated with the action method whereby a user may convey such desire by activating the button object, thusly causing the method to be called. From phase 1101 flow may proceed to phase 1103 where returnResumesViaUserQuery( ) may, as discussed hereinabove, employ the discussed userResumeViewController object to receive data regarding user resume query indications of the sort noted (e.g., one or more user indications of Boolean query and field corresponding thereto, and one or more discussed joiner indications) and further may employ that data in formulating—as discussed hereinabove—a FieldInfo array corresponding to that data.

From phase 1103 flow may proceed to phase 1105. At phase 1105 returnResumesViaUserQuery( ) may, in a manner akin to that which is discussed herein, call doFilterQueryForFieldInfoArray(_:), passing the FieldInfo array formulated in connection with phase 1103 as the sole parameter of the call. IN response to the call returnResumesViaUserQuery( ) may receive a modified FieldInfo array of the sort discussed herein which further sets for of pass resume document numbers.

From phase 1105 flow may proceed to phase 1107. At phase 1107 returnResumesViaUserQuery( ) may, in a manner akin to that which is discussed herein, call rankForFieldInfoArray(_: andFieldJoiner:), passing as the first parameter of the call the modified FieldInfo array received via phase 1105, and passing as the second parameter of the call that which—in keeping with that which is discussed herein—of FieldJoinerKind.And and FieldJoinerKind.Or corresponds to that which has been indicated by the user via the GUI. In reply to the call of phase 1107 returnResumesViaUserQuery( ) may receive a tuple array of the sort discussed herein which sets forth tuples providing resume document numbers and corresponding relevancy scores. From phase 1107 flow may proceed to phase 1109 where returnResumesViaUserQuery( ) may call returnRelevantSparseSegmentedResumesForDocNumScoreTupleArray(_: usingQueriesOfFieldInfoArray:) of object segmentedResumeHelper.

As such, flow may proceed to phase 1109 subsequent to either phase 713 or phase 1107. Firstly considering phase 1109 being entered via phase 713, it is observed that returnResumesForXPathNormalizedKeywords(_: andYPathNormalizedKeywordsAndYPathNormalizedTitles:) may call returnRelevantSparseSegmentedResumesForDocNumScoreTupleArray(_: usingQueriesOfFieldInfoArray:) passing as the first parameter the tuple array received in reply to the call of phase 713, and passing as the second parameter the modified FieldInfo array which was passed to rankForFieldInfoArray(_: andFieldJoiner:) by returnResumesForXPathNormalizedKeywords(_: andYPathNormalizedKeywordsAndYPathNormalizedTitles:) at phase 713. Secondly considering phase 1109 being entered via phase 1107 it is observed that returnResumesViaUserQuery( ) may call returnRelevantSparseSegmentedResumesForDocNumScoreTupleArray(_: usingQueriesOfFieldInfoArray:) passing as the first parameter the tuple array received in reply to the call of phase 1107, and passing as the second parameter the modified FieldInfo array which was passed to rankForFieldInfoArray(_: andFieldJoiner:) by returnResumesViaUserQuery( ) at phase 1107.

Method returnRelevantSparseSegmentedResumesForDocNumScoreTupleArray(_: usingQueriesOfFieldInfoArray:) of the segmentedResumeHelper object may, as perhaps somewhat alluded to by the foregoing discussion of parameters being passed thereto, have the declaration:

```
func
returnRelevantSparseSegmentedResumesForDocNumScoreTupleArray(_
theDocNumScoreTupleArray: [(String,Double)],
usingQueriesOfFieldInfoArray
theFieldInfoArray: [FieldInfo]) -> [SegmentedResume]
```

As such the declaration sets forth that the method may take a first parameter of type [(String,Double)]—an array of tuples, each such tuple setting forth a string and a double—where the first parameter has the local parameter name theDocNumScoreTupleArray and no external parameter name. The declaration further indicates that the method may take a second parameter of type [FieldInfo]—an array of FieldInfo objects, FieldInfo type being discussed herein—where the second parameter has the local parameter name theFieldInfoArray and the external parameter name usingQueriesOfFieldInfoArray. The declaration further indicates that the method may have a return type [SegmentedResume]—an array of SegmentedResume objects. The SegmentedResume type will now be discussed.

The SegmentedResume type may have the declaration:

```
class SegmentedResume: NSObject {
    var docNumString: String
    var rawTtlString: String
    var rawKwdString: String
    var nrmTtlString: String
    var nrmKwdString: String
    var extraDataString: String
}
```

As such the class may include a property docNumString of type string, a property rawTtlString of type string, a property rawKwdString of type string, a property nrmTtlString of type string, a property nrmKwdString of type string, and a property extraDataString of type string. Moreover, the class definition indicates that the class inherits from NSObject allowing for, for instance, the employ of key value coding (KVC) of the Swift/Apple frameworks-based pseudocode employed herein in connection with the class.

The method returnRelevantSparseSegmentedResumesForDocNumScoreTupleArray(_: usingQueriesOfFieldInfoArray:) method may, for instance, be implemented via code in line with the pseudocode:

```
func returnRelevantSparseSegmentedResumesForDocNumScoreTupleArray(_
theDocNumScoreTupleArray: [(String,Double)], usingQueriesOfFieldInfoArray
theFieldInfoArray: [FieldInfo]) -> [SegmentedResume] {
    var docNumArray: [String] = theDocNumScoreTupleArray.map({$0.0})
    var relevantSparseSegmentedResumesToReturn: [SegmentedResume] =
[SegmentedResume]( )
    for docNum in docNumArray {
    relevantSparseSegmentedResumesToReturn.append(self.returnRelevantSparseSegment
edResumeForDocNum(docNum, usingQueriesOfFieldInfoArray: theFieldInfoArray))
    }
    return relevantSparseSegmentedResumesToReturn
}
```

Among that which is conveyed by the pseudocode is applying a map function to passed-in tuple array theDocNumScoreTupleArray so as to yield an array docNumArray setting forth the resume document numbers indicated by the tuple array but not the score components. In particular the map function acts such that, for each array element of the tuple array, the resultant string array element sets forth the string component of that tuple array element (i.e., tuple component 0).

Further conveyed by the pseudocode is a for-in loop which visits each document number of discussed docNumArray and calls (phase 1111) to-be-discussed method returnRelevantSparseSegmentedResumeForDocNum(_: usingQueriesOfFieldInfoArray:), the called method being a method of the segmentedResumeHelper object. Passed for the first parameter of the call may be docNum, the at-hand visited document number of docNumArray. Passed for the second parameter may be theFieldInfoArray, the array of FieldInfo objects received via the second parameter passed to returnRelevantSparseSegmentedResumesForDocNumScoreTupleArray(_: usingQueriesOfFieldInfoArray:). The to-be-discussed SegmentedResume object returned in response to the call to returnRelevantSparseSegmentedResumeForDocNum(_: usingQueriesOfFieldInfoArray:) may be appended to relevantSparseSegmentedResumesToReturn. With completion of the for-in loop flowing from all resume document numbers of docNumArray having been visited, relevantSparseSegmentedResumesToReturn may be passed to the caller of returnRelevantSparseSegmentedResumesForDocNumScoreTupleArray(_: usingQueriesOfFieldInfoArray:).

Method returnRelevantSparseSegmentedResumeForDocNum(_: usingQueriesOfFieldInfoArray:), called in connection with phase 1111 will now be discussed in greater detail. The method may have the declaration:

```
func returnRelevantSparseSegmentedResumeForDocNum(_
theDocNum: String,
usingQueriesOfFieldInfoArray theFieldInfoArray: [FieldInfo]) ->
SegmentedResume
```

As such the declaration indicates that the method may take a first parameter of type String, the first parameter having the local parameter name theDocNum and no external parameter name. The declaration further indicates that the method may take a second parameter of type [FieldInfo] (i.e., an array of FieldInfo objects), the second parameter having the local parameter name theFieldInfoArray and the external parameter name usingQueriesOfFieldInfoArray. Still further the declaration indicates that the method may have a return type of SegmentedResume.

The method may, for instance, be implemented via code in line with the pseudocode:

```
func returnRelevantSparseSegmentedResumeForDocNum(_ theDocNum: String,
usingQueriesOfFieldInfoArray theFieldInfoArray: [FieldInfo]) -> SegmentedResume {
    var searchQueryForFieldsArray: [String] =
theFieldInfoArray.map({$0.searchQueryForField})
    var mergedQueriesString: String =
searchQueryForFieldsArray.joinWithSeparator(" ")
    var strippedMergedQueriesString: String =
self.stripConjunctionsAndNottedWordsFromQueryString(mergedQueriesString)
    var resumeLibrarian: ResumeLibrarian = ResumeLibrarian( )
    var returnedXmlResumeRecordString: String =
resumeLibrarian.returnXmlResumeRecordStringForDocNum(theDocNum)
    var fullSegmentedResume: SegmentedResume =
self.giveSegmentedResumeForXmlResumeRecordString(returnedXmlResumeRecordString)
    var relevantFields: [String] =
self.giveRelevantFieldsForSegmentedResume(fullSegmentedResume, forTerms:
strippedMergedQueriesString.componentsSeparatedByString(" "))
    var relevantSparseSegmentedResumeToReturn = SegmentedResume( )
    for field in relevantFields {
    relevantSparseSegmentedResumeToReturn.setValue((fullSegmentedResume.valueForKey(field) as String), forKey: field)
    }
    return relevantSparseSegmentedResumeToReturn
}
```

Among that which is conveyed by the pseudocode is applying a map function to passed-in FieldInfo array theFieldInfoArray so as to yield an array searchQueryForFieldsArray setting forth with respect to each FieldInfo object of theFieldInfoArray the searchQueryForField property thereof. Also conveyed by the pseudocode is creating a string mergedQueriesString which sets forth all elements of searchQueryForFieldsArray—thusly setting forth all queries of searchQueryForFieldsArray—where a space character is placed interelement when translating the string array to a string.

Further conveyed by the pseudocode is calling (phase 1113) to-be-discussed method stripConjunctionsAndNottedWordsFromQueryString(_:) of the segmentedResumeHelper object where mergedQueriesString is passed as the sole parameter of the call and with the string returned in reply to the call being placed in string object strippedMergedQueriesString. As is discussed in greater detail herein, stripConjunctionsAndNottedWordsFromQueryString(_:) may act to produce a string which corresponds to the passed-in string but which has removed therefrom instances of the word "AND," instances of the word "OR," instances of the word "NOT," and instances of words which are preceded by "NOT." As an illustration, where passed to the method was the string "project OR management OR schedule NOT clinical," the method may return the string "project management schedule." The application of such stripping to a query may perhaps be viewed as yielding from that query pertinent words thereof. With reference to that which is discussed herein, such thusly-produced pertinent words may be employed in identifying relevant sections of resumes returned in reply to a resume search. Also conveyed by the pseudocode is calling (phase 1115) to-be-discussed method returnXmlResumeRecordStringForDocNum(_:) of the resumeLibrarian object, an instantiation of class ResumeLibrarian. According to the pseudocode, passed as the sole parameter of the call may be passed-in parameter theDocNum. Further according to the pseudocode, the string returned in response to the call may be placed in string object returnedXmlResumeRecordString. Method returnXmlResumeRecordStringForDocNum(_:) may instantiate an NSFetchRequest object whose entityName property sets forth a to-be-discussed appropriate entity name and whose predicate property conveys that the returned record should set forth in an appropriate field the resume document number passed to returnXmlResumeRecordStringForDocNum(_:). The method may execute the fetch request. The method may then access the returned record via the [0] element of the array returned in response to the execution of the fetch request and retrieve the string value for a field of the record which conveys an XML resume. The method may then return that string value to the method's caller, thusly returning to the caller an XML resume corresponding to the passed-in resume document number.

Additionally conveyed by the pseudocode is calling (phase 1117) to-be-discussed method giveSegmentedResumeForXmlResumeRecordString(:), the method being a method of the segmentedResumeHelper object. Passed for the sole parameter of the call may be the XML resume string received in reply to the call of phase 1115. The SegmentedResume object returned in response to the call to giveSegmentedResumeForXmlResumeRecordString(:) may be held as SegmentedResume object fullSegmentedResume. As is discussed in greater detail herein, giveSegmentedResumeForXmlResumeRecordString(:) may act to load properties of a SegmentedResume object with corresponding XML tag-delimited data of the XML string passed to it (e.g., data of the XML string delimited by <docNum> and </docNum> may be loaded into the docNumString property of the SegmentedResume object). The thusly-loaded SegmentedResume object may be returned by giveSegmentedResumeForXmlResumeRecordString(:) to its caller.

Also conveyed by the pseudocode is calling (phase 1119) method giveRelevantFieldsForSegmentedResume(_: forTerms:), the method being a method of the segmentedResumeHelper object. Passed for the first parameter of the call may be the SegmentedResume object received in response to the call of phase 1117. Passed for the second parameter of the call may be a string array corresponding to discussed string strippedMergedQueriesString, the string array being produced by calling componentsSeparatedByString(_:) on strippedMergedQueriesString where " "—a string setting forth a space character—is passed as the sole parameter, thusly yielding a string array where a space character is used as the delimiter in mapping the string to elements of the string array. The string array returned in response to the call to giveRelevantFieldsForSegmentedResume(_: forTerms:) may be held as relevantFields. Method giveRelevantFieldsForSegmentedResume(_: forTerms:) will now be discussed in greater detail.

Method giveRelevantFieldsForSegmentedResume(_: forTerms:) may have the declaration:

```
func giveRelevantFieldsForSegmentedResume(_ theSegmentedResume: SegmentedResume, forTerms theTerms: [String]) -> [String]
```

As such the declaration indicates that the method may take a first parameter of type SegmentedResume, the first parameter having the local parameter name theSegmentedResume and no external parameter name. The declaration further indicates that the method may take a second parameter of type string array, the second parameter having the local parameter name theTerms and the external parameter name forTerms. Still further, the declaration indicates that the method may have a return type of string array.

The method may, for instance, be implemented via code in line with the pseudocode:

```
func giveRelevantFieldsForSegmentedResume(_ theSegmentedResume: SegmentedResume, forTerms theTerms: [String]) -> [String] {
  var setOfTheTerms: Set<String> = Set<String>(theTerms)
  var setForArrayToReturn: Set = Set<String>( )
  for term in setOfTheTerms {
    if theSegmentedResume.rawTtlString.containsString(term)
  { setForArrayToReturn.insert("rawTtlString") }
    if theSegmentedResume.rawKwdString.containsString(term)
  { setForArrayToReturn.insert("rawKwdString") }
    if theSegmentedResume.nrmTtlString.containsString(term)
  { setForArrayToReturn.insert("nrmTtlString") }
    if theSegmentedResume.nrmKwdString.containsString(term)
  { setForArrayToReturn.insert("nrmKwdString") }
    var extraDataStringAsDecodedData: NSData =
NSData(base64EncodedString: theSegmentedResume.extraDataString,
options: NSDataBase64DecodingOptions(rawValue: 0))
    var decodedExtraDataString: NSString = NSString(data:
extraDataStringAsDecodedData, encoding: NSUTF8StringEncoding)
    if decodedExtraDataString.containsString(term)
  { setForArrayToReturn.insert("extraDataString") }
  }
  setForArrayToReturn.insert("docNumString")
  var stringArrayToReturn: [String] = [String](setForArrayToReturn)
  return stringArrayToReturn
}
```

Among that which is conveyed by the pseudocode is instantiating set object setOfTheTerms where loaded into the set are the elements of passed-in string array theTerms. In keeping with the pseudocode employed herein a set may keep as a member only one copy of each given value passed to it (e.g., if passed to an empty set were the strings "1," "2," "3," and "1" the members of the set would be "1," "2," and "3"). As such, the employ of set setOfTheTerms may serve, for instance, to remove duplicate terms which may exist in passed-in theTerms. Further set forth by the pseudocode is instantiating empty set object setForArrayToReturn. Bearing in mind the discussed set functionality whereby only one copy of each value passed to a set may be retained, as discussed hereinbelow functionality of giveRelevantFieldsForSegmentedResume(_: forTerms:) may act to yield relevant field names. By adding such yielded relevant field names to setForArrayToReturn—and then conveying the contents of that set to the caller of giveRelevantFieldsForSegmentedResume(_: forTerms:)—functionality may be realized whereby the caller receives only one copy of each yielded relevant field name even where the yielding process produces multiples copies of one or more relevant field names.

Also set forth by the above pseudocode is a for-in loop wherein each term of the received string array of terms as loaded into discussed set setOfTheTerms may be visited. With the visiting of a given term, set forth by the pseudocode is checking multiple portions of the at-hand segmented resume for the presence of that term. Where such presence of the term is detected with respect to such a segmented resume portion, added to setForArrayToReturn may be the name of that segmented resume section. As an illustration, attention is drawn to the portion of the above pseudocode which sets forth:

```
if theSegmentedResume.rawTtlString.containsString(term)
  { setForArrayToReturn.insert("rawTtlString") }
```

Via such pseudocode of the for-in loop where the rawTtlString portion of the at-hand segmented resume is found to contain the visited term, "rawTtlString" may be added to setForArrayToReturn.

As such, via the for-in loop and the concomitant visitation of each unique passed-in term, at completion of the for-in loop setForArrayToReturn stands holding those of the considered segmented resume fields which set forth the passed-in terms.

The pseudocode additionally sets forth setForArrayToReturn.insert("docNumString"), thereby including "docNumString" in setForArrayToReturn. Such inclusion may potentially aid having the ultimately yielded segment resume records set forth appropriate resume document numbers. Finally set forth by the above pseudocode is instantiating string array stringArrayToReturn which sets forth the members of setForArrayToReturn, and returning that string array to the caller of giveRelevantFieldsForSegmentedResume(_: forTerms:).

Returning to consideration of the above-placed pseudocode corresponding to returnRelevantSparseSegmentedResumeForDocNum(_: usingQueriesOfFieldInfoArray:), also conveyed by the pseudocode is instantiating SegmentedResume object relevantSparseSegmentedResumeToReturn and a for-in loop wherein each field name set forth by the relevantFields string array received via the call of phase 1119 is visited. The pseudocode sets forth performing, with each such visitation, the employ of KVC functionality of the Swift/Apple frameworks pseudocode employed herein. In particular set forth by the pseudocode is:

which may be returned by the method. Object fullSegmentedResume is the above-discussed SegmentedResume object corresponding to the above-discussed retrieved XML resume for at-hand resume document number theDocNum, fullSegmentedResume conveying the entirety of the at-hand resume of theDocNum. The pseudocode "fullSegmentedResume.valueForKey(field) as String" employs KVC to retrieve that which fullSegmentedResume sets forth as the value for the field, field as presently visited by the for-in loop. The pseudocode "as String" implements a cast to string, thusly ensuring that the noted retrieved value is available as string. Then, via the setValue(_: forKey:) call on relevantSparseSegmentedResumeToReturn the just-discussed accessed value from fullSegmentedResume is set as the value for the corresponding field of relevantSparseSegmentedResumeToReturn. As an illustration, where the at-hand field name visited by the for-in loop is the field rawTtlString, the above-discussed valueForKey(_:) call may act to retrieve that which fullSegmentedResume sets forth for its rawTtlString (e.g., "construction project manager"). Then via the above-discussed setValue(_: forKey:) call such value may be set for the rawTtlString field of relevantSparseSegmentedResumeToReturn (e.g., the rawTtlString of relevantSparseSegmentedResumeToReturn may be set to "construction project manager"). As such, via the for-in loop yielded may be a sparse segmented resume which sets for each of the fields indicated by relevantFields the value which fullSegmentedResume sets forth for that field. The remaining fields of relevantSparseSegmentedResumeToReturn—those fields not indicated by relevantFields—may set forth an empty string. Bearing in mind that relevantFields, as discussed, sets forth those fields of the at-hand resume considered to be relevant along with the docNumString field, yielded by the for-in loop may be a sparse version of fullSegmentedResume which only conveys the fields of the resume considered to be relevant along with the resume document number. Finally set forth by the above pseudocode of returnRelevantSparseSegmentedResumeForDocNum(_: usingQueriesOfFieldInfoArray:) is returning to the method's caller the discussed relevantSparseSegmentedResumeToReturn SegmentedResume object. Depicted in FIG. 11 is phase 1121 where relevantSparseSegmentedResumeToReturn may be—as just discussed—built via the for-in loop, and then relevantSparseSegmentedResumeToReturn may be returned to the caller.

With reference to that which was discussed herein in connection with phase 1111, the caller of returnRelevantSparseSegmentedResumeForDocNum(_: usingQueriesOfFieldInfoArray:) may be returnRelevantSparseSegmentedResumesForDocNumScoreTupleArray(_: usingQueriesOfFieldInfoArray:). As such it is returnRelevantSparseSegmentedResumesForDocNumScoreTupleArray(_: usingQueriesOfFieldInfoArray:) which may receive discussed relevantSparseSegmentedResumeToReturn. Moreover, via the above-listed pseudocode of returnRelevantSparseSegmentedResumesForDocNumScoreTupleArray(_: usingQueriesOfFieldInfoArray:), returnRelevantSparseSegmentedResumeForDocNum(_: usingQueriesOfFieldInfoArray:) is called in connection with

```
relevantSparseSegmentedResumeToReturn.setValue((fullSegmentedResume.valueForKey(field) as String), forKey: field)
```

In such pseudocode, relevantSparseSegmentedResumeToReturn is the above-noted instantiated resume and that a for-in loop. In particular the for-in loop visits each resume document number set forth by docNumArray and calls returnRelevantSparseSegmentedResumeForDocNum(_: usingQueriesOfFieldInfoArray:) with respect to that visited document number. As such returnRelevantSparseSegmentedResumesForDocNumScoreTupleArray(_: usingQueriesOfFieldInfoArray:) receives a sparse segmented resume, of the sort discussed, with respect to each resume conveyed by docNumArray. As set forth by the pseudocode, returnRelevantSparseSegmentedResumesForDocNumScoreTupleArray(_: usingQueriesOfFieldInfoArray:) appends each such sparse segmented resume to a [SegmentedResume] array and returns that array to the caller of returnRelevantSparseSegmentedResumesForDocNumScoreTupleArray(_: usingQueriesOfFieldInfoArray:) (phase 1125).

Discussed hereinabove for instance with respect to phase 1113 is stripConjunctionsAndNottedWordsFromQueryString(_:). This method will now be discussed in greater detail. The method may have the declaration:

```
func stripConjunctionsAndNottedWordsFromQueryString(_
    theQueryString: String) -> String
```

As such, the declaration indicates that the method may take a single parameter of type string, the parameter having the local parameter name theQueryString and having no external parameter name. The declaration further indicates that the method may have a return type of String. The method may, for example, be implemented via code in line with the pseudocode:

```
func stripConjunctionsAndNottedWordsFromQueryString(_
    theQueryString: String) -> String {
    var arrayForStripping =
    theQueryString.componentsSeparatedByString(" ")
    for var index = 0; index < arrayForStripping.count;   index++ {
        if (arrayForStripping[index] == "AND") | |
    (arrayForStripping[index] == "OR") {
            arrayForStripping.removeAtIndex(index)
        }
    }
    for var index = 0; index < arrayForStripping.count; index ++ {
        if arrayForStripping[index] == "NOT" {
            arrayForStripping.removeAtIndex(index)
            arrayForStripping.removeAtIndex(index)
        }
    }
    return arrayForStripping.joinWithSeparator(" ")
}
```

Among that which is set forth by the pseudocode is calling componentsSeparatedByString(_:) on passed-in string theQueryString, passing as the sole parameter of the call a string setting forth a space character. Returned in response to the call is a string array corresponding to theQueryString where the noted space character is employed as the delimiter in mapping the string to elements of the string array. The string array arising from the call is, as set forth by the pseudocode, placed in string array object arrayForStripping.

Further set forth by the pseudocode is a first for loop which iterates an inter object index through indices of arrayForStripping. With respect to a given iteration of index, the for loop accesses the element of arrayForStripping corresponding to that value of index (i.e., arrayForStripping [index] is accessed). In particular, the for loop checks whether that element of arrayForStripping sets forth the string "AND" and also checks whether that element sets forth the string "OR." Where either of "AND" or "OR" is set forth the for loop acts to remove from arrayForStripping that element, thusly causing removal from the array of that instance of "AND" or "OR."

Also set forth by the pseudocode is a second for loop. The second for loop, like the first, iterates an index object through the indices of arrayForStripping. With respect to a given iteration of index the second for loop accesses the element of arrayForStripping corresponding to that value of index. In particular the second for loop checks whether that element of arrayForStripping sets forth the string "NOT." Where "NOT" is set forth the for loop acts to firstly remove from arrayForStripping the element which sets forth "NOT" and acts to secondly remove from arrayForStripping the element which comes after the element setting forth "NOT" (e.g., where included among the elements of arrayForStripping were an element setting forth "NOT" and a subsequent element setting forth "clinical" both "NOT" and "clinical" may be removed from the array. With an eye towards the pseudocode setting forth arrayForStripping.removeAtIndex (index) twice it is noted that the first occurrence of this pseudocode removes the at-hand element setting forth "NOT" and the second occurrence of the pseudocode removes the element which follows the "NOT"-conveying element. As to the same value—index—being passed for both calls to removeAtIndex(_:), it is observed that subsequent to the removal of the "NOT"-conveying element, the element which had succeeded that "not"-conveying element inherits the element number which had corresponding to the "NOT"-conveying element (e.g., if prior to the removals element [5] of arrayForStripping held "NOT" and element [6] of arrayForStripping held "clinical," following the removal of "NOT"-conveying element [5] the element conveying "clinical" would then be array element [5]).

Finally set forth by the pseudocode corresponding to stripConjunctionsAndNottedWordsFromQueryString(_:) is formulating a string corresponding to arrayForStripping by calling joinWithSeparator(_:) on the array where a string conveying a space character is passed as the sole parameter, and returning that string to the caller of stripConjunctionsAndNottedWordsFromQueryString(_:). As noted herein with respect to phase 1113, where for example passed to stripConjunctionsAndNottedWordsFromQueryString(_:) is the string "project OR management OR schedule NOT clinical" returned by the method may be the string "project management schedule."

Discussed hereinabove for instance with respect to phase 1115 was returnXmlResumeRecordStringForDocNum(_:) of the resumeLibrarian object. This method will now be discussed in greater detail. The method may have the declaration:

func returnXmlResumeRecordStringForDocNum(_theDocNum: String)→String

As such the declaration indicates that the method may take a single parameter of type string, the single parameter having the local parameter name theDocNum and no external parameter name. The declaration further indicates that the method may have a return type of string.

The method may in an aspect set forth code in line with the pseudocode:

```
var xmlResumeFetchRequest = NSFetchRequest(entityName:
"XmlResumeRecordEntity")
xmlResumeFetchRequest.predicate = NSPredicate(format:
"docNum == %@", theDocNum)
var xmlResumeFetchResult =
managedObjectContext.executeFetchRequest(xmlResumeFetchRequest)
```

As such the pseudocode sets forth, in an aspect, instantiating an NSFetchRequest object whose entityName property is set to specify that returned resumes may be compliant with the entity definition XmlResumeRecordEntity. In a further aspect the pseudocode indicates setting the predicate property of the NSFetchRequest object to specify that returned records may set forth theDocNum, the passed-in resume document number in their docNum fields. It is noted that according to the set forth functionality it is expected that only a single XmlResumeRecordEntity record may set forth a given resume document number. Taking the at-hand managed object context of the Swift/Apple frameworks pseudocode employed herein to be available via managedObjectContext, further set forth by the pseudocode is executing the fetch request, with the result of fetch request execution being held in xmlResumeFetchResult.

In a further aspect the method may set forth code in line with the pseudocode:

```
return
xmlResumeFetchResult[0].valueForKey("xmlResumeRecordString")
```

Firstly, as noted above it is expected that only a single XmlResumeRecordEntity record may set forth a given resume document number. As such and in keeping with the pseudocode employed herein it is expected that such single record may be available via element [0] of xmlResumeFetchResult. Such being the case, the above pseudocode sets forth accessing the desired record which sets forth passed-in theDocNum for its docNum field and via the valueForKey(_:) call accessing that which the record sets forth for its xmlResumeRecordString field. Via the employ of return the pseudocode sets forth returning such value set forth for the record's xmlResumeRecordString as the result of the method.

Noted record field xmlResumeRecordString may set forth an XML representation of a resume corresponding to the value set forth for that record's docNum field. In keeping with this the entity definition for XmlResumeRecordEntity may be as follows:

| Field Name | Data Type |
|---|---|
| docNum | String |
| xmlResumeRecordString | String |

The docNum field of a given XmlResumeRecordEntity record may set forth the document number of the resume to which the record corresponds. As an example the document number may be set forth as a UUID. The xmlResumeRecordString field of the record may set forth, as referenced above, an XML representation of a resume corresponding to the document number of docNum.

As an illustration, a particular XmlResumeRecordEntity record may set forth the string "XYZ-123" for its docNum field. It is noted that to facilitate discussion other than a UUID is employed as the example document number. Further according to the illustration, set forth by the XmlResumeRecordEntity record for the xmlResumeRecordString may be XML-formatted string:

```
<resume><docNum>xyz-123</docNum><rawTtl>construction project
manager</rawTtl><rawKwd>worksite management,keeping within
budget,worker relationship management</rawKwd><nrmTtl>project
manager-208,assistant project manager-3086,engineering project
manager-209</nrmTtl><nrmKwd>project schedule-7531,project
planning-3201,project tracking-5375,project estimates-
5374</nrmKwd><extraData>c2FtcGxlIHRleHQ=</extraData></resume>
```

It is noted that to facilitate discussion a foreshortened Base64 string is set forth in the example string with respect to the <extraData> and </extraData> tags. As such, the XML string sets forth tags <docNum> and </docNum> which correspond to the docNum fields of discussed ResumeEntity, tags <rawTtl> and </rawTtl> which correspond to the rawTtl field of discussed ResumeEntity, tags <rawTtl> and </rawTtl> which correspond to the rawTtl field of discussed ResumeEntity, tags <rawKwd> and </rawKwd> which correspond to the rawKwd field of discussed ResumeEntity tags <nrmTtl> and </nrmTtl> which correspond to the nrmTtl field of discussed ResumeEntity, and tags <extraData> and </extraData> which correspond to the extraData field of discussed ResumeEntity, <extraData> and </extraData> thusly being employed to delimitate a Base64 string. Moreover, the foregoing of the XML string is tag-delimited by <resume> and </resume>.

Discussed with respect to with respect to phase 1117 was giveSegmentedResumeForXmlResumeRecordString(:) of the segmentedResumeHelper object. This method will now be discussed in greater detail. The method may have the declaration:

```
func giveSegmentedResumeForXmlResumeRecordString(_ theXmlResumeRecordString:
String) -> SegmentedResume
```

As such the declaration indicates that the method may take a single parameter of type string, the single parameter having the local parameter name theXmlResumeRecordString and having no external parameter name. The declaration further indicates that the method may have a return type of SegmentedResume. The method may, for instance, be implemented via code in line with the pseudocode:

```
func giveSegmentedResumeForXmlResumeRecordString(_ theXmlResumeRecordString:
String) -> SegmentedResume {
    var segmentedResumeToReturn: SegmentedResume = SegmentedResume( )
    var nsXmlDocument: NSXMLDocument = NSXMLDocument(XMLString:
theXmlResumeRecordString, options: 0)
    segmentedResumeToReturn.docNumString =
self.giveStringValueForOneChildTag("docNum", ofNsXmlDocument: nsXmlDocument)
    segmentedResumeToReturn.rawTtlString =
self.giveStringValueForOneChildTag("rawTtl", ofNsXmlDocument: nsXmlDocument)
    segmentedResumeToReturn.rawKwdString =
```

```
self.giveStringValueForOneChildTag("rawKwd", ofNsXmlDocument: nsXmlDocument)
   segmentedResumeToReturn.nrmTtlString =
self.giveStringValueForOneChildTag("nrmTtl", ofNsXmlDocument: nsXmlDocument)
   segmentedResumeToReturn.nrmKwdString =
self.giveStringValueForOneChildTag("nrmKwd", ofNsXmlDocument: nsXmlDocument)
   segmentedResumeToReturn.extraDataString =
self.giveStringValueForOneChildTag("extraData", ofNsXmlDocument: nsXmlDocument)
   return segmentedResumeToReturn
}
```

Among that which is set forth by the pseudocode is instantiating an NSXMLDocument object nsXmlDocument via NSXMLDocument init method init(XMLString: options:) where received string theXmlResumeRecordString is passed for the first parameter and 0 is passed for the second parameter. According to the Swift/Apple frameworks-based pseudocode employed herein, an NSXMLDocument object represents an XML document as a logical tree structure. The logical tree structure being, for example, explorable via method calls such as calls to nodesForXPath (_:), a method which when passed a string conveying XML tag-corresponding text (e.g., "docNum" may be the XML tag-corresponding text for the tag pair <docNum>/</docNum>) returns an array of only NSXMLNode objects conveying that which is delimited by the tags in the XML document. As an illustration, continuing with the example regarding tags <docNum>/</docNum>, where delimited by the tags in the corresponding XML document were "XYZ-123" conveyed by the single element NSXMLNode array may be—at the first and only element of the array—"XYZ-123." Returning to the call to init(XMLString: options:), the first parameter passage of theXmlResumeRecordString indicates that such NSXMLDocument object may be based on the passed-in XML string, while the passage of 0 for the second parameter indicates that no options are desired.

Also set forth by the pseudocode is a series of statements (e.g., segmentedResumeToReturn.docNumString= self.giveStringValueForOneChildTag("docNum", ofNsXmlDocument: nsXmlDocument)) which may act to load properties of to-be-returned SegmentedResume object segmentedResumeToReturn based on that which is received in response to calls to to-be-discussed segmentedResumeHelper method giveStringValueForOneChildTag(_: ofNsXmlDocument:). In particular, there may be correlation between loaded segmentedResumeToReturn property and value passed in calling giveStringValueForOneChildTag(_: ofNsXmlDocument:)—for instance "docNum" being passed in the method call where the docNumString property is being loaded—such correlation reflecting mappings between XML tagging of the passed-in XML string and the property names of the to be returned SegmentedResume object. As reflected by the pseudocode, XML tags <docNum> and </docNum> may map to property docNumString, XML tags <rawTtl> and </rawTtl> may map to rawTtlString, XML tags <rawKwd> and </rawKwd> may map to property rawKwdString, XML tags <nrmTtl> and </nrmTtl> may map to property nrmTtlString, XML tags <nrmKwd> and <nrmKwd> may map to nrmKwdString, and XML tags <extraData> and </extraData>> may map to property extraDataString.

Where giveStringValueForOneChildTag(_: ofNsXmlDocument:) is called with XML tag-corresponding text being passed as the first parameter (e.g., passing "docNum" in the case of XML tags <docNum>/</docNum>) and an NSXMLDocument object being passed as the second parameter, received in response to the call may be a string reflecting the text delimited—within the XML string to which the passed in NSXMLDocument object corresponds—by the tags specified by the first parameter (e.g., continuing with the example of passing "docNum" for the first parameter, where the NSXMLDocument object passed for the second parameter corresponds to an XML string which includes "<docNum> XYZ-123</docNum>," received in response to the call may be "XYZ-123").

As such, via the segmentedResumeToReturn property settings and corresponding calls to giveStringValueForOneChildTag(_: ofNsXmlDocument:) set forth by the pseudocode, formulated may be a SegmentedResume object whose properties are loaded according to corresponding tag delimited values set forth in the XML string passed to giveSegmentedResumeForXmlResumeRecordString(:). Finally set forth by the pseudocode of giveSegmentedResumeForXmlResumeRecordString(:) is returning the discussed SegmentedResume object formulated by the method.

Referenced-above method giveStringValueForOneChildTag(_: ofNsXmlDocument:) will now be discussed in greater detail. The method may have the declaration:

```
func giveStringValueForOneChildTag(_ theOneChildTag: String,
ofNsXmlDocument
theNsXmlDocument: NSXMLDocument) -> String
```

As such the declaration indicates that the method may take a first parameter of type string, the first parameter have the local parameter name theOneChildTag and having no external parameter name. Also indicated by the declaration is that the method may take a second parameter of type NSXMLDocument, the second parameter having the local parameter name theNsXmlDocument and the external parameter name ofNsXmlDocument. Still further indicated by the declaration is that the method may have a return type of string. The method may, for instance, be implemented via code in line with the pseudocode:

```
func giveStringValueForOneChildTag(_ theOneChildTag:
String, ofNsXmlDocument
theNsXmlDocument: NSXMLDocument) -> String {
   var nsXmlNodeArray: [NSXMLNode] =
theNsXmlDocument.nodesForXPath("//\(theOneChildTag)")
   return nsXmlNodeArray.first.stringvalue
}
```

Among that which is set forth by the pseudocode is calling nodesForXPath(_:) on passed in NSXMLDocument theNsXmlDocument, where passed for the first parameter is a string setting forth received string object theOneChildTag. The pseudocode sets forth holding that which is returned in response to the call to nodesForXPath(_:) in [NSXMLNode] array nsXmlNodeArray. With reference to that which is discussed hereinabove with respect to the functionality of nodesForXPath(_:), returned in response to the nodesForXPath(_:) call of the pseudocode may be an [NSXMLNode] array which sets forth that which is tag delimited in keeping with theOneChildTag in the XML string corresponding to theNsXmlDocument. The at-hand discussed resume XML structure sets forth only a single child between XML pairs. As such, the call of the above pseudocode, applied to resume XML data, may be expected to yield a single element [NSXMLNode] array. In keeping with this the pseudocode return nsXmlNodeArray.first.stringValue acts to access that single array element, retrieve string representation of that which is set forth by that sole element, and return that string value as the result of the method. Considering the overall operation of giveStringValueForOneChildTag(_: ofNsXmlDocument:), as noted above with XML tag-corresponding text being passed as the first parameter thereto and an NSXMLDocument object being passed as the second parameter, received in response to the call may be a string reflecting the text delimited—within the XML string to which the passed-in NSXMLDocument corresponds—by the tags specified by the first parameter. It is noted that although certain tags, fields, and the like are discussed herein (e.g., with respect to resume XML strings and SegmentedResume objects), such tags, fields, and the like are for illustrative purposes only. As such there may be, for example, fewer, greater, and/or different such tags, fields, and the like.

With further regard to the more broadly encompassing approach to resume section relevancy, the following alternative functionality will now be discussed. In particular, according to one or more embodiments, an alternative approach involving retrieval from a Core Data managed store (e.g., database) may be taken with respect to the discussed giveRelevantFieldsForSegmentedResume(_: forTerms:) method. Such an alternative approach may, for instance, be implemented via code in line with the pseudocode:

mEntityFetchRequest which sets forth via its entity property that returned records may conform to the discussed ResumeInverseIndexTermEntity definition, the NSFetchRequest object thusly indicating that records corresponding to the outcome of applying the discussed indexing to resumes should be returned. As discussed herein, relationships may be established by which certain entity types may be associated with certain stores such that frameworks implementing Core Data functionality direct operations involving particular entity definitions to appropriate corresponding stores. As such, for example an NSFetchRequest setting forth ResumeInverseIndexTermEntity is handled via the store (e.g., database) corresponding to ResumeInverseIndexTermEntity records.

Further conveyed by thee above pseudocode is a for-in loop wherein each term of the received string array of terms as loaded into a set is visited. The pseudocode sets forth with the visiting of a given term setting the NSFetchRequest's predicate property to indicate that returned records may specify both the at-hand term and the document number of the passed-in segmented resume. The fetch is then executed and the array of returned records is checked for emptiness. Such emptiness may arise where no records met the set criteria. Where at least one such record matching the criteria is returned, such results are each visited via a for-in loop. The for-in loop acts to access the indexField value indicated by the visited record and, via the set forth switch case statement, append to that which may be returned to the caller of the method the segmented resume field name which maps to the field name set forth by the visited record.

Reflecting upon the just-discussed functionality the following is noted. As explained herein, a particular ResumeInverseIndexTermEntity record sets forth indexing-resultant data including a particular term (set forth via the record's term field) and one or more document numbers of resumes (set forth in a comma-delimited fashion via the documentNumbers field) which set forth the record-indicated term in the field as per indexField. As an illustration, a ResumeIn-

```
func giveRelevantFieldsForSegmentedResume(_ theSegmentedResume: SegmentedResume,
forTerms theTerms: [String]) -> [String] {
    var setOfTheTerms: Set<String> = Set<String>(theTerms)
    var setForArrayToReturn: Set = Set<String>( )
    var resumeIITermEntityFetchRequest = NSFetchRequest(entityName:
"ResumeInverseIndexTermEntity")
    for term in setOfTheTerms {
        resumeIITermEntityFetchRequest.predicate = NSPredicate(format: "term
== %@ AND documentNumbers CONTAINS %@", term, theSegmenteedResume.docNumString)
        var fetchResults =
managedObjectContext.executeFetchRequest(resumeIITermEntityFetchRequest)
        if !(fetchResults.isEmpty) {
            for fetchResult in fetchResults {
                switch fetchResult.valueForKey("indexField") {
                case "rawTtl": setForArrayToReturn. insert(" rawTtlString" )
                case "rawKwd": setForArrayToReturn.insert("rawKwdString")
                case "nrmTtt": setForArrayToReturn.insert("nrmTtlString" )
                case "nrmKwd": setForArrayToReturn.insert("nrmKwdString")
                case "extraData": setForArrayToReturn.insert("extraDataString")
                default: print("LOG: switch-case error")
                }
            }
        }
    }
    setForArrayToReturn.insert("docNumString")
    var stringArrayToReturn: [String] = [String](setForArrayToReturn)
    return stringArrayToReturn
}
```

Among that which is conveyed by the above pseudocode is instantiating an NSFetchRequest object resumeIITerverseIndexTermEntity record setting forth "scrummaster" for its term field, "rawTtl" for its indexField, and "PRS- 689,JKN-101" for its documentNumbers field may indicate that each of resume number PRS-689 and resume number JKN-101 sets forth "scrummaster" in its rawTtl field.

Such being the case, via the just-discussed pseudocode retrieved may be one or more records of the sort discussed for the visited term (e.g., "scrummaster") for the at-hand resume document number (e.g., "PRS-689"). Where one of the retrieved records was that of the discussed example, the code may take resume PRS-689 to set forth "scrummaster" in its rawTtl field and add "rawTtlString" to that which is returned to the caller as "rawTtlString" is the segmented resume field which maps to ResumeInverseIndexTermEntity field "rawTtl." A second such returned record might in part set forth at-hand term "scrummaster" for its term field, "rawKwd" for its indexField field, and resumes including "PRS-689" for its documentNumbers field. In like vein to that discussed, the code may take resume PRS-689 to set forth "scrummaster" via its rawKwd field and add "rawKwdString" to that which is returned to the caller as "rawKwdString" is the segmented resume field which maps to ResumeInverseIndexTermEntity field rawKwd.

Thusly the discussed code may act to leverage the result of resume indexing to learn which fields of a given resume set forth each of the passed in terms. It is observed that in keeping with the pseudocode employed herein a set may keep as a member only one copy of each given value passed to it. As an illustration, where pass to an empty set were "1," "2," "3," and "1," the members of the set would be "1," "2," and 3," there being only one copy of "1" in the set despite it having been passed in twice. In view of this, a set is employed with respect to passed in terms to avoid duplication of effort where a given term is indicated twice in the input. Moreover, a set is employed with respect to returned fields such that duplicate inclusion of a given field name in that which is returned by the record is avoided. Moreover, docNumString is included in the returned field names to potentially aid in having the ultimately yielded sparse segment resume records set forth appropriate resume document numbers.

Having discussed in connection with FIG. 11 the more broadly encompassing approach to resume section relevancy, now discussed in connection with FIG. 12 will be the other approach to resume section relevancy. Turning to FIG. 12 it is noted that, in the vein of FIG. 11 two flow paths are depicted. According to the first flow path phases 701-713 may proceed as discussed hereinabove with respect to FIG. 11, with the tuple array returned in reply to the call of phase 713 providing resumes along with corresponding relevancy scores which flow from new job listing provision. According to the second flow path phases 1101-1107 may proceed as discussed hereinabove with respect to FIG. 11, with the tuple array returned in reply to the call of phase 1107 providing resumes along with corresponding relevancy scores which flow from GUI specification.

According to the first flow path, from phase 713 flow may proceed to phase 1201 where returnResumesForXPathNormalizedKeywords(_: andYPathNormalizedKeywordsAndYPathNormalizedTitles:) may call returnRelevantSparseSegmentedResumesForDocNumScoreTupleArray(_: usingFieldInfoArray:) of the segmentedResumeHelper object, passing as the first parameter the tuple array received in reply to the call of phase 713 and passing as the second parameter the modified FieldInfo array which was passed to rankForFieldInfoArray(_: andFieldJoiner:) by returnResumesForXPathNormalizedKeywords(_: andYPathNormalizedKeywordsAndYPathNormalizedTitles:) at phase 713.

According to the second flow path, from phase 1107 flow may also proceed to phase 1201 where returnResumesViaUserQuery( ) may call returnRelevantSparseSegmentedResumesForDocNumScoreTupleArray(_: usingFieldInfoArray:) of the segmentedResumeHelper object, passing as the first parameter the tuple array received in reply to the call of phase 1107 and passing as the second parameter the modified FieldInfo array which was passed to rankForFieldInfoArray(_: andFieldJoiner:) by returnResumesViaUserQuery( ) at phase 1107.

Method returnRelevantSparseSegmentedResumesForDocNumScoreTupleArray(_: usingFieldInfoArray:) will now be discussed in greater detail. The method may have the declaration:

```
func returnRelevantSparseSegmentedResumesForDocNumScoreTupleArray(_
theDocNumScoreTupleArray : [(String, Double)], usingFieldInfoArray
theFieldInfoArray: [FieldInfo]) -> [SegmentedResume]
```

As such the declaration sets forth that the method may take a first parameter of type [(String,Double)], the first parameter having the local parameter name theDocNumScoreTupleArray and having no external parameter name. The declaration further sets forth that the method may take a second parameter of type [FieldInfo], the second parameter having the local parameter name theFieldInfoArray and the external parameter name usingFieldInfoArray. Also indicated by the declaration is that the method may have a return type of [SegmentedResume].

The method may, for example, be implemented via code in line with the pseudocode:

```
func returnRelevantSparseSegmentedResumesForDocNumScoreTupleArray(_
theDocNumScoreTupleArray : [(String, Double)], usingFieldInfoArray
theFieldInfoArray: [FieldInfo]) -> [SegmentedResume] {
    var docNumArray: [String] = theDocNumScoreTupleArray.map({$0.0})
    var relevantSparseSegmentedResumesToReturn: [SegmentedResume] =
[SegmentedResume]( )
    for docNum in docNumArray {
relevantSparseSegmentedResumesToReturn.append(self.returnRelevantSparseSegmentedR
esumeForDocNum(doeNum, usingFieldInfoArray: theFieldInfoArray))
    }
    return relevantSparseSegmentedResumesToReturn
}
```

Among that which is set forth by the pseudocode is acting, as discussed hereinabove with respect to method returnRelevantSparseSegmentedResumesForDocNumScoreTupleArray(_: usingQueriesOfFieldInfoArray:) of the other approach to resume section relevancy, to apply a map function to received theDocNumScoreTupleArray so as to yield string array docNumArray. Also set forth by the pseudocode is a for-in loop which visits each document number of docNumArray. The for-in loop may be as the for-in loop discussed hereinabove with respect to returnRelevantSparseSegmentedResumesForDocNumScoreTupleArray(_: usingQueriesOfFieldInfoArray:)—with the method call of the for-in loop passing for the first parameter docNum and passing for the second parameter theFieldInfoArray—but where the method called is instead to-be-discussed returnRelevantSparseSegmentedResumeForDocNum(_: usingFieldInfoArray:) (phase 1203). As in the noted above-discussed for-in loop, that which is returned in response to the call may—as set forth by the pseudocode—be appended to array relevantSparseSegmentedResumesToReturn. Also set forth by the pseudocode is—as discussed above with respect to method returnRelevantSparseSegmentedResumesForDocNumScoreTupleArray(_: usingQueriesOfFieldInfoArray:)—that with completion of the for-in loop relevantSparseSegmentedResumesToReturn is returned to the caller of returnRelevantSparseSegmentedResumesForDocNumScoreTupleArray(_: usingFieldInfoArray:).

Method returnRelevantSparseSegmentedResumeForDocNum(_: usingFieldInfoArray:) may have the declaration:

```
func returnRelevantSparseSegmentedResumeForDocNum(_ theDocNum: String,
usingFieldInfoArray theFieldInfoArray: [FieldInfo]) -> SegmentedResume
```

As such the declaration indicates that the method may take a first parameter of type string, the first parameter having the local parameter name theDocNum and having no external parameter name. Also indicated by the declaration is that the method may take a second parameter of type [FieldInfo], the second parameter having the local parameter name theFieldInfoArray and the external parameter name usingFieldInfoArray. Moreover, the declaration indicates that the method may have a return type of SegmentedResume.

The method may, for instance, be implemented via code in line with the pseudocode:

Among that which is conveyed by the pseudocode is calling (phase 1205) discussed hereinabove method returnXmlResumeRecordStringForDocNum(_:) of the resumeLibrarian object. According to the pseudocode, passed as the sole parameter of the call may be passed-in theDocNum. Further according to the pseudocode the string returned in response to the call may be placed in string object returnedXmlResumeRecordString. Also conveyed by the pseudocode may be calling (phase 1207) discussed hereinabove method giveSegmentedResumeForXmlResumeRecordString(_:) of the segmentedResumeHelper object. Passed for the sole parameter of the call may be the XML resume string received in reply to the call of 1205. The SegmentedResume object returned in response to the call to giveSegmentedResumeForXmlResumeRecordString(_:) may be held as SegmentedResume object fullSegmentedResume.

Also conveyed by the pseudocode is calling (phase 1209) to-be-discussed method giveRelevantFieldsForSegmentedResume(_: forFieldInfoArray:) of the segmentedResumeHelper object. Passed for the first parameter of the call may be the SegmentedResume object fullSegmentedResume received in response to the call of phase 1207. Passed for the second parameter of the call may be passed-in theFieldInfoArray. The string returned in response to the call may be held as relevantFields. Method giveRelevantFieldsForSegmentedResume(_: forFieldInfoArray:) will now be disused in greater detail.

Method giveRelevantFieldsForSegmentedResume(_: forFieldInfoArray:) may have the declaration:

```
func giveRelevantFieldsForSegmentedResume(_ theSegmentedResume: SegmentedResume,
forFieldInfoArray theFieldInfoArray: [Fieldinfo] ) -> [String]
```

As such the declaration indicates that the method may take a first parameter of type SegmentedResume, the first parameter having the local parameter name theSegmentedResume and no external parameter name. The declaration further indicates that the method may take a second parameter of type [FieldInfo], the second parameter having the

```
func returnRelevantSparseSegmentedResumeForDocNum(_ theDocNum: String,
usingFieldInfoArray theFieldInfoArray: [FieldInfo]) -> SegmentedResume {
    var resumeLibrarian: ResumeLibrarian = ResumeLibrarian( )
    var returnedXmlResumeRecordString: String =
resumeLibrarian.returnXmlResumeRecordStringForDocNum(theDocNum)
    var fullSegmentedResume: SegmentedResume =
self.giveSegmentedResumeForXmlResumeRecordString
(returnedXmlResumeRecordString)
    var relevantFields: [String] =
self.giveRelevantFieldsForSegmentedResume(fullSegmentedResume, forFieldInfoArray
theFieldInfoArray)
    var relevantSparseSegmentedResumeToReturn = SegmentedResume( )
        for field in relevantFields {
relevantSparseSegmentedResumeToReturn. setValue((fullSegmentedResume.
valueForKey(field) as String), forKey: field)
        }
    return relevantSparseSegmentedResumeToReturn
}
``` local parameter name theFieldInfoArray and the external parameter name forFieldInfoArray. Moreover, the declaration indicates that the method may have a return type of [String].

The method may, for instance be implemented via code in line with the pseudocode:

```
func giveRelevantFieldsForSegmentedResume(_ theSegmentedResume: SegmentedResume,
forFieldInfoArray theFieldInfoArray: [FieldInfo]) -> [String] {
    var setForArrayToReturn: Set = Set<String>( )
    for fieldInfoObject in theFieldInfoArray {
        if fieldInfoObject.qfPassDocs.contains(theSegmentedResume.docNumString) {
            switch fieldInfoObject.fieldName {
            case "rawTtl": setForArrayToReturn.insert("rawTtlString" )
            case "rawKwd": setForArrayToReturn.insert("rawKwdString")
            case "nrmTtl": setForArrayToReturn.insert("nrmTtlString" )
            case "nrmKwd": setForArrayToReturn.insert("nrmKwdString")
            case "extraData": setForArrayToReturn.insert("extraDataString")
            default: print("LOG: switch-case error")
            }
        }
    }
    setForArrayToReturn.insert("docNumString")
    var stringArrayToReturn: [String] = [String](setForArrayToReturn)
    return stringArrayToReturn
}
```

As referenced above, according to the at-hand approach to resume section relevancy determination a portion of an at-hand hit resume may be considered relevant where—when considering a corresponding FieldInfo array—a Boolean expression was set forth with respect to that section and the section satisfied—as conveyed via the qfPassDocs property of the FieldInfo object which sets forth that query—that Boolean expression. As also referenced above, in keeping with this where a given FieldInfo object of an at-hand FieldInfo array lists the document number of the at-hand resume as a qfPassDoc the resume section indicated by the fieldName property of that FieldInfo object may be considered to be a relevant section of that hit resume. The above-listed pseudocode set forth in connection with giveRelevantFieldsForSegmentedResume(_: forFieldInfoArray:) may be field as operating in agreement with this. Among that which is set forth by the pseudocode is instantiating empty set object setForArrayToReturn. Bearing in mind that which is discussed herein regarding set functionality, as discussed hereinbelow functionality of the at-hand method may act to yield relevant field names. By adding such yielded relevant field names to setForArrayToReturn—and then conveying the contents of that set to the caller of the at-hand method—functionality may be realized whereby the caller receives only one copy of each yielded relevant field even where the yielding produces multiple copies of one or more relevant field names.

Also set forth by the pseudocode is a for-in loop wherein each FieldInfo object of received theFieldInfoArray may be visited and the qfPassDocs property of the presently-visited FieldInfo object may be checked to ascertain whether or not it contains the document number of the at-hand hit resume as set forth by theSegmentedResume.docNumString. Where the check of qfPassDocs property is found to contain the document number of the at-hand hit resume a switch-case statement may be executed, the switch-case statement acting to add to setForArrayToReturn a string corresponding to the fieldName set forth by the FieldInfo object whose qfPassDocs property so set forth the at-hand hit resume's document number. As referenced by the pseudocode, the string which is added to setForArrayToReturn for a given fieldName value reflects the mapping between SegmentedResume property names and values which are set forth by the fieldName properties of FieldInfo objects.

Also set forth by the pseudocode is including "docNumString" in setForArrayToReturn. In keeping with that which is set forth hereinabove in connection with giveRelevantFieldsForSegmentedResume(_: forTerms:), such inclusion may potentially aid having the ultimately yielded segmented resume records set forth appropriate resume numbers. Set forth by the pseudocode of the at-hand method is instantiating a string array which sets forth the members of setForArrayToReturn, and returning that string array to the caller of giveRelevantFieldsForSegmentedResume(_: forFieldInfoArray:). Returning to consideration of the above pseudocode corresponding to returnRelevantSparseSegmentedResumeForDocNum(_: usingFieldInfoArray:), also conveyed by the pseudocode is instantiating SegmentedResume object relevantSparseSegmentedResumeToReturn. Still further conveyed by the pseudocode is a for-in loop wherein each field set forth by the relevantFields string array received via the call of phase 1209 may be visited. Set forth by the pseudocode is plying, with each such field visitation, code in line with the KVC-employing pseudocode relevantSparseSegmentedResumeToReturn.setValue((fullSegmentedResume.valueForKey(field) as String), forKey: field). Such KVC-employing pseudocode is discussed in greater detail hereinabove in connection with discussion of returnRelevantSparseSegmentedResumeForDocNum(_: usingQueriesOfFieldInfoArray:). Bearing in mind that which is discussed hereinabove with respect to the KVC-employing pseudocode, it is noted that via the for-in loop yielded may be a sparse segmented resume which sets forth for each of the fields indicated by relevantFields the value which fullSegmentedResume sets forth for that field. The remaining fields of relevantSparseSegmentedResumeToReturn—those fields not indicated by relevantFields—may set forth an empty string. Bearing in mind that relevantFields, as discussed, sets forth those fields of the at-hand resume considered to be relevant along with the docNumString field, yielded by the for-in loop may be a sparse version of fullSegmentedResume which only conveys the fields of the resume considered to be relevant along with the resume document number. Finally set forth by the pseudocode of returnRelevantSparseSegmentedResumeForDocNum(_: usingFieldInfoArray:) is returning relevantSparseSegmentedResumeToReturn to the method's caller. Depicted in FIG. 12 is phase 1211 where relevantSparseSegmentedResumeToReturn may be—as just discussed—built via the for-in loop, and then relevantSparseSegmentedResumeToReturn may be returned to the caller.

The caller of returnRelevantSparseSegmentedResumeForDocNum(_: usingFieldInfoArray:) may be, as referenced via the discussion of phase 1203, returnRelevantSparseSegmentedResumesForDocNumScoreTupleArray(_: usingFieldInfoArray:). As such it is this method which may receive relevantSparseSegmentedResumeToReturn. Further, with reference to the above-listed pseudocode for returnRelevantSparseSegmentedResumesForDocNumScoreTupleArray(_: usingFieldInfoArray:) it is noted that returnRelevantSparseSegmentedResumeForDocNum(_: usingFieldInfoArray:) may be called in connection with a for-in loop which visits each resume document number set forth by docNumArray and calls returnRelevantSparseSegmentedResumeForDocNum(_: usingFieldInfoArray:) with respect to the visited document number. As such, returnRelevantSparseSegmentedResumesForDocNumScoreTupleArray(_: usingFieldInfoArray:) receives a sparse segmented resume of the sort discussed with respect to each resume conveyed by docNumArray and appends it to array relevantSparseSegmentedResumesToReturn (phase 1215). Then returnRelevantSparseSegmentedResumesForDocNumScoreTupleArray(_: usingFieldInfoArray:) is returned to the caller (phase 1215).

Considering again FIG. 11, as referenced in connection with phase 1125 returnRelevantSparseSegmentedResumesForDocNumScoreTupleArray(_: usingQueriesOfFieldInfoArray:) returns relevantSparseSegmentedResumesToReturn to its caller. According to the first flow path of FIG. 11 whereby phase 1109 is entered via phase 713 the caller of returnRelevantSparseSegmentedResumesForDocNumScoreTupleArray(_: usingQueriesOfFieldInfoArray:) and therefore the recipient of relevantSparseSegmentedResumesToReturn may be returnResumesForXPathNormalizedKeywords(_: andYPathNormalizedKeywordsAndYPathNormalizedTitles:). According to the second flow path of FIG. 11 whereby phase 1109 is entered via phase 1107 the caller of returnRelevantSparseSegmentedResumesForDocNumScoreTupleArray(_: usingQueriesOfFieldInfoArray:) and therefore the recipient of relevantSparseSegmentedResumesToReturn—may be returnResumesViaUserQuery( ).

Considering again FIG. 12, as referenced in connection with phase 1215 returnRelevantSparseSegmentedResumesForDocNumScoreTupleArray(_: usingFieldInfoArray:) returns relevantSparseSegmentedResumesToReturn to its caller. According to the first flow path of FIG. 12 whereby phase 1201 is entered phase 713 the caller of returnRelevantSparseSegmentedResumesForDocNumScoreTupleArray(_: usingFieldInfoArray:) and therefore the recipient of relevantSparseSegmentedResumesToReturn may be returnResumesForXPathNormalizedKeywords(_: andYPathNormalizedKeywordsAndYPathNormalizedTitles:). According to the second flow path of FIG. 12 whereby phase 1201 is entered via phase 1107 the caller of returnRelevantSparseSegmentedResumesForDocNumScoreTupleArray(_: usingFieldInfoArray:) and therefore the recipient of relevantSparseSegmentedResumesToReturn—may be returnResumesViaUserQuery( ).

As such via the first flow path of either FIG. 11 or FIG. 12 returnResumesForXPathNormalizedKeywords(_: andYPathNormalizedKeywordsAndYPathNormalizedTitles:) may come to possess relevantSparseSegmentedResumesToReturn. Further as such, via the second flow path of either FIG. 11 or FIG. 12 returnResumesViaUserQuery( ) may come to possess relevantSparseSegmentedResumesToReturn.

As noted, returnResumesForXPathNormalizedKeywords(_: andYPathNormalizedKeywordsAndYPathNormalizedTitles:) may have a return type of [FetchedResumeRecord]. As also noted, returnResumesViaUserQuery( ) may have a return type of [FetchedResumeRecord]. According to one or more embodiments returnResumesForXPathNormalizedKeywords(_: andYPathNormalizedKeywordsAndYPathNormalizedTitles:) may act to ply received relevantSparseSegmentedResumesToReturn in formulating the FetchedResumeRecord array for return. It is observed that for embodiments where returnResumesForXPathNormalizedKeywords(_: andYPathNormalizedKeywordsAndYPathNormalizedTitles:) calls either returnRelevantSparseSegmentedResumesForDocNumScoreTupleArray(_: UsingQueriesOfFieldInfoArray:) or returnRelevantSparseSegmentedResumesForDocNumScoreTupleArray(_: usingFieldInfoArray:), receives the SegmentedResume array of relevantSparseSegmentedResumesToReturn in reply to such call, and then as noted plies such SegmentedResume array in formulating the FetchedResumeRecord array for return, one or more NSFetchRequest-related operations discussed herein in connection with returnResumesForXPathNormalizedKeywords(_: andYPathNormalizedKeywordsAndYPathNormalizedTitles:) may not be performed. Moreover, according to one or more embodiments returnResumesViaUserQuery( ) may act to ply received relevantSparseSegmentedResumesToReturn in formulating the FetchedResumeRecord array for return.

The operations with returnResumesForXPathNormalizedKeywords(_: andYPathNormalizedKeywordsAndYPathNormalizedTitles:) and returnResumesViaUserQuery( ) perform in so plying the received SegmentedResume array of relevantSparseSegmentedResumesToReturn in formulating the FetchedResumeRecord array for return will now be discussed. In one aspect, the formulated FetchedResumeRecord array may have the same number of elements as the SegmentedResume array where each element of the SegmentedResume array maps to an element of the FetchedResumeRecord array (e.g., element [n] of the SegmentedResume array may map to element [n] of the FetchedResumeRecord array. Considering the method's formulation of a given element of the FetchedResumeRecord array, the docNum property thereof may have its value set to hold the value indicated by the docNumString property of the corresponding SegmentedResume array element, the rawTtl property thereof may have its value set to hold the value indicated by the rawTtlString property of the corresponding SegmentedResume array element, the rawKwd property thereof may have its value set to hold the value indicated by the rawKwdString property of the corresponding SegmentedResume array element, the nrmTtl property thereof may have its value set to hold the value indicated by the nrmTtlString property of the corresponding SegmentedResume array element, the nrmKwd property thereof may have its value set to hold the value indicated by the nrmKwdString property of the corresponding SegmentedResume array element, and the extraData property thereof may have its value set to hold the value indicated by the extraDataString property of the corresponding SegmentedResume element. Moreover, the relevancyScore property thereof may have its value set to hold the appropriate relevancy score as indicated by the document number-relevancy score tuple array which was received in reply to the call to rankForFieldInfoArray(_: andFieldJoiner:). With reference to that which is discussed hereinabove it is noted that one or more properties of one or more elements of the SegmentedResume array may set forth an empty string. Under such a circumstance the corresponding property of the built FetchedResumeRecord array may likewise set forth an empty string.

Discussed herein is the employ at various junctures of SegmentedResume objects. Reflecting on such employ of SegmentedResume objects rather than, say, employing FetchedResumeRecord objects throughout it is noted that such SegmentedResume object employ may for instance perhaps facilitate identification at various junctures of such a SegmentedResume object as possibly conveying an incomplete resume.

As referenced, the return type of each of returnResumesForXPathNormalizedKeywords(_: andYPathNormalizedKeywordsAndYPathNormalizedTitles:) and returnResumesViaUserQuery( ) is [FetchedResumeRecord]. As such each of these methods may return the FetchedResumeRecord array which it forums to its caller. As noted herein the caller of returnResumesForXPathNormalizedKeywords(_: andYPathNormalizedKeywordsAndYPathNormalizedTitles:) may be resumesAndStoreForNewJobListing( ) of the conductor object. As such resumesAndStoreForNewJobListing( ) may come to possess the FetchedResumeRecord array yielded by returnResumesForXPathNormalizedKeywords(_: andYPathNormalizedKeywordsAndYPathNormalizedTitles:). As also noted herein, the caller of returnResumesViaUserQuery( ) may be startResumesViaUserQuery( ) of the conductor object. As such startResumesViaUserQuery( ) may come to possess the FetchedResumeRecord array yielded by returnResumesViaUserQuery( ) Firstly discussed will be the scenario of resumesAndStoreForNewJobListing( ) being the caller of returnResumesForXPathNormalizedKeywords(_: andYPathNormalizedKeywordsAndYPathNormalizedTitles:) and consequently the recipient of the FetchedResumeRecord produced thereby. Secondly discussed will be the scenario of startResumesViaUserQuery ( ) being the caller of returnResumesViaUserQuery( ) and consequently the recipient of the FetchedResumeRecord array produced thereby.

Turning to the first scenario, as referenced above according to one or more embodiments subsequent to calling returnResumesForXPathNormalizedKeywords(_: andYPathNormalizedKeywordsAndYPathNormalizedTitles:) and receiving a FetchedResumeRecord array in reply resumesAndStoreForNewJobListing( ) may set a resumesArray property of a resumeViewController object and cause display of a view associated with the resumeViewController object. As an alternative, for one or more embodiments including those involving that which is set forth in connection with FIG. 11 and those involving that which is set forth in connection with FIG. 12 resumesAndStoreForNewiobLisLing( ) may instead call a to-be-discussed doFocusedResumePresentationForFetchedResumeRecordArray(_: andFieldInfoArray:) method of a presenter object—the presenter object being an instantiation of a Presenter class—where the at-hand FetchedResumeRecord array may be passed as the first parameter of the call and the at-hand FieldInfo array may be passed as the second parameter of the call.

Turning to the second scenario, for one or more embodiments including those involving that which is set forth in connection with FIG. 11 and those involving that which is set forth in connection with FIG. 12 startResumesViaUserQuery( ) may call noted doFocusedResumePresentationForFetchedResumeRecordArray(_: andFieldInfoArray:) of the presenter object, the at-hand FetchedResumeRecord array being passed as the first parameter of the call and the at-hand FieldInfo array being passed as the second parameter of the call.

The doFocusedResumePresentationForFetchedResumeRecordArray(_: andFieldInfoArray:) method may have the declaration:

```
func doFocusedResumePresentationForFetchedResumeRecordArray(_
theFetchedResumeRecordArray: [FetchedResumeRecord],
andFieldInfoArray
theFieldInfoArray: [FieldInfo])
```

As such the declaration indicates that the method may take a first parameter of type [FetchedResumeRecord]—an array of FetchedResumeRecord objects—where the first parameter has a local parameter name of theFetchedResumeRecordArray and no external parameter name. Also indicated by the declaration is that the method may take a second parameter of type [FieldInfo]—an array of FieldInfo objects—where the second parameter has the local parameter name theFieldInfoArray and the external parameter name andFieldInfoArray. Moreover, the declaration indicates that the method may return no value.

Although the method may return no value. the method may internally yield a z array, that is to say an array of PresentationFetchedResumeRecord objects. As discussed herein, such PresentationFetchedResumeRecord array may be employed in presenting resumes specified thereby to a user (e.g., in a manner employing an object inheriting from UIViewController or in a manner employing JavaScript. The PresentationFetchedResumeRecord class may have the declaration:

```
class PresentationFetchedResumeRecord {
    var docNum: String = ""
    var rawTtl: NSMutableAttributedString =
NSMutableAttributedString( string
"")
    var rawKwd: NSMutableAttributedString =
NSMutableAttributedString(string
"")
    var nrmTtl: NSMutableAttributedString =
NSMutableAttributedString(string
"")
    var nrmKwd: NSMutableAttributedString =
NSMutableAttributedString(string
"")
    var decodedExtraData: NSMutableAttributedString =
NSMutableAttributedString( string: "")
    var relevancyScore: Double = 0.0
}
```

As such the class may, perhaps, be viewed as bearing some similarity to the discussed-hereinabove FetchedResumeRecord class. Comparing the two classes, one may find that in one aspect both set forth a property docNum of type string and a relevancyScore property of type double. In another aspect both classes may set forth a rawTtl property, a rawKwd property, a nrmTtl property, and a nrmKwd property. However, while the FetchedResumeRecord class may set forth each of these properties as a string the PresentationFetchedResumeRecord class may set forth each of these properties as an NSMutableAttributedString. In keeping with the Swift/Apple frameworks pseudocode employed herein, the employ of an NSMutableAttributedString allows for instance for conveyance of not just string text (e.g., of one or more words) but also of corresponding formatting information such as font, text style (e.g., bold and/or italic), text foreground color, and text background color (i.e., highlight color). Further considering the two classes, in an additional aspect the FetchedResumeRecord class sets forth an extraData property of type string while the PresentationFetchedResumeRecord class sets forth a property decodedExtraData of type NSMutableAttributedString. As discussed hereinabove, the FetchedResumeRecord property extraData may be employed in conveying for example Base64 encoded text. As perhaps conveyed by its name— and as for example set forth via the herein-set pseudocode— the PresentationFetchedResumeRecord may be employed in holding a decoded version of text set forth by an extraData property of a FetchedResumeRecord object. Moreover, in keeping with decodedExtraData being an NSMutableAttributedString property, such decoded text may be set forth in a formatted fashion (e.g., with highlighting applied).

As referenced, although the doFocusedResumePresentationForFetchedResumeRecordArray(_: andFieldInfoArray:) method may return no value it may internally yield a PresentationFetchedResumeRecord array. As perhaps foreshadowed by the similarities and differences between the FetchedResumeRecord class and the PresentationFetchedResumeRecord class, the PresentationFetchedResumeRecord array yielded internally by the method may reflect the passed-in FetchedResumeRecord array but with one or more changes applied thereto which may serve to aid presenting to a user the resumes of the intaken FetchedResumeRecord array in a fashion which may act to draw the user's attention to one or more aspects of the resume and/or to facilitate resume viewing in light of the device employed by the user for viewing. As discussed in greater detail hereinbelow, such presentation aiding may include one or more of content truncation and/or content highlighting. More particularly— and as discussed further hereinbelow—the truncation and/or highlighting may take into account query information set forth by the passed-in FieldInfo information set forth by the passed-in FieldInfo array. As such, for example, as discussed below text truncation may act to remove from presentation one or more words which are not specified by the passed-in queries of the FieldInfo array or are not within a specified proximity of such query-specified words. As a further example, as discussed below text highlighting may act to highlight words specified by the passed-in queries of the FieldInfo array. Such highlighting of query-agreeing words of the resume may serve to draw the resume viewer's attention to resume aspects which may likely be of interest. Such truncation may also serve to—by removing potentially extraneous resume content—draw the resume viewer's attention to likely-of-interest resume aspects. Moreover, such truncation may serve to aid resume presentation in a way in keeping with the device type of the resume viewer. In particular, as discussed hereinbelow the extent of such truncation may be adjusted automatically based on the device type. As such, illustratively a greater amount of truncation may be applied where the viewing device is determined to be a smartphone while a lesser amount of truncation may be applied where the viewing device is determined to be a pad. Such difference in truncation application may perhaps be viewed as applying a greater amount of truncation in the case of a smartphone in view of that device likely having a smaller screen than the pad.

As referenced the noted truncation and/or highlighting may take into account query information set forth in the passed-in FieldInfo array. Two approaches to the doFocusedResumePresentationForFetchedResumeRecordArray(_: andFieldInfoArray:) will now be discussed, the two approaches differing for example in their strategies as to applying such passed-in query information to highlighting and/or truncation.

Turning to FIG. 13, according to the first approach at phase 1301 presenter object method doFocusedResumePresentationForFetchedResumeRecordArray(_: andFieldInfoArray:) of the first approach may be called by either resumesAndStoreForNewiobListing( ) or startResumesViaUserQuery( ), such calling method passing—as discussed above—the noted FetchedResumeRecord array and the noted FieldInfo array. With regard to phase 1303 doFocusedResumePresentationForFetchedResumeRecordArray(_: andFieldInfoArray:) may set forth code in line with the pseudocode:

```
var searchQueryForFieldsArray: [String] =
theFieldInfoArray.map({$0.searchQueryForField})
    var mergedQueriesString: String =
searchQueryForFieldsArray.joinWithSeparator(" ")
    var strippedMergedQueriesString: String =
self.stripConjunctionsAndNottedWordsFromQueryString
(mergedQueriesString)
    var strippedMergedQueriesSet: Set<String> =
Set(strippedMergedQueriesString.componentsSeparatedByString(" "))
    var strippedMergedQueriesArray: [String] =
[String](strippedMergedQueriesSet)
```

As noted, the two approaches to the doFocusedResumePresentationForFetchedResumeRecordArray(_: andFieldInfoArray:) method may in an aspect differ as to their strategies for applying to the noted highlighting and/or truncation the query information received via the passed-in FieldInfo array. According to the first approach the method may ply such passed-in query information such that a single bank of the query words may be formulated, and this single bank of query words may be wielded in applying highlighting and/or truncation to all FetchedResumeRecord fields which receive highlighting and/or truncation (e.g., where it is the rawTtl, rawKwd, and extraData fields which are to be subjected to highlighting and/or truncation, each of these fields may receive highlighting and/or truncation which may make use of the sole query word bank). Via code in line with the above pseudocode the method may act to establish such single bank of passed-in query words by formulating string array strippedMergedQueriesArray (phase 1303). As set forth by the pseudocode, in a first aspect the method may apply to the passed-in FieldInfo array a map function which may act to output a string array where each element of the output string array corresponds to a particular element of the passed-in FieldInfo array but sets forth—as conveyed by $0.searchQueryForField—only the searchQueryForField property of that particular element. As such, searchQueryForFieldsArray sets forth via its elements all queries set forth by the totality of the searchQueryForField properties of the passed-in FieldInfo array. As additionally set forth by the pseudocode the method may call joinWithSeparator(_:) on searchQueryForFieldsArray passing a string setting forth a sole space character as the sole parameter of the call, thusly producing a string mergedQueriesString which sets forth all elements of searchQueryForFieldsArray with the passed space character being employed as the delimited in mapping array elements to the string.

Further the method may, as set forth by the pseudocode, call discussed herein stripConjunctionsAndNottedWordsFromQueryString(_:) where mergedQueriesString is passed as the sole parameter of the call. In keeping with that which is disused herein, such call may yield a string which corresponds to the passed-in string but with "AND," "OR," "NOT," and words preceded by "NOT" removed therefrom. As per the pseudocode such yielded string bears the name strippedMergedQueriesString. Then, as conveyed by the pseudocode, a set strippedMergedQueriesSet corresponding to strippedMergedQueriesString cast as an array may be formulated. In keeping with the Swift/Apple frameworks pseudocode employed herein such set may convey all words set forth by s strippedMergedQueriesString but with only one copy of each such word even where such word appears multiple times in strippedMergedQueriesString. Finally set forth by the above pseudocode is casting strippedMergedQueriesSet as an array thusly yielding the discussed above string array strippedMergedQueriesArray providing the noted single back of passed-in query words.

Subsequent to performance of phase 1303, the method may instantiate a PresentationFetchedResumeRecord array and enter a for-in loop which, visiting each element of passed-in theFetchedResumeRecordArray, may act to fill the newly-instantiated array (e.g., the array instantiation may be implemented via code in line with the pseudocode var presentationFRRArray: [PresentationFetchedResumeRecord]=[PresentationFetchedResumeRecord]( ) and such for-in loop may include code in line with the pseudocode for frrObject in theFetchedResumeRecordArray). Performed within the for-in loop may firstly be instantiation of PresentationFetchedResumeRecord object presentationFRRObjectToAdd. Further performed within the for-in loop may be phases 1305-1351. Turning first to phases 1305-1311, it is noted that such phases may be implemented via code in line with the pseudocode:

```
if frrObject.rawTtl != "" {
    var shortenedRawTtlString: String =
self.returnShortenedStringForFocusWords(strippedMergedQueriesArray,
inString:
frrObject.rawTtl, forSpan: spanValue)
    var highlightedAttributedOfShortenedRawTtlString:
NSMutableAttributedString =
self.returnAttributedStringHighlightingWords(strippedMergedQueriesArray,
inString: shortenedRawTtlString)
    presentationFRRObjectToAdd.rawTtl =
highlightedAttributedOfShortenedRawTtlString
}
```

In keeping with that which is set forth by the if statement of the above pseudocode, the doFocusedResumePresentationForFetchedResumeRecordArray(_: andFieldInfoArray:) method may at phase 1305 check whether or not the rawTtl property of the element of theFetchedResumeRecordArray which is presently being visited by the for-in loop is empty. Where such emptiness is found flow may proceed to phase 1313. Where such emptiness is not found flow may proceed to phase 1307. At phase 1307 the method may, in keeping with that which is set forth by the above pseudocode portion which includes a call to returnShortenedStringForFocusWords(_: inString: forSpan:), apply truncation of the sort noted above with respect to that which is set forth by the rawTtl property of the currently-visited element of theFetchedResumeRecordArray. As set forth by the pseudocode, passed as the first parameter of the call may be discussed strippedMergedQueriesArray which provides the noted single bank of the query words. Passed for the second parameter of the call may be frrObject.rawTtl, the rawTtl property of the presently-visited element of theFetchedResumeRecordArray. Passed for the third parameter of the call may be spanValue. As reflected by the pseudocode set forth hereinbelow in connection with the returnShortenedStringForFocusWords(_: inString: forSpan:) method, the value passed for the forSpan parameter may specify within how may words of a word specified via the first parameter a word of inString may be in order to be included in the string returned by the method. For example, where 0 is specified for the forSpan parameter there may be call that a word of inString be one of the words specified for the first parameter in order for that word to be included in the output string (e.g., where passed for the first parameter is a single element string array setting forth "construction," passed for the second parameter is the string "residential construction management," and passed for the third parameter is 0, the only word in the output string may be "construction"). As another example, where 1 is specified for the forSpan parameter there may be call that a word of inString be either one of the words specified for the first parameter, a word to the left of such a first parameter-specified word, or a word to the right of such a first-parameter specified word (e.g., where passed for the first parameter is a single element string array setting forth "construction," passed for the second parameter is the string "residential construction management," and passed for the third parameter is 1, all three of "residential," "construction," and "management," may be in the output string).

The value passed for the forSpan parameter—spanValue in the doFocusedResumePresentationForFetchedResumeRecordArray(_: andFieldInfoArray:) pseudocode—may be set in a number of ways. As one example, such may be set according to user choice (e.g., with the user specifying her desire via a GUI), by a system administrator, or in an automated fashion. Such automated implementation may take into account the device which the user is employing to view resumes. As such, for instance, a lower value may be passed for the forSpan parameter in the case of the user employing a smartphone for resume viewing, such lower value resulting in less resume content being shown in keeping with the expected smaller display of a smartphone. A higher value may be passed for the forSpan parameter in the case of the user employing a laptop or desktop for resume viewing, such higher value resulting in more resume content being shown in keeping with the expected larger display of a laptop or desktop. A middle ground value may be passed for the forSpan property in the case of the user employing a pad (e.g., an iPad) for resume viewing, such middle ground value resulting in a middle ground amount of resume content being shown in keeping with the expected middle ground display size of a pad. As an illustration, a switch case statement may be employed to set the value passed for the forSpan parameter (e.g., to set discussed spanValue), such switch case statement setting the value to be passed in light of the resume viewing device type (e.g., laptop/desktop versus pad versus smartphone).

Device type may be determined in a number of ways. For example, where a web browser is being employed in resume viewing the user agent string may be taken into account. As an illustration, where the user agent includes the string "Macintosh" or "611" the resume viewing device may be taken to be a laptop or desktop, where the user agent string contains the string "iPhone" the viewing device may be taken to be a smartphone, or where the user agent string contains the string "iPad" the viewing device may be taken to be a pad (e.g., the switch case statement may take into account such string value in selecting the value to be passed). As another example of determining device type, in keeping with the Swift/Apple frameworks pseudocode employed herein the string found when checking the property UIDevice.currentDevice( ).model may be examined, and the resume viewing device may be taken to be a smartphone where the string is "iPhone" and the device may be taken to be a pad where the string is "iPad" (e.g., the noted switch case statement may take into account such string property in selecting the value to be passed to returnShortenedStringForFocusWords(_: inString: forSpan:)). In like vein, the string found when checking the property NSProcessInfo.processInfo( ).operatingSystemVersionString may be examined and the device may be taken to be a laptop or desktop where the string contains a string in the form of "10.x.y where x and y and integer values). As set forth by the pseudocode, the string returned in reply to the call to returnShortenedStringForFocusWords(_: inString: forSpan:) may be placed in string object shortenedRawTtlString.

From phase 1307 flow may proceed to phase 1309 where doFocusedResumePresentationForFetchedResumeRecordArray(_: andFieldInfoArray:) may, in keeping with that which is set forth by the above pseudocode portion which includes a call to returnAttributedStringHighlightingWords (_: inString:), apply highlighting of the sort noted above with respect to that which is set forth by the rawTtl property of the currently-visited element of theFetchedResumeRecordArray. As set forth by the pseudocode, passed for the first parameter of the call may be discussed strippedMergedQueriesArray. Passed for the second parameter may be shortenedRawTtlString, the string object setting forth that which was returned in reply to the call of phase 1307. As reflected by the pseudocode set forth hereinbelow in connection with the returnAttributedStringHighlightingWords (_: inString:) method, such method may act to return an NSMutableAttributedString which sets forth that which is specified by passed-in string inString but with highlighting applied to those of the words of inString which are set forth by the string array passed for the first parameter. As such, for the at-hand case of strippedMergedQueriesArray being passed for the first parameter and shortenedRawTtlString being passed for the second parameter, the returned NSMutableAttributedString object may set forth that which was set forth by the string returned in reply to the call of phase 1307 but with highlighting applied to those of the phase 1307-returned words which are specified by sole bank of passed-in query words strippedMergedQueriesArray.

From phase 1309 flow may proceed to phase 1311 where doFocusedResumePresentationForFetchedResumeRecordArray(_: andFieldInfoArray:) may, in keeping with that which is conveyed by the above pseudocode portion which sets forth presentationFRRObjectToAdd.rawTtl= highlightedAttributedOfShortenedRawTtlString, set the rawTtl property of object presentationFRRObjectToAdd to reflect the truncation and highlighting performed via phases 1307 and 1309. As set forth hereinbelow in connection with phase 1351, presentationFRRObjectToAdd may be applied to presentationFRRArray, the PresentationFetchedResumeeRecord array which is filled via the for-in loop. From phase 1311 flow may proceed to phase 1313.

As specified by FIG. 13, flow may proceed to phase 1313 from either phase 1311 or—in the case of a determination of "yes" at phase 1305—from phase 1305. Turning to phases 1313-1319 it is noted that, as referenced by the below-listed pseudocode and further by FIG. 13, such phases may be performed in a fashion analogous to that discussed hereinabove with respect to phases 1305-1311 but with respect to rawKwd rather than with respect to rawTtl:

```
if frrObject.rawKwd != "" {
    var shortenedRawKwdString: String =
self. returnShortenedStringForFocusWords(strippedMergedQueriesArray,
inString:
frrObject.rawKwd, forSpan: spanValue)
    var highlightedAttributedOfShortenedRawKwdString:
NSMutableAttributedString =
self.returnAttributedStringHighlightingWords(strippedMergedQueriesArray,
inString: shortenedRawKwdString)
    presentationFRRObjectToAdd.rawKwd =
highlightedAttributedOfShortenedRawKwdString
}
```

As reflected by FIG. 13, flow may proceed to phase 1321 from either phase 1319 or—in the case of a "yes" determination at phase 1313—from phase 1313. Turning to phases 1321-1327 it is noted that, as reflected by the below-listed pseudocode and as further reflected by FIG. 13, such phases may be performed in a fashion analogous to that discussed above with respect to phases 1305-1311 but with respect to nrmTtl rather than with respect to rawTtl:

```
if frrObject.nrmTtl != "" {
    var shortenedNrmTtlString: String =
self.returnShortenedStringForFocusWords(strippedMergedQueriesArray,
inString:
frrObject.nrmTtl, forSpan: spanValue)
    var highlightedAttributedOfShortenedNrmTtlString:
NSMutableAttributedString =
self.returnAttributedStringHighlightingWords(strippedMergedQueriesArray,
inString: shortenedNrmTtlString)
    presentationFRRObjectToAdd.nrmTtl =
highlightedAttributedOfShortenedNrmTtlString
}
```

Flow may—as reflected by FIG. 13—proceed to phase 1329 from either phase 1327 or—in the case of a "yes" determination at phase 1321—from phase 1321. Turning to phases 1329-1335 it is noted that, as reflected by the below-listed pseudocode and as further reflected by FIG. 13, such phases may be performed in a fashion analogous to that discussed above with respect to phases 1305-1311 but with respect to nrmKwd rather than with respect to rawTtl:

```
if frrObject.nrmKwd != "" {
    var shortenedNrmKwdString: String =
self.returnShortenedStringForFocusWords(strippedMergedQueriesArray, inString:
frrObject.nrmKwd, forSpan: spanValue)
    var highlightedAttributedOfShortenedNrmKwdString:
NSMutableAttributedString =
self.returnAttributedStringHighlightingWords(strippedMergedQueriesArray,
inString: shortenedNrmKwdString)
    presentationFRRObjectToAdd.nrmKwd =
highlightedAttributedOfShortenedNrmKwdString
}
```

As referenced by FIG. 13, flow may proceed to phase 1337 from either phase 1335 or—in the case of a "yes" determination at phase 1329—from phase 1329. Phases 1337-1345 will now be discussed. It is noted that such phases may be implemented via code in line with the pseudocode:

```
if frrObject.extraData != "" {
    var extraDataDecodedData: NSData = NSData(base64EncodedString: frrObject.extraData, options: NSDataBase64DecodingOptions(rawValue: 0))
    var extraDataDecodedString: NSString = NSString(data: extraDataDecodedData, encoding: NSUTF8StringEncoding)
    var shortenedExtraDataDecodedString: String = self.returnShortenedStringForFocusWords(strippedMergedQueriesArray, inString: extraDataDecodedString as String, forSpan: spanValue)
    var highlightedAttributedOfShortenedExtraDataDecodedString: NSMutableAttributedString = self.returnAttributedStringHighlightingWords(strippedMergedQueriesArray, inString: shortenedExtraDataDecodedString)
    presentationFRRObjectToAdd.decodedExtraData = highlightedAttributedOfShortenedExtraDataDecodedString
}
```

With an eye towards the if statement of the above pseudocode it is noted that doFocusedResumePresentationForFetchedResumeRecordArray(_: andFieldInfoArray:) may act at phase 1337 to—in a manner analogous to that discussed hereinabove in connection with for instance phase 1305—check whether or not the extraData property of the element of theFetchedResumeRecordArray which is presently being visited by the for-in loop is empty. Where emptiness is found flow may proceed to phase 1347. Where emptiness is not found flow may proceed to phase 1339. At phase 1339 the method may act to decode the Base64 data set forth by the noted extraData property so as to yielded decoded string text. As set forth by the pseudocode the method may first decode the data in such a fashion that an NSData object corresponding to the decoded Base64 data of the extraData property is yielded. In particular, as set forth by the pseudocode the method may employ the NSData init(base64EncodedString: options:) method, passing as the first parameter the noted extraData property and passing for the second parameter NSDataBase64DecodingOptions(rawValue: 0) to convey that no options are desired. The yielded NSData object corresponding to the as-discussed extraData property may be, as set forth by the pseudocode, held in an NSData objected named extraDataDecodedData. Further at phase 1339 the doFocusedResumePresentationForFetchedResumeRecordArray(_: andFieldInfoArray:) method may provide a string object which conveys in string form the decoded data of NSData object extraDataDecodedData. In particular, As set forth by the pseudocode the method may employ the NSString init(data: encoding:) method, passing as the first parameter the noted NSData object extraDataDecodedData and passing as the second parameter NSUTF8StringEncoding so as to convey the desired string type. As set forth by the pseudocode the yielded string—which sets forth as a decoded, plain text string that which was set forth in Base64 form by the noted extraData property—may be held in string object extraDataDecodedString. The plain text, decoded string having been yielded, flow may proceed to phases 1341-1345. Phases 1341-1345 may be performed in a fashion analogous to that discussed hereinabove with respect to phases 1307-1311 butt with respect to decoded, plain text string extraDataDecodedString rather than with respect to the noted rawTtl property.

Turning to phases 1347 and 1349 it is noted that phase 1347 may be reached from phase 1345 or—in the case of a "yes" determination at phase 1337—from phase 1337.

Phases 1347 and 1349 may, for example, be implemented via code in line with the pseudocode:

```
presentationFRRObjectToAdd.docNum = frrObject.docNum
presentationFRRObjectToAdd.relevancyScore = frrObject.relevancyScore
```

As such at phase 1347 the doFocusedResumePresentationForFetchedResumeRecordArray(_: andFieldInfoArray:) method may, in keeping with that which is set forth by the first line of the pseudocode, set the docNum property of object presentationFRRObjectToAdd to that which is set forth by the docNum property of the element of theFetchedResumeRecordArray which is presently being visited by the for-in loop. In like vein at phase 1349 the method may, in keeping with that which is set forth by the second line of the above pseudocode, set the relevancyScore property of object presentationFRRObjectToAdd to that which is set forth by the relevancyScore property of the element of theFetchedResumeRecordArray which is presently being visited by the for-in loop. As set forth hereinbelow in connection with phase 1351, presentationFRRObjectToAdd may be appended to presentationFRRArray, the PresentationFetchedResumeRecord array which is filled via the for-in loop. As such, the array built by the loop may set forth the docNum and relevancyScore properties set forth by intaken theFetchedResumeRecordArray.

From phase 1349 flow may proceed to phase 1351 where the method may, as alluded to earlier, append presentationFRRObjectToAdd to presentationFRRArray, the PresentationFetchedResumeRecord array which is filled via the for-in loop. Such of phase 1351 may, for instance, be implemented via code in line with the pseudocode presentationFRRArray.append(presentationFRRObjectToAdd).

From phase 1351 flow may proceed to phase 1353 where the for-in-loop may determine whether or not there are further elements in theFetchedResumeRecordArray. Where the for-in loop makes a determination of "yes," flow may return to phase 1305 where, in keeping with the employ of a for-in loop, operation flow proceeds with respect to the next element of theFetchedResumeRecordArray. Where a determination of "no" is made at phase 1353 flow may proceed to phase 1355 where, as is discussed in greater detail hereinbelow, formulated presentationFRRArray may be employed in resume display.

As referenced, although doFocusedResumePresentationForFetchedResumeRecordArray(_: andFieldInfoArray:) may return no value it may internally yield a PresentationFetchedResumeRecord array. As also noted such array may reflect the passed-in FetchedResumeRecord array but with changes applied thereto (e.g., truncation and/or highlighting) which may serve to draw the resume-viewing user's attention to one or more resume aspects and/or to facilitate resume viewing in light of the device being employed for resume viewing. As also discussed such truncation and/or highlighting may make use of query information set forth by the passed-in FieldInfo array. As also noted two approaches to the doFocusedResumePresentationForFetchedResumeRecordArray(_: andFieldInfoArray:) method are set forth herein, the two approaches differing in their strategies as to applying such passed-in query information to highlighting and/or truncation.

As referenced, according to the first approach—which was just discussed in connection with FIG. 13—the passed-in query information was plied by the method such that a single bank of the query words was formulated, and this single bank of query words was wielded in applying highlighting and/or truncation to all FetchedResumeRecord fields which received highlighting and/or truncation.

Now discussed in connection with FIG. 14 will be the second approach to the method. As indicated this approach may differ from the first approach as to strategy for applying passed-in query information to highlighting and/or truncation. In particular, according to this second approach the passed-in query information may be plied such that a different bank of query words may be formulated with respect to each FetchedResumeRecord field which is to be subjected to highlighting and/or truncation. In particular, the bank of query words formulated for a given FetchedResumeRecord field corresponds to the query set forth by the passed-in FieldInfo array for that field. As such, for instance, the bank of query words wielded in applying highlighting and/or truncation to the rawKwd field may reflect the query set forth by the FieldInfo array for rawKwd, while the bank of query words wielded in applying highlighting and/or truncation to the nrmTtl field may reflect the query set for by the FieldInfo array for nrmTtl.

As such, turning to FIG. 14 according to the second approach at phase 1401 the presenter object doFocusedResumePresentationForFetchedResumeRecordArray(_: andFieldInfoArray:) of the second approach may be called by either resumesAndStoreForNewiobListing( ) or startResumesViaUserQuery( ), such calling method passing—as discussed above—the noted FetchedResumeRecord array and the noted FieldInfo array.

Subsequent to phase 1401 the method may instantiate a PresentationFetchedResumeRecord array and enter a for-in loop which, visiting each element of passed-in theFetchedResumeRecordArray, may act to fill that newly-instantiated array. The array instantiation may be implemented via code in line with the pseudocode var presentationFRRArray: [PresentationFetchedResumeRecord]=[PresentationFetchedResumeRecord]( ) and such for-in loop may include code in line with the pseudocode for frrObject in theFetchedResumeRecordArray. Performed within the for-in loop may firstly be instantiation of PresentationFetchedResumeRecord object presentationFRRObjectToAdd. Next within the for-in loop the method may at phase 1403—in a fashion analogous to that discussed hereinabove in connection with phase 1305—check whether or not the rawTtl property of the element of theFetchedResumeRecordArray which is presently being visited by the for-in loop is empty. The code setting forth such functionality may include code in line with the pseudocode if frrObject.rawTtl !=" ". Where emptiness is found flow may proceed to phase 1413. Where emptiness is not found flow may proceed to phase 1405. With regard to phase 1405 it is noted that doFocusedResumePresentationForFetchedResumeRecordArray(_: andFieldInfoArray:) may set forth code in line with the pseudocode:

--- var indexofRawTtlFIObject: Int = (theFieldInfoArray.map({$0.fieldName})).indexOf("rawTtl")
var rawTtlQuery: String = theFieldInfoArray[indexofRawTtlFIObject].searchQueryForField
var strippedRawTtlQuery: String = self.stripConjunctionsAndNottedWordsFromQueryString(rawTtlQuery)
var strippedRawTtlQueryAsSet: Set<String> = Set(strippedRawTtlQuery.componentsSeparatedByString(" "))
var strippedRawTtlQueryAsArray: [String] = [String](strippedRawTtlQueryAsSet)

---

As noted the two approaches to the doFocusedResumePresentationForFetchedResumeRecordArray(_: andFieldInfoArray:) method may in one aspect differ as to their strategies for applying to the noted highlighting and/or truncation the query information received via the passed-in FieldInfo array. As also noted, according to the at-hand second approach the passed-in query information may be plied such that a different bank of query words may be formulated with respect to each FetchedResumeRecord property which is to be subjected to truncation and/or highlighting, with the bank of query words formulated for a given FetchedResumeRecord property corresponding to the query set forth by the passed-in FieldInfo array for that property. In keeping with this, as rawTtl is the at-hand FetchedResumeRecord property which respect to phase 1405, at phase 1405 the method may formulate a bank of query words which reflects the query set forth by the passed-in FieldInfo array for rawTtl. In particular, via code in line with the above pseudocode the method may act to establish such a property-specific query word bank by formulating strippedRawTtlQueryAsArray (phase 1405). As set forth by the above pseudocode, in a first aspect the method may apply to passed-in theFieldInfoArray a map function which outputs a string array where each element of the string array corresponds to a particular element of the FieldInfo array but sets forth—as conveyed by $0.fieldName—only the fieldName property of that particular element. Then, as further set forth by the pseudocode, indexOf (_:) is called on the thusly-yielded string array with rawTtl being passed as the sole parameter of the call. Received in reply to such indexOf(_:) call may be an integer specifying the array element which corresponds to rawTtl. As set forth by the pseudocode such index number may be held in integer object indexofRawTtlFIObject. Then, with this index value now being known, as set forth in the above pseudocode doFocusedResumePresentationForFetchedResumeRecordArray(_: andFieldInfoArray:) may act to ply such index number in determining the query which the FieldInfo array sets forth for rawTtl (see above pseudocode setting forth var rawTtlQuery: String=theFieldInfoArray[indexofRawTtlFIObject].searchQueryForField). With such query held in string rawTtlQuery, the method may, as set forth by the above pseudocode, act in a fashion analogous to that discussed herein above in connection with phase 1303 to remove from rawTtlQuery instances of "AND," "OR," "NOT," and words preceded by "NOT," the result of such removing being held in string object strippedRawTtlQuery. Then the method may, as set forth by the above pseudocode, act in a manner further analogous to that discussed in connection with phase 1303 to create a set object corresponding to strippedRawTtlQuery, such casting as a set achieving removal of any duplicate words existing in strippedRawTtlQuery. As still further set forth by the pseudocode—and also analogous to that which is discussed in connection with phase 1303—the method may act to cast the set as string array strippedRawTtlQueryAsArray, thusly completing phase 1405.

From phase 1405 flow may proceed to phase 1407. Turning to phases 1407-1411 it is noted that, as reflected by the below-listed pseudocode and as further reflected by FIG. 14, such phases may be performed in a fashion analogous to that discussed above with respect to phases 1307-1311 but with the bank of query words being rawTtl-specific query word bank strippedRawTtlQueryAsArray rather than sole query word bank strippedMergedQueriesArray of phases 1307-1311:

```
var shortenedRawTtlString: String =
self.returnShortenedStringForFocusWords(strippedRawTtlQueryAsArray, inString:
frrObject.rawTtl, forSpan: spanValue)
var highlightedAttributedOfShortenedRawTtlString: NSMutableAttributedString =
self.returnAttributedStringHighlightingWords(strippedRawTtlQueryAsArray,
inString: shortenedRawTtlString)
presentationFRRObjectToAdd.rawTtl = highlightedAttributedOfShortenedRawTtlString
```

With an eye towards method returnShortenedStringForFocusWords(_: inString: forSpan:) and returnAttributedStringHighlightingWords(_: inString:) it is noted that such methods are discussed in greater detail hereinbelow.

From phase 1411 flow may proceed to phase 1413. In agreement with that which is set forth hereinabove and also that which is indicated by FIG. 14, phase 1411 may also be reached via phase 1403 in the case of a "yes" determination at phase 1403. Turning to phases 1413-1421 it is noted that as reflected by the below-set pseudocode and as further reflected by FIG. 14, such phases may be performed in a fashion analogous to that discussed above in connection with phases 1403-1411 but with respect to rawKwd rather than with respect to rawTtl and plying rawKwd-specific query word bank strippedRawKwdQueryAsArray rather than rawTtl-specific query word bank strippedRawTtlQueryAsArray:

```
var shortenedRawKwdString: String =
self.returnShortenedStringForFocusWords(strippedRawKwdQueryAsArray, inString:
frrObject.rawKwd, forSpan: spanValue)
var highlightedAttributedOfShortenedRawKwdString: NSMutableAttributedString =
self.returnAttributedStringHighlightingWords(strippedRawKwdQueryAsArray,
inString: shortenedRawKwdString)
presentationFRRObjectToAdd.rawKwd = highlightedAttributedOfShortenedRawKwdString
```

From phase 1421 flow may proceed to phase 1423. In agreement with that which is set forth hereinabove and also that which is indicated by FIG. 14, phase 1423 may also be reached via phase 1413 in the case of a "yes" determination at phase 1413. Turning to phases 1423-1431 it is noted that as reflected by the below-listed pseudocode and as further reflected by FIG. 14, such phases may be performed in a fashion analogous to that discussed above in connection with phases 1403-1411 but with respect to nrmTtl rather than with respect to rawTtl and plying nrmTtl-specific query word bank strippedNrmTtlQueryAsArray rather than raw-Ttl-specific query word bank strippedRawTtlQueryAsArray:

```
if frrObject.nrmTtl != "" {
    var indexofNrmTtlFIObject: Int =
(theFieldInfoArray.map({$0.fieldName})).indexOf("nrmTtl")
    var nrmTtlQuery: String =
theFieldInfoArray[indexofNrmTtlFIObject].searchQueryForField
    var strippedNrmTtlQuery: String =
self.stripConjunctionsAndNottedWordsFromQueryString(nrmTtlQuery)
    var strippedNrmTtlQueryAsSet: Set<String> =
Set(strippedNrmTtlQuery.componentsSeparatedByString(" "))
    var strippedNrmTtlQueryAsArray: [String] = [String](strippedNrmTtlQueryAsSet)
    var shortenedNrmTtlString: String =
self.returnShortenedStringForFocusWords(StrippedNrmTtlQueryAsArray, inString:
frrObject.nrmTtl, forSpan: spanValue)
    var highlightedAttributedOfShortenedNrmTtlString: NSMutableAttributedString =
self.returnAttributedStringHighlightingWords(StrippedNrmTtlQueryAsArray,
inString: shortenedNrmTtlString)
    presentationFRRObjectToAdd.nrmTtl =
highlightedAttributedOfShortenedNrmTtlString
}
```

From phase 1431 flow may proceed to phase 1433. In agreement with that which is set forth hereinabove and also that which is indicated by FIG. 14, phase 1433 may also be reached via phase 1423 in the case of a "yes" determination at phase 1423. Turning to phases 1433-1441 it is noted that as reflected by the below-listed pseudocode and as further reflected by FIG. 14, such phases may be performed in a fashion analogous to that discussed above in connection with phases 1403-1411 but with respect to nrmKwd rather than with respect to rawTtl and plying nrmKwd-specific query word bank strippedNrmKwdQueryAsArray rather than rawTtl-specific query word bank strippedRawTtlQueryAsArray:

Firstly, with an eye towards phase 1447 and the portions of the below-listed pseudocode including calls to NSData method init(base64EncodedString: options:) and to NSString method init(data: encoding:), in contrast to that which is set forth in connection with phases 1403-1411 also included may be operations which take the Base64 data set forth by the extraData property of the element of theFetchedResumeRecordArray which is presently being visited by the for-in loop and produce corresponding decoded plain text string object extraDataDecodedString. With reference to the below-pasted pseudocode, it is noted that such operations of phase 1447 may be performed in a manner analo-

```
if frrObject.nrmKwd != "" {
    var indexofNrmKwdFIObject: Int =
(theFieldInfoArray.map({$0.fieldName})).indexOf("nrmKwd")
    var nrmKwdQuery: String =
theFieldInfoArray[indexofNrmKwdFIObject].searchQueryForField
    var strippedNrmKwdQuery: String =
self.stripConjunctionsAndNottedWordsFromQueryString(nrmKwdQuery)
    var strippedNrmKwdQueryAsSet: Set<String> =
Set(strippedNrmKwdQuery.componentsSeparatedByString(" "))
    var strippedNrmKwdQueryAsArray: [String] =
[String](StrippedNrmKwdQueryAsSet)
    var shortenedNrmKwdString: String =
self.returnShortenedStringForFocusWords(StrippedNrmKwdQueryAsArray, inString:
frrObject.nrmKwd, forSpan: spanValue)
    var highlightedAttributedOfShortenedNrmKwdString:
NSMutableAttributedString =
self.returnAttributedStringHighlightingWords(StrippedNrmKwdQueryAsArray,
inString: shortenedNrmKwdString)
    presentationFRRObjectToAdd.nrmKwd =
highlightedAttributedOfShortenedNrmKwdString
}
```

From phase 1441 flow may proceed to phase 1443. In agreement with that which is set forth hereinabove and also that which is indicated by FIG. 14, phase 1443 may also be reached via phase 1433 in the case of a "yes" determination at phase 1433. Turning to phases 1443-1453 it is noted that as reflected by the below-listed pseudocode and as further reflected by FIG. 14, such phases may be performed in a manner analogous to that discussed above in connection with phases 1403-1411 but with the following differences.

gous to that set forth in connection with phase 1339. Then, as a further difference versus phases 1403-1411, phases 1445-1453 may act with respect to extraDataDecodedString rather than with respect to rawTtl and plying extraData-specific query word bank strippedExtraDataQueryAsArray rather than rawTtl-specific query word bank strippedRawTtlQueryAsArray. Set forth below is the above-referenced pseudocode corresponding to phases 1445-1453:

```
if frrObject.extraData != "" {
    var indexofExtraDataFIObject: Int =
(theFieldInfoArray.map({$0.fieldName})).indexOf("extraData")
```

```
    var extraDataQuery: String =
theFieldInfoArray[indexofExtraDataFIObject].searchQueryForField
    var strippedExtraDataQuery: String =
self.stripConjunctionsAndNottedWordsFromQueryString(extraDataQuery)
    var strippedExtraDataQueryAsSet: Set<String> =
Set(strippedExtraDataQuery.componentsSeparatedByString(" "))
    var strippedExtraDataQueryAsArray: [String] =
[String](StrippedExtraDataQueryAsSet)
    var extraDataDecodedData: NSData = NSData(base64EncodedString:
frrObject.extraData, options: NSDataBase64DecodingOptions(rawValue: 0))
    var extraDataDecodedString: NSString = NSString(data:
extraDataDecodedData, encoding: NSUTF8StringEncoding)
    var shortenedExtraDataDecodedString: String =
self.returnShortenedStringForFocusWords(StrippedExtraDataQueryAsArray, inString:
extraDataDecodedString as String, forSpan: spanValue)
    var highlightedAttributedOfShortenedExtraDataDecodedString:
NSMutableAttributedString =
self.returnAttributedStringHighlightingWords(strippedExtraDataQueryAsArray,
inString: shortenedExtraDataDecodedString)
    presentationFRRObjectToAdd.decodedExtraData =
highlightedAttributedOfShortenedExtraDataDecodedString
}
```

Turning to phases 1455 and 1457 it is noted that phase 1455 may be reached from phase 1453 or—in the case of a "yes" determination at phase 1443—from phase 1443. Phases 1455 and 1457 may, for example, be implemented via code in line with the pseudocode:

```
presentationFRRObjectToAdd.docNum = frrObject.docNum
presentationFRRObjectToAdd.relevancyScore =
frrObject.relevancyScore
```

As such, at phase 1455 the doFocusedResumePresentationForFetchedResumeRecordArray(_: andFieldInfoArray:) method may, in view of that which is set forth by the first line of the pseudocode, set the docNum property of presentationFRRObjectToAdd to that which is set forth by the docNum property of the element of theFetchedResumeRecordArray which is presently being visited by the for-in loop. Likewise at phase 1457 the method may, in keeping with that which is set forth by the second line of the pseudocode, set the relevancyScore property of object presentationFRRObjectToAdd to that which is set forth by the relevancyScore property of the element of theFetchedResumeRecordArray which is presently being visited by the for-in loop.

From phase 1457 flow may proceed to phase 1459 where the method may append presentationFRRObjectToAdd to presentationFRRArray, the PresentationFetchedResumeRecord array which is filled via the for-in loop. Such of phase 1459 may, for instance, be implemented via code in line with the pseudocode presentationFRRArray.append(presentationFRRObjectToAdd).

From phase 1459 flow may proceed to phase 1461 where the for in loop may determine whether or not there are further elements in theFetchedResumeRecordArray. Where the for-in loop makes a determination of "yes" flow may return to phase 1403 where in keeping with the employ of a for-in loop operation flow proceeds with respect to the next element of theFetchedResumeRecordArray. Where a determination of "no" is made at phase 1461 flow may proceed to phase 1463 where, as discussed in greater detail hereinbelow, presentationFRRArray may be employed in resume display.

Method returnShortenedStringForFocusWords(_: inString: forSpan:) and returnAttributedStringHighlightingWords(_: inString:) of the presenter object will now be discussed in greater detail.

Firstly discussed will be returnShortenedStringForFocusWords(_: inString: forSpan:). Such method may have the declaration:

```
func returnShortenedStringForFocusWords(_ theFocusWords: [String],
    inString theString: String, forSpan theSpan: Int) -> String
```

As such the declaration indicates that the method may take a first parameter of type string array ([String]), the first parameter having the local parameter name theFocusWords and no external parameter name. Further indicated by the method is that the method may take a second parameter of type String, the second parameter having the local parameter theString and the external parameter name inString. Still further indicated by the declaration is that the method may take a third parameter of type integer, the third parameter having the local parameter name theSpan and the external parameter name forSpan. Additionally indicated by the declaration is that the method may have return type of string.

As referenced above the value passed for the forSpan parameter may specify within how many words of a word specified via the first parameter a word of inString may be in order to be included in the string returned by the method. Moreover, ellipses may be placed by the method to convey in the output string words which have been removed relative to the input string. As an illustration, where passed for the first parameter were the string array ["management", "project", "schedule", "manager"], passed for the inString parameter were string "worksite management keeping within budget worker relationship management," and passed for the forSpan parameter were the integer 1, returned by the method may be string "worksite management keeping . . . relationship management."

The method may, as an illustration, be implemented via code in line with the to-be-discussed pseudocode. In a first aspect such pseudocode may involve casting intaken theString as a string array object named inTakenStringAsArray via var inTakenStringAsArray: [String]=theString.componentsSeparatedByString(" "). In another aspect such pseudocode may include instantiating set hitIndicesSet.

Further, implementation of the method may include code in line with the pseudocode:

```
var inTakenStringAsArray: [String] =
   theString.componentsSeparatedByString(" ")
   var hitIndicesSet: Set<Int> = Set<Int>( )
   for (index, stringWord) in inTakenStringAsArray.enumerate( ) {
      if theFocusWords.contains(stringWord) {
         hitIndicesSet.insert(index)
      }
   }
```

The above pseudocode sets forth, for instance, employing a for-in loop to visit each element of inTakenStringAsArray and check whether the word of the visited element is among those specified by passed-in theFocusWords. Where such visited word is thusly specified, the pseudocode sets forth adding the array element of that element to hitIndicesSet. As such, with completion of the loop hitIndicesSet may set forth the indices of elements of inTakenStringAsArray which are specified by theFocusWords.

Implementation of the method may also include code in line with the pseudocode:

```
var subOutputStringArray: [String] = [String]( )
for (index, stringWord) in inTakenStringAsArray.enumerate( ) {
   var posRange: Range = index ... (index + theSpan)
   var negRange: Range = ((index − theSpan) ... index)
   if negRange.startIndex < 0 { negRange = 0 ... index }
   var posRangeSet: Set = Set(posRange)
   var negRangeSet: Set = Set(negRange)
   var fullRangeSet: Set = posRangeSet.union(negRangeSet)
   if !(fullRangeSet.intersect(hitIndicesSet).isEmpty) {
      subOutputStringArray.append(stringWord)
   }
   if fullRangeSet.intersect(hitIndicesSet).isEmpty {
      subOutputStringArray.append("...")
   }
}
```

In one aspect the pseudocode sets forth instantiating string array subOutputStringArray. Also set forth by the pseudocode is a for-in loop which once again visits each element of inTakenStringAsArray. As indicated by the pseudocode, performed with each such visitation is establishing set fullRangeSet which sets forth the element numbers of those array elements which are included in the element range established by passed-in theSpan for the at-hand visited array element. As one illustration, for a passed-in the span of 0 and the element number of the visited element being 5, fullRangeSet may indicate only the value 5. As another illustration, for a passed-in theSpan of 2 and the element number of the visited element being 5, fullRangeSet may include the values 3, 4, 5, 6, and 7.

Then, via the final two if statements of the above pseudocode checking may be performed as to see whether, for the at-hand visited word, the element range established by theSpan and reflected by fullRangeSet places the at-hand visited word within acceptable vicinity of one of the words set forth by theFocusWords. Where the at-hand visited word is within such appropriate vicinity it may be added to subOutputStringArray. Where it is not an ellipsis may instead be added to subOutputStringArray. As one illustration, returning to the above example which passed ["management", "project", "schedule", "manager"] for the first parameter, "worksite management keeping within budget worker relationship management" for the second parameter, and 1 for the forSpan parameter, where the visited element corresponds to the theString word "keeping," such word may be added to subOutputStringArray because its index number of 3 is within acceptable vicinity of hit word "management." As another illustration, where the visited element instead corresponds to the theString word "within," an ellipsis may be added to subOutputStringArray instead of the word because its index number of 4 is not within acceptable vicinity of any hit word.

Implementation of the method may additionally include code in line with the pseudocode:

```
var lastWasElipsis: Bool = false
var revisedArray: [String] = [String]( )
for element in subOutputStringArray {
   if element != "..." {
      revisedArray.append(element)
      lastWasElipsis = false
   }
   else if element == "..." && !lastWasElipsis {
      revisedArray.append(element)
      lastWasElipsis = true
   }
   else if element == "..." && lastWasElipsis {
      lastWasElipsis = true
   }
}
```

In one aspect, the above pseudocode sets forth instantiating Bool object lastWasElipsis within an initial value of false, and instantiating string array revisedArray. Then via the for-in loop each element of subOutputStringArray is visited. Where the visited element is not an ellipsis it is added to revisedArray and lastWasElipsis is updated such that with the next iteration of the loop there is record that this element was not an ellipsis. Where the visited element is an ellipsis lastWasElipsis is set to reflect such. Moreover, the ellipsis may be appended to revisedArray where it was not proceeded by another ellipsis, but may not be appended to revisedArray where it was proceeded by another ellipsis.

Subsequent to the just-discussed for-in loop, code in line with the pseudocode return revisedArray.joinWithSeparator(" ") may be employed to return revisedArray, cast as a string, as the result of the method.

Now discussed will be returnAttributedStringHighlightingWords(_: inString:). This method may have the declaration:

```
func returnAttributedStringHighlightingWords(_ theWords: [String],
   inString theString: String) −> NSMutableAttributedString
```

As such the declaration indicates that the method may take a first parameter of type string array where the first parameter has a local parameter name of theWords and no external parameter name. Also indicated by the declaration is that the method may take a second parameter of type String, the second parameter having the local parameter name theString and the external parameter name inString. Still further indicated by the declaration is that the method may have a return type of NSMutableAttributedString. With reference to that which is set forth hereinabove regarding NSMutableAttributedString, it is noted that employ of a NSMutableAttributedString allows conveyance of both textual information (e.g., one or more words) as well as corresponding formatting information (e.g., text color, highlight/background color, and/or font specifications for those one or more words).

Such method may return an NSMutableAttributedString which sets forth the text of the string passed for inString where yellow highlighting/background color is added to a passed-in word of inString if it is among the words passed for the first parameter.

In one aspect, implementation of the method may include code in line with the pseudocode:

```
var stringArray: [String] = theString.componentsSeparatedByString(" ")
var attStringArray: [NSMutableAttributedString] = [NSMutableAttributedString] ( )
for plainWord in stringArray {
   attStringArray.append(NSMutableAttributedString(string: plainWord) )
}
```

Set forth by the above pseudocode is casting intaken theString as a string array name stringArray by calling componentsSeparatedByString(_:) on theString where a string providing a space character is passed as the sole parameter of the call. Then an NSMutableAttributedString array named attStringArray is instantiated. Further, via a for-in loop attStringArray is loaded so as to have elements matching the elements of stringArray.

In another aspect, implementation of the method may include code in line with the pseudocode:

```
for attString in attStringArray {
   var rangeForAttString: NSRange = NSMakeRange(0,
attString.string.characters.count)
   if theWords.contains(attString.string) {
      attString.addAttribute(NSBackgroundColorAttributeName, value:
UIColor.yellowColor( ), range: rangeForAttString)
   }
}
```

As such the pseudocode sets forth a for-in loop which visits each element of attStringArray, and with each such visitation does the following. Firstly instantiating an NSRange object rangeForAttString which sets forth a range corresponding to the entirety of attString, the word of attStringArray presently visited by the for-in loop. Further with each such visitation the set forth if statement is performed. The if statement checks whether attString—the presently visited element of attStringArray—is among passed in theWords. Where attString is thusly among theWords, yellow highlighting may be added to the presently-visited element of attStringArray.

In yet another aspect, the method may be implemented via code in line with the pseudocode:

```
var attributedStringToReturn: NSMutableAttributedString =
NSMutableAttributedString( )
for (index, attStringPostHl) in attStringArray.enumerate( ) {
   attributedStringToReturn.appendAttributedString(attStringPostHl)
   if index != ( (attStringArray.count)−1) {
attributedStringToReturn.appendAttributedString(NSMutableAttributedString(string:
" ") )
   }
}
```

As such, the pseudocode sets for establishing an NSMutableAttributedString object attributedStringToReturn which corresponds to attStringArray. In particular, after instantiating attributedStringToReturn a for-in loop visits each element of attStringArray. With each such element visitation, the visited element is added to attributedStringToReturn, with a space character being appended where the added element is noted the final element.

Finally set forth by the method may be code in line with the pseudocode return attributedStringToReturn, thusly returning attributedStringToReturn as the result of the method.

As discussed hereinabove, according to either implementation of doFocusedResumePresentationForFetchedResumeRecordArray(_: andFieldInfoArray:) internally yielded by the method may be presentationFRRArray. As noted, the yielded presentationFRRArray object may set forth one or more empty properties (e.g., where one or more corresponding FetchedResumeRecord properties were, as discussed hereinabove, found not to set forth relevant information). As referenced, the method may employ presentationFRRArray in resume display. In particular, the method may instantiate an object resumeOverviewViewController of class ResumeOverviewViewController. Provided via the ResumeOverviewViewController class may be, for example, a view which sets forth an instance of a UITableView. In keeping with this the ResumeOverviewViewController class may, in an aspect, adopt the UITableViewDataSource and UITableViewDelegate protocols. Moreover, the ResumeOverviewViewController class may inherit from UIViewController. Among the properties provided by the ResumeOverviewViewController class may be a property tableView of type UITableView which may be associated with the noted UITableView instance (e.g., with the property being a @IBOutlet property and with the association being set via Xcode). Further among the properties provided by the ResumeOverviewViewController class may be a property heldPresentationFRRArray of type [PresentationFetchedResumeRecord], and subsequent to instantiating resumeOverviewViewController doFocusedResumePresentationForFetchedResumeRecordArray(_: andFieldInfoArray:) may set the heldPresentationFRRArray property of resumeOverviewViewController to reflect presentationFRRArray yielded by the method. Moreover, via for instance viewDidLoad( ) resumeOverviewViewController may set forth code in line with the pseudocode tableView.delegate=self and tableView.dataSource=self.

Cells of the UITableView instance may be set to be ones of a class ResumeCell which inherits from UITableViewCell. The ResumeCell class may in an aspect set forth two @IBOutlet properties of type UILabel, one named rawTtlLabel and one named relevancyScoreLabel. Also set forth by the class may be a property presentationFRRResume of type PresentationFetchedResumeRecord and a computed property accessorPresentationFRRResume. The computed property may be set forth via code in line with the following pseudocode, thusly setting forth a setter and a getter method:

```
var accessorPresentationFRRResume: PresentationFetchedResumeRecord {
  get {
    return presentationFRRResume
  }
  set (accessorPresentationFRRResume) {
    presentationFRRResume = accessorPresentationFRRResume
    rawTtlLabel.attributedText = accessorPresentationFRRResume.rawTtl
    relevancyScoreLabel.text =
String(accessorPresentationFRRResume.relevancyScore)
  }
}
```

Via for instance Xcode this class may be associated with the UITable instance and with an identifier resumecellidentifier. Moreover, via, for example, Xcode the rawTtlLabel property may be associated with a UILabel and the relevancyScoreLabel property may likewise be associated with a UILabel.

Moreover, set forth for the ResumeOverviewViewController class may be a property corresponding to the UITableView instance. Still further, included in the viewDidLoad( ) method of ResumeOverviewViewController may be setting the delegate and dataSource properties of the UITableView to self to convey that the ResumeOverviewViewController instance may act as the delegate and datasource for the UITableView. Further, in keeping with such delegate and datasource roles, set forth by the ResumeOverviewViewController class may be the following two methods:

```
func tableView(_ tableView: UITableView, numberOfRowsInSection section: Int) ->
Int {
  return self.heldPresentationFRRArray.count
}
func tableView(_ tableView: UITableView, cellForRowAtIndexPath indexPath:
NSIndexPath) -> UITableViewCell {
  var cell: ResumeCell =
tableView.dequeueReusableCellWithIdentifier("resumecellidentifier")
  cell.accessorPresentationFRRResume =
self.heldPresentationFRRArray[indexPath.row]
  return cell
}
```

Reflecting upon the aforementioned regarding the resumeOverviewViewController the following is noted. Via the discussed setting of the heldPresentationFRRArray property the object comes to have access to the PresentationFetchedResumeRecord array yielded by doFocusedResumePresentationForFetchedResumeRecordArray(_: andFieldInfoArray:). Then, via the ResumeCell class and its associated UILabels established was the potential for the instantiated UITableView to set forth cells which each provide resume rawTtl data and resume relevancyScore information. Then via UITableViewDelegate method tableView(_: cellForRowAtIndexPath:) established was the ability to vend to the instantiated UITableView, in response to a request therefrom, a ResumeCell instance whose corresponding rawTtlLabel and relevancyScoreLabel have been set to reflect the rawTtl and relevancyScore properties of the heldPresentationFRRArray element whose element number matches the table view raw number passed to the method via the cellForRowAtIndexPath parameter. As one illustrative example, via the just-discussed row zero of the UITableView may include a cell whose rawTtlLabel sets forth the information of the rawTtl property of element [0] of heldPresentationFRRArray and whose relevancyScoreLabel sets forth the information of the relevancyScore property of element [0] of heldPresentationFRRArray. As another illustrative example, via the just-discussed row one of the UITableView may include a cell whose rawTtlLabel sets forth the information of the rawTtl property of element [1] of heldPresentationFRRArray and whose relevancyScoreLabel sets forth the information of the relevancyScore property of element [1] of heldPresentationFRRArray. Thusly, row n of the UITableView may provide a cell whose rawTtl label sets forth the information of the rawTtl property of element [n] of heldPresentationFRRArray and whose relevancyScoreLabel sets forth the information of the relevancyScore property of element [n] of heldPresentationFRRArray.

As such, presented to the user may be a scrollable table whose rows set forth the rawTtl properties and relevancyScore properties of heldPresentationFRRArray and therefore of the PresentationFetchedResumeRecord array yielded by doFocusedResumePresentationForFetchedResumeRecordArray(_: andFieldInfoArray:).

Additionally, the UITableView presented to the user may be clickable/tapable such that by clicking/tapping on a row of the table the user may be provided with further detail regarding the corresponding resume. Moreover, such detailed presentation may be in a form which corresponds to the device type being employed for resume viewing (e.g., smartphone versus pad). Such device-type-dependent presentation forms may, for instance, be thought of as device-type-dependent-templates. Such smartphone template may in an aspect involve a to-be-discussed instantiated object of to-be-discussed type ResumePhonePageViewController, and such pad template may in an aspect involve a to-be-discussed instantiated object of to-be-discussed type ResumePadPageViewController. In an aspect, the ResumeOverviewViewController class may additionally set forth the UITableViewDelegate method:

```
func tableView(_ tableView: UITableView, didSelectRowAtIndexPath indexPath:
NSIndexPath) {
    var currentDevice = UIDevice.currentDevice( ).model
    if currentDevice == "iPad" {
        var pageViewControllerToUse = ResumePadPageViewController( )
        pageViewControllerToUse.currentResumePresentationFRR =
heldPresentationFRRArray[indexPath.row]
        self.presentViewController(pageViewControllerToUse, animated: true,
completion: nil)
    }
    else {
        var pageViewControllerToUse = ResumePhonePageViewController( )
        pageViewControllerToUse.currentResumePresentationFRR =
heldPresentationFRRArray[indexPath.row]
        self.presentViewController(pageViewControllerToUse, animated: true,
completion: nil)
    }
}
```

Via such UITableViewDelegate method, where the user clicks/taps on a row a page view controller may be instantiated, have its currentResumePresentationFRR property set to reflect the element number of heldPresentationFRRArray which corresponds to the clicked/tapped table row, and display corresponding to the instantiated page view controller may be requested. As set forth by the pseudocode, the instantiated page view controller may be of class ResumePadPageViewController where the current device is a pad and may be of class ResumePhonePageViewController otherwise.

In keeping with the Swift/Apple frameworks pseudocode employed herein, associated with a UIPageViewController object may be an array property which sets forth one or more UIViewController objects, each such UIViewController object being associated with a UIView. The UIPageViewController may allow the user to employ a swipe/drag to switch among such UIViews of the UIViewController objects of the array. As such, as set forth herein UIPageViewController functionality may be employed to, subsequent to a user selecting a resume via the discussed table, allow the user to swipe/drag among UIViews, with each UIView presenting one or more portions of that resume (e.g., such a UIView may display the extraData portion of the selected resume and/or such a UIView may display the nrmTtl and nrmKwd portions of the selected resume).

As noted, the employed page view controller may be of class ResumePadPageViewController where the user resume viewing device is determined to be a pad; the employed page view controller may be of class ResumePhonePageViewController otherwise. Firstly discussed will be the ResumePhonePageViewController class.

The ResumePhonePageViewController class may, in aspects, be a subclass of UIPageViewController and may conform to the UIPageViewControllerDataSource protocol. As referenced, the class may set forth a property currentResumePresentationFRR of type PresentationFetchedResumeRecord. Moreover via, for instance, viewDidLoad( ) the class may—in keeping with it conforming to the UIPageViewControllerDataSource protocol—set forth code in line with the pseudocode self.dataSource=self. Still further, with reference to that which has been discussed above with respect to UIPageViewController functionality, the ResumePhonePageViewController class may set forth a property resumeSectionViewControllers of type [UIViewController]. Setting of the UIViewController elements of this property is discussed hereinbelow.

Still further set forth by the class may be establishing the UIViewController which may be first provided to the user. Such may be set forth by calling (e.g., via viewDidLoad( )) the setViewControllers(_: direction: animated: completion:) method—a method inherited via being a subclass of UIPageViewController—as per code in line with the pseudocode:

```
self.setViewControllers( [resumeSectionViewControllers[0]], direction: .Forward,
animated: true, completion: nil)
``` whereby, for instance, the first UIViewController of the noted array is set to be the first one displayed to the user.

In keeping with the Swift/Apple frameworks pseudocode employed herein the ResumePhonePageViewController class may also implement, in agreement with adopting the UIPageViewControllerDataSource protocol, method pageViewController(_: viewControllerBeforeViewController:) and method pageViewControler(_: viewControllerAfterViewController:). As referenced, the resumeSectionViewControllers array may set forth one or more UIViewController objects, each such UIViewController object being associated with a UIView which displays one or more resume portions. In agreement with the Swift/Apple frameworks pseudocode employed herein, pageViewController(_: viewControllerBeforeViewController:) may be called under the circumstance where the user is viewing a given one of the UIViews associated with one of the UIViewController objects of the array and then swipes/drags leftward. Passed to the method may be the UIViewController associated with the currently-viewed UIView, and the method may act to return either nil or the UIViewController associated with the UIView which may be presented to the user in response to such leftward drag/swipe. The ResumePhonePageViewController class may implement this method by firstly determining the position within the resumeSectionViewControllers array of the passed-in view controller (e.g., by calling indexOf( ) on the array, passing such UIViewController as the sole parameter of the call. Where the array position is found to be element [0] pageViewController(_: viewControllerBeforeViewController:) may return nil. As the element [0] determination signifies that the user is presently making use of the first UIViewController of the array, the returning of nil may be seen as indicating that there is no preceding view controller. Where pageViewControler(_: viewControllerBeforeViewController:) instead finds the determined array element number to be other than [0], the method may act to return the preceding UIViewController of the array (e.g., where the determined array element is held in integer object determinedIndex, returned by the method may be resumeSectionViewControllers[(determinedIndex–1)]. In like vein, in agreement with the Swift/Apple frameworks pseudocode employed herein pageViewControler(_: viewControllerAfterViewController:) may be called under the circumstance where the user is viewing a given one of the UIViews associated with one of the UIViewControllers of the array and then swipes/drags rightward. In further like vein, passed to the method may be the UIViewController associated with the currently-viewed UIView, and the method may act to return either nil or the UIViewController associated with the UIView which may be presented to the user in response to such rightward drag/swipe. The ResumePhonePageViewController class may implement this method by firstly determining the position within the resumeSectionViewControllers array of the passed-in UIViewController (e.g., by calling indexOf( ) on the array in the fashion discussed hereinabove). Where the array position is found to base the last element of the array (e.g., where the array position is found to be (resumeSectionViewControllers.count–1)), pageViewControler(_: viewControllerAfterViewController:) may return nil. As the determination of the array position to be the last element of the array may signify that the user is presently making us of the last UIViewController of the array, the returning of nil may be seen as indicating that there is no successor view controller. Where pageViewControler(_: viewControllerAfterViewController:) instead finds the determined array element number to be other than (resumeSectionViewControllers.count–1), the method may act to return the preceding UIViewController of the array (e.g., where the determined array element number is held in integer object determinedIndex, returned by the method may be resumeSectionViewControllers[(determinedIndex+1)].

According to one or more embodiments a ResumePhonePageViewController object may be capable of setting forth a UIViewController and corresponding view with respect to each of one or more properties of PresentationFetchedResumeRecord. For instance, such a ResumePhonePageViewController object may be capable of instantiating an object of to-be-discussed class RawTtlViewController which corresponds to resume rawTtl display, an object of to-be-discussed class RawKwdViewController which corresponds to resume rawKwd display, an object of to-be-discussed class NrmTtlViewController which corresponds to resume nrmTtl display, an object of to-be-discussed class NrmKwdViewController which corresponds to resume nrmKwd display, an object of to-be-discussed class DecodedExtraDataViewController which corresponds to resume extraData display, and/or an object of to-be-discussed class RelevancyScoreViewController which corresponds to resume relevancyScore display.

As referenced, an object of class ResumePhonePageViewController may have a currentResumePresentationFRR property which may be set to reflect a PresentationFetchedResumeRecord object corresponding to a resume which the user has selected via the UITableView. Moreover, as discussed a given PresentationFetchedResumeRecord object may set forth an empty string (" ") for one or more of its properties (e.g., a given such property may set forth an empty string in the case where operations of the sort discussed herein have determined the property to correspond to a not-relevant resume section).

According to one or more embodiments the ResumePhonePageViewController object may check (e.g., via its viewDidLoad( ) method) for such emptiness with respect to one or more properties of noted currentResumePresentationFRR. In particular, according to one or more embodiments such checking may involve performing an empty string check with respect to one or more of the rawTtl property, the rawKwd property, the nrmTtl property, the nrmKwd property, and the decodedExtraData property of currentResumePresentationFRR. It is noted that, according to one or more embodiments no emptiness check may be performed with respect to the relevancyScore property of currentResumePresentationFRR (e.g., such embodiments may be ones where relevancyScore properties are not at risk of being set to an empty value by operations of the sort discussed herein).

In particular, the ResumePhonePageViewController object may set forth (e.g., via its viewDidLoad( ) method) code in line with the pseudocode:

```
if currentResumePresentationFRR.rawTtl != "" {
    var rawTtlViewController = RawTtlViewController( )
    rawTtlViewController.currentResumePresentationFRR = currentResumePresentationFRR
    resumeSectionViewControllers.append(rawTtlViewController)
}
if currentResumePresentationFRR.rawKwd != "" {
    var rawKwdViewController = RawKwdViewController( )
    rawKwdViewController.currentResumePresentationFRR = currentResumePresentationFRR
    resumeSectionViewControllers.append(rawKwdViewController)
}
if currentResumePresentationFRR.nrmTtl != "" {
    var nrmTtlViewController = NrmTtlViewController( )
    nrmTtlViewController.currentResumePresentationFRR = currentResumePresentationFRR
    resumeSectionViewControllers.append(nrmTtlViewController)
}
if currentResumePresentationFRR.nrmKwd != "" {
    var nrmKwdViewController = NrmKwdViewController( )
    nrmKwdViewController.currentResumePresentationFRR = currentResumePresentationFRR
    resumeSectionViewControllers.append(nrmKwdViewController)
}
```

-continued

```
if currentResumePresentationFRR.decodedExtraData != "" {
   var decodedExtraDataViewController = DecodedExtraDataViewController( )
   decodedExtraDataViewController.currentResumePresentationFRR =
currentResumePresentationFRR
   resumeSectionViewControllers.append(decodedExtraDataViewController)
}
var relevancyScoreViewController = RelevancyScoreViewController( )
relevancyScoreViewController.currentResumePresentationFRR =
currentResumePresentationFRR
resumeSectionViewControllers.append(relevancyScoreViewController)
```

As such, with respect to each of the rawTtl property, the rawKwd property, the nrmTtl property, the nrmKwd property, and the decodedExtraData property of currentResumePresentationFRR of the ResumePhonePageViewController object the above pseudocode sets forth first checking as to the emptiness of such property. Where the property is determined not to indicate an empty string the pseudocode sets forth instantiating an object of the corresponding view controller class, setting the newly-instantiated view controller object's currentResumePresentationFRR property to match the currentResumePresentationFRR property of the ResumePhonePageViewController object, and adding the newly-instantiated view controller object to resumeSectionViewControllers. Moreover, with reference to that which is discussed hereinabove, set forth by the pseudocode is—without the performance of an emptiness check—instantiating an object of type RelevancyScoreViewController, setting the newly-instantiated view controller object's currentResumePresentationFRR property to match the currentResumePresentationFRR property of the ResumePhonePageViewController object, and adding the newly-instated view controller object to resumeSectionViewControllers.

Now discussed will be the ResumePadPageViewController class. Like the ResumePhonePageViewController class the ResumePadPageViewController class may be a subclass of UIPageViewController, may conform to the UIPageViewControllerDataSource protocol, may set forth a property currentResumePresentationFRR of type PresentationFetchedResumeRecord, and may set forth property resumeSectionViewControllers of type [UIViewController]. Moreover, in keeping with its conforming to the UIPageViewControllerDataSource protocol the ResumePadPageViewController class may—for instance via its viewDidLoad( ) method—set forth code in line with the pseudocode self.dataSource=self.

Still further like the ResumePhonePageViewController class, the ResumePadPageViewController class may establish the UIViewController which may first be provided to the user. Such functionality may be implemented by the ResumePadPageViewController as discussed hereinabove with respect to the ResumePhonePageViewController class. Also like the ResumePhonePageViewController class, the ResumePadPageViewController class may, in agreement with adopting the UIPageViewControllerDataSource protocol, implement the methods pageViewController(_: viewControllerBeforeViewController:) and pageViewControler (_: viewControllerAfterViewController:). Such methods may be implemented by the ResumePadPageViewController class as discussed hereinabove with respect to the ResumePhonePageViewController.

Discussed in connection with the ResumePhonePageViewController class was, for instance, there being a UIViewController and corresponding UIView with respect to each of the rawTtl property, the rawKwd property, the nrmTtl property, the nrmKwd property, the decodedExtraData property, and the relevancyScore property of the PresentationFetchedResumeRecord class. According to one or more embodiments, the ResumePadPageViewController class may—unlike the ResumePhonePageViewController class—set forth one or more UIViewControllers and corresponding UIViews which each correspond to two or more PresentationFetchedResumeRecord properties (e.g., a single UIViewController and corresponding UIView may correspond to both the rawTtl PresentationFetchedResumeRecord property and the rawKwd PresentationFetchedResumeRecord property). One illustration of UIViewControllers and corresponding views which a ResumePadPageViewController object may be capable of setting forth is as follows. The ResumePadPageViewController object may be capable of instantiating an object of to-be-discussed class RawTtlRawKwdRelevancyScoreViewController which corresponds to resume rawTtl, rawKwd, and relevancyScore display, an object of to-be-discussed class NrmTtlNrmKwdRelevancyScoreViewController which corresponds to resume nrmTtl, nrmKwd, and relevancyScore display, and/or an object of to-be-discussed class DecodedExtraDataRelevancyScoreViewController which corresponds to resume ExtraData and relevancyScore display.

As referenced, an object of class ResumePadPageViewController may have a currentResumePresentationFRR property which may be set to reflect a PresentationFetchedResumeRecord object corresponding to a resume which the user has selected via the UITableView. Moreover, as noted, for example, in connection with the ResumePhonePageViewController a given PresentationFetchedResumeRecord object may set forth an empty string (" ") for one or more of its properties (e.g., arising from operations of the sort discussed hereinabove making one or more property lack-of-relevancy determinations). Discussed hereinabove in connection with the ResumePhonePageViewController class was performing currentResumePresentationFRR property emptiness determination in connection with establishing UIViewControllers—and their associated UIViews—as being available to the user via a ResumePhonePageViewController object. In like vein the ResumePhonePageViewController object may set forth—for example via its viewDidLoad( ) method—code in line with the following pseudocode:

```
if (currentResumePresentationFRR.rawTtl != "" ) ||
(currentResumePresentationFRR.rawKwd != "" ) {
   var rawTtlRawKwdRelevancyScoreViewController =
RawTtlRawKwdRelevancyScoreViewController( )
      rawTtlRawKwdRelevancyScoreViewController.currentResumePresentationFRR =
currentResumePresentationFRR
      resumeSectionViewControllers.append(rawTtlRawKwdRelevancyScoreViewController)
}
if (currentResumePresentationFRR.nrmTtl != "" ) ||
(currentResumePresentationFRR.nrmKwd != "" ) {
   var nrmTtlNrmKwdRelevancyScoreViewController =
NrmTtlNrmKwdRelevancyScoreViewController( )
      nrmTtlNrmKwdRelevancyScoreViewController.currentResumePresentationFRR =
currentResumePresentationFRR
      resumeSectionViewControllers.append(nrmTtlNrmKwdRelevancyScoreViewController)
}
if currentResumePresentationFRR.decodedExtraData != "" {
   var decodedExtraDataRelevancyScoreViewController =
DecodedExtraDataRelevancyScoreViewController( )
      decodedExtraDataRelevancyScoreViewController. currentResumePresentationFRR =
currentResumePresentationFRR
resumeSectionViewControllers.append(decodedExtraDataRelevancyScoreViewController)
}
```

As such in one aspect the pseudocode sets forth with respect to the RawTtlRawKwdRelevancyScoreViewController class checking the emptiness of both currentResumePresentationFRR.rawTtl and currentResumePresentationFRR.rawKwd. Where at least one of the checked properties is found to not set forth an empty string, set forth is instantiating an object of type RawTtlRawKwdRelevancyScoreViewController, setting the newly-instantiated object's currentResumePresentationFRR to match the currentResumePresentationFRR property of the ResumePadPageViewController object, and adding the newly-instantiated view controller object to the resumeSectionViewControllers array. As referenced a RawTtlRawKwdRelevancyScoreViewController object may correspond to resume rawTtl, rawKwd, and relevancyScore display. For example, an associated UIView may set forth a rawTtl-corresponding UILabel, a rawKwd-corresponding UILabel, and a relevancyScore-corresponding UILabel. With reference to that which is discussed hereinabove, relevancyScore may not be expected to display emptiness. However, with reference to that which is discussed rawTtl and rawKwd may set forth empty strings. Then, as per the above pseudocode the instantiation and other set forth operations may be performed with regard to RawTdRawKwdRelevancyScoreViewController even where one of the checked rawTtl property and the checked rawKwd property sets forth an empty string. According to one or more embodiments and as discussed hereinbelow, under such circumstance where one of the noted properties sets forth an empty string its UILabel in the corresponding UIView may not be displayed (e.g., via the UILabel having its hidden property set to true). As an illustration, as per the above pseudocode where currentResumePresentationFRR.rawTtl does not set forth an empty string but currentResumePresentationFRR.rawKwd does set forth an empty string the instantiation and other indicated operations with respect to RawTtlRawKwdRelevancyScoreViewController may nevertheless be performed. However, as per that which has just been discussed the corresponding UILabel for rawKwd may have its hidden property set to true and may not be displayed.

Further regarding the above pseudocode, set forth with respect to the NrmTtlNrmKwdRelevancyScoreViewController is checking the emptiness of both currentResumePresentationFRR.nrmTtl and currentResumePresentationFRR.nrmKwd. Where at least one of the checked properties is found to not convey an empty string, set forth by the pseudocode is instantiating an object of type NrmTtlNrmKwdRelevancyScoreViewController, setting the newly-instantiated object's currentResumePresentationFRR property to match the currentResumePresentationFRR property of the ResumePadPageViewController object, and adding the newly-instantiated view controller object to the resumeSectionViewControllers array.

A NrmTtlNrmKwdRelevancyScoreViewController object may, as referenced, correspond to resume nrmTtl, nrmKwd, and relevancyScore display. As an illustration, an associated UIView may set forth a nrmTtl-corresponding UILabel, a nrmKwd-corresponding UILabel, and a relevancy-score corresponding UILabel. With reference to that which is discussed hereinabove a UILabel may not be displayed where its corresponding property sets forth an empty value (e.g., where nrmTtl does set forth an empty string but nrmKwd does not set forth an empty string, the UILabel for nrmTtl may not be displayed, such as by way of the UILabel object having its hidden property set to true).

With still further regard to the above pseudocode, it is noted that set forth with respect to the DecodedExtraDataRelevancyScoreViewController class may be checking the emptiness of currentResumePresentationFRR.decodedExtraData. Where currentResumePresentationFRR.decodedExtraData is found to not convey an empty string, set forth by the pseudocode is instantiating an object of type DecodedExtraDataRelevancyScoreViewController, setting the newly-instantiated object's currentResumePresentationFRR to match the currentResumePresentationFRR property of the ResumePadPageViewController, and adding the newly-instantiated view controller object to the resumeSectionViewControllers array. As referenced, a DecodedExtraDataRelevancyScoreViewController object may correspond to resume extraData and relevancyScore display. As an illustration, an associated UIView may set forth an extraData-corresponding UITextView and a relevancyScore-corresponding UILabel. As referenced hereinabove, PresentationFetchedResumeRecord property relevancyScore may not be expected to set forth an empty value. Moreover, the pseudocode sets forth with respect to the DecodedExtraDataRelevancyScoreViewController class an emptiness check with respect to decodedExtraData. As such, the potential for emptiness in connection with the DecodedExtraDataRelevancyScoreViewController class may be dealt with via the noted if statement. In particular, where decodedExtraData is found to be empty neither DecodedExtraDataRelevancyScoreViewController instantiation nor corresponding UIView display transpires. As such, there may not be call to, say, potentially set a hidden property to true.

Now discussed in greater detail will be the UIViewControllers discussed hereinabove in connection with the ResumePhonePageViewController class and therefore the classes RawTtlViewController, RawKwdViewController, NrmTtlViewController, NrmKwdViewController, DecodedExtraDataViewController, and RelevancyScoreViewController. Also discussed will not be the UIViews which correspond to those UIViewControllers.

Turning first to the RawTtlViewController class, it is noted that the RawTtlViewController may be set forth via code in line with the pseudocode:

```
class RawTtlViewController: UIViewController {
    var currentResumePresentationFRR: PresentationFetchedResumeRecord
    @IBOutlet var rawTtl: UILabel
    override func viewDidLoad( ) {
        rawTtl.attributedText = currentResumePresentationFRR.rawTtl
    }
}
```

Such RawTtlViewController class may for instance via Xcode be instantiated as an object, and then associated with such RawTtlViewController object in Xcode may be a UIView object. Further in Xcode a UILabel object may be added to the UIView object. Also in Xcode the rawTtl outlet of the RawTtlViewController object may be associated with the UILabel object. As one example the noted UIView object with UILabel object may be as depicted in FIG. 15 wherein the UIView object is depicted as element 1501 and the UILabel object is depicted as element 1503.

Reflecting upon the above pseudocode of the RawTtlViewController class, it is noted that the class sets forth two properties. One such property is discussed-above currentResumePresentationFRR which is, for example, set forth as being set via the viewDidLoad( ) method of ResumePhonePageViewController. The other property of RawTtlViewController is the rawTtl @IBOutlet property which was plied in the above-discussed rawTtl outlet-UILabel object association.

Still further, the RawTtlViewController pseudocode sets forth override method viewDidLoad( ). Such method may be called in a RawTtlViewController object when the object's corresponding view is displayed. With the calling of the method the noted UILabel may be set to display the NSMutableAttributedString text conveyed by currentResumePresentationFRR.rawTtl (see for instance the pseudocode rawTtl.attributedText=currentResumePresentationFRR.rawTtl). Accordingly, for instance, when the user navigates via the page view controller to the view associated with the RawTtlViewController object the noted viewDidLoad( ) method may be called causing the noted UILabel to display the attributed text set forth by currentResumePresentationFRR.rawTtl.

Turning now to the RawKwdViewController class and corresponding UIView the following is noted. Such class and such view may be implemented in a manner analogous to that discussed hereinabove with respect to RawTtlViewController and its corresponding UIView but with regard to rawKwd rather than with regard to rawTtl. Turning to the NrmTtlViewController class and corresponding view, and to the NrmKwdViewController class and corresponding view, it is noted that such classes and such views may each be implemented in a manner analogous to that discussed hereinabove with respect to RawTtlViewController and its corresponding UIView, but with regard to nrmTtl and nrmKwd respectively.

Turning to the DecodedExtraDataViewController class and corresponding view, such class and such view may be implemented in a manner analogous to that discussed hereinabove with respect to RawTtlViewController and its corresponding UIView, but where UITextView is plied in place of UILabel and being with regard to decodedExtraData rather than with regard to rawTtl. Turning to the RelevancyScoreViewController class and corresponding view, such class and such view may be implemented in a manner analogous to that discussed hereinabove with respect to RawTtlViewController and its corresponding UIView, but with regard to relevancyScore rather than with regard to rawTtl, and where the UILabel property setting is of the text property thereof and where the UILabel property setting involves a cast to string (e.g., code in line with the pseudocode relevancyScore.text=String(currentResumePresentationFRR.relevancyScore) may be employed).

Now discussed in greater detail will be the UIViewControllers discussed above in connection with the ResumePadPageViewController class and therefore the classes RawTtlRawKwdRelevancyScoreViewController, NrmTtlNrmKwdRelevancyScoreViewController, and DecodedExtraDataRelevancyScoreViewController. Also discussed will be UIViews which correspond to these UIViewControllers.

Turning first to the RawTtlRawKwdRelevancyScoreViewController class it is note that the class may be set forth via code in line with the pseudocode:

```
class RawTtlRawKwdRelevancyScoreViewController: UIViewController {
    var currentResumePresentationFRR: PresentationFetchedResumeRecord
    @IBOutlet var rawTtl: UILabel
    @IBOutlet var rawKwd: UILabel
    @IBOutlet var relevancyScore: UILabel
    override func viewDidLoad( ) {
        if currentResumePresentationFRR.rawTtl == "" {
            rawTtl.hidden = true
        }
        else {
```

```
        rawTtl.attributedText = currentResumePresentationFRR.rawTtl
    }
    if currentResumePresentationFRR.rawKwd == "" {
        rawKwd.hidden = true
    }
    else {
        rawKwd.attributedText = currentResumePresentationFRR.rawKwd
    }
    relevancyScore.text = String(currentResumePresentationFRR.relevancyScore)
    }
}
```

Such RawTtlRawKwdRelevancyScoreViewController class may for instance via Xcode be instantiated as an object, and associated with such RawTtlRawKwdRelevancyScoreViewController object in Xcode may be a UIView object. Further in Xcode three UILabel objects may be added to the UIView object. Also in Xcode the rawTtl outlet of the RawTtlRawKwdRelevancyScoreViewController object may be associated with a first of the UILabel objects, the rawKwd outlet of the RawTtlRawKwdRelevancyScoreViewController object may be associated with a second of the UILabel objects, and the relevancyScore outlet of the RawTtlRawKwdRelevancyScoreViewController object may be associated with a third of the UILabel objects. As one example the noted UIView object with three UILabel objects may be as depicted in FIG. 16 wherein the UIView object is depicted as element 1601, the rawTtl-corresponding UILabel object is depicted as element 1603, the rawKwd-corresponding UILabel object is depicted as element 1605, and the relevancyScore-corresponding UILabel object is depicted as element 1607.

Reflecting upon the above pseudocode of the RawTtlRawKwdRelevancyScoreViewController class, it is noted that the class sets forth four properties. One such property is the discussed-above currentResumePresentationFRR property which is, for example, set forth as being set view the viewDidLoad( ) method of ResumePadPageViewController. The other three properties are the rawTtl @IBOutlet property which was plied in the above-discussed rawTtl outlet-UILabel object association, the rawKwd @IBOutlet property which was plied in the above-discussed rawKwd outlet-UILabel object association, and the relevancyScore @IBOutlet property which was plied in the above-discussed relevancyScore outlet-UILabel object association.

Moreover, the RawTtlRawKwdRelevancyScoreViewController pseudocode sets forth override method viewDidLoad( ). Such method may be called in a RawTtlRawKwdRelevancyScoreViewController object when the object's corresponding view is displayed (e.g., where the user navigates via the page view controller to the view associated with the RawTtlRawKwdRelevancyScoreViewController object). Responsive to the calling of the method the following may transpire. As referenced above, the potential exists for one of currentResumePresentationFRR.rawTtl and currentResumePresentationFRR.rawKwd to set forth an empty string. In keeping with this, set forth by the pseudocode is checking for the emptiness of currentResumePresentationFRR.rawTtl. Where emptiness is found, as per the pseudocode rawTtl.hidden=true the corresponding UILabel is not displayed to the user. Where emptiness is not found, the rawTtl-corresponding label may be set to display the NSMutableAttributedString text conveyed by currentResumePresentationFRR.rawTtl. In like vein, set forth by the pseudocode is checking for the emptiness of currentResumePresentationFRR.rawKwd. Where emptiness is found, as per the pseudocode rawKwd.hidden=true the corresponding UILabel object may not be displayed to the user. Where emptiness is not found, the rawKwd-corresponding label may be set to display the NSMutableAttributedString text conveyed by currentResumePresentationFRR.rawKwd. Also set forth by the pseudocode of the viewDidLoad( ) method is setting the relevancyScore-corresponding label to display a string corresponding to the double conveyed by currentResumePresentationFRR.relevancyScore.

Turning now to the NrmTtlNrmKwdRelevancyScoreViewController and corresponding UIView, it is noted that such class and such view may be implemented in a manner analogous to that discussed hereinabove with respect to RawTdRawKwdRelevancyScoreViewController and its corresponding UIView but with respect to nrmTtl rather than rawTtl and with respect to nrmKwd rather than rawKwd.

Turning now to the DecodedExtraDataRelevancyScoreViewController class and corresponding UIView, it is noted that such class and such view may be implemented in a manner analogous to that discussed hereinabove with respect to ResumePadPageViewController and its corresponding UIView but with the following differences. Firstly, in place of the noted rawTtl and rawKwd UILabel-related outlet properties, a single property set forth via code in line with the pseudocode @IBOutlet var decodedExtraData: UITextView. And in keeping with this a single UITextView object added to the UIView and associated with the outlet in place of the rawTtl-corresponding UILabel and the rawKwd-corresponding UILabel set forth in connection with RawTtlRawKwdRelevancyScoreViewController and its corresponding view.

As a second difference, in place of the noted viewDidLoad( ) emptiness-checking-inclusive operations set forth with respect to rawTtl and rawKwd may be code in line with the pseudocode decodedExtraData.attributedText=currentResumePresentationFRR.decodedExtraData and thusly causing the referenced UITextView object to display the attributed text set forth by currentResumePresentationFRR.decodedExtraData without performance of a preceding emptiness check. As noted hereinabove, decodedExtraData emptiness may be addressed via the viewDidLoad( ) method of ResumePadPageViewController.

According to one or more embodiments resume download (e.g., with appropriate highlighting of the sort discussed hereinabove applied thereto) may be offered in one or more formats such as pdf, HTML, and/or Microsoft Word. Firstly discussed will be pdf format resume download.

Discussed hereinabove was employ of UIPageViewController objects and related UIViewController objects. According to one or more embodiments provided via such UIViewController objects may be action methods and corresponding UIButton objects whose activation leads to action method calling. In particular, each of the discussed hereinabove UIViewControllers—that is to say each of ResumePhonePageViewController-related UIViewControllers RawTtlViewController, RawKwdViewController, NrmTtlViewController, NrmKwdViewController, DecodedExtraDataViewController, and RelevancyScoreViewController, and each of ResumePadPageViewController-related UIViewControllers RawTtlRawKwdRelevancyScoreViewController, NrmTtlNrmKwdRelevancyScoreViewController, DecodedExtraDataRelevancyScoreViewController—may set forth to-be-discussed action method doQueuePdfRequest(_:) and a UIButton object (e.g., labeled "queue resume for pdf download") set to, when pressed, call that action method.

Moreover, each of the noted UIPageViewControllers— that is to say each of ResumePhonePageViewController and ResumePadPageViewController—may set forth to-be-discussed action method requestQueuedPdfs(_:) and string set property pdfRequestDocNumsSet. What is more, set forth (e.g., via a further view controller) may be a UIButton object (e.g., labeled "request queued pdfs") set to, when pressed, call requestQueuedPdfs(_:).

As such, the user may for example experience behavior in agreement with the following. When employing the page view controller functionality to view different UIViewController-provided resume portions, seeing on each such portion view a button perhaps labeled "queue resume for pdf download." And visible outside the page view controller area—say beneath the page view controller area—a button perhaps labeled "request queued pdfs." As perhaps alluded to by the button labels, activating the button perhaps labeled "queue resume for pdf download" may cause the presently-viewed resume to be queued for pdf download. And pressing the button perhaps labeled "request queued pdfs" may cause download to the user device of those pdfs which have been queued since the last download request and/or since app launch.

Now discussed in greater detail will be action method doQueuePdfRequest(_:). The method may have the declaration:

func doQueuePdfRequest(_sender: UIButton)

and may be set forth as an action method (e.g., by being preceded by @IBAction). As set forth by the declaration, the method takes as its sole parameter the UIButton whose activation calls the method, and returns no value.

As referenced, this action method may be associated with each of the UIPageViewController-related UIViewControllers (e.g., the action method may be associated with rawTtlViewController). As discussed, at the disposal of each such UIViewController may be property currentResumePresentationFRR which is of type PresentationFetchedResumeRecord and which corresponds to the currently-viewed resume. In view of this, available to the action method via currentResumePresentationFRR.docNum may be the document number of the currently-viewed resume. Still further, the method may have access to noted page view controller property pdfRequestDocNumsSet. Such being the case, the action method when activated may call method insert(_:) on its access to property pdfRequestDocNumsSet, passing as the sole parameter of the call currentResumePresentationFRR.docNum, thus causing the document number of the presently-viewed resume to be added to set pdfRequestDocNumsSet. As pdfRequestDocNumsSet holds the document numbers of the resumes to be fetched as pdfs at the next download request, the action method provides functionality by which the user pressing the "queue resume for pdf download" button causes the document number of the presently-viewed resume to be fetched as a pdf at the next download request. Bearing in mind that in keeping with the Swift/Apple frameworks employed herein a set retains only one copy of a value even when such value is passed to the set multiple times, the employ of a set for pdfRequestDocNumsSet allows only one copy of a resume document number to be retained even if, say, the user inadvertently presses the "queue resume for pdf download" button multiple times (e.g., inadvertently) in connection with a particular resume.

Discussed now will be action method (e.g., of ResumePhonePageViewController and/or ResumePadPageViewController) requestQueuedPdfs(_:). The method may have the declaration:

func requestQueuedPdfs(_sender: UIButton)

and may be set forth as an action method (e.g., by being preceded with @IBAction). As set forth by the declaration, the method may take as its sole parameter the UIButton whose activation calls the method, and may return no value.

With the user activating the UIButton associated with the method (e.g., labeled "request queued pdfs") the method may be called and the following may transpire. Firstly, the method may check pdfRequestDocNumsSet (e.g., via code in line with the pseudocode pdfRequestDocNumsSet.isEmpty and checking the returned Boolean value). Where the set is found to be empty a dismissible dialog box may be presented to the user, and with the user's dismissal of the dialog the method may terminate Where the set is found to not be empty the method may perform further to-be-discussed operations. Considering the dialog box, it is noted that such functionality may be provided via employ of a UIAlertController object, and an associated UIAlertAction object via which the user may press a button to dismiss the dialog. It is noted that according to one or more embodiments such checking for emptiness with button press may not occur. Instead, the set may be periodically checked as to emptiness. Where the set is found to be empty, the button object may be disabled by having its enabled property set to false. Where the set is found to not be empty the button may be enabled by having its enabled property set to true. For such embodiments, the button may only be activated when the set is not empty, and as such the button may only be employed by the user to activate the action method where the set is not empty. In keeping with this, for such embodiments the method, when called, may assume the set to not be empty.

Where the action method finds the set to not be empty—or for an embodiment of the sort discussed where the method assumes the set to not be empty—the method may call method returnPdfResumeUrlsForDocNums(_:), passing as the sole parameter of the call pdfRequestDocNumsSet cast as a string array (e.g., via passing [String](pdfRequestDocNumsSet)). As is discussed in greater detail below, returned to the action method in reply to the call may be a String array setting forth URLs from which the desired resume pdfs may be downloaded. It is noted that, according to one or more embodiments, returnPdfResumeUrlsForDocNums(_:) may run remotely (e.g., on a remote server), the method perhaps being offered by a pdfPresenter object which is an instantiation of a PdfPresenter class.

Method returnPdfResumeUrlsForDocNums(_:) may have the declaration:

func returnPdfResumeUrlsForDocNums(_theDocNums: [String])→[String]

As such, the declaration indicates that the method may take a sole parameter of type string array, the sole parameter having the local parameter name theDocNums and no external parameter name. Further indicated by the declaration is that the method may have a return type of string array.

Turning to the operation of the method the following is noted. The method may have at its disposal the FieldInfo array and the FetchedResumeRecord array which corresponds to the resume presentation which was enjoyed by the user (e.g., via the noted page view controllers and view controllers). According to one or more embodiments the method may employ a session identifier (e.g., a UUID-based session identifier) to potentially distinguish among multiple held such FieldInfo arrays and/or multiple held such FetchedResumeRecord arrays (e.g., corresponding to one or more users and/or user devices).

Taking the method to have access to the appropriate FieldInfo array as object theFiArray and to have access to the appropriate FetchedResumeRecord array as theFrrArray, the following may transpire. Firstly, the method may yield a FetchedResumeRecord array which only conveys those resumes specified by passed-in document numbers theDocNums, and store such array as object requestedFrrArray, via code in line with the pseudocode var requestedFrrArray: [FetchedResumeRecord] theFrrArray.filter({theDocNums.contains($0.docNum)}).

Further the method may call method doFocusedResumePdfsForFetchedResumeRecordArray(_: andFieldInfoArray:), passing as the first parameter of the call requestedFrrArray and passing as the second parameter of the call theFiArray. Returned in reply to the call may be a string array setting forth URLs from which the desired resume pdfs may be downloaded. According to one or more embodiments, doFocusedResumePdfsForFetchedResumeRecordArray(_: andFieldInfoArray:) may run remotely (e.g., on a remote server), the method perhaps being offered by noted pdfPresenter.

Method doFocusedResumePdfsForFetchedResumeRecordArray(_: andFieldInfoArray:) may have the declaration:

called both returnShortenedStringForFocusWords(_: inString: forSpan:) and returnAttributedStringHighlightingWords(_: inString:), the at-hand method may only call the later of these two methods. With reference to that which is discussed hereinbelow, such difference may perhaps be viewed as being in keeping with the generated pdfs not, say, suffering from the view space restrictions which may befall a user device (e.g., a smartphone or pad). As another difference, according to one or more embodiments the at-hand method may call a version of returnAttributedStringHighlightingWords(_: inString:) which—bearing in mind the pseudocode set forth for that method—may set forth NSColor in place of UIColor.

As another modification, turning to internally-yielded presentationFRRArray the at-hand method may—instead of employing such array for user display as discussed—employ it in creating, for each resume conveyed via passed-in theFetchedResumeRecordArray, a corresponding pdf. At the disposal of doFocusedResumePdfsForFetchedResumeRecordArray(_: andFieldInfoArray:) may be an NSView accessible as resumePrintView. As examples, the NSView—like other NSView and UIView family objects discussed herein—may be configured programmatically and/or via Xcode. The NSView may be configured such that it contains an number of NSTextField objects and an NSTextView object which, as discussed below, may be populated in pursuit of creating a pdf for a resume via one or more PresentationFetchedResumeRecord properties corresponding to that resume. As an illustration the as-configured NSView may be as illustrated in FIG. 17 which depicts the NSView (1701), rawTtl-corresponding NSTextField object 1703, rawKwd-corresponding NSTextField object 1705, nrmTtl-corresponding NSTextField object 1707, nrmKwd-corresponding NSTextField object 1709, decodedExtraData-corresponding NSTextView object 1711, and relevancyScore-corresponding NSTextField object 1713. The object which sets forth doFocusedResumePdfsForFetche-

```
func doFocusedResumePdfsForFetchedResumeRecordArray(_
theFetchedResumeRecordArray: [FetchedResumeRecord], andFieldInfoArray
theFieldInfoArray: [FieldInfo]) -> [String]
```

As such, the declaration indicates that the method may take a first parameter of type [FetchedResumeRecord], the first parameter having the local parameter name theFetchedResumeRecordArray and no external parameter name. Also indicated by the declaration is that the method may take a second parameter of type [FieldInfo], the second parameter having the local parameter name theFieldInfoArray and the external parameter name andFieldInfoArray. Still further indicated by the declaration is that the method may have a return type of string array.

The implementation of the method may perhaps be viewed as a modification of discussed hereinabove method doFocusedResumePresentationForFetchedResumeRecordArray(_: andFieldInfoArray:) with the following modifications applied. Discussed above were two approaches to doFocusedResumePresentationForFetchedResumeRecordArray(_: andFieldInfoArray:). It is noted that the modifications are applicable to both approaches.

Turning to the modifications, as a first modification the method may as discussed hereinbelow return a string array setting forth URLs from which pdfs may be downloaded. As another modification, where doFocusedResumePresentationForFetchedResumeRecordArray(_: andFieldInfoArray:)

dResumeRecordArray(_: andFieldInfoArray:) (e.g., pdfPresenter) may include properties which provide access to the NSView of FIG. 17, the NSTextFields of FIG. 17, and the NSTextView of FIG. 17, for instance the properties resumePrintView of type NSView which corresponds to the NSView of 1701, rawTtlPrint of type NSTextField which corresponds to the NSTextField 1703, rawKwdPrint of type NSTextField which corresponds to NSTextField 1705, nrmTtlPrint of type NSTextField which corresponds to NSTextField 1707, nrmKwdPrint of type NSTextField which corresponds to NSTextField 1709, decodedExtraDataPrint of type NSTextView which corresponds to NSTextView 1711, and relevancyScorePrint of type NSTextField which corresponds to NSTextField 1713. As examples such properties may be set forth as @IBOutlet properties and/or may be associated with their corresponding GUI objects via Xcode.

Considering the functionality of the at-hand method the following is noted. The method may in an aspect instantiate string array stringArrayToReturn. Then, via for instance a for-in loop (e.g., in a manner including code in line with the pseudocode for presentationFRR in presentationFRRArray), the method may visit each element of the internally-yielded PresentationFetchedResumeRecord array. Within the for-in loop, the method may act to populate the discussed fields of the NSView which will be plied in creating a pdf corresponding to the element of presentationFRRArray presently being visited by the for-in loop. As such, code in line with the following pseudocode may be employed in populating such fields with property values of the visited presentationFRRArray element:

```
rawTtlPrint.attributedStringValue = presentationFRR.rawTtl
rawKwdPrint.attributedStringValue = presentationFRR.rawKwd
nrmTtlPrint.attributedStringValue = presentationFRR.nrmTtl
rawKwdPrint.attributedStringValue = presentationFRR.nrmKwd
decodedExtraDataPrint.textstorage.setAttributedString(presentationFRR.decodedExtraData)
relevancyScorePrint.stringValue = String(presentationFRR.relevancyScore)
```

As such, via code in line with such pseudocode the fields set forth by NSView resumePrintView may be appropriately filled with respect to the at-hand visited resume.

Further in the loop, with NSView resumePrintView appropriately populated, one or more operations may be performed to yield a corresponding pdf. In a first aspect a file name for the to-be-generated pdf may be established. For example, via code in line with the following pseudocode established may be a NSURL object which conveys such a file name as being situated in directory/resumeprint/spool and having a name which starts with the string "printfilenr," continues with a newly-generated UUID string, and ends with extension ".pdf":

```
var newUuidString = NSUUID( ).UUIDString
var localNsurlForPrintSave: NSURL = NSURL(fileURLWithPath: "/resumeprint/spool/printfilenr_\( newUuidString). pdf")
```

Next in pursuit of creation of the pdf, established, via code in line with the following pseudocode, may be NSMutableDictionary object printInfoToUse. As set forth by the pseudocode, creation of printInfoToUse involves leveraging defaults provided by NSPrintInfo.sharedPrintInfo and then setting a value for key NSPrintJobDisposition which conveys that saving to a file is desired, and a value for key NSPrintJobSavingURL which sets forth the discussed pdf save location NSURL:

```
var sharedPrintInfo: NSPrintInfo = NSPrintInfo.sharedPrintInfo( )
var sharedPrintInfoDict: NSMutableDictionary = sharedPrintInfo.dictionary( )
var printInfoToUseDict: NSMutableDictionary = NSMutableDictionary(dictionary: sharedPrintInfoDict)
printInfoToUseDict.setValue(NSPrintSaveJob, forKey: NSPrintJobDisposition)
printInfoToUseDict.setValue(localNsurlForPrintSave, forKey: NSPrintJobSavingURL)
```

Then, the NSMutableDictionary object may be cast as a Swift dictionary swiftPrintInfoToUseDict.

Next, an NSPrintInfo object corresponding to swiftPrintInfoToUseDict may be instantiated via code in line with the pseudocode var printInfo=NSPrintInfo(dictionary: swiftPrintInfoToUseDict). Then, via code in line with the following pseudocode an NSPrintOperation object corresponding to discussed resumePrintView and further to the discussed NSPrintInfo object may be instantiated. Next, by calling runOperation( ) on that NSPrintOperation object a pdf corresponding to the resume presently-visited by the for-in loop may be generated and stored at the file location denoted by localNsurlForPrintSave. As such:

```
var printOperation: NSPrintOperation = NSPrintOperation(view: resumePrintView, printInfo: printInfo)
printOperation.showsPrintPanet = false
printOperation.runOperation( )
```

Noted pdf save directory/resumeprint/spool may correspond to a web-accessible URL portion, for example URL portion http://example.com/resumeprint/spool (e.g., a resume pdf stored at/resumeprint/spool/sampleresume.pdf may be accessible via URL http://example.com/resumeprint/spool/sampleresume.pdf, it being noted that a simplified pdf file name is set forth to facilitate discussion). As such, via code in line with the following pseudocode the loop may act to instantiate a string which conveys such a web-accessible URL allowing access to the just-generated resume pdf, and to append that string to noted stringArrayToReturn:

```
var webAccessibleUrl: String =
"http://example.com/resumeprint/spool/printfilenr_\(newUuidString).pdf"
stringArrayToReturn.append(webAccessibleUrl)
```

Accordingly, via the for-in loop a pdf may be generated for each resume visited via the for-in loop, and stringArrayToReturn may be populated with the web accessible URLs employable in fetching such resume pdfs. Subsequent to the for-in loop, with the desired pdfs generated and stringArrayToReturn appropriately populated, the method may return that array as the result of the method via code in line with the pseudocode return stringArrayToReturn.

As such, stringArrayToReturn may be received by the caller of the method, and therefore by returnPdfResumeUrlsForDocNums(_:). In response to receipt of the array, returnPdfResumeUrlsForDocNums(_:) may pass the array to its caller, to with action method requestQueuedPdfs (_:).

Action method requestQueuedPdfs(_:) may act to, with respect to each element conveyed by stringArrayToReturn, fetch the pdf file specified by that array element and save it at the user device (e.g., such that it may be accessed via pdf viewing functionality of the user device, say via a pdf viewer app). Moreover, the method may, subsequent to such pdf download and at-user-device storing, act to clear property pdfRequestDocNumsSet, thusly readying it for subsequent queuing operations.

Taking stringArrayToReturn to be held by requestQueuedPdfs(_:) as pdfUrlsArray, requestQueuedPdfs(_:) may, for example, implement the just-discussed functionality via code in line with the pseudocode:

```
for pdfUrlString in pdfUrlsArray {
    var webNsUrl: NSURL = NSURL(string: pdfUrlString)
    var urlRequest: NSURLRequest = NSURLRequest(URL: webNsUrl)
    var urlSession: NSURLSession = NSURLSession.sharedSession( )
    var task: NSURLSessionDataTask = urlSession.dataTaskWithRequest(urlRequest,
completionHandler: {(data, response, error) in
        if (error != nil) {print("LOG-ERROR \(error.localizedDescription)")}
        else {
            var localNsUrl: NSURL =
NSFileManager.defaultManager( ).URLsForDirectory(.DocumentDirectory,
inDomains: .UserDomainMask) [0]
            localNsUrl =
localNsUrl.URLByAppendingPathComponent(webNsUrl.lastPathComponent)
            data.writeToURL(localNsUrl, atomically: true)
        }
    })
    task.resume( )
}
pdfRequestDocNumsSet.removeAll
```

With the pdfs thusly saved the user may, as referenced, be able to view them via pdf viewer functionality of the user device.

Although to facilitate discussion resume download (e.g., with relevant highlighting applied thereto) in pdf form has been discussed, download in other formats may alternately or additionally be provided. For example, turning to HTML download the following is noted. Discussed hereinabove in connection with pdf download was, for instance, an NSView with fields in the form of NSTextField and NSTextView objects and population of such fields with appropriate PresentationFetchedResumeRecord property data. In like vein there may be an HTML form document as an analog to the noted NSView, and PresentationFetchedResumeRecord property-corresponding HTML tag pairs in analog to the noted NSTextField and NSTextView objects. From there, the HTML tag pairs may be populated with PresentationFetchedResumeRecord data in analogous vein to the discussed NSTextField and NSTextView population, thusly yielding an HTML formatted resume. The post-population HTML resume may be made available for user device download, and be downloaded by the user device in like vein to the discussed functionality of making resume-corresponding pdf documents available for download, and the discussed functionality regarding client download of such documents. As another example, download in Microsoft Word form may be offered. Such Word-format functionality may, for example, be implemented in a manner analogous to that discussed with respect to HTML download, but with respect to, say, a Word form document (e.g., an XML-based Word form document) rather than an HTML form document and with respect to Word fields (e.g., XML-based Word fields) rather than HTML tag pairs.

According to one or more embodiments, one or more operations may be performed to alter the language of a job seeker's resume so that such language better matches the language set forth by a job listing corresponding to a job to which the seeker desires to apply. With reference to that which is discussed herein, such alteration may be performed in a fashion that endeavors to not introduce any misrepresentations into the seeker's resume. For example, as discussed hereinbelow alterations may stem from normalized data (e.g., normalized keywords and/or normalized titles of the sort discussed herein) found in common between the job listing and the resume. Such stemming from in-common normalized data may serve to aid avoidance of misrepresentation introduction by ensuring that—as is discussed in greater detail herein—a change of a resume phrase to match a job listing phrase can be traced to particular in-common normalized data (e.g., a resume phrase and a job listing phrase may be found to both map to the same in common normalized keyword, and in the resume the resume's phrase may be replaced with the job listing's phrase). It is noted that although to facilitate discussion it is normalized data in the form of normalized keyword data which is generally discussed herein in connection with resume alteration, such is for illustrative purposes only (e.g., normalized title data may alternately or additionally be employed in a fashion analogous to that which is discussed herein in connection with resume alteration and normalized keywords. As another example, alternately or additionally the job seeker may—as discussed herein—be asked to approve all alterations prior to their being made and/or may be able to select from among multiple resume alteration options. Moreover, as yet another example it may alternately or additionally be the case that alteration is made in such a way that an individual reviewing the altered resume is made aware of the alterations made. For instance, associated with an alteration may be a footnote, a selectable link (e.g., hyperlink) hovertext, or the like which leads to explanation of the nature of the alteration. For example, such explanation may convey that a given phrase (e.g., raw keyword) of the resume text was altered and/or may set forth the pre-alteration phrase (e.g., such explanation may set forth language in the vein of "phrase x was, with the help of the system and as approved by the applicant, changed to phrase y" where "x" is the pre-alteration phrase and "y" is the post-alteration phrase.

As noted, resume alterations may stem from normalized data (e.g., normalized keywords) found in common between the job listing and the resume. Normalized data (e.g., normalized keywords) may, as one example, be associated with a job listing by a personnel manager or the like providing the job listing and/or with a resume by a seeker providing the resume (e.g., such personnel manager or job seeker may be provided (e.g., via a GUI) with one or more normalized keywords and/or normalized titles and be invited to select one or more of such normalized keywords and/or normalized titles for association with the job listing or resume. As another example, such association may transpire in an automated fashion and/or a fashion enjoying automated assistance. For instance, as discussed herein in connection with job listing introduction to the system, automated processes may act to yield, say, normalized titles and/or normalized keywords based, for example, on introduced raw titles and/or raw keywords. Via such operation and/or analogous operation, automated functionality may receive raw data (e.g., raw titles and/or raw keywords) of a resume and/or job listing and yield appropriate normalized data (e.g., normalized titles and/or normalized keywords). Such normalized data may be added to the job listing in an automated fashion and/or may (e.g., via a GUI) be presented to a user (e.g., a personnel manager and/or job seeker user) and such user may be able to select some or all of the normalized data (e.g., normalized titles and/or normalized keywords) for inclusion with the resume or job listing. As such, normalized data (e.g., normalized keywords) may—as another example—come to be associated with a resume and/or job listing in an automated and/or automated-assisted manner.

The resume language alteration functionality (e.g., involving the noted in-common-between-job-listing-and-resume normalized data and/or user approval of the resume alteration will now be discussed in greater detail.

Discussed now in connection with FIG. 18 will be method startResumeAdjustmentForResumeWithRawKwds(_: andNormKwds: andJobListingWithRawKwds: andNormKwds:) of a resumeAdjuster object which is an instantiation of a ResumeAdjuster class. The method may be called at phase 1801 (e.g., in connection with a job seeker user applying to a given job listing). As an example, the call may be performed by an applyToJob(_:) method (e.g., an action method) of a jobApplicationConductor object which is an instantiation of a JobApplicationConductor class. The applyToJob(_:) method may, according to one or more embodiments, have access to the JobListingEntityRecord corresponding to the job to which the job seeker user desires to apply and/or the ResumeEntity record corresponding to the job seeker's resume. Method startResumeAdjustmentForResumeWithRawKwds(_: andNormKwds: andJobListingWithRawKwds: andNormKwds:) may have the declaration:

```
func startResumeAdjustmentForResumeWithRawKwds(_ theResumeRawKwds: String,
andNormKwds theResumeNormKwds: String, andJobListingWithRawKwds
theJobListingRawKwds: String, andNormKwds theJobListingNormKwds: String) ->
String.
```

As such the declaration indicates that the method may take a first parameter of type String, the first parameter having the local parameter name theResumeRawKwds and no external parameter name. Further indicated by the declaration is that the method may take a second parameter of type String, the second parameter having the local parameter name theResumeNormKwds and the external parameter name andNormKwds. Also indicated by the declaration is that the method may take a third parameter of type String, the third parameter having the local parameter name theJobListingRawKwds and the external parameter name andJobListingWithRawKwds. Still further indicated by the declaration is that the method may take a fourth parameter of type String, the fourth parameter having the local parameter name theJobListingNormKwds and the external parameter name andNormKwds. Also indicated by the declaration is that the method may have a return type of String.

Passed as the first and second parameters of the call may be, respectively, a string providing raw keywords sourced from the job seeker's resume and a string providing normalized keywords sourced from the job seeker's resume. Such strings may, for example, be drawn respectively from the referenced-herein rawKwd and nrmKwd fields of a ResumeEntity record setting forth the job seeker's resume. In like vein, passed as the third and fourth parameters of the call may be, respectively, a string providing raw keywords drawn from the job listing to which the seeker is applying, and a string providing normalized keywords sourced from the job listing to which the seeker is applying. Such strings may, for example, be sourced—respectively—from the referenced-herein rawKwd and nrmKwd fields of a JobListingEntity record setting forth the job listing to which the user is applying. What is more, available to the method may be the following properties of the resumeAdjuster object:

```
var outletForResumeRawNormCorrelator: RawNormCorrelator
var outletForJobListingRawNormCorrelator: RawNormCorrelator
var setThreshold: Int
```

The outletForResumeRawNormCorrelator property provides access to a RawNormCorrelator object which has been trained to, for instance, provide with respect to resumes raw data correlations for normalized data. The outletForJobListingRawNormCorrelator property provides access to a RawNormCorrelator object which has been trained to, for instance, provide with respect to job listings raw data correlations for normalized data. Such properties may perhaps be set forth as @IBOutlet properties and associated with their corresponding RawNormCorrelator objects via Xcode. RawNormCorrelator objects are discussed in greater detail hereinbelow. The setThreshold may set forth a to-be-discussed threshold employed in to-be-discussed operations. The value of the threshold may as one example be set by a system administrator. As another example such threshold may alternately or additionally be set according to an automated and/or automated-assisted operation of the sort discussed herein (e.g., various threshold values may be employed for certain periods of time and/or with respect to different user groups and the results compared, with the threshold value being one found via such testing to provide acceptable results.

From phase 1801 flow may proceed to phase 1803 where passed-in string parameters theResumeRawKwds, theResumeNormKwds, theJobListingRawKwds, and theJobListingNormKwds may be cast as string arrays. Such functionality may, for instance, be implemented via code in line with the pseudocode:

```
var resumeRawKwdsArray: [String] =
    theResumeRawKwds.componentsSeparatedByString(",")
var resumeNormKwdsArray: [String] =
    theResumeNormKwds.componentsSeparatedByString(",")
var jobListingRawKwdsArray: [String] =
    theJobListingRawKwds.componentsSeparatedByString(",")
var jobListingNormKwdsArray: [String] =
    theJobListingNormKwds.componentsSeparatedByString(",")
```

From phase 1803 flow may proceed to phase 1805 where NSCountedSet joinedNormKwdsCountedSet may be formulated and loaded with the elements of resumeNormKwdsArray and jobListingNormKwdsArray. Such functionality may be set forth via code in line with the pseudocode:

```
var joinedNormKwdsCountedSet = NSCountedSet( )
joinedNormKwdsCountedSet.addObjectsFromArray(resumeNormKwdsArray)
joinedNormKwdsCountedSet.addObjectsFromArray(jobListingNormKwdsArray)
```

In keeping with the Swift/Apple frameworks pseudocode employed herein an NSCountedSet object may provide functionality including on one hand retaining only one copy of a member object even when multiple of that object are passed in, yet on the other hand keeping count of how many of that object were passed in (e.g., where objects A, B, C, and B are passed to an empty NSCountedSet object the members of the set will be three objects: object A, object B, and object C. The counts maintained by the NSCountedSet object will be as follows: one for each of objects A and C, and two for object B.

From phase 1805 flow may proceed to phase 1807 where the method may formulate string set object commonNormKwdsSet (e.g., via code in line with the pseudocode var commonNormKwdsSet: Set<String>=Set<String>( ) and may visit the first normalized keyword of joinedNormKwdsCountedSet. Such visitation may be performed via a for-in loop (e.g., a for-in loop whose code includes code in line with the pseudocode for object in joinedNormKwdsCountedSet.objectEnumerator( ) From phase 1807 flow may proceed to phase 1809 where a determination may be made as to whether or not the object count for the at-hand visited normalized keyword of joinedNormKwdsCountedSet is two. Such functionality may be implemented via code including code in line with the pseudocode if joinedNormKwdsCountedSet.countForObject(object)==2. Where an answer of "yes" is obtained at phase 1809 flow may proceed to phase 1811 where the at-hand visited normalized keyword of joinedNormKwdsCountedSet may be added to commonNormKwdsSet. Such adding functionality may be implemented via code in line with the pseudocode commonNormKwdsSet.insert(object as String).

From either phase 1809 under the circumstance of a "no" determination or from phase 1811 flow may proceed to phase 1813 where a determination may be made as to whether or not there are further normalized keywords in joinedNormKwdsCountedSet. Such determination may be made in connection with the noted for-in loop including joinedNormKwdsCountedSet. Where a determination of "no" is made at phase 1813 flow may proceed to phase 1817. It is noted that subsequent to performance of 1813 and prior to performance of 1817 the at-hand method may instantiate a discussed hereinbelow array object crossoverArray of type [NormToResumeRawAndJobListingRawCrossover].

Where a determination of "yes" is made at phase 1813 flow may proceed to phase 1815 where the method (e.g., in connection with the noted for-in loop involving joinedNormKwdsCountedSet) may visit a subsequent normalized keyword of joinedNormKwdsCountedSet. From phase 1815 flow may return too phase 1809.

Reflecting upon phases 1807-1815 the following is noted. As resumes and job listings are expected (e.g., in keeping with the functionality discussed herein) to set forth a given normalized keyword no more than once, and as joinedNormKwdsCountedSet is passed the normalized keywords of a single resume and a single job listing, a normalized keyword of joinedNormKwdsCountedSet having a set object counter of two is indicative of that normalized keyword being common to both the resume and the job listing (i.e., one copy of the normalized keyword being passed to joinedNormKwdsCountedSet via the resume and one copy of the normalized keyword being passed to joinedNormKwdsCountedSet via the job listing leads to a set object count of two for that normalized keyword). As such, the actions of phases 1807-1815 setting forth common-NormKwdsSet as holding those normalized keywords of joinedNormKwdsCountedSet which have a set object count of two serves to have commonNormKwdsSet set forth those normalized keywords which are set forth both in the resume and in the job listing.

Turning attention to 1817, at phase 1817 the method may visit an initial common-to-resume-and-job-listing normalized keyword of commonNormKwdsSet. Such functionality may transpire in connection with a for-in loop (e.g., a for-in loop including code in line with the pseudocode for commonNormKwd in commonNormKwdsSet. From 1817 flow may proceed to phase 1819 where startResumeAdjustmentForResumeWithRawKwds(_: andNormKwds: andJobListingWithRawKwds: andNormKwds:) may employ discussed hereinabove property outletForResumeRawNormCorrelator in calling, on the RawNormCorrelator object which has been trained with respect to resumes, method returnBucketsProvidingRawCorrelationsForNormWord(_: whereRawWordsAre: withThreshold:). Passed as the first parameter of the call may be the at-hand visited common-to-resume-and-job-listing normalized keyword of commonNormKwdsSet (e.g., commonNormKwd where the noted for-in loop code is set forth). Passed as the second parameter may be resumeRawKwdsArray, the noted string array corresponding to passed-in theResumeRawKwds. Passed for the third parameter may be discussed threshold setThreshold. With reference to the forthcoming in-greater-detail discussion of the returnBucketsProvidingRawCorrelationsForNormWord(_: whereRawWordsAre: withThreshold:) method, received in response to the call of phase 1819 may be tuples which provide indications of those of the resume's raw keywords—as passed in via the second parameter—which may map to the common-to-resume-and-job-listing normalized keyword passed as the first parameter. As discussed in greater detail hereinbelow, the threshold the threshold value passed for the third parameter may serve to dictate that which may perhaps be viewed as the strength of certitude which may be called for in order for the called method to return a given raw keyword as a possible map to the passed-in at-hand normalized keyword. As such, where a lower threshold value is passed the called method may be more lenient as to those raw keywords which is returns as possible maps to the passed-in at-hand normalized keyword, whereas passage of a higher threshold may cause the called method to be more strict as to the raw keywords which it returns. It is observed that passage for the second parameter of the raw keywords set forth by the resume may serve to have the called method in effect indicate which of the resume's raw keywords may map to the passed-in normalized keyword. As an illustration, suppose that the at-hand resume sets forth the raw keywords "java task leadership," "mobile development," "game design experience," and "mobile app developer," and that such was passed for the second parameter of the call. Suppose further that passed for the first parameter of the call was the normalized keyword "scrum leadership-8888," and that setThreshold was passed for the third parameter. Returned in response to the call may be tuples conveying the set-forth-by-the-resume raw keywords "java task leadership" and "mobile app developer" as potential mapping to the passed-in normalized keyword. Moreover, as discussed hereinbelow such tuples may set forth for each such returned keyword that which may be viewed as a strength score conveying the level of certitude with which the method thinks the returned raw keyword to map to the passed-in normalized keyword (e.g., the method may return a higher such strength score with respect to "java task leadership" and a lower such strength score with respect to "mobile app developer." That which is returned in reply to the method call of 1819 may be held in object resumeBuckets. The method call of phase 1819 may for example be implemented via code in line with the pseudocode var resumeBuckets outletForResumeRawNormCorrelator.returnBucketsProvidingRawCorreladonsForNormWord (commonNormKwd, whereRawWordsAre: resumeRawKwdsArray, withThreshold: setThreshold).

From phase 1819 flow may proceed to phase 1821 where startResumeAdjustmentForResumeWithRawKwds(_: andNormKwds: andJobListingWithRawKwds: andNormKwds:) may act in a fashion analogous to that discussed in connection with phase 1819 but with respect to job listing normalized keywords and job listing raw keywords rather than with respect to resume normalized keywords and resume raw keywords as in phase 1819. As such, at phase 1821 startResumeAdjustmentForResumeWithRawKwds(_: andNormKwds: andJobListingWithRawKwds: andNormKwds:) may employ discussed hereinabove property outletForJobListingRawNormCorrelator in calling, on the RawNormCorrelator object which has been trained with respect to job listings, method returnBucketsProvidingRawCorrelationsForNormWord(_: whereRawWordsAre: withThreshold:). As was the case for the call of phase 1819, passed as the first parameter of the call may be the at-hand visited common-to-resume-and-job-listing normalized keyword of commonNormKwdsSet (e.g., commonNormKwd may be passed). As was also the case for the call of 1819, passed for the third parameter may be discussed threshold setThreshold. However, unlike the call of phase 1819 passed for the second parameter may be jobListingRawKwdsArray, the noted string array corresponding to passed-in theJobListingRawKwds.

In analogous fashion to that which was discussed in connection with the call of phase 1819, and with reference to the hereinbelow in-greater-detail discussion of the returnBucketsProvidingRawCorrelationsForNormWord(_: whereRawWordsAre: withThreshold:), received in reply to the call of phase 1821 may be indications of those of the job listing's raw keywords—as passed in via the second parameter—which may map to the common-to-resume-and-job-listing normalized keyword passed as the first parameter. As was the case for the call of phase 1819, and as is discussed in greater detail hereinbelow, the value passed for the third parameter may serve to dictate the strength of the certitude which may be called for in order for the called method to return a given raw keyword as a possible map to the passed-in at-hand normalized keyword.

In analogous vein to the call of phase 1819, it is observed that passage for the second parameter of the raw keywords set forth by the job listing may serve to have the called method in effect indicate which of the job listing's raw keywords may map to the passed-in normalized keyword. As an illustration, suppose that the at-hand job listing sets forth the raw keywords "coding experience," "edutainment programs," "project leader," "arcade game design," and "scrum management skills," and that such was passed for the second parameter of the call. Suppose further that passed for the first parameter of the call was the normalized keyword "scrum leadership-8888", and that setThreshold was passed for the third parameter. Returned in reply to the call may be tuples conveying the set-forth-by-the-job-listing raw keywords "project leader" and "scrum management skills" as potential mappings to the passed-in normalized keyword. Further, akin to that which was discussed in connection with the call of phase 1819, the tuples may set forth for each returned raw keyword a strength score of the sort discussed (e.g., the returned tuples may convey a higher strength score with respect to "scrum management skills" than the strength score conveyed with respect to "project leader."

That which is returned in reply to the method call of 1821 may be held in an object jobListingBuckets. The method call of phase 1821 may for example be implemented via code in line with the pseudocode var jobListingBuckets outletForJobListingRawNormCorrelator.returnBucketsProvidingRawCorrelationsForNormWord(commonNormKwd, whereRawWordsAre: jobListingRawKwdsArray, withThreshold: setThreshold).

From phase 1821 flow may proceed to phase 1823 where startResumeAdjustmentForResumeWithRawKwds(_: andNormKwds: andJobListingWithRawKwds: andNormKwds:) may add to crossoverArray an element which sets forth the at-hand common-to-resume-and-job-listing normalized keyword commonNormKwd, object resumeBuckets which sets forth that which was received in reply to the call of phase 1819, and object jobListingBuckets which sets forth that which was received in reply to the call of phase 1821. As such, the added element may in an aspect set forth possible raw keywords of the at-hand job listing and possible raw keywords of the at-hand resume which may map to the at-hand common-to-resume-and-job-listing normalized keyword. Such functionality may, for example, be set forth via code in line with the pseudocode:

```
if !(resumeBuckets.isEmpty) && !(jobListingBuckets.isEmpty) {
    var elementToAppend: NormToResumeRawAndJobListingRawCrossover = NormToResumeRawAndJobListingRawCrossover( )
        elementToAppend.norm = commonNormKwd
        elementToAppend.resumeRawBuckets = resumeBuckets
        elementToAppend.jobListingRawBuckets = jobListingBuckets
        crossoverArray.append(elementToAppend)
}
```

As set forth by the pseudocode, prior to such element addition a check is made to ensure that both calls to returnBucketsProvidingRawCorrelationsForNormWord(_: whereRawWordsAre: withThreshold:) yielded a non-empty result (i.e., both calls returned at least one potential raw keyword mapping to the passed-in normalized keyword). Class NormToResumeRawAndJobListingRawCrossover may have the definition:

```
class NormToResumeRawAndJobListingRawCrossover {
    var norm: String = ""
    var resumeRawBuckets: [(rawLabel: String, nrmLabel: String, countScore: Int)] = [(rawLabel: String, nrmLabel: String, countScore: Int)]( )
    var jobListingRawBuckets: [(rawLabel: String, nrmLabel: String, countScore: Int)] = [(rawLabel: String, nrmLabel: String, countScore: Int)]( )
}
```

Thus the class definition sets forth a property norm of type string which, as referenced, may set forth a normalized keyword to which an object of class NormToResumeRawAndJobListingRawCrossover applies. The class further sets forth a property resumeRawBuckets and a property jobListingRawBuckets, each of which is of type array of a tuple which sets forth a string named rawLabel, a string named nrmLabel, and an Int named countScore. Such tuple is discussed in greater detail hereinbelow in connection with method returnBucketsProvidingRawCorrelationsForNormWord(_: whereRawWordsAre: withThreshold:). Still, with reference to at least that which was discussed in connection with phases 1819 and 1821, it is noted that such a tuple may thusly set forth—with respect to a resume (e.g., as plied in connection with property resumeRawBuckets) or with respect to a job listing (e.g., as plied in connection with property jobListingRawBuckets—a potential mapping between a raw value (e.g., raw keyword) and a normalized value (e.g., normalized keyword), along with a count score indicative of that which might be viewed as degree of certitude of that potential mapping.

From phase 1823 flow may proceed to phase 1825 where a determination may be made (e.g., in connection with the noted for-in loop) as to whether or not there are further in-common-between-resume-and-job listing normalized keywords in commonNormKwdsSet. Where a determination of "yes" is made flow may proceed to phase 1827 where (e.g., in connection with the noted for-in loop) a subsequent such common normalized keyword may be considered. Where a determination of "no" is made at phase 1825, flow may proceed to phase 1829.

At phase 1829 the at-hand method may in an aspect—say via code including code in line with the pseudocode if !(crossoverArray.isEmpty)—check crossoverArray for emptiness. Such emptiness may transpire where the noted calls to returnBucketsProvidingRawCorrelationsForNormWord (_: whereRawWordsAre: withThreshold:) yield for none of the in-common-between-resume-and-job listing normalized keywords any occurrences of on one hand at least one potential resume raw keyword mapping to that normalized keyword and on the other hand at least one potential job listing raw keyword mapping to that normalized keyword.

Where emptiness is found the method may terminate Where emptiness is not found, the at-hand method may visit each element of crossoverArray (e.g., via a for-in loop which sets forth code including code in line with the pseudocode for crossoverElement in crossoverArray). With each visited element of crossoverArray the at-hand method may proceed as follows. In one aspect the method may (e.g., via code in line with the pseudocode crossoverElement.norm) gain access to the in-common-between-resume-and-job listing normalized keyword to which the visited element of crossoverArray pertains. The method may then (e.g., via applyToJob(_:)) make the job seeker user aware of this in-common normalized keyword. For instance, via a GUI—say via employ of a UILabel—text in the vein of the following may be set forth, where \(crossoverElement.norm) conveys that the user will see the value set forth by crossoverElement.norm:

"normalized keyword \(crossoverElement.norm) is common to both your resume and the job listing corresponding to the job to which you are applying."

Further set forth (e.g., via a GUI and/or a UILabel) may be text in line with the text:

"In the job listing, this normalized keyword appears to map to job listing phrase(s):"

Then, the method may visit each job listing bucket of the jobListingRawBuckets of the at-hand visited element of crossoverArray (e.g., via code including code in line with the pseudocode for jobListingBucket in crossoverElement.jobListingRawBuckets). With respect to each thusly visited job listing bucket the method may make the user aware of the at-hand job listing raw keyword which potentially maps to the at-hand visited in-common-between-resume-and-job listing normalized keyword.

For instance, via a GUI and/or a UILabel text in line with the following may be set forth where, akin to the above, employ of "\(object)" conveys presentation to the user of the value of object:

"\(jobListingBucket.rawLabel), with strength score \(jobListingBucket.countScore)"

In like vein to the aforementioned, the method may further set forth (e.g., via a GUI and/or a UILabel) text in line with the following:

"In your resume, this normalized keyword appears to map to resume phrase(s):"

The method may then, once again in the vein of the aforementioned, visit each resume bucket of the resumeRawBuckets property of the at-hand visited element of crossoverArray (e.g., via code including code in line with the pseudocode for resume Bucket in crossoverElement.resumeRawBuckets. With respect to each thusly visited resume bucket the method may make the user aware of that at-hand resume raw keyword which potentially maps to the at-hand visited in-common-between-resume-and-job listing normalized keyword, as well as a corresponding indication of strength of the sort noted.

For instance, via a GUI and/or a UILabel text in line with the following may be set forth:

"\(resumeBucketrawLabel), with strength score \(resumeBucket.countScore)"

Moreover, the method (e.g., via a GUI, and/or one or more radio buttons and/or UIPicker objects) may allow the user to select one of the above-noted conveyed resume raw keywords. Also the user may be presented (e.g., via a GUI and/or a UILabel) with instructional text in the vein of the following:

"Please select from the resume phrase(s) a phrase, and from the job listing phrase(s) a phrase. The selected phrase from your resume will be replaced with the selected phrase from the job listing. When done please press 'OK.' Should no replacement be desired please press 'No replacement desired.'"

GUI button widgets may be employed to allow the user to indicate "OK" or to exercise the "No replacement desired" option (e.g., UIButtons may be employed). As such, with respect to each in-common-between-resume-and-job listing normalized keyword visited for instance by the noted for-in loop regarding crossoverArray the user may be presented with a GUI in the vein of that set forth by FIG. 19. According to an example, functionality of the sort discussed herein regarding employ of a UIPageViewController object and one or more UIViewControllers may be employed. In particular, for each in-common normalized keyword visited (e.g., via the noted for-in loop) there may be a corresponding UIViewController object conveying widgets and text in the vein of that set forth in FIG. 19. Then—in line with that which is discussed herein above regarding UIPageViewController employ—such UIViewControllers may be under the thrall of a UIPageViewController. As such the job seeker user, by dragging and/or swipe-gesturing, may be able to view the various screens in the vein of that set forth by FIG. 19, each correspond to a different in-common normalized keyword visited by the for-in loop (e.g., the user may by such swiping/dragging be able to—where there are three in-common normalized keywords—select between a FIG. 19-vein screen corresponding to the first in-common normalized keyword, a FIG. 19-vein screen corresponding to the second in-common normalized keyword, and a FIG. 19-vein screen corresponding to the third in-common normalized keyword). According to one or more embodiments, once a user has answered a particular one of the FIG. 19-vein screens by pressing "OK" or "No replacement desired" such screen may be removed from the carousel of screens presented by the page view controller. Once the user has answered all such screens, the GUI querying the job seeker user as to altering the resume with respect to the at-hand job listing may be dismissed.

As an alternative to such UIPageViewController/UIViewController implementation, an HTML and/or JavaScript implementation offering a similar user experience may be implemented. For example, each screen in the vein of FIG. 19 may be presented as a different HTML page with HTML and/or JavaScript elements setting forth the various widgets and text of the figure, and forward and next buttons and/or links may allow the user to navigate between the various such screens corresponding to the one or more in-common normalized keywords.

That which is set forth by FIG. 19—presentation of resume adjustment options with respect to a particular in-common-between-resume-and-job listing normalized keyword—will now be discussed in greater detail. As such, element 1901 may be a GUI text element (e.g., implemented via a UILabel object) which provides explanatory text of the sort noted setting forth the particular in-common normalized keyword being addressed by the screen. Figure elements 1903 and 1905 may be GUI elements (e.g., implemented via UILabel objects which provide explanatory text of the sort noted setting forth—respectively—information about job listing phrases and resume phrases which may potentially map to the particular in-common normalized keyword being addressed by the screen. Figure element 1907 may provide a GUI selection element (e.g., implemented via a UIPicker object and/or one or more radio buttons) which allows the job seeker user to select—in the vein of that which has been discussed—a job listing phrase to be added to the resume as replacement text. Figure element 1909 may provide a GUI selection element (e.g., implemented via a UIPicker object and/or one or more radio buttons) which allows the user to select—in the vein of that which has been discussed—the resume phrase which will be replaced. Figure elements 1911 and 1913 may provide GUI button elements (e.g., implemented via UIButtons) which allow the user to convey the discussed "OK" and "No replacement desired" directives. Figure element 1915 may be a GUI text element (e.g., implemented via a UILabel object) which provides the explanatory text of the sort noted setting forth instructional text for making use of the screen.

Where the job seeker user opts to make none of the offered resume changes no alteration of the user's resume may be performed. Under such a circumstance an empty string may be received as the result of startResumeAdjustmentForResumeWithRawKwds(_: andNormKwds: andJobListingWithRawKwds: andNormKwds:).

Where instead the job seeker user opts to make one or more of the offered resume changes operations may be performed to implement such changes.

In an aspect, further to the discussed ResumeEntity may be an entity having the name AdjustedResumeEntity, such entity having the entity definition:

| Field Name | Data Type |
|---|---|
| docNum | String |
| rawTtl | String |
| rawKwd | String |
| adjustedRawKwd | String |
| nrmTtl | String |
| nrmKwd | String |
| extraData | String |

As such, the AdjustedResumeEntity may have an entity definition like that of ResumeEntity but further including a field adjustedRawKwd. A resume record conforming with the AdjustedResumeEntity definition—like a resume recording conforming with the ResumeEntity definition—may set forth via its rawKwd field, in a comma-delimited fashion, one or more raw keywords of the resume. The AdjustedResumeEntity field adjustedRawKwd may set forth, in a comma-delimited fashion, one or more of the user-elected resume raw keyword alterations of the sort discussed which swap one or more resume raw keywords for believed correlated job listing raw keywords. In particular, the comma delimitation of the AdjustedResumeEntity rawKwd field and the AdjustedResumeEntity adjustedRawKwd field may track each other on a one-to-one comma-delimitation basis such that the nth comma-delimited position of the adjustedRawKwd field may map to the nth comma-delimited position of the rawKwd field. Where the job seeker user has opted to alter a particular resume raw keyword—say the raw keyword set forth at comma-delimited position a of the rawKwd field—comma-delimited position a of the adjustedRawKwd field may set forth the corresponding replacement raw keyword. Where no alteration is to be performed with respect to a particular resume raw keyword—say the raw keyword set forth at comma-delimited position u of the rawKwd field—comma-delimited position u of the adjustedRawKwd field may set forth no characters. As such, the string set forth for the adjustedRawKwd field may indicate a comma character immediately followed by another comma character (i.e., ",," may be included in the string set forth for adjustedRawKwd).

As an illustration, suppose that a rawKwd field set forth the string "operator,logistics shipping,hazmat." Suppose further that a corresponding adjustedRawKwd field set forth the string "cdl driver,,hazardous materials." Proceeding through the comma-delimited positions of the two fields on a one-to-one basis the following is noted. Comma-delimited position 0 of the rawKwd field sets forth "operator" while comma-delimited position 0 of the adjustedRawKwd field sets forth "cdl driver." As such, conveyed by the two fields taken together may convey that existing resume raw keyword "operator" is to be replaced with raw keyword "cdl driver." Turning to comma-delimited position 1, the rawKwd field sets forth "logistics shipping" while the adjustedRawKwd field sets forth an empty string. As such the two fields taken together may convey that existing resume raw keyword "logistics shipping" is to remain unaltered. Turning to comma-delimited position 2, the rawKwd field sets forth "hazmat" while the adjustedRawKwd field sets forth "hazardous materials." As such, conveyed by the two fields taken together may be that existing resume raw keyword "hazmat" is to be replaced with raw keyword "hazardous materials."

As such, where the job seeker user opts to make one or more offered resume changes, startResumeAdjustmentForResumeWithRawKwds(_: andNormKwds: andJobListingWithRawKwds: andNormKwds:) may act to formulate, and return as the result of the method, an adjustedRawKwd string of the sort noted which conveys those changes. Passed to startResumeAdjustmentForResumeWithRawKwds(_: andNormKwds: andJobListingWithRawKwds: andNormKwds:) as its first parameter may be the rawKwd string corresponding to the resume. As discussed, the method produced string array resumeRawKwdsArray by calling componentsSeparatedByString(",") on that first passed-in parameter. Such call yielded an array whose element numbers tracked the comma-delimited position numbers of the passed-in rawKwd string (e.g., element [n] of resumeRawKwdsArray corresponds to comma-delimited position n of the passed-in rawKwd string).

According to one or more embodiments, startResumeAdjustmentForResumeWithRawKwds(_: andNormKwds: andJobListingWithRawKwds: andNormKwds:) may maintain a string array adjustedRawKwdArray whose element numbering tracks the element numbering of resumeRawKwdsArray (e.g., element [n] of resumeRawKwdsArray and element [n] of adjustedRawKwdArray may correspond to the same raw keyword of the resume). For those raw keywords of the resume for which no alteration of the sort discussed herein is offered, the method may place an empty string within the corresponding array element. With respect to those raw keywords of the resume for which alteration of the sort discussed herein is offered the following may transpire. As discussed in connection with the noted GUI operations, the job seeker user may—with respect to each resume raw keyword for which alteration is offered—opt either to swap that resume raw keyword for a particular job listing raw keyword, or to indicate that no alteration is desired. The method may keep track of such selections in adjustedRawKwdArray. In particular, with respect to each such resume raw keyword for which an alteration is offered the method may—in the adjustedRawKwdArray element corresponding to that resume raw keyword—indicate the particular job listing raw keyword which the job seeker has elected, or where the job seeker indicates that no alteration is desired p lance empty string in that array element.

As such, yielded may be an adjustedRawKwdArray in which each element sets forth—with respect to its corresponding resume raw keyword—either: 1) an empty string where either no alteration was offered or where alteration was offered but the user elected not to proceed with the alteration; or 2) where alteration was offered and the user opted to alter, the particular chosen job listing raw keyword to be substituted for the resume raw keyword to which the array element corresponds.

With adjustedRawKwdArray thusly filled, the method may call joinWithSeparator(",") on the array thusly yielding a comma delimited string whose comma delimited position numbering tracks the element numbering of adjustedRawKwdArray—and by extension tracks the comma-delimited numbering of the at-hand resume's rawKwd field string which was passed as the first parameter of the call to startResumeAdjustmentForResumeWithRawKwds(_: and-NormKwds: andJobListingWithRawKwds: and-NormKwds:).

As such, the discussed yielded string provides an appropriate adjustedRawKwd string reflecting the job seeker user's alteration elections. Such adjustedRawKwd string may then be returned as the result of the method.

As such, the yielded adjustedRawKwd string may be received by caller applyToJob(_:). Method applyToJob(_:), as noted, may have access to the ResumeEntity record corresponding to the job seeker's resume. Accordingly applyToJob(_:) may have access to fields of that resume record including the docNum field thereof. Thusly having the docNum field value for the job seeker's resume, and further having received the relevant adjustedRawKwd string for that resume, applyToJob(_:) may act as per the following.

Method applyToJob(_:) may call a method addNewAdjustedResumeRecordBasedOnResumeRecordWithDocNum(_: usingAdjustedRawKwdString:) method of a resumeLibrarian object, an instantiation of a ResumeLibrarian class.

The method may have the declaration:

```
func addNewAdjustedResumeRecordBasedOnResumeRecordWithDocNum(_ theDocNum: String,
    usingAdjustedRawKwdString theAdjustedRawKwdString: String).
```

As such the declaration indicates that the method may take a first parameter of type String, the first parameter have the local parameter name theDocNum and no external parameter name. Also indicated by the declaration is that the method may take a second parameter of type String, the second parameter having the local parameter name theAdjustedRawKwdString and the external parameter name usingAdjustedRawKwdString. Still further conveyed by the declaration is that the method may have no return value.

The method may in an aspect act in the vein of that which is discussed herein with respect to ResumeEntity record retrieval to retrieve the ResumeEntity record corresponding to the document number passed via the method's first parameter. The method may further—in a fashion in the vein of that discussed herein with respect to the storing of JobListingEntity records—create a new AdjustedResumeEntity record. In particular, the created AdjustedResumeEntity record may set forth for its docNum, rawTtl, rawKwd, nrmTtl, nrmKwd, and extraData fields the data which was set forth by the corresponding fields of the retrieved ResumeEntity record. Moreover, the created AdjustedResumeEntity record may set forth for its adjustedRawKwd field that which was passed via the method's second parameter. According to one or more embodiments, the method may—as an alternative to and/or in addition to the noted adjustedRawKwd field placement—alter extraData field occurrences of swapped resume raw keywords to set forth their job listing-sourced replacements (e.g., in keeping with the Swift/Apple frameworks pseudocode employed herein NSRegularExpression method replaceMatchesInString(_: options: range: withTemplate:) may be employed in such alteration of the extraData fields).

The new AdjustedResumeEntity record thusly stored, operations of the sort discussed herein regarding resume display may further act to make use of it. In particular, further to that which is discussed herein such resume display operations may, when tasked with displaying a particular resume, ascertain whether or not there exists an AdjustedResumeEntity record for that resume. As such, in the vein of that which is discussed herein an NSFetchRequest specifying the entity as AdjustedResumeEntity—and additionally setting forth via predicate the at-hand resume document number—may be formulated and executed. Where such action finds that no such corresponding AdjustedResumeEntity record exists resume display may proceed as discussed hereinabove.

Where instead such NSFetchRequest action finds that a corresponding AdjustedResumeEntity record does exist, resume display may proceed as discussed hereinabove but further acting to convey the resume raw keyword changes. In doing so, in one aspect the rawKwd and adjustedRawKwd fields may—in agreement with that which is discussed above—be taken to identify those raw keywords which are subject to alteration. For instance, the contents of the resume's rawKwd field may be loaded into a first string array and the contents of the resume's adjustedRawKwd field may be loaded into a second string array via calling on each string componentsSeparatedByString(","). The two string arrays may be inspected together element-by-element in lockstep (e.g., with a given element [n] of the rawKwd array being considered vis-a-vis element [n] of the adjusted RawKwd array). Where such an inspection finds an empty string for the at-hand adjustedRawKwd array element (e.g., property isEmpty of that element returns true), the corresponding resume raw keyword may be taken to be unchanged. Where instead such inspection finds other than an empty string for the at-hand adjustedRawKwd array element, the raw keyword set forth by the same-numbered element of the rawKwd array may be considered replaced by the noted non-empty string of the adjustedRawKwd array. As one example, where element [a] of such a rawKwd array sets forth "long haul" and element [a] of such an adjustedRawKwd array sets forth "intercity interstate transport," resume raw keyword "long haul" may be considered replaced with "intercity interstate transport." As another example, where element [n] of such a rawKwd array sets forth "interhub shuttling" and element [n] of such an adjustedRawKwd array sets forth an empty string, resume raw keyword "interhub shuttling" may be considered unaltered. As such, the functionality handling resume display may come to know for each resume raw keyword whether or not the keyword is altered, and if so the replacement raw keyword.

Armed with such knowledge, the resume display functionality may act to make the resume-viewing user aware of the changes. As reflected above, such may, for example, involve swapping changed raw keywords with their replacements. Moreover, as referenced above the resume viewer may become aware of the nature of the changes made. For instance, footnotes, clickable links (e.g., hyperlinks), and/or hovertext (e.g., tooltips) may set forth with respect to a resume raw keyword which has been changed from "x" to "y" language in the vein of "changed to 'y' from 'x'" (e.g., "changed to 'intercity interstate transport' from 'long haul'"). Such hovertext may, as examples, be implemented via employ of JavaScript onmouseover and onmouseout events, via employ of a UIPopoverView object, and/or via employ of a UIMenuController object. Such footnotes may as an example be implemented via superscript numbers placed near replaced keywords (e.g., "intercity interstate transport") and corresponding numbered explanatory text placed elsewhere, say towards the side and/or bottom of a resume display area (e.g., "5-changed from 'long haul'").

Discussed hereinabove in connection with startResumeAdjustmentForResumeWithRawKwds(_: andNormKwds: andJobListingWithRawKwds: andNormKwds:) were two properties of type RawNormCorrelator, outletForResumeRawNormCorrelator and outletForJobListingRawNormCorrelator. As noted, the outletForResumeRawNormCorrelator provides access to a RawNormCorrelator object which has been trained to provide with respect to resumes raw data correlations for normalized data. As also noted, the outletForJobListingRawNormCorrelator property provides access to a RawNormCorrelator object which has been trained to provide with respect to job listings raw data correlations for normalized data. As also noted in connection with startResumeAdjustmentForResumeWithRawKwds(_: andNormKwds: andJobListingWithRawKwds: andNormKwds:) was employing those properties to call returnBucketsProvidingRawCorrelationsForNormWord(_: whereRawWordsAre: withThreshold:) on their corresponding resume-trained and job-listing trained RawNormCorrelator objects.

Now discussed in greater detail will be the RawNormCorrelator class which gives rise to RawNormCorrelator objects, including the trainFurtherWithRawArray(_: andNormArray:) method provided thereby which allows for the referenced-hereinabove training (e.g., resume-oriented training and/or job listing-oriented training), and also the referenced-hereinabove returnBucketsProvidingRawCorrelationsForNormWord(_: whereRawWordsAre: withThreshold:) method provided via the class which offers functionality including providing—based on the training—raw data correlations for normalized data.

According to one or more embodiments a requestResumeAndJobListingRawNormCorrelatorsSpawn( ) method of a rawNormCorrelatorConductor object may be called, the object being an instantiation of a RawNormCorrelatorConductor class. The method may, as one example, be called in response to a user request to spawn a RawNormCorrelator object trained in the vein of the above-discussed with respect to resumes and a RawNormCorrelator object trained in the vein of the above-discussed with respect to job listings.

Accordingly, for instance, the method may be an action method activated by a UIButton object. The method may, as another example, be called in an automated fashion (e.g., where an automated process ascertains that spawning of the sort noted, is called for, say based on a determination that spawning has yet to occur and/or that respawning is called for due to an occurrence such as the passage of a certain amount of time).

The method may act to call a to-be-discussed-in-greater-detail method spawnTrainedResumeAndJobListingRawNormCorrelatorObjectsUsingResumeDocNums(_: andJobListingDocNums:) method of a rawNormCorrelatorSpawner object, the object being an instantiation of a RawNormCorrelatorSpawner class. With reference to that which is discussed hereinbelow, the method may take as its first parameter a string array setting forth the document numbers of resumes to be employed in training, and as its second parameter a string setting forth the document numbers of job listings to be employed in training According to one or more embodiments, at the disposal of requestResumeAndJobListingRawNormCorrelatorsSpawn( ) may be a string array setting forth the document numbers of some or all job listings of one or more corpuses, and/or a string array setting forth the document numbers of some or all resumes of one or more corpuses. As an example, requestResumeAndJobListingRawNormCorrelatorsSpawn( ) may, in calling spawnTrainedResumeAndJobListingRawNormCorrelatorObjectsUsingResumeDocNums (_: andJobListingDocNums:), pass as the first parameter some or all elements of the array setting forth resume document numbers, and pass as the second parameter some or all elements of the array setting forth job listing document numbers. As another example, requestResumeAndJobListingRawNormCorrelatorsSpawn( ) may, in making the noted call, pass for the first and second parameters resume and job listing document numbers provided by a user (e.g., via specification of particular such document numbers and/ or via specification of one or more ranges of such document numbers). As an illustration, one or more UITextField objects and/or UIPicker objects may be presented to the user to allow her to specify one or more resume and/or job listing document numbers and/or document number ranges, and requestResumeAndJobListingRawNormCorrelatorsSpawn( ) may act to retrieve user-entered values from such objects, employ such values in formulating resume document number arrays of the sort noted and job listing document number arrays of the sort noted, and employ such formulated arrays as parameters in calling spawnTrainedResumeAndJobListingRawNormCorrelatorObjectsUsingResumeDocNums (_: andJobListingDocNums:).

Method spawnTrainedResumeAndJobListingRawNormCorrelatorObjectsUsingResumeDocNums(_: andJobListingDocNums:) will, in connection with FIG. 20, now be discussed in greater detail. The method may have the declaration:

```
func spawnTrainedResumeAndJobListingRawNormCorrelatorObjectsUsingResumeDocNums (_
theResumeDocNums: [String], andJobListingDocNums theJobListingDocNums: [String])
-> ( resumeCorrelator: RawNormCorrelator, jobListingCorrelator: RawNormCorrelator)
```

As such the declaration indicates that the method may take a first parameter of type string array, the first parameter having the local parameter name theResumeDocNums and no external parameter name. Also indicated by the declaration is that the method may take a second parameter of type string array, the second parameter having the local parameter name theJobListingDocNums and the external parameter name andJobListingDocNums. Still further indicated by the declaration is that the method may return a two component tuple, where both components are of type RawNormCorrelator, where the first component is accessible via the component name resumeCorrelator, and where the second component is accessible via the component name job-ListingCorrelator. Turning to the figure, at phase 2001 the spawnTrainedResumeAndJobListingRawNormCorrelatorObjectsUsingResumeDocNums(_: andJobListingDocNums:) method may be called (e.g., by requestResumeAndJobListingRawNormCorrelatorsSpawn( )). From phase 2001 flow may proceed to phase 2003 where spawnTrainedResumeAndJobListingRawNormCorrelatorObjectsUsingResumeDocNums(_: andJobListingDocNums:) may instantiate RawNormCorrelator object resumeRawNormCorrelator. Such instantiation may be implemented via code in line with the pseudocode var resumeRawNormCorrelator: RawNormCorrelator=RawNormCorrelator( ). From phase 2003 flow may proceed to phase 2005 where the method may visit the first element of theResumeDocNums. Such visitation may be performed in connection with a for-in loop (e.g., a for-in loop set forth via code including code in line with the pseudocode for resumeDocNum in theResumeDocNums).

From phase 2005 flow may proceed to phase 2007 where the method may formulate a fetch request with respect to the at-hand element of theResumeDocNums and may execute the fetch request. In particular the method may first formulate a fetch request which indicates that the retrieved records should comply with the ResumeEntity definition and should further set forth the at-hand element of theResumeDocNums for their docNum fields. The method may then execute that fetch request. Taking the at-hand element of theResumeDocNums to be available via resumeDocNum and the at-hand managed object context to be available via managedObjectContext, the aforementioned may be implemented via code in line with the pseudocode:

```
resumeFetchRequest = NSFetchRequest(entityName: "ResumeEntity")
resumeFetchRequest.predicate = NSPredicate(format: docNum == %@", resumeDocNum)
resumeFetchResult = managedObjectContext.executeFetchRequest(resumeFetchRequest)
```

From phase 2007 flow may proceed to phase 2009 where the method may access the rawKwd and nrmKwd fields yielded via the fetch request of phase 2007. It is noted that, due to the document number set forth by the at-hand element of theResumeDocNums being expected to be unique among ResumeEntity records, the fetch result of phase 2007 is expected to be a single element array setting forth a single record. As such, the access of phase 2009 may be implemented via code in line with the pseudocode:

```
fetchedRawKwd = resumeFetchResult[0].valueForKey("rawKwd")
fetchedNrmKwd = resumeFetchResult[0].valueForKey("nrmKwd")
```

From phase 2009 flow may proceed to phase 2011 where the method may formulate a string array corresponding to the fetched rawKwd field and a string array corresponding to the fetched nrmKwd field (e.g., with the arrays being named, respectively, rawKwdArray and nrmKwdArray. Such array formulation may be implemented via code in line with the pseudocode:

```
rawKwdArray: [String] = fetchedRawKwd.componentsSeparatedByString(",")
nrmKwdArray: [String] = fetchedNrmKwd.componentsSeparatedByString(",")
```

Recalling the comma-delimited nature of ResumeEntity rawKwd and nrmKwd fields, via code in line with the above pseudocode yielded are arrays whose elements track such comma delimitation (i.e., each array element corresponds to a comma delimited position of the string which gave rise to the array).

From phase 2011 flow may proceed to phase 2013 where the method may call trainFurtherWithRawArray(_: andNormArray:) on resumeRawNormCorrelator, passing as the parameters of the call the string arrays formulated via phase 2011. Such may be implemented via code in line with the pseudocode resumeRawNormCorrelator. trainFurtherWithRawArray(rawKwdArray, andNormArray: nrmKwdArray). Flow may then proceed to phase 2014 where spawnTrainedResumeAndJobListingRawNormCorrelatorObjectsUsingResumeDocNums(_: andJobListingDocNums:) may (e.g., via the noted for-in loop) determine whether there are further elements in theResumeDocNums. In the case of a determination of "no" flow may proceed to phase 2017. In the case of a determination of "yes" flow may proceed to phase where the method may (e.g., via the noted for-in loop) proceed to the subsequent element of theResumeDocNums.

At phase 2017 the method may, in the like vein to phase 2003, instantiate RawNormCorrelator object jobListingRawNormCorrelator. Such instantiation may be implemented via code in line with the pseudocode var jobListingRawNormCorrelator:
RawNormCorrelator=RawNormCorrelator( ). Flow may then proceed to phase 2019 where the method may, in the vein of phase 2005, visit the first element of theJobListingDocNums. Such visitation may be performed in connection with a for-in loop (e.g., a for-in loop including code in line with the pseudocode for jobListingDocNum in theJobListingDocNums).

Next, flow may proceed to phase 2021 where the method may, in the vein of phase 2007, formulate a fetch request with respect to the at-hand element of theJobListingDocNums and may execute the fetch request. In particular, the method may first formulate a fetch request which indicates that the retrieved records may comply with the JobListingEntity definition and may further set forth the at-hand element of theJobListingDocNums for their docNum fields. The method may then execute that fetch request. Taking the at-hand element of theJobListingDocNums to be available via jobListingDocNum and the at-hand managed object context to be available via managedObjectContext, the aforementioned may be implemented via code in line with the pseudocode:

```
jobListingFetchRequest = NSFetchRequest(entityName: "JobListingEntity")
jobListingFetchRequest.predicate = NSPredicate(format: "docNum == %@",
jobListingDocNum)
jobListingFetchResult =
managedObjectContext.executeFetchRequest(jobListingFetchRequest)
```

From phase 2021 flow may proceed to phase 2023 where the method may, in the vein of phase 2009, access the rawKwd and nrmKwd fields yielded via the fetch request of phase 2021. It is noted that due to the document number set forth by the at-hand element of theJobListingDocNums being expected to be unique among JobListingEntity records, the fetch request of phase 2021 is expected to be a single element array setting forth a single record. As such the access of phase 2023 may be implemented via code in line with the pseudocode:

```
fetchedRawKwd = jobListingFetchResult[0].valueForKey("rawKwd")
fetchedNrmKwd = jobListingFetchResult[0].valueForKey("nrmKwd")
```

From phase 2023 flow may proceed to phase 2025 where the method may formulate a string array corresponding to the fetched rawKwd field and a string array corresponding to the fetched nrmKwd field (e.g., with the arrays being named, respectively, rawKwdArray and nrmKwdArray). Such array formulation may be implemented via code in line with the pseudocode:

```
rawKwdArray: [String] =
fetchedRawKwd.componentsSeparatedByString(",")
nrmKwdArray: [String] =
fetchedNrmKwd. componentsSeparatedByString(",")
```

Recalling the comma-delimited nature of JobListingEntity rawKwd and nrmKwd fields, via code in line with the above pseudocode yielded may be arrays whose elements track such comma delimitation.

From phase 2025 flow may proceed to phase 2027 where the method may, in the vein of phase 2013, call trainFurtherWithRawArray(_: andNormArray:) on jobListingRawNormCorrelator, passing as the parameters of the call the string arrays formulated via phase 2025. Such may be implemented via code in line with the pseudocode jobListingRawNormCorrelator.trainFurtherWithRawArray(rawKwdArray, andNormArray: nrmKwdArray). Flow may then proceed to phase 2029 where spawnTrainedResumeAndJobListingRawNormCorrelatorObjectsUsingResumeDocNums(_: andJobListingDocNums:) (e.g., via the noted for-in loop) determine whether or not there are further elements in theJobListingDocNums. In the case of a determination of "no" flow may proceed to phase 2033. In the case of a determination of "yes" flow may proceed to phase 2031 where the method may (e.g., via the noted for-in loop) proceed to the subsequent element of theJobListingDocNums.

At phase 2033 the method may act to return, as the result of the method, a tuple providing spawned resumeRawNormCorrelator and spawned jobListingRawNormCorrelator. Such functionality may, for instance, be implemented via code in line with the pseudocode:

```
return (resumeCorrelator: resumeRawNormCorrelator,
    jobListingCorrelator: jobListingRawNormCorrelator).
```

As such the formulated tuple may be returned to requestResumeAndJobListingRawNormCorrelatorsSpawn( ), the caller of spawnTrainedResumeAndJobListingRawNormCorrelatorObjectsUsingResumeDocNums(_: andJobListingDocNums:).

The RawNormCorrelator class, including provided-thereby method trainFurtherWithRawArray(_: andNormArray:) and returnBucketsProvidingRawCorrelationsForNormWord(_: whereRawWordsAre: withThreshold:), will now be discussed in greater detail.

The RawNormCorrelator class may, for instance, be implemented via code in line with the pseudocode:

```
class RawNormCorrelator {
    var buckets: [(rawLabel: String, nrmLabel: String, countScore: Int)] =
[(rawLabel: String, nrmLabel: String, countScore: Int)]( )
    func trainFurtherWithRawArray(_ theRawArray: [String], andNormArray
theNormArray: [String]) {
        for raw in theRawArray {
            for norm in theNormArray {
                if (buckets.filter({($0.rawLabel == raw) && ($0.nrmLabel ==
norm)})).isEmpty {
                    buckets.append((rawLabel: raw, nrmLabel: norm, countScore:
1))
                }
                else {
                    var elementToIncrement = buckets.indexOf({($0.rawLabel ==
raw) && ($0.nrmLabel == norm)})
                    var oldCount = buckets[elementToIncrement].countScore
                    buckets[elementToIncrement].countScore = oldCount + 1
                }
            }
        }
    }
    func returnBucketsProvidingRawCorrelationsForNormWord(_ theNormWord: String,
whereRawWordsAre theRawWords: [String], withThreshold theThreshold: Int) ->
```

```
[(rawLabel: String, nrmLabel: String, countScore: Int)] {
    var arrayToReturn = [(rawLabel: String, nrmLabel: String, countScore:
Int)]( )
      arrayToReturn = buckets.filter({(theRawWords.contains($0.rawLabel)) &&
($0.nrmLabel == theNormWord) && ($0.countScore >= theThreshold)})
      return arrayToReturn
    }
}
```

Firstly discussed in connection with the RawNormCorrelator class will be the reference hereinabove method trainFurtherWithRawArray(_: andNormArray:) provided thereby. Such method may have the declaration:

```
func trainFurtherWithRawArray(_ theRawArray: [String], andNormArray
theNormArray: [String])
```

As such the declaration indicates that the method may take a first parameter of type string array, the first parameter having the local parameter name theRawArray no external parameter name. Also indicated by the declaration is that the method may take a second parameter of type string array, the second parameter having the local parameter name theNormArray and the external parameter name andNormArray. Still further indicated by the declaration is that the method may have no return value.

As set forth by pseudocode, the RawNormCorrelator class imbues objects of the class with the property buckets. The type of the buckets property is that of an array of tuples. In particular, the tuples of the array are the tuple (rawLabel: String, nrmLabel: String, countScore: Int). As such, the tuples each have a first tuple component of type string which is accessible via the name rawLabel, a second tuple component of type string which is accessible via the name nrmLabel, and a third tuple component of type int which is accessible via the name countScore. As will be discussed in connection with FIG. 21, trainFurtherWithRawArray(_: andNormArray:) may cycle through each element (e.g., each raw keyword) of passed in theRawArray and through each element (e.g., each normalized keyword) of passed-in theNormArray. In doing so the method may come to have at hand each possible theRawArray element-theNormArray element pairing (e.g., each possible raw keyword-normalized keyword pairing). A tuple element of property buckets, via its rawLabel and nrmLabel components, may convey such a theRawArray element-theNormArray element pairing (e.g., raw keyword-normalized keyword pairing). As such—and as set forth by the pseudocode and by FIG. 21—the method may, when coming to have such a pairing at hand by virtue of the looping, determine whether or not there exists an element of the buckets property whose rawLabel and nrmLabel components convey that pairing. Where such a bucket element exists the method may increment the value set forth by that element's countScore component. Where no such bucket exists the method may add to the buckets array property a new element whose rawLabel and nrmLabel components convey the at-hand pairing and set the countScore component of that element to 1.

As such, via the action of the method the buckets array property may come to convey counts for all theRawArray element-theNormArray element pairings (e.g., all raw keyword-normalized keyword pairings) arising from passed-in theRawArray and theNormArray.

Then, due to buckets being a property of the instantiated object via which the method runs, the buckets property may persist across multiple calls to the method with their corresponding passing-ins of different raw arrays and norm arrays.

As such, with multiple calls to the method and passages of different raw arrays and norm arrays the countScore components set forth by the buckets property may come to convey which particular pairings (e.g., which particular raw keyword-normalized keyword pairings) have occurred the most times. A particular pairing (e.g., a particular raw keyword-normalized keyword pairing) occurring frequently across multiple runs of the method may be taken as indicative that the components of that pair are correlated (e.g., that the raw keyword of the pair is correlated with the normalized keyword of the pair). A perspective of the logic of this may be illustrated by the following example. Suppose that there were a multitude of documents which set forth three Arabic numerals and the corresponding English words for those numerals, but that such a document offers no guidance as to which of the set forth Arabic numerals maps to which of the English words (e.g., a given element may set forth the Arabic numerals "3," "12," and "50" and the words "fifty," "three," and "twelve" in that which might be viewed as a jumbled fashion). However, given a large set of such documents with such document setting forth different numbers valid mapping (e.g., "50" and "fifty") may be expected to occur more frequently as intradocument pairs across the data set than other intradocument pairs.

As such, by employing the method to train a resume-oriented RawNormCorrelator object by calling the method multiple times—each time passing raw keywords and normalized keywords drawn from a particular resume—resume correlations between raw keywords and normalized keywords may be found (e.g., it may be ascertained that raw keyword "omniplan experience" is correlated with normalized keyword "project management software-2509 for resumes). In like vein, by employing the method to train a job listing-orientated RawNormCorrelator object by calling trainFurtherWithRawArray(_: andNormArray:) multiple times—each time passing raw keywords and normalized keywords drawn from a particular job listing—job listing correlations between raw keywords and normalized keywords may be found.

Turning to FIG. 21, at phase 2101 trainFurtherWithRawArray(_: andNormArray:)—as set forth by a particular RawNormCorrelator object (e.g., one corresponding to resumes or one corresponding to job listings)—may be called. From phase 2101 flow may proceed to phase 2103 where the first element of passed-in theRawArray may be visited by the method. Such visitation may occur via a for-in loop (see, for instance, the above pseudocode including "for raw in theRawArray"). From phase 2103 flow may proceed to phase 2105 where the method may visit the first element of passed-in theNormArray. Such visitation may likewise occur via a for-in loop (see, for instance, the above pseudocode including "for norm in theNormArray").

Next, flow may proceed to phase 2107 where determination may be made as to whether or not there exists a bucket corresponding to the at-hand raw and the at-hand norm. Such functionality may be achieved via code in line with the above pseudocode's setting forth of if (buckets.filter({ ($0.rawLabel==raw) && ($0.nrmLabel==norm)})) .isEmpty—where raw conveys the currently-visited element of theRawArray and norm conveys the currently-visited element of theNormArray—which evaluates to true where no such bucket exists.

Where a determination of "no" is made at phase 2105 flow may proceed to phase 2109 where added to array property buckets may be a new bucket element corresponding to the at-hand raw and the at-hand norm. Such functionality may be achieved via code in line with the above pseudocode's setting forth of buckets.append((rawLabel: raw, nrmLabel: norm, countScore: 1)).

Where a determination of "yes" is made at phase 2107 flow may proceed to phase 2111 where countScore for the existing bucket may be incremented, thusly memorializing that the raw-norm pair to which that bucket corresponds has again been encountered. Such functionality may be implemented via code in line with the above-placed pseudocode:

```
var elementToIncrement = buckets.indexOf({($0.rawLabel ==
raw) && ($0.nrmLabel == norm)})
var oldCount = buckets[elementToIncrement].countScore
buckets[elementToIncrement].countScore = oldCount + 1
```

From either phase 2109 or phase 2111 flow may proceed to phase 2113 where a determination may be made as to whether or not there are further norms in theNormArray. Such may transpire in connection with a for-in loop (e.g., the noted for-in loop regarding theNormArray). Where a determination of "no" is yielded flow may proceed to phase 2117. Where a determination of "yes" is yielded flow may proceed to phase 2115 where the subsequent norm in theNormArray may be visited (e.g., in connection with the noted for-in loop regarding theNormArray). From phase 2115 flow may return to phase 2107.

Turning to phase 2117, a determination may be made as to whether or not there are further raws in theRawArray. Such determination may be made in connection with the noted for-in loop regarding theRawArray. Where a determination of "yes" is made at phase 2117 flow may proceed to phase 2119 where the subsequent raw in theRawArray may be visited (e.g., in connection with the noted for-in loop regarding theRawArray).

Where a determination of "no" is made at phase 2117 flow may proceed to phase 2121. At phase 2121 flow may terminate. However, as referenced hereinabove, the buckets property of the at-hand RawNormCorrelator object may persist, for example being further altered via subsequent calls to the trainFurtherWithRawArray(_: andNormArray:) method of that object.

Discussed hereinabove in connection for instance with FIG. 18 was RawNormCorrelator-provided method returnBucketsProvidingRawCorrelationsForNormWord(_: whereRawWordsAre: withThreshold:). For example, discussed in connection with phase 1819 was calling this method on a RawNormCorrelator object which has been trained via method trainFurtherWithRawArray(_: andNormArray:) with respect to resumes. As another example, discussed in connection with phase 1821 was calling returnBucketsProvidingRawCorrelationsForNormWord(_: whereRawWordsAre: withThreshold:) on a RawNormCorrelator object which has been trained via method trainFurtherWithRawArray(_: andNormArray:) with respect to job listings. This method will now be discussed in greater detail.

As set forth by the above pseudocode, the method may have the declaration:

```
func returnBucketsProvidingRawCorrelationsForNormWord(_
theNormWord: String, whereRawWordsAre theRawWords: [String],
withThreshold theThreshold: Int) -> [(rawLabel: String, nrmLabel: String,
countScore: Int)]
```

As such the declaration indicates that the method may take a first parameter of type String array, the first parameter having the local parameter name theNormWord and no external parameter name. Further indicated by the declaration is that the method may take a second parameter of type string array, the second parameter having the local parameter name theRawWords and the external parameter name whereRawWordsAre. Still further indicated by the declaration is that the method may take a third parameter of type int, the third parameter having the local parameter name theThreshold and the external parameter name withThreshold. Also indicated by the declaration is that the method may have a return type of [(rawLabel: String, nrmLabel: String, countScore: Int)]. As such the method returns an array of tuples where the tuples of the array are the tuples discussed hereinabove, for instance, in connection with RawNormCorrelator property buckets.

With an eye towards the placed-hereinabove pseudocode for this method, it is observed that such pseudocode includes:

```
var arrayToReturn = [(rawLabel: String, nrmLabel: String,
countScore: Int)]( )
arrayToReturn = buckets.filter({(theRawWords.contains($0.rawLabel))
&& ($0.nrmLabel == theNormWord) && ($0.countScore >=
theThreshold)})
return arrayToReturn
```

Via the first of the above three lines, object arrayToReturn—which sets forth an array of (rawLabel: String, nrmLabel: String, countScore: Int) tuples—may be instantiated. Via the second of the three lines a filter method is called upon the buckets property of the at-hand RawNormCorrelator object (e.g., one trained as discussed with respect to resumes or one trained as discussed above with respect to job listings). By virtue of the above-listed parameters passed in the filter call, the filter method returns an array which contains only those tuple elements of property buckets whose rawLabel component sets forth one of the strings of passed-in string array theRawWords, whose nrmLabel component sets forth the string specified by passed-in theNormWord, and whose countScore component sets forth a value meeting or exceeding passed-in theThreshold. The via the third pseudocode line of the above the array yielded by the filter call is returned as the result of the method. Bearing in mind that which has been discussed herein, the array returned by the method may perhaps be viewed as conveying those of passed-in raw words (e.g., raw keywords) which may be correlated with the passed-in norm word (e.g., normalized keyword) as regulated by the threshold.

Discussed hereinabove is the presence of comma delimitation within rawKwd and rawTtl fields of ResumeEntity and JobListingEntity records. Now discussed will be functionality by which such rawKwd and rawTtl fields may come to possess such comma delimitation. Among such discussed functionality will be functionality by which believed particular phrases (e.g., particular keywords) may be recognized within rawKwd field-destined text or rawTtl field-destined text and thereby subjected to comma delimitation. As an illustration, suppose the rawKwd field-destined text "hazmat driving interhub sprints long haul." Via the to-be-discussed functionality each of "hazmat driving," "interhub sprints," and "long haul" might be identified as a raw keyword, thus allowing for comma-delimited rawKwd field text of "hazmat driving, interhub sprints, long haul." It is noted that the rawKwd field-destined or rawTtl field-destined text (e.g., "hazmat driving interhub sprints long haul") may represent text which has been retrieved from the entirety of or a portion of a resume or job listing (e.g., a skills or duties section) and then subject to removal of punctuation and/or of keywords sourced from a list of words considered to be filler words (e.g., conjunctions and words such as "a," "an," and "the").

In particular, discussed-herein method trainFurtherWithString(_: forWindowSize:) may be employed to train a to-be-discussed PhraseDeterminer object with various input text, while to-be-discussed method returnOrderedPhrasesArrayForThreshold(_:) may be employed to retrieve from the thusly-trained object a string array of which each element is a multiword phrase which the object, due to its training, believes to constitute a likely phrase. The array elements may, will be explained, be ordered according to how strongly the object believes each element to constitute a phrase. As will be discussed herein, the operation of trainFurtherWithString(_: forWindowSize:) moves through the text of the passed-in string employing a windows of a certain size. As an illustration, for the input text "hazmat driving interhub sprints long haul" and a window size of two, moving through may cause the method to consider the strings "hazmat driving," "driving interhub," "interhub sprints," "sprints long," and "long haul." In the vein of discussed hereinabove trainFurtherWithRawArray(_: andNormArray:), with respect to each of the considered strings the method may see if a bucket exists for that string (e.g., whether or not a bucket exists for "hazmat driving" or for "sprints long"). Where such a bucket does not exist such a bucket may—in the vein of trainFurtherWithRawArray(_: andNormArray:)—be created and have its count score set to an appropriate initial value. Where such a bucket does exist the count score for the bucket may—in thee vein of trainFurtherWithRawArray(_: andNormArray:) be incremented by an appropriate value. As such,—and again in the vein of that which is discussed hereinabove in connection with trainFurtherWithRawArray(_: andNormArray:)—given a multitude of differing input text valid phrases (e.g., "hazmat driving") may be expected to appear more often than invalid phrases (e.g., "sprints long"). As such oftenness of appearance may be reflected in bucket countScore values, the examination of bucket countScore values may allow recognition of likely phrases (e.g., the bucket for "hazmat driving" may be expected to set forth a higher countScore than the bucket for "sprints long." As discussed hereinbelow, the text employed for training may include various texts which may be expected to set forth job-related phrases (e.g., resumes, job listings, job-related books, and/or job-related periodicals).

The aforementioned functionality (e.g., the operation of method trainFurtherWithString(_: forWindowSize:) will now be discussed in greater detail. It is noted that to facilitate discussion discourse will focus on the rawKwd field although applicability of the noted functionality is wider than this (e.g., the functionality may be applied with respect to the rawTtl field.

According to one or more embodiments a requestPhraseDeterminerSpawn( ) method of a phraseDeterminerConductor object may be called, the object being an instantiation of a PhraseDeterminer class. As referenced, the text employed for training of a PhraseDeterminer object may include various texts which may be expected to set forth job-related phrases. Such documents may, as an example, be stored in a manner akin to other storage discussed herein (e.g., in a database such as a Core Data-managed database). Further akin to the discussed-herein storage, such employed-for-training documents may be records compliant with one or more entity definitions. As an example, resumes employed as training documents may comply with the entity definition:

| Field Name | Data Type |
| --- | --- |
| docNum | String |
| docText | String |

Such entity may be given the name RawResumeEntity. The docNum field may, in the vein of the above-discussed, set forth a UUID (e.g., one generated via code in line with the pseudocode NSUUID( ).UUIDString. The docText field may set firth the entity of a resume. According to one or more embodiments resume text may be subject to certain processing prior to placement in such a docText field (e.g., removal of punctuation and/or removal of words which exist in a list of words considered to be filler words—say conjunctions and words such as "a," "an," and "the." It is noted that a resume set forth via a RawResumeEntity record may be viewed as differing from a resume set forth via a ResumeEntity record by, for instance, not setting forth comma delimitation and/or fields (e.g., rawKwd and nrmKwd), and instead setting forth the entirety of the resume—perhaps as subjected to the noted preprocessing—in a single docText field.

As another example, the job listings, job-related books, and job-related periodicals employed as training documents may, respectively, comply with RawJobListingEntity, RawJobBookEntity, and RawJobPeriodicalEntity definitions. Such entity definitions may be like that of the discussed RawResumeEntity—setting forth a docNum string field (e.g., setting forth a UUID) and a docText field of the sort discussed—but differ therefrom by setting forth a different entity name With reference to that which is discussed herein, such setting forth of differing entity names may facilitate, for instance, Core Data framework functionality—of the Swift/Apple frameworks pseudocode employed herein—by which records complying with differing entity definitions may be held in different stores (e.g., such that employed-for-training resumes, job listings, job-related books, and/or job-related periodicals may be held in differing stores, with the Core Data frameworks directing Core Data operations to appropriate stores in view of the entity types to which such operations are applied) Akin to the docText field of a RawResumeEntity for-training resume record, the docText field of a RawJobListingEntity for-training job listing record may set forth the entirety of a job listing, the docText field of a RawJobBookEntity for-training book record may set forth the entirety of a job-related book, and/or the docText field of a RawJobPeriodicalEntity for-training periodical record may set forth the entirety of a job-related periodical. Likewise to that which was discussed in connection with the RawResumeEntity, such docText fields may be subjected to preprocessing (e.g., removal of punctuation, and/or removal of words which exist in a list of words considered to be filler words—say conjunctions and words such as "a," "an," and "the"). It is noted that a job listing set forth via a RawJobListingEntity record may be viewed as differing from a job listing set forth via a JobListingEntity record for instance by not setting forth comma delimitation and/or multiple fields (e.g., rawKwd and nrmKwd) and instead setting forth the entirety of the job listing—perhaps as subjected to the noted preprocessing—via a single docText field. The requestPhraseDeterminerSpawn( ) method may—as will be discussed—make reference to the RawResumeEntity, RawJobListingEntity, RawJobBookEntity, and/or RawJobPeriodicalEntity in calling to-be-discussed spawnTrainedPhraseDeterminerObjectUsingDocumentsOfEntityNameDocNumTuples(_:).

Further regarding requestPhraseDeterminerSpawn( ), such method may, as one example, be called in response to a user request to spawn a PhraseDeterminer object trained with particular documents (e.g., particular resumes, job listings, job-related books, and/or job-related periodicals). As such the method may, for example, be an action method activated via a UIButton object. The method may, as another example, be called in an automated fashion (e.g., where an automated process ascertains that spawn of the PhraseDeterminer object is called for, say based on a determination that such a spawning has yet to occur and/or that respawning is called for due to an occurrence such as passage of a certain amount of time). As referenced above, requestPhraseDeterminerSpawn( ) may call spawnTrainedPhraseDeterminerObjectUsingDocumentsOfEntityNameDocNumTuples(_:), a method of a phraseDeterminerSpawner, object the object being an instantiation of a PhraseDeterminerSpawner class. Although this method is discussed in greater detail hereinbelow, it is noted at this juncture that the method may take as its sole parameter an array of tuples, where the tuples of the array are as per (entityName: String, docNums: [String]). As such, each tuple of the array may be employed to set forth via its entityName component a name of one of the noted training document-related entity definitions (e.g., set forth via the entityName component of a given tuple of the array may be the string "RawResumeEntity," the string "RawJobListingEntity," the string "RawJobBookEntity," or the string "RawJobPeriodicalEntity"). Further as such, each tuple of the array may be employed to set forth via its docNums component the document numbers of the particular documents of the tuple-specified entity type which are to be employed in training. As an illustration, such a tuple of the array might set forth the string "RawJobPeriodicalEntity" for its entityName component and the string array ["ABC123," "XYZ456," "MRZ509"] for its docNums component, such tuple of the array thereby conveying that included among the documents employed in training may be the RawJobPeriodicalEntity record with the docNum "ABC123," the RawJobPeriodicalEntity record with the docNum "XYZ456," and the RawJobPeriodicalEntity record with the docNum "MRZ509." It is noted that, to facilitate discussion, foreshortened document numbers are set forth in the foregoing rather than, say, UUIDs.

According to one or more embodiments, at the disposal of requestPhraseDeterminerSpawn( ) may be a string array setting forth the document numbers of some or all RawResumeEntity records of one or more corpuses, a string array setting forth the document numbers of some or all RawJobListingEntity records of one or more corpuses, a string array setting forth the document numbers of some or all RawJobBookEntity records of one or more corpuses, and/or a string array setting forth the document numbers of some or all RawJobPeriodicalEntity records of one or more corpuses. As one example, requestPhraseDeterminerSpawn( ) may, in calling spawnTrainedPhraseDeterminerObjectUsingDocumentsOfEntityNameDocNumTuples(_:), include in the passed array one or more of a tuple setting forth for its entityName component the string "RawResumeEntity" and for its docNums component a string array setting forth some or all elements of the noted array setting forth corpus RawResumeEntity record document numbers, a tuple setting forth for its entityName component the string "RawJobListingEntity" and for its docNums component a string array setting forth some or all elements of the noted array setting forth corpus RawJobListingEntity record document numbers, a tuple setting forth for its entityName component the string "RawJobBookEntity" and for its docNums component a string array setting forth some or all elements of the noted array setting forth corpus RawJobBookEntity record document numbers, and a tuple setting forth for its entityName component the string "RawJobPeriodicalEntity" and for its docNums component a string array setting forth some or all elements of the noted array setting forth corpus RawJobPeriodicalEntity record document numbers.

As another example, requestPhraseDeterminerSpawn( ) may, in calling spawnTrainedPhraseDeterminerObjectUsingDocumentsOfEntityNameDocNumTuples(_:), include in the passed array one or more tuples setting forth user-provided entity names (e.g., "RawJobListingEntity") and corresponding user-provided document numbers. Such user-provided document numbers may flow from user provision of one or more particular document numbers and/or user provision of one or more ranges of document numbers.

As an example, one or more UITextField objects and/or UIPicker objects may be presented to the user to allow her to specify one or more of the training document entity names (e.g., RawResumeEntity) and corresponding particular document numbers and/or ranges of document numbers. It is noted that, according to one or more embodiments, such user selection of training document entity names may involve the user being presented with that which may perhaps be viewed as user-friendly characterization of a training document entity name (e.g., a UIPicker object may set forth text indications such as "resume records," "job listing records," "books," and/or "periodicals" rather than, say, text indications such as "RawResumeEntity," "RawJobListingEntity," "RawJobBookEntity," and/or "RawJobPeriodicalEntity").

Method requestPhraseDeterminerSpawn( ) may act to retrieve user-entered values from such UITextField and/or UIPicker objects, employ such values in formulating (entityName: String, docNums: [String]) tuples, loading those tuples into an array, and employing that array as the sole parameter in a call to spawnTrainedPhraseDeterminerObjectUsingDocumentsOfEntityNameDocNumTuples(_:).

Method spawnTrainedPhraseDeterminerObjectUsingDocumentsOfEntityNameDocNumTuples(_:) will, in connection with FIG. 22 now be discussed in greater detail. The method may have the declaration:

```
func spawnTrainedPhraseDeterminerObjectUsingDocumentsOfEntityNameDocNumTuples(_
theEntityNameDocNumTuples: [(entityName: String, docNums: [String])] ->
PhraseDeterminer
```

As such the declaration indicates that the method may take a single parameter which has no external parameter name but which has the local parameter name theEntityNameDocNumTuples, the single parameter being of type tuple array, where each tuple of the array has a component named entityName which sets forth a String and a component named docNums which sets forth a string array. Also indicated is that the method may have a return type of PhraseDeterminer. The PhraseDeterminer class is discussed in greater detail hereinbelow.

Turning to FIG. 22, at phase 2201 the spawnTrainedPhraseDeterminerObjectUsingDocumentsOfEntityNameDocNumTuples(_:) may be called. From phase 2201 flow may proceed to phase 2203 where the method may instantiate object phraseDeterminerToReturn. Such instantiation may be implemented via code in line with the pseudocode var phraseDeterminerToReturn: PhraseDeterminer=PhraseDeterminer( ). From phase 2203 flow may proceed to phase 2205 where the method may visit the first element of theEntityNameDocNumTuples. Such visitation may be performed in connection with a for-in loop (e.g., a for-in loop set forth via code including code in line with the pseudocode for entityNameDocNumTuple in theEntityNameDocNumTuples).

From phase 2205 flow may proceed to phase 2207 where the method may visit the first element of the docNums component of the at-hand element of theEntityNameDocNumTuples. Such visitation may be performed in connection with a for-in loop (e.g., a for-in loop set forth via code including code in line with the pseudocode forDocNum in entityDocNumTuple.docNums).

From phase 2207 flow may proceed to phase 2209 where the method may formulate a fetch request with respect to the at-hand element of the docNums component of the at-hand element of theEntityNameDocNumTuples and nay execute the fetch request. In particular, the method may first formulate a fetch request which indicates that records should comply with the entity definition set forth by the entityName tuple component of the at-hand visited element of theEntityNameDocNumTuples, and that such retrieved records should further set forth for their docNum fields the at-hand visited element of the array of the at-hand docNums tuple component. The method may then execute the fetch request. Taking the at-hand entity name to—for instance via the noted for-in loop regarding theEntityNameDocNumTuples—be available via entityDocNumTuple.entityName, the at-hand document number to—for instance via the noted for-in loop regarding entityDocNumTuple.docNums—be available via docNum, and the at-hand managed object context be available via managedObjectContext, the aforementioned may be implemented via code in line with the pseudocode:

```
trainingDocumentFetchRequest = NSFetchRequest(entityName:
entityDocNumTuple.entityName)
trainingDocumentFetchRequest.predicate = NSPredicate(format:
docNum == %@", docNum)
trainingDocumentFetchResult =
managedObjectContext.executeFetchRequest(trainingDocumentFetchRequest)
```

From phase 2209 flow may proceed to phase 2211 where the method may access the docText field yielded via the fetch request of phase 2209. It is noted that, due to the document number set forth by the fetch request being expected to be unique among those records which comply with the particular entity definition referenced by the fetch request, the fetch request of phase 2209 may be expected to be a single element array setting forth a single record. As such, the access of phase 2211 may be implemented via code in line with the pseudocode:

fetchedDocText=trainingDocumentFetchResult[0].valueForKey("docText")

From phase 2211 flow may proceed to phase 2213 where the method may call trainFurtherWithString(_: forWindowSize:) on phraseDeterminerToReturn, passing the noted docText field string value as the first parameter and 2 as the second parameter. As referenced above this method may move through the text of the passed-in string employing a window of the passed-in size. The setting forth here of such passed window size being two is for illustrative purposes only and other values may be employed. For example, in the vein of that which is discussed herein such value of the call of phase 2213 may be set by a system administrator. As another example, likewise in the vein of that which is discussed herein such value of the call of phase 2213 may be set in an automated and/or automated assist fashion (e.g., in the vein of that which is discussed herein certain window values may be employed for certain periods of time and/or with respect to certain user pools and then selected may be the window size which yielded the most appropriate result.

From phase 2213 flow may proceed to phase 2215 where spawnTrainedPhraseDeterminerObjectUsingDocumentsOfEntityNameDocNumTuples(_:) may call trainFurtherWithString(_: forWindowSize:) on phraseDeterminerToReturn, passing the noted docText field string value as the first parameter and 3 as the second parameter. The setting forth here of the passed window size being three is for illustrative purposes and other values may be employed. As examples, in line with that which was discussed in connection with phase 2213 such window size value may be set by a system administrator, and/or in an automated and/or automated assist fashion. It is observed that according to one or more embodiments the automated and/or automated assist window size selection discussed in connection with phase 2213 and the automated and/or automated assist window size selection discussed in connection with this phase may operate in concert (e.g., certain values of window size for phase 2213 and certain values of window size for phase 2215 may, as testing pairs, be employed for certain periods of time and/or with respect to certain user pools, and the testing pair which provides the most appropriate result may be plied with respect to phases 2213 and 2215. It is noted that according to one or more embodiments the window size employed for phase 2213 may differ from the window size employed for phase 2215.

From phase 2215 flow may proceed to phase 2217 where spawnTrainedPhraseDeterminerObjectUsingDocumentsOfEntityNameDocNumTuples(_:) may (e.g., via the for-in loop regarding entityDocNumTuple.docNums) determine whether or not there are further elements in the docNums component of the at-hand element of theEntityNameDocNumTuples. In the case of a determination of "yes" flow may proceed to phase 2219. In the case of a determination of "no" flow may proceed to phase 2221.

At phase 2219 the method may proceed to the subsequent element of the docNums component of the at-hand element of theEntityNameDocNumTuples. Such may transpire in connection with a for-in loop (e.g., the for-in loop regarding entityDocNumTuple.docNums). From phase 2219 flow may return to 2209.

At phase 2221 the method may (e.g., in connection with the for-in loop regarding theEntityNameDocNumTuples) determine whether or not there are further elements in theEntityNameDocNumTuples. In the case of a determination of "yes" flow may proceed to phase 2223. In the case of a determination of "no" flow may proceed to phase 2225 (e.g., in connection with the for-in loop regarding theEntityNameDocNumTuples).

At phase 2223 the method may (e.g., in connection with the for-in loop regarding theEntityNameDocNumTuples) proceed to the subsequent element of theEntityNameDocNumTuples. Flow may then return to phase 2207.

At phase 2225—reached under the circumstance of a determination of "no" at phase 2221—the method may act to return, to its caller, spawned phraseDeterminerToReturn. Such functionality may be implemented via code in line with the pseudocode return phraseDeterminerToReturn.

The PhraseDeterminer class, including provided-thereby methods trainFurtherWithString(_: forWindowSize:) and returnOrderedPhrasesArrayForThreshold(_:), will now be discussed in greater detail. The phrase determiner class may, for instance, be implemented via code in line with the pseudocode:

```
class PhraseDeterminer {
    var buckets: [(unifiedLabel: String, windowSize: Int, countScore: Double)] = [(unifiedLabel: String, windowSize: Int, countScore: Double)]( )
    func trainFurtherWithString(_ theString: String, forWindowSize theWindowSize: Int) {
        var theStringAsArray = theString.componentsSeparatedByString(" ")
        var multiplier: Double
        switch theWindowSize {
        case 2: multiplier = 1
        case 3: multiplier = 1.25
        default: multiplier = 1
        }
        for var i = 0; i <= (theStringAsArray.count - theWindowSize); i += 1 {
            var currentLabel = String( )
            for offset in 0...(theWindowSize-1) {
                currentLabel.appendContentsOf(" \(theStringAsArray[(i+offset)])")
            }
            currentLabel = currentLabel.stringByTrimmingCharactersInSet(NSCharacterSet.whitespaceCharacterSet( ))
            if (buckets.filter({$0.unifiedLabel == currentLabel})).isEmpty {
                buckets.append((unifiedLabel: currentLabel, windowSize: theWindowSize, countScore: (1 * multiplier)))
            }
            else {
                var elementToIncrement = buckets.indexOf({$0.unifiedLabel == currentLabel})
                var oldCount: Double = buckets[elementToIncrement].countScore
                buckets[elementToIncrement].countScore = oldCount + (1 * multiplier)
            }
        }
    }
    func returnOrderedPhrasesArrayForThreshold(_ theThreshold: Double) -> [String] {
        var arrayToReturn: [String] = [String]( )
        var bucketsMeeetingThreshold = buckets.filter({($0.countScore >= theThreshold)})
        var orderedBucketsMeetingThreshold = bucketsMeeetingThreshold.sort({$0.countScore > $1.countScore})
        arrayToReturn = orderedBucketsMeetingThreshold.map({$0.unifiedLabel})
        return arrayToReturn
    }
}
```

As set forth by the pseudocode, the PhraseDeterminer class imbues objects of the class with the property buckets. The type of the buckets property is that of array of tuples. In particular the tuples of the array are the tuple (unifiedLabel: String, windowSize: Int, countScore: Double). As such the tuples each have a first tuple component of type string which is accessible via the name unifiedLabel, a second tuple component of type Int which is accessible via the name windowSize, and a third tuple component of type Double which is accessible via the name countScore. As noted above and as discussed hereinbelow, the method may move through the text of passed-in theString employing a window of a word size as per passed-in theWindowSize. As an illustration, where theString is "hazmat driving interhub springs long haul" and theWindowSize is 2 the method may consider the strings "hazmat driving," "driving interhub," "interhub sprints," "sprints long," and "long haul." With respect to each of the window-ensnared strings—"hazmat driving," "driving interhub," "interhub sprints," "sprints long," and "long haul" in the foregoing example—the method may, as is discussed hereinbelow, check as to whether or not a tuple element of array property buckets exists which sets forth via its unifiedLabel component that window-ensnared string (e.g., where the at-hand window-ensnared string is "interhub sprints" the method may check whether any tuple element of array property buckets sets forth "interhub sprints" via its unifiedLabel component). As discussed hereinbelow, where such a bucket tuple element exists the countScore component of that bucket tuple element may be incremented (e.g., by a value which takes into account the at-hand window size). Where such a bucket tuple element does not exist, a new bucket tuple element may be added to the array property buckets, the new tuple element setting forth the at-hand window ensnared string (e.g., "interhub sprints" for its unifiedLabel component, the at-hand window size for its windowSize component, and a window-size-dependent initial value for its countScore component).

Due to buckets being a property of the at-hand instantiated PhraseDeterminer object, buckets may persist across multiple calls to trainFurtherWithString(_: forWindowSize:) with such calls passing differing training text (e.g., resumes, job listings, job-related-books, and job-related-periodicals). As referenced, given a multitude of differing such training text, valid phrases (e.g., "hazmat driving") may be expected to appear more often than invalid phrases (e.g., "sprints long"). Such more frequent appearance of valid phrases may be ascertainable via inspection of the countScore values set forth by persisting-across-calls array property buckets (e.g., the tuple element of persistent property buckets whose unifiedLabel component sets forth "hazmat driving" may set forth a higher value for its countScore component than the countScore set forth by the tuple element whose unifiedLabel component sets forth "sprints long").

In keeping with this, discussed hereinbelow method returnOrderedPhrasesArrayForThreshold(_:) may in an aspect examine the countScore components set forth by the tuples of persistent array property buckets in view of passed-in theThreshold so as to prepare and return to its caller a string array of which each element is a multiword phrase which—based on such countScore component consideration and such consideration of theThreshold—appears to be a valid phrase.

Method trainFurtherWithString(_: forWindowSize:) will now be discussed in greater detail in connection with FIG. 23.

The method may have the declaration:

```
func trainFurtherWithString(_ theString: String, forWindowSize
  theWindowSize: Int)
```

As such the declaration indicates that the method may take a first parameter of type String, the first parameter having the local parameter name theString and no external parameter name. Also indicated by the declaration is that the method may take a second parameter of type Int, the second parameter having the local parameter name theWindowSize and the external parameter name forWindowSize. Still further indicated by the declaration is that the method may have no return value.

Turning now to phase 2301, at phase 2301 trainFurtherWithString(_: forWindowSize:) may be called. From phase 2301 flow may proceed to phase 2303 which may cast passed in theString as an array. As set forth by the above pseudocode such may be implemented via code in line with the pseudocode var theStringArray=theString.componentsSeparatedByString(" ").

From phase 2303 flow may proceed to phase 2305 where the method may set multiplier in view of passed-in theWindowSize. Such may be implemented via code in line with the above-set pseudocode:

```
switch theWindowSize {
  case 2: multiplier = 1
  case 3: multiplier = 1.25
  default: multiplier = 1
}
```

It is noted that the set forth potential window sizes and corresponding multiplier values are for illustrative purposes and other such values may be employed (e.g., via—in the vein of the above-discussed—system administrator setting, and/or automated and/or automated assist setting). From phase 2305 flow may proceed to phase 2307 and then to phase 2309, with phase 2307 setting index i to zero and phase 2309 checking whether or not i<=(theStringAsArray.count−theWindowSize). Such functionality may be implemented via code in line with the portion of the above-set pseudocode:

for var i=0; i<=(theStringAsArray.count−theWindowSize); i+=1

Where a determination of "yes" is made flow may proceed to phase 2311. Where a determination of "no" is made flow may proceed to phase 2327 where the method may terminate but—as referenced above—property buckets may persist. It is noted that the referenced for loop functionality may serve to allow the method to progress through the text corresponding to the passed-in string in a manner which is savvy as to window size (e.g., not allowing loop cycling to proceed to the point that some or all of the window would exceed the upper end of theStringAsArray).

Turning to phase 2311, it is noted that phases 2311-2317 may serve to build a window-ensnared string—of the sort discussed—with respect to passed-in theWindowSize and the current progression point through theStringAsArray as per index i. Such functionality may be implemented via code in line with the following of the above pseudocode:

```
for offset in 0...(theWindowSize-1) {
    currentLabel.appendContentsOf(" \(theStringAsArray[(i+offset)])")
}
currentLabel =
currentLabel.stringByTrimmingCharactersInSet(NSCharacterSet.whitespaceCharacterSe
t( ))
```

As set forth by the above pseudocode, currentLabel is built up by adding to currentLabel each word ensnared by the current window position (e.g., where theString is "pastry baking cooking tarts icing application," theWindowSize is two, and the current window position ensnares "cooking tarts," the above code may act to build up currentLabel as "cooking tarts"). The pseudocode including a call to stringByTrimmingCharactersInSet(_:) serves to ensure that currentLabel is devoid of extraneous space characters.

Where the determination set forth at phase 2315 returns "yes" flow may proceed to phase FPS-17 to, in keeping with the above pseudocode, progress to the next member of range 0 . . . (theWindowSize-1). Where the determination set forth at phase 2315 returns "no," flow may proceed to phase 2319 where the method acts to ascertain whether buckets contains a tuple element whose unifiedLabel sets forth currentLabel. Where a determination of "yes" is made at phase 2319 flow may proceed to phase 2321 where the method may add to array property buckets a new tuple element whose unifiedLabel component is set to currentLabel, whose windowSize component is set to passed-in theWindowSize, and whose countScore component is set to 1*multiplier. Such may serve to implement the above-discussed functionality of creating a new bucket for an at-hand window-ensnared string where such bucket does not exist. Where a determination of "no" is made at phase 2319 flow may proceed to phase 2325 where the method may increment the existing tuple element's countScore component by (1*multiplier).

The discussed of phases 2319, 2321, and 2325 may be implemented via the following of the above-set pseudocode:

```
if (buckets.filter({$0.unifiedLabel == currentLabel})).isEmpty {
    buckets.append((unifiedLabel: currentLabel, windowSize:
theWindowSize, countScore: (1 * multiplier)))
}
    else {
    var elementToIncrement = buckets.indexOf({$0.unifiedLabel ==
currentLabel})
    var oldCount: Double =
buckets[elementToIncrement].countScore
    buckets[elementToIncrement].countScore = oldCount + (1 *
multiplier)
}
```

From either phase 2321 or phase 2325 flow may proceed to phase 2323 where index i may be incremented. Such may occur in connection with the above-discussed for loop. From phase 2323 flow may return to phase 2309. As referenced, where a determination of "yes" is made at phase 2309 flow may proceed to phase 2311. And where a determination of "no" is made flow may proceed to phase 2327 where the method may terminate but array property buckets may persist (e.g., to be plied in connection with further calls to trainFurtherWithString(_: forWindowSize:) or a call to returnOrderedPhrasesArrayForThreshold(_:)).

Method returnOrderedPhrasesArrayForThreshold(_:) will now be discussed in greater detail. As referenced this method may in an aspect examine, in view of passed-in theThreshold, the countScore components set forth by the tuples of persistent array property buckets of the at-hand PhraseDeterminer object. Doing so the method may prepare and return to its caller a string array of which each element is a multiword phrase which—based on such countScore component consideration and such consideration of theThreshold—appears to be a valid phrase.

The method may have the declaration:
   func    returnOrderedPhrasesArrayForThreshold(_theThreshold: Double)→[String]

As such the declaration indicates that the method may take a sole parameter of type Double, the sole parameter having the local parameter name theThreshold and no external parameter name. Also indicated by the declaration is that the method may return a string array.

Method returnOrderedPhrasesArrayForThreshold(_:) may as an example be called by an automated process that determines that there is call for requesting the ordered phrases array to be returned from a given trained PhraseDeterminer object. As one example, such automated process may monitor for the return of a new PhraseDeterminer object by spawnTrainedPhraseDeterminerObjectUsingDocumentsOfEntityNameDocNumTuples(_:) and upon such object return call returnOrderedPhrasesArrayForThreshold(_:) on that object. As another example such automated process may make the returnOrderedPhrasesArrayForThreshold(_:) call where that automated process determines that an ordered phrases array has yet to be requested with respect to a given PhraseDeterminer object.

The threshold value passed in calling returnOrderedPhrasesArrayForThreshold(_:) (e.g., passed by the action of the automated process) may be selected in a number of ways. As examples, in the vein of the above discussed such threshold value may be selected by a system administrator, and/or in an automated and/or automated assist fashion (e.g., with different threshold values being employed for different periods of time and/or with respect to different user pools and selecting as the threshold to employ for the noted call to returnOrderedPhrasesArrayForThreshold(_:) a threshold value which yielded positive testing results).

With an eye towards the above-placed pseudocode for returnOrderedPhrasesArrayForThreshold(_:), it is noted that such pseudocode includes:

```
var arrayToReturn: [String] = [String]( )
var bucketsMeeetingThreshold = buckets.filter({($0.countScore >=
theThreshold)})
var orderedBucketsMeetingThreshold =
bucketsMeeetingThreshold.sort({$0.countScore > $1.countScore})
arrayToReturn =
orderedBucketsMeetingThreshold.map({$0.unifiedLabel})
return arrayToReturn
```

Via the first of these lines string object arrayToReturn may be instantiated. Via the second of these lines a filter method is called upon the buckets property of the PhraseDeterminer object which sets forth the method. By virtue of the parameter passed for the filter call the filter call returns an array which contains only those tuple elements of property buckets whose countScore component sets forth a value higher than or equal to passed-in theThreshold.

Then via the third of these lines a sort method is called upon bucketsMeeetingThreshold as yielded by the preceding line. By virtue of the above-listed parameter passed in the sort call, the sort method returns an array similar to that of bucketsMeeetingThreshold but with a likely different ordering. In particular, according to such likely different ordering tuple elements of the array are sorted according to their countScore component properties, with tuple elements setting forth higher countScore values appearing earlier in the array (i.e., with lower index numbers) than tuple elements setting forth lower countScores).

Finally, in the fourth of these lines a map method is called upon object orderedBucketsMeetingThreshold as yielded by the preceding line. Considering the map method, it is observed that, by virtue of the above-listed parameter passed in the map call, returned by the map call may be a string array setting forth the unifiedLabel components of the tuples of orderedBucketsMeetingThreshold. Also in the fourth line the result of the map method is returned as the result of returnOrderedPhrasesArrayForThreshold(_:).

With method returnOrderedPhrasesArrayForThreshold (_:) having the yielded the discussed string array—a string array of which each element is a multiword phrase which the corresponding PhraseDeterminer object considers due to its training to constitute a likely phrase, the elements of the array being ordered according to tuple countScore and thusly ordered as to how strongly the training suggest each phrase thereof to constitute a valid phrase—that string array may be plied in causing rawKwd and/or rawTtl fields of job listing records and/or resume records to set forth the discussed comma delimitation.

In particular, discussed will be method returnCommaDelimitedForString(_: forOrderedPhrases:) of a commaD-elimiter object, the object being an instantiation of a CommaDelimiter class. The method may take in a string via its first parameter (e.g., a string intended to be employed for a rawKwd field or a rawTtl field) and via its second parameter a ordered phrase string array of the sort noted, and return to its caller a comma-delimited version of the passed-in string. The comma delimitation may be such that comma delimitation highlights in the input string instances of the input string setting forth a multiword phrase of the intaken string array. Words of the input string which are found to belong to no phrase of the intaken list may be highlighted via comma delimitation as standalone words. Moreover, comma delimitation may heed of the discussed rank ordering of the intaken list. Such rank-respecting functionality may come into play, for example, where certain words of the input string are potentially mappable to more than one phrase of the ordered list; according to the rank-respecting comma delimitation functionality deference may be given to the potential mapping which corresponds to a highest of the ranked possibilities. As an illustration, suppose an input string "intercity interstate transport logistics hazmat flammable owner operator mountainous terrain driving interhub sprints" and a ranked phrase array ["logistics hazmat flammable," "interhub sprints," "intercity interstate transport," "logistics hazmat," "cdl driver"]. As to the rank-respecting comma delimitation functionality, it is noted that substring "logistics hazmat flammable" of the input string is potentially mappable to either "logistics hazmat flammable" or "logistics hazmat." Moreover, according to the rank-respecting functionality deference is given to higher ranking "logistics hazmat flammable."

More generally, for the circumstance of the above example's intaken string and intaken ordered phrase string array, the string returned by the method may be "intercity interstate transport, logistics hazmat flammable, owner, operator, mountainous, terrain, driving, interhub sprints." Considering the output string the following is noted. As one aspect, higher-ranking listed phrase "logistics hazmat flammable" is highlighted via comma delimitation thusly trumping lower-ranking listed phrase "logistics hazmat." As another aspect, listed phrases "intercity interstate transport" and "interhub sprints" receive comma delimitation. In a further aspect input string words "owner," "operator," "mountainous," "terrain," and "driving" receive comma delimitation as standalone words due to their belonging to no phrase of the ordered list. In yet a further aspect listed phrase "cdl driver" is not found in the input string. Method returnCommaDelimitedForString(_: forOrderedPhrases:) will now be discussed in greater detail.

Method returnCommaDelimitedForString(_: forOrderedPhrases:) may have the declaration:

```
func returnCommaDelimitedForString(_ theString: String,
    forOrderedPhrases theOrderedPhrases: [String]) -> String
```

As such, indicated by the declaration is that the method may take a first parameter of type string, the first parameter having the local parameter name theString and no external parameter name. Also indicated by the declaration is that the method may take a second parameter of type string array, the second parameter having the local parameter name theOrderedPhrases and the external parameter name forOrderedPhrases. Still further indicated by the declaration is that the method may have a return type of string.

The method may be implemented via code in line with the pseudocode:

```
func returnCommaDelimitedForString(_ theString: String, forOrderedPhrases
theOrderedPhrases: [String]) -> String {
    var nsMutableTheString = NSMutableString(string: theString)
    var stringToReturn: String = String( )
    for orderedPhrase in theOrderedPhrases {
        var regexOrderedPhrase = NSRegularExpression(pattern: orderedPhrase,
options: [ ])
        var scarabOrderedPhrase: String =
orderedPhrase.stringByReplacingOccurrencesOfString(" ", withString: "¤")
        scarabOrderedPhrase = "¤\(scarabOrderedPhrase)¤"
        regexOrderedPhrase.replaceMatchesInString(nsMutableTheString, options:
[ ], range: NSMakeRange(0, nsMutableTheString.length), withTemplate:
scarabOrderedPhrase)
    }
    stringToReturn = String(nsMutableTheString)
```

-continued

```
    var arrayOfStringToReturn = stringToReturn.componentsSeparatedByString(" ")
    arrayOfStringToReturn =
arrayOfStringToReturn.map({$0.stringByReplacingOccurrencesOfString("¤",
withString: " ")})
    arrayOfStringToReturn =
arrayOfStringToReturn.map({$0.stringByTrimmingCharactersInSet(NSCharacterSet.whit
espaceCharacterSet( ))})
    stringToReturn = arrayOfStringToReturn.joinWithSeparator(",")
    return stringToReturn
}
```

The method will now be discussed in connection with FIG. 24. At phase 2401 the method may be called. As one example the call may be made by discussed herein method resumesAndStoreForNewJobListing( ) prior to its discussed call to addNewJobListingRecordForResumeRawTtl(_: andRawKwd: andNrmTtl: andNrmKwd: andExtraData:). More particularly, rather than resumesAndStoreForNewJobListing( ) directly passing one of the jobListingTitle, StrippedJobTitle, and theOmnibusStringArray properties of the conductor object as the first parameter of the call, resumesAndStoreForNewJobListing( ) may pass such property of the conductor object and the at-hand ordered list in a call to returnCommaDelimitedForString(_: forOrderedPhrases:). Then resumesAndStoreForNewJobListing( ) may pass the string received in reply to that call as the first parameter in calling addNewJobListingRecordForResumeRawTtl(_: andRawKwd: andNrmTtl: andNrmKwd: andExtraData:). In like vein, rather than resumesAndStoreForNewJobListing( ) directly passing the jobListingBalance property of the conductor object (e.g., setting forth a qualifications and duties subportion of the at-hand job listing) as the second parameter in calling addNewJobListingRecordForResumeRawTtl(_: andRawKwd: andNrmTtl: andNrmKwd: andExtraData:), resumesAndStoreForNewJobListing( ) may pass jobListingBalance and the at-hand ordered list in a call to returnCommaDelimitedForString(_: forOrderedPhrases:). Then resumesAndStoreForNewJobListing( ) may pass the string received in reply to that call as the second parameter in calling addNewJobListingRecordForResumeRawTtl(_: andRawKwd: andNrmTtl: andNrmKwd: andExtraData:). As another example, a method or process other than resumesAndStoreForNewJobListing( ) may—instead of directly passing to addNewJobListingRecordForResumeRawTtl(_: andRawKwd: andNrmTtl: andNrmKwd: andExtraData:) a given first string for the first parameter or a given second string for the second parameter—act in the vein of the just discussed to process via a call akin to the above to returnCommaDelimitedForString(_: forOrderedPhrases:) and pass the result of that call onto addNewJobListingRecordForResumeRawTtl(_: andRawKwd: andNrmTtl: andNrmKwd: andExtraData:). As a further example, analogous functionality may be employed with respect to a method for storing resumes which acts in analogous fashion to addNewJobListingRecordForResumeRawTtl(_: andRawKwd: andNrmTtl: andNrmKwd: andExtraData:).

From phase 2401 flow may proceed to phase 2403 where returnCommaDelimitedForString(_: forOrderedPhrases:) may visit the first element of theOrderedPhrases. Such may occur in connection with the employ of a for-in loop (e.g., a for-in loop including code in line with the portion of the above-set pseudocode which sets forth for orderedPhrase in theOrderedPhrases).

From phase 2403 flow may proceed to phase 2405 where the method may instantiate, in keeping with the Swift/Apple frameworks pseudocode employed herein, NSRegularExpression object regexOrderedPhrase which corresponds to the at-hand element of theOrderedPhrases. Such functionality may be implemented via code in line with the portion of the above-set pseudocode which sets forth NSRegularExpression(pattern: orderedPhrase, options: [ ]). With reference to that which is discussed hereinbelow, a NSRegularExpression object provides functionality including search and replace functionality via its replaceMatchesInString(_: options: range: withTemplate:) method.

From phase 2405 flow may proceed to phase 2407 where returnCommaDelimitedForString(_: forOrderedPhrases:) may formulate object scarabOrderedPhrase which corresponds to the at-hand element of theOrderedPhrases but with a special character (e.g., "¤," Unicode 00A4 known by names including "scarab" and "universal currency") placed at the start of the string of the at-hand element, at the end of the string of the at-hand element, and interword with respect to the string of the at-hand element. As an illustration, for an at-hand element of theOrderedPhrases of "intercity interstate transport" and a replacement character of "¤" (scarab), the instantiated object yielded by phase may be "¤ intercity¤ interstate¤ transport¤ ." Such functionality may be implemented via code in line with the portion of the above-placed pseudocode which sets forth:

```
    var scarabOrderedPhrase: String =
orderedPhrase.stringByReplacingOccurrencesOfString(" ",
withString: "¤")
    scarabOrderedPhrase = "¤\(scarabOrderedPhrase)¤"
```

From phase 2407 flow may proceed to phase 2409 where the method may employ the replaceMatchesInString(_: options: range: withTemplate:) method of NSRegularExpression object regexOrderedPhrase in searching the intaken string for the at-hand element of theOrderedPhrases, where hits are replaced with above-discussed scarabOrderedPhrase. Such functionality may be implemented via code in lien with the portion of the above-placed pseudocode which sets forth regexOrderedPhrase.replaceMatchesInString(nsMutableTheString, options: [ ], range: NSMakeRange(0, nsMutableTheString.length), withTemplate: scarabOrderedPhrase). With reference to the above set pseudocode of var nsMutableTheString=NSMutableString (string: theString) which casts intaken theString as an NSMutableString object, it is noted that the just-noted call on regexOrderedPhrase passes nsMutableTheString as the first parameter to indicate the string which is the target of search-and-replace, passes [] as the second parameter to indicate that no options are desired, passes the result yielded by the indicated call to NSMakeRange() as the third parameter to convey that the entirety of nsMutableTheString is to be searched, and passes scarabOrderedPhrase as the fourth parameter to indicate that hits are to be replaced with scarabOrderedPhrase.

Reflecting upon the functionality of phase 2409 the following is noted. Discussed above is an example of return-CommaDelimitedForString(_: forOrderedPhrases:) receiving an input string of "intercity interstate transport logistics hazmat flammable owner operator mountainous terrain driving interhub sprints" and a ranked phrase array ["logistics hazmat flammable," "interhub sprints," "intercity interstate transport," "logistics hazmat," "cdl driver"]. As discussed above although "logistics hazmat flammable" of the input string is potentially mappable to either "logistics hazmat flammable" or "logistics hazmat," according to the discussed rank-respecting functionality deference is given to higher-ranking phrase "logistics hazmat flammable." The functionality set forth in connection with phrases 2405-2409 implements such rank-respecting operation as per the following. Explaining by way of example with respect to the above-noted passed-in string and passed-in ranked phrase array, due to "logistics hazmat flammable" appearing earlier in the ranked phrase array than "logistics hazmat" the journey of the method (e.g., via a for-in loop) through the array may visit "logistics hazmat flammable" before visiting "logistics hazmat." According to the noted search and special character (e.g., "⌑"/scarab) placement with respect to hits, the portion of the passed-in string setting forth "logistics hazmat flammable" may become "a logistics⌑ hazmat ⌑ flammable⌑ ." As such when the journey of the method through the passed-in ranked phrase array (e.g., via the for-in loop) later takes it to the phrase "logistics hazmat" the following may transpire. Phase 2409 may look for "logistics hazmat" in the as-modified passed-in string as it stands at that point in time. In particular, as referenced the as-modified passed-in string may at that point in time include "⌑ logistics⌑ hazmat⌑ flammable" rather than initially set forth "logistics hazmat flammable." Due to the presence of the scarab characters, the operation searching for the string "logistics hazmat" may fail (e.g., "logistics⌑ hazmat" may not satisfy a search for "logistics hazmat." As such, in keeping with the at-hand rank-respecting functionality, the passed-in string may receive comma delimitation highlighting with respect to "logistics hazmat flammable" rather than with respect to "logistics hazmat."

From phase 2409 flow may proceed to phase 2411 where returnCommaDelimitedForString(_: forOrderedPhrases:) may (e.g., in connection with the noted for-in loop) determine whether or not there are further elements in theOrderedPhrases. Where a determination of "yes" is made flow may proceed to phase 2413 where the method may (e.g., in connection with the noted for-in loop) proceed to the subsequent element of theOrderedPhrases. From phase 2413 flow may return to phase 2405.

Where a determination of "no" is made at phase 2411 flow may proceed to phase 2415. At phase 2415 the method may formulate object arrayOfStringToReturn which corresponds to the as-modified intaken string. Such functionality may be implemented via code in-line with the above-set pseudocode:

```
stringToReturn = String(nsMutableTheString)
var arrayOfStringToReturn =
   stringToReturn.componentsSeparatedByString(" ")
```

By virtue of the call to componentsSeparatedByString(_:) being passed a space character (" ") as the sole parameter of the call, an array may be formed out of stringToReturn with the indicated space character being employed as the delimiter in mapping string portions to array elements. As such, each element of formulated arrayOfStringToReturn may be either a scarab-marked found phrase of the ordered list or a word which is not part of a found phrase of the ordered list. As an illustration, taking the as-modified intaken string to—in reflection of the discussed herein functionality—set forth "⌑ intercity⌑ interstate⌑ transport⌑ ⌑ logistics ⌑ hazmat⌑ flammable⌑ owner operator mountainous terrain driving ⌑ interhub⌑ sprints⌑ " formulated arrayOfStringToReturn may set forth ["⌑ intercity⌑ interstate ⌑ transport⌑ ", "⌑ logistics⌑ hazmat⌑ flammable⌑ ", "owner", "operator", "mountainous", "terrain", "driving", "⌑ interhub⌑ sprints⌑ "].

From phase 2415 flow may proceed to phase 2417 where returnCommaDelimitedForString(_: forOrderedPhrases:) may remove scarab characters and extra whitespace from the elements of arrayOfStringToReturn. Such functionality may be implemented via code in line with the pseudocode:

```
arrayOfStringToReturn =
arrayOfStringToReturn.map({$0.stringByReplacingOccurrencesOfString("⌑",
withString: " ")})
arrayOfStringToReturn =
arrayOfStringToReturn.map({$0.stringByTrimmingCharactersInSet(NSCharacterSet.whit
espaceCharacterSet( )})
```

From phase 2417 flow may proceed to phase 2419 where the method may formulate a string corresponding to arrayOfStringToReturn, and may return that formulated string as the result of the method. Such functionality may be implemented via code in line with the following portion of the above-placed pseudocode:

```
stringToReturn = arrayOfStringToReturn.joinWithSeparator(",")
return stringToReturn
```

In keeping with the passage of a comma character (",") in the call to joinWithSeparator(_:), returned may be a comma delimited string of the sort discussed herein where comma delimitation highlights in the passed-in string found phrases of the passed-in phrases list and standalone words which belong to no phrase of the ordered list, the highlighting respecting the scored-based order of the phrase list.

As an illustration, continuing with the above example of arrayOfStringToReturn as ["⌑ intercity⌑ interstate ⌑ transport⌑ ", "⌑ logistics⌑ hazmat⌑ flammable⌑ ", "owner", "operator", "mountainous", "terrain", "driving", "⌑ interhub⌑ sprints⌑ "], returned by the method may be intercity interstate transport,logistics hazmat flammable, owner,operator,mountainous,terrain,driving,interhub sprints.

According to one or more embodiments a headhunter user may be presented with a user interface by which she may specify information regarding one or more job opportunities and one or more job seeker users that are to each receive an email which serves to inform the seeker recipient of the jobs and to allow the seeker recipient to apply to those jobs, providing a cover letter in doing so. In particular the seeker recipient may be able to apply to the email-indicated jobs by replying to the email, the body of the reply email being used to convey the cover letter. As discussed herein, according to one or more embodiments the seeker may alternately or additionally be able to apply via executable code (e.g., JavaScript) set forth in the body of the email which she receives.

Returning to the user interface provided to the headhunter user, the user interface may in one aspect allow the headhunter to specify the job opportunities to be broadcasted by specifying the document numbers of the corresponding JobListingEntity records. In another aspect the user interface may allow the headhunter user to specify for each of those job opportunities a corresponding description. As illustrations, such corresponding description may include explanatory text (e.g., "Meteor Corp—Product Manager. Go anywhere, do anything with this one") and/or one or more URLs regarding the opportunity (e.g., www.example.com/meteor-corpjobs/productmanager).

Still further, the user interface may allow the headhunter user to specify information regarding the seekers to be informed. In one aspect the user interface may allow the headhunter user to specify the particular job seekers to receive the opportunities information by, as one example, specifying the document numbers of the ResumeEntity records corresponding to those seekers. As another example, the headhunter user may be able to specify the job seekers to receive the opportunities information by selecting (e.g., via a GUI) those users from a list of users. As yet another example the headhunter user may be able to specify the job seekers to receive the opportunities information by specifying (e.g., via a GUI) one or more criteria. For instance, the headhunter user may be able to specify held job titles, cities of residence, and/or skills, and job seekers meeting the specified criteria may become the specified job seekers. As an illustration, where the headhunter user specified as criteria "software engineer," "Boston, MA," and "javascript," job seekers having resumes and/or profiles agreeing with such criteria may come to be the specified job seekers who receive the opportunity information.

In another aspect the user interface may allow the headhunter user to specify for each of those seekers a corresponding name to be employed in addressing the seeker (e.g., "Richard," "Rich," "Richard Johnson," or "Mr. Johnson") and a corresponding email address to be employed in sending the job announcement email to the user (e.g., jojo@example.org).

As an example, the user interface presented to the headhunter user may be associated with method doStartSeekerJobListingReach(_:) of a reachUi object, the reachUi object being an instantiation of a ReachUi class. The method may have the declaration:

func doStartSeekerJobListingReach(_sender: AnyObject)

As such the declaration indicates that the method may take a first parameter of type AnyObject, the first parameter having the local parameter name sender and no external parameter name. Also indicated by the declaration is that the method may have no return value. The method may be set forth as an action method (e.g., being preceded by @IBAction). The method may be called via action of a GUI widget (e.g., action of a UIButton object may serve to call the method. The method may when activated obtain from the user interface headhunter-user provided information of the sort indicated—say one or more job listing document numbers, one or more job listing descriptions, one or more resume document numbers corresponding to to-be-contacted seekers, one or more provisions of seeker name information, and/or one or more seeker emails addresses—and employ that information in calling to-be-discussed method reachEachOfSeekers(_: withJobListings:) of a reachConductor object, an instantiation of a ReachConductor class. As discussed herein reachEachOfSeekers(_: withJobListings:) may take as its first parameter an array of tuples, each tuple of the array being a tuple of the type (seekerResumeUuid: String, seekerGreetName: String, seekerEmailAddress: String). As also discussed herein, reachEachOfSeekers(_: withJobListings:) may take as its second parameter an array of tuples, each tuple of the array being a tuple of the type (jobListingUuid: String, jobListingDescription: String).

As such doStartSeekerJobListingReach(_:) may after obtaining the noted headhunter user-provided information, employ it in loading tuple arrays of the sort expected by reachEachOfSeekers(_: withJobListings:), and then may call reachEachOfSeekers(_: withJobListings:) providing the loaded arrays as parameters of the call. As to the loading of the tuple arrays, first discussed will be loading of the tuple array to be employed as the first parameter of the method call. Each element of such array may set forth via its tuple the headhunter-provided information regarding a given seeker. In particular, the document number of the seeker's resume may be loaded into the seekerResumeUuid component of the tuple, the provided seeker name may be loaded into the seekerGreetName component of the tuple, and the provided seeker email address may be loaded into the seekerEmailAddress component of the tuple. As such, the array to be provided for the first parameter of the method call may have an element for each seeker to be contacted, each such element setting forth the noted seeker information via the components of the tuple.

In like vein, each element of the array to be provided as the second parameter of the method call may set forth via its tuple the headhunter-provided information regarding a given job opportunity. In particular the document number of the JobListingEntity record corresponding to the opportunity may be loaded into the jobListingUuid component of the tuple and the provided job listing description may be loaded into the jobListingDescription component of the tuple. As such the array to be provided for the second parameter of the method call may have an element for each opportunity to be announced, each such element setting forth the noted job listing information via the components of the tuple.

Returning to doStartSeekerJobListingReach(_:) obtaining—when called—via the user interface headhunter information of the sort discussed, the following is noted. As one illustration, one or more text fields (e.g., instantiated UITextField objects) may be set forth via the user interface provided to the headhunter. One or more such text fields may be provided so that the headhunter may—as discussed—provide with respect to each of the one or more seekers the noted seeker resume document number, name, and email address information. Further, one or more such text fields may be provided so that the headhunter may—as discussed—provide with respect to each of the one or more to-be-broadcasted opportunities the noted job listing document number and job listing description. The method may when called—say in response to the headhunter user pressing a GUI button—in one aspect read from the text fields the headhunter-provided information (e.g., the method may access the text property of each UITextField object, thusly obtaining the text entered into that text field). The method may then employ the information retrieved from the text fields in loading the noted tuple arrays and calling reachEachOfSeekers(_: withJobListings:) as discussed.

Although text fields are discussed so as to illustrate by way of example, other possibilities exist. For example, as an alternative and/or in addition to textfield employ of the sort noted, one or more slot machine-style spin selector widgets may be provided (e.g., via one or more UIPicker objects). As one example such spinners may be employed in allowing the headhunter user to select from one or more resume document numbers, job listing document numbers, and/or seeker email addresses while text fields may be employed to solicit the other information (e.g., seeker names, seeker email addresses, and/or job listing descriptions). Where UIPicker objects are employed, a data source object may be employed to populate a given UIPicker object with selectable values (e.g., an object conforming to the UIPickerViewDelegate protocol may provide such information via its pickerView(_: titleForRow: forComponent:) method). The value selected by the headhunter user from those presented by a given UIPicker object may be ascertained by—where the UIPicker object sets forth a single spinner—accessing the selectedRowInComponent[0] property of the UIPicker object to ascertain which row of the spinner has been selected. Such row number may be employed in accessing an array which maps UIPicker raw values to seeker or job listing data of the sort noted. As an illustration, corresponding to a UIPicker object allowing selection of job listing document numbers may be an array which, via its element numbers, maps spinner rows to job listing document numbers (e.g., spinner row 5 may correspond to element [5] of the array, and element [5] of the array may set forth the job listing document number displayed at row five of the spinner). Headhunter-indicated values provided via the spinner may be employed in the manner discussed above with respect to values obtained from text fields (e.g., such values may be employed in building tuple arrays of the sort noted).

Discussed above was doStartSeekerJobListingReach(_:) when activated (e.g., where a corresponding GUI button is pressed) reading values from text fields (e.g., reading text properties of UITextField objects). In like vein the method may when called alternatively or additionally read spinner-selected values (e.g., reading selectedRowInComponent(0) properties of each of one or more one column/component spinners and looking up in one or more arrays the value— say resume document number—which maps to a particular spinner-selected row).

Having created the discussed tuple arrays employable in calling noted reachConductor object method reachEachOfSeekers(_: withJobListings:), doStartSeekerJobListingReach(_:) may act to pass those tuple arrays as parameters in a call to reachEachOfSeekers(_: withJobListings:). Method reachEachOfSeekers(_: withJobListings:) may have the declaration:

```
func reachEachOfSeekers(_ theSeekers: [(seekerResumeUuid: String,
seekerGreetName: String, seekerEmailAddress: String)], withJobListings
theJobListings: [(jobListingUuid: String, jobListingDescription: String)])
```

As such the declaration indicates that the method may take a first parameter of type [(seekerResumeUuid: String, seekerGreetName: String, seekerEmailAddress: String)], that is to say an array of tuples where each tuple of the array has a first component which is of type string and which has the name seekerResumeUuid, a second component which is of type string and which has the name seekerGreetName, and a third component which is of type string and which has the component name seekerEmailAddress. The declaration indicates that such first parameter may have the local parameter name theSeekers and no external parameter name. Also indicated by the declaration is that the method may take a second parameter of type [(jobListingUuid: String, jobListingDescription: String)], that is to say an array of tuple where each tuple of the array has a first component which is of type string and which has the name jobListingUuid, and a second component which is of type string and which has the name jobListingDescription. The declaration further indicates that such second parameter may have the local parameter name theJobListings and the external parameter name withJobListings. Still further, the declaration indicates that the method may return no value.

The method may be implemented via code in line with the pseudocode:

```
func reachEachOfSeekers(_ theSeekers: [(seekerResumeUuid: String,
seekerGreetName: String, seekerEmailAddress: String)], withJobListings
theJobListings: [(jobListingUuid: String, jobListingDescription: String)]) {
    var reachEmailer = ReachEmailer( )
    for seeker in theSeekers {
        var keyForSeekerContact: String =
seekerResumeProposedJobListingsLibrarianOutlet.uuidKeyAndDictStoreForSeekerResume
Uuid(seeker.seekerResumeUuid, andProposedJobListingUuids:
theJobListings.map({$0.jobListingUuid}))
        reachEmailer.sendEmailToSeeker(seeker, regardingJobListings:
theJobListings, withUuidKey: keyForSeekerContact)
    }
}
```

As such the method provides functionality including employing a for-in loop to visit each element of tuple array theSeekers. With respect to each such visit the method makes two calls. The first call employs a property seekerResumeProposedJobListingsLibrarianOutlet of type SeekerResumeProposedJobListingsLibrarian, the property being set forth by reachEachOfSeekers(_: withJobListings:)'s object, that is to say object reachConductor, an instantiation of a ReachConductor class. The property provides access to an already-instantiated SeekerResumeProposedJobListingsLibrarian object. The call made via seekerResumeProposedJobListingsLibrarianOutlet calls on the already-instantiated SeekerResumeProposedJobListingsLibrarian object method uuidKeyAndDictStoreForSeekerResumeUuid(_: andProposedJobListingUuids:). That method may act to take a seeker resume UUID (e.g., the document number of the ResumeEntity record for that seeker's resume) and an array of proposed job listing UUIDs (e.g., the document numbers of the JobListingEntity records of the job listings proposed by the headhunter). The method may act to generate a new UUID, and to store the received seeker resume UUID and the received proposed job listing UUIDs in a dictionary which is a property of the method's corresponding instantiated SeekerResumeProposedJobListingsLibrarian object. The generated UUID may be employed as the dictionary key for later retrieval of stored values. As such the method may provide such generated UUID to its caller, and the method's object may further provide method returnSeekerResumeIdAndProposedJobListingIdsForUuidKey (_:) which takes in such a generated UUID key, employs it in accessing the noted dictionary property, and returns to its caller the seeker resume UUID and proposed job listing UUIDs which had been stored earlier in the dictionary under that key.

Such SeekerResumeProposedJobListingsLibrarian functionality may be set forth via code in line with the following pseudocode which establishes the discussed SeekerResumeProposedJobListingsLibrarian class including the noted dictionary property thereof as property heldDictionary, and also the discussed methods uuidKeyAndDictStoreForSeekerResumeUuid(_: andProposedJobListingUuids:) and returnSeekerResumeIdAndProposedJobListingIdsForUuidKey(_:):

```
class SeekerResumeProposedJobListingsLibrarian {
    var heldDictionary: [String : (seekerResumeUuid: String,
proposedJobListingUuids: [String])] = [String : (seekerResumeUuid:
String, proposedJobListingUuids: [String])]( )
    func uuidKeyAndDictStoreForSeekerResumeUuid(_
theSeekerResumeUuid: String, andProposedJobListingUuids
theProposedJobListingUuids: [String]) -> String {
    var newUuidString: String = NSUUID( ).UUIDString
    heldDictionary[newUuidString] = (seekerResumeUuid:
theSeekerResumeUuid, proposedJobListingUuids:
theProposedJobListingUuids)
    return newUuidString
    }
    func returnSeekerResumeIdAndProposedJobListingIdsForUuidKey(_
theUuidKey: String) -> (seekerResumeUuid: String,
proposedJobListingUuids: [String]) {
        return heldDictionary[theUuidKey]
    }
}
```

As such method uuidKeyAndDictStoreForSeekerResumeUuid(_: andProposedJobListingUuids:) may have the declaration:

```
func uuidKeyAndDictStoreForSeekerResumeUuid(_
theSeekerResumeUuid: String, andProposedJobListingUuids
theProposedJobListingUuids: [String]) -> String
```

The declaration indicates that the method may take a first parameter of type string, the first parameter having the local parameter name theSeekerResumeUuid and no external parameter name. The declaration further indicates that the method may take a second parameter of type string array, the second parameter having the local parameter name theProposedJobListingUuids and the external parameter name andProposedJobListingUuids. Also indicated by the declaration is that the method may have a return type of string.

Further as such, method returnSeekerResumeIdAndProposedJobListingIdsForUuidKey(_:) may have the declaration:

```
func returnSeekerResumeIdAndProposedJobListingIdsForUuidKey(_
theUuidKey: String) -> (seekerResumeUuid: String,
proposedJobListingUuids: [String])
```

As such the declaration indicates that the method may take a sole parameter of type string, the sole parameter having the local parameter name theUuidKey and no external parameter name. Also indicated by the declaration is that the method may return a tuple, where the first component of the tuple is of type string and has the name seekerResumeUuid, and where the second component of the tuple is of type string array and has the name proposedJobListingUuids.

Returning to the discussion of reachEachOfSeekers(_: withJobListings:), the referenced call to uuidKeyAndDictStoreForSeekerResumeUuid(_: andProposedJobListingUuids:) may pass for the first parameter of the call the seekerResumeUuid component of the tuple element of theSeekers which is presently being visited by the for-in loop, and may pass for the second parameter of the call an array whose elements set forth only the jobListingUuid components of the jobListingUuid tuple array. As set forth by the pseudocode, the UUID key of the sort discussed which is returned in reply to the call may be held via string object keyForSeekerContact.

Further set forth by the pseudocode of reachEachOfSeekers(_: withJobListings:) may additionally be with the for-in loop calling on object reachEmailer, an instantiation of a ReachEmailer class, method sendEmailToSeeker(_: regardingJobListings: withUuidKey:). Passed for the first parameter of the call may be the at-hand tuple element of theSeekers presently visited by the for-in loop, passed for the second parameter of the call may be received tuple array theJobListings, and passed for the third parameter of the call may be the discussed UUID key which was returned in reply to the call to uuidKeyAndDictStoreForSeekerResumeUuid (_: andProposedJobListingUuids:).

The sendEmailToSeeker(_: regardingJobListings: withUuidKey:) method of the reachEmailer object may act to construct an email whose to line reflects the seeker email address obtained via the passed-in tuple theSeeker, and whose subject line sets forth the headhunter-chosen seeker name as set forth via passed-in tuple theSeeker along with form text (e.g., "Great new opportunities for you") and also the at-hand UUID key of the sort discussed as set forth via passed-in string theUuidKey. Still further, the method may construct the email such that its body sets forth the headhunter-chosen seeker name, form text (e.g., "The opportunities are:"), each job listing description set forth via passed-in array theJobListings, and further form text (e.g., "To apply to these openings, simply hit 'reply,' type your cover letter, and press 'send'").

Having generated the email, the method may act to dispatch it via launchable task /usr/bin/mail which employs mail server postfix to dispatch the email, where the method employs launchable task /bin/echo to provide the body of the email to /usr/bin/mail and provides the subject lines and to lines of the email to /usr/bin/mail as arguments thereto.

In particular, the method may instantiate and configure two NSTask objects, one corresponding to /bin/echo and one corresponding to /usr/bin/mail Via setting the arguments properties thereof, the NSTask object for /bin/echo may be set to intake the constructed email body, causing /bin/echo when launched to send the constructed email body via its standard out (stdout). Via setting the arguments property thereof, the NSTask object for /usr/bin/mail may be set to indicate that the constructed subject line is to be employed as the subject line of the email with the -s flag of /usr/bin/mail being employed in such indication, and further to indicate that the constructed to line should be employed as the to line of the email Still further, the method may instantiate an NSPipe object, and set the stdout for the /bin/echo task to the pipe, and further set the standard in (stdin) for the /usr/bin/mail task to the pipe. The method may then launch both the task for /bin/echo and the task for /usr/bin/mail. Due to the configuration of /bin/echo's stdout with respect to the pipe and the configuration of /usr/bin/mail's stdin with respect to the pipe, with launch the constructed email body may be output via /bin/echo's stdout, go into the pipe, and be received by /usr/bin/mail via its stdin. As /usr/bin/mail takes that which it receives via stdin as the body of the email, /usr/bin/mail may take the constructed email body to be the body of the email. Via the noted arguments thereof, /usr/bin/mail may take the constructed subject line and the constructed to line as the subject and to lines of the email Possessing these components of the email, /usr/bin/mail may cause the email to be dispatched to its recipient. Reflecting on it being the case that reachEachOfSeekers(_: withJobListings:) calls, via its for-in loop, sendEmailToSeeker(_: regardingJobListings: withUuidKey:) with respect to each headhunter-selected seeker as set forth via theSeekers parameter passed to that method, each of the headhunter-selected seekers may receive an email as per the foregoing.

The aforementioned functionality of sendEmailToSeeker (_: regardingJobListings: withUuidKey:) may be set forth via code in line with the pseudocode:

```
func sendEmailToSeeker(_ theSeeker: (seekerResumeUuid: String,
seekerGreetName: String, seekerEmailAddress: String),
regardingJobListings theJobListings: [(jobListingUuid: String,
jobListingDescription: String)], withUuidKey theUuidKey: String) {
    var theJobListingDescriptions =
theJobListings.map({$0.jobListingDescription})
    var emailToLine: String = theSeeker.seekerEmailAddress
    var emailSubjectLine: String = "\(theSeeker.seekerGreetName)- Great
new opportunities for you \(theUuidKey)"
    var emailBody: String = "\(theSeeker.seekerGreetName),\n\nThe
opportunities are:\n\n"
    for jobListingDescription in theJobListingDescriptions {
        emailBody = emailBody + "• \(jobListingDescription)\n"
    }
    emailBody = emailBody + "\nTo apply to these openings, simply
hit \"reply,\" type your cover letter, and press \"send.\"\n\nThanks,
\n\nYour Headhunter"
    var echoTask = NSTask( )
    var mailTask = NSTask( )
    echoTask.launchPath = "/bin/echo"
    mailTask.launchPath = "/usr/bin/mail"
    echoTask.arguments = ["\"\(emailBody)\""]
    mailTask.arguments =
["-s","\"\(emailSubjectLine)\"","\"\(emailToLine)\""]
    var throughPipe = NSPipe( )
    echoTask.standardOutput = throughPipe
    mailTask.standardInput = throughPipe
    echoTask.launch( )
    mailTask.launch( )
}
```

As set forth by the pseudocode, the method may have the declaration:

```
func sendEmailToSeeker(_ theSeeker: (seekerResumeUuid:
String, seekerGreetName: String, seekerEmailAddress: String),
regardingJobListings theJobListings: [(jobListingUuid:
String, jobListingDescription: String)], withUuidKey
theUuidKey: String)
```

As such the declaration indicates that the method may take as its first parameter a tuple which has a first component of type string which is named seekerResumeUuid, a second component of type string which is named seekerGreetName, and a third component of type string which is named seekerEmailAddress. The declaration indicates that the parameter may have the external parameter name theSeeker and no external parameter name. The declaration further indicates that the method may take a second parameter of type [(jobListingUuid: String, jobListingDescription: String)], that is to say an array of tuples wherein each tuple of the array has a first component which is of type string and which has the name jobListingUuid, and a second component which is of type string and which is named jobListingDescription. The declaration indicates this second parameter to have the local parameter name theJobListings and the external parameter name regardingJobListings. Still further, the declaration indicates that the method may take a third parameter of type string, the third parameter having the local parameter name theUuidKey and the external parameter name withUuidKey. Still further the declaration indicates that the method may return no value.

The job-opportunity-heralding emails sent to seekers by the action of sendEmailToSeeker(_: regardingJobListings: withUuidKey:) may be sent out under an email account associated with a user account under which the method and/or its NSTask-launched tasks execute. It is noted that such user account may not be associated with a person, instead perhaps being viewed as the user account of an automated process. Email replies sent by those of the seekers wishing to reply to the job opportunities may be directed to such email account associated with the user account under which the sendEmailToSeeker(_: regardingJobListings: withUuidKey:) method and/or its launched tasks execute. Received emails directed to that email account may be saved via automated process to a particular directory. As one example, in the vein of the Swift/Apple frameworks employed herein, emails directed to such email account may as an illustration be received and processed by Apple Mail.app. In particular associated with that email account in Mail.app may be a Mail.app rule set to fire in response to any received email directed to that email account. The rule may be configured to, upon firing, execute an AppleScript which acts to save that email, in Mail.app plain text format, in a particular directory (e.g., /seekerreachout/received/emails)

Now discussed in connection with FIG. 25 will be processing performed in response to the receipt of such an email and the saving of that email (e.g., in Mail.app plain text format) in a particular directory (e.g., /seekerreachout/received/emails) Among the methods of object emailReceiptConductor—an instantiation of an EmailReceiptConductor class—may be method watchForNewEmails( ). The method may have the declaration:

func watchForNewEmails( )

As such the declaration indicates that the method may take no parameters and may return no value. The method may be called in an automated fashion (e.g., via an applicationDidFinishLaunching(_:) method in keeping with the Swift/Apple frameworks pseudocode employed herein) (phase 2501). The watchForNewEmails( ) method may, in keeping with the pseudocode employed herein, employ FSEvents to receive notifications of the full file paths of files added to the noted email save directory (e.g., /seekerreachout/received/emails) The method may employ the FSEventStreamCreate function of FSEvents, indicating in doing so for the "pathsToWatch" parameter the email save directory (e.g., /seekerreachout/received/emails) and for the "flags" parameter kFSEventStreamCreateFlagFileEvents. Method watchForNewEmails( ) may await an FSEvents-originated notification indicating that a new email has been added to the email save directory (phase 2503). Having received such notification—which in keeping with the Swift/Apple frameworks-based pseudocode employed herein includes specification of the full file path including file name of the added email text file—watchForNewEmails( ) may pass such full file path cast as a string as the sole parameter of a call to to-be-discussed method processReceivedSeekerEmailWithPathFileName(_:), a further method of the emailReceiptConductor object.

The processReceivedSeekerEmailWithPathFileName(_:) method may have the declaration:

func   processReceivedSeekerEmailWithPathFileName
       (_thePathFileName: String)

As such the declaration indicates that the method may take a single parameter of type string, the single parameter having the local parameter name thePathFileName and no external parameter name. Also indicated by the declaration is that the method may return no value. The method may be called at phase 2505

The method may, in an aspect, load into an NSString object the contents of the added email text file specified by thePathFileName (phase 2507). Such functionality may be implemented via code in line with the Swift/Apple Frameworks based pseudocode:

```
var fileUrl = NSURL(fileURLWithPath: thePathFileName)
var fileData = NSData(contentsOfURL: fileUrl)
var stringOfEmail = NSString.init(data: fileData, encoding:
   NSUTF8StringEncoding)
```

In particular, via the first of the three pseudocode lines NSURL object fileUrl is instantiated based on passed in thePathFileName. Next, NSData object fileData is instantiated via NSData's contentsOfURL init method, thusly giving birth to an NSData object which holds the contents of the file specified by the file of thePathFileName. Then, via the third of the three pseudocode lines fileData is cast as an NSString object via NSString's init(data: encoding:) init method, where the passage of NSUTF8StringEncoding for the second parameter conveys the desired encoding technique to be employed in making a string out of the noted NSData.

Possessing the contents of the added email text file in NSString stringOfEmail processReceivedSeekerEmailWithPathFileName(_:) may act to pass such NSString cast as a Swift string in a call to returnUuidKeyFromSubjectAndCoverLetterViaBodyFromEmail(_:), a to-be-discussed-in-greater-detail method of an emailExtractor object, an instantiation of an EmailExtractor class (phase 2509). With reference to that which is discussed hereinbelow with respect to returnUuidKeyFromSubjectAndCoverLetterViaBodyFromEmail(_:), such method may return when called a tuple of type (uuidKey: String, coverLetter: String). As such, in response to calling this method with stringOfEmail—cast as a Swift string—as the sole parameter, processReceivedSeekerEmailWithPathFileName(_:) may receive in return a tuple which provides via its uuidKey component the discussed-herein key extracted from the subject line set forth by the email of stringOfEmail, a key which had been—as per that which is discussed herein—earlier provided by uuidKeyAndDictStoreForSeekerResumeUuid(_: andProposedJobListingUuids:) in connection with the outgoing email to which the email of stringOfEmail may be responsive. Also obtained via the received tuple may, via the coverLetter component thereof, be the cover letter set forth by the email of stringOfEmail. As noted, in responding to a job listing-heralding email of the sort discussed herein a recipient seeker user may include in the body of the reply email the cover letter which she wishes to employ in applying to the heralded job listings.

Taking processReceivedSeekerEmailWithPathFileName(_:) to hold the received tuple in object receivedTuple, the method may act to extract into two string object that which is provided by components of the tuple (phase 2511) via code in line with the pseudocode:

```
var receivedEmailUuidKey: String = receivedTuple.uuidKey
var receivedEmailCoverLetter: String = receivedTuple.coverLetter
```

The emailReceiptConductor object to which processReceivedSeekerEmailWithPathFileName(_:) may set forth a property seekerResumeProposedJobListingsLibrarianOutlet of type SeekerResumeProposedJobListingsLibrarian which provides access to the noted instantiated SeekerResumeProposedJobListingsLibrarian object. Method processReceivedSeekerEmailWithPathFileName(_:) may employ this property in receiving from that instantiated SeekerResumeProposedJobListingsLibrarian in one aspect the ResumeEntity record document number, and in another aspect the one or more JobListingEntity record document numbers, which had been passed to the instantiated SeekerResumeProposedJobListingsLibrarian object via uuidKeyAndDictStoreForSeekerResumeUuid(_: andProposedJobListingUuids:)—previously as discussed above. In particular, processReceivedSeekerEmailWithPathFileName(_:) may receive such ResumeEntity record document number and such one or more JobListingEntity record document numbers via a call to discussed-herein method returnSeekerResumeIdAndProposedJobListingIdsForUuidKey(_:) of the instantiated SeekerResumeProposedJobListingsLibrarian (phase 2513), where passed as the sole parameter of the call may be receivedEmailUuidKey and where received in reply to the call may be a tuple of type (seekerResumeUuid: String, proposedJobListingUuids: [String]) which provides the noted ResumeEntity record document number via the seekerResumeUuid component and the noted one or more JobListingEntity record document numbers via its proposedJobListingUuids component.

In keeping with the foregoing, processReceivedSeekerEmailWithPathFileName(_:) may set forth code in line with the pseudocode:

```
var receivedResumeJobListingsDocNumTuple =
seekerResumeProposedJobListingsLibrarianOutlet.
returnSeekerResumeIdAndProposedJobListingIdsForUuidKey
(receivedEmailUuidKey)
```

As such, the receivedResumeJobListingsDocNumTuple object may set forth the noted relevant ResumeEntity record document number via its seekerResumeUuid component and the noted relevant one or more JobListingEntity record document numbers via its proposedJobListingUuids component. Method processReceivedSeekerEmailWithPathFileName(_:) may act to extract into a string and a string array that which is set forth by receivedResumeJobListingsDocNumTuple (phase 2515) via code in line with the pseudocode:

```
var receivedResumeDocNum: String =
receivedResumeJobListingsDocNumTuple.seekerResumeUuid
var receivedJobListingDocNums: [String] =
receivedResumeJobListingsDocNumTuple.proposedJobListingUuids
```

As such, among that which is at the disposal of processReceivedSeekerEmailWithPathFileName(_:) may be noted receivedEmailCoverLetter setting forth the at-hand received cover letter, noted receivedResumeDocNum setting forth the at-hand ResumeEntity record document number, and noted receivedJobListingDocNums setting forth the one or more at-hand JobListingEntity record document numbers. Having such information, processReceivedSeekerEmailWithPathFileName(_:) may act to attach the at-hand job seeker as an applicant to each of the one or more at-hand job listings to which the seeker indicated desired to apply via her reply email. In particular the method may act to create with respect to each such job listing a record compliant with the entity definition:

| Field Name | Data Type |
| --- | --- |
| docNum | String |
| forJobListingNr | String |
| seekerResumeNr | String |
| coverLetter | String |

Such entity may have the entity name JobApplicationEntity. A JobApplicationEntity may perhaps be viewed as memorializing the application of a certain seeker to a certain job.

A JobApplicationEntity record may set forth via its docNum field a document number uniquely identifying the record (e.g., a UUID of the sort discussed herein). Further, a JobApplicationEntity record may set for via its forJobListingNr field the document number of the JobListingEntity record corresponding to the at-hand applied-for job (e.g., where a JobApplicationEntity record reflects an application for a job corresponding to a JobListingEntity record with document number ABC-123, the forJobListingNr field of the JobApplicationEntity record may set forth ABC-123).

Still further, a JobApplicationEntity record may set forth via its seekerResumeNr the document number of the ResumeEntity record corresponding to the at-hand seeker applicant (e.g., where a JobApplicationEntity record reflects a job application by a seeker corresponding to a ResumeEntity record with document number XYZ-456 the seekerResumeNr field of the JobApplicationEntity record may set forth XYZ-456). It is noted that to facilitate discussion foreshortened document numbers are set forth rather than, say, UUIDs. Reflecting further it is noted that a JobApplicationEntity record may set forth via its coverLetter field the text of the cover letter corresponding to the at-hand application for a job.

Now discussed will be details of processReceivedSeekerEmailWithPathFileName(_:) acting to create a JobApplicationEntity record. As referenced, among that which processReceivedSeekerEmailWithPathFileName(_:) has at its disposal may be noted string object receivedEmailCoverLetter, noted string object receivedResumeDocNum, and noted string array object receivedJobListingDocNums. Method processReceivedSeekerEmailWithPathFileName (_:) may act to create with respect to each job listing referenced by string array object receivedJobListingDocNums a JobApplicationEntity record setting forth the corresponding JobListingEntity record document number, the at-hand ResumeEntity record document number reflected by receivedResumeDocNum, the at-hand cover letter text reflected by receivedEmailCoverLetter, and a generated unique document number for the new JobApplicationEntity record. Method processReceivedSeekerEmailWithPathFileName(_:) may implement such functionality via code in line with the following pseudocode for which managedObjectContext is taken to provide access to the at-hand managed object context (phase 2517, phase 2519):

```
var jobApplicationEntityDescription: NSEntityDescription =
NSEntityDescription. entity ForName("JobApplicationEntity", inManagedObjectContext
managedObjectContext)
for jobListingDocNum in receivedJobListingDocNums {
    var newJobApplication: NSManagedObject = NSManagedObject(entity:
jobApplicationEntityDescription, insertIntoManagedObjectContext:
managedObjectContext)
    var docNumForNewJobApplication: String = NSUUID( ).UUIDString
    newJobApplication.setValue(docNumForNewJobApplication, forKey: "docNum")
    newJobApplication.setValue(jobListingDocNum, forKey: "forJobListingNr")
    newJobApplication.setValue(receivedResumeDocNum, forKey: "seekerResumeNr")
    newJobApplication.setValue(receivedEmailCoverLetter, forKey: "coverLetter")
    managedObjectContext.save( )
}
```

As such, via the first line of the pseudocode instantiated is NSEntityDescription object jobApplicationEntityDescription which reflects the data model for JobApplicationEntity. Then via a for-in loop each element of string array receivedJobListingDocNums is visited. With each such visitation the following transpires. Via the first line within the for-in loop an NSManagedObject corresponding to the record being created and named newJobApplication is instantiated. Next, via the second and third lines within the for-in loop a new UUID is generated and set as the value for the docNum field of the new JobApplicationEntity record. Then via the fourth line within the for-in loop the currently-visited job listing document number of receivedJobListingDocNums is set as the value for the forJobListingNr field of the new JobApplicationEntity record. After this via the fifth and sixth lines within the for-in loop receivedResumeDocNum and receivedEmailCoverLetter are set as the values for, respectively, the seekerResumeNr and coverLetter fields of the new JobApplicationEntity record. Then via the seventh line within the for-in loop save( ) is called on the at-hand managed object context thusly saving to the store (e.g., database) the new JobApplicationEntity record. As such, via the functionality of the above pseudocode a new JobApplicationEntity record is created with respect to each of the job listings set forth by receivedJobListingDocNums, such record setting forth the JobListingEntity document number corresponding to that job listing, as well as a newly-generated UUID, the document number of the ResumeEntityRecord for the at-hand applicant seeker, and also that seeker's cover letter as provided via the reply email As referenced, method returnUuidKeyFromSubjectAndCoverLetterViaBodyFromEmail(_:) of the emailExtractor object may act to receive via its sole parameter a string setting forth a seeker-dispatched email reply of the sort discussed herein, and return a tuple which firstly provides, as extracted from the subject line of the passed-in email, a UUID key of the sort discussed herein. And which secondly provides the cover letter which is set forth via the body of the passed-in email. Method returnUuidKeyFromSubjectAndCoverLetterViaBodyFromEmail(_:) may have the declaration:

```
func returnUuidKeyFromSubjectAndCoverLetterViaBodyFromEmail
(_ theEmail: String) -> (uuidKey: String, coverLetter: String)
```

As such the declaration indicates that the method may take a single parameter of type String, the single parameter having the local parameter name theEmail and no external parameter name. Also indicated by the declaration is that the method may return a tuple of type (uuidKey: String, coverLetter: String). As such the tuple sets forth a first component which has the name uuidKey and which is of type string, and a second component which has the name coverLetter and which is of type string.

The method may be set forth via code in line with the pseudocode:

```
func returnUuidKeyFromSubjectAndCoverLetterViaBodyFromEmail(_ theEmail: String) -> (uuidKey: String, coverLetter: String) {
    var regexForUUID = NSRegularExpression(pattern: "[A-F0-9]{8}-[A-F0-9]{4}-4[A-F0-9]{3}-[89AB][A-F0-9]{3}-[A-F0-9]{12}", options: [ ] )
    var regexForSubjectLine = NSRegularExpression( pattern: "Subject: (.+)", options: [ ])
    var regexForToLine = NSRegularExpression(pattern: "To: (.+)", options: [ ])
    var regexForOnWroteLine = NSRegularExpression(pattern: "On (.+) wrote:", options: [ ])
    var nsOfTheEmail = NSString(string: theEmail)
    var subjectLineCheckResult = regexForSubjectLine.firstMatchInString(theEmail, options: [ ], range: NSMakeRange(0, nsOfTheEmail.length))
    var rangeForSubjectLine = subjectLineCheckResult.range
    var subjectLineAsString = nsOfTheEmail.substringWithRange(rangeForSubjectLine)
    var uuidFromFoundSjCheckResult = regexForUUID.firstMatchInString(subjectLineAsString, options: [ ], range: NSMakeRange(0, (subjectLineAsString as NSString).length))
    var rangeForUuid = uuidFromFoundSjCheckResult.range
    var uuidOfSubjectLineAsString = (subjectLineAsString as NSString).substringWithRange(rangeForUuid)
    var toLineCheckResult = regexForToLine.firstMatchInString(theEmail, options: [ ], range: NSMakeRange(0, nsOfTheEmail.length))
    var rangeForToLine = toLineCheckResult.range
    var coverLetterToReturn: String
    var onWroteLineCheckResult = regexForOnWroteLine.firstMatchInString(theEmail, options: [ ], range: NSMakeRange(0, nsOfTheEmail.length) )
    if onWroteLineCheckResult != nil {
        var rangeForOnWroteLine = onWroteLineCheckResult.range
        var swiftRangeOfNewBodyOnly = (rangeForToLine. location + rangeForToLine.length) ..< rangeForOnWroteLine.location
        var nsRangeOfNewBodyOnly = NSRange(SwiftRangeOfNewBodyOnly)
        var NewBodyOnlyAsString = nsOfTheEmail.substringWithRange(nsRangeOfNewBodyOnly)
        coverLetterToReturn = NewBodyOnlyAsString
    }
    else {
        var swiftRangeOfUncutBody = (rangeForToLine.location + rangeForToLine.length)..<nsOfTheEmail.length
        var nsRangeOfUncutBody = NSRange(swiftRangeOfUncutBody)
        var uncutBodyAsString = nsOfTheEmail.substringWithRange(nsRangeOfUncutBody)
        coverLetterToReturn = uncutBodyAsString
    }
    return (uuidKey: uuidOfSubjectLineAsString, coverLetter: coverLetterToReturn)
}
```

As such, in one aspect set forth is instantiating NSRegularExpression object regexForUUID which is set to match UUIDs in the format of those generated via the Swift/Apple frameworks pseudocode employed herein. As such, object regexForUUID is set to match a string made up of a first group of eight hex digits, a second group of four hex digits, and third group of the hex digit "4" followed by three more hex digits, a fourth group of the hex digit "8" or "9" or "A" or "B" followed by three more hex digits, and a fifth group of twelve hex digits, where there are dashes placed intergroup. In another aspect, set forth are instantiating NSRegularExpression objects regexForSubjectLine, regexForToLine, and regexForOnWroteLine which are, respectively, set to match email "subject" lines, email "to" lines, and email "on-wrote" lines (e.g., lines in the vein of "on Dec. 31, 2025, at 16:14, JOHN SAMPLE <jsample@example.net> wrote:).

Further set forth by the pseudocode are three lines culminating with instantiating NSString object subjectLineAsString which plies regexForSubjectLine against the passed-in string of the email to have subjectLineAsString set forth the subject line of the passed-in email. Also set forth by the pseudocode are three lines culminating with instantiating string object uuidOfSubjectLineAsString. In particular by these three lines regexForUUID is plied against subjectLineAsString so as to yield from subjectLineAsString the UUID thereof, with the result being placed in uuidOfSubjectLineAsString.

Also set forth is applying regexForOnWroteLine against passed-in string theEmail to yield an NSTextCheckingResult object which will hold nil where theEmail does not set forth an on-wrote line, and will otherwise hold a description of the found on-wrote line.

Via the if statement of the pseudocode there may be checking for such nilness of the onWroteLineCheckResult object. Where nilness is not detected—the circumstance of there being an on-wrote line—that which is bracketed within the if statement may be performed. Where nilness is detected—the circumstance of there being no on-wrote line—that which is bracketed within the else statement may be executed.

Considering that which is bracketed within the if statement, the five lines culminating with coverLetterToReturn=NewBodyOnlyAsString may act to establish a range which starts just after the to line of the email and ends just before the on-wrote line of the email. Via the call to substringWithRange(_:) yielded may be a string object corresponding to passed-in theEmail, but cropped to set forth only the reply text of the email, to with sans for instance included text of earlier emails in the at-hand email chain as introduced via on-wrote lines and also sans header lines such as the "from:" and "subject:" header lines. Such cropped email text comes to be held in object coverLetterToReturn, reflecting that such cropped, reply-text-only portion of theEmail sets forth the at-hand seeker's cover letter.

Considering now that which is bracketed by the else statement, the four lines culminating with coverLetterToReturn=uncutBodyAsString at to establish a range which starts just after the to line of the email and runs to the end of the email. Via the call to substringWithRange (_:) yielded may be a string corresponding to passed-in theEmail but cropped to set forth only the reply text of the email, sans for instance header lines such as "from:" and "subject:." The at hand email being one for which onWroteLineCheckResult sets forth nil, there may be no on-wrote-introduced text to be cropped. Such cropped email text comes to be held in object coverLetterToReturn, reflecting that such cropped, reply-text-only portion of theEmail sets forth the at-hand seeker's cover letter.

Finally, the method culminates by returning a tuple which sets forth via its first component the discussed UUID key as extracted from the email's subject line, and via its second component coverLetterToReturn. It is noted—with reference to the aforediscussed—that coverLetterToReturn may reflect either the operations bracketed within the if statement, or the operations bracketed within the else statement. As referenced, which of such code groups may be extracted depends upon the nilness of onWroteLineCheckResult.

As referenced, where a seeker makes use of the discussed email-body-placed executable code (e.g., JavaScript) to compose a cover letter, to select one or more job opportunities to which the cover letter may correspond, and then presses the "send" button associated with the executable code, the executable code may dispatch to a particular URL an HTTP message whose body sets forth a tag-delimited string conveying the at-hand UUID key, the at-hand cover letter text, and the one or more job listings to which the cover letter may be directed. Now discussed will be the processing which acts to receive such dispatch and to perform operations corresponding to that dispatch. Among the methods of object generatedReplyReceiptConductor—an instantiation of a GeneratedReplyReceiptConductor class may be method watchForNewGeneratedReplies( ). The generatedReplyReceiptConductor object may have properties including generatedReplyReceptorTask of type NSTask, generatedReplyReceptorPipe of type NSPipe, and generatedReplyReceptorFileHandle of type NSFileHandle which may, for example, be employed by watchForNewGeneratedReplies( ). The watchForNewGeneratedReplies( ) method may have the declaration:

func watchForNewGeneratedReplies( )

As such the declaration indicates that the method may take no parameters and may return no value. The method may be called in an automated fashion (e.g., via an applicationDidFinishLaunching(_:) method in keeping with the Swift/Apple frameworks pseudocode employed herein). At the disposal of watchForNewGeneratedReplies( ) may be a launchable task (e.g., available via /usr/local/bin/generatedreplyreceptor) which acts to listen for dispatches directed to the noted particular URL, extract the body of such a dispatch, and make the extracted body contents available via standard output (stdout). Such launchable task may be implemented via code in line with the following php-based pseudocode which takes dispatches directed to the noted particular URL to be available via 198.51.100.11, port 80:

```
#!/usr/local/bin/php
<?PHP
header('Content-Type: text/plain');
saddress = '198.51.100.11';
sport = 80;
ssock = socket_create(AF_INET, SOCK_STREAM, 0);
socket_bind($sock, $address, $port) or die('Could not bind to address')
socket_listen($sock);
$client = socket_accept($sock);
do {
   $input = "";
   $input = socket_read($client, 1024);
   $data .= $input;
} while( sinput != "");
echo "$data\n";
```

Further regarding watchForNewGeneratedReplies( ) it is noted that such method may be implemented via code in line with the pseudocode:

```
func watchForNewGeneratedReplies( ) {
    generatedReplyReceptorTask = NSTask( )
        generatedReplyReceptorTask. launchPath =
    "/usr/local/bin/generatedreplyreceptor"
        generatedReplyReceptorPipe = NSPipe( )
    generatedReplyReceptorTask.standardoutput =
    generatedReplyReceptorPipe
        generatedReplyReceptorFileHandle =
            generatedReplyReceptorPipe.fileHandleForReading
        var notificationcenter: NSNotificationCenter =
    NSNotificationCenter.defaultCenter( )
        notificationcenter.addObserver(self, selector:
    Selector("processReceivedSeekerGeneratedReplyWithNsNotification:"),
    name:
    NSFileHandleReadCompletionNotification, object:
    generatedReplyReceptorFileHandle)
        generatedReplyReceptorTask. launch( )
        generatedReplyReceptorFileHandle.
        readInBackgroundAndNotify( )
}
```

As such, among that which is proffered by the method may be the following. In one aspect initializing NSTask property generatedReplyReceptorTask and settings its launchPath property to indicate the discussed launchable task. In another aspect, the method initializes NSPipe property generatedReplyReceptorPipe and sets the standardOutput property of generatedReplyReceptorTask to that generatedReplyReceptorPipe, thusly establishing that that which the noted launchable task directs to stdout will be available via the pipe. In an additional aspect, the method sets NSFileHandle property generatedReplyReceptorFileHandle to reflect the pipe's file handle for reading as made available via the fileHandleForReading property of generatedReplyReceptorPipe. Also set forth by the method is setting NSNotificationCenter object notificationCenter to, in keeping with the Swift/Apple frameworks pseudocode employed herein, reflect the default notification center, and then calling addObserver(_: selector: name: object:). Bearing in mind the parameters of the call set forth by the pseudocode, such call registers, via the passage of self, object generatedReplyReceiptConductor which sets forth watchForNewGeneratedReplies( ) to receive NSFileHandleReadCompletionNotification notifications regarding NSFileHandle object generatedReplyReceptorFileHandle. Further, such call indicates that it may be to-be-discussed generatedReplyReceiptConductor method processReceivedSeekerGeneratedReplyWithNsNotification(_:) which may be called when the referenced file handle read completion notification transpires.

Also performed by watchForNewGeneratedReplies( ) may be calling lunch( ) on generatedReplyReceptorTask, thereby starting the noted launchable task. Finally, the method may call readInBackgroundAndNotify( ) on generatedReplyReceptorFileHandle, thusly causing reads from that which may be output by the running launchable task to occur via a background thread, with an NSFileHandleReadCompletionNotification in keeping with that which has been discussed to be posted to the notification center once reading has completed.

Now discussed in greater detail will be above-referenced generatedReplyReceiptConductor method processReceivedSeekerGeneratedReplyWithNsNotification(_:). Such method may have the declaration:

```
processReceivedSeekerGeneratedReplyWithNsNotification(_
theNsNotification NSNotification)
```

As such the declaration indicates that the method may take a single parameter of type NSNotification, the single parameter having the local parameter name theNsNotification and no external parameter name. A NSNotification object provides functionality including encapsulating data which is broadcast from one object to another via an NSNotificationCenter object. Also indicated by the declaration is that the method may have no return value.

As referenced, dispatched by the email-body-placed executable code which may be in the hands of the seeker may be an HTTP message whose body provides as a tag-delimited string the at-hand UUID key, cover letter text, and indication of seeker-selected job listings to which the cover letter may be directed. Via the functionality discussed in connection with watchForNewGeneratedReplies( ) and the launchable task such data dispatched via the email body executable code may come to be encapsulated within NSNotification object theNsNotification received by processReceivedSeekerGeneratedReplyWithNsNotification(_:). The method may act to retrieve such data from object theNsNotification which encapsulates it and to cast such data as a string via code in line with the pseudocode:

```
var notificationData: NSData =
theNsNotification.userinfo[NSFileHandleNotificationDataItem]
var seekerReplyString: String = NSString(data:
notificationData, encoding:
NSUTF8StringEncoding) as String
```

Possessing the discussed tag-delimited string—dispatched by the email-body-placed executable code—within seekerReplyString the method may, in keeping with the Swift/Apple frameworks-based pseudocode employed herein, formulate an NSXMLDocument object corresponding to seekerReplyString. Further the method may, via nodesForXPath(_:) calls to that NSXMLDocument object, obtain as strings that which may be tag delimited within seekerReplyString. Also, via a call to string method componentsSeparatedByString(_:) passing a comma character as the sole parameter of the call processReceivedSeekerGeneratedReplyWithNsNotification(_:) may produce a string array of which each element is one of the JobListingEntity record document numbers set forth by seekerReplyString. Method process ReceivedSeekerGeneratedReplyWithNsNotification(_:) may achieve such functionality via code in line with the pseudocode:

```
var xmlDoc: NSXMLDocument = NSXMLDocument(XMLString:
seekerReplyString, options 0)
var uuidKeyString: String = xmlDoc.nodesForXPath("//uuidKey").
first.stringvalue
var coverLetterString: String =
xmlDoc.nodesForXPath("//coverLetter").first.stringvalue
var chosenJobListingsDocNumsString: String =
xmlDoc.nodesForXPath("//chosenDocNums").first.stringvalue
var chosenJobListingsDocNumsArray: [String] =
chosenJobListingsDocNumsString.componentsSeparatedByString(",")
```

Akin to that which was discussed hereinabove in connection with object emailReceiptConductor, object generatedReplyReceiptConductor to which processReceivedSeekerGeneratedReplyWithNsNotification(_:) belongs may set forth a property seekerResumeProposedJobListingsLibrarianOutlet of type SeekerProposedJobListingsLibrarian which provides access to the noted instantiated SeekerProposedJobListingsLibrarian object. Method processReceivedSeekerGeneratedReplyWithNsNotification(_:) may employ this property in receiving from that instantiated SeekerProposedJobListingsLibrarian object the ResumeEntity record document number which had been passed to the instantiated SeekerProposedJobListingsLibrarian object via uuidKeyAndDictStoreForSeekerResumeUuid(_: andProposedJobListingUuids:)—previously as discussed above. In particular processReceivedSeekerGeneratedReplyWithNsNotification(_:) may receive such ResumeEntity record document number via code in line with the pseudocode:

```
var resumeJobListingsDocNumTuple =
seekerResumeProposedJobListingsLibrarianoutlet.
returnSeekerResumeIdAndProposedJob
ListingIdsForUuidKey(uuidKeyString)
var resumeDocNum: String = resumeJobListingDocNumTuple.
seekerResumeUuid
```

It is noted that although resumeJobListingsDocNumTuple also sets forth the JobListingEntity record document numbers of all job listings which were offered to the at-hand seeker, for the at-hand circumstance it is instead those JobListingEntity record document numbers which were indicated by the tag-delimited string dispatched by the email body-executable code which are relevant.

As such, among that which is at the disposal of processReceivedSeekerGeneratedReplyWithNsNotification(_:) may be noted coverLetterString setting forth the at-hand cover letter dispatched by the seeker via the email body-placed executable code, resumeDocNum setting forth the document number of the resume of the seeker who replied via the email body-placed executable code, and chosenJobListingsDocNumsArray setting forth the document numbers of the JobListingEntity records which correspond to the job opportunities for which the cover letter is to be plied as per the seeker's indication via the email body-placed executable code. Having such information, processReceivedSeekerGeneratedReplyWithNsNotification(_:) may act to attach the at-hand job seeker as an applicant to each of the one or more job listings set forth via chosenJobListingsDocNumsArray, and as such to those of the job listings to which the at-hand seeker desires to apply using the resume set forth via coverLetterString. In particular the method may act to create with respect to each such job listing a JobApplicationEntity record.

As such, the method may act to create with respect to each job listing referenced by string array object chosenJobListingsDocNumsArray a JobApplicationEntity record setting forth the corresponding JobListingEntity record document number referenced by resumeDocNum, the at-hand cover letter text referenced by coverLetterString, and a generated unique document number for the new JobApplicationEntity record.

Method processReceivedSeekerGeneratedReplyWithNsNotification(_:) may implement such functionality in the vein of that which is discussed hereinabove with respect to performance of JobApplicationEntity record creation by method processReceivedSeekerEmailWithPathFileName (_:). As such, at-hand method processReceivedSeekerGeneratedReplyWithNsNotification(_:) may implement the JobApplicationEntity record creation via code in line with the following pseudocode for which managedObjectContext may be taken to provide access to the at-hand managed object context:

```
var jobApplicationEntityDescription: NSEntityDescription =
NSEntityDescription. entity ForName("JobApplicationEntity",
inManagedObjectContext:
managedObjectContext)
for jobListingDocNum in chosenJobListingsDocNumsArray {
    var newJobApplication: NSManagedObject = NSManagedObject(entity:
jobApplicationEntityDescription, insertIntoManagedObjectContext:
managedObjectContext)
    var docNumForNewJobApplication: String = NSUUID( ).UUIDString
    newJobApplication.setValue(docNumForNewJobApplication,
forKey: "docNum")
    newJobApplication.setValue(jobListingDocNum, forKey:
"forJobListingNr")
    newJobApplication. setValue(resumeDocNum, forKey:
"seekerResumeNr")
    newJobApplication.setValue(coverLetterString, forKey:
"coverLetter")
    managedObjectContext.save( )
}
```

As such, via the functionality of the above pseudocode a new JobApplicationEntity record may be created with respect to each of the job listings set forth by chosenJobListingsDocNumsArray, such record setting forth the JobListingEntity document number corresponding to that job listing, as well as a newly-generated UUID, the document number of the ResumeEntity record for the at-hand applicant seeker, and also that seeker's cover letter as provided via the functionality provided by the email body-placed executable code.

Discussed hereinabove in connection with method sendEmailToSeeker(_: regardingJobListings: withUuidKey:) was functionality including constructing an email body which was customized in view of data passed into the method (e.g., with the email body setting forth the name of the at-hand targeted seeker as well as the one or more headhunter-penned job listing descriptions). According to one or more embodiments, such customized email body generation functionality may alternately or additionally act to include in the email body executable code (e.g., JavaScript executable code) which allows a seeker recipient reading the email to select one or more of particular ones of the one or more job listings announced by the email as job listings to which she desires to apply, and/or allows the user to compose one or more cover letters corresponding to those applications (e.g., the user may be able to compose one or more cover letters and, with respect to each composed cover letter, specify the one or more job listings to which the cover letter is to correspond).

Depicted via figure is an example user interface which may be displayed in such an email body in connection with the aforementioned executable-code-based functionality. Set forth in FIG. 26 are cover letter composition area 2601 (e.g., implemented via an HTML <textarea> element), checkboxes 2603 for specifying the job listings to which the composed cover letter presently set forth in composition area 2601 may correspond (e.g., implemented via one or more HTML <input> elements of type "checkbox"), "send" button 2605 (e.g., implemented via an HTML <input> element of type "button"), and "cancel" button 2607 (e.g., implemented via a HTML <input> element of type "button"). Also depicted in FIG. 26 are instructional text areas 2609, 2611, and 2613 (e.g., with each being implemented via HTML text). A seeker receiving an email which sets forth executable code (e.g., JavaScript executable code) and the user interface of FIG. 26 in connection with that executable code may be able to enter cover letter text via GUI element 2601. Then, via checkbox GUI elements 2603 the seeker user may be able to select particular ones of the one or more job listings to which she desires to apply as the job listings to which the cover letter presently set forth via 2601 may correspond. Having composed the cover letter and selected the job listings to which the cover letter may correspond, the user may press "send," thusly dispatching (e.g., via JavaScript) a to-be-discussed communication conveying information including the cover letter text and indication of the one or more job listings to which that cover letter may correspond. By pressing "clear"—GUI element 2607—the user may have the entered text of 2601 cleared away (e.g., pressing button 2607 may activate JavaScript which clears box 2601). Where, say, a seeker desires to ply different cover letters with respect to different job listings, the seeker may perform multiple rounds of entering cover letter text via GUI element 2601, selecting one or more corresponding job listings via GUI element 2603, and pressing "send" button 2605, potentially entering different cover letter text for each round.

As noted, pressing "send" button 2605 may (e.g., via JavaScript functionality) cause a communication to be dispatched. Such communication will now be discussed in greater detail. According to one or more embodiments, set forth in such communication may be the at-hand UUID key corresponding to the email which set forth the executable code (e.g., the value passed as the third parameter in the call to sendEmailToSeeker(_: regardingJobListings: withUuid-Key:) which led to the dispatch of that email), the cover letter text set forth via GUI element 2601, and indication of those one or more corresponding job listings specified via check boxes 2603.

As an illustration, such communication may be generated by the executable code of the email and may be, say, set forth via a JavaScript XMLHttpRequest object whose open method is called passing an HTTP request method type of post and a particular URL which was set forth as part of the executable code when the executable code was placed in the email body by sendEmailToSeeker(_: regardingJobListings: withUuidKey:). Moreover, the executable code of the email may set forth a HTTP body for the JavaScript XMLHttpRequest object as a string which includes, in an XML-tag delimited fashion, the noted at-hand UUID key (such UUID key perhaps being set forth for the string by sendEmailToSeeker(_: regardingJobListings: withUuidKey:) when setting forth the executable code—say JavaScript—in the body of the outgoing email), the noted cover letter text as entered in GUI element 2601, and indication of the one or more job listings to which the cover letter text may be directed as specified via GUI elements 2603. The job listings may as an example be specified via their JobListingEntity record document Numbers.

As examples, the overall string may be tagged <message> </message>, the UUID key may be tag-delimited <uuidKey> </uuidKey>, the cover letter text may be tag-delimited <coverLetter> </coverLetter>, and/or the one or more job listings may be tag-delimited <chosenJobListings> </chosenJobListings> with comma delimitation being employed to specify multiple job listings within the tags. The executable code of the email body may act to dispatch (e.g., via HTTPS) the communication by calling send( ) on the XMLHttpRequest object, passing the noted string as the sole parameter of the call. The executable code of the email body may act to perform such calling of send( ) on the XMLHttpRequest object in response to the seeker user activating GUI "send" button 2605.

As an illustration where the at-hand UUID key is "A0A309," the at-hand cover letter text is—with "\n" conveying a new line character—"I am a details-oriented worker who never misses a beat.\nHire me and you will be glad that you did.," and the corresponding job listing document numbers are "XKR888" and "JDX484," the communication dispatched to the noted URL may set forth for its HTTP body the string "<message> <uuidKey>A0A309</uuidKey> <coverLetter>I am a details-oriented worker who never misses a beat.\nHire me and you will be glad that you did.</coverLetter><chosenJobListings>XKR888, JDX484</chosenJobListings> </message>" It is noted that to facilitate discussion foreshortened values (e.g., A0A309 and JDX484 are set forth rather than full UUIDs. It is also noted that according to one or more embodiments the cover letter text may be Base64 encoded prior to placement between the <coverLetter> and </coverLetter> tags.

Although discussed in the foregoing has been employ of internet-based-email, other possibilities exist. For instance, that which has been set forth herein as being implemented via employ of, for example, internet-based-email might alternately or additionally be implemented—in analogous fashion to that which is discussed hereinabove—via other than internet-based email. As one example, a messaging system providing internet-based-email-like capabilities but which is generally limited to communication between certain users (e.g., users of one or more websites and/or one or more intranets) might alternately or additionally be employed. As one example, both such internet-based-email and such website and/or intranet-based messaging may be employed such that one or more servers or other machines act to mirror communications between the two approaches. As one illustration of such, where a user of such a website and/or such an intranet sends via internet-based email a message to another user of the website and/or the intranet, such servers and/or other machines may act so that the message is mirrored to also appear in the sending user's website and/or intranet outbox and in the recipient user's website and/or intranet inbox. As another example of such functionality, in like vein where a user of such a website and/or such an intranet sends via the website-based messaging and/or the intranet-based messaging a message to another user of the website and/or the intranet, such servers and/or other machines may act so that the message is mirrored to also appear in the sending user's internet outbox and in the receiving user's website and/or internet inbox. As another example, a messaging system providing instant messaging capabilities might alternately or additionally be implemented in analogous fashion to that which is discussed hereinabove with respect to, for instance, the employ of internet-based-email Further to that which is discussed herein with respect to method doFilterQueryForFieldInfoArray(_:) of the index-Operations object it is noted that such method may be set forth via code in line with the pseudocode:

```
func doFilterQueryForFieldInfoArray(_ theFieldInfoArray :
[FieldInfo] ) ->
[FieldInfo] {
   var scratchpadFieldInfoArray: [Fieldinfo] = theFieldInfoArray
   for scratchpadFieldInfoItem in scratchpadFieldInfoArray {
      scratchpadFieldInfoItem.qfPassDocs =
self.filterQueryForQuery(scratchpadFieldInfoItem.
searchQueryForField,
andField:
scratchpadFieldInfoItem.fieldName)
   }
   return scratchpadFieldInfoArray
}
```

As such, set forth by the pseudocode is in one aspect copying passed-in [FieldInfo] object theFieldInfoArray to [FieldInfo] object scratchpadFieldInfoArray. In another aspect the pseudocode sets forth employing a for-in loop so as to visit each FieldInfo element of scratchpadFieldInfoArray. With such visit the pseudocode sets forth calling noted filterQueryForQuery(_: andField:) where passed for the first parameter of the call is the searchQueryForField property of the at-hand visited element of scratchpadFieldInfoArray, passed for the second parameter of the call is the fieldname property of the at-hand visited element of scratchpadField-InfoArray, and where the value returned in reply to the call is placed in the qfPassDocs property of the at-hand visited element of scratchpadFieldInfoArray. With reference to that which is discussed herein with respect to the functionality of filterQueryForQuery(_: andField:) it is noted that with completion of the for-in loop each element of scratchpadFieldInfoArray may set forth via its qfPassDocs property the result of calling filterQueryForQuery(_: andField:) with respect to that element's searchQueryForField and fieldname properties. Finally set forth by the pseudocode is returning scratchpadFieldInfoArray to the caller of doFilterQueryForFieldInfoArray(_:).

With reference to that which is discussed hereinabove with respect to indexOperations object method filterQueryForQuery(_: andField:), the following is now discussed. To facilitate discussion it is reminded that this method may have the declaration:

func filterQueryForQuery(_ theSearchString :
String, andField theIndexField:
String) -> [String], the declaration being discussed in greater detail herein.

The method may in one aspect have at its disposal a method docsForTerm(_: andField:), the method being a method of a jobListingLibrarian object, an instantiation of a JobListingLibrarian class. The method may have the declaration:

func docsForTerm(_theTerm: String, andField theField: String)→[String]

As such the declaration indicates that the method may take a first parameter of type string, the first parameter having the local parameter name theTerm and no external parameter name. Also indicated by the declaration is that the method may take a second parameter of type string, the second parameter having the local parameter name theField and the external parameter name andField. Also indicated by the declaration is that the method may return a string array. The method may in an aspect act to return the docNums of job listings whose field as specified by the second parameter (e.g., "rawKwd") set forth the word indicated by the first parameter (e.g., "construction"). The method may be implemented via code in line with the following pseudocode for which managedObjectContext is taken to provide access to the at-hand managed object context:

```
var jobListingInverseIndexFetchRequest = NSFetchRequest(entityName:
"JobListingInverseIndexTermEntity")
jobListingInverseIndexFetchRequest.predicate = NSPredicate(format: "%@ ==
indexField AND %@ == term", theField, theTerm)
var jobListingInverseIndexFetchResult =
managedObjectContext.executeFetchRequest(jobListingInverseIndexFetchRequest)
var documentNumbersString =
jobListingInverseIndexFetchResult[0].valueForKey("documentNumbers")
var documentNumbersArrayToReturn =
documentNumbersString.componentsSeparatedByString(",")
return documentNumbersArrayToReturn
```

As such the pseudocode sets forth formulating and executing a fetch request which seeks JobListingInverseIndexTermEntity records which set forth passed-in theField for their indexFields and passed-in theTerm for their term fields. With reference to that which is discussed herein with respect to indexing and JobListingInverseIndexTermEntity records it is noted that such result may be expected to return a single result record, such record being accessible via the [0] element of above-indicated array jobListingInverseIndexFetchResult. As set forth above the method accesses the documentNumbers field of that record. As discussed herein with respect to indexing, such field of a JobListingInverseIndexTermEntity record sets forth job listing record docNums in a comma-delimited fashion. Via the call to componentsSeparatedByString(_:) where a comma character is passed as the sole parameter of the call, docsForTerm(_: andField:) leverages that comma-delimitation in creating an array in which each element sets forth one of the job listing records document numbers. Finally the method returns that array to its caller.

Method filterQueryForQuery(_: andField:) may further have at its disposal (e.g., via the indexOperations object to which it belongs) string array property corpusJobListingDocNumsArray which may hold via its elements the docNums of all JobListingEntity records of the corpus. It is noted that according to one or more embodiments the method may alternately or additionally have at its disposal one or more string array properties setting forth all corpus docNums of other record types (e.g., there may alternately or additionally be a string array property corpusResumeDocNumsArray which may hold the docNums of all ResumeEntity records of the corpus and/or a string array property corpusNormalizedKeywordDocNumsArray which may hold the docNums of all NormalizedKeywordEntity records of the corpus).

Method filterQueryForQuery(_: andField:) may in one aspect set forth code in line with the pseudocode:

```
var corpusJobListingDocNumsSet = Set(corpusJobListingDocNumsArray)
var searchArray = theSearchString.componentsSeparatedByString(" ")
var dcxArray = [[String]]( )
for (index, searchToken) in searchArray.enumerate( ) {
```

-continued

```
switch searchToken {
  case "AND":
    dcxArray.append([searchToken])
  case "OR":
    dcxArray.append([searchToken])
  default:
    if index != 0 {
      if searchArray[index-1] == "NOT" {
        var dftSet = Set(jobListingLibrarian.docsForTerm(searchToken,
andField: theIndexField))
        var inverseDftSet =
corpusJobListingDocNumsSet.subtract(dftSet)
        var inverseDftArray = Array(inverseDftSet)
        dcxArray.append(inverseDftArray)
      }
      else {
        dcxArray.append(jobListingLibrarian.docsForTerm(searchToken,
andField: theIndexField))
      }
    }
    else {
      dcxArray.append(jobListingLibrarian.docsForTerm(searchToken,
andField: theIndexField))
    }
  }
}
```

Reflecting on the above pseudocode it is noted that with the completion of the for-in loop object dcxArray of type [[String]]( )—that is to say of type array of string arrays—may have elements tracking the components of passed-in theSearchString, maintaining Boolean operators AND and OR, but in one aspect replacing search words which are not preceded by NOT with the document numbers of those job listing records which set forth that word in their fields as specified by theIndexField and in another aspect replacing search words which are preceded by NOT with the document numbers of those job listing records which do not set forth that word in their fields as specified by theIndexField.

As an illustration, suppose that theSearchString set forth "NOT construction AND management AND planning" and that theIndexField set forth "nrmKwd." With completion of the for-in loop dcxArray may set forth as its first element an array listing the docNums of those job listing records of the corpus which do not set forth "construction" via their nrmKwd fields, as its second element a single element array setting forth "AND," as its third element an array listing the docNums of those job listing records of the corpus which do set forth "management" via their nrmKwd fields, as its fourth element a single element array setting forth "AND," and as its fifth element an array listing the docNums of those job listing records of the corpus which do set forth "planning" via their nrmKwd fields.

In another aspect, the method mat set forth code in line with the pseudocode:

```
for var index = 0; index <= (dcxArray.count-1); index++ {
  if dcxArray[index] == ["AND"] {
    var leftSet = Set(dcxArray[index-1])
    var rightSet = Set(dcxArray[index]+1)
    var andAnswer = leftSet.intersect(rightSet)
    dcxArray[index+1] = [String](andAnswer)
    dcxArray.removeAtIndex(index-1)
    dcxArray.removeAtIndex(index-1)
    index = index - 1
  }
  if dcxArray[index] == ["OR"] {
    var leftSet = Set(dcxArray[index-1])
    var rightSet = Set(dcxArray[index]+1)
```

-continued

```
    var orAnswer = leftSet.union(rightSet)
    dcxArray[index+1] = [String](orAnswer)
    dcxArray.removeAtIndex(index-1)
    dcxArray.removeAtIndex(index-1)
    index = index - 1
  }
}
return dcxArray[0]
```

Reflecting on the above pseudocode it is noted that dcxArray as it stands subsequent to the presently-discussed for-in loop may—in agreement with the Boolean expression of theSearchString being in the form of an enterable search query—be interpreted in left-to-right reading order. In particular, the left-to-right interpretation of dcxArray applies set operations—intersection in the case of AND and union in the case of OR—to find the set of docNums which satisfies the Boolean expression set forth by dcxArray. As an illustration, suppose that dcxArray at the termination of the for-in loop set forth:

[["1", "3", "5", "7"], ["AND"], ["1", "2", "3"], ["OR"], ["6", "12"]], wherein simplified docNums are set forth to facilitate discussion. Via the noted set operations which are applied in left-to-right reading order, dcxArray may come to set forth [["1", "3", "6", "12"]]. Such reflects firstly performing an intersection operation between ["1", "3", "5", "7"] and ["1", "2", "3"], then secondly performing a union operation between ["1", "3"] and ["6", "12"] to yield ["1", "3", "6", "12"].

The pseudocode return dcxArray[0] may provide the outcome of the set operations as the outcome of the method. It is noted that the specification of [0] reflects that, due to the dcxArray-modifying nature of that which is set forth by the pseudocode, dcxArray may be a single element array whose sole element may be an array setting forth the desired outcome of the method (e.g., an outcome perhaps viewable as being the docNums of those records whose fields as specified by theIndexField satisfy the Boolean expression set forth via theSearchString). Via the specification of [0]

that single element of dcxArray—and thusly the array setting forth the desired outcome of the method—may be returned to the caller of the method.

Further to that which is discussed herein with respect to method rankForFieldInfoArray(_: andFieldJoiner:) of the indexOperations object, the following is now set forth. To facilitate discussion it is reminded that the method may have the declaration:

```
func rankForFieldInfoArray(inout _ theFieldInfoArray: [FieldInfo],
  andFieldJoiner theFieldJoiner: FieldJoinerKind) -> [(String, Double)]
``` the declaration being discussed in greater detail herein. It is noted that such method may in an aspect set forth code in line with the pseudocode:

```
if theFieldJoiner == FieldJoinerKind.And {
  theFieldInfoArray =
    self.andFieldsHandlerForFieldInfoArray(theFieldInfoArray)
}
```

As such—under the circumstance where passed-in theFieldJoiner sets for FieldJoinerKind.And—the method may modify passed-in theFieldInfoArray to set forth the result of passing theFieldInfoArray as the sole parameter of a call to andFieldsHandlerForFieldInfoArray(_:), a method which is discussed in greater detail herein. Next rankForFieldInfoArray(_: andFieldJoiner:) may visit each element of intaken theFieldInfoArray—say via a for in-loop whose code includes code in line with the pseudocode for fieldInfoItem in theFieldInfoArray—and in connection with such visitation may employ code in line with the pseudocode:

```
var rawTokensArray =
fieldInfoItem.searchQueryForField.componentsSeparatedByString(" ")
for var i = 0; i <= (rawTokensArray.count - 1); i++ {
  if (rawTokensArray[i] != "AND") && (rawTokensArray[i] != "OR")
&& (rawTokensArray[i] != "NOT") {
    fieldInfoItem.strippedQueryForField.append(rawTokensArray[i])
  }
  if rawTokensArray[i] == "NOT" {
    i = i +1
  }
}
```

As such the method may act to populate the strippedQueryForField property of the at-hand visited element of theFieldInfoArray (e.g., of fieldInfoItem where the noted for-in loop is employed). In particular such strippedQueryForField property of the visited element may reflect that element's searchQueryForField property but lacking AND, OR, NOT, and also terms preceded by NOT. It is observed that the above pseudocode achieves such lack of terms preceded by NOT via the indicated i=i+1 which occurs under the circumstance of rawTokensArray[i]=="NOT" evaluating to true. Such increment may cause the for loop to skip over the term preceded by NOT, thusly eliminating the potential for the loop to add that term to the at-hand strippedQueryForField property.

In another aspect the method may further in connection with the noted theFieldInfoArray element visitation employ code in line with the pseudocode:

```
var unNormedDocScoresDict: [String:Double] = [String:Double]( )
for qfDoc in fieldInfoItem.qfPassDocs {
  for token in fieldInfoItem.strippedQueryForField {
    var resultScore = self.calculateScoreForTerm(token,
  forDocumentNumber: qfDoc, andFieldName: fieldInfoItem.fieldName)
    if unNormedDocScoresDict[qfDoc] == nil {
      unNormedDocScoresDict[qfDoc] = resultScore
    }
    else {
      unNormedDocScoresDict[qfDoc] =
  unNormedDocScoresDict[qfDoc] + resultScore
    }
  }
}
```

As such the method may, for the at-hand element of theFieldInfoArray (e.g., fieldInfoItem), visit each of the docNums listed by that element's qfPassDocs property. Then for the at-hand docNum the method may visit each word (see, for example, object token in the pseudocode) of the at-hand strippedQueryForField property and call referenced above—and discussed in greater detail herein—method calculateScoreForTerm(_: forDocumentNumber: andFieldName:). The method may then add that which is returned in reply to the method call to the running score total for that docNum as held by dictionary unNormedDocScoresDict.

In a further aspect the method may—also in connection with the noted theFieldInfoArray element visitation—employ code in line with the pseudocode:

```
var normDict: [String:Double] = [String:Double]( )
for qfDoc in fieldInfoItem.qfPassDocs {
  for token in fieldInfoItem.strippedQueryForField {
    var normContrib = self.calculateNormContribForTerm(token,
  forDocumentNumber: qfDoc, andFieldName: fieldInfoItem.fieldName)
    if normDict[qfDoc] == nil {
      normDict[qfDoc] = normContrib
    }
    else {
      normDict[qfDoc] = normDict[qfDoc] + normContrib
    }
  }
}
```

As such the method may act in the vein of that which is discussed hereinabove with respect to the call to calculateScoreForTerm(_: forDocumentNumber: andFieldName:) and the addition to the noted running score total held by unNormedDocScoresDict, but in one aspect instead calling discussed hereinabove—and discussed in greater detail hereinbelow—method calculateNormContribForTerm(_: forDocumentNumber: andFieldName:), and in another aspect instead adding that which is returned in reply to the different method call to the running norm total for that docNum as held by dictionary normDict.

In yet another aspect the method may—further in connection with the noted theFieldInfoArray element visitation—employ code in line with the pseudocode:

```
for qfDoc in fieldInfoItem.qfPassDocs {
  normDict[qfDoc] = 1/pow(normDict[qfDoc],0.5)
}
```

As such the method may visit each dictionary entry of normDict which was placed via the last-discussed pseudocode, and alter such entry to set forth one over the square root of its value.

In a further aspect the method may—again in connection with the noted theFieldInfoArray element visitation—employ code in line with the pseudocode:

```
var normedDocScoresDict: [String:Double] = [String:Double]( )
for qfDoc in fieldInfoItem.qfPassDocs {
    normedDocScoresDict[qfDoc] = unNormedDocScoresDict[qfDoc] *
      normDict[qfDoc]
}
fieldInfoItem.scoresForQfPassDocs = normedDocScoresDict
```

As such the method may create new dictionary normedDocScoresDict and have each qfDoc entry thereof set forth as its value the product of that which unNormedDocScoresDict sets forth for that docNum and that which normDict sets forth for that docNum, thusly causing normedDocScoresDict to set forth for each of its docNums a score with normalization applied. Then, via fieldInfoItem.scoresForQfPassDocs=normedDocScoresDict the scoresForQfPassDocs property of the at-hand visited element of theFieldInfoArray may be set to reflect normedDocScoresDict. Such application of normalization may facilitate cross-query comparison of scores. Subsequent to the code which corresponds to the above-set pseudocode the method may terminate the noted visitation of each element of the intaken theFieldInfoArray (e.g., the noted for-in loop setting forth code including code in line with the pseudocode for fieldInfoItem in theFieldInfoArray may terminate).

Next the method may employ code in line with the pseudocode:

```
var inclusiveDocNumbersSet: NSMutableSet = NSMutableSet( )
for fieldInfoItem in theFieldInfoArray {
    inclusiveDocNumbersSet.addObjectsFromArray(fieldInfoItem.qfPassDocs)
}
```

Bearing in mind that via the Swift/Apple frameworks pseudocode employed herein an NSMutableSet object may provide functionality including maintaining only one copy of a given object even though such object may be added to the set multiple times, it is noted that NSMutableSet object inclusiveDocNumbersSet may come via the above-placed to hold one copy of each docNum occurring among the various qfPassDocs properties of the various elements of theFieldInfoArray.

Still further the method may employ code in line with the pseudocode:

```
var summedScoresForDocsDict: [String : Double] = [String : Double]( )
for fieldInfoItem in theFieldInfoArray {
    for inclusiveDocNumber in inclusiveDocNumbersSet {
        if fieldInfoItem.scoresForQfPassDocs[inclusiveDocNumber as
          String != nil
        {
            if summedScoresForDocsDict[inclusiveDocNumber as String] ==
              nil {
                summedScoresForDocsDict[inclusiveDocNumber as String] =
fieldInfoItem.scoresForQfPassDocs[inclusiveDocNumber as String]
            }
            else {
                summedScoresForDocsDict[inclusiveDocNumber as String] =
summedScoresForDocsDict[inclusiveDocNumber as String] +
fieldInfoItem.scoresForQfPassDocs[inclusiveDocNumber as String]
            }
        }
    }
}
```

As such the method may iterate through each element of theFieldInfoArray and each document number of inclusiveDocNumbersSet in pursuit of loading dictionary object summedScoresForDocsDict to set forth for each document number of inclusiveDocNumbersSet the sum of the normalized scores indicated for that document number among the various elements of theFieldInfoArray.

Finally, the method may employ code in line with the pseudocode:

```
var summedScoresForDocsTupleArray: [(String, Double)] =
  Array(summedScoresForDocsDict)
var sortedSummedScoresForDocsTupleArray: [(String, Double)] =
  summedScoresForDocsTupleArray.sort({$0.1 > $1.1})
return sortedSummedScoresForDocsTupleArray
```

As such the method may formulate summedScoresForDocsTupleArray which may be an array of tuples based on discussed summedScoresForDocsDict. Bearing in mind that summedScoresForDocsDict sets forth document numbers as keys and corresponding normalized scores as values, thusly formulated summedScoresForDocsTupleArray may set forth via each of its elements a tuple whose 0 component sets forth a document number key of summedScoresForDocsDict, and whose 1 component sets forth the corresponding normalized score as indicated by summedScoresForDocsDict.

Then via code in line with the next pseudocode line the method may formulate sortedSummedScoresForDocsTupleArray which corresponds to summedScoresForDocsTupleArray but with the elements thereof sorted such that elements indicating higher scores are listed earlier in the array. Finally via code in line with the last of the above-set pseudocode lines the method may return sortedSummedScoresForDocsTupleArray to its caller, after which the method may terminate.

Further to that which is discussed herein with respect to andFieldsHandlerForFieldInfoArray(_:) of the indexOperations object the following is now set forth. To facilitate discussion it is reminded that the method may have the declaration:

```
func andFieldsHandlerForFieldInfoArray(_ theFieldInfoArray:
  [FieldInfo]) -> [FieldInfo],
``` the declaration being discussed in greater detail hereinabove. The method may, in one aspect, set forth code in line with the pseudocode:

```
var exclusiveDocNumbersSet: Set<String> = Set<String>( )
for fieldInfoItem in theFieldInfoArray {
    if exclusiveDocNumbersSet.isEmpty {
        exclusiveDocNumbersSet = Set<String>(fieldInfoItem.qfPassDocs)
    }
    else {
        exclusiveDocNumbersSet =
exclusiveDocNumbersSet.intersect(fieldInfoItem.qfPassDocs)
    }
}
```

As such the method may employ a for-in loop in visiting each element of theFieldInfoArray. Via the employ of intersection set operations between that which is set forth by the qfPassDocs properties of the elements of theFieldInfoArray, exclusiveDocNumbersSet may come to hold only those docNums which are included in every qfPassDocs property found among the elements of theFieldInfoArray.

As an illustration, suppose that theFieldInfoArray had three elements—a first element whose qfPassDocs property set forth ["11", "5", "16", "3", "8"], a second element whose qfPassDocs property set forth ["12", "8", "11", "9", "3"], and a third element whose qfPassDocs property set forth ["2", "5", "8", "3", "11"]. Under such circumstance, via code in line with the above pseudocode exclusiveDocNumbersSet may come to hold "3," "8," and "11" as it is these which are found in each of the at-hand qfPassDocs properties. It is noted that to facilitate discussion integer-style document numbers are set forth rather than, say, UUIDs.

In another aspect the method may set forth code in line with the pseudocode:

```
var cutdownFieldInfoArray: [FieldInfo] = theFieldInfoArray
for cutdownFieldInfoItem in cutdownFieldInfoArray {
   cutdownFieldInfoItem.qfPassDocs = [String](exclusiveDocNumbersSet)
}
return cutdownFieldInfoArray
```

As such the method may in an aspect instantiate object cutdownFieldInfoArray as a copy of passed-in theFieldInfoArray. Next the method may set the qfPassDocs property of each element of cutdownFieldInfoArray to reflect that which is set forth by exclusiveDocNumbersSet, thusly causing each qfPassDocs property of cutdownFieldInfoArray to hold those docNums which were included in every qfPassDocs property of theFieldInfoArray.

After this the method may return cutdownFieldInfoArray to its caller and the method may end.

Further to that which is discussed hereinabove with respect to method calculateScoreForTerm(_: forDocumentNumber: andFieldName:) of the indexOperations object the follows is now set forth. As will be set forth herein the method may perform operations including calculating a product for which a higher determined value thereof may be indicative of increased relevancy:

reflect the number of times that theTerm appears among all documents (e.g., all job listings), and in particular by—as indicated herein being set forth in terms of an inverse—act such that theTerm appearing a greater number of times among such all documents may serve to reduce the calculated product. Such may perhaps be viewed as reflecting that a document (e.g., job listing) setting forth a term which is also found commonly among all documents indicates that such document setting forth the term is not suggestive of high relevancy of that document because the term is merely a common one.

The termBoostDoubleForTheDocumentNumber component of the product may—with reference to that which is discussed herein—reflect a multiplier value which may be set with respect to a certain term of a certain document (e.g., the term "construction" might be given a multiplier of greater than one with respect to a given job listing thereby leading to a higher calculated product, or to less than one thereby leading to a lower calculated product). In the vein of that which has been discussed herein, such value may be set by a system administrator, in an automated fashion, and/or in an automated assist fashion. For instance, in the vein of that which has been discussed herein different boost values may be employed with respect to different user pools and/or for different periods of time, with the results being compared and a boost value selected which, in view of such testing, leads to more positive results (e.g., a larger number of views and/or applications with respect to the job listing). Jumping ahead to the last component of the product—to with fieldBoostDoubleForTheDocumentNumber—such component may, with reference to that which is discussed herein, be a multiplier in the vein of the last-discussed product component, but rather than being with respect to a certain term of a certain document being with respect to the entirety of a given field (e.g., nrmKwd) of a certain document (e.g., job listing). Accordingly, such field-corresponding multiplier may come into play with respect to each word set forth by the given field of the given document. In analogous vein to that which was discussed with respect to termBoostDoubleForTheDocumentNumber, fieldBoostDoubleForTheDocu-

```
squareRootOfTermFrequencyDoubleForTheDocumentNumber *
pow(weightedInverseDocumentFrequency,2) *  termBoostDoubleForTheDocumentNumber *
fieldLengthNorm * fieldBoostDoubleForTheDocumentNumber
```

Such squareRootOfTermFrequencyDoubleForTheDocumentNumber may, with reference to that which is discussed herein, reflect the quantity of times that passed-in theTerm appears in the field specified by passed-in theField of the record indicated by passed-in theDocumentNumber. The set forth application of square root may act such that changes in term frequency do not linearly change the calculated sum, such choice of square root application perhaps being viewable as considering term frequency's effect on relevancy score to not be worthy of such a linear role.

Turning to the second component of the product, such may—with reference to that which is discussed herein— mentNumber may be set by a system administrator, and/or and in automated and/or automated-assist fashion.

Returning now to the fieldLengthNorm component of the product, such component may—with reference to that which is discussed herein—reflect the length of the at-hand field (e.g., nrmKwd) and act such that increasing field length drives the product lower and decreasing field length drives the product higher. Such product component may perhaps be thought of as acting from the point of view that increased field length increases the likelihood of any given word appearing therein (e.g., a field with one thousand words may be more likely to poses any randomly selected dictionary word than a field with fifteen words).

Method calculateScoreForTerm(_: forDocumentNumber: andFieldName:) may have the declaration:

```
func calculateScoreForTerm(_ theTerm: String, forDocumentNumber
theDocumentNumber: String, andFieldName theFieldName: String) -> Double
```

As such the declaration indicates that method may take a first parameter of type string, the first parameter having the local parameter name theTerm and having no external parameter name. The declaration further indicates that the method may take a second parameter of type string, the second parameter having the local parameter name theDocumentNumber and the external parameter name forDocumentNumber. Still further indicated by the declaration is that the method may take a third parameter of type string, the third parameter having the local parameter name theFieldName and the external parameter name andFieldName. Also indicated by the declaration is that the method may return a double.

The method may in one aspect set forth code in line with the pseudocode for which managedObjectContext is taken to provide access to the at-hand managed object context:

```
var jobListingInverseIndexFetchRequest = NSFetchRequest(entityName:
"JobListingInverseIndexTermEntity")
jobListingInverseIndexFetchRequest.predicate = NSPredicate(format: "%@ ==
indexField AND %@ == term", theFieldName, theTerm)
var jobListingInverseIndexFetchResult =
managedObjectContext.executeFetchRequest(jobListingInverseInfexFetchRequest)
var docNumsString: String =
jobListingInverseIndexFetchResult[0].valueForKey("documentNumbers")
var termFrequencyString: String =
jobListingInverseIndexFetchResult[0].valueForKey("termFrequency")
```

As such the method may, for example, act to formulate and execute a fetch request which seeks JobListingInverseIndexTermEntity records which set forth passed-in theFieldName for their indexField fields and passed-in theTerm for their term fields. With reference to that which is discussed herein (e.g., with respect to indexing) it is noted that execution of the fetch request may be expected to return a single JobListingInverseIndexTermEntity record, such record being available via index [0] of array jobListingInverseIndexFetchResult.

Further as such via code in line with the above pseudocode the method may act to access that which the retrieved JobListingInverseIndexTermEntity record sets forth via its documentNumbers field and place it in string object docNumsString, and to access that which the retrieved record sets forth via its termFrequency field and place it in string object termFreqsString.

In another aspect the method may employ code in line with the pseudocode:

```
var docNumsArray = docNumsString.componentsSeparatedByString(",")
var termFreqsArray = termFreqsString.componentsSeparatedByString(",")
```

As such the method may cast strings docNumsString and termFreqsString as, respectively, string arrays docNumsArray and termFreqsArray. As discussed herein, JobListingInverseIndexTermEntity records may employ comma delimitation with respect to their documentNumbers and termFrequency fields. In keeping with this a comma character is passed as the parameter in the above calls to componentsSeparatedByString(_:), thusly leveraging such comma delimitation in mapping the strings to string arrays (e.g., each element of docNumsArray may set forth a document number and each element of termFreqsArray may set forth a term frequency value).

In a further aspect the method may set forth code in line with the pseudocode:

```
var indexOfTheDocumentNumber = docNumsArray.indexOf(theDocumentNumber)
if indexOfTheDocumentNumber == nil {
    var score = Double(0)
    return score
}
var termFrequencyStringForTheDocumentNumber =
termFreqsArray[indexOfTheDocumentNumber]
```

The noted documentNumbers and termFrequency fields may each set forth data in a comma-delimited fashion. Moreover, the comma delimitation of these two fields may be yoked such that comma-delimited position p of the termFrequency field may give the term frequency value which corresponds to the document number indicated by comma-delimited position p of the documentNumbers field. Flowing from this, in keeping with the discussed loading of docNumsArray and termFreqsArray which leverages such comma delimitation, element [e] of termFreqsArray may provide the term frequency value which corresponds to the document number indicated by element [e] of docNumsArray. In keeping with this, the above pseudocode portion var indexOfTheDocumentNumber=docNumsArray.indexOf (theDocumentNumber) may cause—under the circumstance where docNumsArray holds passed-in theDocumentNumber—indexOfTheDocumentNumber to hold the index number of the element of docNumsArray which sets forth theDocumentNumber. Bearing in mind the discussed yoking, such index number indicates the element of termFreqsArray which sets forth the term frequency which corresponds to theDocumentNumber. In keeping with this the pseudocode sets forth var termFrequencyStringForTheDocumentNumber= termFreqsArray[indexOfTheDocumentNumber], thusly causing termFrequencyStringForTheDocumentNumber to hold the term frequency which corresponds to theDocumentNumber.

However, the possibility exists that docNumsArray does not set forth passed-in theDocumentNumber. Such may transpire for instance, under the circumstance of an OR-bearing search query as such may yield a qfPassDocs document number which corresponds to a document (e.g., a job listing) which sets forth fewer than all words of the query. As an illustration, suppose OR-bearing search query "management OR construction." A qfPassDocs document corresponding thereto may have satisfied the Boolean expression of the query by including via the at-hand field only "management" of the query, only "construction" of the query, or both words of the query. Continuing with the example, suppose that calculateScoreForTerm(_: forDocumentNumber: andFieldName:) is called such that its passed parameters convey the word "management," such a qfPassDocs document which sets forth "construction" but not "management," and the relevant field name. Noted object indexOfTheDocumentNumber may hold nil because the inverse index record corresponding to "management" and the at-hand field may—in view of the at hand qfPassDocs document not including "management" for the at-hand field—not set forth the docNum of that qfPassDocs document in its documentNumbers field. Under such circumstance the relevancy score for theTerm with respect to that qfPassDocs document may be zero (e.g., a term frequency of zero may lead to a zero result for the discussed score product due to the zero property of multiplication). In view of this the pseudocode sets forth returning zero under the circumstance of indexOfTheDocumentNumber holding nil, thusly ending the method early.

As noted, the method may end early under the circumstance where indexOfTheDocumentNumber is found to hold nil. That which follows regarding calculateScoreForTerm(_: forDocumentNumber: andFieldName:) corresponds to the circumstance where such nilness is not found.

Method calculateScoreForTerm(_: forDocumentNumber: andFieldName:) may, in another aspect, set forth code in line with the following pseudocode for which numberOfJobListingDocuments is a property of type double of the indexOperations object which sets forth the quantity of JobListingEntity records in the corpus, and for which managedObjectContext is taken to provide access to the at-hand managed object context:

```
var documentFrequencyFetchRequest = NSFetchRequest(entityName:
"JobListingDocumentFrequencyEntity")
documentFrequencyFetchRequest.predicate = NSPredicate(format: "%@ == term",
theTerm)
var documentFrequencyFetchResult =
mangedObjectContext.executeFetchRequest(documentFrequencyFetchRequest)
var rawDocumentFrequencyString =
documentFrequencyFetchResult[0].valueForKey("docFrequency")
var fieldNamesString = documentFrequencyFetchResult[0].valueForKey("indexField")
var rawDocumentFrequencyArray =
rawDocumentFrequencyString.componentsSeparatedByString(",")
var fieldNamesArray = fieldNamesString.componentsSeparatedByString(",")
var indexOfTheFieldName = fieldNamesArray.indexOf(theFieldName)
var rawDocumentFrequencyAsStringForTheFieldName =
rawDocumentFrequencyArray[indexOfTheFieldName]
var rawDocumentFrequencyAsDoubleForTheFieldName =
Double(rawDocumentFrequencyAsStringForTheFieldName)
var weightedInverseDocumentFrequency = 1 + log(numberOfJobListingDocuments /
(rawDocumentFrequencyAsDoubleForTheFieldName + 1) )
```

As such, via the foregoing the method may act to formulate noted above object weightedInverseDocumentFrequency. As referenced herein a JobListingDocumentFrequencyEntity record may set forth, with respect to the word of its term field, the number of times that such word occurs among all job listings of the corpus within each of the job listing fields (e.g., nrmKwd) set forth by its indexField field. In particular, in the vein of that which has been discussed herein with respect to JobListingInverseIndexTermEntity records the indexField and docFrequency fields may set forth their data in a comma-delimited fashion, and moreover the comma delimitation of these two fields may be yoked such that comma-delimited position p of the docFrequency field may set forth the value which corresponds to the field set forth at comma-delimited position p of the indexField field. Via the above pseudocode the method formulates and executes a fetch request for the JobListingDocumentFrequencyEntity record which corresponds to passed in theTerm. Bearing in mind that which is discussed herein such request may be expected to yield a single record available via element [0] of documentFrequencyFetchResult. Then—in the vein of that which has been discussed hereinabove with respect to jobListingInverseIndexFetchResult—the noted yoked comma-delimitation between JobListingDocumentFrequencyEntity fields indexField and docFrequency, object rawDocumentFrequencyAsDoubleForTheFieldName comes to hold that which the fetched JobListingDocumentFrequencyEntity record indicates to be the number of times that the word of passed-in theTerm appears—within in the field as specified by passed-in theFieldName—among all job listings of the corpus. Then such object is employed in calculating weightedInverseDocumentFrequency. As set forth by the pseudocode, the calculation for weightedInverseDocumentFrequency reflects the ratio between the number of job listings in the corpus and the number of times that theTerm occurs within theFieldName among all job listings of the corpus, thusly quantifying that which may perhaps be viewed as the rarity of theTerm.

Recalling noted termFrequencyStringForTheDocumentNumber, via code in line with following pseudocode calculateScoreForTerm(_: forDocumentNumber: andFieldName:) may act to apply termFrequencyStringForTheDocumentNumber formulating discussed-above product component squareRootOfTermFrequencyDoubleForTheDocumentNumber:

```
var termFrequencyDoubleForTheDocumentNumber =
Double(termFrequencyStringForTheDocumentNumber)
var squareRootOfTermFrequencyDoubleForTheDocumentNumber =
sqrt(termFrequencyDoubleForTheDocumentNumber)
```

Via code in line with the following pseudocode method calculateScoreForTerm(_: forDocumentNumber: andFieldName:) may act to formulate discussed-above product component termBoostDoubleForTheDocumentNumber:

```
var termBoostsString =
jobListingInverseIndexFetchResult[0].valueForKey("termBoost")
var termBoostsArray = termBoostsString.componentsSeparatedByString(",")
var termBoostStringForTheDocumentNumber =
termBoostsArray[indexOfTheDocumentNumber]
var termBoostDoubleForTheDocumentNumber =
Double(termBoostStringForTheDocumentNumber)
```

As such the method may act in the vein of that which is discussed hereinabove with respect to establishment of termFrequencyDoubleForTheDocumentNumber to establish termBoostDoubleForTheDocumentNumber, with the nilness check of indexOfTheDocumentNumber already having been performed with the establishment of termFrequencyDoubleForTheDocumentNumber.

Via code in line with the following pseudocode—for which managedObjectContext is taken to provide access to the at-hand managed object context—method calculateScoreForTerm(_: forDocumentNumber: andFieldName:) may act to formulate discussed-hereinabove product components fieldBoostDoubleForTheDocumentNumber and fieldLengthNorm:

```
var fieldDataFetchRequest = NSFetchRequest(entityName:
"JobListingFieldDataEntity")
fieldDataFetchRequest.predicate = NSPredicate(format: "%@ == docNum"
theDocumentNumber)
var fieldDataFetchResult =
managedObjectContext.executeFetchRequest(fieldDataFetchRequest)
var fieldNamesStringForFieldData =
fieldDataFetchResult[0].valueForKey("fieldNames")
var fieldBoostsStringForFieldData =
fieldDataFetchResult[0].valueForKey("fieldBoosts")
var fieldLengthsStringForFieldData =
fieldDataFetchResult[0].valueForKey("fieldLengths")
var fieldNamesArrayForFieldData =
fieldNamesStringForFieldData.componentsSeparatedByString(",")
var fieldBoostsArrayForFieldData =
fieldBoostsStringForFieldData.componentsSeparatedByString(",")
var fieldLengthsArrayForFieldData =
fieldLengthsStringForFieldData.componentsSeparatedByString(",")
var indexOfTheFieldNameForFieldData =
fieldNamesArrayForFieldData.indexOf (theFieldName)
var fieldBoostStringForTheDocumentNumber =
fieldBoostsArrayForFieldData[indexOfTheFieldNameForFieldData]
var fieldBoostDoubleForTheDocumentNumber =
Double(fieldBoostStringForTheDocumentNumber)
var fieldLengthStringForTheDocumentNumber =
fieldLengthsArrayForFieldData[indexOfTheFieldNameForFieldData]
var fieldLengthDoubleForTheDocumentNumber =
Double(fieldLengthStringForTheDocumentNumber)
var fieldLengthNorm = sqrt(fieldLengthDoubleForTheDocumentNumber)
```

As such, in the vein of the above-discussed the method may fetch a JobListingFieldDataEntity record corresponding to passed-in theDocumentNumber. As discussed herein, a JobListingFieldDataEntity record sets forth for each field of a job listing a field boost and a field length, the JobListingFieldDataEntity record employing discussed-herein yoked comma delimitation in doing so. The above pseudocode sets forth leveraging, in a manner akin to that which has been discussed herein, such yoked comma delimitation in accessing that which the fetched JobListingFieldDataEntity record indicates to be the at-hand field boost and placing such, in double form, in object fieldBoostDoubleForTheDocumentNumber, and in accessing that which the fetched JobListingFieldDataEntity record indicates to be the at-hand field length and placing such, in double form, in object fieldLengthDoubleForTheDocumentNumber. Such fieldBoostDoubleForTheDocumentNumber provides the discussed product component. The method calculates the square root of fieldLengthDoubleForTheDocumentNumber to yield discussed product component fieldLengthNorm.

Finally the method ends by calculating the noted product and returning it as the result of the method:

```
var score: Double = squareRootOfTermFrequencyDoubleForTheDocumentNumber *
pow(weightedInverseDocumentFrequency, 2) * termBoostDoubleForTheDocumentNumber *
fieldLengthNorm * fieldBoostDoubleForTheDocumentNumber
return score
```

Further to that which is discussed hereinabove with respect to method calculateNormContribForTerm(_: forDocumentNumber: andFieldName:) of the indexOperations object the following is now set forth. To facilitate discussion, it is reminded that the method may have the declaration:

```
func calculateNormContribForTerm(_ theTerm: String, forDocumentNumber
theDocumentNumber: String, andFieldName theFieldName: String) -> Double,
``` the declaration being discussed in greater detail hereinabove.

The method may act in a manner analogous to that which is discussed hereinabove with respect to calculateScoreForTerm(_: forDocumentNumber: andFieldName:) to establish there-discussed objects weightedInverseDocumentFrequency and termBoostDoubleForTheDocumentNumber. Method calculateNormContribForTerm(_: forDocumentNumber: andFieldName:) may then ply these objects in calculating normContrib and returning normContrib as the result of the method via code in line with the pseudocode:

```
var normContrib: Double = pow(weightedInverseDocumentFrequency *
termBoostDoubleForTheDocumentNumber, 2)
return normContrib
```

As such the method determines the product of noted weightedInverseDocumentFrequency and termBoostDoubleForTheDocumentNumber, squares the result, and returns the result as the output of the method.

Further to that which is discussed herein with respect to method feedWithDocNumAndScoreTupleArray(_: forField: andTokenSeparator: andPunctateDepth:) of the indexOperations object the following is now set forth. To facilitate discussion it is reminded that the method may have the declaration:

```
func feedWithDocNumAndScoreTupleArray(_ theDocNumAndScoreTupleArray: [(num:
String, score: Double)], forField theField: String, andTokenSeparator
theTokenSeparator: String, andPunctateDepth thePunctateDepth: Int) ->
[(fieldVal: String, count: Int, score: Double)],
``` the declaration being discussed in greater detail hereinabove.

The method may in an aspect employ code in line with the following pseudocode, for which managedObjectContext is taken to provide access to the at-hand managed object context:

```
var expandedTupleArray: [(num: String, score: Double, fieldVal: String)] = [(num:
String, score: Double, fieldVal: String)]( )
for docNumAndScoreTuple in theDocNumAndScoreTupleArray {
var fieldValForFieldNameFetchRequest = NSFetchRequest(entityName:
"JobListingEntity")
fieldValForFieldNameFetchRequest.predicate = NSPredicate(format: "%@ == docNum",
docNumAndScoreTuple.num)
var fieldValForFieldNameFetchResult =
managedObjectContext.executeFetchRequest(fieldValForFieldNameFetchRequest)
var fieldValTemp = fieldValForFieldNameFetchResult[0].valueForKey(theField)
```

As such the method may instantiate object expandedTupleArray, a tuple array of the set forth type. Further as such the method may enter a for-in loop which visits each tuple element of passed-in theDocNumAndScoreTupleArray. Still further, the method may perform JobListingEntity record operations in the vein of those discussed herein to learn that which the job listing record corresponding to the at-hand visited element of theDocNumAndScoreTupleArray (e.g., the job listing record whose docNum is that specified by the num component of that visited element) sets forth for its field as specified by passed-in theField. Shown by the pseudocode is placing such learned job listing record field value in object fieldValTemp.

Further within the noted for-in loop which visits each tuple element of theDocNumAndScoreTupleArray the method may employ code in line with the pseudocode, with the method closing such for-in loop subsequent to that which is set forth below:

```
if fieldValTemp.containsString(theTokenSeparator) {
    var tokenArray: [String] =
fieldValTemp.componentsSeparatedByString(theTokenSeparator)
    for token in tokenArray {
        var tupleToAdd = (num: docNumAndScoreTuple.num, score:
docNumAndScoreTuple.score, fieldVal: token)
        expandedTupleArray.append(tupleToAdd)
    }
}
else {
    var tupleToAdd = (num: docNumAndScoreTuple.num, score:
docNumAndScoreTuple.score, fieldVal: fieldValTemp)
    expandedTupleArray.append(tupleToAdd)
}
```

As such, the method may employ the set-forth call to containsString(_:) to determine whether or not the learned job listing record field value as referenced by fieldValTemp sets forth delimited data (e.g., comma-delimited data). The circumstance of the learned field not setting forth comma-delimited data may transpire, for instance, where the learned job listing record field sets forth only one data item (e.g., a job listing nrmTtl field setting forth only a single normalized job title).

Where such determination finds the learned job listing record field to not set forth delimited data (e.g., comma-delimited data) that which is set forth via the above-set else substatement may be executed. In particular executed may be adding to noted expandedTupleArray a tuple which sets forth for its num component the job listing document number set forth by the num component of the at-hand visited element of theDocNumAndScoreTupleArray, sets forth for its score component the score set forth by the score component of the at-hand visited element of theDocNumAndScoreTupleArray, and sets forth for its fieldVal component the learned job listing record field value as reflected by fieldValTemp.

Where the noted delimited data determination finds the learned job listing record field to set forth delimited data (e.g., comma-delimited data), that which is set forth via the above-set if substatement may be executed. In particular executed may be adding to expandedTupleArray—with respect to each of the delimitedly-placed data items of the fetched job listing field—a tuple in the vein of that which was discussed in connection with the else sub statement.

Finally, feedWithDocNumAndScoreTupleArray(_: forField: andTokenSeparator: andPunctateDepth:) may employ code in line with the pseudocode:

```
var result=self.punctateForExpandedTupleArray(expandedTupleArray,
andPunctateDepth: thePunctateDepth)
return result
```

As such feedWithDocNumAndScoreTupleArray(_: forField: andTokenSeparator: andPunctateDepth:) may call method punctateForExpandedTupleArray(_: andPunctateDepth:), a method which is discussed hereinabove and is discussed in greater detail hereinbelow. In particular passed for the first parameter of the call may be discussed expandedTupleArray and passed for the second parameter of the call may be thePunctateDepth as received by feedWithDocNumAndScoreTupleArray(_: forField: andTokenSeparator: andPunctateDepth:). Further set forth by the pseudocode is returning—as the result of feedWithDocNumAndScoreTupleArray(_: forField: andTokenSeparator: andPunctateDepth:)—that which is received in reply to the call to punctateForExpandedTupleArray(_: andPunctateDepth:). Subsequent to such return feedWithDocNumAndScoreTupleArray(_: forField: andTokenSeparator: andPunctateDepth:) may end.

Further to that which is discussed hereinabove with respect to method punctateForExpandedTupleArray(_: andPunctateDepth:) of the indexOperations object the following is now set forth. To facilitate discussion it is reminded that the method may have the declaration:

```
func punctateForExpandedTupleArray(_ theExpandedTupleArray:
[(num: String, score: Double, fieldVal: String)], andPunctateDepth
thePunctateDepth: Int) -> [(fieldVal: String, count: Int, score: Double)]
``` the declaration being discussed in greater detail hereinabove.

The method may in an aspect employ code in line with the pseudocode:

```
var set: NSCountedSet = NSCountedSet( )
for expandedTuple in theExpandedTupleArray {
    set.addObject(expandedTuple.fieldVal)
}
```

As such the method may instantiate NSCountedSet object set. In keeping with the Swift/Apple frameworks pseudocode employed herein, an NSCountedSet on one hand maintains only one copy of a given object even where such object is passed in multiple times, yet on the other hand maintains a count of how many times a given object has been passed to the set (e.g., where a string object conveying "scrummaster" were passed to an NSCountedSet object three times, the NSCountedSet object may on one hand maintain only one copy of the string object conveying "scrummaster" yet on the other hand maintain a count of three with respect to the string object conveying "scrummaster"). Further set forth by the pseudocode is employing a for-in loop in adding to set each field value set forth by theExpandedTupleArray, thusly causing set to—in keeping with the discussed NSCountedSet functionality (e.g., in keeping with the scrummaster example)—on one hand hold only one copy of each passed-in field value yet on the other hand maintain count of how many times each field value has been passed in.

The method may in another aspect employ code in line with the pseudocode:

```
var tupleArrayOfSet: [(item: String, count: Int)] = [(item: String, count: Int)]( )
for object in set.objectEnumerator( ) {
    tupleArrayOfSet.append((item: String(object), count: set.countForObject(object)))
}
var sortedTupleArrayOfSet: [(item: String, count: Int)] = tupleArrayOfSet.sort({$0.count > $1.count})
var maxElementNumber = thePunctateDepth - 1
var depthCutSortedTupleArrayOfSet: [(item: String, count: Int)] = [(item: String, count: Int)](sortedTupleArrayOfSet.prefixThrough(maxElementNumber))
```

As such the method may instantiate object tupleArrayOfSet and employ a for-in loop in loading its tuples such that each tuple of tupleArrayOfSet has for its item component one of the objects of set, and has for its count component set's count for that object (e.g., referring again to the example of the string object conveying "scrummaster" being held in set, the corresponding tuple of tupleArrayOfSet may have "scrummaster" for its item component and for its count component). Via the for-in loop all such objects of set may come to be thusly reflected in tupleArrayOfSet.

Further via the above, the method may act to formulate object sortedTupleArrayOfSet which corresponds to tupleArrayOfSet but sorted according to the values of the count components of the tuples such that tuples setting forth higher values via their count components appear earlier.

Finally set forth via the above is instantiating object depthCutSortedTupleArrayOfSet which corresponds to sortedTupleArrayOfSet but which only sets forth the first f elements of sortedTupleArrayOfSet where f is as per passed-in thePunctateDepth, the subtraction of one being placed to reflect that array indexing starts at zero.

The method may in a further aspect employ code in line with the pseudocode:

```
var tupleArrayToReturn: [(fieldVal: String, count: Int, score: Double)] = [(fieldVal: String, count: Int, score: Double)]( )
for tuple in depthCutSortedTupleArrayOfSet {
    var averagerArray: [Double] = (theExpandedTupleArray.filter({$0.fieldVal == tuple.item})).map({$0.score})
    var averagerSum = averagerArray.reduce(0) { (runningTotal, nextScore) in runningTotal + nextScore }
    var averageOfAveragerArray = averagerSum/(Double(averagerArray.count))
    tupleArrayToReturn.append((fieldVal: tuple.item, count: tuple.count, score: averageOfAveragerArray))
}
tupleArrayToReturn = tupleArrayToReturn.sort({$0.score > $1.score})
return tupleArrayToReturn
```

As such the method may formulate tuple array tupleArrayToReturn and then enter a for-in loop which visits each tuple element of depthCutSortedTupleArrayOfSet, with such visitation acting to fill tupleArrayToReturn. In particular, within the for-in loop the following may transpire. In a first aspect, filter(_:) may be called on theExpandedTupleArray so as to yield only those elements of theExpandedTupleArray which set forth for their fieldVal components that which is specified by the item component of the at-hand visited element of depthCutSortedTupleArrayOfSet—to with that which is specified by the item component of tuple. As an illustration, where the at-hand visited element of depthCutSortedTupleArrayOfSet specifies "process engineer-3873" for its item component, the noted call to filter(_:) may yield only those elements of theExpandedTupleArray which set forth "process engineer-3873" for their fieldVal components. Then map(_:) may be called, on the tuple array yielded by the filter call, in such a fashion so as to yield array averagerArray which contains only the score components of that filter-yielded tuple array, In another aspect, via the next two lines of pseudocode object averageOfAveragerArray may come to hold the calculated average of that which is set forth by the elements of averagerArray.

Still further within the for-in loop the method may act to append to tupleArrayToReturn a tuple which sets forth for its fieldVal component that which is specified by the item component of the at-hand visited element of depthCutSortedTupleArrayOfSet, sets forth for its count component that which is specified by the count component of the at-hand visited element of depthCutSortedTupleArrayOfSet, and sets forth for its score component noted averageOfAveragerArray. Subsequently set forth by the pseudocode is closing the for-in loop.

Finally set forth by the above pseudocode is applying sort(_:) to tupleArrayToReturn in such a fashion that the tuple elements of tupleArrayToReturn are sorted according to that which is set forth by their score components such that tuples whose score components bear higher values appear earlier in the array than tuples whose score components bear lower values. Finally, the method returns tupleArrayToReturn to its caller and the method ends.

It is noted that, to facilitate discussion, various of that which is discussed hereinthroughout (e.g., regarding doFilterQueryForFieldInfoArray(_:), filterQueryForQuery(_: andField:), docsForTerm(_: andField:), rankForFieldInfoArray(_: andFieldJoiner:), andFieldsHandlerForFieldInfoArray(_:), calculateScoreForTerm(_: forDocumentNumber: andFieldName:), calculateNormContribForTerm(_: forDocumentNumber: andFieldName:), feedWithDocNumAndScoreTupleArray(_: forField: andTokenSeparator: andPunctateDepth:), and punctateForExpandedTupleArray (_: andPunctateDepth:)) is discussed with respect to job listings. However, analogous operations may—in view of that which is discussed hereinthroughout—be performed, for instance, with respect to resumes and/or normalized keywords.

Further to that which is discussed hereinabove with respect to method corpusCountForFeederResult(_: forField:) of the indexOperations object the following is now set forth. To facilitate discussion it is reminded that the method may have the declaration:

```
func corpusCountForFeederResult(_ theFeederResult: [(fieldVal: String,
count: Int, score: Double)], forField theField: String) -> [(fieldVal: String,
count: Int, corpusCount: Int, score: Double)],
``` the declaration being discussed in greater detail hereinabove.

The method may, in an aspect, employ code in line with the following pseudocode, where managedObjectContext is taken to provide access to the at-hand managed object context:

```
var arrayToReturn = [(fieldVal: String, count: Int, corpusCount:Int, score:
Double)] ( )
    for feederResultElement in theFeederResult {
    var corpusCountFetchRequest = NSFetchRequest(entityName:
"JobListingDocumentFrequencyEntity")
    corpusCountFetchRequest.predicate = NSPredicate(format:
"%@ == term", feederResultElement.fieldVal)
    var corpusCountFetchResult =
managedObjectContext.executeFetchRequest(corpusCountFetchRequest)
    var rawDocumentFrequencyString =
corpusCountFetchResult[0].valueForKey("docFrequency")
    var fieldNamesString =
corpusCountFetchResult[0].valueForKey("indexField")
    var rawDocumentFrequencyArray =
rawDocumentFrequencyString.componentsSeparatedByString(",")
    var fieldNamesArray =
fieldNamesString.componentsSeparatedByString(",")
    var indexOfTheField = fieldNamesArray.indexOf(theField)
    var corpusCountAsString =
rawDocumentFrequencyArray[indexOfTheField]
    var corpusCount = Int(corpusCountAsString)
    arrayToReturn.append((fieldVal: feederResultElement.fieldVal,
count: feederResultElement.count, corpusCount: corpusCount, score:
feederResultElement.score))
    }
    return arrayToReturn
```

As such, via the foregoing the method may instantiate tuple array arrayToReturn and fill the tuple array via a for-in loop which visits each tuple element of passed-in tuple array theFeederResult.

In particular, with each such visitation the at-hand method may, in an aspect, perform operations in line with those discussed hereinabove with respect to calculateScoreForTerm(_: forDocumentNumber: andFieldName:) and formulation of object rawDocumentFrequencyAsDoubleForTheFieldName. In particular the at-hand method may formulate and dispatch a fetch request so as to receive the JobListingDocumentFrequencyEntity record corresponding to that which is set forth by the fieldVal component of the at-hand visited element of passed-in theFeederResult. The method may then retrieve from that record that which its docFrequency field sets forth with respect to the index field which corresponds to passed-in theField, and place such retrieved value in integer object corpusCount.

Further with each such visitation the at-hand method may append to arrayToReturn a tuple element which sets forth for its fieldVal component that which the presently-visited tuple of theFeederResult sets forth for its fieldVal component, sets forth for its count component that which the presently-visited tuple of theFeederResult sets forth for its count component, sets forth for its corpusCount component that which is set forth by discussed integer object corpusCount, and sets forth for its score component that which the presently-visited tuple of theFeederResult sets forth for its score component.

Further set forth by the above pseudocode is, subsequent to completion of the above-discussed for-in loop, the at-hand method returning to its caller arrayToReturn as filed by the for-in loop. Having returned such to its caller the method may end.

FIG. 27 shows a screenshot (2701) illustrating embodiments of SEMATFM-AMIA operation by which a headhunter user may communicate with a job seeker user via instant messaging (e.g., in connection with discussing a job interview and/or discussing an offer letter). Such instant messaging may, for example, be of the sort discussed herein. Set forth in the screenshot is the instant messaging being performed within a window which hovers over information display which is discussed in greater detail in connection, for example, with FIG. 37.

FIG. 28 shows a screenshot (2801) illustrating embodiments of SEMATFM-AMIA operation by which a headhunter user may perform operations including providing a new job listing (e.g., via a smartphone), messaging job seekers, and advertising a job. Such job listing provision may, in agreement with that which is discussed herein, involve entry, upload, and/or from-library-choosing by a headhunter user. Also in agreement with that which is discussed herein such uploaded and/or chosen-from-library job listing may be in one of a variety of formats (e.g., pdf or Microsoft Word).

Such messaging may be of the sort discussed herein, for example the discussed email and/or instant messaging functionality by which job seekers may learn of headhunter-selected job opportunities, and by which recipient seekers may apply to those jobs and provide cover letters in doing so. In agreement with that which is set forth herein, the headhunter may be able to specify the job seekers to receive the opportunities information by specifying one or more criteria (held job titles, cities of residence, and/or skills). Such advertising a job may, for instance, include the noted provision of a new job listing (e.g., the uploading of such a new job listing) and/or indication (e.g., by the headhunter user via a GUI) of one or more destinations—say job listing websites—for the introduced job listing. Such destinations (e.g., websites) may implement some or all of the discussed-herein functionality. Also set forth in FIG. 28 is descriptive text (2803) regarding the screenshot of FIG. 28.

FIG. 29 shows a screenshot (2901) illustrating embodiments of SEMATFM-AMIA operation by which a headhunter user may, as discussed herein, provide a new job listing via entry. Implementation of such functionality may be as discussed herein (e.g., implementation may involve the employ of one or more instantiated UITextField objects and/or UITextView objects). In agreement with that which is set forth in the screenshot, the headhunter user may be able to employ the concomitant GUI to apply various formatting to the entered job listing text (e.g., underlining, italicization, underlining, justification, line spacing, and/or indent).

Figure 30:
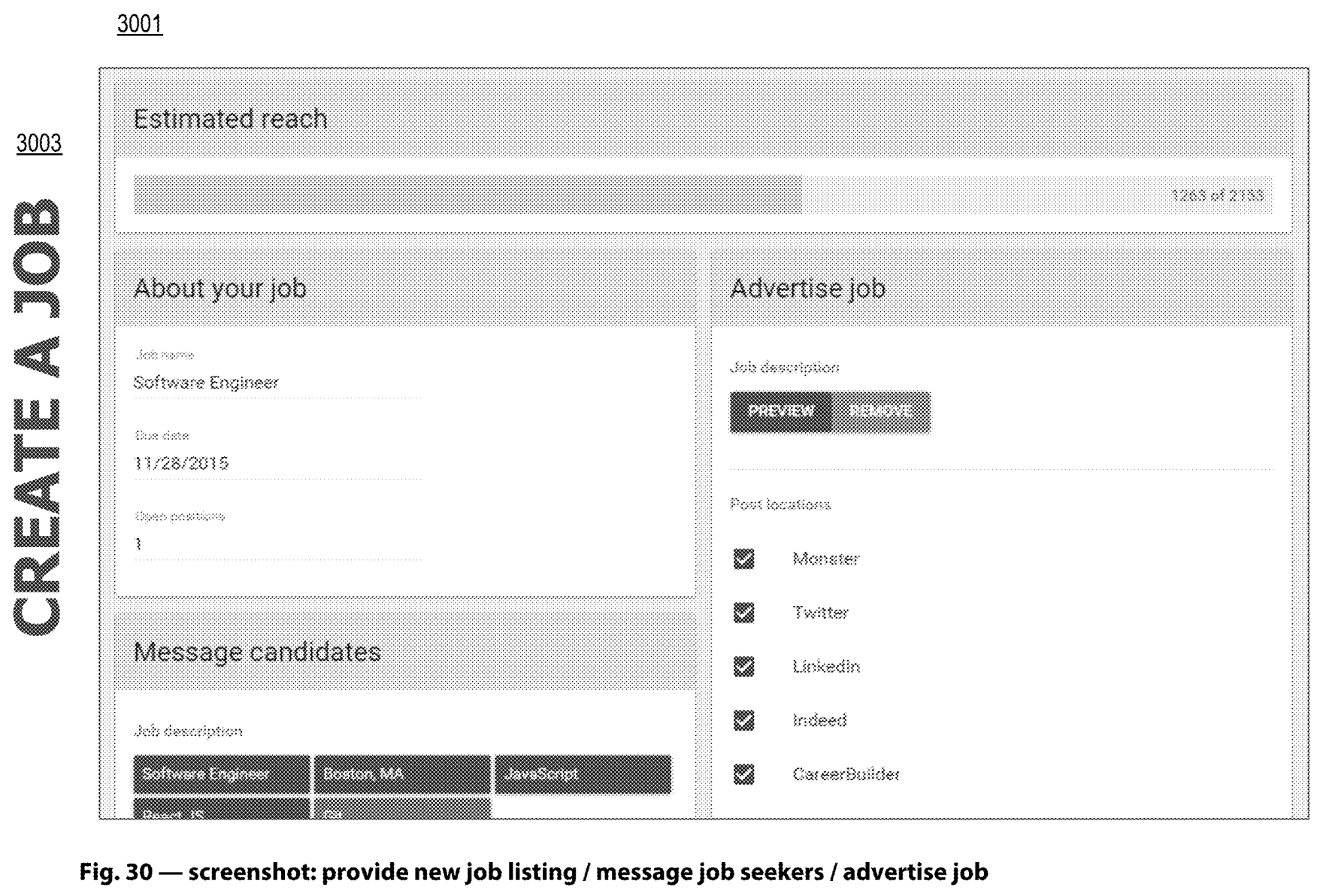

FIG. 30 shows a screenshot (3001) illustrating embodiments of SEMATFM-AMIA operation by which, in the vein of that which is discussed in connection with FIG. 28, a headhunter user may perform operations including providing a new job listing (e.g., via a smartphone), messaging job seekers, and advertising a job. Turning to new job listing provision, depicted in screenshot 3001 is the headhunter user having specified for the new job listing a job name of "software engineer," a job-fill due date of "11/28/2015," and an indication that a single position is open in connection with the opportunity.

Turning to such messaging, depicted in the screenshot is the headhunter user having specified that seekers to receive the at-hand job opportunity information of the sort discussed herein are seekers meeting criteria including held job title "Software Engineer," city of residence of "Boston, MA," and skills "JavaScript," "React JS," and "Go." Turning to such job advertising, depicted in the screenshot is the headhunter user having specified as destinations (e.g., websites) for the new job listing "Monster," "Twitter," "LinkedIn," "Indeed," and "CareerBuilder." As set forth by the screenshot, the headhunter user may act to "preview" (e.g., via functionality in line with the display functionality discussed herein) and/or "remove" the newly-provided job listing.

Still further set forth by the screenshot is display regarding "estimated reach" where, according to the example of the figure, the estimated reach is "1263 of 2153." According to one or more embodiments, estimated reach may be set forth in the form of "s of t." Value t may, for instance, represent the number of hits yielded when performing a search for resumes (e.g., via search functionality in line with that which is set forth herein) where specified as criteria for the search are one or more portions of the at-hand job listing (e.g., the title thereof, and/or a qualifications and duties portion thereof). Value s may, for instance, represent the number of hits yielded when performing a search for resumes (e.g., via search functionality in line with that which is set forth herein) where specified as criteria for the search are, firstly, those criteria set forth for the search of t, and, secondly, the noted criteria of the sort specified via the GUI of FIG. 30 (e.g., held job title "Software Engineer," city of residence of "Boston, MA," and skills "JavaScript," "React JS," and "Go"), where Boolean AND is applied between the first set of search criteria and the second set of search criteria. Also set forth in FIG. 30 is descriptive text (3003) regarding the screenshot of FIG. 30.

FIG. 31 shows a screenshot (3101) illustrating embodiments of SEMATFM-AMIA operation by which, in one aspect, a headhunter user may provide a job title of a being-introduced job listing and receive one or more suggested skills, titles, and/or locations for that new job listing. Such functionality may be implemented in line with the discussed-herein functionality via which one or more normalized titles and/or normalized skills may be yielded in response to provision of a job title by a headhunter user (e.g., with the suggested job location functionality being implemented in a manner analogous to that set forth herein with respect to normalized titles and normalized skills).

The functionality referenced by FIG. 31 may allow a headhunter user to select one or more of the suggested skills, titles, and/or locations for inclusion in the being-introduced job listing. As such, depicted in the screenshot of FIG. 31 is a GUI via which the headhunter is provided with one or more suggested skills, titles, and/or locations and by which the user may exclude a suggested skill, title, or location from being attached to the being-introduced job listing by activating an X GUI widget associated therewith. According to the example of FIG. 31 the headhunter is offered suggested skills "Rapid Prototyping," "CSS," and "JavaScript," suggested titles "Product Designer" and "Product Manager," and suggested location "Weston, MA" Further according to the example of FIG. 31 an X widget of the sort discussed is set forth in connection with each of these suggestions.

What is more, according to one or more embodiments color coding may be employed in connection with the suggested skills, titles, and/or locations. As an illustration, GUI display may be such that suggested skills are presented via text of a first color, suggested titles are presented via text of a second color, and/or suggested locations are presented via text of a third color.

In another aspect, illustrated by the screenshot of FIG. 31 are embodiments of SEMATFM-AMIA operation by which a headhunter user may be provided with a prediction of the quantity of candidates which are suggested to be considered in order to appropriately and/or successfully fill the job opening to which the at-hand job listing corresponds. Also presented to the user may be the quantity of candidates which have so far been obtained by the headhunter user with respect to the at-hand job listing. As an example, such prediction may arise from predictive analytics which take into account one or more of job requirements, job location, due date for filling the position, and past performance for filling positions akin to that of the at-hand position. As an illustration, the GUI of FIG. 31 indicates that it is predicted that appropriately and/or successfully filling the at-hand position calls for 100 candidates, and that there are presently 210 candidates at hand. Also set forth in FIG. 31 is descriptive text (3103) regarding the screenshot of FIG. 31.

Discussed herein is relevancy-score-leveraging functionality by which a headhunter user may provide a job title and/or select one or more skills (e.g., via a GUI), and yielded may be, for instance, one or more normalized job titles and/or normalized skills. Referenced by the screenshot of FIG. 32 is SEMATFM-AMIA operation by which such yielded normalized job titles and/or normalized skills may be employed in prepopulating a job listing. Also set forth in FIG. 32 is descriptive text (3203) regarding the screenshot of FIG. 32.

FIG. 33 shows a screenshot (3301) illustrating embodiments of SEMATFM-AMIA operation by which, in one aspect, a headhunter user may be presented with an indication of the match rate of candidates to requirements. According to one or more embodiments, such match rate may be set forth in the form of "m of e." Value m may, for instance, represent the number of hits yielded when performing a search for resumes (e.g., via search functionality in line with that which is set forth herein) where specified as criteria for the search are one or more portions of the at-hand job listing (e.g., the title thereof, and/or a qualifications and duties portion thereof). Value e may, for instance, the total number of possible seeker users (e.g., a value reflected by the quantity of corpus resumes).

In another aspect, the screenshot of FIG. 33 illustrates embodiments of SEMATFM-AMIA operation by which a headhunter user may create a group of candidates to be messaged regarding a job listing. Such functionality may be implemented via the discussed-herein functionality by which a headhunter user may specify information regarding one or more job opportunities and one or more job seeker users that are to each receive messaging which serves to inform the seeker recipient of the jobs and allows the seeker recipient to apply to those jobs, providing a cover letter in doing so.

In yet another aspect, the screenshot of FIG. 33 illustrates embodiments of SEMATFM-AMIA operation by which a headhunter user may (e.g., via a GUI) tag job listings (e.g., in a fashion employing headhunter user-selected color and/ or headhunter user-entered text), job listings may be tagged in an automated fashion, and/or a headhunter user may (e.g., via a GUI) leverage such tagging in locating job listings (e.g., the headhunter user may—say via a GUI—be able to request display of job listings which possess one or more headhunter user-indicated tags).

Such automated tagging may, as one illustration, involve one or more automated processes accessing databases which group, say, job titles and/or job skills into groups. As an illustration a particular job skill group might include the skills "Android," "Java," "iOS," and "Swift." Automatically set tags might correspond to such groups (e.g., job listings which set forth one or more of "Android," "Java," "iOS," and "Swift" may be automatically tagged with a particular tag. Also set forth in FIG. 33 is descriptive text (3303) regarding the screenshot of FIG. 33.

FIG. 34 shows a screenshot (3401) illustrating embodiments of SEMATFM-AMIA operation by which a headhunter user may, in one aspect, review candidate job seekers (e.g., view the resumes of seekers via functionality of the sort discussed herein including but not limited to the discussed-herein functionality which may act to draw headhunter attention to relevant resume sections). In another aspect FIG. 34 references SEMATFM-AMIA operation by which a headhunter user may incorporate automated job listing refinement suggestions (e.g., a headhunter user may elect for job listing inclusion one or more normalized job titles and/or normalized skills yielded via the corresponding discussed-herein functionality). Also set forth in FIG. 34 is descriptive text (3403) regarding the screenshot of FIG. 34.

FIG. 35 shows a screenshot (3501) illustrating embodiments of SEMATFM-AMIA operation by which a headhunter user may (e.g., via a GUI) review job seeker user responses (e.g., responses regarding the discussed-herein functionality by which job seeker users may be informed via messaging of headhunter-selected job opportunities and may respond via messaging to apply to those job listings), select (e.g., via a GUI) job seeker users which appear to be good fits for the at-hand job opportunity, move (e.g., via a GUI) job seeker users forward in the at-hand hiring process (e.g., causing such users to be associated with a data structure holding to-be-considered-further job seekers), and/or to create and/or receive (e.g., via a GUI) reports on Office of Federal Contract Compliance Programs (OFCCP) metrics (e.g., in a connection with an automated process which matches seeker-provided information with OFFCP factors). Also set forth in FIG. 35 is descriptive text (3503) regarding the screenshot of FIG. 35.

FIG. 36 shows a screenshot (3601) illustrating embodiments of SEMATFM-AMIA operation by which, in the vein of that which is discussed in connection with FIG. 30, a headhunter user may perform operations including advertising a job. In particular, FIG. 36 shows a further screenshot wherein certain destinations (e.g., websites) for the new job listing have been selected. Available destinations may include destinations which regard Pay Per Click (PPC) jobs, destinations which regard duration and/or limited-duration jobs, and cost-free job posting destinations (e.g., cost-free job posting websites). As in the screenshot of FIG. 30, the screenshot of FIG. 36 indicates that the headhunter user may act to "preview" (e.g., via functionality in line with the display functionality discussed herein) and/or "remove" the newly-provided job listing. Set forth in the screenshot is several destinations for the new job listing having been selected. It is noted that according to one or more embodiments, by default all available destinations may be selected. Also set forth in FIG. 36 is descriptive text (3603) regarding the screenshot of FIG. 36.

FIG. 37 shows a screenshot (3701) illustrating embodiments of SEMATFM-AMIA operation by which, in one aspect, a headhunter user may receive (e.g., via a GUI) information regarding one or more campaigns for filling job openings. As depicted in the screenshot of FIG. 37, the headhunter user may receive job campaign information including quantity of candidates reached (e.g., reached via the discussed-herein functionality by which job seekers may learn via messaging of headhunter-selected job opportunities, and by which recipient seekers may employ reply messaging to apply to those jobs and provide cover letters in doing so), quantity of candidates who have responded (e.g., responded via the discussed-herein functionality by which job seekers may learn via messaging of headhunter-selected job opportunities, and by which recipient seekers may employ reply messaging to apply to those jobs and provide cover letters in doing so), quantity of candidates who have participated in an interview for the at-hand job, and/or quantity of candidates who have been hired for the at-hand job (e.g., applicable for job listings which seek to fill multiple openings for a particular position).

In receiving job campaign information, the headhunter user may enjoy functionality including job campaigns being prioritized (e.g., in terms of their listing order within GUI display) according to due date for filing the concomitant position, colored circles being provided (e.g., via GUI display) to draw attention to items requiring headhunter user attention (e.g., a for-position-filling due date being near for a given position, a seeker having applied to a particular position, and/or an offer decision having been made with respect to a particular position), and/or buttons for performing various operations (e.g., GUI buttons of the discussed-herein sort for performing operations of the discussed-herein sort). The headhunter user may further enjoy functionality including breakdown of candidate seekers according to pipeline stage (e.g., stages including reached, responded, having participated in an interview, having received a job offer, and/or having been hired), customer and/or hiring manager icons (e.g., photographs or other icons which represent the customer and/or hiring manager responsible for the position to which the at-hand campaign corresponds, the icons perhaps being clickable in order to communicate with such individual via messaging), and/or tags (e.g., of the sort discussed herein). Also set forth in FIG. 37 is descriptive text (3703) regarding the screenshot of FIG. 37.

FIG. 38 shows a screenshot (3801) illustrating embodiments of SEMATFM-AMIA operation by which, in one aspect, a headhunter user may be provided with functionality including being able to view starred candidates (e.g., the headhunter user may be provided with a GUI which allows her to mark of-interest candidates with a star, request display of those candidates which have been thusly starred, and/or select a starred candidate for further action), receive information regarding quantity of views and/or clicks for job listings, and/or receive information regarding quantity of views and/or clicks for campaigns (e.g., receive information regarding total quantities of views and/or clicks among those job openings which have been grouped into a campaign). Also set forth in FIG. 38 is descriptive text (3803) regarding the screenshot of FIG. 38.

FIG. 39 shows a screenshot (3901) illustrating embodiments of SEMATFM-AMIA operation by which, in one aspect, a headhunter user may be provided with functionality by which she may search for job seekers (e.g., via the discussed-herein resume search functionality) across multiple destinations (e.g., websites), such destinations perhaps implementing some or all of the discussed-herein functionality. Implementation of such across-multiple-destination search may, as one illustration, involve performing the discussed-herein resume search functionality operations multiple times such that the operations are performed with respect to each of the multiple destinations of interest. It is observed that the destinations may be unaffiliated (e.g., in a corporate and/or ownership sense) from one another and/or from a particular destination with which an at-hand headhunter user may be most closely associated, such destinations perhaps being called "third party" destinations.

In another aspect, illustrated by the screenshot of FIG. 39 is a headhunter user being provided with functionality which automatically recommends search terms and candidates based on an at-hand job description. Implementation of such functionality may, as one illustration, involve performing the discussed-herein operations by which one or more elements of a newly-introduced job listing may be leveraged in finding resumes relevant to that job listing.

In a further aspect, illustrated by the screenshot of FIG. 39 is a headhunter user being provided with functionality by which candidate counts may be provided (e.g., via a GUI) with respect to the number of candidates found via search (e.g., search of the sort discussed herein) versus quantity of candidates which are suggested to be considered in order to appropriately and/or successfully fill the at-hand job opening. Such suggested quantity of candidates may be formulated in line with that which is discussed in connection with FIG. 31 (e.g., predictive analytics may be employed). In further aspects, illustrated by the screenshot of FIG. 39 are a headhunter user being provided with buttons for performing various operations (e.g., GUI buttons of the discussed-herein sort for performing operations of the discussed-herein sort) and the headhunter user being provided with tagging functionality (e.g., regarding tagging of the sort discussed herein). Also set forth in FIG. 39 is descriptive text (3903) regarding the screenshot of FIG. 39.

FIG. 40 shows a screenshot (4001) illustrating embodiments of SEMATFM-AMIA operation by which, in one aspect, a headhunter user may be provided with type-ahead functionality (e.g., based on similar queries and/or job descriptions). As one illustration, such type-ahead functionality may be implemented using a prefix tree. Such prefix tree may, in an aspect, include as keys words drawn from the at-hand corpus, pools of past queries (e.g., past queries which are linguistically similar to the present query and/or regard a similar job role to an at-hand job role), and/or held job listings. In another aspect such prefix tree may include as values the corresponding occurrence frequencies of those words (e.g., for a word drawn from a past queries pool the quantity of times which that word occurs among the past queries). In further aspects, illustrated by the screenshot of FIG. 40 are a headhunter user being provided with recommended titles (e.g., recommended titles arising from the discussed-herein functionality which yields normalized titles) and/or the headhunter user enjoying color coded skills designations (e.g., with color coding of skills being according to particular skill such as there being a particular color for the skill of objective-c programming, and/or according to skill group such as there being a particular color for the skill group programming) Also set forth in FIG. 40 is descriptive text (4003) regarding the screenshot of FIG. 40.

FIG. 41 shows a screenshot (4101) illustrating embodiments of SEMATFM-AMIA operation by which a headhunter user may be provided with candidate messaging capabilities. Such candidate messaging may regard the discussed-herein functionality by which job seekers may learn of headhunter-selected job opportunities, and by which recipient seekers may employ return messaging to apply to corresponding jobs and provide cover letters in doing so. Templates for such messaging (e.g., templates regarding the discussed-herein outgoing emails to which recipient seekers may respond so as to apply to corresponding job openings and provide cover letters in doing so) may be provided to the headhunter user. The headhunter user may be able to select (e.g., via a GUI) a particular one of the available templates to be a default template, and/or the default template could be one which has been proven to be successful (e.g., successful for the at-hand job category). Determination of template success may be implemented in a fashion which involves collecting success metrics regarding employed templates (e.g., quantity of seeker responses with respect to a particular template), and/or employing of differing templates for different headhunter and/or seeker user pools and/or for different periods of time with comparison of outcomes (e.g., in terms of quantity of seeker responses per employed template). Also set forth in FIG. 41 is descriptive text (4103) regarding the screenshot of FIG. 41.

FIG. 42 shows a screenshot (4201) illustrating embodiments of SEMATFM-AMIA operation by which a headhunter user may be able to view (e.g., via a GUI) information regarding candidate job seeker users. For instance, a GUI may allow the headhunter user to select a displayed job seeker user and perform one or more operations corresponding to that seeker (e.g., view a resume and/or cover letter corresponding to that seeker).

Such candidates may, for the purposes of display (e.g., display via a corresponding GUI). be classified into groups including an "updated" group and an "applied" group. Such "updated group" may include candidates who have responded to job listings and/or campaigns, and for whom there is call for further headhunter user action (e.g., there may be call that the headhunter user review the resume of a respondent seeker). Such "applied" candidates may be seeker users who have applied to one or more job listings and are considered to be in the candidate pipeline for the concomitant job openings. Also set forth in FIG. 42 is descriptive text (4203) regarding the screenshot of FIG. 42.

FIG. 43 shows a screenshot (4301) illustrating embodiments of SEMATFM-AMIA operation by which a headhunter user may be able to, in one aspect, receive display (e.g., via a GUI) of pipeline progress of a given seeker candidate (e.g., progress of the seeker through stages including "reached," "screened," "interview," "offer," and "hired"). Such pipeline progress display may involve employ of a growing-bar indicator with corresponding stage waypoints, and/or a percentage indication. Display (e.g., GUI display) may apply color coding to indicate level of headhunter user attention required (e.g., with red being employed to indicate call for high priority attention, green being employed to indicate call for low priority attention, and yellow being employed to indicate call for middle priority attention) and/or may display seekers for whom there is call for high priority attention before displaying seekers for whom there is call for lower priority attention.

In another aspect, the screenshot of FIG. 43 illustrates SEMATFM-AMIA operation by which a headhunter user may be able to remove a seeker from a pipeline (e.g., by activating a corresponding GUI widget, say a red X), move a seeker to a subsequent pipeline waypoint (e.g., by activating a corresponding GUI widget, say a green check symbol), and/or place aside a seeker for later consideration (e.g., by activating a corresponding GUI widget, say an arrow icon). Also set forth in FIG. 43 is descriptive text (4303) regarding the screenshot of FIG. 43.

FIG. 44 shows a screenshot (4401) illustrating embodiments of SEMATFM-AMIA operation by which a headhunter user may be able to receive display (e.g., via a GUI) regarding one or more seeker candidates. Offered functionality (e.g., via a corresponding GUI) may allow a headhunter user to select a displayed job seeker user and perform one or more operations corresponding to that seeker (e.g., view a resume and/or cover letter corresponding to that seeker). Display may be such that starred seeker candidates (e.g., candidates starred as discussed hereinabove) are displayed ahead of unstarred candidates and/or such that match score (e.g., with match score for a given seeker corresponding to the discussed-herein relevancy score for that seeker's resume) determines candidate listing order. Also set forth in FIG. 44 is descriptive text (4403) regarding the screenshot of FIG. 44.

SEMATFM-AMIA Controller

FIG. 45 shows a block diagram illustrating embodiments of a SEMATFM-AMIA controller. In this embodiment, the SEMATFM-AMIA controller 4501 may serve to aggregate, process, store, search, serve, identify, instruct, generate, match, and/or facilitate interactions with a computer through relationship management systems technologies, and/or other related data.

Typically, users, which may be people and/or other systems, may engage information technology systems (e.g., computers) to facilitate information processing. In turn, computers employ processors to process information; such processors 4503 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 4529 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the SEMATFM-AMIA controller 4501 may be connected to and/or communicate with entities such as, but not limited to: one or more users from peripheral devices 4512 (e.g., user input devices 4511); an optional cryptographic processor device 4528; and/or a communications network 4513.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The SEMATFM-AMIA controller 4501 may be based on computer systems that may comprise, but are not limited to, components such as: a computer systemization 4502 connected to memory 4529.

Computer Systemization

A computer systemization 4502 may comprise a clock 4530, central processing unit ("CPU(s)" and/or "processor(s)" (these terms are used interchangeable throughout the disclosure unless noted to the contrary)) 4503, a memory 4529 (e.g., a read only memory (ROM) 4506, a random access memory (RAM) 4505, etc.), and/or an interface bus 4507, and most frequently, although not necessarily, are all interconnected and/or communicating through a system bus 4504 on one or more (mother)board(s) 4502 having conductive and/or otherwise transportive circuit pathways through which instructions (e.g., binary encoded signals) may travel to effectuate communications, operations, storage, etc. The computer systemization may be connected to a power source 4586; e.g., optionally the power source may be internal. Optionally, a cryptographic processor 4526 may be connected to the system bus. In another embodiment, the cryptographic processor, transceivers (e.g., ICs) 4574, and/or sensor array (e.g., accelerometer, altimeter, ambient light, barometer, global positioning system (GPS) (thereby allowing SEMATFM-AMIA controller to determine its location), gyroscope, magnetometer, pedometer, proximity, ultra-violet sensor, etc.) 4573 may be connected as either internal and/or external peripheral devices 4512 via the interface bus I/O 4508 (not pictured) and/or directly via the interface bus 4507. In turn, the transceivers may be connected to antenna(s) 4575, thereby effectuating wireless transmission and reception of various communication and/or sensor protocols; for example the antenna(s) may connect to various transceiver chipsets (depending on deployment needs), including: Broadcom BCM4329FKUBG transceiver chip (e.g., providing 802.11n, Bluetooth 2.1+EDR, FM, etc.); a Broadcom BCM4752 GPS receiver with accelerometer, altimeter, GPS, gyroscope, magnetometer; a Broadcom BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom BCM43341 transceiver chip (e.g., providing 2G, 3G and 4G LTE cellular communications; 802.11 g/, Bluetooth 4.0, near field communication (NFC), FM radio); an Infineon Technologies X-Gold 618-PMB9800 transceiver chip (e.g., providing 2G/3G HSDPA/HSUPA communications); a MediaTek MT6620 transceiver chip (e.g., providing 802.11a/ac/b/g/n, Bluetooth 4.0 LE, FM, GPS; a Lapis Semiconductor ML8511 UV sensor; a maxim integrated MAX44000 ambient light and infrared proximity sensor; a Texas Instruments WiLink WL1283 transceiver chip (e.g., providing 802.11n, Bluetooth 3.0, FM, GPS); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large super-computer(s) and mainframe(s) computers, down to mini computers, servers, desktop computers, laptops, thin clients (e.g., Chromebooks), netbooks, tablets (e.g., Android, iPads, and Windows tablets, etc.), mobile smartphones (e.g., Android, iPhones, Nokia, Palm and Windows phones, etc.), wearable device(s) (e.g., watches, glasses, goggles (e.g., Google Glass), etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 4529 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; Apple's A series of processors (e.g., A5, A6, A7, A8, etc.); ARM's application, embedded and secure processors; IBM and/or Motorola's DragonBall and PowerPC; IBM's and Sony's Cell processor; Intel's 80X86 series (e.g., 80386, 80486), Pentium, Celeron, Core (2) Duo, i series (e.g., i3, i5, i7, etc.), Itanium, Xeon, and/or XScale; Motorola's 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the SEMATFM-AMIA controller and beyond through various interfaces. Should processing requirements dictate a greater amount speed and/or capacity, distributed processors (e.g., see Distributed SEMATFM-AMIA below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the SEMATFM-AMIA may be achieved by implementing a microcontroller such as CAST's R8051XC2 microcontroller; Intel's MCS 51 (i.e., 8051 microcontroller); and/or the like. Also, to implement certain features of the SEMATFM-AMIA, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the SEMATFM-AMIA component collection (distributed or otherwise) and/or features may be implemented via the microprocessor and/or via embedded components; e.g., via ASIC, coprocessor, DSP, FPGA, and/or the like. Alternately, some implementations of the SEMATFM-AMIA may be implemented with embedded components that are configured and used to achieve a variety of features or signal processing.

Depending on the particular implementation, the embedded components may include software solutions, hardware solutions, and/or some combination of both hardware/software solutions. For example, SEMATFM-AMIA features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the SEMATFM-AMIA features. A hierarchy of programmable interconnects allow logic blocks to be interconnected as needed by the SEMATFM-AMIA system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the SEMATFM-AMIA may be developed on regular FPGAs and then migrated into a fixed version that more resembles ASIC implementations. Alternate or coordinating implementations may migrate SEMATFM-AMIA controller features to a final ASIC instead of or in addition to FPGAs. Depending on the implementation all of the aforementioned embedded components and microprocessors may be considered the "CPU" and/or "processor" for the SEMATFM-AMIA.

Power Source

The power source 4586 may be of any standard form for powering small electronic circuit board devices such as the following power cells alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 4586 is connected to at least one of the interconnected subsequent components of the SEMATFM-AMIA thereby providing an electric current to all subsequent components. In one example, the power source 4586 is connected to the system bus component 4504. In an alternative embodiment, an outside power source 4586 is provided through a connection across the I/O interface. For example, a USB and/or IEEE 1394 connection carries both data and power across the connection and is therefore a suitable source of power.

Interface Adapters

Interface bus(ses) 4507 may accept, connect, and/or communicate to a number of interface adapters, conventionally although not necessarily in the form of adapter cards, such as but not limited to: input output interfaces (I/O) 4508, storage interfaces 4509, network interfaces 4510, and/or the like. Optionally, cryptographic processor interfaces 4527 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 4509 may accept, communicate, and/or connect to a number of storage devices such as, but not limited to: storage devices 4514, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 4510 may accept, communicate, and/or connect to a communications network 4513. Through a communications network 4513, the SEMATFM-AMIA controller is accessible through remote clients 4533b (e.g., computers with web browsers) by users 4533a. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., see Distributed SEMATFM-AMIA below), architectures may similarly be employed to pool, load balance, and/or otherwise decrease/increase the communicative bandwidth required by the SEMATFM-AMIA controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 4510 may be used to engage with various communications network types 4513. For example, multiple network interfaces may be employed to allow for the communication over broadcast, multicast, and/or unicast networks.

Input Output interfaces (I/O) 4508 may accept, communicate, and/or connect to user, peripheral devices 4512 (e.g., input devices 4511), cryptographic processor devices 4528, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) DisplayPort, high-definition multimedia interface (HDMI), RCA, RF antennae, S-Video, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

Peripheral devices 4512 may be connected and/or communicate to I/O and/or other facilities of the like such as network interfaces, storage interfaces, directly to the interface bus, system bus, the CPU, and/or the like. Peripheral devices may be external, internal and/or part of the SEMATFM-AMIA controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 4511 often are a type of peripheral device 512 (see above) and may include: card readers, dongles, finger print readers, gloves, graphics tablets, joysticks, keyboards, microphones, mouse (mice), remote controls, security/biometric devices (e.g., fingerprint reader, iris reader, retina reader, etc.), touch screens (e.g., capacitive, resistive, etc.), trackballs, trackpads, styluses, and/or the like.

It should be noted that although user input devices and peripheral devices may be employed, the SEMATFM-AMIA controller may be embodied as an embedded, dedicated, and/or monitor-less (i.e., headless) device, wherein access would be provided over a network interface connection.

Cryptographic units such as, but not limited to, microcontrollers, processors 4526, interfaces 4527, and/or devices 4528 may be attached, and/or communicate with the SEMATFM-AMIA controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 4529. However, memory is a fungible technology and resource, thus, any number of memory embodiments may be employed in lieu of or in concert with one another. It is to be understood that the SEMATFM-AMIA controller and/or a computer systemization may employ various forms of memory 4529. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 4529 will include ROM 4506, RAM 4505, and a storage device 4514. A storage device 4514 may be any conventional computer system storage. Storage devices may include: an array of devices (e.g., Redundant Array of Independent Disks (RAID)); a drum; a (fixed and/or removable) magnetic disk drive; a magneto-optical drive; an optical drive (i.e., Blu-ray, CD ROM/RAM/Recordable (R)/ReWritable (RW), DVD R/RW, HD DVD R/RW etc.); RAM drives; solid state memory devices (USB memory, solid state drives (SSD), etc.); other processor-readable storage mediums; and/or other devices of the like. Thus, a computer systemization generally requires and makes use of memory.

Component Collection

The memory 4529 may contain a collection of program and/or database components and/or data such as, but not limited to: operating system component(s) 4515 (operating system); information server component(s) 4516 (information server); user interface component(s) 4517 (user interface); Web browser component(s) 4518 (Web browser); database(s) 4519; mail server component(s) 4521; mail client component(s) 4522; cryptographic server component(s) 4520 (cryptographic server); the SEMATFM-AMIA component(s) 4535; and/or the like (i.e., collectively a component collection). These components may be stored and accessed from the storage devices and/or from storage devices accessible through an interface bus. Although non-conventional program components such as those in the component collection, typically, are stored in a local storage device 4514, they may also be loaded and/or stored in memory such as: peripheral devices, RAM, remote storage facilities through a communications network, ROM, various forms of memory, and/or the like.

Operating System

The operating system component 4515 is an executable program component facilitating the operation of the SEMATFM-AMIA controller. Typically, the operating system facilitates access of I/O, network interfaces, peripheral devices, storage devices, and/or the like. The operating system may be a highly fault tolerant, scalable, and secure system such as: Apple's Macintosh OS X (Server); AT&T Plan 9; Be OS; Blackberry's QNX; Google's Chrome; Microsoft's Windows 7/8; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millennium/Mobile/NT/Vista/XP (Server), Palm OS, and/or the like. Additionally, for robust mobile deployment applications, mobile operating systems may be used, such as: Apple's iOS; China Operating System COS; Google's Android; Microsoft Windows RT/Phone; Palm's WebOS; Samsung/Intel's Tizen; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the SEMATFM-AMIA controller to communicate with other entities through a communications network 4513. Various communication protocols may be used by the SEMATFM-AMIA controller as a subcarrier transport mechanism for interaction, such as, but not limited to: multicast, TCP/IP, UDP, unicast, and/or the like.

Information Server

An information server component 4516 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C # and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the SEMATFM-AMIA controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the SEMATFM-AMIA database 4519, operating systems, other program components, user interfaces, Web browsers, and/or the like.

Access to the SEMATFM-AMIA database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the SEMATFM-AMIA. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the SEMATFM-AMIA as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple's iOS, Macintosh Operating System's Aqua; IBM's OS/2; Google's Chrome (e.g., and other webbrowser/cloud based client OSs); Microsoft's Windows varied UIs 2000/2003/3.1/95/98/CE/Millennium/Mobile/NT/Vista/XP (Server) (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 4517 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 4518 is a stored program component that is executed by a CPU. The Web browser may be a conventional hypertext viewing application such as Apple's (mobile) Safari, Google's Chrome, Microsoft Internet Explorer, Mozilla's Firefox, Netscape Navigator, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., Firefox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the SEMATFM-AMIA enabled nodes. The combined application may be nugatory on systems employing standard Web browsers.

Mail Server

A mail server component 4521 is a stored program component that is executed by a CPU 4503. The mail server may be a conventional Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POPS), simple mail transfer protocol (SMTP), and/or the like. The mail server can route, forward, and process incoming and outgoing mail messages that have been sent, relayed and/or otherwise traversing through and/or to the SEMATFM-AMIA. Alternatively, the mail server component may be distributed out to mail service providing entities such as Google's cloud services (e.g., Gmail and notifications may alternatively be provided via messenger services such as AOL's Instant Messenger, Apple's iMessage, Google Messenger, SnapChat, etc.).

Access to the SEMATFM-AMIA mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 4522 is a stored program component that is executed by a CPU 4503. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POPS, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 4520 is a stored program component that is executed by a CPU 4503, cryptographic processor 4526, cryptographic processor interface 4527, cryptographic processor device 4528, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the SEMATFM-AMIA may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the SEMATFM-AMIA component to engage in secure transactions if so desired. The cryptographic component facilitates the secure accessing of resources on the SEMATFM-AMIA and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The SEMATFM-AMIA Database

The SEMATFM-AMIA database component 4519 may be embodied in a database and its stored data. The database is a stored program component, which is executed by the CPU; the stored program component portion configuring the CPU to process the stored data. The database may be a conventional, fault tolerant, relational, scalable, secure database such as MySQL, Oracle, Sybase, etc. may be used. Additionally, optimized fast memory and distributed databases such as IBM's Netezza, MongoDB's MongoDB, open source Hadoop, open source VoltDB, SAP's Hana, etc. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the SEMATFM-AMIA database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the SEMATFM-AMIA database is implemented as a data-structure, the use of the SEMATFM-AMIA database 4519 may be integrated into another component such as the SEMATFM-AMIA component 4535. Also, the database may be implemented as a mix of data structures, objects, and relational structures. Databases may be consolidated and/or distributed in countless variations (e.g., see Distributed SEMATFM-AMIA below). Portions of databases, e.g., tables, may be exported and/or imported and thus decentralized and/or integrated.

In one embodiment, the database component 4519 includes several tables 4519*a-bb*:

An accounts table 4519*a* includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routingNumber, linkWalletsID, accountPrioritAccaountRatio, accountAddress, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accounRestrictions, and/or the like;

A users table 4519*b* includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivilges, userPreferences, userRestrictions, and/or the like (the user table may support and/or track multiple entity accounts on a SEMATFM-AMIA);

An devices table 4519*c* includes fields such as, but not limited to: deviceID, sensorIDs, accountID, assetIDs, paymentIDs, deviceType, deviceName, deviceManufacturer, deviceModel, deviceVersion, deviceSerialNo, deviceIPaddress, deviceMACaddress, device_ECID, deviceUUID, deviceLocation, deviceCertificate, deviceOS, appIDs, deviceResources, deviceSession, authKey, deviceSecureKey, walletAppInstalledFlag, deviceAcces sPrivileges, devicePreferences, deviceRestrictions, hardware_config, software_config, storage_location, sensor_value, pin_reading, data_length, channel_requirement, sensor_name, sensor_model_no, sensor_manufacturer, sensor_type, sensor_serial_number, sensor_power_requirement, device_power_requirement, location, sensor_associated_tool, sensor_dimensions, device_dimensions, sensor_communications_type, device_communications_type, power_percentage, power_condition, temperature_setting, speed_adjust, hold_duration, part_actuation, and/or the like. Device table may, in some embodiments, include fields corresponding to one or more Bluetooth profiles, such as those published at https://www.bluetooth.org/en-us/specification/adopted-specifications, and/or other device specifications, and/or the like;

An apps table 4519*d* includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, appAccessPrivileges, appPreferences, appRestrictions, portNum, access_API_call, linked_wallets_list, and/or the like;

An assets table 4519*e* includes fields such as, but not limited to: assetID, accountID, userID, distributorAccountID, distributorPaymentID, distributorOnwerID, assetOwnerID, assetType, assetSourceDeviceID, assetSourceDeviceType, assetSourceDeviceName, assetSourceDistributionChannelID, assetSourceDistributionChannelType, assetSourceDistributionChannelName, assetTargetChannelID, assetTargetChannelType, assetTargetChannelName, assetName, assetSeriesName, assetSeriesSeason, assetSeriesEpisode, assetCode, assetQuantity, assetCost, assetPrice, assetValue, assetManufactuer, assetModelNo, assetSerialNo, assetLocation, assetAddress, assetState, assetZIPcode, assetState, assetCountry, assetEmail, assetIPaddress, assetURLaccessCode, assetOwnerAccountID, subscriptionIDs, assetAuthroizationCode, assetAccessPrivileges, assetPreferences, assetRestrictions, assetAPI, assetAPIconnectionAddress, and/or the like;

A payments table 4519*f* includes fields such as, but not limited to: paymentID, accountID, userID, couponID, couponValue, couponConditions, couponExpiration, payment- Type, paymentAccountNo, paymentAccountName, paymentAccountAuthorizationCodes, paymentExpirationDate, paymentCCV, paymentRoutingNo, paymentRoutingType, paymentAddress, paymentState, paymentZIPcode, paymentCountry, paymentEmail, paymentAuthKey, paymentIPaddress, paymentURLaccessCode, paymentPortNo, paymentAccessPrivileges, paymentPreferences, payementRestrictions, and/or the like;

An transactions table 4519g includes fields such as, but not limited to: transactionID, accountID, assetIDs, deviceIDs, paymentIDs, transactionIDs, userID, merchantID, transactionType, transactionDate, transactionTime, transactionAmount, transactionQuantity, transactionDetails, productsList, productType, productTitle, productsSummary, productParamsList, transactionNo, transactionAccessPrivileges, transactionPreferences, transactionRestrictions, merchantAuthKey, merchantAuthCode, and/or the like;

An merchants table 4519h includes fields such as, but not limited to: merchantID, merchantTaxID, merchanteName, merchantContactUserID, accountID, issuerID, acquirerID, merchantEmail, merchantAddress, merchantState, merchantZIPcode, merchantCountry, merchantAuthKey, merchantIPaddress, portNum, merchantURLaccessCode, merchantPortNo, merchantAccessPrivileges, merchantPreferences, merchantRestrictions, and/or the like;

An ads table 4519i includes fields such as, but not limited to: adID, advertiserID, adMerchantID, adNetworkID, adName, adTags, advertiserName, adSponsor, adTime, adGeo, adAttributes, adFormat, adProduct, adText, adMedia, adMediaID, adChannelID, adTagTime, adAudioSignature, adHash, adTemplateID, adTemplateData, adSourceID, adSourceName, adSourceServerIP, adSourceURL, adSourceSecurityProtocol, adSourceFTP, adAuthKey, adAccessPrivileges, adPreferences, adRestrictions, adNetworkXchangeID, adNetworkXchangeName, adNetworkXchangeCost, adNetworkXchangeMetricType (e.g., CPA, CPC, CPM, CTR, etc.), adNetworkXchangeMetricValue, adNetworkXchangeServer, adNetworkXchangePortNumber, publisherID, publisherAddress, publisherURL, publisherTag, publisherIndustry, publisherName, publisherDescription, siteDomain, siteURL, siteContent, siteTag, siteContext, siteImpression, siteVisits, siteHeadline, sitePage, siteAdPrice, sitePlacement, sitePosition, bidID, bidExchange, bidOS, bidTarget, bidTimestamp, bidPrice, bidImpressionID, bidType, bidScore, adType (e.g., mobile, desktop, wearable, largescreen, interstitial, etc.), assetID, merchantID, deviceID, userID, accountID, impressionID, impressionOS, impressionTimeStamp, impressionGeo, impressionAction, impressionType, impressionPublisherID, impressionPublisherURL, and/or the like;

A job listing table 4519j may correspond to the above-discussed entity definition JobListingEntity and include fields such as, but not limited to: docNum, rawTtl, rawKwd, nrmTtl, nrmKwd, extraData, and/or the like;

A resume table 4519k may correspond to the above-discussed entity definition ResumeEntity and include fields such as, but not limited to: docNum, rawTtl, rawKwd, nrmTtl, nrmKwd, extraData, and/or the like;

A normalized keyword table 4519l may correspond to the above-discussed entity definition NormalizedKeywordEntity and include fields such as, but not limited to: docNum, normalizedKeywordId, normalizedKeyword, and/or the like;

A job listing inverse index term table 4519m may correspond to the above-discussed entity definition JobListingInverseIndexTermEntity and include fields such as, but not limited to: indexField, term, documentNumbers, termFrequency, termBoost termPositions, and/or the like;

A resume inverse index term table 4519n may correspond to the above-discussed entity definition ResumeInverseIndexTermEntity and include fields such as, but not limited to: indexField, term, documentNumbers, termFrequency, termBoost termPositions, and/or the like;

A normalized keyword inverse index term table 4519o may correspond to the above-discussed entity definition NormalizedKeywordInverseIndexTermEntity and include fields such as, but not limited to: indexField, term, documentNumbers, termFrequency, termBoost termPositions, and/or the like;

A job listing document frequency table 4519p may correspond to the above-discussed entity definition JobListingDocumentFrequencyEntity and include fields such as, but not limited to: term, indexField, docFrequency, and/or the like;

A resume document frequency table 4519q may correspond to the above-discussed entity definition ResumeDocumentFrequencyEntity and include fields such as, but not limited to: term, indexField, docFrequency, and/or the like;

A normalized keyword document frequency table 4519r may correspond to the above-discussed entity definition NormalizedKeywordDocumentFrequencyEntity and include fields such as, but not limited to: term, indexField, docFrequency, and/or the like;

A job listing field data table 4519s may correspond to the above-discussed entity definition JobListingFieldDataEntity and include fields such as, but not limited to: docNum, fieldNames, fieldBoosts, fieldLengths, and/or the like;

A resume field data table 4519t may correspond to the above-discussed entity definition ResumeFieldDataEntity and include fields such as, but not limited to: docNum, fieldNames, fieldBoosts, fieldLengths, and/or the like;

A normalized keyword field data table 4519u may correspond to the above-discussed entity definition NormalizedKeywordFieldDataEntity and include fields such as, but not limited to: docNum, fieldNames, fieldBoosts, fieldLengths, and/or the like;

A XML resume record table 4519v may correspond to the above-discussed entity definition XmlResumeRecordEntity and include fields such as, but not limited to: docNum, xmlResumeRecordString, and/or the like;

An adjusted resume table 4519w may correspond to the above-discussed entity definition AdjustedResumeEntity and include fields such as, but not limited to: docNum, rawTtl, rawKwd, adjustedRawKwd, nrmTtl, nrmKwd, extraData, and/or the like;

A raw resume table 4519x may correspond to the above-discussed entity definition RawResumeEntity and include fields such as, but not limited to: docNum, docText, and/or the like;

A raw job listing table 4519y may correspond to the above-discussed entity definition RawJobListingEntity and include fields such as, but not limited to: docNum, docText, and/or the like;

A raw job book table 4519z may correspond to the above-discussed entity definition RawJobBookEntity and include fields such as, but not limited to: docNum, docText, and/or the like;

A raw job periodical table 4519aa may correspond to the above-discussed entity definition RawJobPeriodicalEntity and include fields such as, but not limited to: docNum, docText, and/or the like;

An job application table 4519bb may correspond to the above-discussed entity definition JobApplicationEntity and include fields such as, but not limited to: docNum, forJobListingNr, seekerResumeNr, coverLetter, and/or the like;

In one embodiment, the SEMATFM-AMIA database may interact with other database systems. For example, employing a distributed database system, queries and data access by search SEMATFM-AMIA component may treat the combination of the SEMATFM-AMIA database, an integrated data security layer database as a single database entity (e.g., see Distributed SEMATFM-AMIA below).

In one embodiment, user programs may contain various user interface primitives, which may serve to update the SEMATFM-AMIA. Also, various accounts may require custom database tables depending upon the environments and the types of clients the SEMATFM-AMIA may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 4519*a-bb*. The SEMATFM-AMIA may be configured to keep track of various settings, inputs, and parameters via database controllers.

The SEMATFM-AMIA database may communicate to and/or with other components in a component collection, including itself, and/or facilities of the like. Most frequently, the SEMATFM-AMIA database communicates with the SEMATFM-AMIA component, other program components, and/or the like. The database may contain, retain, and provide information regarding other nodes and data.

The SEMATFM-AMIAs

The SEMATFM-AMIA component 4535 is a stored program component that is executed by a CPU. In one embodiment, the SEMATFM-AMIA component incorporates any and/or all combinations of the aspects of the SEMATFM-AMIA that was discussed in the previous figures. As such, the SEMATFM-AMIA affects accessing, obtaining and the provision of information, services, transactions, and/or the like across various communications networks. The features and embodiments of the SEMATFM-AMIA discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the SEMATFM-AMIA's features and facilities, and in many cases reduce the costs, energy consumption/requirements, and extend the life of SEMATFM-AMIA's underlying infrastructure; this has the added benefit of making the SEMATFM-AMIA more reliable. Similarly, many of the features and mechanisms are designed to be easier for users to use and access, thereby broadening the audience that may enjoy/employ and exploit the feature sets of the SEMATFM-AMIA; such ease of use also helps to increase the reliability of the SEMATFM-AMIA. In addition, the feature sets include heightened security as noted via the Cryptographic components 4520, 4526, 4528 and throughout, making access to the features and data more reliable and secure In a first aspect, SEMATFM-AMIA transforms inputs including new job listing introduction inputs, via SEMATFM-AMIA components (e.g., the conductor component, the resume view controller component, the XY paths handler component, the title handler component, the resume librarian component, and the job listing librarian component), into outputs including relevant resume outputs and/or augmented new job listing record outputs.

In a second aspect, SEMATFM-AMIA transforms inputs including job listing introduction inputs and/or resume query inputs, via SEMATFM-AMIA components (e.g., the conductor component, the presenter component, the segmented resume helper component, the resume librarian component, and the job listing librarian component), into outputs including relevant portion attention-draw outputs regarding resumes and/or viewing modality-tailored outputs regarding resumes.

In a third aspect, SEMATFM-AMIA transforms inputs including job application inputs, resume inputs, and/or job listing inputs, via SEMATFM-AMIA components (e.g., the job application conductor component, the resume adjuster component, the resume raw norm correlator component, the job listing raw norm correlator component, and the resume librarian component), into outputs including adjusted resume outputs.

In a fourth aspect, SEMATFM-AMIA transforms inputs including headhunter-selected job seeker-job opportunity inputs, via SEMATFM-AMIA components (e.g., the reach UI component, the reach conductor component, the seeker resume proposed job listings librarian component, the reach emailer component, echo task component, and the mail task component), into outputs including email outputs which provide for job application and cover letter provision.

In a fifth aspect, SEMATFM-AMIA transforms inputs including seeker reply inputs and/or resume query inputs, via SEMATFM-AMIA components (e.g., email receipt conductor component, the email extractor component, and seeker resume proposed job listings librarian component), into outputs including job listing attachment outputs.

Conductor object 4541 may perform operations including, as discussed herein, intaking a new job listing, receiving headhunter skills selection regarding the new job listing, coordinating storage of the new job listing, coordinating the return of resumes which appear relevant to the new job listing, receiving a query which seeks resumes, and/or coordinating the return of resumes in response to the query.

Resume view controller object 4543 may perform operations including, as discussed herein, providing for resume display.

XY paths handler object 4545 may perform operations including, as discussed herein, yielding X path normalized skills, Y path normalized job titles, and/or Y path normalized skills.

Title handler object 4547 may perform operations including, as discussed herein, job title stripping operations and/or job title combinatory operations.

Resume librarian object 4549 may perform operations including, as discussed herein, returning resumes in view of specified X path normalized keywords, Y path normalized keywords, and Y path normalized titles, returning an XML version of a specified resume, and/or handling storage of an adjusted resume record.

Job listing librarian object 4551 may perform operations including, as discussed herein, handling storage of a new job listing.

Presenter object 4553 may perform operations including, as discussed herein, providing for focused resume presentation.

Segmented resume helper object 4555 may perform operations including, as discussed herein, providing relevant sparse segmented resumes based on input and/or yielding relevant resume fields based on input.

Job application conductor object 4557 may perform operations including, as discussed herein, receiving a job application request, coordinating adjustment of resume language, and/or coordinating realization of application to the corresponding job opening.

Resume adjuster object 4559 may perform operations including, as discussed herein, providing for adjustment of resume language.

Resume raw norm correlator object 4561 may perform operations including, as discussed herein, providing, with respect to resumes, correlation information regarding raw words and normalized words.

Job listing raw norm correlator object 4563 may perform operations including, as discussed herein, providing, with respect to job listings, correlation information regarding raw words and normalized words.

Reach UI object 4565 may perform operations including, as discussed herein, acting to fulfill a headhunter user request to employ messaging in informing selected seekers of selected job opportunities in a fashion which allows those seekers to employ return messaging to execute job application and to provide corresponding cover letters in doing so.

Reach conductor object 4567 may perform operations including, as discussed herein, coordinating the employ of messaging to inform headhunter-selected seekers of headhunter-selected job opportunities in a fashion which allows those seekers to employ return messaging to execute job application and to provide corresponding cover letters in doing so.

Reach emailer object 4569 may perform operations including, as discussed herein, providing for messaging out to headhunter-selected seekers with regard to headhunter-selected job opportunities in a fashion which allows those seekers to employ return messaging to execute job application and to provide corresponding cover letters in doing so.

Email receipt conductor object 4571 may perform operations including, as discussed herein, coordinating the processing of a seeker job application messaging reply to a message heralding one or more headhunter-selected job opportunities.

Email extractor object 4573 may perform operations including, as discussed herein, yielding, from a seeker response message seeking job application, a UUID key and a cover letter.

Seeker resume proposed job listings librarian object 4575 may perform operations including, as discussed herein, intaking a seeker resume identifier and one or more identifiers regarding one or more job opportunities which were headhunter-selected for that seeker, performing storage to a dictionary, and returning a UUID key. Further including alternately or additionally returning as discussed herein—in view of a provided UUID key—a seeker resume identifier and one or more identifiers regarding one or more job opportunities which were headhunter-selected for that seeker.

The SEMATFM-AMIA component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the SEMATFM-AMIA server employs a cryptographic server to encrypt and decrypt communications. The SEMATFM-AMIA component may communicate to and/or with other components in a component collection, including itself, and/or facilities of the like. Most frequently, the SEMATFM-AMIA component communicates with the SEMATFM-AMIA database, operating systems, other program components, and/or the like. The SEMATFM-AMIA may contain, communicate, generate, obtain, and/or provide program component, system, user, and/or data communications, requests, and/or responses.

Distributed SEMATFM-AMIAs

The structure and/or operation of any of the SEMATFM-AMIA node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such a combination of hardware may be distributed within a location, within a region and/or globally where logical access to a controller may be abstracted as a singular node, yet where a multitude of private, semiprivate and publically accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access).

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the SEMATFM-AMIA controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services, Microsoft Azure, Hewlett Packard Helion, IBM Cloud services allow for SEMATFM-AMIA controller and/or SEMATFM-AMIA component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c -post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the SEMATFM-AMIA controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of
message do {
    $input = "";
    $input = socket_read($client, 1024);
    $data .= $input; =
} while($input != "");
// parse data to extract variables
$obj = json_decode($data, true);
// store input data in a database
mysql_connect("201.408.185.132",$DBserver,$password); // access
database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

As an example, butler objects may be employed. Via the employ of such butler objects, method calls using pseudocode in keeping with a call made to an object which runs within the same process and/or on the same machine as an object making the call (e.g., pseudocode in the form of myObject.myMethod( )) may, alternately or additionally, be made to an object which runs within a different process and/or on a different machine than the object which makes the call. In particular, such interprocess and/or intermachine method calls may include a sending butler object which runs within the same process and/or on the same machine as the calling object, and a counterpart receiving butler object which runs within the same process and/or on the same machine as an ultimate target object. Returning to the noted example pseudocode in the form of myObject.myMethod( ), it is noted that where such butler objects are employed such pseudocode may be substituted with sendingButlerForMyObject.myMethod( ).

So as to illustrate by way of example, in keeping with the Swift/Apple frameworks pseudocode employed herein, suppose that an object schoolRegistrar implements a method calculateAverageForGrade1(_: andGrade2: andGrade3:), such method having the declaration:

func calculateAverageForGrade1(_theGrade1: Int, andGrade2 theGrade2: Int, andGrade3 theGrade3: Int)→Int where the declaration indicates that the method may take a first parameter of type Int, the first parameter having the local parameter name "theGrade1" and having no external parameter name. The declaration further indicates that the method may take a second parameter of type Int, the second parameter having a local parameter name "theGrade2" and having the external parameter name "andGrade2." The declaration also indicates that the method may take a third parameter of type Int, the third parameter having a local parameter name "theGrade3" and having the external parameter name "andGrade3." Moreover, the declaration indicates that the method may have a return type of Int. Suppose that the method takes in three integer-specified test scores and returns the average of those scores.

Suppose that a method running on a first machine and/or within a first process wishes to call such method of the schoolRegistrar object and that schoolRegistrar is running on a second machine and/or within a second process. To facilitate discussion, it is the scenario of running on a second machine which will be discussed. It is noted however that that which will be discussed is analogously applicable to the scenario of running in a second process.

Running on the first machine may be an object sendingButlerForSchoolRegistrar which implements a method which has the same name and declaration as the noted calculateAverageForGrade1(_: andGrade2: andGrade3:), but which rather than returning the average of the three integers passed to it dispatches, to an endpoint URL associated with a to-be-discussed receiving butler object receivingButlerForSchoolRegistrar running on a second machine, a SOAP request:

```
POST /ReceivingButlerForSchoolRegistrar HTTP/1.1
Host: www.example.com
Content-Type: application/soap+xml; charset=utf-8
<?xml version="1.0"?>
<soap:Envelope xmlns:soap="http://www.w3.org/2003/05/soap-envelope">
   <soap:Body>
      <CalculateAverageForGrade1andGrade2andGrade3
xmlns="http://www.example.com/calculateaverageforgrade1andgrade2andgrade3>
         <Grade1> \(theGrade1) </Grade1>
         <AndGrade2> \(theGrade2) </AndGrade2>
         <AndGrade3>\(theGrade3)</AndGrade3>
      </CalculateAverageForGrade1andGrade2andGrade3>
   </soap:Body>
</soap:Envelope>
``` wherein the use of a backslash and parentheses around a variable applies string interpolation to place that variable in the SOAP string, and as such in the above sendingButlerForSchoolRegistrar includes its received parameters at the appropriate locations in the SOAP string.

Turning to the second machine where the object schoolRegistrar runs, intermediate code (e.g., PHP-based intermediate code) running at the second machine (e.g., in connection with the noted endpoint) may listen for SOAP XML request dispatches of the sort noted, extract the SOAP string thereof, and make it available to a method of the receiving butler object running on the second machine. The method of receivingButlerForSchoolRegistrar may then—via employ of a NSXMLParser object and implementation of appropriate delegate methods therefor, along with being set to recognize the SOAP format employed by the sending butler object—come to interpret the SOAP string to, via specification of "CalculateAverageForGrade1and Grade2andGrade3" indicate a desire to make a call to the method calculateAverageForGrade1(_: andGrade2: andGrade3:) of the schoolRegistrar running on the second machine, and the SOAP string to further specify via the tag delimited <Grade1>-</Grade1>, <AndGrade2>-</AndGrade2>, and <AndGrade3>-</AndGrade3> the three parameters for that method call.

As such, receivingButlerForSchoolRegistrar may, via for instance operation in line with the noted employ of an NSXMLParser object, extract the noted three tag-delimited parameters, make a call to the noted method of schoolRegistrar, as running on the second machine, passing those three extracted parameters, and receive the result of the method call. The receiving butler may then formulate an XML response string conveying the integer return result of the made call to schoolRegistrar. Taking the receiving butler object to hold the integer return result in a variable resultFromSchoolRegistrar, the receiving butler object may prepare an XML formatted response string via code in line with the following pseudocode:

```
"<ResultofCalculateAverageForGrade1andGrade2andGrade3>
\(resultFromSchoolRegistrar)
</ResultofCalculateAverageForGrade1andGrade2andGrade3>"
``` where the backslash and parentheses employ string interpolation to place the value of resultFromSchoolRegistrar into the XML string.

The receiving butler may then pass the prepared XML-formatted response string to intermediate code (e.g., PHP-based intermediate code) which returns the XML string as the reply to the SOAP message dispatched by the sending machine.

Intermediate code (e.g., PHP-based intermediate code) running on the sending machine may receive the prepared XML-formatted response string and make it available to the method of the sending butler object of that machine. The method of sendingButlerForSchoolRegistrar may then—for instance via employ of an NSXMLParser object and implementation of appropriate delegate methods, along with being set to recognize the XML format employed by the receiving butler object—interpret the XML string, via specification of <ResultofCalculateAverageForGrade1andGrade2andGrade3> \(resultFromSchoolRegistrar) </ResultofCalculateAverageForGrade1andGrade2andGrade3> to convey the result solicited via the SOAP request string formulated by the sending butler object. As such the sending butler object may, for instance via operation in line with the noted employ of an NSXMLParser object, extract the method call result conveyed by the received XML reply. The sending butler object may then return, to the method by which it was called, the result contained in the received XML reply, the method of the sending butler object perhaps implementing such return so as to cast the result to integer in keeping with the return type of calculateAverageForGrade1(_: andGrade2: andGrade3:).

Also, the following resources may be used to provide example embodiments regarding SOAP parser implementation:

http://www.xay.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:
http://publib.boulder.ibm.com/infocenter/tivihelp/v2r1/index.jsp?topic=/com.ibm.IBMDI.doc/referenceguide259.htm all of which are hereby expressly incorporated by reference.

In order to address various issues and advance the art, the entirety of this application for Search Extraction Matching, Draw Attention-Fit Modality, Application Morphing, and Informed Apply Apparatuses, Methods and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Further and to the extent any financial and/or investment examples are included, such examples are for illustrative purpose(s) only, and are not, nor should they be interpreted, as investment advice. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower," "upper," "horizontal," "vertical," "above," "below," "up," "down," "top" and "bottom" as well as derivative thereof (e.g., "horizontally," "downwardly," "upwardly," etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached," "affixed," "connected," "coupled," "interconnected," and similar may refer to a relationship wherein structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a SEMATFM-AMIA individual and/or enterprise user, database configuration and/or relational model, data type, data transmission and/or network framework, syntax structure, and/or the like, various embodiments of the SEMATFM-AMIA, may be implemented that enable a great deal of flexibility and customization. For example, aspects of the SEMATFM-AMIA may be adapted for automated medical record prepopulation and automated medical diagnosis, where patient medical records stand in place of the discussed-herein job listings, medical condition records stand in place of the discussed-herein resumes, and operations analogous to those discussed herein are performed so as to yield, for instance, prepopulation of a submitted patient medical record with proposed patient data and return of one or more medical condition records believed to match the at-hand patient record. While various embodiments and discussions of the SEMATFM-AMIA have included relationship management systems, however, it is to be understood that the embodiments described herein may be readily configured and/or customized for a wide variety of other applications and/or implementations.

What is claimed is:

1. An apparatus, comprising:
   a memory;
   a component collection in the memory, including:
   a resume adjuster component,
   a resume raw norm correlator component,
   a job listing raw norm correlator component, and
   a resume librarian component;
   a processor disposed in communication with the memory, and configured to issue a plurality of processing instructions from the component collection stored in the memory,
   wherein the processor issues instructions from the resume adjuster component, stored in the memory, to:
   receive, in connection with an application to a job, a resume adjustment request, where the request includes one or more raw terms of a resume, one or more normalized terms of the resume, one or more raw terms of a job listing corresponding to the job, and one or more normalized terms of the job listing;

load said resume normalized terms and said job listing normalized terms into a joined normalized terms set;

add to a common normalized terms set normalized term members of the joined normalized terms set which meet a count criterion;

visit each of one or more normalized term members of the common normalized terms set;

receive, from the resume raw norm correlator component, indication of which one or more of said job-application-request-provided resume raw terms potentially map to the visited common normalized term;

receive, from the job listing raw norm correlator component, indication of which one or more of said job-application-request-provided job listing raw terms potentially map to the visited common normalized term;

add to a crossover array an element setting forth the visited common normalized term, said indication of which one or more of said job-application-request-provided resume raw terms potentially map to the visited common normalized term, and said indication of which one or more of said job-application-request-provided job listing raw terms potentially map to the visited common normalized term;

visit each of one or more elements of the crossover array;

provide user notification of the normalized term of the element;

provide user notification of the one or more resume raw terms of the element, said subject-to-notification resume raw terms potentially mapping to the normalized term of the element;

provide user notification of the one or more job listing raw terms of the element, said subject-to-notification job listing raw terms potentially mapping to the normalized term of the element; and receive user selection of one of the resume raw terms of the element;

receive user selection of one of the job listing raw terms of the element; and request, from the resume librarian component, formulation of an adjusted resume record which substitutes each of user-selected resume raw terms with a corresponding user-selected job listing raw term;

wherein the processor issues instructions from the resume raw norm correlator component, stored in the memory, to:

receive, from the resume adjuster component, a correlations request, wherein said correlations request includes the visited common normalized term and the resume raw terms received in connection with the job application request; and provide, to the resume adjuster component, said one or more of said job-application-request-provided resume raw terms which potentially map to the visited common normalized term;

wherein the processor issues instructions from the job listing raw norm correlator component, stored in the memory, to:

receive, from the resume adjuster component, a correlations request, wherein said correlations request includes the visited common normalized term and the job listing raw terms received in connection with the job application request; and provide, to the resume adjuster component, said one or more of said job-application-request-provided job listing raw terms which potentially map to the visited common normalized term; and wherein the processor issues instructions from the resume librarian component, stored in the memory, to:

receive, from the resume adjuster component, a request to formulate the adjusted resume record, wherein said record formulation request includes specification of the resume and substitution information; and formulate the adjusted resume record which substitutes each of user-selected resume raw terms with a corresponding user-selected job listing raw term, wherein the formulation includes accessing one or more stores.

\* \* \* \* \*